United States Patent [19]

DeVale et al.

[11] Patent Number: 4,463,429

[45] Date of Patent: Jul. 31, 1984

[54] COMPUTER CONTROLLED APPARATUS FOR GRAIN ELEVATORS

[75] Inventors: Donald P. DeVale, Sycamore; Howard B. Wilbrandt, Crystal Lake; Dennis E. Tomlinson, St. Charles; Ashish Shah, Dekalb, all of Ill.

[73] Assignee: Industrial Design Engineering Associates, Ltd., Sycamore, Ill.

[21] Appl. No.: 295,686

[22] Filed: Aug. 24, 1981

[51] Int. Cl.[3] ........................ G06F 15/20; G06G 7/48

[52] U.S. Cl. .................................... 364/466; 364/464; 364/469; 364/497; 364/498; 364/567; 364/568; 364/552; 73/76

[58] Field of Search ............... 364/466, 464, 469, 567, 364/568, 552, 525, 497, 498; 73/76; 374/14; 177/25

[56] References Cited

U.S. PATENT DOCUMENTS

| | | | |
|---|---|---|---|
| 3,890,825 | 6/1975 | Davis | 374/14 |
| 3,962,569 | 6/1976 | Loshbough et al. | 364/466 |
| 3,994,156 | 11/1976 | Koster | 73/76 |
| 4,040,747 | 8/1977 | Webster | 364/525 |
| 4,045,657 | 8/1977 | Falke | 364/567 |
| 4,165,633 | 8/1979 | Raisamen | 73/76 |
| 4,212,074 | 7/1980 | Kuno et al. | 364/466 |
| 4,299,115 | 11/1981 | Athey et al. | 364/567 |
| 4,301,878 | 11/1981 | Soe | 364/466 |
| 4,313,509 | 2/1982 | Engels | 364/466 |
| 4,316,384 | 2/1982 | Pommer et al. | 364/567 |
| 4,326,254 | 4/1982 | Uchimura et al. | 364/466 |
| 4,328,874 | 5/1982 | Gumberich et al. | 364/567 |
| 4,354,244 | 10/1982 | Miller et al. | 364/568 |
| 4,372,405 | 2/1983 | Stuart | 177/25 |

*Primary Examiner*—Joseph F. Ruggiero
*Assistant Examiner*—John R. Lastova
*Attorney, Agent, or Firm*—Hill, Van Santen, Steadman & Simpson

[57] ABSTRACT

A computer controlled apparatus for grain elevators which includes a computer with keyboard and display and suitable output devices such as a printer and which receives inputs from sensing devices such as scales and moisture analyzers and sensors and which records and retains grain transactions as the grain is weighed and unloaded and in which samples of the grain are selected and analyzed in a moisture meter. The elevator operator inputs with the keyboard particular customer numbers and other desired information and the apparatus eliminates weigh ticket writing and prints over the scale transactions automatically and provides instant decision data such as marketing data so that the accounting functions can be automatically selected.

4 Claims, 14 Drawing Figures

FIG. 1
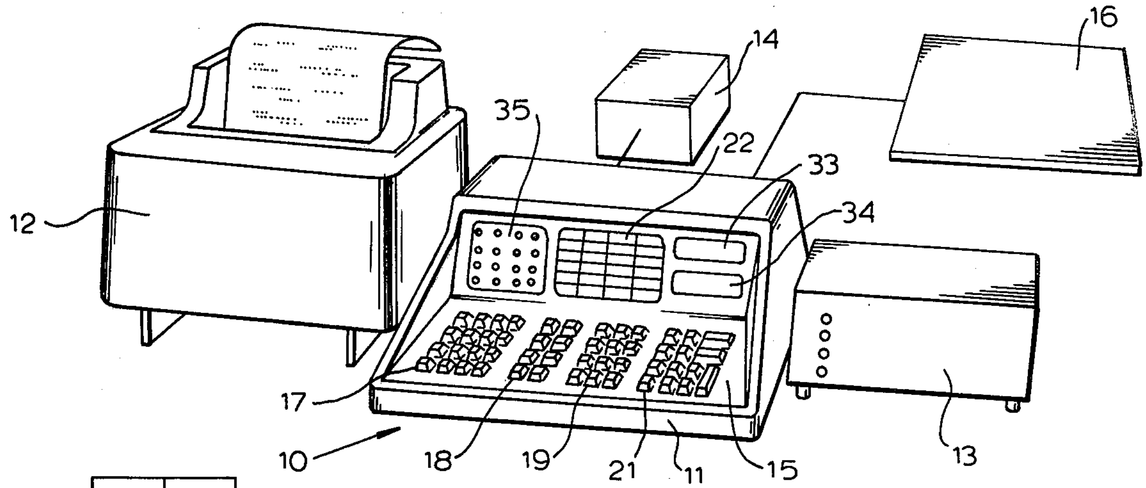
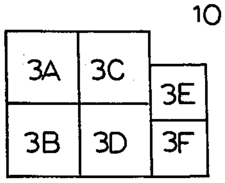
FIG. 3
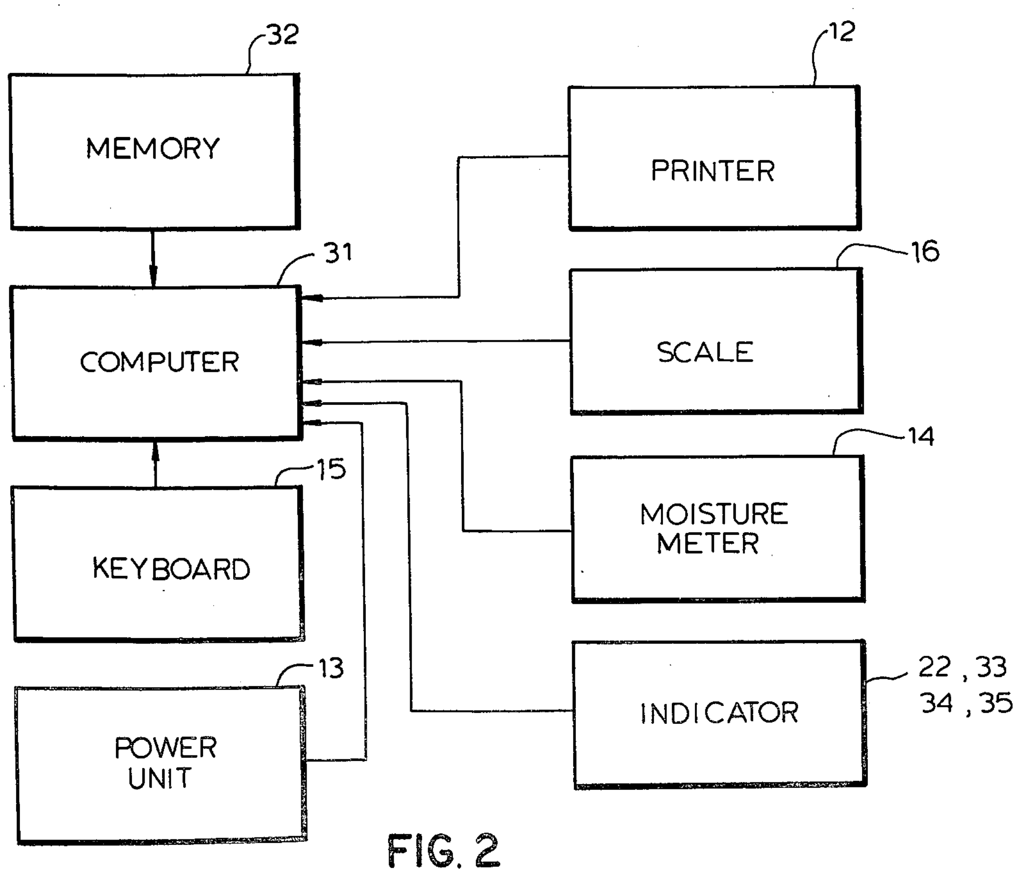
FIG. 2

COMPUTER CONTROLLED APPARATUS FOR GRAIN ELEVATORS

BACKGROUND OF THE INVENTION

1. Field of the Invention

This invention relates in general to computer controlled accounting and record keeping for grain transactions and in particular to an automatic system.

2. Description of the Prior Art

In the handling of grain buying and selling in grain elevators, it has previously been necessary for the elevator operator to weigh and sample the incoming grain, unload the grain and then weigh the vehicle to obtain the tare weight and then to calculate for each individual customer transaction the buy-sell or storage information. Each customer transaction has required the preparation of a weigh ticket and the subsequent calculations which are required to maintain and record the customer's debit or credit position as well as to obtain the overall elevator's position and inventory.

Such systems have been subject to human error in entering the required data, have been time consuming and required skillful personnel in obtaining accurate records.

SUMMARY OF THE INVENTION

The present invention comprises a computer controlled system for grain elevators which can receive inputs from scales and moisture meters and wherein the elevator operator can simply and easily enter with the computer keyboard the required information and the computer system will automatically record the transaction and will provide an output such as one or more printed copies to record the transaction. The system can automatically calculate purchase and sales prices including dockage discounts and allows the call-up at any time of sub-totals and can print current totals by bushels or cwt in all customer delivery options, dealer shipments and can even accumulate average moisture intake and moisture dockage revenue.

The system prints a daily journal listing each transaction of the day in sequential customer order and groups or transactions for a particular customer when there have been multiple transactions by one customer.

The system stores and maintains all incompleted transactions until the data for completing the transaction has been entered and the transaction has been printed and is no longer required to be retained in storage.

The system is capable of being connected to an electronic weigh scale. It can be connected to a permanent memory storage system and can be connected to terminal hardware.

The system completes every grain transaction in or out from weight scale to accounting faster and accurately and eliminates human error. Instant marketing and decision data is available with the invention.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a perspective view of the invention;

FIG. 2 is a block diagram of the invention;

FIG. 3 is a chart illustrating how schematic FIGS. 3A–3F fit together;

DESCRIPTION OF THE PREFERRED EMBODIMENTS

Figure 3A:
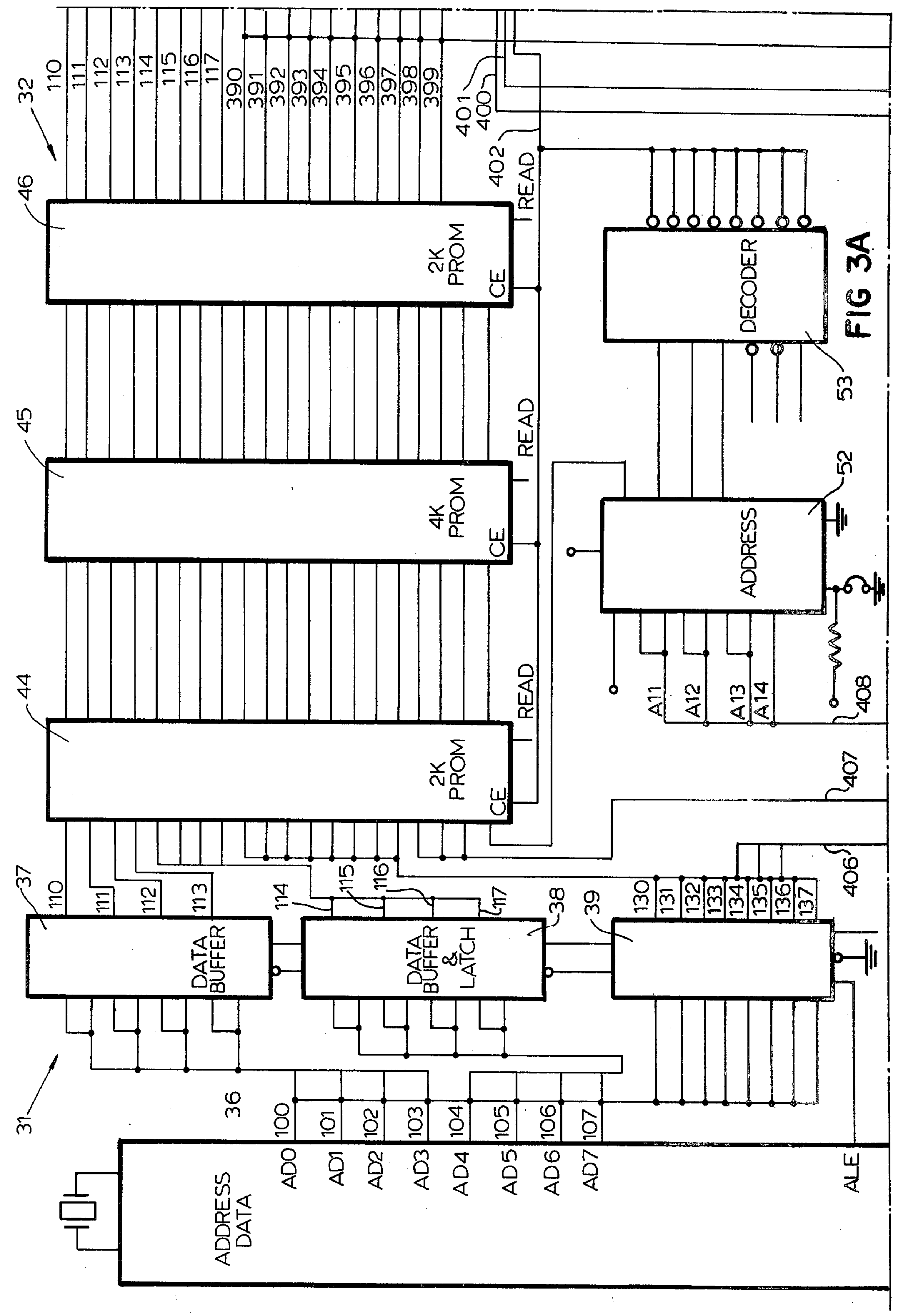
FIGS. 3A–3F are a schematic diagram illustrating the invention.

FIG. 1 illustrates the novel grain computer system 10 of the invention which includes a main console 11 which is electrically connected to a printer 12 and receives inputs from a moisture meter 14 and a scale 16 for weighing grain. A main power unit 13 is also connected to the console 11. A keyboard 15 includes four separate groups of keys 17, 18, 19 and 21. There are sixteen keys in keyboard portion 17 which have the following designations, Price, Test Weight, Form Feed, Program, Moisture, Contract, Off, Del Trans, FM, Print Journal, Print Lock, Date DMG, Lock, DPR, SSH. The second group of keys 18 comprise eight keys which have the following designations, Weight In, Weight Out, Share, Service, Sell, Store, Contract, Price.

A third group of keys 19 comprise twelve keys comprising digits 0–9 with a delete and decimal point key. A Fourth group of keys 21 have the following designations, Sun Flower, Rice, Milo, Oats, Corn, Bean, Wheat A, Print, Customer, B, C, Enter.

The console also has an indicator board 22 with twenty-four areas that can be selectively lighted which have the following captions, Price, Print Lock, Date, Program, Service, Shares, Contract, Delayed Price, % Moisture, %F.M., Test Weight, Damage, Oats, Milo, Sun Flower, Blank, Sell, Store, Weight In, Weight Out, Corn, Beans, Rice, Wheat. A couple of indicator regions 33 and 34 display the customer number.

An indicator area 35 has indicator lights 1 through 16.

FIG. 2 illustrates a computer 31 with memory 32 which is interconnected to the keyboard 15, the power unit 13, printer 12, the weighing scale 16, the moisture unit 14 and the indicators 22, 33, 34 and 35.

Figure 3B:
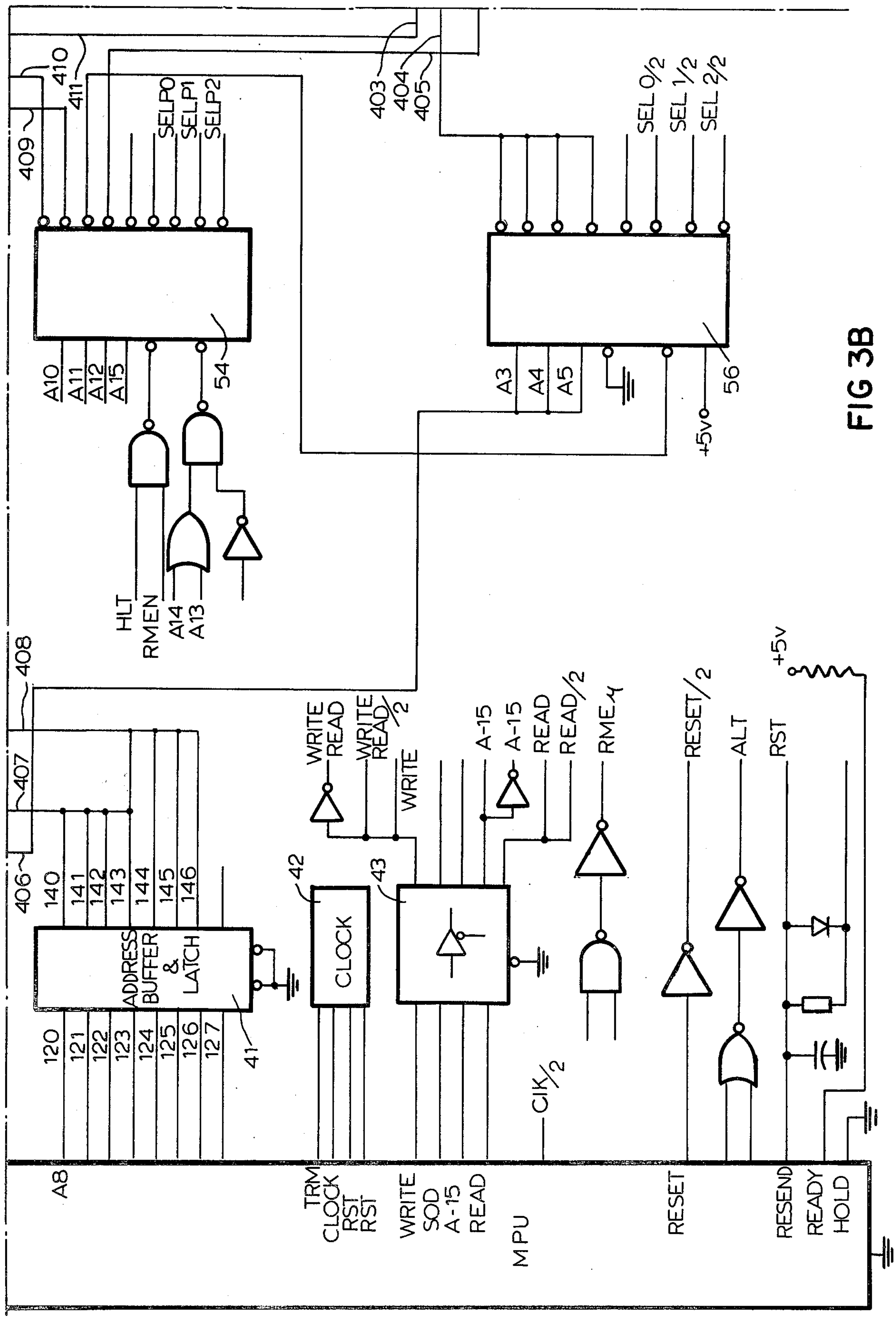
Figure 3C:
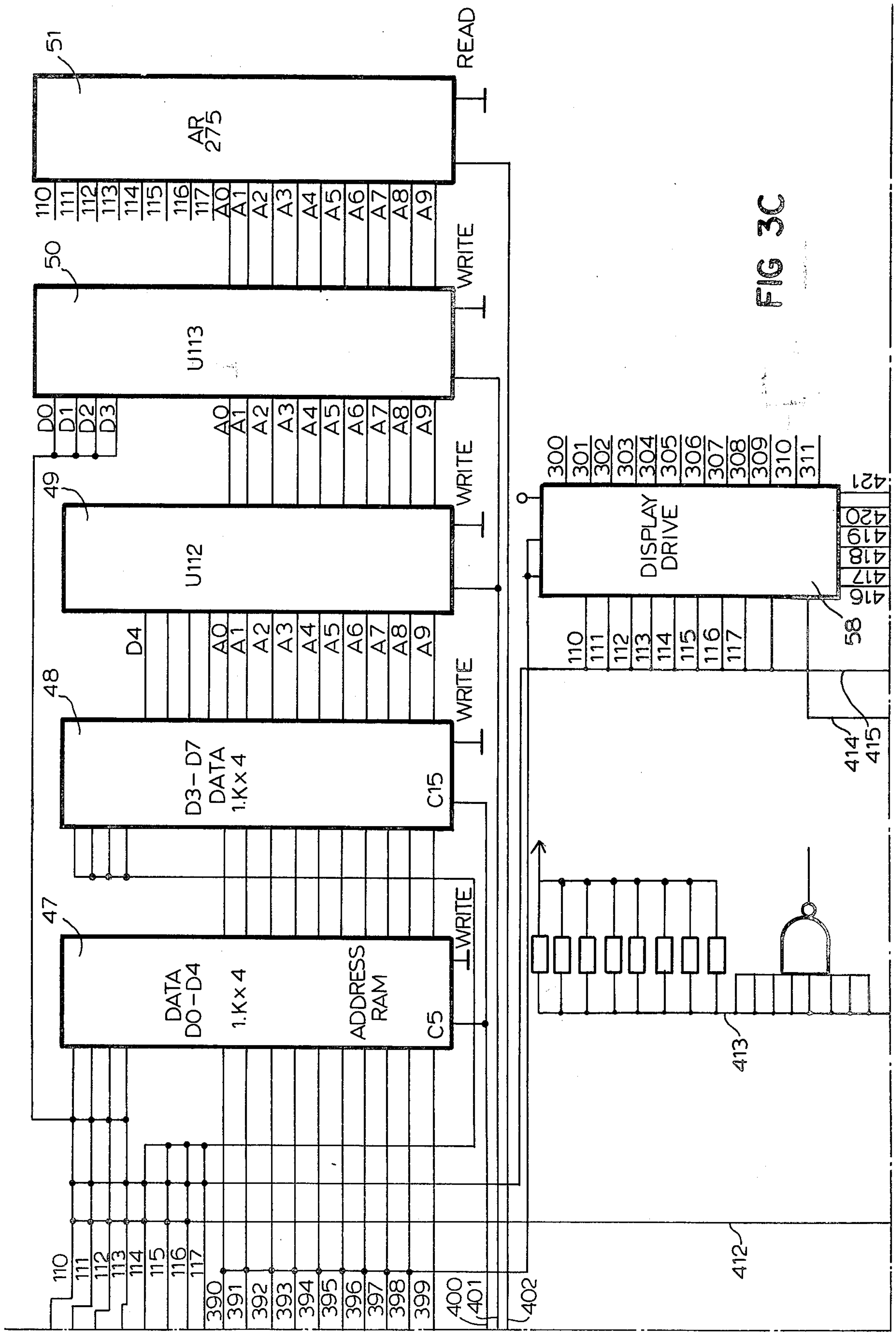
Figure 3D:
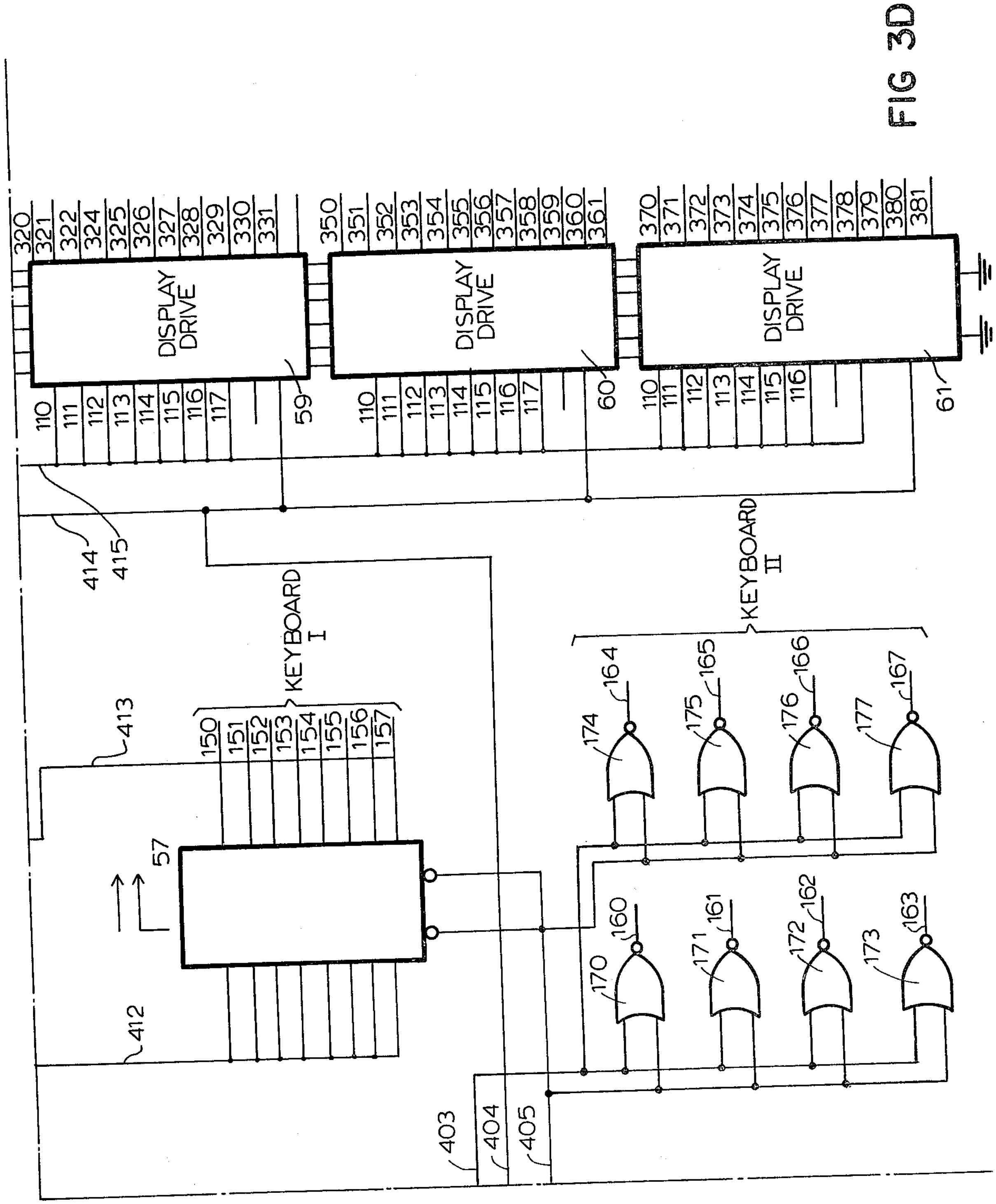
Figure 3E:
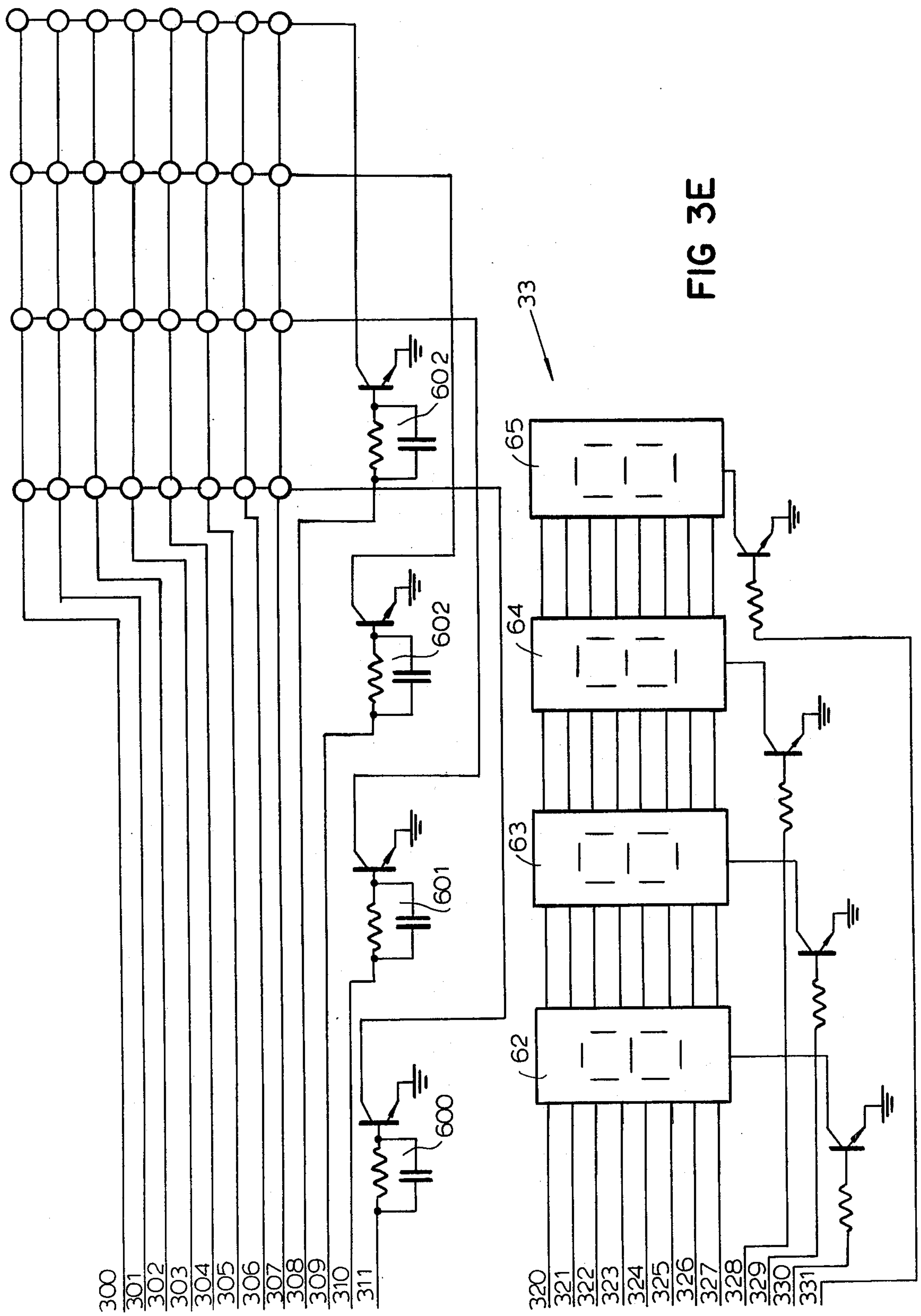
Figure 3F:
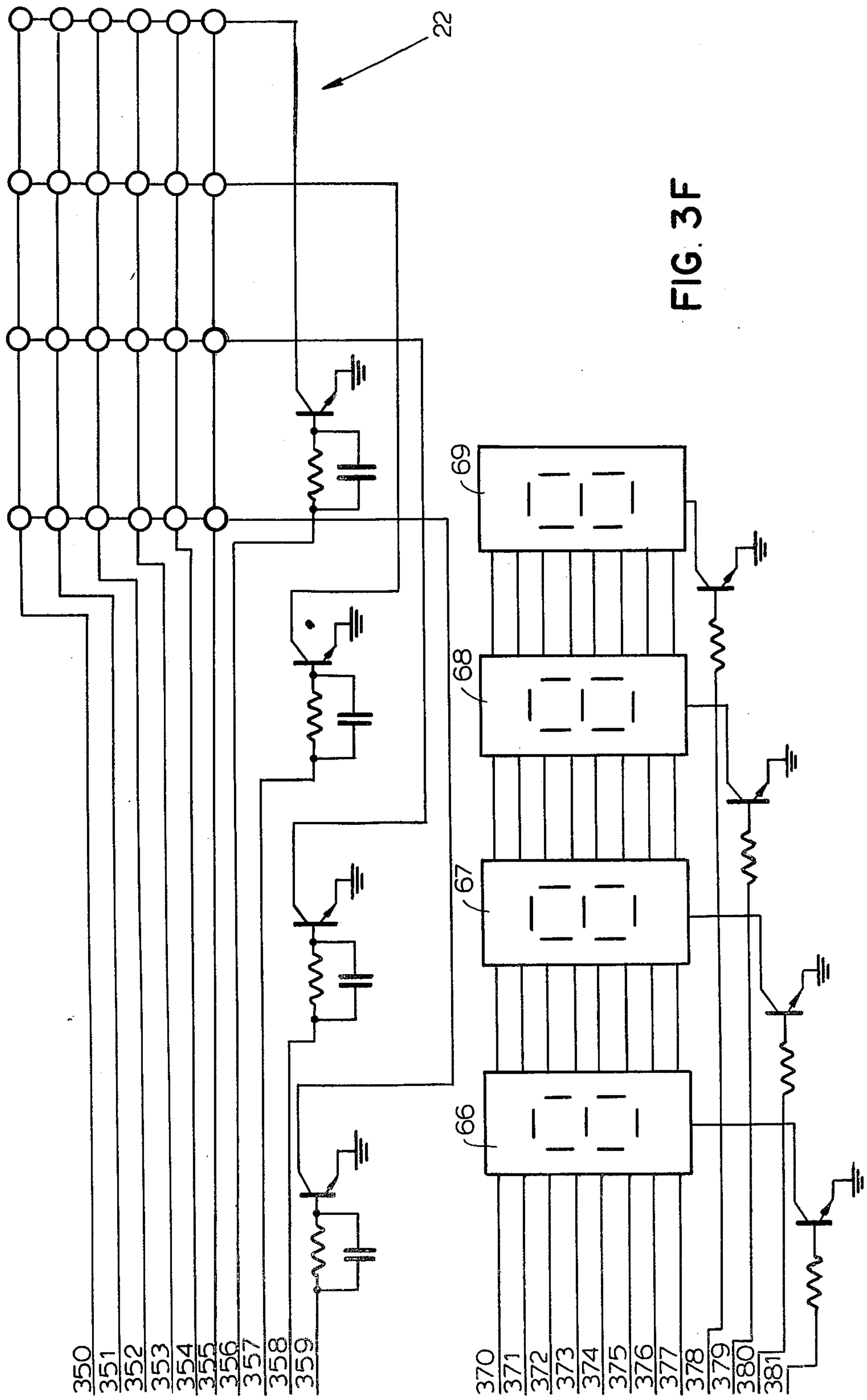

FIGS. 3A, 3B, 3C and 3D, 3E, 3F illustrate the computer 31 and memory 32 with the various components for interconnecting it as illustrated in FIG. 2. FIGS. 3A and 3B illustrate the microprocessor 36 which has data buses 100 through 107 which are, respectively, connected to data buffers 37 and 38 which have data busses 110 through 117. A pair of address buffers and latches 39 and 49 are connected to the computer 36 with the buffer 39 being connected to leads 100 through 107 and the buffer 41 being connected to leads 120 through 127. A plurality of leads 130 through 137 of buffer 39 are connected to a memory of a PROM type 44. Leads 140 through 143 of buffer 41 are connected to the PROM 44. Leads 143 through 146 are connected to an address decoder 52 which is connected to a decoder 53. A decoder 56 is connected to outputs 134, 135 and 136 of the buffer 39. The buffers 37 and 38 may be type AT28N. The MPU 36 may be type 8085. The buffer 39 may be type 8212. The buffer 41 may be type 81LS97. An inverter 43 is connected to write and read outputs from the MPU 36 and it may be a type LS97. A PROM 45 and a PROM 46 are connected to the PROM 44 as well as to a pair of RAM memories 47 and 48 and memories 49, 50 and 51 connected as shown. Decoders 53 and 54 are connected to the memory units 44 through 51 and to display drivers 58, 59, 60 and 61. Display drivers 58 through 61 may be type 74C911 and these are connected to drive the indicator lights and alpha numeric indicators 62 through 69 which indicate the customer number in regions 33 and 34 as well as the indicator lights 22 and 35.

Figure 4:
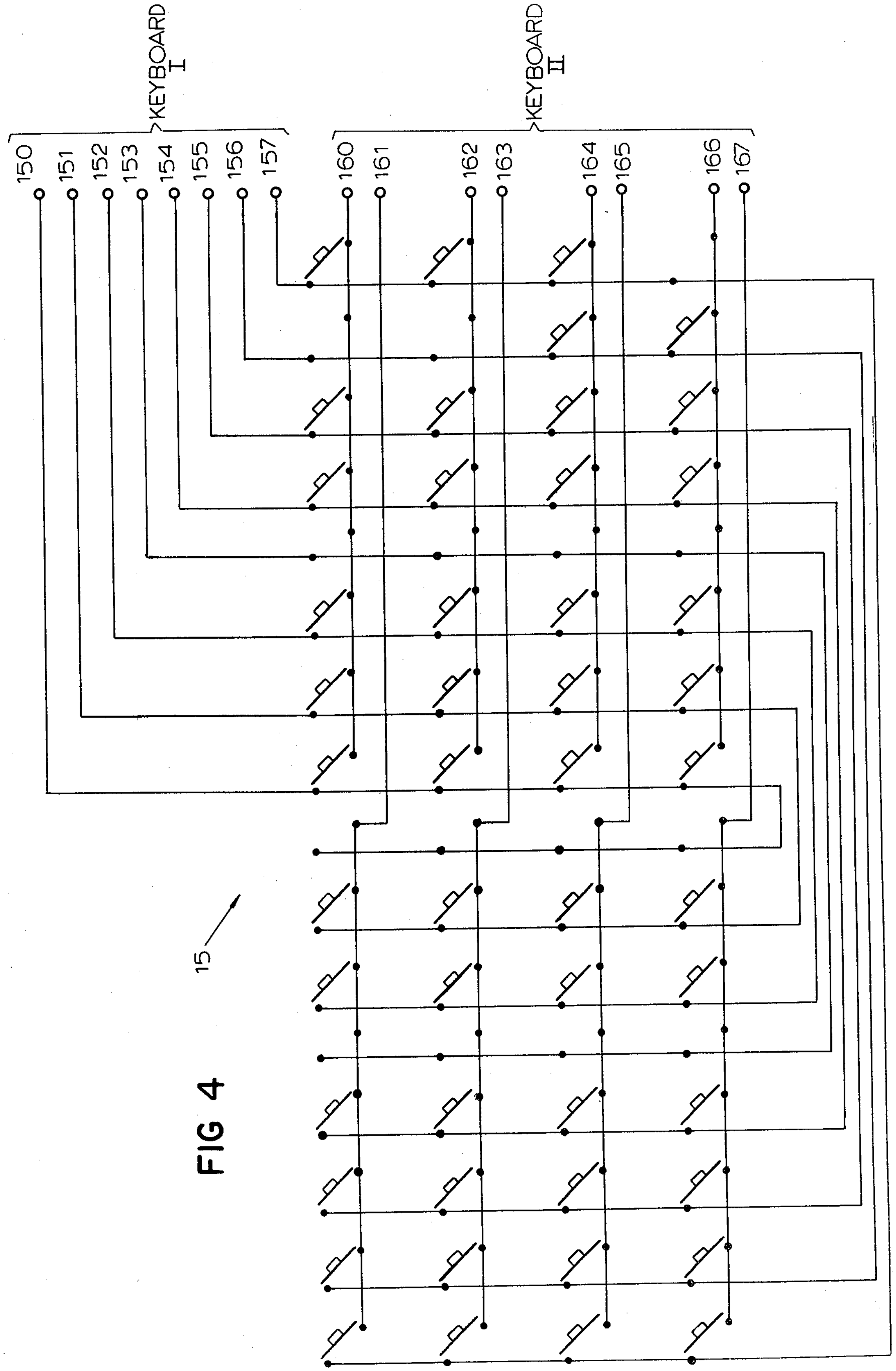
FIG. 4 illustrates the keyboard switches.

Keyboard 15 is illustrated in FIG. 4 and comprises a plurality of finger operated push button switches which make up the keyboards 17, 18, 19 and 21. The keyboard switches form vertical and horizontal matrixes which are respectively connected to leads 150 through 157 and 160 through 167. The leads 150 through 157 are connected to unit 57 which may be a type 81LS97 and the leads 160 through 167 are connected to gates 170 through 177. The gates 170 through 177 are connected to unit 54 and to leads 404 and 405.

Figure 5:
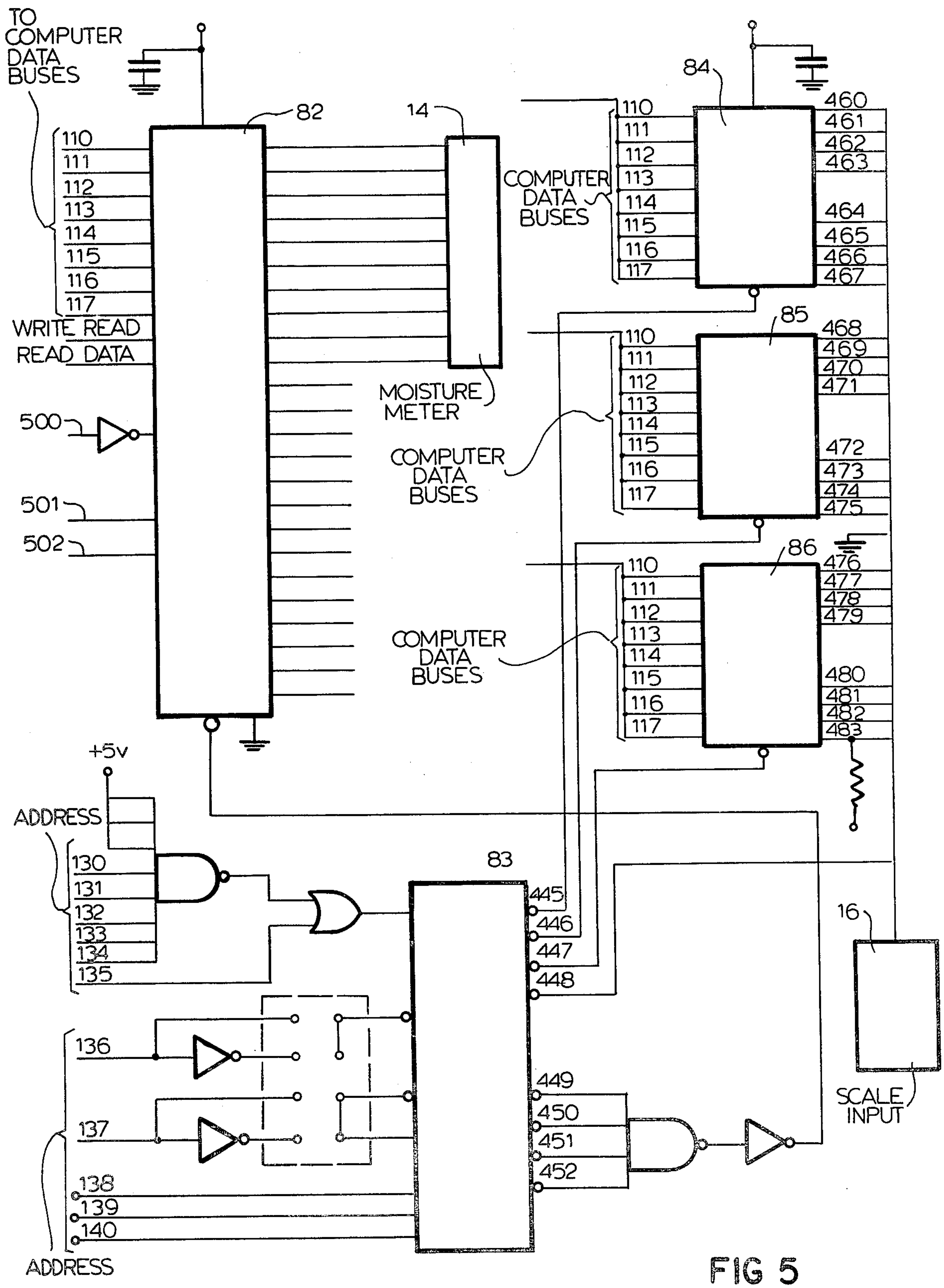
FIG. 5 illustrates the scale and moisture meter schematic.

FIG. 5 illustrates the scale 16 which is connected to units 84, 85 and 86 which may be type 74LS244 which are connected to computer data buses 110 through 117, respectively. These units also receive inputs from an element 83 which may be a type 74LS138 which receives inputs from the address buses of the computer.

The moisture meter 14 is connected to data buses 110 through 117 through a unit 82 which may be a type 8255A.

Figure 6:
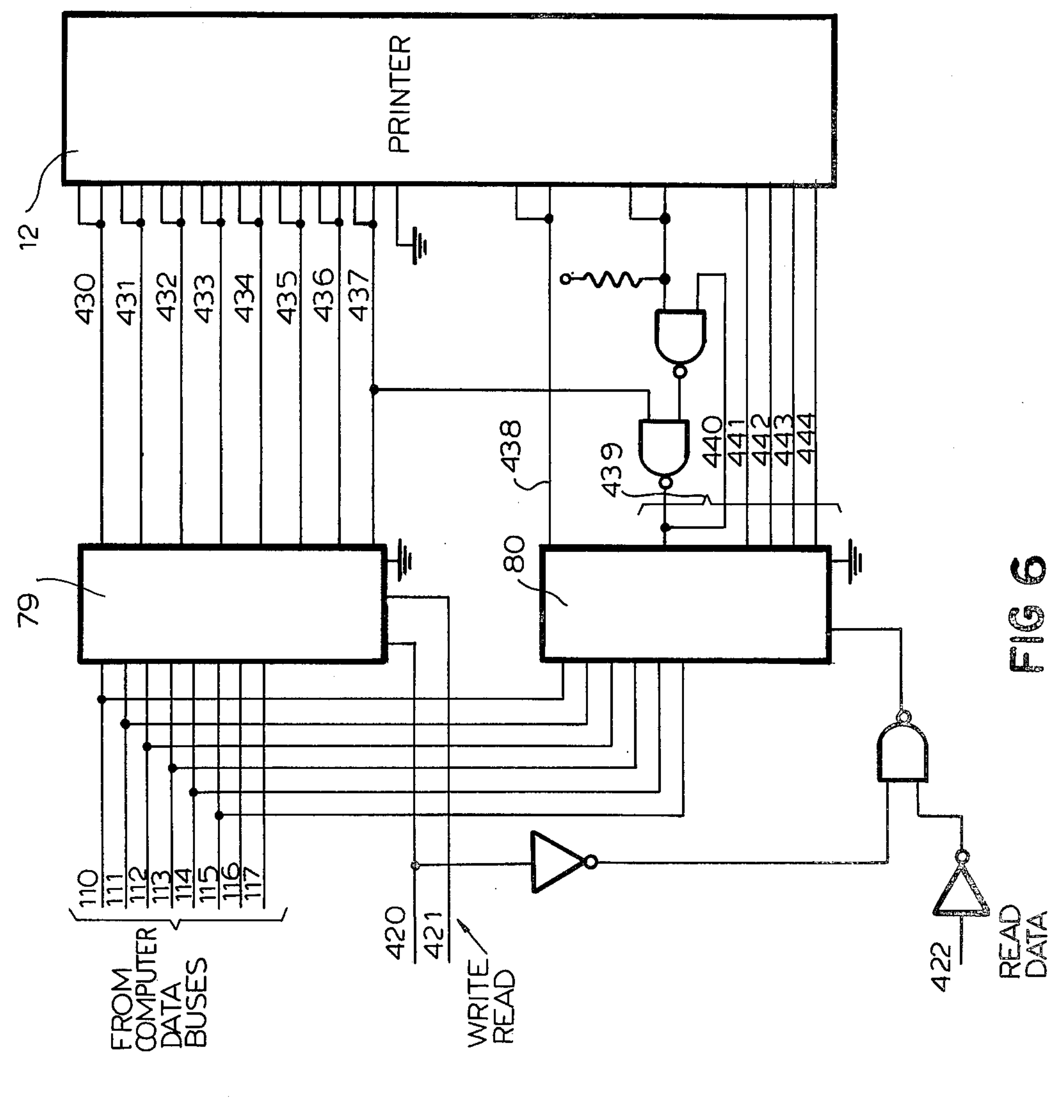
FIG. 6 illustrates the printer schematic.

FIG. 6 illustrates the printer 12 which is connected to the data buses 110 through 117 through a unit 79 which may be of type 8212 and a unit 80 which may be type LS367.

Figure 7:
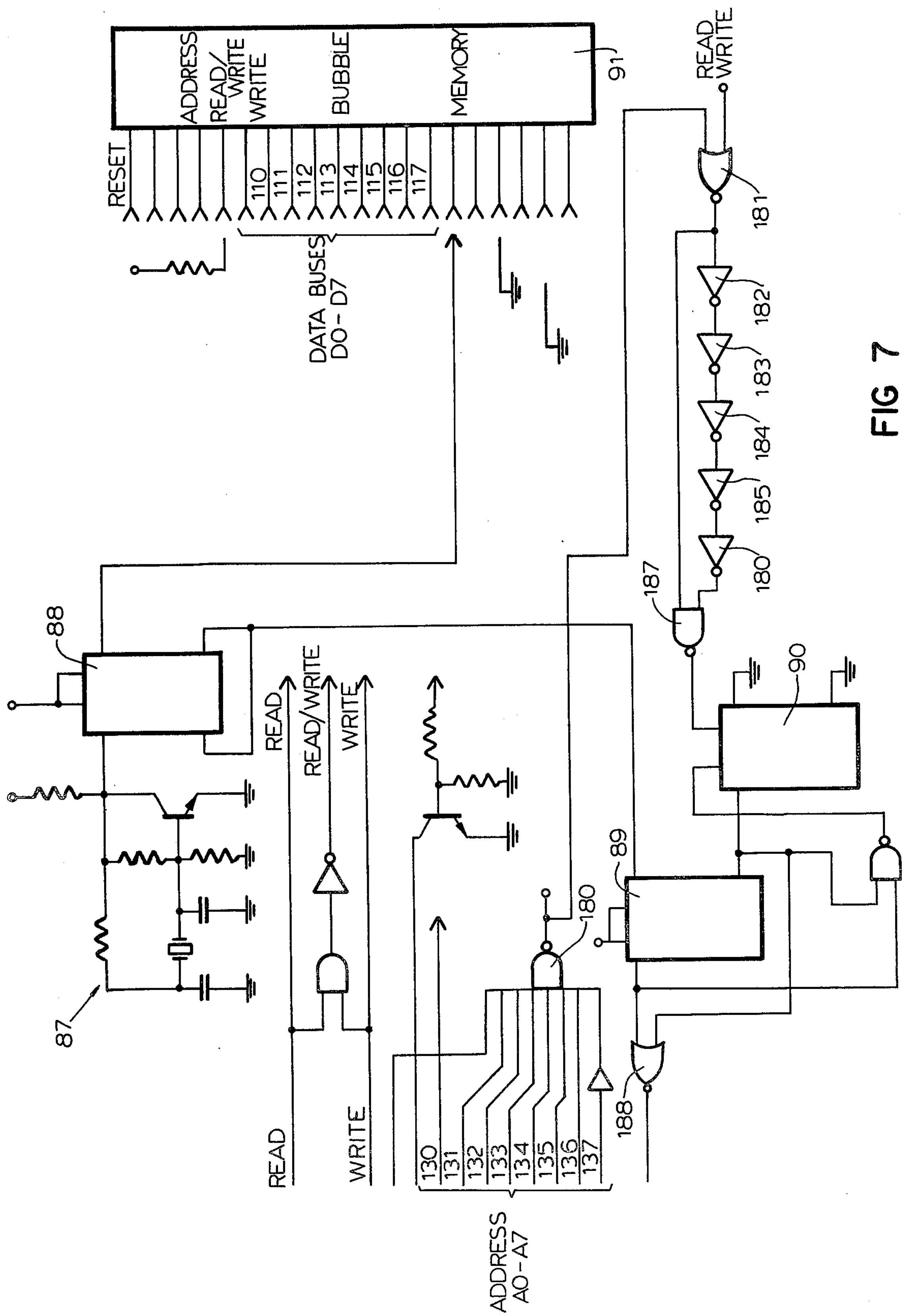
FIG. 7 illustrates the bubble memory schematic.

FIG. 7 illustrates a bubble memory 91 which is connected to data terminals 110 through 117 and also receives an input from a unit 88 which may be a type LS74 which receives an input from an oscillator 87. Address terminals 130 through 137 supply through a gate 180 which is connected to a gate 181 and through gates 182 through 187 to a unit 90 which may be a type LS94 which is connected to the unit 89 and to gate 188. The bubble memory allows large capacity of storage of data for the computer.

Figure 8:
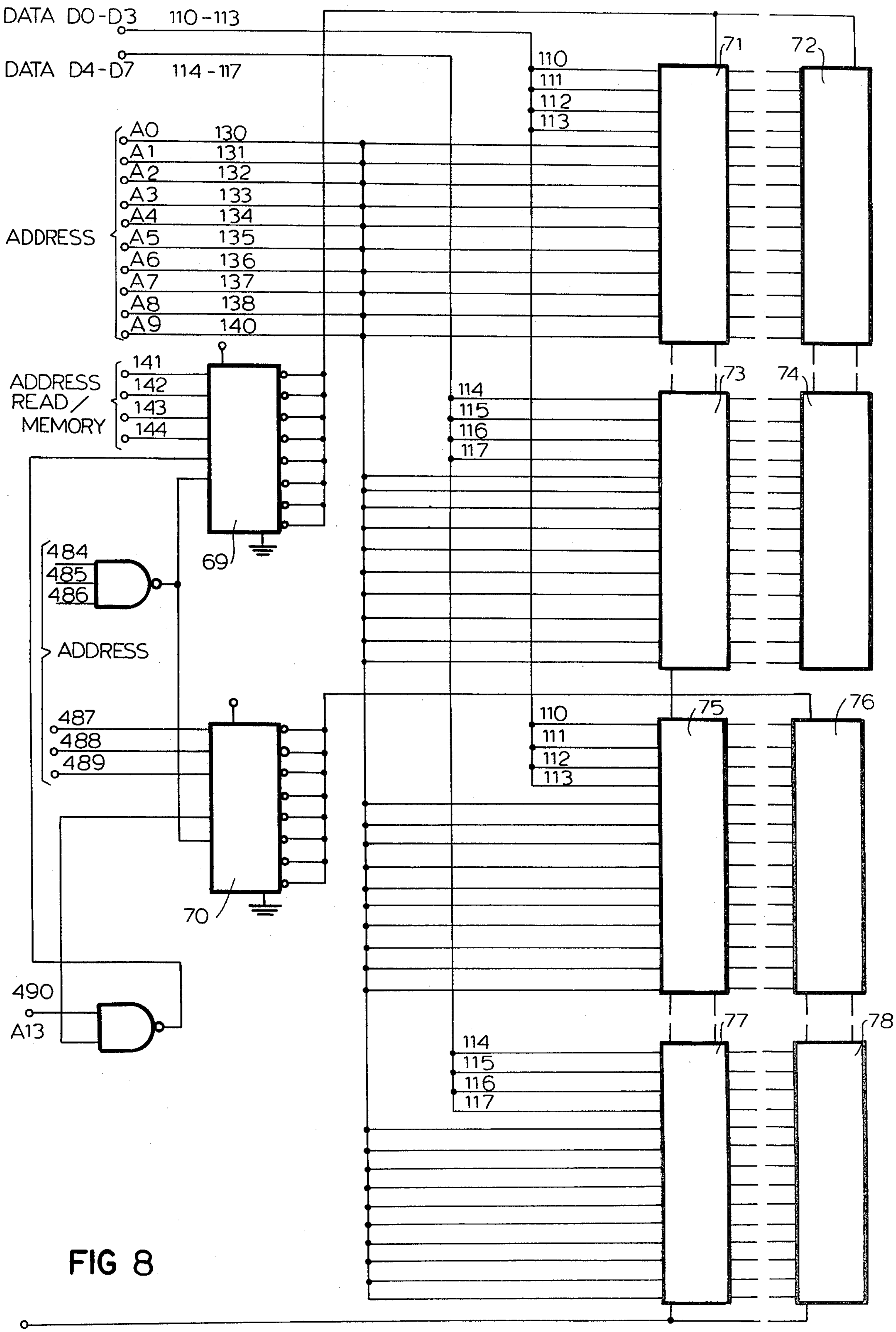
FIG. 8 illustrates the memory schematic.

FIG. 8 illustrates a plurality of additional RAM units 71 through 78 which are interconnected with the data buses 110 through 117 and the address buses 130 through 144. Units 69 and 70 which may be type LS138 receive address inputs and are connected to the RAM units 71 through 78. It is to be realized that although only eight RAM units are shown in FIG. 8 that thirty-two or more may be utilized in an actual system.

A program for the computer of this invention is attached herewith.

The invention comprises a definite purpose computer designed specifically for daily operating procedures of a commercial grain facility and results in increased operating and management efficiency and virtually eliminates clerical errors and substantially reduces the time and personnel needs through improved daily record keeping.

The invention provides information for each customer, each transaction, the delivery options and also designates share splits where more than one person is to be compensated for the grain. Such services as trucking and storage charges are also incorporated into the calculations.

At any time, the invention will print a "daily journal" of all transactions during that day or time period. Also, it 'is capable of printing individual settlement sheets, dealers current position reports and dealers daily position reports.

The invention systems perform the arithmetic calculations for automatically computing gross and tare weights to net weight considering shrinkage factors, dockages for moisture, foreign material, damage and test weight. Customer transactions may be immediately printed or retained in the computer's memory for a later printing.

Summaries of the current inputs and outputs of each commodity by delivery option and dealer shipments is also available for print-out.

The invention provides total flexibility for programming prices and dockages at any time and market fluctuations allow the operator to decrease or increase the prices immediately.

In order to energize the invention, a secret code number can be provided where upon the machine may be turned on or off by utilizing such secret codes for turning on or off the machine. This prevents tampering with the information stored in the computer memories during off hours by unauthorized personnel.

The invention can store in its memories a large number of customer transactions which can be recalled at any time for a printed customer sheet.

For example, for each customer transaction, the customer's number is entered on the keyboard of the machine and then the applicable commodity is identified by pressing the commodity key such as corn, beans, oats, rice, wheat, milo or sun flowers. Then the customer's delivery option such as sell, store, contracts or delayed price is selected by actuating the keyboard. The weight in, gross is automatically entered into the computer system or in an alternative mode may be manually entered from the keyboard. The moisture content of the grain is either detected and automatically supplied by the moisture meter of the invention or can be manually entered in an alternate mode. Test weight is entered and the percentage of foreign material is entered on the keyboard as well as the percent of estimated damage. When the vehicle has been unloaded the tare weight out is supplied to the computer and the invention will print a customer transaction. If the price has been established, it will be a completed customer transaction, but if delayed price or other arrangements have been made, an incomplete customer transaction will be stored for later completion. Such customer transactions may be recalled by either the customer number and specific load number or, alternatively, by the dealer transaction number.

The following is an example of a customer transaction print-out.

HOME GRAIN COMPANY, INC.
1250 RAILROAD STREET, ANYTOWN, ILLINOIS 61843
John Adams, Mgr. (814 562 4828) Betty Doe, Ofc., Mgr.
14:05 HRS. DATE 10/08/80
"ORIGINAL"

CUSTOMER NAME: ____________

| | | | |
|---|---|---|---|
| TRANSACTION NO: 0014-A CUSTOMER NO: 847-2 KIND OF GRAIN: | | CORN SELL | |
| WEIGHT IN: 40160 lbs. | WEIGHT OUT: 12800 lbs. | NET WEIGHT: 27360 lbs. | |
| STD. WEIGHT: 56.00 lbs./bu. | | | |
| | NET BEFORE SHRINK: | 488.57 bu. @ $2.47 | $1206.76 |
| MIN TEST WT: 54.00 lbs./bu. | TW: 52.40 lb @ $.0100/lb/bu. | $ 7.81 | |
| MOISTURE: 19.80% | | | |
| DRYING CHARGE: | 4.29 pts @ $.0700/pt/bu. | $146.71 | |
| FOREIGN MATERIAL: (3.80%) | 0.80% @ $ .0100/%/bu. | $ 3.90 | |
| DAMAGE: (5.60%) | 0.60% @ $.0200/%/bu. | $ 5.86 | |
| | TOTAL DOCKAGE | $164.28 | $ 164.28 |
| | | NET TOTAL | $1042.48 |
| NET AFTER SHRINK: 459.22 bu. | | | |

The invention also is capable of printing the daily position record such as illustrated below.

HOME GRAIN COMPANY, INC.
1250 RAILROAD STREET, ANYTOWN, ILLINOIS 61843
John Adams, Mgr. (814 562 4828) Betty Doe, Ofc., Mgr.
17:42 HRS. DATE 10/08/80

DAILY POSITION RECORD

C C C WAREHOUSE CODE NO. 9-1234
ALL QUANTITIES IN BUSHELS — KIND and CLASS OF GRAIN CORN

SUMMARY STOCK RECORD

| Received | Loaded Out | Adjustments | Total Stock |
|---|---|---|---|
| 3653.59 | .00 | 117.57 | 7354.96 |

STORAGE LIABILITY AND POSITION RECORD

| Warehouse Receipt Liability | | | Open Storage Liability | | |
|---|---|---|---|---|---|
| Issued | Cancelled | Outstanding | Increase | Decrease | Total |
| .00 | .00 | .00 | 233.55 | .00 | 749.88 |

| Warehouse Owned Grain | | | Total |
|---|---|---|---|
| Increase | Decrease | Total | Storage |
| 3302.47 | .00 | 6605.08 | 7354.96 |

The invention is also capable of indicating the intake of different grains for the day as shown by the following report.

HOME GRAIN COMPANY, INC.
1250 RAILROAD STREET, ANYTOWN, ILLINOIS 61843
John Adams, Mgr. (814 562 4828) Betty Doe, Ofc., Mgr.
13:01 HRS. DATE 10/08/80

KIND and CLASS OF GRAIN CORN
INTAKE FOR TODAY IS

| | NET Bu/cwt | GROSS Bu/cwt |
|---|---|---|
| FOR SALE: | 3302.47 | 6850.84 |
| FOR STORAGE: | 233.55 | 250.00 |
| ON CONTRACT: | .00 | 1515.46 |
| FOR DELAY PRICE: | .00 | 1785.58 |
| SHIPPED TODAY: | .00 | 3389.95 |
| MOISTURE REVENUE: $ | 546.56 | |
| AVG. MOISTURE IN: | 17.62% | |

Although the invention has been described with respect to preferred embodiments, it is not to be so limited as changes and modifications can be made which are within the full intended scope of the invention as defined by the appended claims.

The following pages comprise the computer program:

| | |
|---|---|
| Module Program | COL. 9-66 |
| Module Program | COL. 65-120 |
| Module Program | COL. 119-262 |
| PRCHAR Program | COL. 261-264 |
| GRNCUF Program | COL. 265-272 |
| GRNSSF Program | COL. 271-276 |
| MAXFND Program | COL. 275-280 |
| BEEPER Program | COL. 281-282 |
| DELAY Program | COL. 281-284 |
| STUFFE Program | COL. 283-284 |
| PRNMSG Program | COL. 283-286 |
| KYSCN Program | COL. 285-288 |
| PRFRH Program | COL. 287-290 |
| GACIO Program | COL. 289-298 |
| SCLIO3 Program | COL. 297-304 |
| SCLIO3 Program | COL. 303-310 |

```
ISIS-II 8080/8085 MACRO ASSEMBLER, V3.0        MODULE

LOC  OBJ          LINE        SOURCE STATEMENT

                      $DEBUG
                      ;THIS IS PROGRAM GRNPRD.ASM 2/21/81
                      ;CHANGE MADE THIS DATE ON PTKTB 2/21/81
                      ;CHANGE MADE ON DATE 2/24/81. ADDED ROUND OFF ROUTINE FOR THE NO.
                      ;MODIFIED TO RUN ON 8 1/2 BY 11 PRINTER PAPER
                      ;
00FF                  TRUE     EQU     0FFH
0000                  FALSE    EQU     0H
0000                  PD2      EQU     FALSE
                      EXTRN    FWRFL,PRINTR,DLYR,STRET,TRNCTR,MCMTAB
                      EXTRN    DSIGN,DSCALE,DADDR,DLNGTH,FRLOC0,DESTOR
                      EXTRN    CMDFLT,CMDADF,CMDOSF,CRAM,CUFIND,PRDTR,ERDIS
                      EXTRN    CMSTAT,DIM11,DIM27,MSTMIN,NETMST,MSTSTA,NETAMG
                      EXTRN    FCMPR,FDIV,FLOAD,FMUL,FQFB2D,FQFD2B,FADD,FABS
                      EXTRN    FSTOR,FSUB,FPR,FNUMD3,FNUMF3,SRNKFL,STATUS
                      EXTRN    FLAG1,PRICEF,SCOMN,FNUMD1,FNUMD2,FNUMF1,FNUMF2
                      EXTRN    FLAG2,PRJRFL,NETCMB,NETCMS,NETCMC,NETCMT
                      EXTRN    RUNPR,MOISTF,FRESFL,FRLOCK,OFFFL,STRETM
                      EXTRN    LASTKY,KEYIN,NETCMD,PRGM7,SMLR,PERRFL,NETAMS
                      EXTRN    NETCMG,NETAVG,DSTOR0,PRNTJR,PRJRC,TOTDOC
                      EXTRN    CONSA,CONSAL,TRAFR,GRSDOL,MFORM
                      EXTRN    GRSCMB,GRSCMC,GRSCMD,GRSCMS,GRSCMT,SHORTF
                      ;
                      ;        ADDED FOR CALCULATIONS FOR PRINTING SETTLEMENT SHEET
                      EXTRN    TRANFL,NETWT,GROSBU,TWFL,MSTFL
                      EXTRN    FMFL,DISCNT,DMGFL,BASEPR,NETBU,LINEFL
                      EXTRN    SERV,SRVRT,SPACE,SERVFL,ADJPTR
                      EXTRN    DTRFL,MSTAMT,PCMNAM,ROUNDR,SELLFL,HEADG1,HEADG2
                      EXTRN    GOVMSG,B2D1A7,MSGA19,HEADG3,PMASG
                               IF      PD2
                      PUBLIC           PCHAR
                               ELSE
                      EXTRN            PCHAR
                               ENDIF
                      ;
                      ;
                      PUBLIC   PTIKT,PRIR,MACR,MSTAVG
                      PUBLIC   PFORMA,PRSLTA,HEADG,ACRR
                      PUBLIC   PRJRA,PDIGA,PDIGB,PTKTF,B2D1,PRNTWT,PTSTWT
                      PUBLIC   PTKTB1,D2BC,D2B2,B2D1A,MSTOR,MASGB,PFORMB
                      PUBLIC   MSGELB,PCUSN,MSGJ,PRSLT,PNET1,PDOCK,MCMTB1
                      PUBLIC   MSGELC,D2B1,MSTORB,D2BB,MSTOR1,ADDNTA,PTKTB4
                      ;
                      ;
                      ;        ASCII TABLE
000D                  ACR      EQU     0DH
0020                  ASP      EQU     20H
0003                  AETX     EQU     03H
002E                  PERIOD   EQU     2EH
002D                  MINUS    EQU     2DH
0040                  COMMER   EQU     40H
0024                  DOLLAR   EQU     24H
0025                  PERCNT   EQU     25H
002B                  PLUS     EQU     2BH
0073                  SEGP     EQU     73H
0050                  SEGR     EQU     50H
0004                  SEGI     EQU     04H
0054                  SEGN     EQU     54H
0078                  SEGT     EQU     78H
                      ;
0003                  SELL     EQU     03H
0011                  DELET    EQU     11H
0073                  TESTWT   EQU     73H
0063                  PRICE    EQU     63H
0067                  MOIST    EQU     67H
0062                  FM       EQU     62H
0085                  MINTW    EQU     85H
0066                  DAMAGE   EQU     66H
0080                  MOISTA   EQU     80H
0081                  MOISTB   EQU     81H
0082                  SHRFAC   EQU     82H
0086                  MINDMG   EQU     86H
0087                  MINFM    EQU     87H
                      ;
                      ;
                      ;
                                                      ;FLAG1: DS      1
                                                      ;MSTSTA:DS      1   FLAG INDICATES THAT MOISTURE
                                                      ;                   IS BELOW BREAK POINT
                                                      ;PRICEF:DS      5
                                                      ;SCOMN: DS      1       ;STORAGE LOCATION FOR
                                                      ;STORING COMMOD NO.
                                                      ;FNUMD1: DS     7
                                                      ;FNUMD2: DS     5
                                                      ;FNUMF1: DS     5
                                                      ;FNUMF2: DS     5
                                                      ;RUNPR:  DS     5       ;RAM LOCATION FOR
                                                      ;STORING RUNNING PRICE
                                                      ;MOISTF: DS     4
                                                      ;PRESFL: DS     1       ;FLAG FOR SUPRESS
                                                      ;SELLFL: DS     1       ;FLAG IS SET WHEN
                                                      ;ELEVATOR IS SELLING GRAIN TO CUSTOMER
                      ;
                      CSEG
0000 1E00     C       MCMTB1:  DW      MASGC
0002 2400     C                DW      MASGD
0004 2B00     C                DW      MASGE
0006 3500     C                DW      MASGF
0008 454E4420         MASGB:   DB      'END OF DAILY JOURNAL'
000C 4F462044
```

```
LOC  OBJ          LINE        SOURCE STATEMENT

0010 41494C59
0014 204A4F55
0018 524E414C
001C 0C            100         DB      0CH,AETX
001D 03
001E 53454C4C      101 MASGC:  DB      'SELL',02H,AETX
0022 02
0023 03
0024 53544F52      102 MASGD:  DB      'STORE',02H,AETX
0028 45
0029 02
002A 03
002B 434F4E54      103 MASGE:  DB      'CONTRACT',02H,AETX
002F 52414354
0033 02
0034 03
0035 444C5920      104 MASGF:  DB      'DLY PRICE',02H,AETX
0039 50524943
003D 45
003E 02
003F 03
0040 0D            105 MSGELA: DB      ACR,02H,1EH
0041 02
0042 1E
0043 5452414E      106         DB      'TRANSACTION NO: ',01H,1BH
0047 53414354
004B 494F4E20
004F 4E4F3A20
0053 01
0054 1B
0055 03            107         DB      AETX
0056 02            108 MSGELB: DB      02H,1EH,' CUSTOMER NO:',01H,1BH,AETX
0057 1E
0058 20435553
005C 544F4D45
0060 52204E4F
0064 3A
0065 01
0066 1B
0067 03
0068 02            109 MSGELC: DB      02H,1EH,' KIND OF GRAIN:',01H,1BH,AETX
0069 1E
006A 204B494E
006E 44204F46
0072 20475241
0076 494E3A
0079 01
007A 1B
007B 03
007C 0D            110 MSGELD: DB      ACR,ACR,02,1EH
007D 0D
007E 02
007F 1E
0080 57454947      111         DB      'WEIGHT IN:  ',AETX
0084 48542049
0088 4E3A2020
008C 03
008D 20202020      112 MSGELE: DB      '      WEIGHT OUT:  ',AETX
0091 20205745
0095 49474854
0099 204F5554
009D 3A2020
00A0 03
00A1 20202020      113 MSGELF: DB      '      NET WEIGHT:  ',AETX
00A5 20204E45
00A9 54205745
00AD 49474854
00B1 3A2020
00B4 03
00B5 0D            114 MSGELG: DB      ACR
00B6 5354442E      115         DB      'STD. WEIGHT: ',AETX
00BA 20574549
00BE 4748543A
00C2 20
00C3 03
00C4 4E45543A      116 MSGELH: DB      'NET:  ',AETX
00C8 2020
00CA 03
00CB 20402024      117 MSGS:   DB      ' @ $',AETX
00CF 03
00D0 2024          118 MSGELI: DB      ' $',AETX
00D2 03
00D3 54573A20      119 MSGELJ: DB      'TW: ',AETX
00D7 03
00D8 0D            120 MSGELK: DB      ACR
00D9 4D4F4953      121         DB      'MOISTURE:  ',AETX
00DD 54555245
00E1 3A2020
00E4 03
00E5 20252020      122 MSGELL: DB      ' %  @ $.',AETX
00E9 4020242E
00ED 03
00EE 0D            123 MSGELO: DB      ACR
00EF 464F5245      124         DB      'FOREIGN MATERIAL:'
00F3 49474E20
00F7 4D415445
00FB 5249414C
00FF 3A
0100 20            125         DB      ASP,AETX
0101 03
0102 0D            126 MSGELP: DB      ACR
0103 44414D41      127         DB      'DAMAGE:'
0107 47453A
```

```
LOC  OBJ              LINE     SOURCE STATEMENT

010A 03               128          DB       AETX
010B 0D               129 MSGELQ:  DB       ACR
010C 53455256         130          DB       'SERV CUST NO:       '
0110 20435553
0114 54204E4F
0118 3A202020
011C 2020
011E 03               131          DB       AETX
011F 4020242E         132 MSGELR:  DB       '@ $.',AETX
0123 03
0124 0D               133 MSGELT:  DB       ACR,ACR,AETX
0125 0D
0126 03
0127 0D               134 MSGELU:  DB       ACR
0128 53484152         135          DB       'SHARES CUST NO:    ',AETX
012C 45532043
0130 55535420
0134 4E4F3A20
0138 2020
013A 03
013B 402020           136 MSGELV:  DB       '@  ',AETX
013E 03
013F 4E455420         137 MSGELW:  DB       'NET TOTAL',AETX
0143 544F5441
0147 4C
0148 03
0149 544F5441         138 MSGO:    DB       'TOTAL DOCKAGE   $',AETX
014D 4C20444F
0151 434B4147
0155 45202020
0159 24
015A 03
015B 20402024         139 MSGELX:  DB       ' @ $ ',AETX
015F 20
0160 03
0161 20202020         140 MSGELY:  DB       '     %  ',AETX
0165 252020
0168 03
0169 20               141 MSGELZ:  DB       ASP
016A 4C42532E         142          DB       'LBS./BU.',AETX
016E 2F42552E
0172 03
0173 204C4220         143 MSGA:    DB       ' LB @ $.',AETX
0177 4020242E
017B 03
017C 2F4C422F         144 MSGB:    DB       '/LB/BU.  $',AETX
0180 42552E20
0184 2024
0186 03
0187 2F252F62         145 MSGC:    DB       '/%/BU.   $',AETX
018B 752E2020
018F 2024
0191 03
0192 0D               146 MSGD:    DB       ACR,0AH
0193 0A
0194 4D494E20         147          DB       'MIN TEST WT: ',AETX
0198 54455354
019C 2057543A
01A0 20
01A1 03
01A2 204E4F20         148 MSGI:    DB       ' NO DOCKAGE ',AETX
01A6 444F434B
01AA 41474520
01AE 03
01AF 0D               149 MSGF:    DB       ACR
01B0 44525949         150          DB       'DRYING CHARGE: ',AETX
01B4 4E472043
01B8 48415247
01BC 453A20
01BF 03
01C0 20252020         151 MSGG:    DB       ' %  ',AETX
01C4 03
01C5 202F252F         152 MSGH:    DB       ' /%/BU.   $',AETX
01C9 62752E20
01CD 202024
01D0 03
01D1 202F6275         153 MSGI:    DB       ' /BU.     $',AETX
01D5 2E202020
01D9 202024
01DC 03
01DD 202F6377         154 MSGX:    DB       ' /CWT.    $',AETX
01E1 742E2020
01E5 202024
01E8 03
01E9 202F252F         155 MSGW:    DB       ' /%/CWT.  $',AETX
01ED 6377742E
01F1 202024
01F4 03
01F5 0D               156 MSGJ:    DB       ACR,0AH,0AH,0AH,0AH,0AH
01F6 0A
01F7 0A
01F8 0A
01F9 0A
01FA 0A
01FB 0D               157 MSGJ1:   DB       ACR,0AH,AETX
01FC 0A
01FD 03
01FE 2025             158 MSGK:    DB       ' %',AETX
0200 03
0201 4E4F5420         159 MSGL:    DB       'NOT ENTERED'
0205 454E5445
0209 524544
020C 0D               160          DB       ACR,AETX
020D 03
```

```
LOC  OBJ             LINE       SOURCE STATEMENT

020E 0D              161 MSGM:    DB      ACR,ACR
020F 0D
0210 4E45543A        162          DB      'NET:     ',AETX
0214 20202020
0218 03
0219 0D              163 MSGN:    DB      ACR
021A 54455354        164          DB      'TEST WEIGHT:',AETX
021E 20574549
0222 4748543A
0226 03
0227 2F252F63        165 MSGQ:    DB      '/%/CWT.  $',AETX
022B 77742E20
022F 2024
0231 03
0232 4E455420        166 MSGR:    DB      'NET BEFORE SHRINK:',AETX
0236 4245464F
023A 52452053
023E 4852494E
0242 4B3A
0244 03
0245 4E455420        167 MSGT:    DB      'NET AFTER SHRINK:',AETX
0249 41465445
024D 52205348
0251 52494E4B
0255 3A
0256 03
0257 0D              168 MSGV:    DB      ACR
0258 20455252        169          DB      ' ERROR: "NUMBER OUT OF RANGE"'
025C 4F523A20
0260 224E554D
0264 42455220
0268 4F555420
026C 4F462052
0270 414E4745
0274 22
0275 0D              170          DB      ACR,AETX
0276 03
0277 70747320        171 MSGZ:    DB      'PTS @ $.',AETX
027B 4020242E
027F 03
0280 2F70742F        172 MSGZZ:   DB      '/PT/BU.  $',AETX
0284 62752E20
0288 2024
028A 03
028B 0D              173 MSGY:    DB      ACR
028C 2A20202D        174          DB      '*  - WEIGHTS HAVE BEEN MANUALLY ENTERED. ',ACR
0290 20574569
0294 67687473
0298 20686176
029C 65206265
02A0 656E206D
02A4 616E7561
02A8 6C6C7920
02AC 656E7465
02B0 7265642E
02B4 20
02B5 0D
02B6 20202020        175          DB      '     A PRINTED SCALE TICKET MUST BE ATTACHED',ACR
02BA 20412070
02BE 72696E74
02C2 65642073
02C6 63616C65
02CA 20746963
02CE 6B657420
02D2 6D757374
02D6 20626520
02DA 61747461
02DE 63686564
02E2 0D
02E3 20202020        176          DB      '     TO VALIDATE THIS TRANSACTION.',ACR,AETX
02E7 20746F20
02EB 76616C69
02EF 64617465
02F3 20746869
02F7 73207472
02FB 616E7361
02FF 6374696F
0303 6E2E
0305 0D
0306 03
0307 20              177 PLBS:    DB      ASP
0308 6C62732E        178          DB      'LBS.'
030C 03              179          DB      AETX
030D 20              180 PCWT;    DB      ASP
030E 637774          181          DB      'CWT'
0311 03              182          DB      AETX
0312 20              183 PBU:     DB      ASP
0313 62752E          184          DB      'BU.'
0316 03              185          DB      AETX
0317 02              186 MSGB1;   DB      02H,1EH
0318 1E
0319 44524956        187          DB      'DRIVER OFF'
031D 4552204F
0321 4646
0323 03              188          DB      AETX
                     189 ;
0324 22434F50        190 MCOPY:   DB      '"COPY"'
0328 5922
032A 03              191          DB      AETX
032B 224F5249        192 MORGIN:  DB      '"ORIGINAL"',AETX
032F 47494E41
0333 4C22
0335 03
```

```
LOC  OBJ          LINE        SOURCE STATEMENT

              ;
                      IF      PD2
              ;
              PERR:   PUSH    H
                      MVI     A,SEGP          ;LOAD STARTING LOCATION OF DISPLAY MEMORY
                      STA     DIM11
                      LXI     H,DIM27
                      MVI     M,SEGR
                      DCX     H
                      MVI     M,SEGI
                      DCX     H
                      MVI     M,SEGN
                      DCX     H
                      MVI     M,SEGT
                      CALL    ERDIS           ;DISPLAY ERROR ON SCR. PAD AND UPDATE DISP.
                      POP     H
                      XRA     A
                      STA     LASTKY
                      CALL    KEYIN
                      CPI     DELET
                      RNZ
                      JMP     TRAPR
                                              ;REG C HOLDS THE CHARACTER TO PRINT
                                              ;ROUTINE INTERFACES WITH THE PRINTER
                                              ;AND PRINTS OUT THE CHARACTER
                                              ;SETS CARRY IF IT IS SUCCESSFUL IN PRINTING
                                              ;CLEARS CARRY IF IT IS UNSUCCESSFUL
              PCHAR:  PUSH    B
                      PUSH    D
                      PUSH    H
                      PUSH    PSW
                      LDA     PWRFL           ;CHECK POWER FLAG IS SET THEN EXIT WITH
                      ORA     A               ;PRINT ERROR
                      JNZ     SETC
                      LDA     OPFFL
                      ORA     A
                      JNZ     SETC
                      LDA     PERRFL
                      ANI     0F0H
                      JZ      PCHAR5
                      MVI     A,0FH
                      STA     PERRFL
              PCHAR5: LXI     D,1500
                      CALL    BSYDEL          ;CHECK BUSY STATUS OF PRINTER TIME 1.5 SEC
                      JNC     PCHAR4
                      DCX     H               ;OUTPUT THE CHARACTER
                      MVI     A,7FH           ;CLEAR THE 7TH BIT
                      ANA     C
                      MOV     M,A             ;OUTPUT THE CHARACTER
                      ORI     80H
                      MOV     M,A
                      LXI     D,3000
                      CALL    BSYDEL
                      JNC     PCHAR4          ;JUMP IF PRINTER IS STILL BUSY
                      LXI     D,1500
                      MVI     C,01H
              PCHAR1: MVI     A,02H           ;CHECK ACK. FROM PRINTER
                      ANA     M
                      JZ      SETC            ;RETURN IF ACK. RECEIVED
                      CALL    DLYR
                      DCX     D
                      MOV     A,E
                      ORA     D
                      JNZ     PCHAR1
              PCHAR4: CALL    PERR            ;PRINT ERROR ON THE DISPLAY
              CLRC:   LDA     PERRFL
                      ADI     02
                      STA     PERRFL
                      CPI     07
                      JM      SETC2
                      POP     PSW
                      ORA     A
                      JMP     SETC1
              SETC:   LDA     PERRFL
                      ORA     A
                      JZ      SETC2
                      DCR     A
                      STA     PERRFL
              SETC2:  POP     PSW
                      STC                     ;SET CARRY FOR SUCCESSFUL PRINTING
              SETC1:  PUSH    PSW
                      JMP     STRET
              ;
              ;
              BSYDEL: ORA     A               ;CLEAR CARRY
                      PUSH    B
                      PUSH    PSW
                      LXI     H,(PRINTR+1)    ;LOAD THE PRINTER STATUS
                      MVI     C,01H           ;WAIT FOR 1.5 SEC
              BSY1:   CALL    DLYR
                      MVI     A,01H
                      ANA     M
                      JZ      BSY2
                      DCX     D
                      MOV     A,E
                      ORA     D
                      JNZ     BSY1
                      POP     PSW
              BSY3:   POP     B
                      RET
              BSY2:   POP     PSW
                      STC
                      JMP     BSY3
                      ENDIF
```

```
LOC  OBJ           LINE        SOURCE STATEMENT

                   297 ;
0336 F1            298 SETCY:   POP    PSW
0337 37            299          STC
0338 F5            300 SETCY1:  PUSH   PSW
0339 C30000    E   301          JMP    STRET
033C F1            302 CLRCY:   POP    PSW
033D B7            303          ORA    A
033E C33803    C   304          JMP    SETCY1
                   305 ;
                   306                        ;ROUTINE PRINTS OUT THE TRANSACTION TICKET
                   307                        ;REG H & L HAS THE ADD OF STATUS BYTE FOR THAT
                   308                        ;CUSTOMER.
                   309                        ;REG D & E HAS THE ADD OF BUFFER FOR
                   310                        ;THAT CUSTOMER
                   311 ;
0341 C5            312 PTIKT:   PUSH   B
0342 D5            313          PUSH   D
0343 E5            314          PUSH   H
0344 F5            315          PUSH   PSW
0345 CD7204    C   316          CALL   CLRMEM
0348 EB            317          XCHG          ;REG H POINTS TO BUFFER
                   318                        ;REG D HAS THE STATUS BYTE
0349 AF            319          XRA    A
034A 320000    E   320          STA    FLAG1  ;CLEAR THE GO OR DON'T GO FLAG
034D CDCD04    C   321          CALL   PFORMA ;PRINT TRANS NO.,CUST NO., & KIND OF GRAIN
0350 D23C03    C   322          JNC    CLRCY  ;JUMP IF UNSUCCESSFUL IN PRINTING
0353 3A0000    E   323          LDA    FLAG1
0356 B7            324          ORA    A
0357 C23603    C   325          JNZ    SETCY  ;RETURN IF REQUIRED DATA NOT ENTERED
035A CDBB05    C   326          CALL   PFORMB ;PRINT GROSS WT., EMPTY WT.,TARE WT., &
035D D23C03    C   327          JNC    CLRCY  ;TEST WEIGHT
0360 3A0000    E   328          LDA    FLAG1
0363 B7            329          ORA    A
0364 C23603    C   330          JNZ    SETCY
0367 CDBB07    C   331          CALL   PNET   ;CALCULATE NET AND PRINT
036A D23C03    C   332          JNC    CLRCY
036D 3A0000    E   333          LDA    FLAG1
0370 B7            334          ORA    A
0371 C23603    C   335          JNZ    SETCY
0374 CD210C    C   336          CALL   PFORMC ;CALCULATE ALL DOCKAGES AND PRINT
0377 D23C03    C   337          JNC    CLRCY
                   338                        ;ROUTINE TO PRINT THE CUSTOMER SERVICE CHARGE
037A 3A0000    E   339          LDA    FLAG1
037D B7            340          ORA    A
037E C23603    C   341          JNZ    SETCY
0381 0602          342 PFORMD:  MVI    B,02H  ;DO FOR TWO CUSTOMERS
0383 CD1310    C   343 PFRMD1:  CALL   CSERV
0386 D23C03    C   344          JNC    CLRCY
0389 05            345          DCR    B
038A C28303    C   346          JNZ    PFRMD1
038D 0E0D          347 PTIKT2:  MVI    C,ACR
038F CD0000    E   348          CALL   PCHAR
0392 0E0D          349          MVI    C,ACR
0394 CD0000    E   350          CALL   PCHAR
0397 3E2B          351          MVI    A,43
0399 CD0000    E   352          CALL   SPACE
039C 114901    C   353          LXI    D,MSGO ;PRINT TOTAL DOCKAGE
039F CD0000    E   354          CALL   PMASG
03A2 CDB304    C   355          CALL   PDOCK
03A5 3E0B          356          MVI    A,11
03A7 CD0000    E   357          CALL   SPACE
03AA 0E24          358          MVI    C,DOLLAR
03AC CD0000    E   359          CALL   PCHAR
03AF CDB304    C   360          CALL   PDOCK
03B2 3A0000    E   361          LDA    FLAG2
03B5 B7            362          ORA    A
03B6 C25704    C   363          JNZ    PTIKT5
03B9 3E04          364          MVI    A,04H
03BB CD0809    C   365          CALL   ACRR
03BE 3E43          366          MVI    A,67
03C0 CD0000    E   367          CALL   SPACE
03C3 113F01    C   368          LXI    D,MSGELW ;PRINT TOTAL
03C6 CD0000    E   369          CALL   PMASG
03C9 3E05          370          MVI    A,05
03CB CD0000    E   371          CALL   SPACE
03CE 0E24          372          MVI    C,DOLLAR
03D0 CD0000    E   373          CALL   PCHAR
03D3 CD9B04    C   374 PTIKT3:  CALL   PTOTAL
                   375 ;
                   376 ;
                   377                        ;ROUTINE TO PRINT THE CUSTOMERS SHARE
03D6 112401    C   378 PFORME:  LXI    D,MSGELT ;PRINT 'SHARES' ON PRINTER
03D9 CD0000    E   379          CALL   PMASG
03DC D23C03    C   380          JNC    CLRCY
03DF D5            381          PUSH   D
03E0 E5            382          PUSH   H
03E1 0605          383          MVI    B,05H
03E3 110000    E   384          LXI    D,RUNFR
03E6 210000    E   385          LXI    H,PRICEF
03E9 CD0A10    C   386          CALL   DSC2
03EC E1            387          POP    H
03ED D1            388          POP    D
03EE AF            389          XRA    A
03EF 320000    E   390          STA    FLAG1
03F2 F1            391          POP    PSW
03F3 E1            392          POP    H
03F4 D1            393          POP    D
03F5 D5            394          PUSH   D
03F6 E5            395          PUSH   H
03F7 F5            396          PUSH   PSW
03F8 212000        397          LXI    H,0032 ;POINT REGISTER H&L TO SHARE BYTE IN BUFFER
03FB 19            398          DAD    D
03FC 0602          399          MVI    B,02H  ;DO FOR TWO CUSTOMER
```

```
LOC  OBJ                SOURCE STATEMENT

03FE CDF010   C   PFRME1: CALL   CSHARE
0401 D23C03   C           JNC    CLRCY
0404 05                   DCR    B
0405 C2FE03   C           JNZ    PFRME1
0408 3A0000   E           LDA    FLAG1
040B B7                   ORA    A
040C CA2E04   C           JZ     PTIKT1
040F 112701   C           LXI    D,MSGELU      ;PRINT CUSTOMER NO.
0412 CD0000   E           CALL   PMASG
0415 F1                   POP    PSW
0416 E1                   POP    H
0417 D1                   POP    D
0418 D5                   PUSH   D
0419 E5                   PUSH   H
041A F5                   PUSH   PSW
041B EB                   XCHG
041C 23                   INX    H
041D 23                   INX    H
041E CD5C0A   C           CALL   PCUSN
0421 3E3C                 MVI    A,60
0423 CD0000   E           CALL   SPACE
0426 0E24                 MVI    C,DOLLAR
0428 CD0000   E           CALL   PCHAR
042B CD9B04   C           CALL   PTOTAL
042E 3A0000   E   PTIKT1: LDA    SRNKFL
0431 CD0000   E           CALL   CONSAL        ;IF ALL CALCULATIONS ARE TO BE DONE
0434 DA3B04   C           JC     PTOKT1
0437 B7                   ORA    A             ;ON GROSS BUSHELS THEN CONTINUE
0438 C47D11   C           CNZ    SRNKR
043B CDA605   C   PTOKT1: CALL   MACR
043E F1                   POP    PSW
043F E1                   POP    H
0440 D1                   POP    D
0441 D5                   PUSH   D
0442 E5                   PUSH   H
0443 F5                   PUSH   PSW
0444 211D00               LXI    H,29          ;PRINT THE MESSAGE IF WEIGHTS ARE ENTERED
0447 19                   DAD    D             ;MANUALLY
0448 3E40                 MVI    A,40H
044A A6                   ANA    M
044B C23603   C           JNZ    SETCY
044E 118B02   C           LXI    D,MSGY
0451 CD0000   E           CALL   PMASG
0454 C33603   C           JMP    SETCY
                          ;
0457 110000   E   PTIKT5; LXI    D,TOTDOC
045A 010000   E           LXI    B,FPR
045D CD0000   E           CALL   FLOAD
0460 CD0000   E           CALL   FABS
0463 110000   E           LXI    D,RUNPR
0466 CD0000   E           CALL   FSTOR
0469 110000   E           LXI    D,PRICEF
046C CD0000   E           CALL   FSTOR
046F C3D603   C           JMP    PFORME
                  ;
0472 C5           CLRMEM: PUSH   B
0473 D5                   PUSH   D
0474 E5                   PUSH   H
0475 F5                   PUSH   PSW
0476 110000   E           LXI    D,RUNPR       ;ROUTINE TO CLEAR RUNPRICE MEMORY
0479 CD9104   C           CALL   CLRMA
047C 110000   E           LXI    D,TOTDOC      ;CLEAR THE TOTAL DOCKAGE CHARGE MEMORY
047F CD9104   C           CALL   CLRMA
0482 110000   E           LXI    D,GROSBU
0485 CD9104   C           CALL   CLRMA
0488 110000   E           LXI    D,NETBU
048B CD9104   C           CALL   CLRMA
048E C30000   E           JMP    STRET
0491 0604         CLRMA:  MVI    B,04
0493 AF                   XRA    A
0494 12           CLRMA1: STAX   D
0495 13                   INX    D
0496 05                   DCR    B
0497 C29404   C           JNZ    CLRMA1
049A C9                   RET
                  ;
                          ;
                  ;
049B E5           PTOTAL; PUSH   H
049C 110000   E           LXI    D,RUNPR
049F 010000   E   PTOTL1: LXI    B,FPR
04A2 CD0000   E           CALL   FLOAD
04A5 210000   E           LXI    H,FNUMD1
04A8 CD0000   E           CALL   B2D1A7
04AB 110000   E           LXI    D,FNUMD1
04AE CD670B   C           CALL   PRSLT
04B1 E1                   POP    H
04B2 C9                   RET
                  ;
04B3 E5           PDOCK:  PUSH   H
04B4 110000   E           LXI    D,TOTDOC
04B7 C39F04   C           JMP    PTOTL1
                  ;
04BA 110102   C   SFLAG4: LXI    D,MSGL
04BD CD0000   E           CALL   PMASG
04C0 C3C504   C           JMP    SFLAG
04C3 E1           SFLAG3: POP    H
04C4 E1           SFLAG2: POP    H
04C5 D1           SFLAG:  POP    D
04C6 3EFF         SFLAG1: MVI    A,0FFH
04C8 320000   E           STA    FLAG1
04CB 37                   STC
04CC C9                   RET
                  ;
```

```
LOC  OBJ          LINE        SOURCE STATEMENT

                         ;
04CD D5                  PFORMA: PUSH    D          ;SAVE STATUS BYTE OF CUSTOMER TRANSACTION
04CE 3E02                        MVI     A,2
04D0 CD0809     C                CALL    ACRR
04D3 E5                          PUSH    H
04D4 D5                          PUSH    D
04D5 111D00                      LXI     D,29
04D8 19                          DAD     D
04D9 7E                          MOV     A,M
04DA D1                          POP     D
04DB E1                          POP     H
04DC E680                        ANI     80H
04DE C2EC04     C                JNZ     PFRMA5
04E1 111703     C                LXI     D,MSGB1    ;PRINT THE MESSAGE AGAIN
04E4 CD0000     E                CALL    PMASG
04E7 3E0F                        MVI     A,15       ;LEAVE 16 SPACES
04E9 C3EE04     C                JMP     PFRMA4
04EC 3E19                PFRMA5: MVI     A,25
04EE CD0000     E        PFRMA4: CALL    SPACE
04F1 110000     E                LXI     D,MSGA19   ;PRINT 'CUSTOMER NAME:
04F4 CD0000     E                CALL    PMASG
04F7 114000     C                LXI     D,MSGELA
04FA CD0000     E                CALL    PMASG
04FD 3EFF                        MVI     A,0FFH     ;RETURN IF TRANSACTION NO. NOT ENTERED
04FF AE                          XRA     M
0500 CABA04     C                JZ      SFLAG4
0503 E5                          PUSH    H
0504 110300     E                LXI     D,TRANFL+3 ;STORE TRANSACTION NO. IN TRANFL FOR
0507 CD190A     C                CALL    MSTOR      ;FOR PRINTING JOURNAL
050A E1                          POP     H
050B CD330A     C                CALL    PDIG       ;UNPACK TRANSACTION NO. AND CONVERT IT
050E D24805     C                JNC     PFRMA6     ;TO ASCII AND PRINT
0511 0E2D                        MVI     C,2DH      ;PRINT '-' ON PRINTER
0513 CD0000     E                CALL    PCHAR
0516 E5                          PUSH    H
0517 D5                          PUSH    D
0518 111A00                      LXI     D,26
051B 19                          DAD     D
051C 4E                          MOV     C,M
051D D1                          POP     D
051E E1                          POP     H
051F CD0000     E                CALL    PCHAR
0522 115600     C                LXI     D,MSGELB   ;PRINT MESSAGE 'CUSTOMER NO:'
0525 CD0000     E                CALL    PMASG
0528 3EFF                        MVI     A,0FFH     ;RETURN IF CUSTOMER NO. NOT ENTERED
052A AE                          XRA     M
052B CABA04     C                JZ      SFLAG4     ;PRINT NOT ENTERED
052E CD5C0A     C                CALL    PCUSN      ;UNPACK CUSTOMER NO. AND PRINT
0531 0E2D                        MVI     C,2DH
0533 CD0000     E                CALL    PCHAR      ;OUT - ON PRINTER
0536 D24805     C                JNC     PFRMA6
0539 3EF0                        MVI     A,0F0H     ;PRINT LOAD NO.
053B A6                          ANA     M
053C CA4B05     C                JZ      PFRMA2
053F CD440A     C                CALL    PDIGA      ;PRINT BOTH THE BYTE.
0542 C34E05     C                JMP     PFRMA3
0545 D1                  PFRMA1: POP     D
0546 37                          STC
0547 C9                          RET
0548 B7                  PFRMA6: ORA     A
0549 D1                          POP     D
054A C9                          RET
054B CD520A     C        PFRMA2: CALL    PDIGB
054E D24805     C        PFRMA3: JNC     PFRMA6
0551 23                          INX     H
0552 116800     C                LXI     D,MSGELC   ;PRINT  'KIND OF GRAIN:'
0555 CD0000     E                CALL    PMASG
0558 7E                          MOV     A,M
0559 23                          INX     H
055A 320000     E                STA     SCOMN      ;STORE THE COMMODITY NO. IN MEMORY
055D FEFF                        CPI     0FFH       ;IS COMMODITY NAME ENTERED?
055F CABA04     C                JZ      SFLAG4
0562 3A0000     E        PFRMA9: LDA     SCOMN
0565 4F                          MOV     C,A
0566 CD0000     E                CALL    PCMNAM
0569 D1                          POP     D          ;PRINT 'SALE' OR 'STORE' OR 'CONTRACT'
056A D5                          PUSH    D          ;OR 'DLY PRICE' ACCORDING TO TYPE OF TRANS.
056B 1A                          LDAX    D
056C 110000     C                LXI     D,MGMTB1
056F E660                        ANI     60H
0571 07                          RLC
0572 07                          RLC
0573 07                          RLC
0574 320000     E                STA     STATUS
0577 CA8005     C        PFRMA8: JZ      PFRMA7
057A 13                          INX     D
057B 13                          INX     D
057C 3D                          DCR     A
057D C37705     C                JMP     PFRMA8
0580 E5                  PFRMA7: PUSH    H
0581 EB                          XCHG
0582 5E                          MOV     E,M
0583 23                          INX     H
0584 56                          MOV     D,M
0585 E1                          POP     H
0586 CD0000     E                CALL    PMASG      ;PRINT TYPE OF TRANSACTION
0589 D24805     C                JNC     PFRMA6
058C D1                          POP     D
058D 3A0000     E                LDA     STATUS
0590 B7                          ORA     A
0591 CAA005     C                JZ      PFRM1
0594 FE02                        CPI     10B
0596 CAA005     C                JZ      PFRM1
```

```
LOC  OBJ           LINE     SOURCE STATEMENT

0599 3EFF                    MVI   A,0FFH
059B 320000   E              STA   FLAG2
059E 37                      STC
059F C9                      RET
05A0 AF             PFRM1:   XRA   A
05A1 320000   E              STA   FLAG2
05A4 37                      STC
05A5 C9                      RET
                    ;
                    ;
05A6 3A0000   E     MACR:    LDA   FRJRFL        ;ROUTINE CHECKS THE FRJRFL AND
05A9 B7                      ORA   A             ;IF IT ZERO GIVE 6 ACR OTHERWISE 2
05AA CAB405   C              JZ    MACR1
05AD 11FB01   C              LXI   D,MSGJ1
05B0 CD0000   E              CALL  PMASG
05B3 C9                      RET
05B4 11F501   C     MACR1:   LXI   D,MSGJ
05B7 CD0000   E              CALL  PMASG
05BA C9                      RET
                    ;
                    ;
05BB D5             PFORM8:  PUSH  D
05BC 117C00   C              LXI   D,MSGELD
05BF CD0000   E              CALL  PMASG         ;PRINT 'GROSS WEIGHT:'
05C2 7E                      MOV   A,M           ;IF WT. NOT ENTERED THEN RETURN
05C3 FEFF                    CPI   0FFH
05C5 C2D405   C              JNZ   PFRMB3
05C8 110102   C              LXI   D,MSGL        ;PRINT 'NOT ENTERED'
05CB CD0000   E              CALL  PMASG
05CE CDA605   C     PFRMB2:  CALL  MACR
05D1 C34805   C              JMP   PFRMA6
05D4 110400   E     PFRMB3:  LXI   D,(FNUMD1+4)  ;CONVERT GROSS WT DIGIT INTO ASCII AND STORE
05D7 CD8712   C              CALL  MSTORB        ;STORE IT IN LOCATION FNUMD1
05DA 110400   E              LXI   D,(FNUMD2+4)  ;CONVERT EMPTY WT DIGIT INTO ASCII AND STORE
05DD CD8712   C              CALL  MSTORB        ;STORE IT IN LOCATION FNUMD2
05E0 110000   E              LXI   D,FNUMD1      ;PRINT GROSS WEIGHT STARTING FROM 10K DIGIT
05E3 CD9212   C              CALL  PLBSR         ;PRINT DIGITS AND LBS ON PRINTER
05E6 D24805   C              JNC   PFRMA6
05E9 E5                      PUSH  H             ;SAVE H & L REGISTER
05EA 111100                  LXI   D,17          ;POINT TO FLAG BYTE
05ED 19                      DAD   D
05EE 3E40                    MVI   A,40H         ;CHECK TO SEE IF WEIGHT MANUALLY ENTERED
05F0 A6                      ANA   M
05F1 E1                      POP   H
05F2 C2FF05   C              JNZ   PFMB1
05F5 3E01                    MVI   A,01
05F7 CD0000   E              CALL  SPACE
05FA 0E2A                    MVI   C,'*'         ;PUT '*' MARK FOR THE MESSAGE AT THE BOTTOM
05FC CD0000   E              CALL  PCHAR
05FF 118D00   C     PFMB1:   LXI   D,MSGELE      ;PRINT EMPTY WEIGHT ON PRINTER
0602 CD0000   E              CALL  PMASG
0605 D1                      POP   D
0606 D5                      PUSH  D
0607 1A                      LDAX  D             ;IS WEIGHT OUT ENTERED?
0608 E608                    ANI   08H
060A C23606   C              JNZ   PFRMB4        ;RETURN IF WEIGHT OUT NOT ENTERED
060D E5             PFMB2:   PUSH  H
060E AF                      XRA   A
060F 320000   E              STA   SHORTF        ;RESET THE SHORT FLAG
0612 0E0D                    MVI   C,ACR
0614 CD0000   E              CALL  PCHAR         ;GIVE ASCII CARRIAGE RETURN
0617 11D300   C              LXI   D,MSGELJ      ;PRINT DOCKAGES FOR CONVENINENCE
061A CD2307   C              CALL  PFMBA         ;PRINT THE DIGIT OUT IF ENTERED
061D 11D800   C              LXI   D,MSGELK      ;PRINT MOISTURE
0620 CD2307   C              CALL  PFMBA
0623 11EE00   C              LXI   D,MSGELO      ;PRINT FM
0626 CD2307   C              CALL  PFMBA
0629 110201   C              LXI   D,MSGELF
062C CD2307   C              CALL  PFMBA
062F E1                      POP   H
0630 CDA605   C     PFRMB5:  CALL  MACR
0633 C3C504   C              JMP   SFLAG
0636 110000   E     PFRMB4:  LXI   D,FNUMD2      ;PRINT EMPTY WEIGHT ON PRINTER STARTING
                                                 ;FROM 10K DIGIT
0639 CD9212   C              CALL  PLBSR         ;PRINT LBS AS UNITS
063C D24805   C              JNC   PFRMA6
063F E5                      PUSH  H             ;CHECK TO SEE IF WEIGHT ENTERED MANUALLY
0640 111100                  LXI   D,17
0643 19                      DAD   D
0644 3E40                    MVI   A,40H
0646 A6                      ANA   M
0647 E1                      POP   H
0648 C25506   C              JNZ   PFRMB9
064B 3E01                    MVI   A,01
064D CD0000   E              CALL  SPACE
0650 0E2A                    MVI   C,'*'
0652 CD0000   E              CALL  PCHAR
0655 E5             PFRMB9:  PUSH  H
0656 210000   E              LXI   H,FNUMD2      ;EMPTY WEIGHT IN BCD AT FNUMD2
0659 CD9D12   C              CALL  D2B1          ;CONVERT BCD TO BINAY
065C 110000   E              LXI   D,FNUMD2      ;EMPTY WEIGHT IN BINARY IN FNUMD2
065F CD0000   E              CALL  FSTOR
0662 210000   E              LXI   H,FNUMD1      ;GROSS WEIGHT IN BCD AT FNUMD1
0665 CD9D12   C              CALL  D2B1
0668 110000   E              LXI   D,FNUMD2
066B CD0000   E              CALL  FSUB          ;TARE WEIGHT = GROSS WEIGHT-EMPTY WEIGHT
066E 110000   E              LXI   D,NETWT       ;STORE NET WEIGHT FOR PRINT JOURNAL
0671 CD0000   E              CALL  FSTOR         ;CALCULATIONS
0674 210000   E              LXI   H,FNUMD1
0677 CDCD12   C              CALL  B2D1          ;TARE WEIGHT IN BCD AT FNUMD1
067A 3A0000   E              LDA   DSIGN         ;IF ELEVATOR IS SELLING TO CUSTOMER THEN
067D FE2D                    CPI   MINUS         ;
067F C28706   C              JNZ   PFRMB8
```

```
LOC  OBJ          LINE   SOURCE STATEMENT

0682 3EFF                        MVI    A,0FFH          ;SET THE FLAG IF ELEVATOR IS SELLING GRAIN
0684 C38E06   C                  JMP    PFRMB7          ;TO CUSTOMER
0687 AF                  PFRMB8: XRA    A               ;CLEAR THE FLAG IF ELEVATOR IS BUYING GRAIN
0688 320000   E          PFRMB7: STA    SELLFL          ;FROM CUSTOMER
068B 11A100   C                  LXI    D,MSGELF        ;PRINT 'TARE WEIGHT:' ON PRINTER
068E CD0000   E                  CALL   PMASG
0691 D22007   C                  JNC    PFRMB1
0694 110000   E                  LXI    D,FNUMD1        ;PRINT TARE WEIGHT DIGIT
0697 CDEC09   C                  CALL   PTKTF
069A D22007   C                  JNC    PFRMB1
069D 110703   C                  LXI    D,PLBS
06A0 CD0000   E                  CALL   PMASG           ;PRINT LBS
06A3 D22007   C                  JNC    PFRMB1
06A6 CDAD09   C                  CALL   PNET1           ;IF GRAIN IS IN CWT THEN ABORT
06A9 CAD206   C                  JZ     PFRMB6          ;ENTIRE STANDARD WEIGHT MESSAGE
06AC 11B500   C                  LXI    D,MSGELG        ;PRINT 'TEST WEIGHT:'
06AF CD0000   E                  CALL   PMASG
06B2 D22007   C                  JNC    PFRMB1
06B5 210000   E                  LXI    H,SCOMN         ;BRING THE PRESENT COMMODITY NO.
06B8 7E                          MOV    A,M             ;LOAD THE COMMODITY NO.
06B9 3D                          DCR    A
06BA 07                          RLC                    ;MULTIPLY BY 2
06BB 110000   E                  LXI    D,CMDFLT        ;LOAD THE STARTING LOCATION OF TABLE
06BE 2600                        MVI    H,0
06C0 6F                          MOV    L,A
06C1 19                          DAD    D
06C2 110300   E                  LXI    D,(FNUMD2+3)    ;TEST WEIGHT DIGIT IN BCD ASCII AT FNUMD2
06C5 CD190A   C                  CALL   MSTOR
06C8 13                          INX    D
06C9 CD4F12   C                  CALL   PTSTWT          ;PRINT THE TEST WEIGHT DIGITS FROM FNUMD2
06CC 116901   C                  LXI    D,MSGELZ        ;PRINT 'LBS/BU'
06CF CD0000   E                  CALL   PMASG
06D2 210000   E          PFRMB6: LXI    H,FNUMD2        ;TEST WEIGHT IN BCD AT FNUMD2
06D5 CDBE12   C                  CALL   D2B2
06D8 110000   E                  LXI    D,FNUMF2
06DB CD0000   E                  CALL   FSTOR           ;TEST WEIGHT IN BINARY AT FNUMF2
06DE CDAD09   C                  CALL   PNET1
06E1 C2ED06   C                  JNZ    PNET3
06E4 CD3A07   C                  CALL   DIV100
06E7 110000   E                  LXI    D,FNUMF2        ;STORE 100 IN BINARY AT FNUMF1
06EA CD0000   E                  CALL   FSTOR
06ED 110000   E          PNET3:  LXI    D,NETWT         ;BRING TARE WT. IN BINARY
06F0 CD0000   E                  CALL   FLOAD
06F3 110000   E                  LXI    D,FNUMF2
06F6 CD0000   E                  CALL   FDIV            ;DIVIDE BY 100
06F9 CD0000   E                  CALL   ROUNDR
06FC 110000   E                  LXI    D,FNUMF2
06FF CD0000   E                  CALL   FSTOR
0702 CD0000   E                  CALL   FABS
0705 110000   E                  LXI    D,GROSBU        ;STORE BINARY NO. OF GROSS BU. IN
0708 CD0000   E                  CALL   FSTOR           ;GROSBU FOR PRINTING JOURNAL CALCULATIONS
070B 210000   E                  LXI    H,FNUMD1
070E CD0000   E                  CALL   B2D1A7
0711 E1                          POP    H
0712 CD5607   C                  CALL   PNETD
0715 37                          STC
0716 3A0000   E                  LDA    SHORTF
0719 B7                          ORA    A
071A C20D06   C                  JNZ    PFMB2
071D 37                          STC
071E D1                          POP    D
071F C9                          RET
0720 E1                  PFRMB1: POP    H
0721 D1                          POP    D
0722 C9                          RET
                         ;
0723 CD0000   E          PFMBA:  CALL   PMASG
0726 7E                          MOV    A,M
0727 FEFF                        CPI    0FFH
0729 CA3707   C                  JZ     PFMBA1
072C 110300   E                  LXI    D,FNUMD2+3
072F CD190A   C                  CALL   MSTOR
0732 13                          INX    D
0733 CD4F12   C                  CALL   PTSTWT          ;PRINT THE NO.
0736 C9                          RET
0737 23                  PFMBA1: INX    H               ;INCREMENT THE POINTER
0738 23                          INX    H
0739 C9                          RET
                         ;
073A 110000   E          DIV100: LXI    D,FNUMD2        ;STORE 100 IN BCD AT FNUMD2
073D 3E31                        MVI    A,31H
073F 12                          STAX   D
0740 13                          INX    D
0741 3E30                        MVI    A,30H
0743 12                          STAX   D
0744 13                          INX    D
0745 12                          STAX   D
0746 AF                          XRA    A               ;SET THE CONTROL TABLE
0747 320000   E                  STA    DSCALE
074A 320100   E                  STA    DSCALE+1
074D 3E03                        MVI    A,03H
074F 210000   E                  LXI    H,FNUMD2
0752 CDA612   C                  CALL   D2BB
0755 C9                          RET
                         ;
0756 C5                  PNETD:  PUSH   B
0757 D5                          PUSH   D
0758 E5                          PUSH   H
0759 F5                          PUSH   PSW
075A 2B                          DCX    H
075B 7E                          MOV    A,M             ;DON'T ADD THE WEIGHT IF ADDED ONCE
075C E6F0                        ANI    0F0H
075E C2AB07   C                  JNZ    PNETD3
```

```
LOC  OBJ          LINE        SOURCE STATEMENT

0761 7E            813          MOV    A,M
0762 F6F0          814          ORI    0F0H
0764 77            815          MOV    M,A          ;SET THE FLAG
0765 3A0000   E    816          LDA    SELLFL       ;CHECK IF CUSTOMER IS BUYING FROM ELEVATOR
0768 B7            817          ORA    A
0769 C2B507   C    818          JNZ    PNETD1
076C 110000   E    819 PNETD6:  LXI    D,GRSCMB     ;INITIALIZE THE POINTER
076F 3A0000   E    820          LDA    STATUS       ;CHECK THE STATUS
0772 B7            821          ORA    A
0773 CA8707   C    822          JZ     PNETD2
0776 110000   E    823          LXI    D,GRSCMS     ;CHECK IF IT IS STORE
0779 3D            824          DCR    A
077A CA8707   C    825          JZ     PNETD2
077D 110000   E    826          LXI    D,GRSCMC     ;CHECK IF IT CONTRACT
0780 3D            827          DCR    A
0781 CA8707   C    828          JZ     PNETD2
0784 110000   E    829          LXI    D,GRSCMD     ;CHECK DELAY PRICE
0787 CD0000   E    830 PNETD2:  CALL   ADJPTR       ;ADJUST THE POINTER
078A 010000   E    831          LXI    B,FPR
078D D5            832          PUSH   D
078E CD0000   E    833          CALL   FLOAD
0791 110000   E    834          LXI    D,GROSBU     ;LOAD GROSS BUSHELS
0794 3A0000   E    835          LDA    DTRFL        ;ARE WE DELETING THE TRANSACTION
0797 B7            836          ORA    A
0798 C2A107   C    837          JNZ    PNETD4
079B CD0000   E    838          CALL   FADD         ;ADD GROSS BUSHELS
079E C3A407   C    839          JMP    PNETD5
07A1 CD0000   E    840 PNETD4:  CALL   FSUB         ;OTHERWISE SUBTRACT
07A4 D1            841 PNETD5:  POP    D            ;LOAD THE POINTER
07A5 CD0000   E    842          CALL   FSTOR        ;STORE IT BACK
07A8 C30000   E    843          JMP    STRET
07AB 3A0000   E    844 PNETD3:  LDA    DTRFL        ;CHECK IF WE ARE DELETING
07AE B7            845          ORA    A
07AF CA0000   E    846          JZ     STRET
07B2 C36C07   C    847          JMP    PNETD6
07B5 110000   E    848 PNETD1:  LXI    D,GRSCMT     ;ADD TO ELEVATOR SELLING BINS
07B8 C38707   C    849          JMP    PNETD2
                   850 ;
                   851 ;
07BB CD0000   E    852 PNET:    CALL   CONSAL
07BE DA4A08   C    853          JC     PNAT
07C1 D5            854          PUSH   D
07C2 E5            855          PUSH   H
07C3 AF            856 PNET2:   XRA    A            ;CLEAR THE FLAG FOR SHRINK
07C4 320000   E    857          STA    SRNKFL
07C7 3A0000   E    858          LDA    SCOMN        ;LOAD THE COMMODITY NO.
07CA 4F            859          MOV    C,A
07CB CD0000   E    860          CALL   CMDADF       ;FIND THE ADDRESS FOR THAT COMMODITY
07CE D22007   C    861          JNC    PFRMB1
07D1 0E82          862          MVI    C,SHRFAC     ;FIND THE ADDRESS FOR SHRINK
07D3 CD0000   E    863          CALL   CMDOSF
07D6 AF            864          XRA    A            ;IS SHRINK ENTERED?
07D7 BE            865          CMP    M
07D8 C2E007   C    866          JNZ    PNET4
07DB 23            867          INX    H
07DC BE            868          CMP    M
07DD CA1008   C    869          JZ     PNET17
07E0 3EFF          870 PNET4:   MVI    A,0FFH
07E2 320000   E    871          STA    SRNKFL       ;SET THE FLAG FOR SHRINK
07E5 0E0D          872          MVI    C,ACR
07E7 CD0000   E    873          CALL   PCHAR
07EA 0E0A          874          MVI    C,0AH
07EC CD0000   E    875          CALL   PCHAR
07EF 3E26          876          MVI    A,38
07F1 CD0000   E    877          CALL   SPACE
07F4 113202   C    878          LXI    D,MSGR       ;PRINT 'NET BEFORE SHRINK:'
07F7 CD0000   E    879          CALL   PMASG
07FA 3A0000   E    880          LDA    FLAG2
07FD B7            881          ORA    A
07FE C21D08   C    882          JNZ    PNET20
0801 E1            883          POP    H
0802 E5            884          PUSH   H
0803 111200        885          LXI    D,18
0806 19            886          DAD    D
0807 7E            887          MOV    A,M
0808 FEFF          888          CPI    0FFH
080A CA1D08   C    889          JZ     PNET20
080D C34308   C    890          JMP    PNET21
0810 3A0000   E    891 PNET17:  LDA    FLAG2
0813 B7            892          ORA    A
0814 CA2708   C    893          JZ     PNET6
0817 110B02   C    894 PNET19:  LXI    D,MSGM
081A CD0000   E    895 PNET18:  CALL   PMASG        ;PRINT 'NET:
081D CD9109   C    896 PNET20:  CALL   PNETC        ;PRINT THE WEIGHT
0820 CD7D09   C    897          CALL   PABS         ;CONVERT NET INTO ABSOLUTE VALUE
0823 37            898 PNET23:  STC
0824 E1            899          POP    H
0825 D1            900          POP    D
0826 C9            901          RET
0827 E1            902 PNET6:   POP    H            ;IS PRICE ENTERED?
0828 E5            903          PUSH   H
0829 111200        904          LXI    D,18
082C 19            905          DAD    D
082D 7E            906          MOV    A,M
082E FEFF          907          CPI    0FFH
0830 CA1708   C    908          JZ     PNET19
0833 3E02          909          MVI    A,02
0835 CD0809   C    910          CALL   ACRR
0838 3E34          911          MVI    A,52
083A CD0000   E    912          CALL   SPACE
083D 11C400   C    913          LXI    D,MSGELH
0840 CD0000   E    914          CALL   PMASG        ;PRINT 'NET: @ $'
0843 CD1409   C    915 PNET21:  CALL   PNETA
```

```
LOC  OBJ              SOURCE STATEMENT

0846 37                      STC
0847 E1                      POP   H
0848 D1                      POP   D
0849 C9                      RET
                      ;
                      ;
084A D5               PNAT:  PUSH  D
084B E5                      PUSH  H
084C AF               PNAT2: XRA   A          ;CLEAR THE FLAG FOR SHRINK
084D 320000   E              STA   SRNKFL
0850 3A0000   E              LDA   SCOMN      ;LOAD THE COMMODITY NO.
0853 4F                      MOV   C,A
0854 CD0000   E              CALL  CMDADF     ;FIND THE ADDRESS FOR THAT COMMODITY
0857 D22007   C              JNC   PFRMB1
085A 0E82                    MVI   C,SHRFAC   ;FIND THE ADDRESS FOR SHRINK
085C CD0000   E              CALL  CMDOSF
085F AF                      XRA   A          ;IS SHRINK ENTERED?
0860 BE                      CMP   M
0861 C26908   C              JNZ   PNAT4
0864 23                      INX   H
0865 BE                      CMP   M
0866 CAB008   C              JZ    PNAT17
0869 3EFF             PNAT4: MVI   A,0FFH
086B 320000   E              STA   SRNKFL     ;SET THE FLAG FOR SHRINK
086E 3E02                    MVI   A,2        ;GIVE 2 CARRIAGE RETURNS
0870 CD0809   C              CALL  ACRR
0873 113202   C              LXI   D,MSGR     ;PRINT 'NET BEFORE SHRINK:'
0876 CD0000   E              CALL  PMASG
0879 3A0000   E              LDA   FLAG2
087C B7                      ORA   A
087D C2C708   C              JNZ   PNAT22
0880 E1                      POP   H
0881 E5                      PUSH  H
0882 111200                  LXI   D,18
0885 19                      DAD   D
0886 7E                      MOV   A,M
0887 FEFF                    CPI   0FFH
0889 CAC708   C              JZ    PNAT22
088C E1                      POP   H
088D D1                      POP   D
088E D5                      PUSH  D
088F E5                      PUSH  H
0890 1A                      LDAX  D          ;IS MOISTURE ENTERED?
0891 E601                    ANI   01H
0893 CABD08   C              JZ    PNAT20     ;JUMP TO PNET20 IF NOT ENTERED
0896 23                      INX   H
0897 23                      INX   H
0898 7E                      MOV   A,M        ;ARE DIGITS FF
0899 FEFF                    CPI   0FFH
089B CABD08   C              JZ    PNAT20     ;JUMP TO PNET20 IF DIGITS ARE FF
089E CD9109   C              CALL  PNETC      ;PRINT NET WEIGHT BEFORE SHRINK
08A1 CD870F   C              CALL  CMOSTA     ;CALCULATE THE MOISTURE
08A4 CD7D11   C              CALL  SRNKR      ;PRINT NET WEIGHT AFTER SHRINK
08A7 E1                      POP   H
08A8 E5                      PUSH  H
08A9 111200                  LXI   D,18
08AC 19                      DAD   D
08AD C30109   C              JMP   PNAT21
08B0 3A0000   E       PNAT17: LDA  FLAG2
08B3 B7                      ORA   A
08B4 CAE508   C              JZ    PNAT6
08B7 110E02   C       PNAT19: LXI  D,MSGM     ;PRINT 'NET:'
08BA CD0000   E       PNAT18: CALL PMASG
08BD CD9109   C       PNAT20: CALL PNETC      ;PRINT THE WEIGHT
08C0 CD7D09   C              CALL  PABS       ;CONVERT NET INTO ABSOLUTE VALUE
08C3 37               PNAT23: STC
08C4 E1                      POP   H
08C5 D1                      POP   D
08C6 C9                      RET
08C7 CD9109   C       PNAT22: CALL PNETC      ;PRINT NET BEFORE SHRINK
08CA E1                      POP   H
08CB D1                      POP   D
08CC D5                      PUSH  D
08CD E5                      PUSH  H
08CE 1A                      LDAX  D
08CF E601                    ANI   01H
08D1 CAC308   C              JZ    PNAT23     ;IS MOISTURE ENTERED?
08D4 23                      INX   H
08D5 23                      INX   H
08D6 7E                      MOV   A,M
08D7 FEFF                    CPI   0FFH
08D9 CAC308   C              JZ    PNAT23
08DC CD870F   C              CALL  CMOSTA
08DF CD7D11   C              CALL  SRNKR
08E2 C3BD08   C              JMP   PNAT20
08E5 E1               PNAT6: POP   H          ;IS PRICE ENTERED?
08E6 E5                      PUSH  H
08E7 111200                  LXI   D,18
08EA 19                      DAD   D
08EB 7E                      MOV   A,M
08EC FEFF                    CPI   0FFH
08EE CAB708   C              JZ    PNAT19
08F1 3E02                    MVI   A,02
08F3 CD0809   C              CALL  ACRR
08F6 3E34                    MVI   A,52
08F8 CD0000   E              CALL  SPACE
08FB 11C400   C              LXI   D,MSGELH
08FE CD0000   E              CALL  PMASG      ;PRINT 'NET: @ $'
0901 CD1409   C       PNAT21: CALL PNETA
0904 37                      STC
0905 E1                      POP   H
0906 D1                      POP   D
0907 C9                      RET
```

```
LOC  OBJ            LINE        SOURCE STATEMENT

                         ;
                         ;
0908 C5                  ACRR:    PUSH    B
0909 0E0D                ACRR1:   MVI     C,ACR
090B CD0000      E                CALL    PCHAR
090E 3D                           DCR     A
090F C20909      C                JNZ     ACRR1
0912 C1                           POP     B
0913 C9                           RET
                         ;
0914 E5                  PNETA:   PUSH    H
0915 110300      E                LXI     D,BASEPR+3        ;STORE PRICE IN BASE PRICE LOCATION
0918 CD190A      C                CALL    MSTOR
091B E1                           POP     H
091C 110300      E                LXI     D,(FNUMD2+3)      ;STORE THE PRICE IN BCD AT FNUMD2
091F CD190A      C                CALL    MSTOR
0922 CD9109      C                CALL    PNETC             ;PRINT THE WT.
0925 115B01      C                LXI     D,MSGELX
0928 CD0000      E                CALL    PMASG
092B 110000      E                LXI     D,FNUMD2
092E CD4F12      C                CALL    PTSTWT            ;PRINT THE PRICE
0931 210000      E                LXI     H,FNUMD2
0934 CDBE12      C                CALL    D2B2              ;PRICE IN BINARY AT FAC
0937 110000      E                LXI     D,FNUMF2
093A CD0000      E                CALL    FMUL              ;PRICE=PRICE FOR COMM.X NET
093D CD0000      E                CALL    FABS
0940 CD0000      E                CALL    ROUNDR
0943 110000      E                LXI     D,PRICEF          ;STORE RUNNING PRICE IN MEMORY AT PRICE
0946 CD0000      E                CALL    FSTOR
0949 110000      E                LXI     D,GRSDOL
094C CD0000      E                CALL    FSTOR
094F 110000      E                LXI     D,RUNPR           ;STORE IN RUNNING PRICE
0952 CD0000      E                CALL    FSTOR
0955 210000      E                LXI     H,FNUMD1
0958 CD0000      E                CALL    B2D1A7
095B 11D000      C                LXI     D,MSGELI
095E CD0000      E                CALL    PMASG
0961 110000      E                LXI     D,FNUMD1
0964 CD670B      C                CALL    PRSLT
0967 CD0000      E                CALL    CONSAL            ;IF PAY ON NET DOCK ON GROSS IS TRUE
096A D27909      C                JNC     PNETA1
096D 110000      E                LXI     D,GROSBU          ;PUT BACK THE GROSBU IN FNUMF2
0970 CD0000      E                CALL    FLOAD
0973 110000      E                LXI     D,FNUMF2
0976 CD0000      E                CALL    FSTOR
0979 CD7D09      C       PNETA1:  CALL    FABS
097C C9                           RET
                         ;
                         ;
097D 010000      E       FABS:    LXI     B,FPR
0980 110000      E                LXI     D,FNUMF2
0983 CD0000      E                CALL    FLOAD
0986 CD0000      E                CALL    FABS
0989 110000      E                LXI     D,FNUMF2
098C CD0000      E                CALL    FSTOR
098F 37                           STC
0990 C9                           RET
                         ;
0991 110000      E       PNETC:   LXI     D,FNUMD1          ;NET IN BCD AT FNUMD1
0994 CD670B      C                CALL    PRSLT             ;PRINT NET WEIGHT
0997 CDAD09      C                CALL    PNET1             ;BRING THE STATUS OF COMMODITY
099A FE0C                         XRI     0CH
099C C2A609      C                JNZ     PNETC1
099F 110D03      C                LXI     D,PCWT            ;PRINT CWT AS UNITS
09A2 CD0000      E                CALL    PMASG
09A5 C9                           RET
09A6 111203      C       PNETC1:  LXI     D,PBU             ;PRINT BU. AS UNITS
09A9 CD0000      E                CALL    PMASG
09AC C9                           RET
                         ;
                         ;
                         ;
09AD D5                  PNET1:   PUSH    D
09AE E5                           PUSH    H
09AF 210000      E                LXI     H,SCOMN           ;LOAD THE COMMODITY NO.
09B2 7E                           MOV     A,M
09B3 3D                           DCR     A
09B4 5F                           MOV     E,A               ;LOAD THE COMMODITY NO. INTO D & E REGISTER
09B5 1600                         MVI     D,00H
09B7 210000      E                LXI     H,CMSTAT          ;BRING THE STATUS OF THAT COMMODITY
09BA 19                           DAD     D
09BB 7E                           MOV     A,M
09BC E60F                         ANI     0FH
09BE FE0C                         CPI     0CH
09C0 E1                           POP     H
09C1 D1                           POP     D
09C2 C9                           RET
                         ;
                         ;
09C3 0605                PTKTB:   MVI     B,05H             ;PRINT OUT 5 DIGIT
09C5 1A                  PTKTB4:  LDAX    D
09C6 EE30                         XRI     30H               ;PUT ASP FOR DIGITS MSB WHICH ARE ZERO
09C8 CAD809      C                JZ      PTKTB3
09CB 1A                  PTKTB1:  LDAX    D
09CC 4F                           MOV     C,A
09CD CD0000      E                CALL    PCHAR             ;RETURN IF UNSUCCESSFUL IN PRINTING
09D0 D0                           RNC
09D1 13                           INX     D
09D2 05                           DCR     B
09D3 C2CB09      C                JNZ     PTKTB1
09D6 37                  PTKTB5:  STC                       ;ADDED PTKTB5 2/21/81
09D7 C9                           RET
09D8 0E20                PTKTB3:  MVI     C,ASP
```

```
LOC  OBJ           LINE        SOURCE STATEMENT

09DA CD0000    E           CALL    PCHAR
09DD D0                    RNC
09DE 13                    INX     D
09DF 05                    DCR     B
09E0 C2C509    C           JNZ     PTKTB4      ;CHANGED TO READ JNZ FROM JMP 2/21/81
09E3 C3D609    C           JMP     PTKTB5      ;ADDED THIS JMP STATEMENT 2/21/81
                 ;
                 ;
09E6 C5          PTKTF:    PUSH    B
09E7 E5                    PUSH    H
09E8 0605                  MVI     B,05H       ;PRINT 5 CHARACTERS
09EA 210000    E           LXI     H,DSCALE
09ED 7E          PTKTF1:   MOV     A,M         ;CHECK THE SCALE
09EE B7                    ORA     A           ;IS IT 5 THEN PRINT ALL DIGITS
09EF C2070A    C           JNZ     PTKTF5      ;JUMP IF NOT
09F2 1A          PTKTF2:   LDAX    D           ;LOAD THE DIGIT
09F3 4F                    MOV     C,A
09F4 CD0000    E           CALL    PCHAR
09F7 D2030A    C           JNC     PTKTF3      ;RETURN IF CARRY IS NOT SET
09FA 13                    INX     D
09FB 05                    DCR     B           ;INCREMENT THE POINTER
09FC C2F209    C           JNZ     PTKTF2
09FF 37          PTKTF6:   STC                 ;SUCCESSFUL PRINTING
0A00 C3040A    C           JMP     PTKTF4
0A03 B7          PTKTF3:   ORA     A           ;CLEAR CARRY FOR UNSUCCESSFUL PRINTING
0A04 E1          PTKTF4:   POP     H
0A05 C1                    POP     B
0A06 C9                    RET
0A07 0E20        PTKTF5:   MVI     C,ASP       ;IF THE SCALE IS LESS THAN 5 THEN PUT
0A09 CD0000    E           CALL    PCHAR       ;THE ASP FOR THAT DIGIT
0A0C D2030A    C           JNC     PTKTF3
0A0F 7E                    MOV     A,M
0A10 3C                    INR     A           ;INCREMENT THE SCALE BY 1
0A11 77                    MOV     M,A
0A12 05                    DCR     B           ;DECREMENT THE NO. OF BITS TO PRINT
0A13 CAFF09    C           JZ      PTKTF6
0A16 C3ED09    C           JMP     PTKTF1
                 ;
                 ;
0A19 0E02        MSTOR:    MVI     C,02H       ;ROUTINE TO STORE THE DIGIT INTO ASCII
0A1B 7E          MSTOR1:   MOV     A,M
0A1C E60F                  ANI     0FH
0A1E C630                  ADI     30H
0A20 12                    STAX    D           ;D & E HAS THE STARTING LOCATION OF STORAGE
0A21 1B                    DCX     D           ;LOCATION. GO TO NEXT LOCATION
0A22 7E                    MOV     A,M         ;BRING THE DIGIT
0A23 E6F0                  ANI     0F0H
0A25 0F                    RRC
0A26 0F                    RRC
0A27 0F                    RRC
0A28 0F                    RRC
0A29 C630                  ADI     30H         ;CONVERT THE CODE INTO ASCII
0A2B 12                    STAX    D
0A2C 1B                    DCX     D
0A2D 23                    INX     H
0A2E 0D                    DCR     C
0A2F C8                    RZ
0A30 C31B0A    C           JMP     MSTOR1
                 ;
                                           ;PRINT ERROR ROUTINE DISPLAY PRINT ERROR ON LED
                 ;
                 ;
                 ;
                                           ;PRINT DIGIT ROUTINE CONVERTS BCD
                                           ;TO ASCII CODE AND THEN PRINTS
                                           ;HL REGS HOLD THE STARTING ADDR.
                                           ;OF THE DIGIT TO BE PRINTED
                 ;
0A33 0602        PDIG:     MVI     B,02H
0A35 23                    INX     H
0A36 CD440A    C PDIG1:    CALL    PDIGA
0A39 D0                    RNC
0A3A 2B                    DCX     H
0A3B 05                    DCR     B
0A3C C2360A    C           JNZ     PDIG1
0A3F 23          PDIG2:    INX     H           ;POINT TO NEXT DIGIT
0A40 23                    INX     H
0A41 23                    INX     H
0A42 37                    STC
0A43 C9                    RET
                 ;
0A44 3EF0        PDIGA:    MVI     A,0F0H
0A46 A6                    ANA     M
0A47 0F                    RRC
0A48 0F                    RRC
0A49 0F                    RRC
0A4A 0F                    RRC
0A4B C630                  ADI     30H         ;CONVERT THE NO. TO ASCII
0A4D 4F                    MOV     C,A
0A4E CD0000    E           CALL    PCHAR
0A51 D0                    RNC
0A52 3E0F        PDIGB:    MVI     A,0FH
0A54 A6                    ANA     M
0A55 C630                  ADI     30H
0A57 4F                    MOV     C,A
0A58 CD0000    E           CALL    PCHAR
0A5B C9                    RET
                 ;
0A5C 23          PCUSN:    INX     H           ;PRINT CUSTOMER ROUTINE
0A5D 7E                    MOV     A,M         ;BRING THE DIGIT
0A5E B7                    ORA     A
0A5F CA6E0A    C           JZ      PCUSN2      ;JUMP IF IT IS ZERO
0A62 CD520A    C           CALL    PDIGB
```

```
LOC  OBJ          SOURCE STATEMENT

0A65 D0                   RNC
0A66 2B                   DCX    H
0A67 CD440A   C           CALL   PDIGA
0A6A 23         PCUSN4:   INX    H
0A6B 23                   INX    H
0A6C 37                   STC
0A6D C9                   RET
0A6E 0E20       PCUSN2:   MVI    C,ASP         ;PUT ASP IF MSB IS 0
0A70 CD0000   E           CALL   PCHAR
0A73 D0                   RNC
0A74 2B                   DCX    H
0A75 7E                   MOV    A,M           ;BRING THE OTHER DIGIT
0A76 E6F0                 ANI    0F0H
0A78 CA810A   C           JZ     PCUSN3
0A7B CD440A   C           CALL   PDIGA
0A7E C36A0A   C           JMP    PCUSN4        ;PRINT OTHER DIGIT IF IT IS NOT ZERO
0A81 0E20       PCUSN3:   MVI    C,ASP
0A83 CD0000   E           CALL   PCHAR         ;PUT ASP FOR THAT DIGIT
0A86 D0                   RNC                  ;RETURN IF FAILURE TO PRINT
0A87 CD520A   C           CALL   PDIGB         ;OTHERWISE PRINT THE LAST DIGIT
0A8A C36A0A   C           JMP    PCUSN4
                ;
                                               ;ROUTINE TO PRINT THE WEIGHT
                                               ;REG D. HAS THE ADDRESS FOR 5 BYTES
                ;
                ;
0A8D C5         PRNTWT:   PUSH   B
0A8E D5                   PUSH   D
0A8F E5                   PUSH   H
0A90 F5                   PUSH   PSW
0A91 0607                 MVI    B,07
0A93 C37D0B   C           JMP    FRSLT4
                ;
                ;
                ;                              ;ROUTINE FOR CALCULATION DOCKAGES
                ;                              ;PARAMETER PASSED
                ;                              ;FNUMD1: UNIT RATE FOR DOCKAGES IN BCD
                ;                              ;FNUMD2: % DOCKAGE FROM BUFFER IN BCD
                ;                              ;FNUMF1: TEMPORARY STORAGE
                ;                              ;FNUMF2: NET IN BINARY
                ;                              ;ROUTINE ALSO PRINTS OUT THE RESULT
                ;
0A96 C5         CDOCK:    PUSH   B
0A97 D5                   PUSH   D
0A98 E5                   PUSH   H
0A99 F5                   PUSH   PSW
0A9A 110000   E           LXI    D,FNUMD2      ;BRING % DOCKAGE FROM BUFFER
0A9D CD4F12   C           CALL   FTSTWT        ;PRINT IN THE FORM XX.XX
0AA0 D23C03   C           JNC    CLRCY
0AA3 3A0000   E           LDA    DESTOR
0AA6 B7                   ORA    A
0AA7 CAB00A   C           JZ     CDOCK4
0AAA 117702   C           LXI    D,MSGZ
0AAD C3B30A   C           JMP    CDOCK5
0AB0 11E500   C  CDOCK4:  LXI    D,MSGELL      ;PRINT ' % $/'
0AB3 CD0000   E  CDOCK5:  CALL   PMASG
0AB6 D23C03   C           JNC    CLRCY
0AB9 110000   E           LXI    D,FNUMD1      ;PRINT UNIT PRICE
0ABC 0604                 MVI    B,04H
0ABE CDCB09   C           CALL   PTKTB1        ;PRINT IN THE FORM .XXXX
0AC1 D23C03   C           JNC    CLRCY
0AC4 CDAD09   C           CALL   FNET1
0AC7 C2D30A   C           JNZ    CDOCK2
0ACA 112702   C           LXI    D,MSGQ
0ACD CD0000   E           CALL   PMASG
0AD0 C3E60A   C           JMP    CDOCK3
0AD3 3A0000   E  CDOCK2:  LDA    DESTOR
0AD6 B7                   ORA    A
0AD7 CAE00A   C           JZ     CDOCK6
0ADA 118002   C           LXI    D,MSGZZ
0ADD C3E30A   C           JMP    CDOCK7
0AE0 118701   C  CDOCK6:  LXI    D,MSGC        ;PRINT '/%/BU $ -'
0AE3 CD0000   E  CDOCK7:  CALL   PMASG
0AE6 D23C03   C  CDOCK3:  JNC    CLRCY
0AE9 210000   E           LXI    H,FNUMD1      ;UNIT RATE IN BINARY
0AEC 3EFC                 MVI    A,-4
0AEE CDC012   C           CALL   D2BC          ;CONVERT IT TO BINARY
0AF1 110000   E           LXI    D,FNUMF1      ;STORE IT AT LOCATION FNUMF1
0AF4 CD0000   E           CALL   FSTOR
0AF7 3EFE                 MVI    A,-2
0AF9 210000   E           LXI    H,FNUMD2
0AFC CDC012   C           CALL   D2BC
0AFF 110000   E           LXI    D,FNUMF1
0B02 CD0000   E           CALL   FMUL          ;% DOCKAGE X NET X UNIT RATE
0B05 110000   E           LXI    D,FNUMF1
0B08 D5                   PUSH   D
0B09 CD0000   E           CALL   FSTOR
0B0C 110000   E           LXI    D,DISCNT      ;ADD TO THE DISCOUNT FOR FUTURE CALCULATION
0B0F D5                   PUSH   D
0B10 CD0000   E           CALL   FADD          ;IN PRINT JOURNAL ROUTINE
0B13 D1                   POP    D
0B14 CD0000   E           CALL   FSTOR
0B17 D1                   POP    D
0B18 CD0000   E           CALL   FLOAD
0B1B 110000   E           LXI    D,FNUMF2
0B1E CD0000   E           CALL   FMUL
0B21 110000   E           LXI    D,FNUMF1
0B24 D5                   PUSH   D
0B25 CD0000   E           CALL   ROUNDR
0B28 CD0000   E           CALL   FSTOR
0B2B 110000   E           LXI    D,TOTDOC
0B2E D5                   PUSH   D
0B2F CD0000   E           CALL   FADD
0B32 D1                   POP    D
```

```
LOC  OBJ            LINE      SOURCE STATEMENT

0B33 CD0000    E          CALL   ROUNDR
0B36 CD0000    E          CALL   FSTOR
0B39 D1                   POP    D
0B3A CD0000    E          CALL   FLOAD
0B3D 210000    E          LXI    H,FNUMD1
0B40 CD0000    E          CALL   B2D1A7
0B43 110000    E          LXI    D,FNUMD1     ;PRINT THE RESULT STARTING FROM LOCATION FNUMD1
0B46 CD670B    C          CALL   PRSLT
0B49 D23C03    C          JNC    CLRCY
0B4C 010000    E          LXI    B,FPR
0B4F 110000    E          LXI    D,RUNPR      ;SUBTRACT THE RESULT FROM RUNNING PRICE
0B52 CD0000    E          CALL   FLOAD
0B55 110000    E          LXI    D,FNUMF1
0B58 CD0000    E          CALL   FSUB
0B5B CD0000    E          CALL   ROUNDR
0B5E 110000    E          LXI    D,RUNPR      ;STORE RUNNING PRICE AT LOCATION RUNPR
0B61 CD0000    E          CALL   FSTOR
0B64 C33603    C          JMP    SETCY
                     ;
                     ;
                                              ;ROUTINE TO PRINT THE PRICE IN FORM XXXXX.XX
                                              ;REG. D POINTS TO STARTING LOCATION
                                              ;THE EXPONENT OF NO. IS IN DSCALE
                     ;
0B67 C5              PRSLT:   PUSH   B
0B68 D5                       PUSH   D
0B69 E5                       PUSH   H
0B6A F5                       PUSH   PSW
0B6B 0609                     MVI    B,09H
0B6D 3A0100    E     PRSLTA:  LDA    DSCALE+1
0B70 FEFF                     CPI    0FFH     ;MAKE SURE NUMBER IS IN RANGE
0B72 CA7D0B    C              JZ     PRSLT4
0B75 C600                     ADI    0
0B77 CA010C    C              JZ     PRSLT7
0B7A F2080C    C              JP     PRSLT8
0B7D 1A              PRSLT4:  LDAX   D
0B7E FE30                     CPI    30H
0B80 C2880B    C              JNZ    PRSLT6
0B83 3EF6                     MVI    A,0F6H
0B85 320000    E              STA    DSCALE
0B88 210000    E     PRSLT6:  LXI    H,DSCALE
0B8B 7E                       MOV    A,M      ;BRING THE EXPONENT
0B8C 2F                       CMA
0B8D 3C                       INR    A
0B8E 77                       MOV    M,A
0B8F 7E              PRSLT1:  MOV    A,M
0B90 B7                       ORA    A
0B91 CACD0B    C              JZ     PRSLT3   ;IF ZERO PRINT ALL REMAING DIGITS
0B94 3D                       DCR    A
0B95 320000    E              STA    DSCALE   ;INCREMENT DSCALE BY 1
0B98 05                       DCR    B
0B99 0E20                     MVI    C,ASP
0B9B CD0000    E              CALL   PCHAR    ;LEAVE SPACE IF EXPONENT NON-ZERO
0B9E D23C03    C              JNC    CLRCY
0BA1 3E02                     MVI    A,02
0BA3 A8              PRST12:  XRA    B
0BA4 C28F0B    C              JNZ    PRSLT1   ;LOOP TILL EXPONENT IS ZERO
0BA7 CD110C    C              CALL   PRSB
0BAA 0E2E                     MVI    C,PERIOD ;OTHERWISE PRINT PERIOD
0BAC CD0000    E              CALL   PCHAR
0BAF D23C03    C              JNC    CLRCY
0BB2 0E02                     MVI    C,02
0BB4 7E              PRST11:  MOV    A,M      ;IS EXPONET ZERO?
0BB5 B7                       ORA    A
0BB6 CAD00B    C              JZ     PRS3     ;JUMP IF DSCALE IS 0
0BB9 3D                       DCR    A
0BBA 77                       MOV    M,A
0BBB 05                       DCR    B
0BBC C5                       PUSH   B
0BBD 0E30                     MVI    C,30H    ;OTHERWISE PRINT 0
0BBF CD0000    E              CALL   PCHAR
0BC2 C1                       POP    B
0BC3 0D                       DCR    C
0BC4 C2B40B    C              JNZ    PRST11
0BC7 CDF10B    C              CALL   PRSC
0BCA C33603    C     PRSLT2:  JMP    SETCY
0BCD CD110C    C     PRSLT3:  CALL   PRSB
0BD0 1A              PRS3:    LDAX   D        ;FETCH THE NO.
0BD1 4F                       MOV    C,A
0BD2 CD0000    E              CALL   PCHAR    ;PRINT THE NO.
0BD5 D23C03    C              JNC    CLRCY
0BD8 05                       DCR    B        ;DECREMENT THE NO. OF DIGITS TO PRINT
0BD9 CAEB0B    C              JZ     PRS2
0BDC 13                       INX    D        ;POINT TO NEXT DIGIT
0BDD 3E02                     MVI    A,02
0BDF A8              PRSLT9:  XRA    B        ;IS THIS 2ND DIGIT
0BE0 C2D00B    C              JNZ    PRS3
0BE3 0E2E                     MVI    C,PERIOD
0BE5 CD0000    E              CALL   PCHAR
0BE8 C3D00B    C              JMP    PRS3
0BEB CDF10B    C     PRS2:    CALL   PRSC
0BEE C33603    C              JMP    SETCY
0BF1 C5              PRSC:    PUSH   B
0BF2 3A0000    E              LDA    DSIGN
0BF5 FE2D                     CPI    '-'
0BF7 C2FF0B    C              JNZ    PRSC1
0BFA 0E29                     MVI    C,')'
0BFC CD0000    E              CALL   PCHAR
0BFF C1              PRSC1:   POP    B
0C00 C9                       RET
0C01 3A0000    E     PRSLT7:  LDA    DSCALE
0C04 B7                       ORA    A
0C05 CA7D0B    C              JZ     PRSLT4
```

```
LOC  OBJ           LINE       SOURCE STATEMENT

0C08 115702    C   1432 PRSLT8: LXI     D,MSGV
0C0B CD0000    E   1433         CALL    PMASG
0C0E C33603    C   1434         JMP     SETCY
0C11 C5            1435 PRSB:   PUSH    B
0C12 3A0000    E   1436         LDA     DSIGN
0C15 FE2D          1437         CPI     '-'
0C17 C21F0C    C   1438         JNZ     PRSB1
0C1A 0E28          1439         MVI     C,'('
0C1C CD0000    E   1440         CALL    PCHAR
0C1F C1            1441 PRSB1:  POP     B
0C20 C9            1442         RET
                   1443 ;
                   1444                                   ;PRINT FORM C-DOCKAGES
                   1445 ;
0C21 D5            1446 PFORMC: PUSH    D
0C22 E5            1447         PUSH    H
0C23 1A            1448         LDAX    D
0C24 E610          1449         ANI     10H               ;TEST WT ENTERED?
0C26 C2460C    C   1450         JNZ     PFRMC2            ;JUMP TEST WT ENTERED
0C29 0E0D          1451 PFRMC4: MVI     C,ACR
0C2B CD0000    E   1452         CALL    PCHAR
0C2E 11D300    C   1453         LXI     D,MSGELJ          ;PRINT TEST WEIGHT
0C31 CD0000    E   1454         CALL    PMASG
0C34 110102    C   1455         LXI     D,MSGL            ;PRINT NOT ENTERED
0C37 CD0000    E   1456         CALL    PMASG
0C3A E1            1457         POP     H
0C3B 23            1458         INX     H
0C3C 23            1459         INX     H
0C3D E5            1460         PUSH    H
0C3E 3EFF          1461         MVI     A,0FFH            ;SET THE FLAG
0C40 320000    E   1462         STA     FLAG1
0C43 C3730D    C   1463         JMP     PFRMC1
0C46 7E            1464 PFRMC2: MOV     A,M
0C47 FEFF          1465         CPI     0FFH              ;ARE DIGITS FF?
0C49 CA290C    C   1466         JZ      PFRMC4
0C4C CDAD09    C   1467         CALL    PNET1             ;IS GRAIN IN CWT?
0C4F C25E0C    C   1468         JNZ     PFRMC3
0C52 0E0D          1469         MVI     C,ACR
0C54 CD0000    E   1470         CALL    PCHAR
0C57 E1            1471         POP     H
0C58 23            1472         INX     H
0C59 23            1473         INX     H
0C5A E5            1474         PUSH    H
0C5B C3730D    C   1475         JMP     PFRMC1
0C5E 119201    C   1476 PFRMC3: LXI     D,MSGD            ;PRINT MIN. TEST WT.
0C61 CD0000    E   1477         CALL    PMASG
0C64 3A0000    E   1478         LDA     SCOMN
0C67 4F            1479         MOV     C,A
0C68 CD0000    E   1480         CALL    CMDADF
0C6B D2C404    C   1481         JNC     SFLAG2
0C6E 0E85          1482         MVI     C,MINTW           ;PRINT MIN. TEST WT. DIGIT
0C70 CD0000    E   1483         CALL    CMDOSF
0C73 D2C404    C   1484         JNC     SFLAG2
0C76 110300    E   1485         LXI     D,(FNUMD1+3)
0C79 CD190A    C   1486         CALL    MSTOR
0C7C 13            1487         INX     D
0C7D CD4F12    C   1488         CALL    PTSTWT
0C80 116901    C   1489         LXI     D,MSGELZ
0C83 CD0000    E   1490         CALL    PMASG
0C86 3E02          1491         MVI     A,02
0C88 CD0000    E   1492         CALL    SPACE
0C8B 11D300    C   1493         LXI     D,MSGELJ          ;PRINT 'TW:' ON PRINTER
0C8E CD0000    E   1494         CALL    PMASG
0C91 D24805    C   1495         JNC     PFRMA6            ;RETURN IF UNSUCCESSFUL IN PRINTING
0C94 E1            1496         POP     H
0C95 E5            1497         PUSH    H
0C96 110300    E   1498         LXI     D,TWFL+3          ;STORE TEST WT. AT LOCATION TWFL FOR
0C99 CD190A    C   1499         CALL    MSTOR             ;CALCULATION IN PRINT JOURNAL ROUTINE
0C9C E1            1500         POP     H
0C9D 110300    E   1501         LXI     D,(FNUMD2+3)
0CA0 CD190A    C   1502         CALL    MSTOR             ;STORE THE ACTUAL TEST WT. IN BCD AT FNUMD2
0CA3 13            1503         INX     D
0CA4 CD4F12    C   1504         CALL    PTSTWT            ;PRINT THE ACTUAL TEST WT.
0CA7 117301    C   1505         LXI     D,MSGA            ;PRINT ' LB $.'
0CAA CD0000    E   1506         CALL    PMASG
0CAD E5            1507         PUSH    H
0CAE 3A0000    E   1508         LDA     SCOMN
0CB1 4F            1509         MOV     C,A
0CB2 CD0000    E   1510         CALL    CMDADF
0CB5 D2C404    C   1511         JNC     SFLAG2
0CB8 0E73          1512         MVI     C,TESTWT
0CBA CD0000    E   1513         CALL    CMDOSF
0CBD D2C404    C   1514         JNC     SFLAG2
0CC0 110300    E   1515         LXI     D,FNUMF1+3        ;RATE FOR TEST WEIGHT DOCK. AT FNUMF1
0CC3 CD190A    C   1516         CALL    MSTOR
0CC6 13            1517         INX     D                 ;NET IS IN FNUMF2 IN BINARY
0CC7 0604          1518         MVI     B,04H             ;PRINT THE RATE FOR DOCKAGE
0CC9 CDCB09    C   1519         CALL    PTKTB1
0CCC 117C01    C   1520         LXI     D,MSGB            ;PRINT '/LB/BU $ -'
0CCF CD0000    E   1521         CALL    PMASG
0CD2 3EFE          1522         MVI     A,-2
0CD4 210000    E   1523         LXI     H,FNUMD2          ;CONVERT ACTUAL TEST WT. TO BINARY
0CD7 CDC012    C   1524         CALL    D2BC
0CDA 110000    E   1525         LXI     D,FNUMD2          ;ACTUAL TEST WT. IN BINARY AT FNUMD2
0CDD CD0000    E   1526         CALL    FSTOR
0CE0 3EFE          1527         MVI     A,-2
0CE2 210000    E   1528         LXI     H,FNUMD1          ;CONVERT MINIMUM TESTR WT. TO BINARY
0CE5 CDC012    C   1529         CALL    D2BC
0CE8 110000    E   1530         LXI     D,FNUMD2
0CEB CD0000    E   1531         CALL    FSUB
0CEE 110000    E   1532         LXI     D,FNUMD2
0CF1 CD0000    E   1533         CALL    FSTOR
0CF4 210000    E   1534         LXI     H,FNUMF1          ;CONVERT RATE TO BINARY
```

```
LOC  OBJ            SOURCE STATEMENT

0CF7 3EFC                   MVI    A,-4
0CF9 CDC012    C            CALL   D2BC
0CFC 110000    E            LXI    D,FNUMD2
0CFF CD0000    E            CALL   FMUL          ;MULTIPLY THE ABOVE CALCULATION BY RATE
0D02 110000    E            LXI    D,FNUMF1
0D05 CD0000    E            CALL   FSTOR
0D08 3E05                   MVI    A,05H
0D0A 210000    E            LXI    H,FNUMD1
0D0D CDCF12    C            CALL   B2D1A
0D10 3A0000    E            LDA    DSIGN
0D13 FE2B                   CPI    PLUS
0D15 C2730D    C            JNZ    PFRMC1
0D18 110000    E            LXI    D,FNUMF1
0D1B CD0000    E            CALL   FLOAD
0D1E 110000    E            LXI    D,DISCNT
0D21 D5                     PUSH   D
0D22 CD0000    E            CALL   FADD          ;STORE THE DISCOUNT IN BINARY AT TWRATE FOR
0D25 D1                     POP    D
0D26 CD0000    E            CALL   FSTOR
0D29 110000    E            LXI    D,FNUMF1
0D2C CD0000    E            CALL   FLOAD
0D2F 110000    E            LXI    D,FNUMF2      ;CALCULATING THE PRINT JOURNAL
0D32 CD0000    E            CALL   FMUL
0D35 CD0000    E            CALL   ROUNDR
0D38 110000    E            LXI    D,FNUMF1      ;STORE THE BINARY RESULT AT FNUMF1
0D3B CD0000    E            CALL   FSTOR
0D3E 110000    E            LXI    D,TOTDOC
0D41 D5                     PUSH   D
0D42 CD0000    E            CALL   FADD
0D45 D1                     POP    D
0D46 CD0000    E            CALL   ROUNDR
0D49 CD0000    E            CALL   FSTOR
0D4C 110000    E            LXI    D,FNUMF1
0D4F CD0000    E            CALL   FLOAD
0D52 210000    E            LXI    H,FNUMD1
0D55 CD0000    E            CALL   B2D1A7
0D58 110000    E            LXI    D,FNUMD1
0D5B CD670B    C            CALL   PBSLT         ;PRINT THE PRICE
0D5E 110000    E            LXI    D,RUNPR
0D61 CD0000    E            CALL   FLOAD
0D64 110000    E            LXI    D,FNUMF1
0D67 CD0000    E            CALL   FSUB
0D6A CD0000    E            CALL   ROUNDR
0D6D 110000    E            LXI    D,RUNPR
0D70 CD0000    E            CALL   FSTOR
0D73 E1                PFRMC1: POP    H
0D74 D1                     POP    D
0D75 D5                     PUSH   D
0D76 1A                     LDAX   D
0D77 F601                   ANI    01H           ;IS MOIST ENTERED?
0D79 C2930D    C            JNZ    CMOIST
0D7C 11D800    C       CMOST7: LXI    D,MSGELK      ;PRINT MOISTURE
0D7F CD0000    E            CALL   PMASG
0D82 110102    C            LXI    D,MSGL        ;PRINT NOT ENTERED
0D85 CD0000    E            CALL   PMASG
0D88 23                     INX    H
0D89 23                     INX    H
0D8A E5                     PUSH   H
0D8B 3EFF                   MVI    A,0FFH
0D8D 320000    E            STA    FLAG1
0D90 C3390E    C            JMP    CFM
0D93 7E                CMOIST: MOV    A,M
0D94 FEFF                   CPI    0FFH
0D96 CA7C0D    C            JZ     CMOST7
0D99 E5                     PUSH   H
0D9A 110300    E            LXI    D,MSTFL+3     ;STORE CUSTOMER MOISTURE FOR
0D9D CD190A    C            CALL   MSTOR         ;CALCULATION IN PRINT JOURNAL ROUTINE
0DA0 E1                     POP    H
0DA1 E5                     PUSH   H
0DA2 CD870F    C            CALL   CMOSTA        ;CALCULATE THE DIFFERENCE
0DA5 E1                     POP    H
0DA6 23                     INX    H
0DA7 23                     INX    H
0DA8 E5                     PUSH   H             ;POINT TO NEXT LOCATION FOR FM
0DA9 11D800    C            LXI    D,MSGELK      ;PRINT 'MOISTURE:'
0DAC CD0000    E            CALL   FMASG
0DAF 110000    E            LXI    D,FNUMD2      ;PRINT IN THE FORM XX.XX
0DB2 CD4F12    C            CALL   PTSTWT
0DB5 0E20                   MVI    C,ASF
0DB7 CD0000    E            CALL   PCHAR         ;PRINT '%' AFTER MOISTURE
0DBA 0E25                   MVI    C,PERCNT
0DBC CD0000    E            CALL   PCHAR
0DBF 11AF01    C            LXI    D,MSGF
0DC2 CD0000    E            CALL   PMASG
0DC5 3E12                   MVI    A,18
0DC7 CD0000    E            CALL   SPACE
0DCA 210000    E            LXI    H,FNUMD1
0DCD 3E04                   MVI    A,04H
0DCF CDCF12    C            CALL   B2D1A         ;CONVERT IT TO DECIMAL AND STORE
0DD2 110000    E            LXI    D,FNUMD1
0DD5 CDE70F    C            CALL   DSCA
0DD8 3A0000    E            LDA    DSIGN
0DDB FE2B                   CPI    PLUS          ;IS THE SIGN PLUS THEN NO DOCKAGE
0DDD C2EE0D    C            JNZ    CMOST4
0DE0 3EFF                   MVI    A,0FFH        ;SET THE FLAG IF MOISTURE IS LESS THEN
0DE2 320000    E            STA    MSTSTA        ;BREAK POINT
0DE5 11A201    C            LXI    D,MSGE        ;PRINT 'NO DOCKAGE'
0DE8 CD0000    E            CALL   PMASG
0DEB C3390E    C            JMP    CFM           ;JUMP TO CALCULATE FOREIGN MATERIAL
0DEE 3A0000    E       CMOST4: LDA    SCOMN
0DF1 4F                     MOV    C,A
0DF2 CD0000    E            CALL   CMDADF        ;FIND THE ADDRESS FOR THAT COMMODITY
0DF5 CD0000    E            CALL   CONSAL
0DF8 DA120E    C            JC     CMST04
```

```
LOC   OBJ          LINE        SOURCE STATEMENT

0DFB 3A0000    E  1639           LDA    STATUS
0DFE FE00         1640           CPI    00B
0E00 CA0D0E    C  1641           JZ     CMOST5
0E03 FE02         1642           CPI    10B
0E05 CA0D0E    C  1643           JZ     CMOST5
0E08 0E81         1644           MVI    C,MOISTB        ;CALCULATE THE TICKET ON GROSS BUSHELS
0E0A C3140E    C  1645           JMP    CMOST6
0E0D 0E80         1646 CMOST5:   MVI    C,MOISTA        ;BRINT THE RATE FOR SALE & CONTRACT
0E0F C3140E    C  1647           JMP    CMOST6
0E12 0E67         1648 CMST04:   MVI    C,MOIST
0E14 CD0000    E  1649 CMOST6:   CALL   CMDOSF          ;BRING THE RATE
0E17 110300    E  1650           LXI    D,FNUMD1+3      ;STORE THE RATE AT FNUMD1 IN BCD
0E1A CD190A    C  1651           CALL   MSTOR
0E1D 3EFF         1652           MVI    A,0FFH
0E1F 320000    E  1653           STA    DESTOR
0E22 CD960A    C  1654           CALL   CDOCK           ;CALCULATE THE DOCKAGE & PRINT
0E25 AF           1655           XRA    A
0E26 320000    E  1656           STA    DESTOR
0E29 110000    E  1657           LXI    D,FNUMF1
0E2C 210000    E  1658           LXI    H,MSTAMT        ;STORE THE MOISTURE AMMOUNT IN BINARY
0E2F 0604         1659           MVI    B,04
0E31 1A           1660 CMOST8:   LDAX   D
0E32 77           1661           MOV    M,A
0E33 23           1662           INX    H
0E34 13           1663           INX    D
0E35 05           1664           DCR    B
0E36 C2310E    C  1665           JNZ    CMOST8
0E39 E1           1666 CFM:      POP    H
0E3A D1           1667           POP    D
0E3B D5           1668           PUSH   D
0E3C 1A           1669           LDAX   D
0E3D E602         1670           ANI    02H             ;IS FM ENTERED?
0E3F C2580E    C  1671           JNZ    CFM5
0E42 11EE00    C  1672           LXI    D,MSGELO        ;PRINT FM
0E45 CD0000    E  1673           CALL   PMASG
0E48 110102    C  1674           LXI    D,MSGL          ;PRINT NOT ENTERED
0E4B CD0000    E  1675           CALL   PMASG
0E4E 23           1676           INX    H
0E4F 23           1677           INX    H
0E50 3EFF         1678           MVI    A,0FFH
0E52 320000    E  1679           STA    FLAG1
0E55 C3AC0E    C  1680           JMP    CFM2
0E58 7E           1681 CFM5:     MOV    A,M
0E59 FEFF         1682           CPI    0FFH
0E5B C2630E    C  1683           JNZ    CFM1
0E5E 23           1684           INX    H
0E5F 23           1685           INX    H
0E60 C3AC0E    C  1686           JMP    CFM2
0E63 11EE00    C  1687 CFM1:     LXI    D,MSGELO        ;PRINT 'FM:' ON PRINTER
0E66 CD0000    E  1688           CALL   PMASG
0E69 D24505    C  1689           JNC    PFRMA1
0E6C 3E02         1690           MVI    A,2
0E6E CD0000    E  1691           CALL   SPACE
0E71 E5           1692           PUSH   H
0E72 110300    E  1693           LXI    D,FMFL+3        ;STORET % FM FOR CALCULATION IN PRINT
0E75 CD190A    C  1694           CALL   MSTOR           ;JOURNAL ROUTINE
0E78 E1           1695           POP    H
0E79 110300    E  1696           LXI    D,FNUMD2+3      ;STORE THE F.M. FROM BUFFER
0E7C CD190A    C  1697           CALL   MSTOR
0E7F 0E87         1698           MVI    C,MINFM
0E81 CD170F    C  1699           CALL   CFMA
0E84 D2AC0E    C  1700           JNC    CFM2
0E87 3E03         1701           MVI    A,3
0E89 CD0000    E  1702           CALL   SPACE
0E8C E5           1703           PUSH   H
0E8D 3A0000    E  1704           LDA    SCOMN           ;BRING THE UNIT RATE FOR THAT DOCKAGE
0E90 4F           1705           MOV    C,A
0E91 CD0000    E  1706           CALL   CMDADF
0E94 D2C404    C  1707           JNC    SFLAG2
0E97 0E62         1708           MVI    C,FM
0E99 CD0000    E  1709           CALL   CMDOSF
0E9C D2C404    C  1710           JNC    SFLAG2
0E9F 110300    E  1711           LXI    D,FNUMD1+3
0EA2 CD190A    C  1712           CALL   MSTOR
0EA5 E1           1713           POP    H
0EA6 CD960A    C  1714           CALL   CDOCK           ;CALCULATE AND PRINT DOCKAGE
0EA9 D24505    C  1715           JNC    PFRMA1
0EAC D1           1716 CFM2:     POP    D
0EAD D5           1717           PUSH   D
0EAE 1A           1718           LDAX   D
0EAF E604         1719           ANI    04H             ;DAMAGE ENTERED?
0EB1 C2C30E    C  1720           JNZ    CFM6
0EB4 110201    C  1721           LXI    D,MSGELP        ;PRINT DAMAGE
0EB7 CD0000    E  1722           CALL   PMASG
0EBA 110102    C  1723           LXI    D,MSGL          ;PRINT NOT ENTERED
0EBD CD0000    E  1724           CALL   PMASG
0EC0 C3C504    C  1725           JMP    SFLAG
0EC3 7E           1726 CFM6:     MOV    A,M
0EC4 FEFF         1727           CPI    0FFH
0EC6 C2CE0E    C  1728           JNZ    CFM3
0EC9 23           1729           INX    H
0ECA 23           1730           INX    H
0ECB C3140F    C  1731           JMP    CFM4
0ECE 110201    C  1732 CFM3:     LXI    D,MSGELP        ;PRINT 'DMG:' ON PRINTER
0ED1 CD0000    E  1733           CALL   PMASG
0ED4 D24505    C  1734           JNC    PFRMA1
0ED7 3E0D         1735           MVI    A,13
0ED9 CD0000    E  1736           CALL   SPACE
0EDC E5           1737           PUSH   H
0EDD 110300    E  1738           LXI    D,DMGFL+3       ;STORE THE DAMAGE IN %
0EE0 CD190A    C  1739           CALL   MSTOR
0EE3 E1           1740           POP    H
0EE4 110300    E  1741           LXI    D,(FNUMD2+3)    ;BRING % DOCKAGE FROM BUFFER
```

```
LOC  OBJ           LINE      SOURCE STATEMENT

0EE7 CD190A    C             CALL    MSTOR
0EEA 0E86                    MVI     C,MINDMG
0EEC CD170F    C             CALL    CFMA
0EEF D2140F    C             JNC     CFM4
0EF2 3E03                    MVI     A,3
0EF4 CD0000    E             CALL    SPACE
0EF7 E5                      PUSH    H
0EF8 3A0000    E             LDA     SCOMN           ;BRING UNIT RATE FOR THAT DOCKAGE
0EFB 4F                      MOV     C,A
0EFC CD0000    E             CALL    CMDADF
0EFF D2C404    C             JNC     SFLAG2
0F02 0E66                    MVI     C,DAMAGE
0F04 CD0000    E             CALL    CMDOSF
0F07 D2C604    C             JNC     SFLAG1
0F0A 110300    E             LXI     D,FNUMD1+3
0F0D CD190A    C             CALL    MSTOR
0F10 E1                      POP     H
0F11 CD960A    C             CALL    CDOCK
0F14 C34505    C      CFM4:  JMP     PFRMA1
                      ;
0F17 E5               CFMA:  PUSH    H
0F18 C5                      PUSH    B               ;TEMPORARY STORE THE F.M. NO.
0F19 3E02                    MVI     A,2
0F1B CD0000    E             CALL    SPACE
0F1E 0E28                    MVI     C,'('           ;OUTPUT THE BRACKET
0F20 CD0000    E             CALL    PCHAR
0F23 110000    E             LXI     D,FNUMD2        ;PRINT THE CUSTOMER DOCKAGE
0F26 CD4F12    C             CALL    PTSTWT
0F29 0E25                    MVI     C,'%'           ;PRINT % SIGN
0F2B CD0000    E             CALL    PCHAR
0F2E 0E29                    MVI     C,')'
0F30 CD0000    E             CALL    PCHAR           ;OUTPUT THE END OF BRACKET
0F33 3A0000    E             LDA     SCOMN
0F36 4F                      MOV     C,A
0F37 CD0000    E             CALL    CMDADF          ;FIND ADDRESS FOR COMMODITY
0F3A C1                      POP     B
0F3B CD0000    E             CALL    CMDOSF          ;FIND THE OFFSET
0F3E 110300    E             LXI     D,FNUMD1+3      ;STORE THE BREAK POINT AT FNUMD1
0F41 CD190A    C             CALL    MSTOR
0F44 3EFE                    MVI     A,-2
0F46 210000    E             LXI     H,FNUMD1
0F49 CDC012    C             CALL    D2BC            ;CONVERT IT TO BINARY
0F4C 110000    E             LXI     D,FNUMD1        ;TEMPORARY STORE THE NO.
0F4F CD0000    E             CALL    FSTOR
0F52 3EFE                    MVI     A,-2
0F54 210000    E             LXI     H,FNUMD2        ;CONVERT DECIMAL TO BINARY
0F57 CDC012    C             CALL    D2BC
0F5A 110000    E             LXI     D,FNUMD1        ;SUBRACT THE BREAK POINT
0F5D CD0000    E             CALL    FSUB
0F60 210000    E             LXI     H,FNUMD1
0F63 3E04                    MVI     A,04
0F65 CDCF12    C             CALL    B2D1A           ;CHECK THE REASULT
0F68 3A0000    E             LDA     DSIGN
0F6B FE2B                    CPI     '+'
0F6D CA7E0F    C             JZ      FMA1
0F70 3E0F                    MVI     A,15
0F72 CD0000    E             CALL    SPACE
0F75 11A201    C             LXI     D,MSGE          ;PRINT 'NO DOCKAGE'
0F78 CD0000    E             CALL    PMASG
0F7B E1                      POP     H
0F7C B7                      ORA     A               ;CLEAR CARRY
0F7D C9                      RET
0F7E 110000    E      FMA1:  LXI     D,FNUMD1
0F81 CDE70F    C             CALL    DSCA            ;STORE THE DIFFERENCE AT FNUMD2
0F84 E1                      POP     H
0F85 37                      STC
0F86 C9                      RET
                      ;
                                                     ;ROUTINE CALCULATES THE DIFFERENCE
                                                     ;BETWEEN CUSTOMER MOISTURE AND
                                                     ;BREAKPOINT AND RETURNS RESULTS IN FNUMF3
0F87 E5               CMOSTA: PUSH   H
0F88 AF                      XRA     A               ;CLEAR FLAG THAT INDICATES WHETHER MOIST
0F89 320000    E             STA     MSTSTA          ;IS BELOW THE BREAK POINT
0F8C 110300    E             LXI     D,FNUMD2+3
0F8F CD190A    C             CALL    MSTOR           ;STORE THE % MOISTURE AT FNUMD2 IN BCD
0F92 E1                      POP     H
0F93 110300    E             LXI     D,MOISTF+3      ;STORE MOISTURE AT MOIST FLAG IN BCD
0F96 CD190A    C             CALL    MSTOR
0F99 210000    E             LXI     H,FNUMD2        ;CONVERT % MOISTURE IN BINARY TO BCD
0F9C CDBE12    C             CALL    D2B2
0F9F CD0000    E             CALL    ROUNDR
0FA2 110000    E             LXI     D,FNUMF1        ;STORE % MOISTURE IN BINARY AT FNUMF1
0FA5 CD0000    E             CALL    FSTOR
0FA8 3A0000    E             LDA     SCOMN           ;BRING THE COMMODITY NO.
0FAB 210000    E             LXI     H,MSTMIN
0FAE 3D               CMOST1: DCR    A
0FAF CAB90F    C             JZ      CMOST2
0FB2 23                      INX     H
0FB3 23                      INX     H
0FB4 23                      INX     H
0FB5 23                      INX     H
0FB6 C3AE0F    C             JMP     CMOST1
0FB9 3A0000    E      CMOST2: LDA    STATUS          ;BRING THE TYPE OF CONTRACT
0FBC FE00                    CPI     00B             ;IS IT SALE?
0FBE CAC80F    C             JZ      CMOST3
0FC1 FE02                    CPI     10B
0FC3 CAC80F    C             JZ      CMOST3          ;IS IT CONTRACT?
0FC6 23                      INX     H
0FC7 23                      INX     H
0FC8 110300    E      CMOST3: LXI    D,FNUMD3+3      ;BRING THE MINIMUM MOISTURE
0FCB CD190A    C             CALL    MSTOR
0FCE 210000    E             LXI     H,FNUMD3        ;CONVERT IT TO BINARY
```

```
LOC  OBJ              SOURCE STATEMENT

0FD1 CDBE12   C                 CALL    D2B2
0FD4 110000   E                 LXI     D,FNUMF1        ;MINIMUM MOISTURE-CUSTOMER % MOISTURE
0FD7 CD0000   E                 CALL    FSUB
0FDA 110000   E                 LXI     D,FNUMF3        ;STORE AT FNUMF3 IN BINARY
0FDD CD0000   E                 CALL    ROUNDR
0FE0 CD0000   E                 CALL    FSTOR
0FE3 C9                         RET
                  ;
                  ;
0FE4 110000   E   DSC:          LXI     D,FNUMF1
0FE7 210000   E   DSCA:         LXI     H,FNUMD2
0FEA 0604                       MVI     B,04H
0FEC 3A0000   E                 LDA     DSCALE
0FEF 3C                         INR     A
0FF0 3C                         INR     A
0FF1 320000   E                 STA     DSCALE
0FF4 3A0000   E   DSC1:         LDA     DSCALE
0FF7 B7                         ORA     A
0FF8 CA0A10   C                 JZ      DSC2
0FFB 3630                       MVI     M,30H           ;PUT ZERO
0FFD 3A0000   E                 LDA     DSCALE
1000 3C                         INR     A
1001 320000   E                 STA     DSCALE
1004 23                         INX     H
1005 05                         DCR     B
1006 C8                         RZ
1007 C3F40F   C                 JMP     DSC1
100A 1A           DSC2:         LDAX    D
100B 77                         MOV     M,A
100C 13                         INX     D
100D 23                         INX     H
100E 05                         DCR     B
100F C8                         RZ
1010 C30A10   C                 JMP     DSC2
                  ;
                  ;
                                                        ;CSERV: ROUTINE TO CALCULATE THE SHARES
                                                        ;FOR CUSTOMER
                                                        ;HL REGS POINT TO CUSTOMER #
                  ;
1013 C5           CSERV:        PUSH    B
1014 D5                         PUSH    D
1015 F5                         PUSH    PSW
1016 C32310   C                 JMP     CSERV4
1019 F1           CSERV1:       POP     PSW
101A B7                         ORA     A               ;CLEAR CARRY
101B D1           CSERV2:       POP     D
101C C1                         POP     B
101D C9                         RET
101E F1           CSERV3:       POP     PSW
101F 37                         STC
1020 C31B10   C                 JMP     CSERV2
1023 7E           CSERV4:       MOV     A,M             ;IS CUSTOMER # ENTERED?
1024 EEFF                       XRI     0FFH
1026 C23010   C                 JNZ     CSERV6
1029 23                         INX     H
102A 23                         INX     H
102B 23                         INX     H
102C 23                         INX     H               ;POINT TO NEXT CUSTOMER
102D C31E10   C                 JMP     CSERV3
1030 110B01   C   CSERV6:       LXI     D,MSGELQ        ;PRINT 'SERVICE CUSTOMER NO'
1033 CD0000   E                 CALL    PMASG
1036 CD5C0A   C                 CALL    PCUSN           ;PRINT THAT CUSTOMER #
1039 D21910   C                 JNC     CSERV1
103C 3E15                       MVI     A,21
103E CD0000   E                 CALL    SPACE
1041 111F01   C                 LXI     D,MSGELR
1044 CD0000   E                 CALL    PMASG
1047 110300   E                 LXI     D,FNUMD1+3      ;UNPACK THE SERVICE CHARGE AND
                                                        ;STORE IT IN BCD ASCII
104A CD190A   C                 CALL    FSTOR
104D 110100   E                 LXI     D,FNUMD1+1      ;PRINT THE THREE DIGITS
1050 0603                       MVI     B,03H
1052 CDCB09   C                 CALL    PTXTB1          ;PRINT IN THE FORM .XXX
1055 D21910   C                 JNC     CSERV1
1058 E5                         PUSH    H
1059 3EFD                       MVI     A,-3
105B 210100   E                 LXI     H,FNUMD1+1
105E 320000   E                 STA     DSCALE
1061 3EFF                       MVI     A,0FFH
1063 320100   E                 STA     DSCALE+1
1066 3E03                       MVI     A,03H
1068 CDA612   C                 CALL    D2BB
106B 110000   E                 LXI     D,FNUMD1
106E D5                         PUSH    D
106F CD0000   E                 CALL    FSTOR
1072 110000   E                 LXI     D,SRVRT         ;ADD TWO SERVICE RATE TO GATHER FOR
1075 D5                         PUSH    D               ;CALCULATION IN PRINT JOURNAL ROUTINE
1076 CD0000   E                 CALL    FADD
1079 D1                         POP     D
107A CD0000   E                 CALL    FSTOR
107D D1                         POP     D
107E CD0000   E                 CALL    FLOAD
1081 110000   E                 LXI     D,FNUMF2        ;SERVICE RATE X NET
1084 CD0000   E                 CALL    FMUL
1087 CD0000   E                 CALL    ROUNDR
108A 110000   E                 LXI     D,FNUMF1        ;STORE THE RESULT IN FNUMF1
108D CD0000   E                 CALL    FSTOR
1090 11D101   C   CSERV5:       LXI     D,MSGI
1093 CDAD09   C                 CALL    PNET1
1096 C29C10   C                 JNZ     CSERV9
1099 11DD01   C                 LXI     D,MSGX
109C CD0000   E   CSERV9:       CALL    PMASG
109F 110000   E   CSERV7:       LXI     D,FNUMD1
```

```
LOC  OBJ           SOURCE STATEMENT

10A2 D5                   PUSH  D
10A3 CD0000   E           CALL  ROUNDR
10A6 CD0000   E           CALL  FSTOR
10A9 110000   E           LXI   D,TOTDOC
10AC D5                   PUSH  D
10AD CD0000   E           CALL  FADD
10B0 D1                   POP   D
10B1 CD0000   E           CALL  ROUNDR
10B4 CD0000   E           CALL  FSTOR
10B7 D1                   POP   D
10B8 CD0000   E           CALL  FLOAD
10BB D5                   PUSH  D
10BC 110000   E           LXI   D,SERV       ;ADD NET SERVICE CHARGE FOR CALCULATION IN
10BF D5                   PUSH  D
10C0 CD0000   E           CALL  FADD         ;PRINT JOURNAL ROUTINE
10C3 D1                   POP   D
10C4 CD0000   E           CALL  FSTOR
10C7 D1                   POP   D
10C8 CD0000   E           CALL  FLOAD
10CB 210000   E           LXI   H,FNUMD1
10CE CD0000   E           CALL  B2D1A7
10D1 110000   E           LXI   D,FNUMD1
10D4 CD670B   C           CALL  FRSLT
10D7 110000   E           LXI   D,RUNPR
10DA CD0000   E           CALL  FLOAD
10DD 110000   E           LXI   D,FNUMF1
10E0 CD0000   E           CALL  FSUB
10E3 CD0000   E           CALL  ROUNDR
10E6 110000   E           LXI   D,RUNPR
10E9 CD0000   E           CALL  FSTOR
10EC E1                   POP   H
10ED C31E10   C           JMP   CSERV3
                    ;
                                         ;CSHARE:   ROUTINE TO CALCULATE THE SHARES
                                         ;FOR THE CUSTOMER.
                                         ;HL REGS POINT TO CUST#
                    ;
10F0 C5             CSHARE: PUSH  B
10F1 D5                   PUSH  D
10F2 F5                   PUSH  PSW
10F3 7E                   MOV   A,M          ;RETURN IF CUSTOMER # NOT ENTERED
10F4 EEFF                 XRI   0FFH
10F6 C2FF10   C           JNZ   CSHAR1
10F9 23                   INX   H
10FA 23                   INX   H
10FB 23                   INX   H            ;POINT TO NEXT CUSTOMER
10FC C31E10   C           JMP   CSERV3
10FF 3EF0           CSHAR1: MVI   A,0F0H     ;SET THE SERVICE FLAG THAT THERE IS SHARES
1101 320000   E           STA   SERVFL       ;FOR THE CUSTOMER TO BE USED IN PRINTING
                                             ;SETTLEMENT SHEET
1104 3EFF                 MVI   A,0FFH
1106 320000   E           STA   FLAG1
1109 112701   C           LXI   D,MSGELU     ;PRINT 'SHARES CUST NO:'
110C CD0000   E           CALL  PMASG
110F CD5C0A   C           CALL  PCUSN        ;PRINT CUSTOMER#
1112 3E15                 MVI   A,21
1114 CD0000   E           CALL  SPACE
1117 113B01   C           LXI   D,MSGELY     ;PRINT COMMER.
111A CD0000   E           CALL  PMASG
111D D21910   C           JNC   CSERV1
1120 110100   E           LXI   D,FNUMD2+1   ;STORE THE RATE AT FNUMD2
1123 0E01                 MVI   C,01H
1125 CD1B0A   C           CALL  MSTOR1
1128 13                   INX   D
1129 0602                 MVI   B,02H
112B CDCB09   C           CALL  PTKTB1
112E 11FE01   C           LXI   D,MSGK
1131 CD0000   E           CALL  PMASG
1134 3E20                 MVI   A,32
1136 CD0000   E           CALL  SPACE
1139 0E24                 MVI   C,DOLLAR
113B CD0000   E           CALL  PCHAR
113E F5                   PUSH  H
113F 3EFE                 MVI   A,-02H
1141 320000   E           STA   DSCALE
1144 3E02                 MVI   A,02
1146 210000   E           LXI   H,FNUMD2     ;MULT (SHARE X PRICE)
1149 CDA612   C           CALL  D2BB
114C 110000   E           LXI   D,PRICEF
114F CD0000   E           CALL  FMUL
1152 110000   E           LXI   D,FNUMF1     ;TEMPORARY STORE THE SHARE
1155 CD0000   E           CALL  FSTOR
1158 210000   E           LXI   H,FNUMD1
115B CD0000   E           CALL  B2D1A7
115E 110000   E           LXI   D,FNUMD1     ;PRINT THE CALCULATION
1161 CD670B   C           CALL  FRSLT
1164 110000   E           LXI   D,RUNPR
1167 CD0000   E           CALL  FLOAD
116A 110000   E           LXI   D,FNUMF1
116D CD0000   E           CALL  FSUB
1170 110000   E           LXI   D,RUNPR      ;STORE IT IN RUNNING PRICE
1173 CD0000   E           CALL  ROUNDR
1176 CD0000   E           CALL  FSTOR
1179 E1                   POP   H
117A C31E10   C           JMP   CSERV3
                    ;
                    ;
                                         ;ROUTINE TO CALCULATE THE SHRINK FACTOR
                                         ;FNUMF2 HOLDS NET IN BINARY
                                         ;FNUMF3 HOLDS % MOISTURE IN BINARY
117D C5             SRNKR:  PUSH  B
117E D5                   PUSH  D
117F E5                   PUSH  H
1180 F5                   PUSH  PSW
1181 3E07                 MVI   A,7
```

```
LOC  OBJ         LINE         SOURCE STATEMENT

1183 CD0000   E  2054         CALL    SPACE
1186 114502   C  2055         LXI     D,MSGT
1189 CD0000   E  2056         CALL    PMASG
118C 010000   E  2057         LXI     B,FPR
118F 110000   E  2058         LXI     D,FNUMF3     ;BRING THE (MOISTURE - CUSTOMER % MOISTURE)
1192 CD0000   E  2059         CALL    FLOAD
1195 210000   E  2060         LXI     H,FNUMD3     ;CONVERT IT TO BCD
1198 3E04        2061         MVI     A,04H
119A CDCF12   C  2062         CALL    B2D1A
119D 3A0000   E  2063         LDA     DSIGN        ;CHECK THE SIGN
11A0 FE2B        2064         CPI     PLUS         ;IS IT POSITIVE
11A2 CA3112   C  2065         JZ      SRNKR1       ;DO NOT CALCULATE SHRINKAGE IF POSITIVE
11A5 CD3A07   C  2066         CALL    DIV100
11A8 010000   E  2067         LXI     B,FPR
11AB 110000   E  2068         LXI     D,FNUMD1
11AE CD0000   E  2069         CALL    FSTOR
11B1 110000   E  2070         LXI     D,FNUMF3     ;LOAD THE DIFFERENCE
11B4 CD0000   E  2071         CALL    FLOAD
11B7 CD0000   E  2072         CALL    FABS
11BA 110000   E  2073         LXI     D,FNUMD1     ;DIVIDE BY 100 IN BINARY
11BD CD0000   E  2074         CALL    FDIV
11C0 110000   E  2075         LXI     D,FNUMF3     ;STORE THAT NO. INTO FNUMF3
11C3 CD0000   E  2076         CALL    FSTOR        ;
11C6 3A0000   E  2077         LDA     SCOMN        ;BRING COMMODITY NO.
11C9 4F          2078         MOV     C,A
11CA CD0000   E  2079         CALL    CMDADF       ;FIND THE ADDRESS FOR THAT COMMODITY
11CD 0E82        2080         MVI     C,SHRFAC     ;BRING THE SHRINK FACTOR
11CF CD0000   E  2081         CALL    CMDOSF
11D2 110300   E  2082         LXI     D,FNUMD1+3
11D5 CD190A   C  2083         CALL    MSTOR        ;STORE THE SHRINK FACTOR AT FNUMD1
11D8 210000   E  2084         LXI     H,FNUMD1
11DB CDBE12   C  2085         CALL    D2B2         ;CONVERT IT TO BINARY
11DE 110000   E  2086         LXI     D,FNUMF3
11E1 CD0000   E  2087         CALL    FMUL         ;SHRINK FACTOR X (MOIST - CUST MOIS)/100
11E4 110000   E  2088         LXI     D,FNUMF3     ;STORE IT AT FNUMF3
11E7 CD0000   E  2089         CALL    FSTOR
11EA AF          2090         XRA     A
11EB 320100   E  2091         STA     DSCALE+1     ;1-ABOVE CALCULATION
11EE 320000   E  2092         STA     DSCALE
11F1 3E31        2093         MVI     A,31H
11F3 320000   E  2094         STA     FNUMD1       ;STORE 01 AT FNUMD1
11F6 3E01        2095         MVI     A,01H
11F8 210000   E  2096         LXI     H,FNUMD1     ;CONVERT 1 TO BINARY
11FB CDA612   C  2097         CALL    D2BB
11FE 110000   E  2098         LXI     D,FNUMF3
1201 CD0000   E  2099         CALL    FSUB
1204 110000   E  2100         LXI     D,FNUMF2
1207 CD0000   E  2101         CALL    FMUL         ;MULTIPLY BY NET
120A CD0000   E  2102         CALL    FABS
120D 110000   E  2103         LXI     D,FNUMF2
1210 CD0000   E  2104         CALL    FSTOR
1213 010000   E  2105 SRNKR4: LXI     B,FPR
1216 CD0000   E  2106         CALL    ROUNDR
1219 110000   E  2107         LXI     D,NETBU      ;STORE NET BU IN BINARY FOR FUTURE
121C CD0000   E  2108         CALL    FSTOR        ;CALCULATION IN PRINT JOURNAL ROUTINE
121F 210000   E  2109         LXI     H,FNUMD1     ;CONVERT NET INTO BCD
1222 CD0000   E  2110         CALL    B2D1A7
1225 CD0000   E  2111         CALL    CONSAL
1228 DA0000   E  2112         JC      STRET
122B CD9109   C  2113         CALL    PNETC
122E C30000   E  2114         JMP     STRET
                 2115 ;
1231 110000   E  2116 SRNKR1: LXI     D,FNUMF2
1234 010000   E  2117         LXI     B,FPR
1237 CD0000   E  2118         CALL    FLOAD
123A C31312   C  2119         JMP     SRNKR4
                 2120 ;
123D C5          2121 PRJRA:  PUSH    B
123E D5          2122         PUSH    D
123F E5          2123         PUSH    H
1240 F5          2124         PUSH    PSW
1241 3600        2125         MVI     M,00H
1243 EB          2126         XCHG
1244 0EFF        2127         MVI     C,0FFH
1246 112600      2128         LXI     D,0038
1249 CD0000   E  2129         CALL    SMLR
124C C30000   E  2130         JMP     STRET
                 2131 ;
                 2132 ;
                 2133 ;
                 2134                          ;ROUTINE TO PRINT THE WEIGHT OR PRICE
                 2135                          ;IN THE FORM XX.XX
                 2136                          ;REG. D HAS THE ADDRESS FOR THE NO.
                 2137 ;
124F C5          2138 PTSTWT: PUSH    B
1250 D5          2139         PUSH    D
1251 E5          2140         PUSH    H
1252 F5          2141         PUSH    PSW
1253 1A          2142         LDAX    D
1254 EE30        2143         XRI     30H          ;IS M.S.B. ZERO
1256 CA7912   C  2144         JZ      PTSWT3
1259 0604        2145         MVI     B,04H
125B 1A          2146 PTSWT1: LDAX    D
125C 4F          2147         MOV     C,A
125D CD0000   E  2148         CALL    PCHAR
1260 D23C03   C  2149         JNC     CLRCY
1263 13          2150         INX     D
1264 05          2151         DCR     B
1265 CA3603   C  2152         JZ      SETCY
1268 3E02        2153         MVI     A,02H
126A A8          2154         XRA     B
126B C25B12   C  2155         JNZ     PTSWT1
126E 0E2E        2156 PTSWT2: MVI     C,PERIOD     ;PUT PERIOD IF IT IS SECOND DIGIT
1270 CD0000   E  2157         CALL    PCHAR
```

```
LOC  OBJ              SOURCE STATEMENT

1273 D23C03   C              JNC     CLRCY
1276 C35B12   C              JMP     PTSWT1
1279 0E20            PTSWT3: MVI     C,ASF
127B CD0000   E              CALL    PCHAR
127E D23C03   C              JNC     CLRCY
1281 13                      INX     D
1282 0603                    MVI     B,03H
1284 C35B12   C              JMP     PTSWT1
                     ;
                     ;
1287 CD190A   C      MSTORB: CALL    MSTOR
128A 7E                      MOV     A,M
128B E60F                    ANI     0FH
128D C630                    ADI     30H
128F 12                      STAX    D
1290 23                      INX     H
1291 C9                      RET
                     ;
                     ;
1292 CDC309   C      PLBSR:  CALL    PTXTB            ;PRINT THE DIGIT
1295 D0                      RNC
1296 110703   C              LXI     D,PLBS
1299 CD0000   E              CALL    PMASG
129C C9                      RET
                     ;
                     ;
129D AF              D2B1:   XRA     A                ;ROUTINE TO SET THE CONTROL TABLE FOR
129E 320000   E              STA     DSCALE           ;BCD TO BIUNARY CONVERSION
12A1 320100   E              STA     DSCALE+1
12A4 3E05                    MVI     A,05H
12A6 320000   E      D2BB:   STA     DLNGTH
12A9 3E2B                    MVI     A,PLUS
12AB 320000   E              STA     DSIGN
12AE 220000   E              SHLD    DADDR
12B1 110000   E              LXI     D,DSIGN
12B4 010000   E              LXI     B,FPR
12B7 CD0000   E              CALL    FQFD2B
12BA 010000   E      D2BA:   LXI     B,FPR
12BD C9                      RET
                     ;
                     ;
12BE 3EFE            D2B2:   MVI     A,-2
12C0 320000   E      D2BC:   STA     DSCALE
12C3 3EFF                    MVI     A,0FFH
12C5 320100   E              STA     DSCALE+1
12C8 3E04                    MVI     A,04H
12CA C3A612   C              JMP     D2BB
                     ;
                     ;
12CD 3E05            B2D1:   MVI     A,05H
12CF 320000   E      B2D1A:  STA     DLNGTH
12D2 220000   E              SHLD    DADDR
12D5 110000   E              LXI     D,DSIGN
12D8 010000   E              LXI     B,FPR
12DB CD0000   E              CALL    FQFB2D
12DE C3BA12   C              JMP     D2BA
                     ;
                     ;;;;;;;;;;;;;;;;;;;;;;;;;;;;;;;;;;;;;;;;;;;;;;;;;;;;;;;;;;;;;;;;;;;;;;;;;;;
                     ;
                     ;                PRINT LOCK ROUTINE
                     ;                PRINTS N TICKETS (N<10)
                     ;                AND SUPPRESSES $.CENTS IF PRLOCK
                     ;                FLAG BIT 7 = 1
                     ;                THE NUMBER OF COPIES IS CONTAINED
                     ;                IN PRLOCK BITS 3 THRU 0
                     ;
                     ;;;;;;;;;;;;;;;;;;;;;;;;;;;;;;;;;;;;;;;;;;;;;;;;;;;;;;;;;;;;;;;;;;;;;;;;;;;
                     ;
12E1 3A0000   E      PRLR:   LDA     PRLOC0           ;COUNT FOR MANUAL ENTERIES
12E4 E60F                    ANI     0FH
12E6 C2EF12   C              JNZ     PRLR1
12E9 3A0000   E              LDA     PRLOCK           ;COUNT FOR AUNTOMATIC ENTERIES
12EC E60F                    ANI     0FH
12EE C8                      RZ
12EF F5              PRLR1:  PUSH    PSW              ;SAVE TICKET COUNTER
12F0 CD6713   C              CALL    HEADG
12F3 3E1F                    MVI     A,1FH            ;MASK FOR DOCKAGES
12F5 A6                      ANA     M                ;DOCKAGE MASK IN A
12F6 FE1F                    CPI     1FH              ;ALL DOCKAGES IN?>
12F8 06FF                    MVI     B,0FFH
12FA C23213   C              JNZ     PRLR6            ;IF NOT, NO MORE HEADINGS
12FD 3E60                    MVI     A,60H            ;HANDLING OPTION MASK
12FF A6                      ANA     M                ;MASK IN A
1300 06FF                    MVI     B,0FFH
1302 C24C13   C              JNZ     PRLR7            ;NOT A "SELL"
1305 EB              PRLR2:  XCHG
1306 E5                      PUSH    H
1307 011E00                  LXI     B,30
130A 09                      DAD     B                ;OFFSET TO PRICE BYTE
130B 06FF                    MVI     B,0FFH
130D 7E                      MOV     A,M
130E FEFF                    CPI     0FFH             ;PRICE ENTERED?
1310 CA3013   C              JZ      PRLR5            ;IF NOT, NO MORE HEADINGS
1313 2B                      DCX     H                ;ORIGINAL FLAG
1314 7E              PRLR3:  MOV     A,M
1315 E601                    ANI     01H              ;ORIGINAL PRINTED YET?
1317 D5                      PUSH    D
1318 CA5A13   C              JZ      PRLR8            ;IF SO, PRINT "COPY"
131B 3E1D                    MVI     A,29
131D CD0000   E              CALL    SPACE
1320 112B03   C              LXI     D,MORGIN         ;"ORIGINAL"
1323 7E                      MOV     A,M
1324 E6FE                    ANI     11111110B        ;SET BIT FOR ORIGINAL
1326 77                      MOV     M,A
```

```
LOC  OBJ          LINE        SOURCE STATEMENT

1327 AF           2262          XRA    A
1328 CD0000   E   2263 PRLR4:   CALL   PMASG
132B 47           2264          MOV    B,A
132C CD0000   E   2265          CALL   GOVMSG         ;LONG OFFICIAL MESSAGE
132F D1           2266          POP    D
1330 E1           2267 PRLR5:   POP    H
1331 EB           2268          XCHG
1332 3EFF         2269 PRLR6:   MVI    A,0FFH
1334 320000   E   2270          STA    PRESFL
1337 CD4103   C   2271          CALL   PTIKT          ;BODY OF TICKET
133A AF           2272          XRA    A
133B 320000   E   2273          STA    PRESFL
133E 78           2274          MOV    A,B
133F B7           2275          ORA    A
1340 CC7613   C   2276          CZ     ADDNTA
1343 CD0000   E   2277          CALL   MFORM
1346 F1           2278          POP    PSW            ;TICKET COUNTER
1347 3D           2279          DCR    A
1348 C2EF12   C   2280          JNZ    PRLR1          ;IF NOT DONE, REPEAT
134B C9           2281          RET
134C FE40         2282 PRLR7:   CPI    40H            ;CONTRACT?
134E CA0513   C   2283          JZ     PRLR2          ;IF SO, REJOIN LOOP
1351 EB           2284          XCHG
1352 E5           2285          PUSH   H
1353 011D00       2286          LXI    B,29
1356 09           2287          DAD    B              ;OFFSET TO ORIGINAL FLAG
1357 C31413   C   2288          JMP    PRLR3          ;AND REJOIN LOOP
135A 3E1E         2289 PRLR8:   MVI    A,30
135C CD0000   E   2290          CALL   SPACE
135F 112403   C   2291          LXI    D,MCOPY
1362 3EFF         2292          MVI    A,0FFH
1364 C32813   C   2293          JMP    PRLR4
                  2294 ;
1367 D5           2295 HEADG:   PUSH   D              ;ROUTINE PRINTS THE HEADING
1368 CD0000   E   2296          CALL   HEADG1         ;PRINT NAME
136B CD0000   E   2297          CALL   HEADG2         ;PRINT ADDRESS
136E CD0000   E   2298          CALL   HEADG3         ;PRINT TELEPHONE NO.
1371 CD0000   E   2299          CALL   PRDTR          ;AND CURRENT TIME
1374 D1           2300          POP    D
1375 C9           2301          RET
                  2302 ;
                  2303 ;
1376 C5           2304 ADDNTA:  PUSH   B
1377 D5           2305          PUSH   D
1378 E5           2306          PUSH   H
1379 F5           2307          PUSH   PSW
137A 3A0000   E   2308          LDA    SELLFL         ;CHECK IF THE CUSTOMER IS SELLING TO
137D B7           2309          ORA    A              ;ELEVATOR
137E C2D313   C   2310          JNZ    ADDNT1
1381 CD3214   C   2311          CALL   ADDMST
1384 110000   E   2312          LXI    D,NETCMG       ;ADD GROSS BUSHELS TO BINS
1387 CD0000   E   2313          CALL   ADJPTR
138A D5           2314          PUSH   D
138B 010000   E   2315          LXI    B,FPR
138E CD0000   E   2316          CALL   FLOAD
1391 110000   E   2317          LXI    D,GROSBU
1394 CDD913   C   2318          CALL   ADDNT3
1397 D1           2319          POP    D
1398 CD0000   E   2320          CALL   FSTOR
139B 3A0000   E   2321          LDA    MSTSTA
139E B7           2322          ORA    A
139F C2D313   C   2323          JNZ    ADDNT1
13A2 210000   E   2324          LXI    H,MOISTF       ;BRING THE MOISTURE
13A5 CDBE12   C   2325          CALL   D2B2           ;CONVERT IT TO BINARY
13A8 110000   E   2326          LXI    D,FNUMF2
13AB CD0000   E   2327          CALL   FMUL           ;MOISTURE X NET BU
13AE 110000   E   2328          LXI    D,NETAMS       ;ADD IT TO NETAMS
13B1 CD0000   E   2329          CALL   ADJPTR
13B4 D5           2330          PUSH   D
13B5 CDD913   C   2331          CALL   ADDNT3
13B8 D1           2332          POP    D              ;STORE BACK NETAMS
13B9 CD0000   E   2333          CALL   FSTOR
13BC 010000   E   2334          LXI    B,FPR
13BF 110000   E   2335          LXI    D,FNUMF2
13C2 CD0000   E   2336          CALL   FLOAD
13C5 110000   E   2337          LXI    D,NETAMG
13C8 CD0000   E   2338          CALL   ADJPTR
13CB D5           2339          PUSH   D
13CC CDD913   C   2340          CALL   ADDNT3
13CF D1           2341          POP    D
13D0 CD0000   E   2342          CALL   FSTOR
13D3 CDEE13   C   2343 ADDNT1:  CALL   ADDNET
13D6 C30000   E   2344          JMP    STRET
                  2345 ;
13D9 3A0000   E   2346 ADDNT3:  LDA    DTRFL
13DC B7           2347          ORA    A
13DD CAE713   C   2348          JZ     ADDNT4
13E0 CD0000   E   2349          CALL   FSUB
13E3 CD0000   E   2350          CALL   ROUNDR
13E6 C9           2351          RET
13E7 CD0000   E   2352 ADDNT4:  CALL   FADD
13EA CD0000   E   2353          CALL   ROUNDR
13ED C9           2354          RET
                  2355 ;
                  2356 ;
13EE C5           2357 ADDNET:  PUSH   B              ;ROUTINE TO ADD THE WT. INTO NET WT
13EF D5           2358          PUSH   D
13F0 E5           2359          PUSH   H
13F1 F5           2360          PUSH   PSW
13F2 3A0000   E   2361          LDA    SELLFL         ;CHECK IF ELEVATOR IS SELLING TO CUSTOMER
13F5 B7           2362          ORA    A
13F6 C21814   C   2363          JNZ    ADNET0
13F9 110000   E   2364          LXI    D,NETCMB
```

```
LOC  OBJ              SOURCE STATEMENT

13FC 3A0000   E               LDA    STATUS
13FF E603                     ANI    03H
1401 CA1B14   C               JZ     ADNET1
1404 110000   E               LXI    D,NETCMS
1407 3D                       DCR    A
1408 CA1B14   C               JZ     ADNET1
140B 110000   E               LXI    D,NETCMC
140E 3D                       DCR    A
140F CA1B14   C               JZ     ADNET1
1412 110000   E               LXI    D,NETCMD
1415 C31B14   C               JMP    ADNET1
1418 110000   E       ADNET0: LXI    D,NETCMT
141B CD0000   E       ADNET1: CALL   ADJPTR
141E D5                       PUSH   D
141F 010000   E               LXI    B,FPR
1422 CD0000   E               CALL   FLOAD
1425 110000   E               LXI    D,NETBU
1428 CDD913   C               CALL   ADDNT3
142B D1                       POP    D
142C CD0000   E               CALL   FSTOR
142F C30000   E               JMP    STRET
                      ;
                      ;
                                            ;ROUTINE ADDS MOISTURE DOCKAGE IN DOLLAR
                                            ;TO NETMST
                                            ;FNUMF1 HAS THE BINARY VALUE OF AMMOUNT
1432 C5               ADDMST: PUSH   B
1433 D5                       PUSH   D
1434 E5                       PUSH   H
1435 F5                       PUSH   PSW
1436 010000   E               LXI    B,FPR
1439 110000   E               LXI    D,NETMST
143C CD0000   E               CALL   ADJPTR
143F D5                       PUSH   D
1440 CD0000   E               CALL   FLOAD
1443 110000   E               LXI    D,MSTAMT       ;ADD THE MOISTURE AMOUNT
1446 CDD913   C               CALL   ADDNT3         ;ADD TO NETMST
1449 D1                       POP    D
144A CD0000   E               CALL   FSTOR          ;STORE BACK THE NET MOIST
144D C30000   E               JMP    STRET
                      ;
                      ;
1450 C5               MSTAVG: PUSH   B              ;ACCUMULATOR HAS THE COMMODITY NO.
1451 D5                       PUSH   D
1452 E5                       PUSH   H
1453 F5                       PUSH   PSW
1454 3D                       DCR    A
1455 07                       RLC                   ;FOUR BYTES FOR EACH COMMODITY
1456 07                       RLC
1457 6F                       MOV    L,A
1458 2600                     MVI    H,00H
145A 220000   E               SHLD   DSTOR0
145D 110000   E               LXI    D,NETAMG
1460 CD9E14   C               CALL   MSTAV1
1463 0604                     MVI    B,04H
1465 1A               MSTAV3: LDAX   D
1466 B7                       ORA    A
1467 C27D14   C               JNZ    MSTAV2
146A 13                       INX    D
146B 05                       DCR    B
146C C26514   C               JNZ    MSTAV3
146F 0E00                     MVI    C,0
1471 110400                   LXI    D,04
1474 210000   E               LXI    H,NETAVG
1477 CD0000   E               CALL   SMLR
147A C30000   E               JMP    STRET
147D 010000   E       MSTAV2: LXI    B,FPR
1480 110000   E               LXI    D,NETAMS
1483 CD9E14   C               CALL   MSTAV1
1486 CD0000   E               CALL   FLOAD
1489 110000   E               LXI    D,NETAMG
148C CD9E14   C               CALL   MSTAV1
148F CD0000   E               CALL   FDIV
1492 CD0000   E               CALL   ROUNDR
1495 110000   E               LXI    D,NETAVG
1498 CD0000   E               CALL   FSTOR
149B C30000   E               JMP    STRET
149E 2A0000   E       MSTAV1: LHLD   DSTOR0
14A1 19                       DAD    D
14A2 EB                       XCHG
14A3 C9                       RET
                      ;
                      ;              DESCRIPTION OF THE ROUTINE WRITTEN IN THIS PROGRAMME
                      ;
                      ;PCHAR: PRINT CHARACTER ROUTINE
                      ;       CHARACTER TO BE PRINTED OUT IS PASSED IN REG. C
                      ;       SAVES ALL REGISTERS
                      ;       CARRY IS SET IF SUCCESSFUL IN PRINTING
                      ;
                      ;
                      ;PMASG: PRINT MESSAGE ROUTINE
                      ;       ADDRESS OF THE MESSAGE TO BE PRINTED OUT IS PASSED IN REG. D
                      ;       SAVES ALL REGISTERS
                      ;       CARRY IS SET IF SUCCESSFUL IN PRINTING
                      ;       END OF THE MESSAGE SHOULT HAVE AETX
                      ;
                      ;
                      ;PTIKT: PRINT TICKET ROUTINE
                      ;       PRINTS OUT THE TRANSACTION ROUTINE
                      ;       REG H & L HAS THE ADDRESS OF THE STATUS BYTE FOR THE CUSTOMER
                      ;       RET D & E HAS TO ADDRESS OF BUFFER FOR THAT CUSTOMER
                      ;
                      ;
                      ;CLRMEM:       CLEAR MEMORY ROUTINE
```

```
LOC   OBJ      LINF      SOURCE STATEMENT

;        ROUTINE CLEARS THE RUNPRICE AND TOTAL DOCKAGE CHARGE MEMORY
;        LOCATIONS
;
;
;PTOTAL:          PRINT TOTAL ROUTINE
;        ROUTINE PRINTS THE NO. FROM RUNNING PRICE MEMORY LOCATION
;        AND PRINTS THE DIGITS OUT.
;
;
;PFORMA:          PRINT FORM A OF THE TICKET
;        REG H & L HAS THE ADDRESS OF BUFFER FOR THAT CUSTOMER
;        RET D & E HAS THE ADDRESS OF STATUS FOR THAT CUSTOMER
;        ROUTINE PRINTS OUT THE 1ST PART OF THE TICKET
;        UP TO TYPE OF TRANSACTION
;
;
;PFORMB:          PRINT FORM B OF THB TICKET
;        FORMAT OF THE REGISTER SAME AS PFORMA
;        PRINTS OUT THE 2ND PART OF THE TICKET
;        UP TO STANDARD WEIGHT
;
;
;PNET:   PRINT NET OF THE TICKET
;        FORMAT OF THE REGISTER SAME AS PFORMA
;        PRINTS OUT THE 3RD PART OF THE TICKET
;        UP TO NET WEIGHT AND CALCULATES THE PRICE ON NET BUSHELS
;
;
;ACRR:   ASCII CARRIAGE ROUTINE
;        ACCUMULATOR HAS THE NO. OF CARRIAGE RETURN TO BE GIVEN
;        ALL REGISTER ARE SAVED
;
;
;PNET1:  PRINT NET ROUTINE (SERVICE ROUTINE USED IN PNET)
;        ROUTINE CHECKS THE STATUS OF THE COMMODITY
;        I.E. WHETHER THE COMMODITY IS IN BUSHELS OR HUNDREDWEIGHT
;        COMMODITY NO. IS PASSED IN SCOMN (STORE COMMODITY NO.) LOCATION
;        ROUTINE WILL RETURN ZERO FLAG SET IF COMMODITY IS IN HUNDREDWEIGHT
;        ALL REGISTERS ARE SAVED
;
;
;PTKTB:  PRINTS FIVE CONSECUTIVE DIGITS
;        ADDRESS PASSED IN REGISTER D DIGITS SHOULD BE BCD ASCII
;        WILL LEAVE SPACE IF MOST SIGNIFICANT DIGITS ARE ZERO
;        THIS FORMAT IS USED IN PRINTING WEIGHT IN AND WEIGHT OUT
;        AND TARE WEIGHT IN LBS.
;
;
;PTKTF:  PRINTS OUT 5 DIGITS
;        DSCALE HAS THE SCALE
;        ADDRESS IS PASSED IN REG. D
;
;
;MSTOR:  MEMORY STORE  THE ROUTINE
;        REG. D & E HAS THE END LOCATION OF THE STORAGE
;        REG H & L HAS THE NO. TO BE STORED (PACKED BCD)
;        L.S.B IN 1ST BYTE AND M.S.B. IN 2ND BYTE
;        ROUTINE UNPACKS THE BCD DIGITS AND CONVERTS IT TO
;        ASCII DIGITS
;        ROUTINE HANDLES 2BYTE OF BCD DIGITS
;        FOR EXAMPLE IF YOU HAVE GOT BCD PACKED NO. AT LOCATION
;        X1 AND X2 AND YOU WANT TO STORE THE DIGITS IN ASCII AT
;        LOCATION Y1,Y2,Y3,Y4
;        PASS THE ADD. Y4 IN REG. D AND
;        PASS THE ADD. X1 IN REG. H
;        M.S. DIGITS WILL BE STORED AT LOCATION Y1
;
;
;PERR:   PRINT ERROR ROUTINE
;        ROUTINE DISPLAYS THE ERROR ON DISPLAY
;        SAVES ALL REGISTERS
;
;
;PDIG:   PRINT DIGIT ROUTINE CONVERTS BCD
;        TO ASCII CODE AND THEN PRINTS
;        HL REGS. HOLDS THE STARTING ADDRESS OF THE DIGIT
;        TO BE PRINTED
;
;
;PCUSN:  PRINT CUSTOMER NO. ROUTINE
;        PASS THE STARTING ADDRESS OF NO. IN REG H & L
;        THE NO. IS IN BCD PACKED IN TWO CONSECUTIVE LOCATIONS IN MEMORY
;
;
;CDOCK:  CALCUATE DOCKAGE ROUTINE
;        PARAMETER PASSED
;        FNUMD1: UNIT RATE FOR DOCKAGES IN BCD
;        FNUMD2: % DOCKAGE FROM BUFFER IN BCD
;        FNUMF1: TEMPORARY STORAGE
;        FNUMF2: NET IN BINARY
;        ROUTINE ALSO PRINTS OUT THE RESULT
;
;
;PRSLT:  PRINT RESULT ROUTINE
;        ROUTINE TO PRINT THE PRICE IN FORM XXXX.XX
;        REG. D POINTS TO STARTING LOCATION OF BCD NO. IN ASCII
;        THE EXPONENT OF NO. IS IN DSCALE
;        CAN HANDLE 9 DIGITS BEFORE DECIMAL POINT
;
;
;PFORMC:          PRINT FORM C OF THE TICKET
;        SAME FORMAT AS PFORMA FOR REG.
;        CALCULATES ALL DOCKAGES AND PRINTS OUT IN TICKET FORMAT
```

```
LOC  OBJ        LINE        SOURCE STATEMENT

                            ;
                            ;
                            ;DSC:    SERVICE ROUTINE
                            ;
                            ;
                            ;CSERV:  ROUTINE TO CALCULATE THE SHARES
                            ;        PART OF THE PTIKT ROUTINE
                            ;        REG. FORMAT SAME AS PFORMA
                            ;
                            ;
                            ;CSHARE:         CALCULATE SHARE ROUTINE
                            ;        ROUTINE TO CALCULATE THE SHARES FOR THE CUSTOMER
                            ;        AND PRINTS OUT IN TICKET FORMAT
                            ;
                            ;
                            ;SRNKR:  CALCULATE SHRINK ROUTINE
                            ;        ROUTINE TO CALCULATE THE SHRINK FACTOR
                            ;        ALL REGISTER ARE SAVED
                            ;        SERVICE ROUTINE FOR PTIKT
                            ;PTSTWT:PRINT TEST WEIGHT ROUTINE
                            ;        SAVES ALL REGISTER
                            ;        ROUTINE PRINTS THE DIGITS IN THE FORM XX.XX
                            ;        STARTING LOCATION OF NO. IS PASSED IN REGISTER D
                            ;
                            ;
                            ;D2B1:   ROUTINE TO SET THE CONTROL TABLE FOR BCD TO BINARY
                            ;        CONVERSION
                            ;        DSCALE & DSCALE+1 =00,
                            ;        DLNGTH = 05
                            ;        DSIGN = PLUS
                            ;D2BB:   PART OF D2B1
                            ;        YOU HAVE TO SPECIFY DSCALE,DSCALE+1 AND DLNGTH
                            ;D2B2:   DECIMALE TO BINARY CONVERSION WITH A
                            ;        DSCALE = -2, DLNGTH = 4
                            ;B2D1:   BINARY TO DECIMAL CONVERSION
                            ;        DLNGTH =5
                            ;
                            ;
                            ;PRLR:   PRINT LOCK ROUTINE
                            ;        PRINTS THE TICKET  WITH HEADING AND GOVERNMENT MESSAGE
                            ;
                            ;
                            ;HEADG:  PRINT HEADING OF THE TICKET
                            ;        PRINTS THE NAME OF THE ELEVATIOR AND DATE AND TIME
                            ;        ALL REGISTERS ARE SAVED
                            ;
                            ;
                            ;ADDNTA:         ADD NET ROUTINE
                            ;        ADDS MOISTURE AND NET BUSHELS
                            ;
                            ;ADDNET:         ADD ALL NET BU
                            ;        ROUTINE CALLED BY PRINT LOCK ROUTINE
                            ;        WHEN ORGINAL TICKET IS PRINTED IT ADDS ALL NET BUSHELS
                            ;
                            ;
                            ;MSTAVG:         ADD MOISTURE TO CALCULATE AVERAGE MOISTURE INTAKE
                            ;        ROUTINE CALLED BY CMOIST.
                            ;        ADDS THE MOISTURE IN AVERAGE MOISTURE BIN.
                                     END

PUBLIC SYMBOLS
ACRR   C 0908  ADDNTA C 1376  B2D1   C 12CD  B2D1A  C 12CF  D2B1   C 129D  D2B2   C 12BE  D2BB   C 12A6
D2BC   C 12C0  HEADG  C 1367  MACR   C 05A6  MASGB  C 0008  MCMTB1 C 0000  MSGELB C 0056  MSGELC C 0066
MSGJ   C 01F5  MSTAVG C 1450  MSTOR  C 0A19  MSTOR1 C 0A1B  MSTORB C 1267  FCUSN  C 0A5C  FDIGA  C 0A44
PDIGB  C 0A52  PDOCK  C 04B3  PFORMA C 04CD  PFORMB C 05BB  PNET1  C 09AD  PRJRA  C 123D  PRLR   C 12E1
FRNTWT C 0A8D  PRSLT  C 0B67  PRSLTA C 0P6D  PTIKT  C 0341  PTKTB1 C 09CP  PTKTB4 C 09C5  PTKTF  C 09E6
PTSTWT C 124F

EXTERNAL SYMBOLS
ADJPTR E 0000  B2D1A7 E 0000  BASEPR E 0000  CMDADF E 0000  CMDFLT E 0000  CMDOSF E 0000  CMSTAT E 0200
CONSA  E 0000  CONSAL E 0000  CRAM   E 0000  CUFIND E 0000  DADDR  E 0000  DESTOR E 0000  DIM11  E 0000
DIM27  E 0000  DISCNT E 0000  DLNGTH E 0000  DLYR   E 0000  DMGFL  E 0000  DSCALE E 0000  DSIGN  E 0000
DSTOR0 E 0000  DTRFL  E 0000  ERDIS  E 0000  FABS   E 0000  FADD   E 0000  FCMFR  E 0000  FDIV   E 0000
FLAG1  E 0000  FLAG2  E 0000  FLOAD  E 0000  FMFL   F 0000  FMUL   E 0000  FNUMD1 E 0000  FNUMD2 E 0000
FNUMD3 E 0000  FNUMF1 E 0000  FNUMP2 E 0000  FNUMF3 E 0000  FPR    E 0000  FQFB2D E 0000  FQFD2B E 0000
FSTOR  E 0000  FSUB   E 0000  GOVMSG E 0000  GROSBU E 0000  GRSCMB E 0000  GRSCMC E 0000  GRSCMD E 0000
GRSCMS E 0000  GRSCMT E 0000  GRSDOL E 0000  HEADG1 E 0000  HEADG2 E 0000  HEADG3 E 0000  KEYIN  E 0000
LASTKY E 0000  LINEFL E 0000  MCMTAB E 0000  MFORM  E 0000  MOISTF E 0000  MSGA19 E 0000  MSTAMT E 0000
MSTFL  E 0000  MSTMIN E 0000  MSTSTA E 0000  NETAMG E 0000  NETAMS E 0000  NETAVG E 0000  NETBU  E 0000
NETCMB E 0000  NETCMC E 0000  NETCMD E 0000  NETCMG E 0000  NETCMS E 0000  NETCMT E 0000  NETMST E 0000
NETWT  E 0000  OFFFI  F 0000  PCHAR  E 0000  PCMNAM E 0000  PERRFL E 0000  PMASG  E 0000  PRDTR  E 0000
PRESFL E 0000  PRGM7  E 0000  PRICEF E 0000  PRINTR E 0000  PRJRC  E 0000  PRJRFL E 0000  PRLOC0 E 0200
PRLOCK E 0000  PRNTJR E 0000  PWRFL  E 0000  ROUNDR E 0000  RUNFR  E 0000  SCOMN  E 0000  SELLFL E 0000
SERV   E 0000  SERVFL E 0000  SHORTF E 0000  SMLR   E 0000  SPACE  E 0000  SRNKFL E 0000  SRVRT  E 0000
STATUS E 0000  STRET  E 0000  STRETM E 0000  TOTDOC E 0000  TRANFL E 0000  TRAPR  E 0000  TRNCTR E 0000
TWFL   E 0000

USER SYMBOLS
ACR    A 000D  ACRR   C 0908  ACRR1  C 0909  ADDMST C 1432  ADDNET C 13EE  ADDNT1 C 13D3  ADDNT3 C 13D9
ADDNT4 C 13E7  ADDNTA C 1376  ADJPTR E 0000  ADNFT0 C 1418  ADNET1 C 141B  AETX   A 0003  ASP    A 0020
B2D1   C 12CD  B2D1A  C 12CF  B2D1A7 E 0000  BASEPR E 0000  CDOCK  C 0A96  CDOCK2 C 0AD3  CDOCK3 C 0AE6
CDOCK4 C 0AB0  CDOCK5 C 0AB3  CDOCK6 C 0AE0  CDOCK7 C 0AE3  CFM    C 0E39  CFM1   C 0E63  CFM2   C 0EAC
CFM3   C 0ECE  CFM4   C 0F14  CFM5   C 0E58  CFM6   C 0EC3  CFMA   C 0F17  CLRCY  C 033C  CLRMA  C 0491
CLRMA1 C 0494  CLRMEM C 0472  CMDADF E 0000  CMDFLT E 0000  CMDOSF E 0000  CMOIST C 0D93  CMOST1 C 0FAE
CMOST2 C 0FB9  CMOST3 C 0FC8  CMOST4 C 0DEE  CMOST5 C 0E0D  CMOST6 C 0E14  CMOST7 C 0D7C  CMOST8 C 0E31
CMOSTA C 0F87  CMST04 C 0E12  CMSTAT E 0000  COMMER A 0040  CONSA  E 0000  CONSAL E 0000  CRAM   E 0000
CSERV  C 1013  CSERV1 C 1019  CSERV2 C 101B  CSERV3 C 101E  CSERV4 C 1023  CSERV5 C 1090  CSERV6 C 1030
CSERV7 C 109F  CSERV9 C 109C  CSHAR1 C 10FF  CSHARE C 10F0  CUFIND E 0000  D2B1   C 129D  D2B2   C 12BE
D2BA   C 12BA  D2BB   C 12A6  D2BC   C 12C0  DADDR  E 0000  DAMAGE A 0066  DELET  A 0011  DESTOR E 0000
DIM11  E 0000  DIM27  E 0000  DISCNT E 0000  DIV100 C 073A  DLNGTH E 0000  DLYR   E 0000  DMGFL  E 0000
DOLLAR A 0024  DSC    C 0FE4  DSC1   C 0FF4  DSC2   C 100A  DSCA   C 0FE7  DSCALE E 0000  DSIGN  E 0000
DSTOR0 E 0000  DTRFL  E 0000  ERDIS  E 0000  FABS   E 0000  FADD   E 0000  FALSE  A 0000  FCMFR  E 0000
FDIV   E 0000  FLAG1  E 0000  FLAG2  E 0000  FLOAD  E 0000  FM     A 0062  FMA1   C 0F7E  FMFL   E 0000
```

```
LOC  OBJ          LINE      SOURCE STATEMENT

FMUL   E 0000  FNUMD1 E 0000  FNUMD2 E 0000  FNUMD3 E 0000  FNUMF1 E 0000  FNUMF2 E 0000  FNUMF3 E 0000
FPR    E 0000  FQFB2D E 0000  FQFD2B E 0000  FSTOR  E 0000  FSUB   E 0000  GOVMSG E 0000  GROSBU E 0000
GRSCMB E 0000  GRSCMC E 0000  GRSCMD E 0000  GRSCMS E 0000  GRSCMT E 0000  GRSDOL E 0000  HEADG  C 1367
HEADG1 E 0000  HEADG2 E 0000  HEADG3 E 0000  KEYIN  E 0000  LASTKY E 0000  LINEFL E 0000  MACR   C 05A6
MACR1  C 05B4  MASGB  C 0008  MASGC  C 001E  MASGD  C 0024  MASGE  C 002B  MASGF  C 0035  MCMTAB E 0000
MCMTB1 C 0000  MCOPY  C 0324  MFORM  E 0000  MINDMG A 0086  MINFM  A 0087  MINTW  A 0085  MINUS  A 002D
MOIST  A 0067  MOISTA A 0080  MOISTB A 0081  MOISTF E 0000  MORGIN C 032B  MSGA   C 0173  MSGA19 E 0000
MSGB   C 017C  MSGB1  C 0317  MSGC   C 0187  MSGD   C 0192  MSGE   C 01A2  MSGELA C 0040  MSGELB C 0056
MSGELC C 0068  MSGELD C 007C  MSGELE C 008D  MSGELF 0 00A1  MSGELG C 00B5  MSGELH C 00C4  MSGELI C 00D0
MSGELJ C 00D3  MSGELK C 00D8  MSGELL C 00E5  MSGELO C 00EE  MSGELP C 0102  MSGELQ C 010B  MSGELR C 011F
MSGELT C 0124  MSGELU C 0127  MSGELV C 013B  MSGELW C 013F  MSGELX C 015B  MSGELY C 0161  MSGELZ C 0169
MSGF   C 01AF  MSGG   C 01C0  MSGH   C 01C5  MSGI   C 01D1  MSGJ   C 01F5  MSGJ1  C 01FB  MSGK   C 01FE
MSGL   C 0201  MSGM   C 020E  MSGN   C 0219  MSGO   C 0149  MSGQ   C 0227  MSGR   C 0232  MSGS   C 00CB
MSGT   C 0245  MSGV   C 0257  MSGW   C 01E9  MSGX   C 01DD  MSGY   C 028B  MSGZ   C 0277  MSGZZ  C 0260
MSTAMT E 0000  MSTAV1 C 149E  MSTAV2 C 147D  MSTAV3 C 1465  MSTAVG C 1450  MSTFL  E 0000  MSTMIN E 0000
MSTOR  C 0A19  MSTOR1 C 0A1B  MSTORB C 1287  MSTSTA E 0000  NETAMG E 0000  NETAMS E 0000  NETAVG E 0000
NETBU  E 0000  NETCMB E 0000  NETCMC E 0000  NETCMD E 0000  NETCMG E 0000  NETCMS E 0000  NETCMT E 0000
NETMST E 0000  NETWT  E 0000  OFFFL  E 0000  PAPS   C 097D  PRU    C 0312  PCHAR  E 0000  PCMNAM E 0000
PCUSN  C 0A5C  FCUSN2 C 0A6E  FCUSN3 C 0A81  FCUSN4 C 0A6A  FCWT   C 030D  FD2    A 0000  FDIG   C 0A33
PDIG1  C 0A36  PDIG2  C 0A3F  PDIGA  C 0A44  PDIGB  C 0A52  PDOCK  C 04B3  PERCNT A 0025  PERIOD A 002E
PERRFL E 0000  PFMB1  C 05FF  PFMB2  C 060D  PFMBA  C 0723  PFMBA1 C 0737  PFORMA C 04CD  PFORMB C 05BB
PFORMC C 0C21  FFORMD C 0381  FFORME C 03D6  FFRM1  C 05A0  PFRMA1 C 0545  PFRMA2 C 054B  PFRMA3 C 054E
PFRMA4 C 04EE  PFRMA5 C 04EC  PFRMA6 C 0548  PFRMA7 C 0580  PFRMA8 C 0577  FFRMA9 C 0562  FFRMB1 C 0720
PFRMB2 C 05CE  PFRMB3 C 05D4  PFRMB4 C 0636  PFRMB5 C 0630  PFRMB6 C 06D2  PFRMB7 C 0682  FFRMB8 C 0667
PFRMB9 C 0655  PFRMC1 C 0D73  PFRMC2 C 0C46  PFRMC3 C 0C5E  PFRMC4 C 0C29  PFRMD1 C 0383  FFRME1 C 03FE
FLBS   C 0307  FLBSR  C 1292  FLUS   A 002B  PMASG  E 0000  PNAT   C 084A  PNAT17 C 08B0  PNAT18 C 08BA
PNAT19 C 08B7  PNAT2  C 084C  PNAT20 C 08BD  PNAT21 C 0901  FNAT22 C 08C7  FNAT23 C 08C3  FNAT4  C 0869
PNAT6  C 08E5  PNET   C 07BB  PNET1  C 09AD  FNET17 0 0810  PNET16 C 081A  PNET19 C 0817  PNET2  C 07C3
PNET20 C 081D  PNET21 C 0843  PNET23 C 0823  PNET3  C 06ED  PNET4  C 07E0  PNET6  C 0F27  PNETA  C 0914
PNETA1 C 0979  FNETC  C 0991  FNETC1 C 09A6  PNETD  C 0756  FNETD1 C 07B5  FNETD2 C 0787  FNETD3 C 07AE
PNETD4 C 07A1  PNETD5 C 07A4  PNETD6 C 076C  PRDTR  E 0000  PRESFL E 0000  PRGM7  E 0000  PRICE  A 0063
PRICEF E 0000  PRINTR E 0000  PRJRA  C 123D  PRJRC  E 0000  PRJRFL E 0000  PRLOC0 E 0000  PRLOCK E 0000
FRLR   C 12E1  FRLR1  C 12EF  FRLR2  C 1305  FRLR3  C 1314  PRLR4  C 1328  PRLR5  C 1330  PRLR6  C 1332
PRLR7  C 134C  PRLR8  C 135A  PRNTJR E 0000  PRNTWT C 0A8D  PRS2   C 0BEB  FRS3   C 0BD0  FRSB   C 0C11
PRSB1  C 0C1F  PRSC   C 0BF1  PRSC1  C 0BFF  PRSLT  C 0B67  PRSLT1 C 0B8F  PRSLT2 C 0BCA  PRSLT3 C 0BCD
FRSLT4 C 0B7D  PRSLT6 C 0B88  PRSLT7 C 0C01  PRSLT8 C 0C08  PRSLT9 C 0BDF  FRSLTA C 0B6D  PRST11 C 0BB4
PRST12 C 0BA3  PTIKT  C 0341  FTIKT1 C 042E  FTIKT2 C 036D  FTIKT3 C 03D3  FTIKT5 C 0457  FTKTB  C 09C3
PTKTB1 C 09CB  PTKTB3 C 09D8  PTKTB4 C 09C5  PTKTB5 C 09D6  PTKTF  C 09E6  PTKTF1 C 09ED  PTKTF2 C 09F2
PTKTF3 C 0A03  PTKTF4 C 0A04  PTKTF5 C 0A07  PTKTF6 C 09FF  PTCKT1 C 043B  PTOTAL C 049B  PTOTL1 C 049F
FTSTWT C 124F  PTSWT1 C 125B  FTSWT2 C 126E  FTSWT3 C 1279  FWRFL  E 0000  ROUNDR E 0000  RUNPR  E 0000
SCOMN  E 0000  SEGI   A 0004  SEGN   A 0054  SEGP   A 0073  SEGR   A 0050  SEGT   A 0078  SELL   A 0003
SELLFL E 0000  SERV   E 0000  SERVFL E 0000  SETCY  C 0336  SETCY1 C 0338  SFLAG  C 04C5  SFLAG1 C 04C6
SFLAG2 C 04C4  SFLAG3 C 04C3  SFLAG4 C 04BA  SHORTF E 0000  SHRPAC A 0082  SMLR   E 0000  SPACE  E 0000
SRNKFL E 0000  SRNKR  C 117D  SRNKR1 C 1231  SRNKR4 C 1213  SRVRT  E 0000  STATUS E 0000  STRET  E 0000
STRETM E 0000  TESTWT A 0073  TOTDOC E 0000  TRANFL E 0000  TRAPR  E 0000  TRNCTR E 0000  TRUE   A 00FF
TWFL   E 0000

ASSEMBLY COMPLETE,    NO ERRORS
```

```
ISIS-II 8080/8085 MACRO ASSEMBLER, V3.0          MODULE

LOC  OBJ          LINE      SOURCE STATEMENT

                  $DEBUG
                  ;
                  PUBLIC          FOSRCD,FRJDA,FRNTJR,FRJRC,FRJR
                  PUBLIC          ACRLF,PCMNAM,ADJPTR,B2D1A7
                  PUBLIC          ROUNDR,CONSAL,SETGRN,B2D1A9,MSGA19
                  PUBLIC          MSGA4,MSGA5,MHEADG,HEADG1,HEADG2,GOVMSG,HEADG3
                  PUBLIC          SETPT,SETPTA,MPOSR7,PRNTNO
                  ;
                  ;
                  EXTRN           PCHAR,TRNCTR,FDIGA,FDIGB,STRET,PTKTF
                  EXTRN           B2D1,PRNTWT,PTSTWT,PTKTB1,D2BC,FSTOR,FLOAD
                  EXTRN           FNUMD1,FNUMD2,FMUL,FADD,FSUB,CRAM,D2B2
                  EXTRN           FRSLTA,PRJRA,MACR,FLAG2,FPR,B2D1A,PRDTR
                  EXTRN           MSGJ,LASTKY,KEYIN,PRSLT,SPACE,DSIGN
                  EXTRN           MCPRG,MTW,MFM,MDAMG,MTRDEL,FNUMD
                  EXTRN           MCMTAB,PMASG,CMDADF,CMDOSF,MSTOR,SCOMN
                  EXTRN           PRJRFL,CUFIND,MASGB,FRGM7,MSGELB,DDOT
                  EXTRN           PCUSN,OFFFL,PTIKT,PNET1,HEADG
                  EXTRN           NETCMG,NETCMT,NETCMS,NETCMB,SMLR,KRAM
                  EXTRN           NETCMC,NETCMD,GRSSTK,WRLISS,WRLCAN,WRLOUT
                  EXTRN           OSLDEC,OSLTOT,WOGTOT,WOGINC,MSTOR1
                  EXTRN           MKRAM,DSCALF,D2BB,WOGDEC
                  EXTRN           TRANFL,NETWT,GROSBU,NETBU,MSTFL,FMFL
                  EXTRN           DMGFL,BASEFR,TRASTA,LINEFL,SERVFL,CENTCM
                  EXTRN           MAXLOD,LOADNO,AMOUNT,SERV,SRVRT,DISCNT
                  EXTRN           TOTDOC,TWFL,SHAREF,SETLEF,DSTOR0,SSFIND,KYSTR
                  EXTRN           ROUNDF,DLNGTH,FQFD2B,ADDNTA,AUTOFF
                  EXTRN           CONSA,MMOISA,MMOISB,MMOIST,ENTKEY
                  EXTRN           DIGINR,BYDIGT,KEYDIS,SERNO,HADCT1,HADCT2
                  EXTRN           MHEAD1,MHEAD2,KEYDWN,CODNO,CLRSPD,BLOADR
                  EXTRN           GMSGFL,PRICEF,PDOCK,RUNFR,CRNTST,MSGELC,MCMTB1
                  EXTRN           GRSDOL,FABS,SELLFL,SSNO,PTKTB4,MFORM,HADCT3,MHEAD3
                  EXTRN           PRLOC0,PRLOCK,PRLOC1,GRSCMB,GRSCMT,GRSCMD,GRSCMS,GRSCMC
                  EXTRN           NETMST,NETAMG,NETAMS,POSNO
                  ;
002E              PERIOD  EQU     2EH
000A              ALF     EQU     0AH
000C              AFF     EQU     0CH
0020              ASP     EQU     20H
000D              ACR     EQU     0DH
0003              AETX    EQU     03H
002B              PLUS    EQU     2BH
002D              MINUS   EQU     2DH
0003              SELL    EQU     03H
0073              TESTWT  EQU     73H
```

```
LOC  OBJ        LINE   SOURCE STATEMENT

0067                   MOIST   EQU    67H
0062                   FM      EQU    62H
0066                   DAMAGE  EQU    66H
0011                   DELFT   EQU    11H
0065                   ENTER   EQU    65H
0080                   MOISTA  EQU    80H
0081                   MOISTB  EQU    81H
00FF                   TRUE    EQU    0FFH
0000                   FALSE   EQU    0H
0009                   NCOMOD  EQU    Ø9
                       ;
                                ;
                       ;TRANFL:         DS     4      ;STORAGE FOR TRANSACTION NO. IN BCD
                       ;NETWT:          DS     5      ;STORATE FOR NET WEIGHT IN BCD
                       ;GROSBU:         DS     5      ;GROSS BUSHELS IN BINARY
                       ;NETBU:          DS     5      ;NET BUSHELS IN BINARY
                       ;MSTFL:          DS     4      ;STORAGE FOR MOISTURE IN BCD
                       ;FMFL:           DS     4      ;FM IN BCD
                       ;DMGFL:          DS     4      ;DAMAGE IN BCD
                       ;BASEPR:         DS     5      ;BASE PRICE IN BCD
                       ;TRASTA:         DS     1      ;TRANSACTION STATUS
                       ;LINEFL:         DS     1      ;LINE FLAG TO INDICATE NO. OF LINE LEFT
                                                      ;IN THE PAGE
                       ;SERVFL:         DS     1      ;FLAG IS SET IN PRINTING SETTLEMENT
                                                      ;SHEET WHEN IT IS PRINTING
                                                      ;SERVICE CHARGE
                       ;CRNTCM:         DS     1      ;USED IN PRJR
                       ;MAXLOD:         DS     1      ;USED IN PRJR
                       ;LOADNO:         DS     1      ;USED IN PRJR
                       ;AMOUNT:         DS     5      ;STORAGE LOCATION FOR STORING TOTAL
                       ;SERV:           DS     5      ;STORAGE FOR STORING NET SERVICE CHARGE
                       ;SRVRT:          DS     5      ;STORAGE FOR STORING SERVICE CHARGE
                       ;DISCNT:         DS     5      ;DISCOUNT IN BINARY
                       ;TOTDOC:         DS     5      ;STORAGE FOR CALCULATING TOTAL DOCKAGE
                       ;TWFL:           DS     4      ;STORAGE FOR TEST WEIGHT IN BCD
                       ;SHARE:          DS     1      ;STORAGE LOACTION FOR STORING SHARES
                       ;SETTLE:         DS     1      ;FLAG FOR A SINGLE CUSTOMER
                                                      ;SETTLEMENT SHEET
                       ;
                       CSEG
                       ;
                       ;
                       ;                   ROUTINE TO PRINT OUT THE SETTLEMENT
                       ;                   SHEET AND FOLLOWING IS ASSUMED TO BE
                       ;                   THERE IN THE FOLLOWING FLAGS
                       ;                   TRANFL  -   TRANSACTION NO.
                       ;                   NETWT   -   NET WEIGHT IN LBS IN BCD
                       ;                   GROSBU  -   GROSS BUSHELS IN BINARY
                       ;                   NETBU   -   NET BUSHELS IN BINARY
                       ;                   TWFL    -   CUSTOMER TEST WEIGHT IN BCD
                       ;                   TWRATE  -   RATE FOR TEST WT. DOCKAGE IN BCD
                       ;                   MSTFL   -   CUSTOMER MOISTURE IN BCD
                       ;                   MSTRT   -   MOISTURE RATE IN BCD
                       ;                   FMFL    -   FM IN BCD
                       ;                   FMRATE  -   FM RATE IN BCD
                       ;                   DMGFL   -   DAMAGE IN BCD
                       ;                   DMGRAT  -   DAMAGE RATE IN BCD
                       ;                   BASEPR  -   BASE PRICE IN BCD
                       ;
                                        ;MESSAGE TABLE FILE FOR PRINTING THE
                                        ;BOTTOM PORTION OF THE SETTLEMENT SHEET
0000 2F4C422F          MSGA2:  DB     '/LB/BU.',ACR,AETX
0004 62752E
0007 0D
0008 03
0009 2F252F62          MSGA3:  DB     '/%/BU.',ACR,AETX
000D 752E
000F 0D
0010 03
0011 2F4C422F          MSGA4:  DB     '/LB/CWT',ACR,AETX
0015 637774
0018 0D
0019 03
001A 2F252F63          MSGA5:  DB     '/%/CWT',ACR,AETX
001E 7774
0020 0D
0021 03
0022 202A              MSGA6:  DB     ' *',AETX
0024 03
                       ;
0025 0D                MSGA7:  DB     ACR,ACR,ACR
0026 0D
0027 0D
0028 1E                        DB     1EH
0029 20545241                  DB     ' TRAN   LD   GROSS    NET    TW   MOIST   FM '
002D 4E202020
0031 4C442020
0035 2047524F
0039 53532020
003D 20204E45
0041 54202020
0045 20545720
0049 20204D4F
004D 49535420
0051 2020464D
0055 20
0056 2020444D                  DB     '  DMG   SERV   GROSS    DOCK   SHARES   AMOUNT',ACR
005A 47202020
005E 20534552
0062 56202020
0066 2047524F
006A 53532020
006E 20202044
```

```
LOC  OBJ          LINE        SOURCE STATEMENT

0072 4F434B20
0076 20205348
007A 41524553
007E 20202041
0082 4D4F554E
0086 54
0087 0D
0088 20204E4F      117        DB      '  NO    NO    BU/CWT  BU/CWT  LBS    %     %  '
008C 20202020
0090 4E4F2020
0094 2062752F
0098 63777420
009C 2062752F
00A0 63777420
00A4 206C6273
00A8 20202020
00AC 25202020
00B0 20202520
00B4 20
00B5 20202025      118        DB      '  %     RATE     $         $        %          $',ACR,AETX
00B9 20202020
00BD 20524154
00C1 45202020
00C5 20202024
00C9 20202020
00CD 20202020
00D1 24202020
00D5 20202020
00D9 25202020
00DD 20202020
00E1 2024
00E3 0D
00E4 03
00E5 0D            119 MSGA8:  DB      ACR,'*   NEGATIVE AMOUNT',ACR,AETX
00E6 2A202020
00EA 4E454741
00EE 54495645
00F2 20414D4F
00F6 554E54
00F9 0D
00FA 03
00FB 43555354      120 MSGA9:  DB      'CUSTOMER NO: ',AETX
00FF 4F4D4552
0103 204E4F3A
0107 20
0108 03
0109 544F5441      121 MSGA10: DB      'TOTAL    $ ',AETX
010D 4C202020
0111 2420
0113 03
0114 20202D20      122 MSGA11: DB      ' -      -      -      -      .',AETX
0118 20202020
011C 2D202020
0120 20202D20
0124 20202020
0128 2D202020
012C 20202E
012F 03
0130 20202020      123 MSGA12: DB      '       -        -'
0134 20202D20
0138 20202020
013C 2020202D
0140 2020
0142 2020          124 MSGA13: DB      '  '
0144 20202020      125 MSGA21: DB      '    -',AETX
0148 2D
0149 03
014A 43415554      126 MSGA14: DB      'CAUTION THIS PART OF THE PROGRAM IS TO ENTER PROPER'
014E 494F4E20
0152 54484953
0156 20504152
015A 54204F46
015E 20544845
0162 2050524F
0166 4752414D
016A 20495320
016E 544F2045
0172 4E544552
0176 2050524F
017A 504552
017D 53544152      127        DB      'STARTING LEVELS OF GRAIN FOR THE',ACR
0181 54494E47
0185 204C4556
0189 454C5320
018D 4F462047
0191 5241494E
0195 20464F52
0199 20544845
019D 0D
019E 20444149      128        DB      ' DAILY POSITION RECORD.  DEPRESS ENTER TO CONTINUE,'
01A2 4C592050
01A6 4F534954
01AA 494F4E20
01AE 5245434F
01B2 52442E20
01B6 20444550
01BA 52455353
01BE 20454E54
01C2 45522054
01C6 4F20434F
01CA 4E54494E
01CE 55452C
01D1 2044454C      129        DB      ' DELETE TO CLEAR.',ACR,ALF,ALF,ALF,ALF,ALF,AETX
```

```
LOC  OBJ          LINE         SOURCE STATEMENT

01D5 45544520
01D9 544F2043
01DD 4C454152
01E1 2E
01E2 0D
01E3 0A
01E4 0A
01E5 0A
01E6 0A
01E7 0A
01E8 03
01E9 454E5445     130 MSGA15: DB      'ENTER TOTAL WAREHOUSE OWNED GRAIN',ACR,ALF,ALF,ALF
01ED 5220544F
01F1 54414C20
01F5 57415245
01F9 484F5553
01FD 45204F57
0201 4E454420
0205 47524149
0209 4E
020A 0D
020B 0A
020C 0A
020D 0A
020E 0A           131         DB      ALF,ALF,ALF,ALF,AETX
020F 0A
0210 0A
0211 0A
0212 03
0213 454E5445     132 MSGA16: DB      'ENTER TOTAL WAREHOUSE RECEIPTS LIABILITY',ACR,ALF,ALF
0217 5220544F
021B 54414C20
021F 57415245
0223 484F5553
0227 45205245
022B 43454950
022F 5453204C
0233 49414249
0237 4C495459
023B 0D
023C 0A
023D 0A
023E 0A           133         DB      ALF,ALF,ALF,ALF,ALF,AETX
023F 0A
0240 0A
0241 0A
0242 0A
0243 03
0244 454E5445     134 MSGA17: DB      'ENTER TOTAL OPEN STORAGE LIABILITY',ACR,ALF,ALF,ALF,ALF
0248 5220544F
024C 54414C20
0250 4F50454E
0254 2053544F
0258 52414745
025C 204C4941
0260 42494C49
0264 5459
0266 0D
0267 0A
0268 0A
0269 0A
026A 0A
026B 0A           135         DB      ALF,ALF,ALF,AETX
026C 0A
026D 0A
026E 03
026F 20202020     136 MSGA18: DB      '     - ',AETX
0273 202D20
0276 03
0277 02           137 MSGA19: DB      02,1EH,'CUSTOMER NAME: _______________________'
0278 1E
0279 43555354
027D 4F4D4552
0281 204E414D
0285 453A205F
0289 5F5F5F5F
028D 5F5F5F5F
0291 5F5F5F5F
0295 5F5F5F5F
0299 5F5F5F5F
029D 5F5F5F
02A0 5F5F5F5F     138         DB      '_______________',ACR
02A4 5F5F5F5F
02A8 5F5F5F5F
02AC 5F5F5F
02AF 0D
02B0 0D           139         DB      ACR,AETX
02B1 03
02B2 02           140 MSGA20: DB      02H,1EH,'NO: ',AETX
02B3 1E
02B4 4E4F3A20
02B8 03
                  141 ;
                  142 ;
                  143                 ;MESSAGE TABLE FOR PRINTING DAILY POSITION RECORD
                  144 ;
                  145 ;
02B9 01           146 MFOSR2: DB      01H,1CH,'DAILY POSITION RECORD',02H,ACR,0AH,AETX
02BA 1C
02BB 4441494C
02BF 5920504F
02C3 53495449
02C7 4F4E2052
```

```
LOC  OBJ           LINE        SOURCE STATEMENT

02CB 45434F52
02CF 44
02D0 02
02D1 0D
02D2 0A
02D3 03
02D4 0D             147 MPOSR3: DB       ACR,1CH,'WAREHOUSE LICENSE NO. ',AETX
02D5 1C
02D6 57415245
02DA 484F5553
02DE 45204C49
02E2 43454E53
02E6 45204E4F
02EA 2E20
02EC 03
02ED 02             148 MPOSR4: DB       02H,1DH,'ALL QUANTITIES IN ',AETX
02EE 1D
02EF 416C6C20
02F3 5155414E
02F7 54495449
02FB 45532049
02FF 4E20
0301 03
0302 42555348       149 MPOSR5: DB       'BUSHELS',AETX
0306 454C53
0309 03
030A 48554E44       150 MFOSR6: DB       'HUNDREDWEIGHT',AETX
030E 52454457
0312 45494748
0316 54
0317 03
0318 4B494E44       151 MPOSR7: DB       'KIND AND CLASS OF GRAIN ',AETX
031C 20616E64
0320 20434C41
0324 5353204F
0328 46204752
032C 41494E20
0330 03
0331 02             152 MFOSR8: DB       02,1DH,'SUMMARY STOCK RECORD',02H,AETX
0332 1D
0333 53554D4D
0337 41525920
033B 53544F43
033F 4B205245
0343 434F5244
0347 02
0348 03
0349 1E             153 MFOSR9: DB       1EH,'    RECEIVED            LOADED OUT          ADJUSTMENTS'
034A 20202020
034F 52656365
0352 69766564
0356 20202020
035A 20202020
035E 20202020
0362 4C6F6164
0366 6564204F
036A 75742020
036E 20202020
0372 20202020
0376 41646A75
037A 73746D65
037E 6E7473
0381 20202020       154          DB       '     '
0385 2020
0387 20202020       155          DB       '      TOTAL STOCK',AETX
038B 20202054
038F 6F74616C
0393 2053746F
0397 636B
0399 03
039A 02             156 MPSR10: DB       02,1DH,'STORAGE LIABILITY AND POSITION RECORD',1EH,AETX
039B 1D
039C 53544F52
03A0 41474520
03A4 4C494142
03A8 494C4954
03AC 5920414E
03B0 4420504F
03B4 53495449
03B8 4F4E2052
03BC 45434F52
03C0 44
03C1 1E
03C2 03
03C3 0D             157 MPSR11: DB       ACR,0AH,'          WAREHOUSE RECEIPT LIABILITY
03C4 0A
03C5 20202020
03C9 20202020
03CD 20202057
03D1 61726568
03D5 6F757365
03D9 20526563
03DD 65697074
03E1 204C6961
03E5 62696C69
03E9 74792020
03ED 20202020
03F1 20202020
03F5 20
03F6 20202020       158          DB       '        OPEN STORAGE LIABILITY',ACR,0AH
03FA 20202020
03FE 20204F70
0402 656E2053
0406 746F7261
```

```
LOC  OBJ              LINE         SOURCE STATEMENT

040A 6765204C
040E 69616269
0412 6C697479
0416 0D
0417 0A
0418 20202020          159         DB       '        ISSUED        CANCELLED       OUTSTANDING          '
041C 20204973
0420 73756564
0424 20202020
0428 20204361
042C 6E63656C
0430 6C656420
0434 2020204F
0438 75747374
043C 616E6469
0440 6E672020
0444 20202020
0448 20
0449 2020496E          160         DB       '  INCREASE        DECREASE            TOTAL',ACR,0AH,AETX
044D 63726561
0451 73652020
0455 20202020
0459 20204465
045D 63726561
0461 73652020
0465 20202020
0469 20202054
046D 6F74616C
0471 0D
0472 0A
0473 03
0474 0D                161 MFSR12: DB       ACR,0AH,0AH
0475 0A
0476 0A
0477 20202020          162         DB       '                    WAREHOUSE OWNED GRAIN
047B 20202020
047F 20202020
0483 20205761
0487 7265686F
048B 75736520
048F 4F776E65
0493 64204772
0497 61696E20
049B 20202020
049F 20202020
04A3 20202020
04A7 2020
04A9 20202020          163         DB       '                                     TOTAL',ACR,0AH
04AD 20202020
04B1 20202020
04B5 20202020
04B9 20202020
04BD 20202020
04C1 20546F74
04C5 616C
04C7 0D
04C8 0A
04C9 20202020          164         DB       '    INCREASE        DECREASE            TOTAL '
04CD 496E6372
04D1 65617365
04D5 20202020
04D9 20202044
04DD 65637265
04E1 61736520
04E5 20202020
04E9 20202020
04ED 20546F74
04F1 616C20
04F4 20202020          165         DB       '                                        STORAGE',ACR,0AH,AETX
04F8 20202020
04FC 20202020
0500 20202020
0504 20202020
0508 20202020
050C 20202020
0510 20202053
0514 746F7261
0518 6765
051A 0D
051B 0A
051C 03
                       166 ;
051D F5                167 CONSAL: PUSH     PSW
051E 3A0000      E     168         LDA      CONSA
0521 B7                169         ORA      A
0522 CA2805      C     170         JZ       CONSAM
0525 F1                171         POP      PSW
0526 37                172         STC
0527 C9                173         RET
0528 F1                174 CONSAM: POP      PSW
0529 B7                175         ORA      A
052A C9                176         RET
                       177 ;
                       178 ;
                       179 ;
052B C5                180 PRNTJR: PUSH     B                  ;
052C D5                181         PUSH     D
052D E5                182         PUSH     H
052E F5                183         PUSH     PSW
052F 3A0000      E     184         LDA      LINEPL             ;FOR EVERY LINE DECREASE THE NO. OF LINE
0532 C6FE              185         ADI      -02                ;IN A PAGE BY THREE
0534 C24205      C     186         JNZ      PRNT1              ;IS PAGE FULL?
0537 CDFC07      C     187         CALL     PRJRC
```

```
LOC  OBJ                SOURCE STATEMENT

053A 112500   C                 LXI     D,MSGA7
053D CD0000   E                 CALL    PMASG
0540 3E32                       MVI     A,50          ;RESET THE NO. OF LINES
0542 320000   E         PRNT1:  STA     LINEFL
0545 7E                         MOV     A,M
0546 320000   E                 STA     TRASTA        ;LOAD THE TRANSACTION STATUS
0549 110000   E                 LXI     D,TRANFL      ;LOAD THE TRANSACTION NO.
054C 0604                       MVI     B,04H         ;PRINT THE TRANSACTION NO.
054E CD0000   E                 CALL    PTKTB1        ;
0551 0E2D                       MVI     C,'-'         ;PRINT - ON PRINTER
0553 CD0000   E                 CALL    PCHAR
0556 F1                         POP     PSW
0557 E1                         POP     H
0558 D1                         POP     D
0559 D5                         PUSH    D
055A E5                         PUSH    H
055B F5                         PUSH    PSW
055C 211C00                     LXI     H,28
055F 19                         DAD     D
0560 4E                         MOV     C,M
0561 CD0000   E                 CALL    PCHAR
0564 3E02                       MVI     A,02H
0566 CD0000   E                 CALL    SPACE         ;LEAVE TWO SPACE
0569 210400                     LXI     H,04H         ;POINT TO LOAD NO.
056C 19                         DAD     D
056D 3EF0                       MVI     A,0F0H        ;PRINT THE LOAD NO.
056F A6                         ANA     M
0570 CA7905   C                 JZ      PRNT2
0573 CD0000   E                 CALL    PDIGA         ;IF TWO DIGIT THEN PRINT TWO DIGIT
0576 C37F05   C                 JMP     PRNT3
0579 CDE607   C         PRNT2:  CALL    ASPR
057C CD0000   E                 CALL    PDIGB         ;
057F CDE607   C         PRNT3:  CALL    ASPR
0582 3A0000   E                 LDA     TRASTA        ;LOAD TRANSACTION STATUS
0585 E608                       ANI     08H           ;IS WEIGHT OUT ENTERED?
0587 CAF307   C                 JZ      STRETC        ;STOP PRINTING IF WEIGHT OUT NOT ENTERED
058A 010000   E                 LXI     B,FPR
058D C5                         PUSH    B
058E 110000   E                 LXI     D,GROSBU
0591 CD0000   E                 CALL    FLOAD
0594 210000   E                 LXI     H,FNUMD1      ;PRINT THE GROSBU.
0597 CD0000   E                 CALL    B2D1          ;FIRST CONVERT IT TO BCD
059A 0607                       MVI     B,07H
059C 110000   E                 LXI     D,FNUMD1
059F CDEC07   C                 CALL    PRSLTB        ;PRINT THE GROSS BU.
05A2 C1                         POP     B
05A3 3A0000   E                 LDA     TRASTA
05A6 E601                       ANI     01H           ;MOISTURE ENTERED
05A8 CAF307   C                 JZ      STRETC
05AB 110000   E                 LXI     D,NETBU
05AE CD0000   E                 CALL    FLOAD
05B1 210000   E                 LXI     H,FNUMD1      ;PRINT THE NET BU.
05B4 CD0000   E                 CALL    B2D1          ;CONVERT IT TO BCD
05B7 0607                       MVI     B,07H
05B9 110000   E                 LXI     D,FNUMD1
05BC CDEC07   C                 CALL    PRSLTB
05BF CDE607   C                 CALL    ASPR
05C2 3A0000   E                 LDA     SERVFL        ;PRINTING SERVICE CHARGE?
05C5 FE0F                       CPI     0FH           ;IS SERVICE FLAG SET? YES, THEN PRINT
05C7 CA1707   C                 JZ      PRNT10        ;CHARGES FOR THAT CUSTOMER
                                                      ;IT WILL SKIP THE PART OF THE ROUTINE
05CA 3A0000   E                 LDA     TRASTA        ;BRING THE TRANSACTION STATUS
05CD E610                       ANI     10H           ;IS TEST WEIGHT ENTERED?
05CF CAF307   C                 JZ      STRETC
05D2 110000   E                 LXI     D,TWFL        ;PRINT THE TEST WEIGHT
05D5 CD0000   E                 CALL    PTSTWT
05D8 CDE607   C                 CALL    ASPR
05DB 110000   E                 LXI     D,MSTFL       ;PRINT THE MOISTURE DOCKAGE
05DE CD0000   E                 CALL    PTSTWT
05E1 CDE607   C                 CALL    ASPR          ;LEAVE SPACE BETWEEN THE DIGITS
05E4 3A0000   E                 LDA     TRASTA
05E7 E602                       ANI     02H           ;IS FM ENTERED?
05E9 CAF307   C                 JZ      STRETC        ;STOP PRINTING IF FM NOT ENTERED
05EC 110000   E                 LXI     D,FMFL        ;PRINT FM ON PRINTER
05EF CD0000   E                 CALL    PTSTWT
05F2 CDE607   C                 CALL    ASPR          ;LEAVE SPACE BETWEEN CHARACTER
05F5 3A0000   E                 LDA     TRASTA
05F8 E604                       ANI     04H           ;IS DAMAGE ENTERED?
05FA CAF307   C                 JZ      STRETC        ;STOP PRINTING IF NOT ENTERED
05FD 110000   E                 LXI     D,DMGFL       ;PRINT DAMAGE ON PRINTER
0600 CD0000   E                 CALL    PTSTWT
0603 110000   E                 LXI     D,SHVRT       ;PRINT UNIT CHARGE FOR SERVICE RATE
0606 010000   E                 LXI     B,FPR
0609 CD0000   E                 CALL    FLOAD
060C 3E04                       MVI     A,04H
060E 210000   E                 LXI     H,FNUMD1
0611 CD0000   E                 CALL    B2D1A
0614 0606                       MVI     B,06H
0616 110000   E                 LXI     D,FNUMD1
0619 CDEC07   C                 CALL    PRSLTB
061C 3A0000   E                 LDA     FLAG2         ;FOR STORE AND DLY PRICE DO NOT PRINT GROSS $
061F B7                         ORA     A
0620 C2D606   C                 JNZ     PRNT8
0623 F1                         POP     PSW
0624 E1                         POP     H
0625 D1                         POP     D
0626 D5                         PUSH    D
0627 E5                         PUSH    H
0628 F5                         PUSH    PSW
0629 211E00                     LXI     H,30          ;JUMP IF PRICE NOT ENTERED
062C 19                         DAD     D
062D 7E                         MOV     A,M
062E FEFF                       CPI     0FFH          ;JUMP IF PRICE NOT ENTERED
```

```
LOC  OBJ            SOURCE STATEMENT

0630 CAF307   C          JZ     STRETC
0633 010000   E          LXI    B,FPR
0636 110000   E          LXI    D,GRSDOL       ;LOAD THE GROSS $
0639 CD0000   E          CALL   FLOAD
063C 210000   E          LXI    H,FNUMD1       ;CONVERT PRICE TO BINARY
063F CDAA0E   C          CALL   B2D1A7         ;STORE IT AT LOCATION FNUMD1
0642 110000   E          LXI    D,FNUMD1
0645 CD0000   E          CALL   PRSLT
0648 CD0000   E          CALL   PDOCK          ;PRINT THE TOTAL DOCKAGE
064B CD9007   C          CALL   PRNT12         ;CALCULATE SHARES IF THERE ARE ANY FOR THAT
064E 010000   E          LXI    B,FPR          ;CUSTOMER IF THERE ARE ANY
0651 110000   E          LXI    D,FNUMD2       ;TEMPORARY STORE THE TOTAL
0654 CD0000   E          CALL   FSTOR
0657 210000   E          LXI    H,FNUMD1       ;PRINT THE AMOUNT
065A CDAA0E   C          CALL   B2D1A7
065D 110000   E          LXI    D,FNUMD1
0660 CD0000   E          CALL   PRSLT          ;PRINT THE AMOUNT
0663 110000   E   PRNT5: LXI    D,AMOUNT
0666 D5                  PUSH   D
0667 CD0000   E          CALL   FLOAD
066A CD0000   E          CALL   FABS
066D 110000   E          LXI    D,FNUMD2
0670 3A0000   E          LDA    SELLFL         ;IF ELEVATOR IS SELLING TO CUSTOMER
0673 B7                  ORA    A              ;THEN SUBTRACT
0674 CA7D06   C          JZ     PRNT15
0677 CD0000   E          CALL   FSUB
067A C38006   C          JMP    PRNT16
067D CD0000   E  PRNT15: CALL   FADD           ;ADD THE TOTAL AMOUNT
0680 CDB210   C  PRNT16: CALL   ROUNDR         ;ROUND THE TOTAL
0683 D1                  POP    D
0684 CD0000   E          CALL   FSTOR
0687 CDE607   C   PRNT6: CALL   ASPR
068A 3A0000   E          LDA    PRLOC1         ;DO NOT PUT MASK IF MORE THEN ONE COPY
068D E6F0                ANI    0F0H           ;IS TO BE PRINTED
068F C28007   C          JNZ    PRNT17         ;IF LAST 4 BITS OF THIS FLAG IS ZERO THEN
                                               ;ONLY ONE COPY IS TO BE PRINTED
0692 F1                  POP    PSW
0693 E1                  POP    H
0694 D1                  POP    D
0695 D5                  PUSH   D
0696 E5                  PUSH   H
0697 F5                  PUSH   PSW
0698 D5                  PUSH   D
0699 E5                  PUSH   H
069A 211D00              LXI    H,29           ;IS SETTLEMENT SHEET FOR EVERYBODY HAS
069D 19                  DAD    D              ;BEEN PRINTED I.E. SETTLEMENT SHEET FOR
069E B6                  ORA    M              ;MASK THE BITS IN TICKET FOR WHICH SETTLEMENT
069F 77                  MOV    M,A            ;SHEET HAS BEEN PRINTED
                                               ;SERVICE AND SHARES CUSTOMER AND MAIN CUSTOMER
06A0 E601        PRNT18: ANI    1              ;CHECK TO SEE IF ORIGINAL HAS
                                               ;BEEN PRINTED OR NOT
06A2 C40000   E          CNZ    ADDNTA         ;ADD THE WEIGHTS IN PROPER BEANS
06A5 3EFE                MVI    A,11111110B    ;SET THE ORIGINAL BIT
06A7 A6                  ANA    M
06A8 77                  MOV    M,A            ;STORE IT BACK
06A9 F6C0                ORI    11000000B      ;MASK OFF LAST TWO BITS
06AB FEFE                CPI    0FEH
06AD E1                  POP    H
06AE D1                  POP    D
06AF CC0000   E          CZ     PRJRA
06B2 0E23                MVI    C,23H          ;PRINT SIGN FOR TRANSACTION DELETED
06B4 CC0000   E          CZ     PCHAR
06B7 3A0000   E          LDA    SELLFL
06BA B7                  ORA    A
06BB C2CD06   C          JNZ    PRNT7
06BE 3A0000   E          LDA    SERVFL         ;DO NOT PRINT -VE SIGN IF WE ARE
06C1 FE0F                CPI    0FH            ;PRINTING SERVICE CHARGE
06C3 CAF307   C          JZ     STRETC
06C6 3A0000   E          LDA    FLAG2
06C9 B7                  ORA    A
06CA CAF307   C          JZ     STRETC
06CD 112700   C   PRNT7: LXI    D,MSGA6
06D0 CD0000   E          CALL   PMASG
06D3 C3F307   C          JMP    STRETC
06D6 114201   C   PRNT8: LXI    D,MSGA13       ;FOR STORE AND CONTRACT DO NOT PRINT GROSS $
06D9 CD0000   E          CALL   PMASG
06DC CDE607   C          CALL   ASPR
06DF CD0000   E          CALL   PDOCK          ;PRINT THE TOTAL DOCKAGE
06E2 110000   E          LXI    D,TOTDOC       ;LOAD THE TOTAL DOCKAGE
06E5 010000   E          LXI    B,FPR
06E8 CD0000   E          CALL   FLOAD
06EB CD9F07   C          CALL   PR122          ;MULTIPLY BY SHARES IF ANY
06EE 110000   E          LXI    D,TOTDOC
06F1 CD0000   E          CALL   FSTOR
06F4 CDE607   C          CALL   ASPR
06F7 CDE607   C          CALL   ASPR
06FA CD0000   E          CALL   PDOCK          ;PRINT THE DOCKAGE AGAIN
06FD 010000   E          LXI    B,FPR
0700 110000   E          LXI    D,AMOUNT
0703 D5                  PUSH   D
0704 CD0000   E          CALL   FLOAD          ;SUBTRACT TOTAL DOCKAGE FROM TOTAL AMOUNT AS
0707 110000   E          LXI    D,TOTDOC       ;SERVICE CHARGE
070A CD0000   E          CALL   FSUB
070D CDB210   C          CALL   ROUNDR         ;ROUND THE NUMBER
0710 D1                  POP    D
0711 CD0000   E          CALL   FSTOR
0714 C38706   C          JMP    PRNT6
                  ;
0717 111401   C  PRNT10: LXI    D,MSGA11       ;ROUTINE ADDED TO PRINT OUT SERVICE CHARGE
                                               ;PRINT - ON THE PRINTER
071A CD0000   E          CALL   PMASG
071D 210000   E          LXI    H,SRVRT        ;PRINT THE SERVICE RATE CHARGED BY THAT
0720 110300   E          LXI    D,FNUMD2+3
```

```
LOC  OBJ              SOURCE STATEMENT

0723 CD0000   E              CALL    MSTOR
0726 110100   E              LXI     D,FNUMD2+1
0729 D5                      PUSH    D
072A 0603                    MVI     B,03H          ;RATE STORED IN BCD
072C CD0000   E              CALL    FTKTB1         ;PRINT IN THE FORM .XXX
072F 113001   C              LXI     D,MSGA12       ;PRINT - ON THE PRINTER
0732 CD0000   E              CALL    PMASG
0735 3EFD                    MVI     A,-3           ;CONVERT RATE TO BINARY
0737 320000   E              STA     DSCALE
073A 3EFF                    MVI     A,0FFH
073C 320100   E              STA     DSCALE+1
073F 3E03                    MVI     A,03H
0741 E1                      POP     H
0742 CD0000   E              CALL    D2BB
0745 CD1D05   C              CALL    CONSAL
0748 D25107   C              JNC     FRNT14
074B 110000   E              LXI     D,NETBU        ;IF POGDOG THEN MULTIPLY BY GROSS BUSHELS
074E C35407   C              JMP     PRNT13
0751 110000   E      FRNT14: LXI     D,GROSBU       ;IF FONDOG THEN MULTIFLY BY NET BUSHELS
0754 CD0000   E      PRNT13: CALL    FMUL
0757 110000   E              LXI     D,FNUMD2       ;STORE THE NET X SERVICE CHARGE
075A CD0000   E              CALL    FSTOR
075D 210000   E              LXI     H,FNUMD1
0760 CDAA0E   C              CALL    B2D1A7
0763 110000   E              LXI     D,FNUMD1
0766 CD0000   E              CALL    FRSLT          ;PRINT THE SERVICE CHARGE
0769 110000   E              LXI     D,AMOUNT
076C D5                      PUSH    D
076D CD0000   E              CALL    FLOAD
0770 110000   E              LXI     D,FNUMD2
0773 CD0000   E              CALL    FADD
0776 CDB210   C              CALL    ROUNDR
0779 D1                      POP     D
077A CD0000   E              CALL    FSTOR
077D C38706   C              JMP     PRNT6
                     ;
0780 F1              PRNT17: POP     PSW
0781 E1                      POP     H              ;NEUTRALIZE STACK
0782 D1                      POP     D
0783 D5                      PUSH    D
0784 E5                      PUSH    H
0785 F5                      PUSH    PSW
0786 D5                      PUSH    D
0787 E5                      PUSH    H
0788 211D00                  LXI     H,29           ;OFFSET TO CUSTOMER FLAG
078B 19                      DAD     D
078C 7E                      MOV     A,M
078D C3A006   C              JMP     PRNT18
                     ;
                     ;
0790 110000   E      PRNT12: LXI     D,GRSDOL
0793 010000   E              LXI     B,FPR
0796 CD0000   E              CALL    FLOAD
0799 110000   E              LXI     D,TOTDOC
079C CD0000   E              CALL    FSUB
079F 110000   E      PR122:  LXI     D,RUNPR
07A2 CD0000   E              CALL    FSTOR
07A5 3A0000   E              LDA     SERVFL         ;ARE THERE ANY SHARES
07A8 FEF0                    CPI     0F0H
07AA CAB407   C              JZ      PR121
07AD 114401   C              LXI     D,MSGA21       ;IF THERE ARE NO SHARES THEN PRINT '-'
07B0 CD0000   E              CALL    FMASG
07B3 C9                      RET
07B4 3E03            PR121:  MVI     A,03H
07B6 CD0000   E              CALL    SPACE
07B9 210000   E              LXI     H,SHAREF       ;PRINT THE SHARE WHICH IS IN BCD
07BC 0E01                    MVI     C,01H
07BE 110100   E              LXI     D,FNUMD2+1
07C1 CD0000   E              CALL    MSTOR1
07C4 13                      INX     D
07C5 0602                    MVI     B,02H          ;FOR THE CUSTOMER
07C7 CD0000   E              CALL    FTKTB1
07CA 3EFE                    MVI     A,-2H
07CC 320000   E              STA     DSCALE
07CF 3EFF                    MVI     A,0FFH
07D1 320100   E              STA     DSCALE+1
07D4 3E02                    MVI     A,02H          ;CONVERT SHARE INTO BINARY
07D6 210000   E              LXI     H,FNUMD2
07D9 CD0000   E              CALL    D2BB
07DC CDB210   C              CALL    ROUNDR
07DF 110000   E              LXI     D,RUNPR        ;MULTIPLY THE SHARES BY RUNNING PRICE
07E2 CD0000   E              CALL    FMUL
07E5 C9                      RET
                     ;
                     ;
07E6 0E20            ASPR:   MVI     C,ASP
07E8 CD0000   E              CALL    PCHAR
07EB C9                      RET
                     ;
07EC C5              PRSLTB: PUSH    B
07ED D5                      PUSH    D
07EE E5                      PUSH    H
07EF F5                      PUSH    PSW
07F0 C30000   E              JMP     PRSLTA
                     ;
07F3 CDC40E   C      STRETC: CALL    ACRR
07F6 CDC40E   C              CALL    ACRR
07F9 C30000   E              JMP     STRET
                     ;
                     ;
                                                    ;ROUTINE TAKES COMMODITY NO. FROM SCOMN
                                                    ;AND PRINTS OUT THE BOTTOM PORTION OF THE
                                                    ;SETTLEMENT SHEET , I.E. DOCKAGE RATE FOR
```

```
LOC  OBJ                SOURCE STATEMENT

                                                    ;THAT COMMODITY. LOCATION FNUMD1 IS USED
                                                    ;FOR TEMPORARY STORAGE
07FC C5              PRJRC:   PUSH    B
07FD D5                       PUSH    D
07FE E5                       PUSH    H
07FF F5                       PUSH    PSW
0800 110000    E     PRJRC2:  LXI     D,MCPRG       ;PRINT 'DOCKAGE RATE FOR ... '
0803 CD0000    E              CALL    PMASG
0806 C5                       PUSH    B
0807 3A0000    E              LDA     SCOMN
080A 4F                       MOV     C,A
080B CD690E    C              CALL    PCMNAM        ;PRINT COMMODITY NAME
080E C1                       POP     B
080F CDC40E    C              CALL    ACRR
0812 110000    E              LXI     D,MTW         ;PRINT ':'ACR'TEST WEIGHT DOCKAGE: '
0815 CD0000    E              CALL    PMASG
0818 3A0000    E              LDA     SCOMN
081B 4F                       MOV     C,A
081C CD0000    E              CALL    CMDADF        ;POINT TO STARTING LOCATION FOR THAT COMMODITY
081F E5                       PUSH    H
0820 0E73                     MVI     C,TESTWT      ;POINT TEST WEIGHT DOCKAGE RATE
0822 CDBB08    C              CALL    PRJRD         ;PRINT THE TEST WEIGHT DOCKAGE RATE
0825 110000    C              LXI     D,MSGA2
0828 CD0000    E              CALL    PNET1
082B C23108    C              JNZ     PRJRC1
082E 111100    C              LXI     D,MSGA4
0831 CD0000    E     PRJRC1:  CALL    PMASG
0834 CD1D05    C              CALL    CONSAL
0837 DA4708    C              JC      PRJ002
083A 110000    E              LXI     D,MMOISA      ;PRINT'ACR, MOISTURE DOCKAGE: '
083D CD0000    E              CALL    PMASG
0840 E1                       POP     H
0841 E5                       PUSH    H
0842 0E80      C              MVI     C,MOISTA
0844 C35108    C              JMP     PRJ003
0847 110000    E     PRJ002:  LXI     D,MMOIST
084A CD0000    E              CALL    PMASG
084D E1                       POP     H
084E E5                       PUSH    H
084F 0E67                     MVI     C,MOIST
0851 CDBB08    C     PRJ003:  CALL    PRJRD         ;PRINT MOISTURE RATE FOR THAT COMMODITY
0854 110900    C              LXI     D,MSGA3
0857 CD0000    E              CALL    PNET1
085A C26008    C              JNZ     PRJRC5
085D 111A00    C              LXI     D,MSGA5
0860 D5              PRJRC5:  PUSH    D
0861 CD0000    E              CALL    PMASG
0864 CD1D05    C              CALL    CONSAL
0867 DA7F08    C              JC      PRJ004
086A 110000    E              LXI     D,MMOISB      ;PRINT 'ACR, MOISTURE DOCKAGE FOR STORE'
086D CD0000    E              CALL    PMASG
0870 D1                       POP     D
0871 E1                       POP     H
0872 E5                       PUSH    H
0873 D5                       PUSH    D
0874 0E61                     MVI     C,MOISTB      ;PRINT MOISTURE RATE FOR THAT COMMODITY
0876 CDBB08    C              CALL    PRJRD
0879 D1                       POP     D
087A D5                       PUSH    D
087B CD0000    E              CALL    PMASG         ;PRINT THE UNIT
087E 110000    E     PRJ004:  LXI     D,MFM         ;PRINT ACR,'FM DOCKAGE:       '
0881 CD0000    E              CALL    PMASG
0884 D1                       POP     D
0885 E1                       POP     H
0886 E5                       PUSH    H
0887 D5                       PUSH    D
0888 0E62                     MVI     C,FM
088A CDBB08    C              CALL    PRJRD
088D D1                       POP     D
088E D5                       PUSH    D
088F CD0000    E              CALL    PMASG
0892 110000    E              LXI     D,MDAMG       ;PRINT ACR,'DMG DOCKAGE:      '
0895 CD0000    E              CALL    PMASG
0898 D1                       POP     D
0899 E1                       POP     H
089A D5                       PUSH    D
089B 0E66                     MVI     C,DAMAGE
089D CDBB08    C              CALL    PRJRD
08A0 D1                       POP     D
08A1 CD0000    E              CALL    PMASG
08A4 11E500    C              LXI     D,MSGA8
08A7 CD0000    E              CALL    PMASG
08AA 0E23                     MVI     C,23H
08AC CD0000    E              CALL    PCHAR
08AF 110000    E              LXI     D,MTRDEL      ;PRINT 'ACR,ACR * TRANSACTION DELETED'
08B2 CD0000    E              CALL    PMASG
08B5 CD0000    E              CALL    MFORM         ;GIVE FORM FEED
08B8 C30000    E              JMP     STRET
08BB CD0000    E     PRJRD:   CALL    CMDOSF        ;SERVICE ROUTINE FOR ABOVE PROGRAMM
08BE 110300    E              LXI     D,FNUMD1+3    ;PRINT THE RATE FOR THAT COMMODITY DOCKAGE
08C1 CD0000    E              CALL    MSTOR
08C4 110000    E              LXI     D,FNUMD1
08C7 0604                     MVI     B,04H
08C9 CD0000    E              CALL    PTKTB1
08CC C9                       RET
                     ;
                     ;
                                                    ;PRINT JOURNAL ROUTINE
                                                    ;WHEN CALLED PRINTS SETTLEMENT SHEET
                     ;
08CD 210000    E     PRJR:    LXI     H,CRAM
08D0 010100                   LXI     B,1           ;START FROM CUSTOMER 1
08D3 CD0000    E     PRJDA:   CALL    AUTOFF        ;GIVE AUTOMATIC FORM FEED
```

```
LOC  OBJ                SOURCE STATEMENT

08D6 AF                         XRA   A
08D7 320000    E                STA   PRJRFL
08DA E5                         PUSH  H
08DB 3A0000    E        PRJR1:  LDA   PRLOC0       ;LOAD THE MANUAL FLAG FOR PRINT
08DE E60F                       ANI   0FH          ;ONLY 9 PRINTS ARE ALLOWED
08E0 C2ED08    C                JNZ   PRJR33       ;JUMP IF THERE ARE MANUAL ENTERIES
08E3 3A0000    E                LDA   PRLOCK       ;OTHERWISE LOAD PRINT LOCK FLAG
08E6 E60F                       ANI   0FH
08E8 C2ED08    C                JNZ   PRJR33       ;RETURN IF IT IS ZERO
08EB E1                         POP   H
08EC C9                         RET
08ED 320000    E        PRJR33: STA   PRLOC1       ;OTHERWISE STORE IN PRLOC1 AS COUNTER
08F0 FE01                       CPI   01H          ;IF THERE IS MORE THEN 1 COPY THEN
08F2 CA0609    C                JZ    PRJR34       ;DO NOT DELETE THE TRANSACTION UNTIL LAST
08F5 F6F0                       ORI   0F0H         ;LINE IS PRINTED
08F7 320000    E                STA   PRLOC1       ;SO SET THE FLAG ACCORDINGLY
08FA 3A0000    E                LDA   SSNO
08FD 322700    E                STA   KYSTR+39     ;DO NOT INCREMENT THE SETTLEMENT SHEET NO.
0900 3A0100    E                LDA   SSNO+1
0903 322800    E                STA   KYSTR+40
0906 3E01               PRJR34: MVI   A,01
0908 320000    E                STA   CRNTCM       ;START WITH COMMODITY NO. 1
090B AF                         XRA   A            ;START WITH TRANSACTION AS SELL
090C 320000    E                STA   CRNTST       ;
090F E1                         POP   H
0910 E5                         PUSH  H            ;BRING MAX. TRANSACTION FOR THAT CUSTOMER
0911 7E                         MOV   A,M
0912 B7                         ORA   A
0913 CA8C09    C                JZ    PRJR6        ;IF MAX. TRANSACTION IS ZERO THEN NEXT CUST.
0916 3E01               PRJR3:  MVI   A,01H        ;START WITH NO. OF OCCURANCE 1
0918 320000    E        PRJR4:  STA   MAXLOD
091B 1680                       MVI   D,80H
091D CD0000    E                CALL  CUFIND
0920 D28C09    C                JNC   PRJR6        ;JUMP IF THERE IS NO CUSTOMER
0923 7E                         MOV   A,M
0924 07                         RLC
0925 07                         RLC
0926 07                         RLC
0927 E603                       ANI   03H
0929 E5                         PUSH  H
092A 210000    E                LXI   H,CRNTST     ;COMPARE WITH CURRENT STATUS
092D BE                         CMP   M
092E E1                         POP   H
092F C28509    C                JNZ   PRJR5
0932 E5                         PUSH  H
0933 210500                     LXI   H,05         ;IS IT EQUAL TO CURRENT COMMODITY
0936 19                         DAD   D
0937 3A0000    E                LDA   CRNTCM       ;
093A BE                         CMP   M
093B E1                         POP   H
093C C28509    C                JNZ   PRJR5
093F E5                         PUSH  H
0940 211D00                     LXI   H,29         ;IF SETTLEMENT SHEET PRINTED BEFORE THEN
0943 19                         DAD   D            ;DO NOT PRINT AGAIN
0944 7E                         MOV   A,M
0945 E620                       ANI   20H          .
0947 E1                         POP   H
0948 C28509    C                JNZ   PRJR5
094B CD000B    C                CALL  HEADGR       ;PRINT THE HEADING
094E 3EFF                       MVI   A,0FFH
0950 320000    E                STA   OFFFL        ;DO NOT PRINT BUT ONLY CALCULATE
0953 E5                         PUSH  H
0954 D5                         PUSH  D
0955 210000    E                LXI   H,SERV
0958 1619                       MVI   D,25
095A CD850B    C                CALL  CLRM         ;CLEAR ALL LOCATION TO 0
095D CD8D0B    C                CALL  CLRTW        ;CLEAR TEST WEIGHT FLAG TO 0
0960 D1                         POP   D
0961 E1                         POP   H
0962 AF                         XRA   A
0963 320000    E                STA   SERVFL
0966 CD0000    E                CALL  PTIKT
0969 AF                         XRA   A
096A 320000    E                STA   OFFFL        ;RESET THE PRINTER OFF FLAG
096D 3A0000    E                LDA   SERVFL
0970 FEF0                       CPI   0F0H
0972 CCCC0E    C                CZ    TRASHR       ;TRANSFER CUSTOMER SHARE TO SHAREF LOCATION
0975 3E20                       MVI   A,20H        ;MASK FOR MAIN SETTLEMENT LINE FOR THE CUSTOMER
0977 CD2B05    C                CALL  PRNTJR       ;PRINT THE LINE IN SETTLEMENT SHEET
097A 7E                         MOV   A,M          ;DO NOT INCREMENT THE COUNTER IF TRANSACTION
097B B7                         ORA   A            ;DELETED
097C C28509    C                JNZ   PRJR5
097F 3A0000    E                LDA   MAXLOD
0982 C31809    C                JMP   PRJR4
0985 3A0000    E        PRJR5:  LDA   MAXLOD       ;LOAD NO. OF OCCURANCE
0988 3C                         INR   A
0989 C31809    C                JMP   PRJR4        ;GO FOR NEXT OCCURANCE
098C 1101FF             PRJR6:  LXI   D,0FF01H     ;FIND SHARE OR SERVICE
098F CD0000    E                CALL  SSFIND
0992 D29809    C                JNC   PRJR7        ;JUMP IF IT DID N'T FIND IT
0995 CDF10E    C                CALL  PRJRSS       ;CALCULATE AND PRINT SETTLEMENT SHEET FOR
0998 CD720A    C        PRJR7:  CALL  PBOTOM       ;PRINT THE BOTOM PORTION OF THE TICKET
099B AF                         XRA   A
099C 320000    E                STA   PRJRFL       ;CLEAR THE PRINT JOURNAL FLAG
099F AF                         XRA   A
09A0 320000    E                STA   LASTKY
09A3 CD0000    E                CALL  KEYIN
09A6 FE11                       CPI   DELET
09A8 CAC509    C                JZ    PRJR31
09AB 3A0000    E                LDA   CRNTST       ;GO TO NEXT STATUS E.G. SELL,STORE,CONTR,DLY PR
09AE 3C                         INR   A
09AF FE04                       CPI   04
09B1 320000    E                STA   CRNTST
09B4 C21609    C                JNZ   PRJR3        ;GO TO NEXT STATUS
```

```
LOC  OBJ              LINE   SOURCE STATEMENT

09B7 AF                      PRJR21: XRA    A
09B8 320000    E                     STA    CRNTST
09BB 210000    E                     LXI    H,CRNTCM         ;GO TO NEXT COMMODITY
09BE 7E                              MOV    A,M
09BF 34                              INR    M
09C0 FE09                            CPI    09H              ;IS THIS LAST COMMODITY
09C2 C21609    C                     JNZ    PRJR3
09C5 210000    E             PRJR31: LXI    H,PRLOC1         ;LOAD WITH COUNTER FOR PRINTER
09C8 7E                              MOV    A,M
09C9 E60F                            ANI    0FH              ;MASK FOR ONLY FIRST 4 BIT
09CB 3D                              DCR    A                ;DECREMENT THE COUNTER
09CC CAF609    C                     JZ     PRJR36           ;JUMP IF NO MORE SETTLEMENT SHEET
                                                             ;IS TO BE PRINTED
09CF FE01                            CPI    01               ;IS THIS LAST SETTLEMENT SHEET
09D1 C2F009    C                     JNZ    PRJR35           ;JUMP IF IT IS NOT
09D4 77                              MOV    M,A              ;OTHERWISE CLEAR THE FLAG FOR DELET
09D5 3A2700    E             PRJR39: LDA    KYSTR+39         ;RESTORE THE SETTLEMENT SHEET NO.
09D8 320000    E                     STA    SSNO
09DB 3A2800    E                     LDA    KYSTR+40         ;RESTORE THE SETTLEMENT SHEET NO.
09DE 320100    E                     STA    SSNO+1
09E1 AF                              XRA    A
09E2 320000    E                     STA    LASTKY           ;CHECK TO SEE IF DELET KEY PUSHED
09E5 CD0000    E                     CALL   KEYIN
09E8 FE11                            CPI    DELET
09EA CA700A    C                     JZ     PRJR12
09ED C30609    C                     JMP    PRJR34
09F0 F6F0                    PRJR35: ORI    0F0H
09F2 77                              MOV    M,A              ;OTHERWISE SET THE FLAG
09F3 C3D509    C                     JMP    PRJR39
09F6 3A0000    E             PRJR36: LDA    SETLEF           ;IS THE SETTLEMENT SHEET TO BE PRINTED FOR
09F9 B7                              ORA    A                ;FOR 1 CUSTOMER ONLY
09FA C26C0A    C                     JNZ    PRJR9
09FD AF                              XRA    A
09FE 320000    E                     STA    LASTKY
0A01 CD0000    E                     CALL   KEYIN
0A04 FE11                            CPI    DELET
0A06 CA1B0A    C                     JZ     PRJR32
0A09 3E99                            MVI    A,99H            ;LAST CUSTOMER?
0A0B B9                              CMP    C
0A0C C2510A    C                     JNZ    PRJR8
0A0F 3E09                            MVI    A,09H
0A11 B8                              CMP    B
0A12 C2510A    C                     JNZ    PRJR8
0A15 110000    E                     LXI    D,MASGB          ;PRINT END OF JOURNAL MESSAGE
0A18 CD0000    E                     CALL   PMASG
0A1B E1                      PRJR32: POP    H
0A1C 210000    E                     LXI    H,CRAM           ;CLEAR LOAD NO. TO ZERO IF THERE IS NO
0A1F 010100                          LXI    B,1              ;TRANSACTION FOR THAT BUFFER
0A22 11E703                          LXI    D,999
0A25 3E01                    PRJR11: MVI    A,01H
0A27 E5                              PUSH   H
0A28 D5                              PUSH   D
0A29 1680                            MVI    D,80H
0A2B CD0000    E                     CALL   CUFIND
0A2E D1                              POP    D
0A2F E1                              POP    H
0A30 DA350A    C                     JC     PRJR10
0A33 AF                              XRA    A
0A34 77                              MOV    M,A
0A35 AF                      PRJR10: XRA    A
0A36 320000    E                     STA    LASTKY           ;RETURN IF DELET KEY PRESSED
0A39 CD0000    E                     CALL   KEYIN
0A3C FE11                            CPI    DELET
0A3E C8                              RZ
0A3F 23                              INX    H
0A40 1B                              DCX    D
0A41 79                              MOV    A,C
0A42 C601                            ADI    01H              ;NEXT CUSTOMER
0A44 27                              DAA
0A45 4F                              MOV    C,A
0A46 78                              MOV    A,B
0A47 CE00                            ACI    0
0A49 27                              DAA
0A4A 47                              MOV    B,A
0A4B 7B                              MOV    A,E
0A4C B2                              ORA    D
0A4D C2250A    C                     JNZ    PRJR11
0A50 C9                              RET
0A51 E1                      PRJR8:  POP    H
0A52 23                              INX    H
0A53 E5                              PUSH   H
0A54 79                              MOV    A,C
0A55 C601                            ADI    01H
0A57 27                              DAA                     ;GO TO NEXT CUSTOMER
0A58 4F                              MOV    C,A
0A59 D2DB08    C                     JNC    PRJR1
0A5C 04                              INR    B
0A5D AF                      PRJR37: XRA    A
0A5E 320000    E                     STA    LASTKY
0A61 CD0000    E                     CALL   KEYIN
0A64 FE11                            CPI    DELET
0A66 CA700A    C                     JZ     PRJR12
0A69 C3DB08    C                     JMP    PRJR1
0A6C AF                      PRJR9:  XRA    A
0A6D 320000    E                     STA    SETLEF
0A70 E1                      PRJR12: POP    H
0A71 C9                              RET
                             ;
                             ;
0A72 3A0000    E             PBOTOM: LDA    PRJRFL
0A75 B7                              ORA    A
0A76 C8                              RZ
0A77 C5                              PUSH   B
```

```
LOC  OBJ             SOURCE STATEMENT

0A78 D5                      PUSH   D
0A79 E5                      PUSH   H
0A7A F5                      PUSH   PSW
0A7B CDC40E   C              CALL   ACRR
0A7E 3E49                    MVI    A,73         ;PRINT BOTTOM PORTION OF THE TICKET
0A80 CD0000   E              CALL   SPACE
0A83 110901   C              LXI    D,MSGA10     ;PRINT 'TOTAL' ON SHEET
0A86 CD0000   E              CALL   PMASG
0A89 010000   E              LXI    B,FPR        ;CONVERT TOTAL TO BCD
0A8C 110000   E              LXI    D,AMOUNT
0A8F CD0000   E              CALL   FLOAD
0A92 210000   E              LXI    H,FNUMD1
0A95 CDAA0E   C              CALL   B2D1A7
0A98 110000   E              LXI    D,FNUMD1
0A9B CD0000   E              CALL   PRSLT        ;PRINT THE AMOUNT
0A9E 3A0000   E              LDA    DSIGN
0AA1 FE2B                    CPI    PLUS
0AA3 CAB10A   C              JZ     BOT1
0AA6 3E02                    MVI    A,02
0AA8 CD0000   E              CALL   SPACE
0AAB 112200   C              LXI    D,MSGA6
0AAE CD0000   E              CALL   PMASG
0AB1 110000   E      BOT1:   LXI    D,MSGJ
0AB4 CD0000   E              CALL   PMASG
0AB7 3A0000   E              LDA    CRNTCM       ;LOAD THE CURRENT COMMODITY AND PRINT
0ABA 320000   E              STA    SCOMN        ;THE BOTTOM PORTION FOR THAT COMMODITY
0ABD CDFC07   C              CALL   PPJRC        ;PRINT THE BOTTOM PORTION OF THE PAGE
0AC0 C30000   E              JMP    STRET
                     ;
0AC3 C5              PRNTNO: PUSH   B            ;ROUTINE PRINTS OUT PAGE NO. FROM MEMORY
0AC4 D5                      PUSH   D            ;MEMORY ADDRESS IS PASSED IN REG. D
0AC5 E5                      PUSH   H            ;NO. WILL BE INCREMENTED BY 1 AND THEN PRINTED
0AC6 F5                      PUSH   PSW
0AC7 EB                      XCHG
0AC8 0E02                    MVI    C,02         ;SEND OUT CONTROL CHARACTER
0ACA CD0000   E              CALL   PCHAR
0ACD 0E1E                    MVI    C,1EH        ;SELECT CHARACTER SIZE
0ACF CD0000   E              CALL   PCHAR
0AD2 3E56                    MVI    A,86         ;LEAVE 86 SPACE IN FRONT OF MESSAGE
0AD4 CD0000   E              CALL   SPACE
0AD7 11B202   C              LXI    D,MSGA20     ;PRINT NO. ON PRINTER
0ADA CD0000   E              CALL   PMASG
0ADD 7E                      MOV    A,M          ;GO TO NEXT PAGE NO.
0ADE C601                    ADI    1
0AE0 27                      DAA
0AE1 77                      MOV    M,A
0AE2 23                      INX    H
0AE3 7E                      MOV    A,M
0AE4 CE00                    ACI    0
0AE6 27                      DAA
0AE7 77                      MOV    M,A
0AE8 2B                      DCX    H
0AE9 110300   E              LXI    D,FNUMD1+3   ;CONVERT NO. TO ASCII
0AEC CD0000   E              CALL   MSTOR
0AEF 0604                    MVI    B,04
0AF1 110000   E              LXI    D,FNUMD1     ;PRINT THE NO.
0AF4 CD0000   E              CALL   PTKTB4
0AF7 CDC40E   C              CALL   ACRR
0AFA CDC40E   C              CALL   ACRR
0AFD C30000   E              JMP    STRET
                     ;
0B00 3A0000   E      HEADGR: LDA    PRJRFL
0B03 B7                      ORA    A
0B04 C0                      RNZ
0B05 C5                      PUSH   B
0B06 D5                      PUSH   D
0B07 E5                      PUSH   H
0B08 F5                      PUSH   PSW
0B09 3EFF                    MVI    A,0FFH
0B0B 320000   E              STA    PRJRFL
0B0E CDC40E   C              CALL   ACRR
0B11 C5                      PUSH   B
0B12 110000   E              LXI    D,SSNO
0B15 CDC30A   C              CALL   PRNTNO
0B18 CD0000   E              CALL   HEADG        ;PRINT NAME OF THE ELEVATOR AND ADDRESS
0B1B CDC40E   C              CALL   ACRR
0B1E CDC40E   C              CALL   ACRR
0B21 117702   C              LXI    D,MSGA19     ;PRINT 'CUSTOMER NAME:______________'
0B24 CD0000   E              CALL   PMASG
0B27 11FB00   C              LXI    D,MSGA9      ;PRINT THE HEADING FOR THAT PAGE
0B2A CD0000   E              CALL   PMASG
0B2D C1                      POP    B
0B2E 210000   E              LXI    H,FNUMD1
0B31 71                      MOV    M,C
0B32 23                      INX    H
0B33 70                      MOV    M,B          ;PRINT THE CUSTOMER NO.
0B34 2B                      DCX    H
0B35 CD0000   E              CALL   PCUSN        ;PRINT CUSTOMER NO.
0B38 3E05                    MVI    A,05H        ;LEAVE 5 SPACE
0B3A CD0000   E              CALL   SPACE
0B3D 110000   E              LXI    D,MSGELC     ;PRINT 'KIND OF GRAIN'
0B40 CD0000   E              CALL   PMASG
0B43 3A0000   E              LDA    CRNTCM       ;LOAD THE CURRENT COMMODITY
0B46 4F                      MOV    C,A
0B47 CD890E   C              CALL   PCMNAM       ;PRINT THE COMMODITY NAME
0B4A 3E03                    MVI    A,03
0B4C CD0000   E              CALL   SPACE
0B4F 3A0000   E              LDA    CRNTST       ;LOAD THE CURRENT STATUS
0B52 4F                      MOV    C,A          ;IS IT SELL,STORE,CONTRACT,DLYPRICE
0B53 CD6F0B   C              CALL   PSTATS
0B56 210000   E              LXI    H,AMOUNT     ;BEGINNING OF PAGE CLEAR THE AMOUNT TO ZERO
0B59 1605                    MVI    D,05H
0B5B CD850B   C              CALL   CLRM
```

```
LOC  OBJ            SOURCE STATEMENT

0B5E 112500    C            LXI     D,MSGA7       ;AFTER PRINTING THE CUSTOMER NO. PRINT
0B61 CD0000    E            CALL    PMASG         ;THE MESSAGE FOR HEADING
0B64 CD0000    E            CALL    MACR
0B67 3E20                   MVI     A,32          ;LOAD MAX NO. OF LINE
0B69 320000    E            STA     LINEFL
0B6C C30000    E            JMP     STRET
                 ;
0B6F C5          PSTATS:    PUSH    B             ;PRINTS OUT SELL,STORE,CONTRACT,DLY PRICE
0B70 D5                     PUSH    D             ;REG. C HAS THE STATUS NO.
0B71 E5                     PUSH    H
0B72 F5                     PUSH    PSW
0B73 110000    E            LXI     D,MCMTB1
0B76 79                     MOV     A,C
0B77 07                     RLC                   ;MULTIPLY BY 2
                                                  ;OFF SET TO TABLE
0B78 6F                     MOV     L,A
0B79 2600                   MVI     H,0
0B7B 19                     DAD     D
0B7C 5E                     MOV     E,M
0B7D 23                     INX     H
0B7E 56                     MOV     D,M
0B7F CD0000    E            CALL    PMASG         ;PRINT THE MESSAGE
0B82 C30000    E            JMP     STRET
                 ;
                 ;
0B85 AF          CLRM:      XRA     A             ;CLEARS MEMORY LOCATION
0B86 77                     MOV     M,A
0B87 23                     INX     H
0B88 15                     DCR     D
0B89 C2850B    C            JNZ     CLRM
0B8C C9                     RET
0B8D 210000    E CLRTW:     LXI     H,TWFL
0B90 CDA20B    C            CALL    CLRTWA
0B93 210000    E            LXI     H,MSTFL
0B96 CDA20B    C            CALL    CLRTWA
0B99 210000    E            LXI     H,FMFL
0B9C CDA20B    C            CALL    CLRTWA
0B9F 210000    E            LXI     H,DMGFL
0BA2 3E04        CLRTWA:    MVI     A,04H
0BA4 3630        CLRTW1:    MVI     M,30H
0BA6 23                     INX     H
0BA7 3D                     DCR     A
0BA8 C2A40B    C            JNZ     CLRTW1
0BAB C9                     RET
                                                  ;ROUTINE TO PRINT DAILY POSITION RECORD
                                                  ;COMMODITY NO. IS PASSED IN C REG.
0BAC CD0000    E POSRCD:    CALL    AUTOFF
0BAF C5                     PUSH    B
0BB0 110000    E            LXI     D,POSNO       ;PRINT THE PAGE NO. FOR POSITION
0BB3 CDC30A    C            CALL    PRNTNO
0BB6 CD0000    E            CALL    HEADG         ;PRINT ELEVATOR NAME
0BB9 CDA10E    C            CALL    ACRLF         ;GIVE TWO CARRIAGE RETURNS
0BBC 3E10                   MVI     A,16          ;LEAVE SPACES
0BBE CD0000    E            CALL    SPACE
0BC1 11B902    C            LXI     D,MPOSR2      ;PRINT TITLE BLOCK
0BC4 CD0000    E            CALL    PMASG
0BC7 11D402    C            LXI     D,MPOSR3
0BCA CD0000    E            CALL    PMASG
0BCD 110000    E            LXI     D,CODNO       ;PRINT ELEVATOR CODE NUMBER
0BD0 CD0000    E            CALL    PMASG
0BD3 CDA10E    C            CALL    ACRLF         ;LINE FEED
0BD6 11ED02    C            LXI     D,MPOSR4      ;ALL QUANTITIES IN _
0BD9 CD0000    E            CALL    PMASG
0BDC CD0000    E            CALL    PNET1         ;BUSHELS OR HUNDREDWEIGHT?
0BDF CAE80B    C            JZ      POSR1         ;JUMP IF HUNDREDWEIGHT
0BE2 110203    C            LXI     D,MPOSR5      ;BUSHELS
0BE5 C3EB0B    C            JMP     POSR2
0BE8 110A03    C POSR1:     LXI     D,MPOSR6      ;HUNDREDWEIGHT
0BEB CD0000    E POSR2:     CALL    PMASG
0BEE 3E0A                   MVI     A,10
0BF0 CD0000    E            CALL    SPACE
0BF3 111803    C            LXI     D,MPOSR7
0BF6 CD0000    E            CALL    PMASG         ;KIND OF GRAIN
0BF9 C1                     POP     B
0BFA CD890E    C            CALL    PCMNAM        ;GET COMMIDITY NAME
0BFD CDA10E    C            CALL    ACRLF
0C00 CDC40E    C            CALL    ACRR
0C03 3E1E                   MVI     A,30
0C05 CD0000    E            CALL    DDOT
0C08 113103    C            LXI     D,MPOSR8      ;SUMMARY STOCK RECORD
0C0B CD0000    E            CALL    PMASG
0C0E 3E1E                   MVI     A,30
0C10 CD0000    E            CALL    DDOT          ;MAKE A ROW OF "A" DOTS
0C13 CDC40E    C            CALL    ACRR
0C16 CDA10E    C            CALL    ACRLF
0C19 114903    C POSR7:     LXI     D,MPOSR9      ;TITLE BLOCKS
0C1C CD0000    E            CALL    PMASG
0C1F CDA10E    C            CALL    ACRLF
0C22 010000    E            LXI     B,FPR         ;SET UP FLOATING POINT REGISTER
0C25 110000    E            LXI     D,NETCMG      ;GROSS GRAIN INTAKE FOR TODAY
0C28 CD6B0E    C            CALL    SETPT         ;PRINT OUT
0C2B 3E0A                   MVI     A,10
0C2D CD0000    E            CALL    SPACE
0C30 110000    E            LXI     D,NETCMT      ;SHIPPED TODAY
0C33 CD6B0E    C            CALL    SETPT         ;PRINT OUT
0C36 3E0A                   MVI     A,10
0C38 CD0000    E            CALL    SPACE
                 ;
                 ;THE FOLLOWING GROUP OR STORAGE LOCATIONS ARE ADDED TOGETHER INORDER
                 ;TO DETERMINE THE TOTAL SHRINKAGE FOR THE DAY BASED GROSS INTAKE
                 ;MINUS THE SUMM OF ALL NET AFTER SHRINKAGE INTAKES
                 ;
0C3B 110000    E            LXI     D,NETCMS      ;RECEIVED FOR STORAGE - SHRUNK
```

```
LOC  OBJ          LINE        SOURCE STATEMENT

0C3E CDB60E   C  1013          CALL   ADJPTR        ;ADJUST POINTER FOR COMMODITY NUMBER
0C41 CD0000   E  1014          CALL   FLOAD         ;LOAD INTO FLOATING POINT REG
0C44 110000   E  1015          LXI    D,NETCMB      ;RECEIVED FOR SALE - SHRUNK
0C47 CDB60E   C  1016          CALL   ADJPTR
0C4A CD0000   E  1017          CALL   FADD          ;ADD TO FPR
0C4D 110000   E  1018          LXI    D,NETCMC      ;CONTRACT IN FOR SALE - SHRUNK
0C50 CDB60E   C  1019          CALL   ADJPTR
0C53 CD0000   E  1020          CALL   FADD
0C56 110000   E  1021          LXI    D,NETCMD      ;DELAY PRICE
0C59 CDB60E   C  1022          CALL   ADJPTR
0C5C CD0000   E  1023          CALL   FADD
0C5F CDB210   C  1024          CALL   ROUNDR
0C62 110000   E  1025          LXI    D,FNUMD2      ;STORE SUM OF SHRUNK INPUTS
0C65 CD0000   E  1026          CALL   FSTOR
0C68 110000   E  1027          LXI    D,NETCMG      ;SUBTRACT THE GROSS
0C6B CDB60E   C  1028          CALL   ADJPTR
0C6E CD0000   E  1029          CALL   FLOAD
0C71 110000   E  1030          LXI    D,FNUMD2
0C74 CD0000   E  1031          CALL   FSUB
0C77 CD740E   C  1032          CALL   SETFT1        ;DIFFERENT ENTRY TO SETFT - PRINT
0C7A 3E0A        1033          MVI    A,10
0C7C CD0000   E  1034          CALL   SPACE
0C7F 110000   E  1035          LXI    D,GRSSTK      ;TOTAL STOCK IN HOUSE
0C82 CDB60E   C  1036          CALL   ADJPTR
0C85 D5          1037          PUSH   D
0C86 CD0000   E  1038          CALL   FLOAD
0C89 110000   E  1039          LXI    D,FNUMD2
0C8C CD0000   E  1040          CALL   FADD
0C8F 110000   E  1041          LXI    D,NETCMT      ;SHIPPED OUT TODAY
0C92 CDB60E   C  1042          CALL   ADJPTR
0C95 CD0000   E  1043          CALL   FSUB
0C98 CDB210   C  1044          CALL   ROUNDR
0C9B D1          1045          POP    D
0C9C CD0000   E  1046          CALL   FSTOR
0C9F CD740E   C  1047          CALL   SETPT1
0CA2 CDC40E   C  1048          CALL   ACRR
0CA5 CDA10E   C  1049          CALL   ACRLF
0CA8 3E19        1050          MVI    A,25
0CAA CD0000   E  1051          CALL   DDOT
0CAD 119A03   C  1052 POSR8:   LXI    D,MPSR10      ;TITLE BLOCKS
0CB0 CD0000   E  1053          CALL   PMASG
0CB3 3E14        1054          MVI    A,20
0CB5 CD0000   E  1055          CALL   DDOT
0CB8 CDC40E   C  1056          CALL   ACRR
0CBB 11C303   C  1057          LXI    D,MPSR11
0CBE CD0000   E  1058          CALL   PMASG
0CC1 010000   E  1059          LXI    B,FPR         ;RESET BC REGISTERS FOR FPR
0CC4 110000   E  1060          LXI    D,WRLISS      ;WAREHOUSE RECEIPT LIABILITY ISSUED
0CC7 CD6B0E   C  1061          CALL   SETFT
0CCA 3E03        1062          MVI    A,3
0CCC CD0000   E  1063          CALL   SPACE
0CCF 110000   E  1064          LXI    D,WRLCAN      ;WAREHOUSE RECEIPTS CANCELLED
0CD2 CD6B0E   C  1065          CALL   SETFT
0CD5 3E03        1066          MVI    A,3
0CD7 CD0000   E  1067          CALL   SPACE
0CDA 110000   E  1068          LXI    D,WRLOUT      ;WAREHOUSE RECEIPTS LIABILITY OUTSTANDING
0CDD CDB60E   C  1069          CALL   ADJPTR        ;THE FOLLOWING STEPS ADD OR SUBTRACT TO
0CE0 D5          1070          PUSH   D             ;THIS TOTAL
0CE1 CD0000   E  1071          CALL   FLOAD
0CE4 110000   E  1072          LXI    D,WRLISS      ;ADD ISSUED
0CE7 CDB60E   C  1073          CALL   ADJPTR
0CEA CD0000   E  1074          CALL   FADD
0CED 110000   E  1075          LXI    D,WRLCAN      ;SUBTRACT CANCELLED
0CF0 CDB60E   C  1076          CALL   ADJPTR
0CF3 CD0000   E  1077          CALL   FSUB
0CF6 CDB210   C  1078          CALL   ROUNDR
0CF9 D1          1079          POP    D
0CFA CD0000   E  1080          CALL   FSTOR         ;WRLOUT ADDRESS IN SAVED IN STACK
0CFD CD740E   C  1081          CALL   SETPT1
0D00 110000   E  1082          LXI    D,NETCMS      ;INTAKE TODAY FOR STORAGE
0D03 CDB60E   C  1083          CALL   ADJPTR
0D06 CD0000   E  1084          CALL   FLOAD
0D09 CDB210   C  1085          CALL   ROUNDR
0D0C 110000   E  1086          LXI    D,FNUMD2
0D0F CD0000   E  1087          CALL   FSTOR
0D12 3E05        1088          MVI    A,5
0D14 CD0000   E  1089          CALL   SPACE
0D17 CD740E   C  1090          CALL   SETFT1
0D1A 3E03        1091          MVI    A,3
0D1C CD0000   E  1092          CALL   SPACE
0D1F 110000   E  1093          LXI    D,OSLDEC      ;DECREASE IN OPEN STORAGE LIABILITY
0D22 D5          1094          PUSH   D
0D23 CD6B0E   C  1095          CALL   SETPT
0D26 110000   E  1096          LXI    D,FNUMD2      ;OPEN STORAGE LIABILITY INCREASE
0D29 CD0000   E  1097          CALL   FLOAD         ;
0D2C D1          1098          POP    D
0D2D CDB60E   C  1099          CALL   ADJPTR
0D30 CD0000   E  1100          CALL   FSUB          ;SUBTRACT DECREASE FORM TOTAL
0D33 110000   E  1101          LXI    D,OSLTOT      ;TOTAL OPEN STORAGE LIABILITY
0D36 CDB60E   C  1102          CALL   ADJPTR
0D39 CD0000   E  1103          CALL   FADD          ;ADDS INCREASE TO TOTAL
0D3C CDB210   C  1104          CALL   ROUNDR
0D3F CD0000   E  1105          CALL   FSTOR
0D42 3E03        1106          MVI    A,3
0D44 CD0000   E  1107          CALL   SPACE
0D47 CD740E   C  1108          CALL   SETFT1
0D4A 117404   C  1109 POSR9:   LXI    D,MPSR12      ;TITLE BLOCKS
0D4D CD0000   E  1110          CALL   PMASG
0D50 110000   E  1111          LXI    D,NETCMB      ;INTAKE TODAY FOR SALE
0D53 CDB60E   C  1112          CALL   ADJPTR
0D56 CD0000   E  1113          CALL   FLOAD
0D59 110000   E  1114          LXI    D,NETCMC      ;FOR CONTRACT
0D5C CDB60E   C  1115          CALL   ADJPTR
0D5F CD0000   E  1116          CALL   FADD
```

```
LOC  OBJ              SOURCE STATEMENT

0D62 110000  E              LXI   D,NETCMD
0D65 CDB60E  C              CALL  ADJPTR
0D68 CD0000  E              CALL  FADD
0D6B 110000  E              LXI   D,WOGINC
0D6E CDB60E  C              CALL  ADJPTR
0D71 CD0000  E              CALL  FADD
0D74 CDB210  C              CALL  ROUNDR
0D77 110000  E              LXI   D,FNUMD2
0D7A CD0000  E              CALL  FSTOR
0D7D CD740E  C              CALL  SETPT1
0D80 3E03                   MVI   A,3
0D82 CD0000  E              CALL  SPACE
0D85 110000  E              LXI   D,NETCMT      ;WAREHOUSE OWN GRAIN DECREASE (SHIPPED)
0D88 CDB60E  C              CALL  ADJPTR
0D8B D5                     PUSH  D
0D8C CD0000  E              CALL  FLOAD
0D8F 110000  E              LXI   D,WOGDEC
0D92 CDB60E  C              CALL  ADJPTR
0D95 CD0000  E              CALL  FADD
0D98 D1                     POP   D
0D99 D5                     PUSH  D
0D9A CDB210  C              CALL  ROUNDR
0D9D CD0000  E              CALL  FSTOR
0DA0 CD740E  C              CALL  SETPT1
0DA3 3E03                   MVI   A,3
0DA5 CD0000  E              CALL  SPACE
0DA8 110000  E              LXI   D,FNUMD2
0DAB CD0000  E              CALL  FLOAD
0DAE D1                     POP   D
0DAF CD0000  E              CALL  FSUB
0DB2 110000  E              LXI   D,WOGTOT      ;WAREHOUSE OWNED GRAIN TOTAL
0DB5 CDB60E  C              CALL  ADJPTR
0DB8 D5                     PUSH  D
0DB9 CD0000  E              CALL  FADD
0DBC CDB210  C              CALL  ROUNDR
0DBF CD0000  E              CALL  FSTOR
0DC2 CD740E  C              CALL  SETPT1
0DC5 3E1A                   MVI   A,26
0DC7 CD0000  E              CALL  SPACE
0DCA 110000  E              LXI   D,WRLOUT
0DCD CDB60E  C              CALL  ADJPTR
0DD0 CD0000  E              CALL  FLOAD
0DD3 D1                     POP   D
0DD4 CD0000  E              CALL  FADD
0DD7 110000  E              LXI   D,OSLTOT
0DDA CDB60E  C              CALL  ADJPTR
0DDD CD0000  E              CALL  FADD
0DE0 CD740E  C              CALL  SETPT1
0DE3 0E0C                   MVI   C,0CH
0DE5 CD0000  E              CALL  PCHAR
0DE8 110000  E              LXI   D,NETCMB      ;CLEAR ALL BINS TO ZERO
0DEB CD5D0E  C              CALL  POSA
0DEE 110000  E              LXI   D,NETCMT
0DF1 CD5D0E  C              CALL  POSA          ;CLEAR THE BINS
0DF4 110000  E              LXI   D,NETCMC
0DF7 CD5D0E  C              CALL  POSA
0DFA 110000  E              LXI   D,NETCMS
0DFD CD5D0E  C              CALL  POSA
0E00 110000  E              LXI   D,NETCMD
0E03 CD5D0E  C              CALL  POSA
0E06 110000  E              LXI   D,GRSCMB
0E09 CD5D0E  C              CALL  POSA
0E0C 110000  E              LXI   D,GRSCMT
0E0F CD5D0E  C              CALL  POSA
0E12 110000  E              LXI   D,GRSCMC
0E15 CD5D0E  C              CALL  POSA
0E18 110000  E              LXI   D,GRSCMS
0E1B CD5D0E  C              CALL  POSA
0E1E 110000  E              LXI   D,GRSCMD
0E21 CD5D0E  C              CALL  POSA
0E24 110000  E              LXI   D,NETMST
0E27 CD5D0E  C              CALL  POSA
0E2A 110000  E              LXI   D,NETAMS
0E2D CD5D0E  C              CALL  POSA
0E30 110000  E              LXI   D,NETAMG
0E33 CD5D0E  C              CALL  POSA
0E36 110000  E              LXI   D,NETCMG      ;CLEAR GROSS BUSHELS
0E39 CD5D0E  C              CALL  POSA
0E3C 110000  E              LXI   D,WRLISS
0E3F CD5D0E  C              CALL  POSA
0E42 110000  E              LXI   D,WRLCAN
0E45 CD5D0E  C              CALL  POSA
0E48 110000  E              LXI   D,OSLDEC
0E4B CD5D0E  C              CALL  POSA
0E4E 110000  E              LXI   D,WOGINC
0E51 CD5D0E  C              CALL  POSA
0E54 110000  E              LXI   D,WOGDEC
0E57 CD5D0E  C              CALL  POSA
0E5A C30000  E              JMP   PRGM7
                     ;
0E5D CDB60E  C       POSA:  CALL  ADJPTR
0E60 0E04                   MVI   C,04H
0E62 3E00                   MVI   A,0
0E64 12              POSA1: STAX  D
0E65 13                     INX   D
0E66 0D                     DCR   C
0E67 C2640E  C              JNZ   POSA1
0E6A C9                     RET
                     ;
0E6B CDB60E  C       SETPT: CALL  ADJPTR
0E6E 010000  E       SETPTA: LXI  B,FPR
0E71 CD0000  E              CALL  FLOAD
0E74 210000  E       SETPT1: LXI  H,FNUMD1
0E77 E5                     PUSH  H
```

```
LOC  OBJ              SOURCE STATEMENT

0E78 CD800E    C              CALL   B2D1A9
0E7B D1                       POP    D
0E7C CD800E    C              CALL   SETPT2
0E7F C9                       RET
0E80 C5             SETPT2:   PUSH   B
0E81 D5                       PUSH   D
0E82 E5                       PUSH   H
0E83 F5                       PUSH   PSW
0E84 060B                     MVI    B,0BH
0E86 C30000    E              JMP    PRSLTA
                    ;
                    ;
0E89 C5             PCMNAM:   PUSH   B                 ;PUSH ALL REGISTERS
0E8A D5                       PUSH   D
0E8B E5                       PUSH   H
0E8C F5                       PUSH   PSW
0E8D 210000    E              LXI    H,MCMTAB          ;PRINT COMMODITY NAME
0E90 79                       MOV    A,C               ;REGISTER C HAS THE COMMODITY NO.
0E91 3D                       DCR    A                 ;REG. A HAS COMMODITY NO.
0E92 B7                       ORA    A                 ;
0E93 07                       RLC
0E94 1600                     MVI    D,0
0E96 5F                       MOV    E,A
0E97 19                       DAD    D
0E98 5E                       MOV    E,M
0E99 23                       INX    H
0E9A 56                       MOV    D,M
0E9B CD0000    E              CALL   PMASG
0E9E C30000    E              JMP    STRET
                    ;
                    ;
0EA1 CDC40E    C    ACRLF:    CALL   ACRR
0EA4 0E0A                     MVI    C,0AH
0EA6 CD0000    E              CALL   PCHAR
0EA9 C9                       RET
0EAA 3E07           B2D1A7:   MVI    A,07H
0EAC CD0000    E              CALL   B2D1A
0EAF C9                       RET
0EB0 3E09           B2D1A9:   MVI    A,09H
0EB2 CD0000    E              CALL   B2D1A
0EB5 C9                       RET
0EB6 E5             ADJPTR:   PUSH   H
0EB7 3A0000    E              LDA    SCOMN             ;BRING COMMODITY NO.
0EBA 3D                       DCR    A
0EBB 07                       RLC                      ;4 LOCATION FOR EACH COMMODITY
0EBC 07                       RLC
0EBD 2600                     MVI    H,0
0EBF 6F                       MOV    L,A
0EC0 19                       DAD    D
0EC1 EB                       XCHG
0EC2 E1                       POP    H
0EC3 C9                       RET
0EC4 C5             ACRR:     PUSH   B
0EC5 0E0D                     MVI    C,ACR
0EC7 CD0000    E              CALL   PCHAR
0ECA C1                       POP    B
0ECB C9                       RET
0ECC C5             TRASHR:   PUSH   B
0ECD D5                       PUSH   D
0ECE E5                       PUSH   H
0ECF F5                       PUSH   PSW
0ED0 212200                   LXI    H,34              ;POINT TO SHARE LOCATION
0ED3 19                       DAD    D
0ED4 0E00                     MVI    C,00H             ;100% SHARE IN BCD
0ED6 CDEA0E    C              CALL   DECSUB            ;SUBTRACT 1ST CUTOMER SHARE
0ED9 212500                   LXI    H,37              ;POINTER TO SECOND CUSTOMER SHARE LOCATION
0EDC 19                       DAD    D
0EDD 3EFF                     MVI    A,0FFH            ;IS THERE SHARES FOR 2ND CUSTOMER
0EDF BE                       CMP    M
0EE0 C4EA0E    C              CNZ    DECSUB            ;SUBTRACT OTHER PERSON SHARE
0EE3 210000    E              LXI    H,SHAREF                  ;TRANSFER THE LEFT OUT SHARE IN BCD TO
0EE6 71                       MOV    M,C               ;TO SHARE LOCATION
0EE7 C30000    E              JMP    STRET
0EEA 3E9A           DECSUB:   MVI    A,9AH
0EEC 96                       SUB    M
0EED 81                       ADD    C
0EEE 27                       DAA
0EEF 4F                       MOV    C,A
0EF0 C9                       RET
                                                       ;ROUTINE PUTS THE APPROPRIATE SERVICE
                                                       ;CHARGES IN BCD AND SHARES FOR PRINTING
                                                       ;SETTLEMENT SHEET
                                                       ;
0EF1 C5             PRJRSS:   PUSH   B                 ;SAVE CUSTOMER NO.
0EF2 D5                       PUSH   D
0EF3 E5                       PUSH   H
0EF4 F5                       PUSH   PSW
0EF5 210000                   LXI    H,0H
0EF8 220000    E              SHLD   KYSTR
0EFB 21010F                   LXI    H,0F01H           ;PUT CODE FOR SERVICE CHARGE AND 1ST OCCURANCE
0EFE 220000    E    PSS1:     SHLD   DSTOR0
0F01 EB                       XCHG
0F02 CD0000    E              CALL   SSFIND
0F05 DA440F    C              JC     PSS3              ;JUMP IF FOUND
0F08 2101F0                   LXI    H,0F001H          ;PUT CODE FOR SHARE CHARGE AND 1ST OCCURANCE
0F0B 220000    E    PSS2:     SHLD   DSTOR0
0F0E EB                       XCHG
0F0F CD0000    E              CALL   SSFIND
0F12 D20000    E              JNC    STRET             ;RETURN IF NOT FOUND
0F15 CD790F    C    PSS4:     CALL   PSSA              ;CALCULATE ALL CALCULATION
0F18 D23D0F    C              JNC    PSS41
0F1B D5                       PUSH   D
0F1C E5                       PUSH   H
```

```
LOC  OBJ          LINE        SOURCE STATEMENT

0F1D F5           1324         PUSH    PSW
0F1E 212200       1325         LXI     H,34
0F21 19           1326         DAD     D
0F22 FE08         1327         CPI     08H             ;1ST SHARE CHARGE
0F24 CA2A0F    C  1328         JZ      PSS42
0F27 23           1329         INX     H
0F28 23           1330         INX     H               ;2ND SHARE CHARGE
0F29 23           1331         INX     H
0F2A 7E           1332 PSS42:  MOV     A,M             ;STORE THE SHARES IN SHARES LOCATION
0F2B 320000    E  1333         STA     SHAREF          ;
0F2E 3A0100    E  1334         LDA     DSTOR0+1
0F31 320000    E  1335         STA     SERVFL          ;SET THE FLAG FOR SHARES
0F34 F1           1336         POP     PSW
0F35 E1           1337         POP     H
0F36 D1           1338         POP     D
0F37 CDC60F    C  1339         CALL    PSSC
0F3A C30B0F    C  1340         JMP     PSS2
0F3D 2A0000    E  1341 PSS41:  LHLD    DSTOR0
0F40 23           1342         INX     H
0F41 C30B0F    C  1343         JMP     PSS2
                  1344 ;
0F44 CD790F    C  1345 PSS3:   CALL    PSSA            ;CALCULATE ALL CALCULATION
0F47 D2720F    C  1346         JNC     PSS31           ;JUMP IF THE COMMODITY NO. IS NOT EQUAL
                  1347                                 ;TO CURRENT COMMODITY
0F4A D5           1348         PUSH    D
0F4B E5           1349         PUSH    H
0F4C F5           1350         PUSH    PSW
0F4D 211600       1351         LXI     H,22
0F50 19           1352         DAD     D
0F51 FE02         1353         CPI     02H             ;1ST SERVICE RATE
0F53 CA5A0F    C  1354         JZ      PSS33
0F56 23           1355         INX     H
0F57 23           1356         INX     H
0F58 23           1357         INX     H
0F59 23           1358         INX     H
0F5A 7E           1359 PSS33:  MOV     A,M
0F5B 320000    E  1360         STA     SRVRT
0F5E 23           1361         INX     H
0F5F 7E           1362         MOV     A,M
0F60 320100    E  1363         STA     SRVRT+1
0F63 3A0100    E  1364         LDA     DSTOR0+1
0F66 320000    E  1365         STA     SERVFL          ;SET THE FLAG FOR SERVICE
0F69 F1           1366         POP     PSW
0F6A E1           1367         POP     H
0F6B D1           1368         POP     D
0F6C CDC60F    C  1369         CALL    PSSC            ;PRINT THE SETTLEMENT SHEET
0F6F C3FE0E    C  1370         JMP     PSS1
                  1371 ;
0F72 2A0000    E  1372 PSS31:  LHLD    DSTOR0
0F75 23           1373         INX     H
0F76 C3FE0E    C  1374         JMP     PSS1
                  1375 ;
0F79 B7           1376 PSSA:   ORA     A
0F7A D5           1377         PUSH    D
0F7B E5           1378         PUSH    H               ;SAVE REGISTERS
0F7C F5           1379         PUSH    PSW
0F7D 7E           1380         MOV     A,M
0F7E 07           1381         RLC
0F7F 07           1382         RLC
0F80 07           1383         RLC
0F81 E603         1384         ANI     03H
0F83 E5           1385         PUSH    H
0F84 210000    E  1386         LXI     H,CRNTST        ;COMPARE WITH CURRENT STATUS
0F87 BE           1387         CMP     M
0F88 E1           1388         POP     H
0F89 C2C20F    C  1389         JNZ     PSSA1
0F8C 210500       1390         LXI     H,05H           ;POINT TO COMMODITY NO.
0F8F 19           1391         DAD     D               ;
0F90 3A0000    E  1392         LDA     CRNTCM          ;IS IT EQUAL TO CURRENT COMMODITY
0F93 BE           1393         CMP     M
0F94 C2C20F    C  1394         JNZ     PSSA1
0F97 211D00       1395         LXI     H,29
0F9A 19           1396         DAD     D
0F9B F1           1397         POP     PSW             ;IF SETTLEMENT SHEET PRINTED BEFORE THEN DO
0F9C F5           1398         PUSH    PSW             ;PRINT AGAIN
0F9D A6           1399         ANA     M
0F9E C2C20F    C  1400         JNZ     PSSA1
0FA1 CD000B    C  1401         CALL    HEADGR
0FA4 3EFF         1402         MVI     A,0FFH          ;DO NOT PRINT THE TICKET
0FA6 320000    E  1403         STA     OFFFL
0FA9 210000    E  1404         LXI     H,SERV
0FAC 1619         1405         MVI     D,25
0FAE CD850B    C  1406         CALL    CLRM
0FB1 CD8D0B    C  1407         CALL    CLRTW
0FB4 F1           1408         POP     PSW
0FB5 E1           1409         POP     H
0FB6 D1           1410         POP     D
0FB7 CD0000    E  1411         CALL    PTIKT           ;CALCUALATE ALL CALCULATIONS
0FBA F5           1412         PUSH    PSW
0FBB AF           1413         XRA     A
0FBC 320000    E  1414         STA     OFFFL           ;CLEAR THE FLAG
0FBF F1           1415         POP     PSW
0FC0 37           1416         STC
0FC1 C9           1417         RET
0FC2 F1           1418 PSSA1:  POP     PSW
0FC3 E1           1419         POP     H
0FC4 D1           1420         POP     D
0FC5 C9           1421         RET
0FC6 F5           1422 PSSC:   PUSH    PSW             ;SAVE MASK FOR 1SERVICE/SHARE OR 2SERVICE/SHARE
0FC7 E5           1423         PUSH    H               ;SAVE BUFFER BYTE
0FC8 D5           1424         PUSH    D
0FC9 2A0000    E  1425         LHLD    KYSTR           ;KYSTORE HAS THE LAST TRANSACTION NO.
0FCC 1A           1426         LDAX    D               ;LOAD THE TRANSACTION NO.
```

```
LOC   OBJ             SOURCE STATEMENT

0FCD BD                       CMP   L           ;IS IT EQUAL TO LAST TRANSACTION NO?
0FCE C2F40F    C              JNZ   PSSC1       ;JUMP IF THE LAST NO. ARE NOT EQUAL
0FD1 13                       INX   D
0FD2 1A                       LDAX  D           ;BRING 2ND BYTE OF DATA
0FD3 1B                       DCX   D           ;ADJUST BACK TO BUFFER BYTE
0FD4 BC                       CMP   H           ;2ND BYTE OF TRANSACTION EQUAL?
0FD5 C2F40F    C              JNZ   PSSC1
0FD8 3EFF                     MVI   A,0FFH      ;FOUND THE MATCH SET FLAG
0FDA 320200    E              STA   KYSTR+2
0FDD D1               PSSC2:  POP   D
0FDE E1                       POP   H
0FDF F1                       POP   PSW
0FE0 CD2B05    C              CALL  PRNTJR      ;PRINT THE LINE
0FE3 7E                       MOV   A,M
0FE4 B7                       ORA   A           ;TRANSACTION DELETED?
0FE5 2A0000    E              LHLD  DSTOR0
0FE8 C2F20F    C              JNZ   PSSC3
0FEB 3A0200    E              LDA   KYSTR+2     ;MATCH FLAG SET?
0FEE B7                       ORA   A
0FEF C8                       RZ                ;RETURN IF SET
0FF0 2B                       DCX   H           ;OTHERWISE THERE ARE 2 SERVICE CHARGE FOR
0FF1 C9                       RET               ;FOR SAME CUSTOMER IN SAME TICKET
0FF2 23               PSSC3:  INX   H
0FF3 C9                       RET
0FF4 210000    E      PSSC1:  LXI   H,KYSTR
0FF7 77                       MOV   M,A         ;STORE THE LAST TRANSACTION NO.
0FF8 13                       INX   D
0FF9 23                       INX   H
0FFA 1A                       LDAX  D
0FFB 77                       MOV   M,A
0FFC 23                       INX   H
0FFD 3600                     MVI   M,0
0FFF C3DD0F    C              JMP   PSSC2
                      ;
                      ;
                      ;
1002 AF               STGRNA: XRA   A           ;SERVICE ROUTINE FOR SETGRN ROUTINE
1003 320000    E              STA   DLNGTH      ;CLEAR THE DLNGTH TO ZERO
1006 118907                   LXI   D,0789H     ;LOOK FOR DIGIT KEY
1009 CD0000    E              CALL  DIGINK
100C D22010    C              JNC   STGRNB      ;RETURN IF FORMAT NOT SATISFIED
100F 3A0000    E              LDA   DLNGTH      ;CHECK THE LENGTH OF DIGITS
1012 B7                       ORA   A
1013 CA2010    C              JZ    STGRNB      ;RETURN DLNGTH IS ZERO
1016 010000    E              LXI   B,FPR       ;LOAD THE BINARY NO. OF DIGIT
1019 110000    E              LXI   D,BYDIGT
101C CD0000    E              CALL  FLOAD
101F 37                       STC               ;SET CARRY TO SHOW SUCCESS
1020 C9               STGRNB: RET
                      ;
                      ;
                                                ;PROGRAMME ADDED TO ENTER THE DIGITS FOR
                                                ;DAILY POSITION RECORD
                                                ;KEY SEQUENCE TO ENTER THIS ROUTINE IS
                                                ;DPR,COMMODITY NAME,PROGRAM,ENTER,PROGRAM
1021 CD0000    E      SETGRN: CALL  KEYDIS      ;DISPLAY THE KEY
1024 114A01    C              LXI   D,MSGA14    ;PRINT THE MESSAGE
1027 CD0000    E              CALL  PMASG
102A CD0000    E      SETGR0: CALL  ENTKEY      ;LOOK FOR ENTER KEY
102D D20000    E              JNC   PRGM7       ;RETURN IF ENTER KEY NOT PRESSED
1030 11E901    C              LXI   D,MSGA15    ;PRINT THE MESSAGE
1033 CD0000    E              CALL  PMASG
1036 CD0210    C              CALL  STGRNA      ;LOAD THE BINARY DIGIT
1039 CA4E10    C              JZ    SETGR1
103C D22A10    C              JNC   SETGR0      ;JUMP IF FORMAT NOT SATISFIED
103F 110020    E              LXI   D,WOGTOT    ;STORE THE NO. IN WAREHOUSE OWNED GRAIN TOTAL
1042 CDB60E    C              CALL  ADJPTR
1045 CD0000    E              CALL  FSTOR
1048 110000    E              LXI   D,FNUMD
104B CD0000    E              CALL  FSTOR       ;ALSO STORE THE NO. IN FNUMD
104E 111302    C      SETGR1: LXI   D,MSGA16    ;PRINT THE MESSAGE FOR WAREHOUSE RECEIPT
1051 CD0000    E              CALL  PMASG
1054 CD0210    C              CALL  STGRNA
1057 CA6F10    C              JZ    SETGR2
105A D22A10    C              JNC   SETGR0
105D 110000    E              LXI   D,WRLOUT
1060 CDB60E    C              CALL  ADJPTR
1063 CD0000    E              CALL  FSTOR
1066 110000    E              LXI   D,FNUMD
1069 CD0000    E              CALL  FADD
106C CD0000    E              CALL  FSTOR
106F 114402    C      SETGR2: LXI   D,MSGA17    ;PRINT THE MESSAGE FOR TOTAL OPEN STORAGE
1072 CD0000    E              CALL  PMASG
1075 CD0210    C              CALL  STGRNA
1078 CAA010    C              JZ    SETGR3
107B D22A10    C              JNC   SETGR0
107E 110000    E              LXI   D,OSLTOT
1081 CDB60E    C              CALL  ADJPTR
1084 CD0000    E              CALL  FSTOR       ;STORE THE DIGITS IN OPEN STORAGE TOTAL
1087 110000    E              LXI   D,FNUMD
108A CD0000    E              CALL  FADD
108D 110000    E              LXI   D,GRSSTK    ;LOAD THE TOTAL IN GROSS STOCK
1090 CDB60E    C              CALL  ADJPTR
1093 CD0000    E              CALL  FSTOR
1096 CD0000    E      SETGR4: CALL  MFORM
1099 3A0000    E              LDA   SCOMN       ;LOAD THE COMMODITY NO.
109C 4F                       MOV   C,A
109D C3AC0B    C              JMP   POSRCD
10A0 110000    E      SETGR3: LXI   D,FNUMD
10A3 CD0000    E              CALL  FLOAD
10A6 110000    E              LXI   D,GRSSTK
10A9 CDB60E    C              CALL  ADJPTR
10AC CD0000    E              CALL  FSTOR
```

```
LOC  OBJ          LINE      SOURCE STATEMENT

10AF C39610    C              JMP     SETGR4
                     ;
                              ;
                                                       ;ROUND OFF ROUTINE
                                                       ;ROUTINE ROUNDS UP THE NO. 2 DIGITS
                                                       ;AFTER DECIMAL POINT
                                                       ;NO. IS PASSED IN FLOATING POINT ACCUMULATOR
                                                       ;NO. IS RETURNED IN FLOATING POINT ACCUMULATOR
10B2 C5                ROUNDR: PUSH    B
10B3 D5                        PUSH    D
10B4 E5                        PUSH    H
10B5 F5                        PUSH    PSW
10B6 210000    E               LXI     H,ROUNDF        ;STORE THE BCD NO. AT ROUNDF
10B9 CDAA01    C               CALL    B2D1A7
10BC 2A0000    E               LHLD    DSCALE
10BF 0602                      MVI     B,02H           ;NO. TO BE TRUNCATED AFTER 2 DIGIT DECIMAL
10C1 7C                ROUND1: MOV     A,H             ;BRING THE DSCALE
10C2 B5                        ORA     L               ;DO NOT TRUNCATE THE NO. FOR DSCALE OF 0,-1,-2
10C3 F2E610    C               JP      ROUND3
10C6 23                        INX     H
10C7 05                        DCR     B
10C8 C2C110    C               JNZ     ROUND1          ;NOW H&L HAS THE DSCALE+2
10CB E5                        PUSH    H
10CC 3E07                      MVI     A,7             ;SUBTRACT DSCALE FROM TOTAL LENGTH OF NO.
10CE 85                        ADD     L
10CF 2600                      MVI     H,0
10D1 6F                        MOV     L,A             ;NOW H&L HAS THE OFFSET OF THE NO.
10D2 110000    E               LXI     D,ROUNDF        ;
10D5 19                        DAD     D               ;NOW H&L POINTS TO LOCATION WHERE ZERO HAS
10D6 0607                      MVI     B,07H           ;TO BE STORED
10D8 D1                        POP     D
10D9 3630              ROUND2: MVI     M,30H           ;STORE ASCII ZERO
10DB 23                        INX     H
10DC 13                        INX     D
10DD 7A                        MOV     A,D
10DE B3                        ORA     E               ;STORE ZERO TILL DSCALE GOES TO ZERO
10DF CAE610    C               JZ      ROUND3
10E2 05                        DCR     B
10E3 C2D910    C               JNZ     ROUND2
10E6 210000    E       ROUND3: LXI     H,ROUNDF        ;CONVERT BACK THE NO. TO BINARY
10E9 3E07                      MVI     A,07H
10EB 320000    E               STA     DLNGTH
10EE 010000    E               LXI     B,FPR
10F1 110000    E               LXI     D,DSIGN
10F4 CD0000    E               CALL    FQFD2B
10F7 C30000    E               JMP     STRET
                     ;
                     ;
                     ;**************************************************************************
                     ;**************************************************************************
                     ;**************************************************************************
                                                       ;THIS ROUTINE IS WRITTEN TO ENABLE THE
                                                       ;CUSTOMER CHANGE THE NAME ON TICKET
                                                       ;AND ALLOW HIM TO ENTER HIS OWN SERIAL
                                                       ;NO.
                     ;
                                                       ;THE KEY ARRANGEMENTS ARE AS FOLLOWS
                     ;
                     ;PRICE TESTWT PFEED PROG   WTIN SELL    7    8    9    SUNFL  CORN   PRINT
                     ;  N      R      V     Z     &  •'                       J      F
                     ;
                     ;
                     ;
                     ;MOIST CONTR  OFF   DELTR  WTOT STORE   4    5    6    RICE   BEAN   CUSTOMER
                     ;  M      Q     U      Y     (    ,                      I      E
                     ;
                     ;
                     ;
                     ;PM    PRJR   PRLOC DATE   SHAR CONTR   1    2    3    MILO   WHEAT  B
                     ;  L      P     T      X     )  SHIFT                     H      D      B
                     ;
                     ;
                     ;
                     ;DMG   LOCK   DPR   SSH    SERV DLPR   DEL  0    .    OATS    A     :
                     ; K      O     S      W     -  SPACE                     G      A     :
                     ;
                     ;
10FA 0D                MSGHD1: DB     ACR,ACR,02,1EH
10FB 0D
10FC 02
10FD 1E
10FE 504C4541                  DB     'PLEASE ENTER NAME - MAXIMUM 36 CHARACTERS LONG',ACR,ACR
1102 53452045
1106 4E544552
110A 204E414D
110E 45202D20
1112 4D415849
1116 4D554D20
111A 33362043
111E 48415241
1122 43544552
1126 53204C4F
112A 4E47
112C 0D
112D 0D
112E 0A                        DB     ALF,ALF,ALF,ALF,ALF,ALF,AETX
112F 0A
1130 0A
1131 0A
1132 0A
1133 0A
1134 03
1135 0D                MSGHD2: DB     ACR,ACR,02,1EH
1136 0D
```

```
LOC  OBJ          LINE        SOURCE STATEMENT

1137 02
1138 1E
1139 494E5641     1611        DB      'INVALID KEY ENTRY. ENTER KEY AGAIN',ACR,ACR
113D 4C494420
1141 4B455920
1145 454E5452
1149 592C2045
114D 4E544552
1151 204B4559
1155 20414741
1159 494E
115B 0D
115C 0D
115D 0A           1612        DB      ALF,ALF,ALF,ALF,ALF,ALF,AETX
115E 0A
115F 0A
1160 0A
1161 0A
1162 0A
1163 03
1164 0D           1613 MSGHD3: DB     ACR,ACR,02,1EH
1165 0D
1166 02
1167 1E
1168 4E4F204D     1614        DB      'NO MORE CHARCATER PLEASE - PUSH ENTER KEY TO CONTINUE'
116C 4F524520
1170 43484152
1174 43415445
1178 5220504C
117C 45415345
1180 202D2050
1184 55534820
1188 454E5445
118C 52204B45
1190 5920544F
1194 20434F4E
1198 54494E55
119C 45
119D 0D           1615        DB      ACR,ACR,ALF,ALF,ALF,ALF,ALF,ALF
119E 0D
119F 0A
11A0 0A
11A1 0A
11A2 0A
11A3 0A
11A4 0A
11A5 03           1616        DB      AETX
11A6 0D           1617 MSGHD4: DB     ACR,ACR,02,1EH
11A7 0D
11A8 02
11A9 1E
11AA 504C4541     1618        DB      'PLEASE ENTER ADDRESS - MAXIMUM 66 CHARACTERS',ACR,ACR
11AE 53452045
11B2 4E544552
11B6 20414444
11BA 52455353
11BE 202D204D
11C2 4158494D
11C6 554D2036
11CA 36204348
11CE 41524143
11D2 54455253
11D6 0D
11D7 0D
11D8 0A           1619        DB      ALF,ALF,ALF,ALF,ALF,ALF,AETX
11D9 0A
11DA 0A
11DB 0A
11DC 0A
11DD 0A
11DE 03
11DF 0D           1620 MSGHD5: DB     ACR,ACR,02,1EH
11E0 0D
11E1 02
11E2 1E
11E3 504C4541     1621        DB      'PLEASE ENTER YOUR SECRET NO.',ACR,ACR
11E7 53452045
11EB 4E544552
11EF 20594F55
11F3 52205345
11F7 43524554
11FB 204E4F2E
11FF 0D
1200 0D
1201 0A           1622        DB      ALF,ALF,ALF,ALF,ALF,ALF,AETX
1202 0A
1203 0A
1204 0A
1205 0A
1206 0A
1207 03
1208 0D           1623 MSGHD6: DB     ACR,ACR,02,1EH
1209 0D
120A 02
120B 1E
120C 504C4541     1624        DB      'PLEASE ENTER WAREHOUSE LICENSE NO.',ACR,ACR
1210 53452045
1214 4E544552
1218 20574152
121C 45484F55
1220 5345204C
1224 4943454E
1228 5345204E
```

```
LOC  OBJ             LINE        SOURCE STATEMENT

122C 4F2E
122E 0D
122F 0D
1230 0A              1625          DB       ALF,ALF,ALF,ALF,ALF,ALF,AETX
1231 0A
1232 0A
1233 0A
1234 0A
1235 0A
1236 03
1237 0D              1626 MSGHD7:  DB       ACR,ACR,02,1EH
1238 0D
1239 02
123A 1E
123B 446F2079        1627          DB       'DO YOU WISH TO INCLUDE GOVERNMENT MESSAGE ON TICKET?',ACR
123F 6F752077
1243 69736820
1247 746F2069
124B 6E636C75
124F 64652047
1253 6F766572
1257 6E6D656E
125B 74204D65
125F 73736167
1263 65206F6E
1267 20746963
126B 6B65743F
126F 0D
1270 50757368        1628          DB       'PUSH WT IN  KEY FOR YES',ACR
1274 20575420
1278 494E2020
127C 6B657920
1280 666F7220
1284 594553
1287 0D
1288 50757368        1629          DB       'PUSH WT OUT KEY FOR NO',ACR,ACR
128C 20575420
1290 4F555420
1294 6B657920
1298 666F7220
129C 4E4F
129E 0D
129F 0D
12A0 0A              1630          DB       ALF,ALF,ALF,ALF,ALF,ALF,AETX
12A1 0A
12A2 0A
12A3 0A
12A4 0A
12A5 0A
12A6 03
12A7 0D              1631 MSGHD8:  DB       ACR,ACR,02,1EH
12A8 0D
12A9 02
12AA 1E
12AB 504C4541        1632          DB       'PLEASE ENTER TELEPHONE NO. - MAXIMUM 66 CHARACTERS',ACR
12AF 53452045
12B3 4E544552
12B7 2054454C
12BB 4550484F
12BF 4E45204E
12C3 4F2E202D
12C7 204D4158
12CB 494D554D
12CF 20363620
12D3 43484152
12D7 41435445
12DB 5253
12DD 0D
12DE 0D              1633          DB       ACR,ALF,ALF,ALF,ALF,ALF,ALF,AETX
12DF 0A
12E0 0A
12E1 0A
12E2 0A
12E3 0A
12E4 0A
12E5 03
                     1634                                              ;OCTAL ADDRESS
                     1635          ;
12E6 35              1636 TABLED:  DB       '5'        ;               00
12E7 30              1637          DB       '0'        ;               01
12E8 FE              1638          DB       0FEH       ;SHIFT KEY      02
12E9 27              1639          DB       27H        ;' KEY          03
12EA 38              1640          DB       '8'        ;               04
12EB 32              1641          DB       '2'        ;               05
12EC 20              1642          DB       ' '        ;               06
12ED 2C              1643          DB       ','        ;               07
12EE 34              1644          DB       '4'        ;               10
12EF 11              1645          DB       11H        ;               11
12F0 FF              1646          DB       0FFH       ;INVALID KEY    12
12F1 FF              1647          DB       0FFH       ;INVALID KEY    13
12F2 37              1648          DB       '7'        ;               14
12F3 31              1649          DB       '1'        ;               15
12F4 FF              1650          DB       0FFH       ;               16
12F5 FF              1651          DB       0FFH       ;               17
12F6 FF              1652          DB       0FFH       ;               20
12F7 FF              1653          DB       0FFH       ;               21
12F8 FF              1654          DB       0FFH       ;               22
12F9 FF              1655          DB       0FFH       ;               23
12FA FF              1656          DB       0FFH       ;               24
12FB FF              1657          DB       0FFH       ;               25
12FC FF              1658          DB       0FFH       ;               26
12FD FF              1659          DB       0FFH       ;               27
12FE 36              1660          DB       '6'        ;               30
```

```
LOC  OBJ            SOURCE STATEMENT

12FF 2E                    DB     '.'          ;                     31
1300 29                    DB     ')'          ;                     32
1301 26                    DB     '&'          ;                     33
1302 39                    DB     '9'          ;                     34
1303 33                    DB     '3'          ;                     35
1304 2D                    DB     '-'          ;                     36
1305 28                    DB     '('          ;                     37
1306 45                    DB     'E'          ;                     40
1307 41                    DB     'A'          ;                     41
1308 54                    DB     'T'          ;                     42
1309 56                    DB     'V'          ;                     43
130A 46                    DB     'F'          ;                     44
130B 44                    DB     'D'          ;                     45
130C 53                    DB     'S'          ;                     46
130D 55                    DB     'U'          ;                     47
130E 49                    DB     'I'          ;                     50
130F 47                    DB     'G'          ;                     51
1310 58                    DB     'X'          ;                     52
1311 5A                    DB     'Z'          ;                     53
1312 4A                    DB     'J'          ;                     54
1313 48                    DB     'H'          ;                     55
1314 57                    DB     'W'          ;                     56
1315 59                    DB     'Y'          ;                     57
1316 FF                    DB     ØFFH         ;ILLEGAL KEY          60
1317 FF                    DB     ØFFH         ;ILLEGAL KEY          61
1318 4C                    DB     'L'          ;                     62
1319 4E                    DB     'N'          ;                     63
131A FF                    DB     ØFFH         ;                     64
131B FF                    DB     ØFFH         ;                     65
131C 4B                    DB     'K'          ;                     66
131D 4D                    DB     'M'          ;                     67
131E FF                    DB     ØFFH         ;                     70
131F 43                    DB     'C'          ;                     71
1320 50                    DB     'P'          ;                     72
1321 52                    DB     'R'          ;                     73
1322 FF                    DB     ØFFH         ;                     74
1323 42                    DB     'B'          ;                     75
1324 4F                    DB     'O'          ;                     76
1325 51                    DB     'Q'          ;                     77
                           ;
                    ;
                    ;
1326 C5             MHEADG: PUSH  B
1327 D5                    PUSH   D
1328 E5                    PUSH   H
1329 F5                    PUSH   PSW
132A AF                    XRA    A
132B 32ØØØØ   E            STA    FNUMD1       ;CLEAR THE SHIFT FLAG
132E 11DF11   C            LXI    D,MSGHD5
1331 CDØØØØ   E            CALL   PMASG        ;PRINT 'ENTER SECRET CODE NO:'
1334 1144Ø4                LXI    D,Ø444H
1337 CDØØØØ   E            CALL   DIGINR       ;LOOK FOR 4 DIGIT ONLY
133A D25213   C            JNC    MH11         ;RETURN IF FORMAT NOT SATISFIED
133D FE65                  CPI    ENTER
133F C25213   C            JNZ    MH11         ;IF NOT ENTER KEY THEN DELETE OUT OF ROUTINE
1342 Ø6Ø4                  MVI    B,Ø4H        ;PUT THE KEY CODE IN LOCATION SERIAL NO.
1344 11ØØØØ   E     MH2:   LXI    D,KYSTR
1347 21ØØØØ   E            LXI    H,SERNO      ;
134A 1A             MH1:   LDAX   D
134B 77                    MOV    M,A
134C 13                    INX    D
134D 23                    INX    H
134E Ø5                    DCR    B
134F C24A13   C            JNZ    MH1
1352 11Ø812   C     MH11:  LXI    D,MSGHD6     ;ENTER ELEVATOR C C CODE NO.
1355 CDØØØØ   E            CALL   PMASG
1358 CDØØØØ   E            CALL   CLRSPD
135B 1155Ø5                LXI    D,Ø555H      ;FIVE DIGITS FOR CODE  NO.
135E CDØØØØ   E            CALL   DIGINR
1361 D29C13   C            JNC    MH14
1364 FE65                  CPI    ENTER
1366 C29C13   C            JNZ    MH14
1369 21Ø1ØØ   E            LXI    H,KYSTR+1    ;STORE THE DIGIT FOR CODE NO.
136C 16Ø1                  MVI    D,Ø1H
136E CDØØØØ   E            CALL   BLOADR       ;SET UP FOR BLOADR
1371 79                    MOV    A,C
1372 C63Ø                  ADI    3ØH          ;CONVERT DIGIT TO ASCII
1374 32ØØØØ   E            STA    CODNO
1377 3E2D                  MVI    A,'-'        ;PUT '-' AFTER ONE DIGIT
1379 32Ø1ØØ   E            STA    CODNO+1
137C Ø6Ø4                  MVI    B,Ø4H
137E 21Ø2ØØ   E            LXI    H,KYSTR+2
1381 11Ø2ØØ   E            LXI    D,CODNO+2
1384 C5             MH6:   PUSH   B
1385 D5                    PUSH   D
1386 E5                    PUSH   H
1387 16Ø1                  MVI    D,Ø1
1389 CDØØØØ   E            CALL   BLOADR
138C 79                    MOV    A,C
138D C63Ø                  ADI    3ØH
138F E1                    POP    H
139Ø D1                    POP    D
1391 C1                    POP    B
1392 12                    STAX   D
1393 13                    INX    D
1394 23                    INX    H
1395 Ø5                    DCR    B
1396 C28413   C            JNZ    MH6
1399 3EØ3                  MVI    A,Ø3H
139B 12                    STAX   D            ;PUT END OF TEXT
139C 11FA1Ø   C     MH14:  LXI    D,MSGHD1     ;PRINT 'ENTER NAME PLEASE - MAXIMUM ALLOWABLE
139F CDØØØØ   E            CALL   PMASG        ;LENGTH 32 CHARACTERS'
13A2 11ØØØØ   E            LXI    D,MHEAD1     ;STORE THE CHARCATERS AT MHEAD1
13A5 Ø627                  MVI    B,39         ;LOAD THE COUNTER
```

```
LOC  OBJ            LINE        SOURCE STATEMENT

13A7 CD3D14    C                CALL    MHA             ;PRINT THE NAME AS IT IS ENTERED
13AA D2F413    C                JNC     MH8             ;RETURN IF DELETE KEY PRESSED
13AD 78                         MOV     A,B             ;B HAS THE NO. OF SPACES LEFT
13AE E6FE                       ANI     0FEH
13B0 0F                         RRC                     ;DIVIDE BY 2
13B1 320000    E                STA     HADCT1          ;STORE IT IN IN HEADING COUNTER 1
13B4 3E02              MH8:     MVI     A,02            ;GIVE 2 CARRIAGE RETURN
13B6 CDC40E    C                CALL    ACRR
13B9 CDE914    C                CALL    HEADG1          ;PRINT OUT THE HEADING
13BC 11A611    C                LXI     D,MSGHD4        ;PRINT 'ENTER ADDRESS MAXIMUM ALLOWABLE LENGTH
13BF CD0000    E                CALL    PMASG           ;66 CHARACTERS'
13C2 0643                       MVI     B,67
13C4 110000    E                LXI     D,MHEAD2        ;STORE IT LOCATION MHEAD2
13C7 CD3D14    C                CALL    MHA             ;PRINT THE HEADING
13CA D2D413    C                JNC     MH4             ;RETURN IF DELETED OUT
13CD 78                         MOV     A,B             ;BRING NO. OF SPACES LEFT
13CE E6FE                       ANI     0FEH
13D0 0F                         RRC
13D1 320000    E                STA     HADCT2          ;STORE IT IN HADCT2
13D4 3E02              MH4:     MVI     A,02            ;GIVE CARRIAGE RETURN
13D6 CDC40E    C                CALL    ACRR
13D9 CD0415    C                CALL    HEADG2          ;PRINT OUT THE ADDRESS
13DC 11A712    C                LXI     D,MSGHD8
13DF CD0000    E                CALL    PMASG
13E2 110000    E                LXI     D,MHEAD3        ;STORE TELEPHONE NO. AT MHEAD3
13E5 0643                       MVI     B,67
13E7 CD3D14    C                CALL    MHA
13EA D2F413    C                JNC     MH21
13ED 78                         MOV     A,B
13EE E6FE                       ANI     0FEH            ;DIVIDE BY 2
13F0 0F                         RRC
13F1 320000    E                STA     HADCT3
13F4 3E02              MH21:    MVI     A,02
13F6 CDC40E    C                CALL    ACRR
13F9 CD1A15    C                CALL    HEADG3          ;PRINT THE TELEPHONE NO.
13FC 3E02                       MVI     A,02
13FE CDC40E    C                CALL    ACRR
1401 CDE914    C                CALL    HEADG1
1404 CD0415    C                CALL    HEADG2
1407 CD1A15    C                CALL    HEADG3
140A 3E02                       MVI     A,02
140C CDC40E    C                CALL    ACRR
140F 113712    C                LXI     D,MSGHD7        ;PRINT 'DO YOU WANT GOVERNMENT MESSAGE TO
1412 CD0000    E                CALL    PMASG           ;TO APPEAR ON YOUR TICKET
1415 CD0000    E       MH13:    CALL    KEYDWN          ;LOOK FOR KEY
1418 FE33                       CPI     WTIN            ;WEIGHT IN KEY IS YES
141A C22714    C                JNZ     MH12
141D AF                         XRA     A
141E 320000    E                STA     GMSGFL          ;STORE IT IN GOVERNMENT MESSAGE FLAG
1421 CDCD17    C                CALL    GOVMSG          ;OUTPUT THE GOVERNMENT MESSAGE
1424 C33114    C                JMP     MH3
1427 FE37              MH12:    CPI     WTOUT
1429 C23414    C                JNZ     MH5
142C AF                         XRA     A
142D 2F                         CMA
142E 320000    E                STA     GMSGFL          ;SET THE FLAG FOR GOVERNMENT MESSAGE
1431 C30000    E       MH3:     JMP     STRET
1434 113511    C       MH5:     LXI     D,MSGHD2        ;ILLEGAL KEY ENTRY
1437 CD0000    E                CALL    PMASG
143A C31514    C                JMP     MH13
                       ;
                       ;
143D 78                MHA:     MOV     A,B
143E 320100    E                STA     FNUMD1+1
1441 CD0000    E                CALL    KEYDWN          ;LOOK FOR KEY
1444 FE11                       CPI     DELET           ;COMPARE WITH DELET KEY
1446 C24B14    C                JNZ     MHA2            ;JUMP IF DELET KEY NOT PRESSED
1449 B7                MHA1:    ORA     A               ;CLEAR CARRY
144A C9                         RET
144B FE60              MHA2:    CPI     60H
144D C26414    C                JNZ     MHA8
1450 3E0A                       MVI     A,10            ;LEAVE 10 SPACE
1452 CD0000    E                CALL    SPACE
1455 1A                         LDAX    D
1456 4F                         MOV     C,A             ;PRINT THE CHARACTER FROM BUFFER
1457 CD0000    E                CALL    PCHAR
145A 13                         INX     D               ;INCREMENT THE POINTER
145B 05                         DCR     B               ;DECREMENT THE COUNTER
145C 0E0D                       MVI     C,ACR
145E CD0000    E                CALL    PCHAR
1461 C3D514    C                JMP     MHA5
1464 FE02              MHA8:    CPI     02H             ;SHIFT KEY?
1466 C27314    C                JNZ     MHA7
1469 3A0000    E                LDA     FNUMD1          ;COMPLEMENT THE SHIFT FLAG
146C 2F                         CMA
146D 320000    E                STA     FNUMD1
1470 C3D514    C                JMP     MHA5
1473 FE65              MHA7:    CPI     ENTER           ;COMPARE WITH ENTER KEY
1475 C28114    C                JNZ     MHA3            ;ENTER KEY PUSHED?
1478 3E0D              MHA9:    MVI     A,ACR
147A 12                         STAX    D
147B 13                         INX     D
147C 3E03                       MVI     A,03H           ;LOAD END OF TEXT CODE
147E 12                         STAX    D               ;STORE IT IN MEMORY
147F 37                         STC
1480 C9                         RET
1481 D5                MHA3:    PUSH    D
1482 5F                         MOV     E,A             ;STORE THE KEY CODE
1483 E60F                       ANI     0FH             ;KEY CODE IS IN FORM 0XXX 0XXX
1485 57                         MOV     D,A             ;SO CONVERT IT TO FORM 00XX XXX
1486 7B                         MOV     A,E
1487 E6F0                       ANI     0F0H
```

```
LOC  OBJ                 SOURCE STATEMENT

1489 0F                          RRC
148A B2                          ORA     D
148B D1                          POP     D
148C C5                          PUSH    B              ;STORE CONVERTED KEY CODE
148D 4F                          MOV     C,A            ;OFF SET TO TABLE
148E 0600                        MVI     B,0
1490 21E612    C                 LXI     H,TABLED
1493 09                          DAD     B              ;OFFSET TO ASCII TABLE
1494 C1                          POP     B
1495 7E                          MOV     A,M            ;BRING THE ASCII CODE
1496 FEFF                        CPI     0FFH
1498 C2A414    C                 JNZ     MHA4           ;JUMP IF VALID KEY
149B 113511    C                 LXI     D,MSGHD2       ;INVALID KEY ENTRY
149E CD0000    E                 CALL    PMASG
14A1 C3D514    C                 JMP     MHA5
14A4 4F                  MHA4:   MOV     C,A
14A5 FE20                        CPI     20H            ;SPACE KEY DO NOT ADD
14A7 CAB514    C                 JZ      MHA6           ;
14AA 3A0000    E                 LDA     FNUMD1         ;IS SHIFT KEY DOWN
14AD B7                          ORA     A
14AE 79                          MOV     A,C
14AF CAB514    C                 JZ      MHA6
14B2 C620                        ADI     20H            ;OTHERWISE ADD 20 KEY TO IT
14B4 4F                          MOV     C,A
14B5 12                  MHA6:   STAX    D
14B6 13                          INX     D
14B7 3E0A                        MVI     A,10           ;LEAVE 10 SPACE FOR CHARACTER
14B9 CD0000    E                 CALL    SPACE
14BC C5                          PUSH    B
14BD CD0000    E                 CALL    PCHAR          ;OUT PUT THE CHARACTER
14C0 0E0D                        MVI     C,ACR
14C2 CD0000    E                 CALL    PCHAR
14C5 C1                          POP     B
14C6 05                          DCR     B
14C7 C2D514    C                 JNZ     MHA5           ;LOOK FOR KEY IF COUNTER NOT EXCEDED
14CA D5                          PUSH    D
14CB 116411    C                 LXI     D,MSGHD3       ;PRINT NO MORE CHARACTER
14CE CD0000    E                 CALL    PMASG
14D1 D1                          POP     D
14D2 C37814    C                 JMP     MHA9
14D5 CD0000    E         MHA5:   CALL    KEYDWN         ;LOOK FOR KEY
14D8 FE11                        CPI     DELET
14DA C24B14    C                 JNZ     MHA2
14DD 1B                          DCX     D              ;DECREMENT THE COUNTER
14DE 04                          INR     B              ;INCREMENT THE COUNTER
14DF 3A0100    E                 LDA     FNUMD1+1
14E2 B8                          CMP     B
14E3 CA4914    C                 JZ      MHA1
14E6 C3D514    C                 JMP     MHA5
14E9 0E01                HEADG1: MVI     C,01           ;SEND THE CONTROL CHARACTER
14EB CD0000    E                 CALL    PCHAR
14EE 0E1C                        MVI     C,1CH          ;EXTENDED MODE
14F0 CD0000    E                 CALL    PCHAR
14F3 3A0000    E                 LDA     HADCT1         ;HADCT1 HAS THE NO. OF SPACES
14F6 B7                          ORA     A              ;RETURN IF NO. OF SPACES IS ZERO
14F7 CAFD14    C                 JZ      HEAD11
14FA CD0000    E                 CALL    SPACE
14FD 110000    E         HEAD11: LXI     D,MHEAD1
1500 CD0000    E                 CALL    PMASG
1503 C9                          RET
1504 0E02                HEADG2: MVI     C,02           ;RETURN TO NORMAL MODE
1506 CD0000    E                 CALL    PCHAR
1509 3A0000    E                 LDA     HADCT2         ;LEAVE NO. OF SPACES
150C B7                          ORA     A
150D CA1315    C                 JZ      HEAD21
1510 CD0000    E                 CALL    SPACE
1513 110000    E         HEAD21: LXI     D,MHEAD2       ;PRINT THE ADDRESS
1516 CD0000    E                 CALL    PMASG
1519 C9                          RET
151A 0E02                HEADG3: MVI     C,02
151C CD0000    E                 CALL    PCHAR
151F 0E1C                        MVI     C,1CH
1521 CD0000    E                 CALL    PCHAR
1524 3A0000    E                 LDA     HADCT3
1527 B7                          ORA     A
1528 CA2E15    C                 JZ      HEAD31
152B CD0000    E                 CALL    SPACE
152E 110000    E         HEAD31: LXI     D,MHEAD3       ;PRINT TELEPHONE NO. IF ANY
1531 CD0000    E                 CALL    PMASG
1534 C9                          RET
                         ;
                         ;
                         ;
                         ;
                         ;***********************************************************************
                         ;***********************************************************************
                         ;
                         ;
1535 0D                  MGOV1:  DB      ACR,ACR,1FH
1536 0D
1537 1F
1538 49206865                    DB      'I HEREBY CERTIFY THAT I HOLD A LICENSE UNDER  THE UNITED '
153C 72656279
1540 20636572
1544 74696679
1548 20746861
154C 74204920
1550 686F6C64
1554 2061206C
1558 6963656E
155C 73652075
1560 6E646572
1564 20205448
```

```
LOC  OBJ        LINE         SOURCE STATEMENT

1566 4520554E
156C 49544544
1570 20
1571 20535441    1957          DB      ' STATES  '
1575 54455320
1579 20
157A 77617265    1958          DB      'WAREHOUSE ACT, AND THE REGULATIONS FOR  GRAIN WAREHOUSES'
157E 686F7573
1582 65206163
1586 742C2061
158A 6E642074
158E 68652072
1592 6567756C
1596 6174696F
159A 6E732066
159E 6F722020
15A2 47726169
15A6 6E205761
15AA 7265686F
15AE 75736573
15B2 20746865    1959          DB      ' THEREUNDER',ACR
15B6 7265756E
15BA 646572
15BD 0D
15BE 746F2069    1960          DB      'TO INSPECT, GRADE AND WEIGH THE KIND OF GRAIN COVERED BY'
15C2 6E737065
15C6 63742C20
15CA 67726164
15CE 6520616E
15D2 64207765
15D6 69676820
15DA 74686520
15DE 6B696E64
15E2 206F6620
15E6 67726169
15EA 6E20636F
15EE 76657265
15F2 64206279
15F6 20746869    1961          DB      ' THIS CERTIFICATE; THAT ON THE ABOVE DATE AND AT THE ABOVE '
15FA 73206365
15FE 72746966
1602 69636174
1606 653B2074
160A 68617420
160E 6F6E2074
1612 68652061
1616 626F7665
161A 20646174
161E 6520616E
1622 64206174
1626 20746865
162A 2061626F
162E 766520
1631 706C6163    1962          DB      'PLACE I INSPECTED,',ACR
1635 65204920
1639 696E7370
163D 65637465
1641 642C
1643 0D
1644 67726164    1963          DB      'GRADED AND WEIGHED THE FOLLOWING LOT OR PARCEL'
1648 65642061
164C 6E642077
1650 65696768
1654 65642074
1658 68652066
165C 6F6C6C6F
1660 77696E67
1664 206C6F74
1668 206F7220
166C 70617263
1670 656C
1672 206F6620    1964          DB      ' OF GRAIN STORED OR TO BE STORED IN THE ',AETX
1676 67726169
167A 6E207374
167E 6F726564
1682 206F7220
1686 746F2062
168A 65207374
168E 6F726564
1692 20696E20
1696 74686520
169A 03
169B 61207761    1965 MGOV2:  DB      'A WAREHOUSE LICENSED UNDER SAID ACT AND'
169F 72656F6F
16A3 75736520
16A7 6C696365
16AB 6E736564
16AF 20756E64
16B3 65722073
16B7 61696420
16BB 61637420
16BF 616E64
16C2 20726567    1966          DB      ' REGULATIONS;   AND THAT THE GRADE OF SAID GRAIN ACCORDING TO'
16C6 756C6174
16CA 696F6E73
16CE 3B202020
16D2 616E6420
16D6 74686174
16DA 20746865
16DE 20677261
16E2 6465206F
16E6 66207361
16EA 69642067
```

```
LOC  OBJ          LINE        SOURCE STATEMENT

16EE 72616E6E
16F2 20616363
16F6 6F726469
16FA 6E672074
16FE 6F
16FF 20746865                  DB      ' THE '
1703 20
1704 6F666669                  DB      'OFFICIAL GRAIN STANDARDS OF',ACR,'THE UNITED STATES, AND THE'
1708 6369616C
170C 20677261
1710 696E2073
1714 74616E64
1718 61726473
171C 206F66
171F 0D
1720 74686520
1724 554E4954
1728 45442053
172C 54415445
1730 532C2061
1734 6E642074
1738 6865
173A 206E6574                  DB      ' NET WEIGHT, HEREOF INCLUDING DOCKAGES, IF ANY WERE AS STATED'
173E 20776569
1742 6768742C
1746 20686572
174A 656F6620
174E 696E636C
1752 7564696E
1756 6720646F
175A 636B6167
175E 65732C20
1762 69662061
1766 6E792077
176A 65726520
176E 61732073
1772 74617465
1776 64
1777 2062656C                  DB      ' BELOW:',ACR,0AH,0AH,'
177B 6F773A
177E 0D
177F 0A
1780 0A
1781 2020205F
1785 5F5F5F5F
1789 5F5F5F5F
178D 5F5F5F5F
1791 5F5F5F5F
1795 5F5F5F5F
1799 5F5F5F5F
179D 5F5F5F5F
17A1 5F202020
17A5 202020
17A8 0D                        DB      ACR
17A9 2020204C                  DB      '   LICENSED INSPECTOR AND WEIGHER'
17AD 4943454E
17B1 53454420
17B5 494E5350
17B9 4543544F
17BD 5220414E
17C1 44205745
17C5 49474845
17C9 52
17CA 0D                        DB      ACR,1EH,AETX
17CB 1E
17CC 03
                         ;
0033                     WTIN    EQU     33H
0037                     WTOUT   EQU     37H
                         ;
                                                 ;THIS ROUTINE CHECKS THE GOVERNMENT MESSAGE
                                                 ;FLAG AND IF IT IS ZERO THEN IT PRINTS OUT
                                                 ;GOVERNMENT MESSAGE OTHERWISE SKIPS
17CD C5                  GOVMSG: PUSH    B
17CE D5                          PUSH    D
17CF E5                          PUSH    H
17D0 F5                          PUSH    PSW
17D1 3A0000      E               LDA     GMSGFL
17D4 B7                          ORA     A
17D5 CAE017      C               JZ      GOVM1
17D8 0E0A                        MVI     C,0AH           ;GIVE LINE FEED
17DA CD0000      E               CALL    PCHAR
17DD C30000      E               JMP     STRET
17E0 113515      C       GOVM1:  LXI     D,MGOV1         ;PRINT THE 1ST PART OF TICKET
17E3 CD0000      E               CALL    PMASG
17E6 3E04                        MVI     A,04
17E8 CD0000      E               CALL    SPACE
17EB 110000      E               LXI     D,MHEAD1        ;PRINT THE NAME OF THE ELEVATOR
17EE CD0000      E               CALL    PMASG
17F1 3E04                        MVI     A,04
17F3 CD0000      E               CALL    SPACE
17F6 110000      E               LXI     D,MHEAD2        ;PRINT THE ADDRESS OF THE ELEVATOR
17F9 CD0000      E               CALL    PMASG
17FC 119B16      C               LXI     D,MGOV2         ;PRINT THE 2ND PART OF THE TICKET
17FF CD0000      E               CALL    PMASG
1802 C30000      E               JMP     STRET
                                 END

PUBLIC SYMBOLS
ACRLF  C 0EA1   ADJPTR C 0FB6   B2D1A7 C 0EAA   B2D1A9 C 0EB0   CONSAL C 051D   GOVMSG C 17CD   HEADG1 C 14E9
HEADG2 C 1504   HEADG3 C 151A   MHEADG C 1326   MPOSR7 C 0318   MSGA19 C 0277   MSGA4  C 0011   MSGA5  C 001A
PCMNAM C 0E69   POSRCD C 0BAC   PRJDA  C 08D3   PRJR   C 08CD   PRJRC  C 07FC   PRNTJR C 052B   PRNTNQ C 0AC3
ROUNDR C 10B2   SETGRN C 1021   SETPT  C 0E6B   SETPTA C 0E6E
```

```
LOC  OBJ          LINE        SOURCE STATEMENT

EXTERNAL SYMBOLS
ADDNTA E 0000   AMOUNT E 0000   AUTOFF E 0000   B2D1   E 0000   B2D1A  E 0000   BASEPR E 0000   BLOADR E 0000
BYDIGT E 0000   CLRSPD E 0000   CMDADF E 0000   CMDOSF E 0000   CODNO  E 0000   CONSA  E 0000   CRAM   E 0000
CRNTCM E 0000   CRNTST E 0000   CUFIND E 0000   D2B2   E 0000   D2BB   E 0000   D2BC   E 0000   DDOT   E 0000
DIGINR E 0000   DISCNT E 0000   DLNGTH E 0000   DMGFL  E 0000   DSCALE E 0000   DSIGN  E 0000   DSTOR0 E 0000
ENTKEY E 0000   FABS   E 0000   FADD   E 0000   FLAG2  E 0000   FLOAD  E 0000   FMFL   E 0000   FMUL   E 0000
FNUMD  E 0000   FNUMD1 E 0000   FNUMD2 E 0000   FPR    E 0000   FQFD2B E 0000   FSTOR  E 0000   FSUB   E 0000
GMSGFL E 0000   GROSBU E 0000   GRSCMB E 0000   GRSCMC E 0000   GRSCML E 0000   GRSCMS E 0000   GRSCMT E 0000
GRSDOL E 0000   GRSSTK E 0000   HADCT1 E 0000   HADCT2 E 0000   HADCT3 E 0000   HEADG  E 0000   KEYDIS E 0000
KEYDWN E 0000   KEYIN  E 0000   KRAM   E 0000   KYSTR  E 0000   LASTKY E 0000   LINEFL E 0000   LOADNO E 0000
MACR   E 0000   MASGP  E 0000   MAXLOD E 0000   MCMTAB E 0000   MCMTB1 E 0000   MCPRG  E 0000   MDAMG  E 0000
MFM    E 0000   MFORM  E 0000   MHEAD1 E 0000   MHEAD2 E 0000   MHEAD3 E 0000   MKRAM  E 0000   MMOISA E 0000
MMOISB E 0000   MMOIST E 0000   MSGELB E 0000   MSGELC E 0000   MSGJ   E 0000   MSTFL  E 0000   MSTOR  E 0000
MSTOR1 E 0000   MTRDEL E 0000   MTW    E 0000   NETAMG E 0000   NETAMS E 0000   NETBU  E 0000   NETCMB E 0000
NETCMC E 0000   NETCMD E 0000   NETCMG E 0000   NETCMS E 0000   NETCMT E 0000   NETMST E 0000   NETWT  E 0000
OFFFL  E 0000   OSLDEC E 0000   OSLTOT E 0000   PCHAR  E 0000   PCUSN  E 0000   PDIGA  E 0000   PDIGB  E 0000
PDOCK  E 0000   PMASG  E 0000   PNET1  E 0000   POSNO  E 0000   PRDTR  E 0000   PRGM7  E 0000   PRICEF E 0000
PRJRA  E 0000   PRJRFL E 0000   PRLOC0 E 0000   PRLOC1 E 0000   PRLOCK E 0000   PRNTWT E 0000   PRSLT  E 0000
PRSLTA E 0000   PTIKT  E 0000   PTKTB1 E 0000   PTKTB4 E 0000   PTKTF  E 0000   PTSTWT E 0000   ROUNDF E 0000
RUNPR  E 0000   SCOMN  E 0000   SELLFL E 0000   SERNO  E 0000   SERV   E 0000   SERVFL E 0000   SETLEF E 0000
SHAREF E 0000   SMLR   E 0000   SPACE  E 0000   SRVRT  E 0000   SSFIND E 0000   SSNO   E 0000   STRET  E 0000
TOTDOC E 0000   TRANFL E 0000   TRASTA E 0000   TRNCTR E 0000   TWFL   E 0000   WOGDEC E 0000   WOGINC E 0000
WOGTOT E 0000   WRLCAN E 0000   WRLISS E 0000   WRLOUT E 0000

USER SYMBOLS
ACR    A 000D   ACRLF  C 0EA1   ACRR   C 0EC4   ADDNTA E 0000   ADJFTR C 0EB6   AETX   A 0003   AFF    A 000C
ALF    A 000A   AMOUNT E 0000   ASP    A 0020   ASPR   C 07E6   AUTOFF E 0000   B2D1   E 0000   B2D1A  E 0000
B2D1A7 C 0EAA   B2D1A9 C 0EB0   BASEPR E 0000   BLOADR E 0000   BOT1   C 0AB1   BYDIGT E 0000   CLBM   C 0B65
CLRSPD E 0000   CLRTW  C 0B8D   CLRTW1 C 0BA4   CLRTWA C 0BA2   CMDADF E 0000   CMDOSF E 0000   CODNO  E 0000
CONSA  E 0000   CONSAL C 051D   CONSAM C 0528   CRAM   E 0000   CRNTCM E 0000   CRNTST E 0000   CUFIND E 0000
D2B2   E 0000   D2BB   E 0000   D2BC   E 0000   DAMAGE A 0066   DDOT   E 0000   DECSUB C 0EEA   DELET  A 0011
DIGINR E 0000   DISCNT E 0000   DLNGTH E 0000   DMGFL  E 0000   DSCALE E 0000   DSIGN  E 0000   DSTOR0 E 0000
ENTER  A 0065   ENTKEY E 0000   FABS   E 0000   FADD   E 0000   FALSE  A 0000   FLAG2  E 0000   FLOAD  E 0000
FM     A 0062   FMFL   E 0000   FMUL   E 0000   FNUMD  E 0000   FNUMD1 E 0000   FNUMD2 E 0000   FPR    E 0000
FQFD2B E 0000   FSTOR  E 0000   FSUB   E 0000   GMSGFL E 0000   GOVM1  C 17E0   GOVMSG C 17CD   GROSBU E 0000
GRSCMB E 0000   GRSCMC E 0000   GRSCMD E 0000   GRSCMS E 0000   GRSCMT E 0000   GRSDOL E 0000   GRSSTK E 0000
HADCT1 E 0000   HADCT2 E 0000   HADCT3 E 0000   HEAD11 C 14FD   HEAD21 C 1513   HEAD31 C 152E   HEADG  E 0000
HEADG1 C 14E9   HEADG2 C 1504   HEADG3 C 151A   HEADGR C 0B00   KEYDIS E 0000   KEYDWN E 0000   KEYIN  E 0000
KRAM   E 0000   KYSTR  E 0000   LASTKY E 0000   LINEFL E 0000   LOADNO E 0000   MACR   E 0000   MASGP  E 0000
MAXLOD E 0000   MCMTAB E 0000   MCMTB1 E 0000   MCPRG  E 0000   MDAMG  E 0000   MFM    E 0000   MFORM  E 0000
MGOV1  C 1535   MGOV2  C 169B   MH1    C 134A   MH11   C 1352   MH12   C 1427   MH13   C 1415   MH14   C 139C
MH2    C 1344   MH21   C 13F4   MH3    C 1431   MH4    C 13D4   MH5    C 1434   MH6    C 1384   MH8    C 13F4
MHA    C 143D   MHA1   C 1449   MHA2   C 144B   MHA3   C 1461   MHA4   C 14A4   MHA5   C 14D5   MHA6   C 14B5
MHA7   C 1473   MHA8   C 1464   MHA9   C 1478   MHEAD1 E 0000   MHEAD2 E 0000   MHEAD3 E 0000   MHEADG C 1326
MINUS  A 002D   MKRAM  E 0000   MMOISA E 0000   MMOISB E 0000   MMOIST E 0000   MOIST  A 0067   MOISTA A 0060
MOISTB A 0081   MPOSR2 C 02B9   MPOSR3 C 02D4   MPOSR4 C 02ED   MPOSR5 C 0302   MPOSR6 C 030A   MPOSR7 C 0318
MPOSR8 C 0331   MPOSR9 C 0349   MPSR10 C 039A   MPSR11 C 03C3   MPSR12 C 0474   MSGA10 C 0109   MSGA11 C 0114
MSGA12 C 0130   MSGA13 C 0142   MSGA14 C 014A   MSGA15 C 01E9   MSGA16 C 0213   MSGA17 C 0244   MSGA18 C 026F
MSGA19 C 0277   MSGA2  C 0000   MSGA20 C 02B2   MSGA21 C 0144   MSGA3  C 0009   MSGA4  C 0011   MSGA5  C 001A
MSGA6  C 0022   MSGA7  C 0025   MSGA8  C 00E5   MSGA9  C 00FB   MSGELB E 0000   MSGELC E 0000   MSGHD1 C 10FA
MSGHD2 C 1135   MSGHD3 C 1164   MSGHD4 C 11A6   MSGHD5 C 11DF   MSGHD6 C 1208   MSGHD7 C 1237   MSGHD8 C 12A7
MSGJ   E 0000   MSTFL  E 0000   MSTOR  E 0000   MSTOR1 E 0000   MTRDEL E 0000   MTW    E 0000   NCOMOD A 0009
NETAMG E 0000   NETAMS E 0000   NETBU  E 0000   NETCMB E 0000   NETCMC E 0000   NETCMD E 0000   NETCMG E 0000
NETCMS E 0000   NETCMT E 0000   NETMST E 0000   NETWT  E 0000   OFFFL  E 0000   OSLDEC E 0000   OSLTOT E 0000
PBOTOM C 0A72   PCHAR  E 0000   PCMNAM C 0E69   PCUSN  E 0000   PDIGA  E 0000   PDIGB  E 0000   PDOCK  E 0000
PERIOD A 002E   PLUS   A 002B   PMASG  E 0000   PNET1  E 0000   POSA   C 0E5D   POSA1  C 0E64   POSNO  E 0000
POSR1  C 0BE8   POSR2  C 0BEB   POSR7  C 0C19   POSR8  C 0CAD   POSR9  C 0D4A   POSRCD C 0BAC   PR121  C 07B4
PR122  C 079F   PRDTR  E 0000   PRGM7  E 0000   PRICEF E 0000   PRJ002 C 0847   PRJ003 C 0851   PRJ004 C 087E
PRJDA  C 08D3   PRJR   C 08CD   PRJR1  C 08DB   PRJR10 C 0A35   PRJR11 C 0A25   PRJR12 C 0A70   PRJR21 C 09B7
PRJR3  C 0916   PRJR31 C 09C5   PRJR32 C 0A1B   PRJR33 C 08ED   PRJR34 C 0906   PRJR35 C 09F0   PRJR36 C 09F6
PRJR37 C 0A5D   PRJR39 C 09D5   PRJR4  C 091B   PRJR5  C 0985   PRJR6  C 098C   PRJR7  C 0996   PRJR8  C 0A51
PRJR9  C 0A6C   PRJRA  E 0000   PRJRC  C 07FC   PRJRC1 C 0831   PRJRC2 C 0800   PRJRC5 C 0860   PRJRD  C 08FB
PRJRFL E 0000   PRJRSS C 0EF1   PRLOC0 E 0000   PRLOC1 E 0000   PRLOCK E 0000   PRNT1  C 0542   PRNT10 C 0717
PRNT12 C 0790   PRNT13 C 0754   PRNT14 C 0751   PRNT15 C 067D   PRNT16 C 0680   PRNT17 C 0780   PRNT18 C 06A0
PRNT2  C 0579   PRNT3  C 057F   PRNT5  C 0663   PRNT6  C 0667   PRNT7  C 06CD   PRNT8  C 06D6   PRNTJR C 052B
PRNTNO C 0AC3   PRNTWT E 0000   PRSLT  E 0000   PRSLTA E 0000   PRSLTB C 07EC   PSS1   C 0EFE   PSS2   C 0F0F
PSS3   C 0F44   PSS31  C 0F72   PSS33  C 0F5A   PSS4   C 0F15   PSS41  C 0F3D   PSS42  C 0F2A   PSSA   C 0F79
PSSA1  C 0FC2   PSSC   C 0FC6   PSSC1  C 0FF4   PSSC2  C 0FDD   PSSC3  C 0FF2   PSTATS C 0B6F   PTIKT  E 0000
PTKTB1 E 0000   PTKTB4 E 0000   PTKTF  E 0000   PTSTWT E 0000   ROUND1 C 10C1   ROUND2 C 10D9   ROUND3 C 10E6
ROUNDF E 0000   ROUNDR C 10B2   RUNPR  E 0000   SCOMN  E 0000   SELL   A 0003   SELLFL E 0000   SERNO  E 0000
SERV   E 0000   SERVFL E 0000   SETGR0 C 102A   SETGR1 C 104E   SETGR2 C 106F   SETGR3 C 10A0   SETGR4 C 109E
SETGRN C 1021   SETLEF E 0000   SETPT  C 0E6B   SETPT1 C 0E74   SETPT2 C 0E80   SETPTA C 0E6E   SHAREF E 0000
SMLR   E 0000   SPACE  E 0000   SRVRT  E 0000   SSFIND E 0000   SSNO   E 0000   STGRNA C 1002   STGRNE C 1020
STRET  E 0000   STRETC C 07F3   TABLED C 12E6   TESTWT A 0073   TOTDOC E 0000   TRANFL E 0000   TRASHR C 0ECC
TRASTA E 0000   TRNCTR E 0000   TRUE   A 00FF   TWFL   E 0000   WOGDEC E 0000   WOGINC E 0000   WOGTOT E 0000
WRLCAN E 0000   WRLISS E 0000   WRLOUT E 0000   WTIN   A 0033   WTOUT  A 0037
ASSEMBLY COMPLETE,   NO ERRORS




ISIS-II 8080/8085 MACRO ASSEMBLER, V3.0          MODULE

  LOC  OBJ          LINE        SOURCE STATEMENT

                      $MOD85
                      $DEBUG
                      ;THIS PROGRAM HAS BEEN REDUCED BY REMOVING ALL CONTROL LIGHT
                      ;AND CONTROL FUNCTIONS AND WILL BE HENCEFORTH KNOWN AS GRAINC.ASM
                      ;IT IS CREATED BY STARTING WITH GRAINB.ASM AS MODIFIED FOR DICKEN
                      ;        GRAINB  SAME AS GRAINA BUT HAS NEW PPROG1 ROUTINE
                      ;        AND ADDITION OF FORM FEED IN TRPM50
                      ;        ALSO ADDITION OF FORM FEED KEY (SELECT PROGRAM) AND
                      ;        LINE FEED KEY (ENTER CONTROL PROGRAM)
                      ;        UPDATED AT  1/10/81
                      ;
                      ;1/29/81 THIS DATE ADDED SOFTWARE TO OBTAIN A DAILY POSITION REPORT
                      ;  THE LINE FEED KEY WAS CONVERTED TO THIS USE
                      ;
                      ;THIS DATE CRAM MEMORY LOCATION WAS CHANGED AND A KRAM MEMORY LOCATION
```

```
LOC  OBJ     SOURCE STATEMENT

             ;WAS ADDED FOR THE PURPOSE OF COMPLETING THE DAILY POSITION REPORT
             ;
             ;THIS DATE 2/21/81, TRPMER CHANGED TO HANDLE NON ENTRIES OF WTIN,
             ;WTOUT, AND MOISTURE
             ;
             ;2/21/81 -THIS DATE DTRANR MODIFIED TO UPDATE MEMORY WHEN A TRANSACTION
             ;         IS DELETED.  THIS INSURES THE CORRECTNESS OF THE DAILY POS REPORT
             ;
             ;2/24/81 -THIS DATE TWO NEW ROUTINES ARE ADDED;
             ;         CUSPR   ENTERED VIA CUST/PRICE/PRINT/ENTER
             ;                 REVIEWS ALL TRANSACTIONS IN BUFFERS AND ADDS CURRENT
             ;                 MARKET PRICE AS PROGRAMED INTO THOSE TRANSACTIONS LISTED
             ;                 AS "SELL" WITH NO PRICE ENTRY
             ;
             ;         CUSLST          LISTS ALL INCOMPLETED TRANSACTIONS AND INDICATES WHAT IS
             ;                 MISSING FROM EACH
             ;
             ;2/28/81 -UPDATED TO MAKE CUSPR AND CUSLST WORK BETTER
             ;
             ;3/7/81  -CONTROL PROGRAMS ADDED - UPDATED TO MAKE CUSPR AND CUSLST
             ;         WORK BETTER - ALSO ADDED BIT 6 IN BYTE 29 OF CUSTOMER
             ;         TRANSACTION AS A MANUAL INDICATOR FOR SCALE ENTRIES
             ;3/26/81 -UPDATED DIGINR ROUTINE ADDED CAPABILITY TO ROLLOVER THE DIGIT
             ;         TO BOTTOM DISPLAY AND IT RETURNS THE ASCII CODE FOR DIGIT KEY
             ;         AT LOCATION KYSTR+25 AND FLOATING POINT BINARY NO. AT BYDIGT
             ;
             ;3/28/81 - FURTHER UPDATE TO DIGINR AND UPDATE TO DAYPR ROUTINES
             ;
             ;
             ;OPERATING SOFTWARE FOR GRAIN MASTER  V.1.45
             ;
             ;;;;;;;;;;;;;;;;;;;;;;;;;;;;;;;;;;;;;;;;;;;;;;;;;;;;;;;;;;;;;;;;
             ;
             ;CUSTOMER VALUE EQUATES
             ;
             ;;;;;;;;;;;;;;;;;;;;;;;;;;;;;;;;;;;;;;;;;;;;;;;;;;;;;;;;;;;;;;;;
             ;
00FF         TRUE     EQU     0FFH
0000         FALSE    EQU     0
0002         NPORTS   EQU     2
0010         NCNTRL   EQU     16
0009         NCOMOD   EQU     9         ;CORN,BEANS,WHEAT,OATS,MILO,RICE-A,B,C,SUNFLWR
0000         SCALEA   EQU     FALSE     ;ELECTROSCALE
00FF         SCALEB   EQU     TRUE      ;NCI SCALE - NATIONAL CONTROLS INC.
             ;
             ;;;;;;;;;;;;;;;;;;;;;;;;;;;;;;;;;;;;;;;;;;;;;;;;;;;;;;;;;;;;;;;;
             ;
             ;
             ;
0000         BEGIN    EQU     00H
             ;
             ;KEYBOARD EQUATES, ROW BY COLUMN
             ;
             ;
0060         CUST     EQU     60H
0064         PRINT    EQU     64H
0065         ENTER    EQU     65H
0044         COMOD1   EQU     44H                 ;CORN
0040         COMOD2   EQU     40H                 ;BEANS
0045         COMOD3   EQU     45H                 ;WHEAT
0054         COMOD4   EQU     54H                 ;SUNFLOWER
0050         COMOD5   EQU     50H                 ;RICE
0055         COMOD6   EQU     55H                 ;MILO
0051         COMOD7   EQU     51H                 ;OATS
0041         COMODA   EQU     41H                 ;A-KEY
0075         COMODB   EQU     75H                 ;B-KEY
0071         COMODC   EQU     71H                 ;C-KEY
0034         NINE     EQU     34H
0030         SIX      EQU     30H
0035         THREE    EQU     35H
0031         DOT      EQU     31H
0004         EIGHT    EQU     04H
0000         FIVE     EQU     00H
0005         TWO      EQU     05H
0001         ZERO     EQU     01H
0014         SEVEN    EQU     14H
0010         FOUR     EQU     10H
0015         ONE      EQU     15H
0011         DFLET    EQU     11H
0003         SELL     EQU     03H
0007         STORE    EQU     07H
0002         CONTR    EQU     02H                 ;CONTRACT
0006         DLYPR    EQU     06H                 ;DELAY PRICE
0033         WTIN     EQU     33H                 ;WEIGHT IN
0037         WTOUT    EQU     37H                 ;WEIGHT OUT
0032         SHARE    EQU     32H                 ;SHARES
0036         SERVIC   EQU     36H                 ;SERVICE
0053         PROGRM   EQU     53H                 ;PROGRAM
0057         DTRANS   EQU     57H                 ;DELETE TRANSACTION
0052         PROGDT   EQU     52H                 ;PROGRAM DATE
0056         SETSHT   EQU     56H                 ;SETTLEMENT SHEET
0043         FFEED    EQU     43H                 ;FORM FEED PROGRAM
0047         OFF      EQU     47H
0042         PLOCK    EQU     42H                 ;PRINT LOCK
0046         DPRK     EQU     46H                 ;DAILY POSITION REPORT KEY
0073         TESTWT   EQU     73H                 ;TEST WEIGHT
0077         CNTRL    EQU     77H                 ;CONTROL
0072         PJOURN   EQU     72H                 ;PRINT JOURNAL
0076         LOCK     EQU     76H
0063         PRICE    EQU     63H
0067         MOIST    EQU     67H                 ;MOISTURE
0062         FM       EQU     62H                 ;FOREIGN MATERIAL
0066         DAMAGE   EQU     66H
```

```
LOC   OBJ          LINE     SOURCE STATEMENT

0075               BEPOFF  EQU     75H
                   ;                DUMMY KEYS
0080               MOISTA  EQU     80H               ;FOR LO RANGE MOIST
0081               MOISTB  EQU     81H               ;FOR HI RANGE MOIST
0082               SHRFAC  EQU     82H               ;SHRINKAGE FOR DRYING
0083               COMODD  EQU     83H               ;DUMMY FOR CCMDCHK
0084               COMODE  EQU     84H               ;DUMMY FOR CMDCHK
0085               MINTW   EQU     85H               ;MIN TW  BEFORE DOCKAGE
0086               MINDMG  EQU     86H               ;MIN DMG BEFORE DOCKAGE
0087               MINFM   EQU     87H               ;MIN FM  BEFORE DOCKAGE
                   ;END OF KEYBOARD EQUATES
                   ;
                   ;;;;;;;;;;;;;;;;;;;;;;;;;;;;;;;;;;;;;;;;;;;;;;;;;;;;;;;;;;;;;;;;
                   ;
                   ;
8800               PORTS   EQU     BEGIN + 8800H
                   ;
                   ;DISPLAY LOCATIONS
                   ;
8800               DIS00   EQU     PORTS + 00H       ;LAMP FIELD 13-16
8801               DIS01   EQU     PORTS + 01H       ;    "    "   9-12
8802               DIS02   EQU     PORTS + 02H       ;    "    "   5-8
8803               DIS03   EQU     PORTS + 03H       ;    "    "   1-4
8808               DIS08   EQU     PORTS + 08H       ;LS SCRATCH PAD DISPLAY
8809               DIS09   EQU     PORTS + 09H       ;MID  "    "    "
880A               DIS10   EQU     PORTS + 0AH       ;MS   "    "    "
880B               DIS11   EQU     PORTS + 0BH       ;MS WT DISPLAY
8810               DIS16   EQU     PORTS + 10H       ;MISC. LAMPS 1-6
8811               DIS17   EQU     PORTS + 11H       ;MISC LAMPS 7-12
8812               DIS18   EQU     PORTS + 12H       ;MISC LAMPS 13-16
8813               DIS19   EQU     PORTS + 13H       ;MISC LAMPS 19-24
8818               DIS24   EQU     PORTS + 18H       ;WT DISPLAY LS DIGIT
8819               DIS25   EQU     PORTS + 19H       ;    "     10'S
881A               DIS26   EQU     PORTS + 1AH       ;    "     100'S
881B               DIS27   EQU     PORTS + 1BH       ;    "     1000'S
                   ;
                   ;SEGMENT CODES FOR SEVEN SEGMENT DISPLAYS
                   ;
003F               SEG0    EQU     3FH
0006               SEG1    EQU     06H
005B               SEG2    EQU     5BH
004F               SEG3    EQU     4FH
0066               SEG4    EQU     66H
006D               SEG5    EQU     6DH
007C               SEG6    EQU     7CH
0007               SEG7    EQU     07H
007F               SEG8    EQU     7FH
0067               SEG9    EQU     67H
0000               SEGBL   EQU     00H
0077               SEGA    EQU     77H
007C               SEGB    EQU     7CH
0039               SEGC    EQU     39H
0058               SEGLC   EQU     58H        ;LITTLE C
005E               SEGD    EQU     5EH
0080               SEGDP   EQU     80H
0079               SEGE    EQU     79H
0071               SEGF    EQU     71H
006F               SEGG    EQU     6FH
0076               SEGH    EQU     76H
0037               SEGHM   EQU     37H        ;HALF AN M
0004               SEGI    EQU     04H
001E               SEGJ    EQU     1EH
0038               SEGL    EQU     38H
0054               SEGN    EQU     54H
005C               SEGO    EQU     5CH
0073               SEGP    EQU     73H
0050               SEGR    EQU     50H
006D               SEGS    EQU     6DH
0078               SEGT    EQU     78H
001C               SEGU    EQU     1CH
006E               SEGY    EQU     6EH
                   ;
                   ;
8828               INTR    EQU     PORTS + 28H       ;INTERRUPT PORT
9000               OUTPT   EQU     9000H             ;START OF 8-I/O PORTS
9007               PRINTR  EQU     OUTPT + 07H       ;PRINTER PARALLEL INT
                   ;
0026               TRANSL  EQU     26H               ;TRANSACTION LENGTH
00D2               NTRANS  EQU     210               ;# OF TRANS MAX IN BUFFER
0014               KMAX    EQU     14H               ;MAX. # OF KYSTR ENTRIES
                   ;
0C00               RBUFF0  EQU     0C00H
                   ;
0000               ROM     EQU     BEGIN             ;START OF 32K OF PROM
C000               EXRAM   EQU     BEGIN + 0C000H    ;16K OF CUSTOMER RAM
8000               RAM     EQU     BEGIN + 8000H     ;1K SCRATCH PAD RAM
8400               CRAM    EQU     8400H             ;CUSTOMER RAM
FC00               KRAM    EQU     0FC00H
8300               ENSTAK  EQU     RAM +300H
83FF               STSTAK  EQU     RAM + 3FFH
                   ;
                   ;
                   ;
                   ;        ASCII TABLE
                   ;
0000               ANUL    EQU     00H
0001               ASOH    EQU     01H
0002               ASTX    EQU     02H
0003               AETX    EQU     03H
0004               AEOT    EQU     04H
0005               AENQ    EQU     05H
0006               AACK    EQU     06H
0007               ABEL    EQU     07H
0008               ABS     EQU     08H
```

```
LOC   OBJ     SOURCE STATEMENT

0009          AHT     EQU   09H
000A          ALF     EQU   0AH
000B          AVT     EQU   0BH
000C          AFF     EQU   0CH
000D          ACR     EQU   0DH
000E          ASOA    EQU   0EH
000F          ASIA    EQU   0FH
0010          ADLE    EQU   10H
0011          ADC1    EQU   11H
0012          ADC2    EQU   12H
0013          ADC3    EQU   13H
0014          ADC4    EQU   14H
0015          ANAK    EQU   15H
0016          ASYN    EQU   16H
0017          AETB    EQU   17H
0018          ACAN    EQU   18H
0019          AEM     EQU   19H
001A          ASUB    EQU   1AH
001B          AESC    EQU   1BH
001C          AFS     EQU   1CH
001D          AGS     EQU   1DH
001E          ARS     EQU   1EH
001F          AUS     EQU   1FH
0020          ASP     EQU   20H
0021          EXC     EQU   21H      ;EXCLAMATION MARK, !
0022          QUOTE   EQU   22H
0023          NUM     EQU   23H      ;#
0024          DOLLAR  EQU   24H      ;$
0025          PERCNT  EQU   25H      ;%
0026          AMPSND  EQU   26H      ;&
0027          APOS    EQU   27H      ;'
0028          LPAR    EQU   28H      ;(
0029          RPAR    EQU   29H      ;)
002A          ASTRIC  EQU   2AH      ;*
002B          PLUS    EQU   2BH      ;+
002C          BLANK   EQU   2CH      ;
002D          MINUS   EQU   2DH      ;-
002E          PERIOD  EQU   2EH      ;.
002F          RSLASH  EQU   2FH      ;/
003A          COLON   EQU   3AH      ;COLON
003B          SEMCOL  EQU   3BH      ;SEMICOLON
003C          LABR    EQU   3CH      ;<
003D          EQUAL   EQU   3DH      ;=
003E          RABR    EQU   3EH      ;>
003F          QUES    EQU   3FH      ;?
0040          COMER   EQU   40H      ;@
0041          AA      EQU   41H
0042          AB      EQU   42H
0043          AC      EQU   43H
0044          AD      EQU   44H
0045          AE      EQU   45H
0046          AF      EQU   46H
0047          AG      EQU   47H
0048          AH      EQU   48H
0049          AI      EQU   49H
004A          AJ      EQU   4AH
004B          AK      EQU   4BH
004C          AL      EQU   4CH
004D          AM      EQU   4DH
004E          AN      EQU   4EH
004F          AO      EQU   4FH
0050          AP      EQU   50H
0051          AQ      EQU   51H
0052          AR      EQU   52H
0053          AS      EQU   53H
0054          AT      EQU   54H
0055          AU      EQU   55H
0056          AV      EQU   56H
0057          AW      EQU   57H
0058          AX      EQU   58H
0059          AY      EQU   59H
005A          AZ      EQU   5AH
005B          LFTB    EQU   5BH      ;LEFT BRACKET, [
005C          LSLASH  EQU   5CH      ;\
005D          RTB     EQU   5DH      ;RIGHT BRACKET, ]
005E          UP      EQU   5EH      ;ARROW UP
005F          ALFT    EQU   5FH      ;<----, ARROW LEFT
0060          ACSNT   EQU   60H      ;ACCSENT, `
0061          ASA     EQU   61H      ;SMALL A
0062          ASB     EQU   62H
0063          ASC     EQU   63H
0064          ASD     EQU   64H
0065          ASE     EQU   65H
0066          ASF     EQU   66H
0067          ASG     EQU   67H
0068          ASH     EQU   68H
0069          ASI     EQU   69H
006A          ASJ     EQU   6AH
006B          ASK     EQU   6BH
006C          ASL     EQU   6CH
006D          ASM     EQU   6DH
006E          ASN     EQU   6EH
006F          ASO     EQU   6FH
0070          ALP     EQU   70H      ;LITTLE P
0071          ASQ     EQU   71H
0072          ASR     EQU   72H
0073          ALS     EQU   73H
0074          AST     EQU   74H
0075          ASU     EQU   75H
0076          ASV     EQU   76H
0077          ASW     EQU   77H
0078          ASX     EQU   78H
0079          ASY     EQU   79H
```

```
LOC  OBJ        LINE    SOURCE STATEMENT

007A                ASZ      EQU     7AH
007B                LEFT     EQU     7BH      ;[
007C                VLIN     EQU     7CH      ;VERTICAL LINE
007D                RGHT     EQU     7DH      ;]
007E                WAVY     EQU     7EH      ;
007F                RBOUT    EQU     7FH      ;DEL, RUB OUT
                    ;
                    ;FIXED RAM LOCATIONS
                    ;
                    ;
                             DSEG
                    ;
0000                KYSTR:   DS      40       ;KEY ENTRY BUFFER
0028                KEYCNT:  DS      1        ;KEY ENTRY COUNTER
0029                KEYPTR:  DS      2        ;KYSTR POINTER WORD
002B                ERFLB:   DS      1        ;ERROR FLASH BYTE
002C                LOCKFL:  DS      1        ;LOCK FLAG
002D                EMERFL:  DS      1        ;EMERGENCY FLAG
002E                OFFFL:   DS      1        ;OFF FLAG
002F                PWRFL:   DS      1        ;AC POWER OFF FLAGS
0030                PERRFL:  DS      1        ;PRINT ERROR FLAG
0031                TRPSTR:  DS      1        ;TRANSACTON PIECE MEAL TEMP STORE
0032                TRNCTR:  DS      3        ;TRANSACTION COUNTER (1ST TWO BYTES)
                                              ;3RD BYTE-ASCII CHAR. FRO A-Z FOR DASH#
0035                WAITFL:  DS      1        ;SIGNALS WHEN WE WANT TO USE 5 DIGIT DISPLAY
0036                PRLOCK:  DS      1        ;PRINT LOCK FLAG, MS BIT;1-SUPPRESS $,CENTS
0037                PRLOC0:  DS      1        ;MANUAL PRINT KEY INSERTION
                                              ;0-NOT SUPP $,LAST 4 BITS-# COPIES (< 10)
0038                PRLOC1:  DS      1        ;TEMPORARY STORAGE IN PRINT JOURNAL ROUTINE
                                              ;IT HAS THE NO. OF COPIES TO BE PRINTED
0039                PRINTF:  DS      1        ;PRINT FLAG
003A                PRGFL:   DS      1        ;PROGRAM FLAG, INDICATES CORR. SER# SEQUENCE
003B                BEEPFL:  DS      1        ;BEEP FLAG , BYTE 1 - ACTUAL BEEP FLAG
003C                SRNKFL:  DS      1        ;SHRINK FLAG
003D                STATUS:  DS      1        ;
                    ;
003E                FSTFL:   DS      1        ;FIRST TIME FLAG, FOR USE WITH CNCHKR
003F                INPB:    DS      NPORTS   ;INPORT BYTE, ALSO FOR USE WITH CNCHKR
                    ;
0041                DAY:     DS      1        ;DAY PACKED BCD
0042                MONTH:   DS      1        ;MONTH
0043                YEAR:    DS      1        ;YEAR
0044                HOUR:    DS      1        ;HOUR
0045                MIN:     DS      1        ;MIN
0046                SECS:    DS      1        ;SECONDS
                    ;
0047                DPFLAG:  DS      1        ;DECIMAL POINT FLAG
0048                CUPTS:   DS      1        ;CUSTOMER FIND TEMP. STORE
0049                CUSTFL:  DS      1        ;IF 00-HAS TO BE CUST 000
                                              ;IF NE 00-SOME OTHER CUST #
004A                CNTRFL:  DS      1        ;CONTROL FLAG, INDICATES WHETHER CHECK
                                              ;OF EXTERNAL RAM PORTS CAN BE SCANNED
004B                CNTRLB:  DS      NPORTS   ;FIRST 2 ARE ACTIVE PROGRAM
                                                      ;LAST 10 ARE 5 STORED PROGRAMS
                    ;
004D                FPR:     DS      18
005F                FNUMP:   DS      4                ;TEMP PRINTER STORAGE- BINARY
0063                DSIGN:   DS      1        ;SIGN IN ASCII
0064                DSCALE:  DS      2        ;EXPONENT
0066                DLNGTH:  DS      1        ;LENGTH OF NUMBER
0067                DADDR:   DS      2        ;STARTING ADDRESS
                    ;
0069                CMSMSK:  DS      NCOMOD   ;COMODITY STORAGE MASK BYTE-"DOCKAGE",2,"NEXT"
                                              ;WE GET A 1 IN STATUS BYTE, BIT POSITION
                                              ;CORRESPONDING TO THIS DOCKAGE IN A COMODITY
                                              ;MASK BYTE
0072                COMB:    DS      1        ;COMMODITY BYTE, FOR PROGRAM ROUTINE
                                                  ;KEEPS CURRENT COMOD. #
0018                CMDSL    EQU     24
0073                COMODS:  DS      CMDSL*NCOMOD     ;COMODS FORMAT
                                                      ;PRICE   XX.XX (ELEVATOR PAYS CUST)
                                                      ;SELL    XX.XX   ,CENTS/BU/LB (CUST BUY)
                                                      ;MOIST  .XX XX   ,   "      "
                                                      ;FM     .XX XX   ,   "      "
                                                      ;DAM    .XX XX   ,   "      "
                                                      ;TW     .XX XX   ,   "      "
                                                      ;MOISTA .XX XX   ,   "
                                                      ;MOISTB .XX XX   ,CENTS/BU/%
                                                      ;SHRFAC  XX.XX%  ,SHRINK FACTOR
                                                      ;MIN WT BEFORE T.W. LOCK XX.XX LB
014B                MSTSTA:  DS      1                ;STATUS STORE FOR MOISTURE BREAK POINT
014C                NETAVG:  DS      4                ;AVERAGE MOISTURE INTAKE TODAY
0150                GRSNET:  DS      4                ;ASHISH PRIVATE STORAGE LOCATION
0154                FNUMD:   DS      20               ;TEMP STORE FOR DECIMAL DIGITS
0168                FLAG1:   DS      1                ;A.S.
0169                FLAG2:   DS      1                ;A.S.
016A                PRJRFL:  DS      1                ;A.S.
016B                PRICEF:  DS      5                ;A.S.
0170                SCOMN:   DS      1                ;A.S.
0171                FNUMD1:  DS      11               ;A.S.
017C                FNUMD2:  DS      5                ;A.S.
0181                FNUMF1:  DS      5                ;A.S.
0186                FNUMF2:  DS      5                ;A.S.
018B                FNUMD3:  DS      5                ;A.S.
0190                FNUMF3:  DS      5                ;A.S.
0195                RUNPR:   DS      5                ;A.S.
019A                MOISTF:  DS      4                ;A.S.
019E                SELLFL:  DS      1                ;FLAG IS SET WHEN ELEVATOR IS SELLING GRAIN
                                                      ;TO CUSTOMER IN PTIKT
019F                PRESFL:  DS      1                ;A.S.
01A0                NPRGFL:  DS      1                ;NO PROG LISTING AFTER PP FLAG
01A1                CRNTS1:  DS      1                ;FLAG USED IN PRINT JOURNAL
01A2                GRSDOL:  DS      4                ;FLAG FOR GROSS DOLLAR
                    ;RAM COPY FOR DISPLAY LOCATIONS
```

```
LOC  OBJ        LINE      SOURCE STATEMENT

                     ;
01A6                 DIM00:  DS     1          ;LAMP FIELD 13-16
01A7                 DIM01:  DS     1          ;    "    "   9-12
01A8                 DIM02:  DS     1          ;    "    "   5-8
01A9                 DIM03:  DS     1          ;    "    "   1-4
01AA                 DIM08:  DS     1          ;LS SCRATCH PAD DISPLAY
01AB                 DIM09:  DS     1          ;MID   "     "     "
01AC                 DIM10:  DS     1          ;MS    "     "     "
01AD                 DIM11:  DS     1          ;MS WT DISPLAY
01AE                 DIM16:  DS     1          ;MISC. LAMP 1-6
01AF                 DIM17:  DS     1          ;     "     7-12
01B0                 DIM18:  DS     1          ;     "     13-18
01B1                 DIM19:  DS     1          ;     "     19-24
01B2                 DIM24:  DS     1          ;WT DISPLAY IS DIG
01B3                 DIM25:  DS     1          ;     "     10'S
01B4                 DIM26:  DS     1          ;     "     100'S
01B5                 DIM27:  DS     1          ;     "     1000'S
01B6                 DESTOR: DS     1          ; TEVALES PERSONAL STORAGE LOCATION!!
01B7                 DSTOR0: DS     2          ; TEMP STORAGE FOR HL
01B9                 DSTOR1: DS     1          ; TEMP STORAGE IN COMODR
01BA                 TKSTR:  DS     1          ;TEMP ACC STORAGE
01BB                 TRANFL: DS     4          ;STORAGE FOR TRANSCACTION NO IN BCD
01BF                 NETWT:  DS     5          ;STORAGE FOR NETWT IN BCD
01C4                 GROSBU: DS     5          ;GROSS BUSHELS IN BINARY
01C9                 NETBU:  DS     5          ;NET BUSHELS IN BINARY
01CE                 MSTFL:  DS     4          ;MOISTURE IN BCD
01D2                 FMFL:   DS     4          ;FM IN BCD
01D6                 DMGFL:  DS     4          ;DAMAGE IN BCD
01DA                 BASEPR: DS     5          ;BASE PRICE IN BCD
01DF                 TRASTA: DS     1          ;TRANSACTION STATUS
01E0                 LINEFL: DS     1          ;LINE FLAG TO INDICATE NUMBER OF LINES LEFT ON
                                               ;PAGE
01E1                 SERVFL: DS     1          ;FLAG IS SET IN PRINTING SETTLEMENT SHEET WHEN
                                               ;IT IS PRINTING ONLY SERVICE CHARGE
01E2                 CRNTCM: DS     1          ;USED IN PRJR
01E3                 MAXLOD: DS     1          ;USED IN PRJR
01E4                 LOADNO: DS     1          ;USED IN PRJR
01E5                 AMOUNT: DS     5          ;STORAGE LOCATION FOR STORING TOTAL
01EA                 SERV:   DS     5          ;STORAGE FOR STORING NET SERVICE CHARGE
01EF                 SRVRT:  DS     5          ;STORAGE FOR STORING UNIT SERVICE SHARGE
01F4                 DISCNT: DS     5          ;DISCOUNT IN BINARY
01F9                 TOTDOC: DS     5          ;STORAGE FOR CALCULATING TOTAL DOCKAGE
01FE                 TWFL:   DS     4          ;STORAGE FOR TEST WT IN BCD
0202                 SHAREF: DS     1          ;STORAGE LOCATION FOR STORING SHARES
0203                 SETLEF: DS     1          ;FLAG FOR SINGLE CUSTOMER SETTLEMENT SHEET
0204                 COMDNN: DS     1          ;STORE ARE THERE NO NUMBERS IN DIGINR?
0205                 GACFLG: DS     1          ;WAS MOISTURE ALREADY ENTERED BY THE GAC II?
0206                 MSTAMT: DS     4          ;TEMPORAPY MOISTURE STORE
020A                 DTRFL:  DS     1          ;DELETE TRANSACTION FLAG
020B                 ROUNDF: DS     7          ;ROUND OFF STORAGE
0212                 SAVPTR: DS     2          ;HL REG STORAGE
0214                 FFORMF: DS     1          ;FORM FEED FLAG IF 0FFH THEN FORM FEED B-4 PRLR
0215                 MORGFL: DS     1          ;ORIGINAL FLAG FOR TRPMER
0216                 BYDIGT: DS     5          ;FLOATING POINT BINARY NO. RETURNED FROM DIGINR
021B                 DELETF: DS     1          ;DELETE FLAG
021C                 CONSA:  DS     1          ;PROGRAM FOR POGDOG IN TRUE PORDOG IF FALSE
021D                 BYDIG0: DS     6          ;EXTRA STORAGE FOR BYDIGT - SPACE FOR NINE
                                               ;DIGIT NUMBER FOR PRSLT
0226                 GMSGFL: DS     1          ;FLAG FOR GOVERNMENT MESSAGE TO BE PRINTED OUT OR NOT
                                               ;
0227                 GRSCMB: DS     NCOMOD SHL 2   ;GROSS BUSHELS BOUGHT TO DAY IN BINARY
024B                 GRSCMS: DS     NCOMOD SHL 2   ;GROSS BUSHELS RECEIVED FOR STORAGE
026F                 GRSCMC: DS     NCOMOD SHL 2   ;GROSS BUSHELS RECEIVED FOR CONTRACT
0293                 GRSCMD: DS     NCOMOD SHL 2   ;GROSS BUSHELS RECEIVED FOR DLY PRICE
02B7                 GRSCMT: DS     NCOMOD SHL 2   ;GROSS BUSHELS SHIPPED OUT
                     ;
                             ;
                             ASEG
                     ;
FC00                         ORG    KRAM
FC00                 NETCMB: DS     NCOMOD SHL 2   ;NET BU. PER DAY IN FL. PT.
FC24                 NETCMS: DS     NCOMOD SHL 2   ;NET RECEIVED FOR STORAGE
FC48                 NETCMC: DS     NCOMOD SHL 2   ;NET RECEIVED FOR CONTRACT
FC6C                 NETCMD: DS     NCOMOD SHL 2   ;NET RECEIVED FOR DELAY PRICE
FC90                 NETCMT: DS     NCOMOD SHL 2   ;NET SHIPPED THIS DAY
FCB4                 NETCMG: DS     NCOMOD SHL 2   ;GROSS TEMPORARY RECEIVED
FCD8                 NETMST: DS     NCOMOD SHL 2   ;MOISTURE REVENUE
FCFC                 NETAMS: DS     NCOMOD SHL 2   ;WEIGHTED SUM FOR AVERAGE MOISTURE INTAKE
FD20                 NETAMG: DS     NCOMOD SHL 2   ;DIVISOR FOR NETAMS TO GET NETAVG
FD44                 WRLISS: DS     NCOMOD SHL 2   ;WAREHOUSE RECEIPTS LIABILITY ISSUED
FD68                 WRLCAN: DS     NCOMOD SHL 2   ;    "        "        "     CANCELLED
FD8C                 OSLDEC: DS     NCOMOD SHL 2   ;DECREASE IN OPEN STORAGE LIABILITY
FDB0                 WOGINC: DS     NCOMOD SHL 2   ;INCREASE IN WAREHOUSE OWNED GRAIN
FDD4                 WOGDEC: DS     NCOMOD SHL 2   ;DECREASE IN WAREHOUSE OWNED GRAIN
                     MKRAM:
FDF8                 WRLOUT: DS     NCOMOD SHL 2   ;WAREHOUSE RECPTS LIABILITY OUTSTANDING
FE1C                 GRSSTK: DS     NCOMOD SHL 2   ;TOTAL STOCK IN
FE40                 OSLTOT: DS     NCOMOD SHL 2   ;TOTAL OPEN STORAGE LIABILITY
FE64                 WOGTOT: DS     NCOMOD SHL 2   ;TOTAL WAREHOUSE OWNED GRAIN
FE88                 GRISAL: DS     NCOMOD SHL 2   ;GROSS IN SALE OR DELAY PRICE
FEAC                 GRICON: DS     NCOMOD SHL 2   ;GROSS IN CONTRACT
FED0                 GRISTR: DS     NCOMOD SHL 2   ;GROSS IN STORAGE
FEF4                 HADCT1: DS     1              ;COUNTER FOR PRINTING HEADING HAS THE NO. OF
                                                   ;SPACE TO PUT IN FRONT OF NAME
FEF5                 SERNO:  DS     4              ;SERIAL NO.
FEF9                 MHEAD1: DS     42             ;STORAGE FOR STORING NAME
FF23                 MHEAD2: DS     72             ;STORAGE FOR STORING ADDRESS
FF6B                 HADCT2: DS     1
FF6C                 HADCT3: DS     1              ;STORAGE FOR STORING TELEPHONE NO.
FF6D                 MHEAD3: DS     72             ;SPACE TO LEAVE IN FRONT OF TELEPHONE NO.
FFB5                 CODNO:  DS     7              ;STORAGE FOR STORING C C CODE NO.
FFBC                 SSNO:   DS     2              ;SETTLEMENT SHEET NO.
FFBE                 POSNO:  DS     2              ;STORAGE FOR STORING DAILY POSITION PAGE NO.
FFC0                 SHORTF: DS     1              ;THIS FLAG IS SET TO GET SHORT FORM TICKET
```

```
LOC  OBJ             SOURCE STATEMENT

FFC1                 CHEATF: DS      1            ;THIS FLAG IS SET WHEN MOISTURE FIGURES ARE
                                                  ;TO BE ROUNDED OFF.
FFC2                 PPORT:  DS      2            ;PRINTER PORT
                             CSEG
                     ;
                     ;
                     ;;;;;;;;;;;;;;;;;;;;;;;;;;;;;;;;;;;;;;;;;;;;;;;;;;;;;;;;;;;;;;;
                     ;
                     ;LIST OF EXTERNAL SYMBOLS
                     ;
                     ;;;;;;;;;;;;;;;;;;;;;;;;;;;;;;;;;;;;;;;;;;;;;;;;;;;;;;;;;;;;;;;
                     ;
                             EXTRN   PCHAR,PMASG,FSTOR,FQFB2D,FQFD2B,PTIKT,FSET
                             EXTRN   FADD,FLOAD,PRJR,PRLR,FRESET,FSTAT,MACR
                             EXTRN   MSTAVG,FFORMA,FRSLTA,FRJDA,KEYFLG,FMOSTB,TSTWTB
                             EXTRN   PCMNAM,POSRCD,D2B1,ADJPTR,MSGELB
                             EXTRN   MSGELC,PCUSN,HEADG,PRSLT,PNET1,SKYFLG,WTSTOR
                             EXTRN   KEYIN,SSFIND,CUFIND,BUFBLR,DLYR,TRFIND
                             EXTRN   BEEP,SMLR,PRJRA,B2D1A7,D2BB,GACMN,FFORMB
                             EXTRN   ACRR,ADDNTA,SETGRN,MSGA4,MSGA5,MHEADG
                             EXTRN   SETPT,SETPTA,MPOSR7
                             IF      SCALEA
                             EXTRN   GETWT
                             ENDIF
                             IF      SCALEB
                             EXTRN   GETWT2
                             ENDIF
                     ;
                     ;;;;;;;;;;;;;;;;;;;;;;;;;;;;;;;;;;;;;;;;;;;;;;;;;;;;;;;;;;;;;;;
                     ;
                     ;;;;;;;;;;;;;;;;;;;;;;;;;;;;;;;;;;;;;;;;;;;;;;;;;;;;;;;;;;;;;;;
                     ;
                     ;LIST OF PUBLIC SYMBOLS
                     ;
                     ;;;;;;;;;;;;;;;;;;;;;;;;;;;;;;;;;;;;;;;;;;;;;;;;;;;;;;;;;;;;;;;
                     ;
                             PUBLIC  CMDOSF,CMDADF,PWRFL,STRET,CRAM,PRDTR,ERDIS
                             PUBLIC  FM,DAMAGE,CMSTAT,TRNCTR,DIM19,PRINTR
                             PUBLIC  FPR,DSCALE,DLNGTH,DSIGN,DADDR,CMDFLT,SHRFAC
                             PUBLIC  MCMTAB,FLAG1,PRICEF,SCOMN,FNUMD1,FNUMD2
                             PUBLIC  FNUMF1,FNUMF2,RUNPR,MOISTF,PRESFL,PRLOCK,DIM11,DIM27
                             PUBLIC  OFFFL,STRETM,FNUMF3,FNUMD3,MSTMIN,NETCMD
                             PUBLIC  FLAG2,PRJRFL,FRGM7,FERRFL,NETCMG,NETMST
                             PUBLIC  NETCMB,NETCMS,NETCMC,NETCMT,DESTOR,NETAMS,OSLDEC
                             PUBLIC  NETAVG,STATUS,SRNKFL,GRSNET,DSTOR0,PRLOC0,OSLTOT
                             PUBLIC  NETAMG,MSTSTA,SPACE,GRSSTK,WRLISS,WRLOUT,WOGTOT
                             PUBLIC  MCFRG,MTW,MPM,MDAMG,MTRDEL,WRLCAN,WOGINC,DDOT
                             PUBLIC  MKRAM,KRAM,TRANFL,NETWT,GROSBU,NETBU,MSTFL,FMFL
                             PUBLIC  DMGFL,BASEPR,TRASTA,LINEFL,SERVFL,CRNTCM,MAXLOD
                             PUBLIC  LOADNO,AMOUNT,SERV,SRVRT,DISCNT,TOTDOC,TWFL,SHAREF
                             PUBLIC  SETLEP,WOGDEC,KYSTP,SELLFL,AUTOFF,MFORM
                             PUBLIC  GACFLG,MSTAMT,DTRFL,ROUNDF,CONSA,KEYDIS
                             PUBLIC  MMOISA,MMOISB,MMOIST,FNUMD,ENTKEY,DIGINR,BYDIGT
                             PUBLIC  GRISAL,GRICON,GRISTR,TRAFR,KEYDWN,HADCT1
                             PUBLIC  HADCT2,SERNO,MHEAD1,MHEAD2,CODNO,CLRSPD,BLOADR,GMSGFL
                             PUBLIC  CRNTST,GRSDOL,SSNO,HADCT3,MHEAD3,POSNO,PPORT
                             PUBLIC  GRSCMB,GRSCMS,GRSCMC,GRSCMD,GRSCMT,FRLOC1,SHORTF
                     ;
                     ;
                     ;;;;;;;;;;;;;;;;;;;;;;;;;;;;;;;;;;;;;;;;;;;;;;;;;;;;;;;;;;;;;;;
                     ;
                     ;
                     ;
0000 00                      NOP
0001 00                      NOP
0002 F3                      DI
0003 C39B2E    C             JMP     INIT0
0006 00                      NOP
0007 00                      NOP
                     ;
0008 FB                      EI
0009 C9                      RET
                     ;
000A 00                      NOP
000B 00                      NOP
000C 00                      NOP
000D 00                      NOP
000E 00                      NOP
000F 00                      NOP
                     ;
0010 FB                      EI
0011 C9                      RET
                     ;
0012 00                      NOP
0013 00                      NOP
0014 00                      NOP
0015 00                      NOP
0016 00                      NOP
0017 00                      NOP
                     ;
0018 FB                      EI
0019 C9                      RET
                     ;
001A 00                      NOP
001B 00                      NOP
001C 00                      NOP
001D 00                      NOP
001E 00                      NOP
001F 00                      NOP
                     ;
0020 FB                      EI
0021 C9                      RET
                     ;
0022 00                      NOP
```

```
LOC  OBJ                  SOURCE STATEMENT

0023 00                          NOP
0024 C34711    C                 JMP     TRAPR
0027 00                          NOP
0028 00                          NOP
0029 00                          NOP
                         ;
002A FB                          EI
002B C9                          RET
                         ;
002C 00                          NOP
002D 00                          NOP
002E C3DD17    C                 JMP     INT55
0031 00                          NOP
                         ;
0032 FB                          EI
0033 C9                          RET
                         ;
0034 00                          NOP
0035 00                          NOP
0036 C33412    C                 JMP     INT65
0039 00                          NOP
                         ;
003A FB                          EI
003B C9                          RET
                         ;
003C 00                          NOP
003D 00                          NOP
003E C35715    C                 JMP     INT75
                         ;
                         ;
                         ;
0041 0000                WOM00:  DW      0               ;BYTE BUCKET
                         ;
0043 44                  KYTAB2: DB      COMOD1
0044 40                          DB      COMOD2
0045 45                          DB      COMOD3
0046 54                          DB      COMOD4
0047 50                          DB      COMOD5
0048 50                          DB      COMOD5
0049 50                          DB      COMOD5
004A 55                          DB      COMOD6
004B 51                          DB      COMOD7
004C 03                  KYTAB1: DB      SELL
004D 07                          DB      STORE
004E 02                          DB      CONTR
004F 06                          DB      DLYPR
0050 3F                  SEGTAB: DB      SEG0,SEG1,SEG2,SEG3,SEG4,SEG5,SEG6
0051 06
0052 5B
0053 4F
0054 66
0055 6D
0056 7C
0057 07                          DB      SEG7,SEG8,SEG9,SEGBL,SEGBL,SEGBL
0058 7F
0059 67
005A 00
005B 00
005C 00
005D 00                          DB      SEGBL,SEGBL,SEGBL
005E 00
005F 00
0060 01                  KEYDIG: DB      ZERO,ONE,TWO,THREE,FOUR
0061 15
0062 05
0063 35
0064 10
0065 00                          DB      FIVE,SIX,SEVEN,EIGHT,NINE
0066 30
0067 14
0068 04
0069 34
006A 44                  COMTAB: DB      COMOD1,COMOD2,COMOD3,COMOD4
006B 40
006C 45
006D 54
006E 50                          DB      COMOD5,COMOD6,COMOD7
006F 55
0070 51
                         ENCMTB:
                         ;
                         ;;;;;;;;;;;;;;;;;;;;;;;;;;;;;;;;;;;;;;;;;;;;;;;;;;;;;;;;;;;;;;;;;;;;;;;;;;;
                         ;
                         ;COMMODITY FIXED WEIGHTS FORMAT XX.XXLBS PER BU OR CWT
                         ;
                         ;;;;;;;;;;;;;;;;;;;;;;;;;;;;;;;;;;;;;;;;;;;;;;;;;;;;;;;;;;;;;;;;;;;;;;;;;;;
                         ;
0071 0056                CMDFLT: DW      5600H                   ;CORN
0073 0060                        DW      6000H                   ;BEANS
0075 0060                        DW      6000H                   ;WHEAT
0077 9999                        DW      9999H                   ;SUNFLOWER- CWT
0079 9999                        DW      9999H,9999H,9999H       ;RICE- CWT
007B 9999
007D 9999
007F 9999                        DW      9999H                   ;MILO- CWT?
0081 0032                        DW      3200H                   ;OATS
                         ;
                         ;
                         ;;;;;;;;;;;;;;;;;;;;;;;;;;;;;;;;;;;;;;;;;;;;;;;;;;;;;;;;;;;;;;;;;;;;;;;;
                         ;FORMAT FOR COMNUM AND CMSTAT
                         ;
                         ;       COMNUM LISTS THE VALID COMMODITY #S FOR THE MAJOR
                         ;               COMMOD KEYS. IE. COMOD1 IS FOR CORN
                         ;               WHICH CAN HAVE THREE TYPES
```

```
LOC  OBJ         SOURCE STATEMENT

            ;               THEREFORE #S 1,2,&3 ARE SET ASIDE FOR
            ;               THE THREE TYPES OF CORN AND THE SECOND
            ;               ENTRY IS FOR BEANS
            ;               WHICH IS A 4 (COMOD2), ETC
            ;          CMSTAT THEN TELLS WHETHER A SECOND COMMODITY
            ;               IS REQUIRED FOR THIS COMMODITY BY SETTING
            ;               B7 TO A ONE AND ALSO THE 4LSB'S ENCODE
            ;               STANDARD UNITS, B FOR BU AND C FOR CWT.
            ;
            ;;;;;;;;;;;;;;;;;;;;;;;;;;;;;;;;;;;;;;;;;;;;;;;;;;;;;;;;;;;;;;;;;
            ;

0083 01     COMNUM: DB      1,2,3,4,5,8,9,10
0084 02
0085 03
0086 04
0087 05
0088 08
0089 09
008A 0A
008B 0B     CMSTAT: DB      0BH,0BH,0BH,0CH,8CH,8CH,8CH
008C 0B
008D 0B
008E 0C
008F 8C
0090 8C
0091 8C
0092 0C             DB      0CH,0BH
0093 0B
            ;
            ;;;;;;;;;;;;;;;;;;;;;;;;;;;;;;;;;;;;;;;;;;;;;;;;;;;;;;;;;;;;;;;;;
            ;
            ;               MSTMIN TABLE GIVES GOVERNMENT
            ;               ESTABLISHED MINIMUM MOISTURES
            ;               FOR WHICH NO DOCKAGE IS ALLOWED
            ;               BELOW THAT POINT.
            ;               TWO WORDS PER COMMODITY ARE DEFINED
            ;               WITH THE FORMAT: XX.XX% WITH THE
            ;               LEAST SIGNIFICANT BYTE HOLDING
            ;               THE DIGITS AFTER THE DECIMAL POINT
            ;               THE FIRST WORD APPLIES TO SELL AND CONTRACT
            ;               THE SECOND WORD APPLIES TO STORE AND DELY PRICE.
            ;               BCD FORMAT IS EMPLOYED.
            ;
            ;;;;;;;;;;;;;;;;;;;;;;;;;;;;;;;;;;;;;;;;;;;;;;;;;;;;;;;;;;;;;;;;;
            ;
0094 5015   MSTMIN: DW      1550H,1400H
0096 0014
0098 0013           DW      1300H,1300H
009A 0013
009C 0013           DW      1300H,1300H
009E 0013
00A0 0013           DW      1300H,1300H
00A2 0013
00A4 0013           DW      1300H,1300H,1300H,1300H,1300H,1300H
00A6 0013
00A8 0013
00AA 0013
00AC 0013
00AE 0013
00B0 0013           DW      1300H,1300H
00B2 0013
00B4 0013           DW      1300H,1300H
00B6 0013
            ;
00B8 63     KEYTAB: DB      PRICE,MOIST,FM,DAMAGE,TESTWT,CNTRL,PJOURN,LOCK
00B9 67
00BA 62
00BB 66
00BC 73
00BD 77
00BE 72
00BF 76
00C0 43             DB      PFEED,OFF,PLOCK,DPRK,PROGRM,DTRANS,PROGDT,SETSHT
00C1 47
00C2 42
00C3 46
00C4 53
00C5 57
00C6 52
00C7 56
00C8 33             DB      WTIN,WTOUT,SHARE,SERVIC,SELL,STORE,CONTR,DLYPR
00C9 37
00CA 32
00CB 36
00CC 03
00CD 07
00CE 02
00CF 06
00D0 11             DB      DELET,PRINT,CUST,COMOD1,COMOD2,COMOD3,COMOD4,COMOD5
00D1 64
00D2 60
00D3 44
00D4 40
00D5 45
00D6 54
00D7 50
00D8 55             DB      COMOD6,COMOD7,COMODA,COMODB,COMODC,SHRFAC
00D9 51
00DA 41
00DB 75
00DC 71
00DD 82
00DE 73     KEYSEG: DB      SEGP,SEGR,SEGI,20H        ;PRICE KEY
```

```
LOC  OBJ        LINE     SOURCE STATEMENT

00DF 50
00E0 04
00E1 20
00E2 B101    D   760      DW      DIM19
00E4 76          761      DB      SEGH,SEG2,SEG0,08H       ;% MOISTURE
00E5 5B
00E6 3F
00E7 08
00E8 B001    D   762      DW      DIM18
00EA 71          763      DB      SEGF,SEGO,SEGR,04H       ;FOREIGN MATERIAL
00EB 5C
00EC 50
00ED 04
00EE B001    D   764      DW      DIM18
00F0 5E          765      DB      SEGD,SEGG,SEGE,01H       ;DAMAGE
00F1 6F
00F2 79
00F3 01
00F4 B001    D   766      DW      DIM18
00F6 38          767      DB      SEGL,SEGB,SEGS,02H       ;TEST WEIGHT
00F7 7C
00F8 6D
00F9 02
00FA B001    D   768      DW      DIM18
00FC 39          769      DB      SEGC,SEGN,SEG1,00H       ;CONTROL
00FD 54
00FE 06
00FF 00
0100 4100    C   770      DW      WOM00                    ;****
0102 73          771      DB      SEGP,SEGJ,SEGL,00H       ;PRINT JOURNAL
0103 1E
0104 38
0105 00
0106 4100    C   772      DW      WOM00
0108 38          773      DB      SEGL,SEGO,SEGC,00H       ;LOCK
0109 5C
010A 39
010B 00
010C 4100    C   774      DW      WOM00
010E 71          775      DB      SEGF,SEGF,SEGD,00H       ;FORM FEED
010F 71
0110 5E
0111 00
0112 4100    C   776      DW      WOM00
0114 3F          777      DB      SEG0,SEGF,SEGF,00H       ;OFF
0115 71
0116 71
0117 00
0118 4100    C   778      DW      WOM00
011A 73          779      DB      SEGP,SEGL,SEGC,10H       ;PRINT LOCK
011B 38
011C 39
011D 10
011E B101    D   780      DW      DIM19
0120 5E          781      DB      SEGD,SEGP,SEGR,00H       ;DAILY POSITION REPORT
0121 73
0122 50
0123 00
0124 4100    C   782      DW      WOM00
0126 73          783      DB      SEGP,SEGR,SEGO,04H       ;PROGRAM
0127 50
0128 5C
0129 04
012A B101    D   784      DW      DIM19
012C 5E          785      DB      SEGD,SEGL,SEGE,00H       ;DELETE TRANSACTION
012D 38
012E 79
012F 00
0130 4100    C   786      DW      WOM00
0132 73          787      DB      SEGP,SEGR,SEGD,08H       ;PROGRAM DATE
0133 50
0134 5E
0135 08
0136 B101    D   788      DW      DIM19
0138 6D          789      DB      SEGS,SEGS,SEGH,00H       ;SETTLEMENT SHEET
0139 6D
013A 76
013B 00
013C 4100    C   790      DW      WOM00
013E 38          791      DB      SEGL,SEGB,SEG1,20H       ;WEIGHT IN
013F 7C
0140 06
0141 20
0142 AE01    D   792      DW      DIM16
0144 38          793      DB      SEGL,SEGB,SEG2,10H       ;WEIGHT OUT
0145 7C
0146 5B
0147 10
0148 AE01    D   794      DW      DIM16
014A 6D          795      DB      SEGS,SEGH,SEGR,01H       ;SHARE
014B 76
014C 50
014D 01
014E B101    D   796      DW      DIM19
0150 6D          797      DB      SEGS,SEGE,SEGR,02H       ;SERVICE
0151 79
0152 50
0153 02
0154 B101    D   798      DW      DIM19
0156 6D          799      DB      SEGS,SEGL,SEGL,02H       ;SELL
0157 38
0158 38
0159 02
015A AF01    D   800      DW      DIM17
```

```
LOC  OBJ            LINE        SOURCE STATEMENT

015C 6D              801         DB      SEGS,SEGT,SEGO,01H        ;STORE
015D 78
015E 5C
015F 01
0160 AF01       D    802         DW      DIM17
0162 39              803         DB      SEGC,SEGO,SEGN,20H        ;CONTRACT
0163 5C
0164 54
0165 20
0166 B001       D    804         DW      DIM18
0168 5E              805         DB      SEGD,SEGP,SEGR,10H        ;DELAY PRICE
0169 73
016A 50
016B 10
016C B001       D    806         DW      DIM18
016E 3F              807         DB      SEG0,SEG0,SEG0,00H        ;DELETE
016F 3F
0170 3F
0171 00
0172 4100       C    808         DW      WOM00
0174 73              809         DB      SEGP,SEGR,SEGN,00H        ;PRINT
0175 50
0176 54
0177 00
0178 4100       C    810         DW      WOM00
017A 39              811         DB      SEGC,SEGU,SEGN,00H        ;CUSTOMER
017B 1C
017C 54
017D 00
017E 4100       C    812         DW      WOM00
0180 39              813         DB      SEGC,SEGR,SEGN,08H        ;CORN
0181 50
0182 54
0183 08
0184 AE01       D    814         DW      DIM16
0186 00              815         DB      SEGBL,SEGB,SEGN,04H       ;BEAN
0187 7C
0188 54
0189 04
018A AE01       D    816         DW      DIM16
018C 1C              817         DB      SEGU,SEGU,SEGH,01H        ;WHEAT
018D 1C
018E 76
018F 01
0190 AE01       D    818         DW      DIM16
0192 6D              819         DB      SEGS,SEGU,SEGN,08H        ;SUNFLOWER
0193 1C
0194 54
0195 08
0196 AF01       D    820         DW      DIM17
0198 50              821         DB      SEGR,SEGI,SEGLC,02H       ;RICE
0199 04
019A 58
019B 02
019C AE01       D    822         DW      DIM16
019E 37              823         DB      SEGHM,SEGHM,SEGI,10H      ;MILO
019F 37
01A0 04
01A1 10
01A2 AF01       D    824         DW      DIM17
01A4 00              825         DB      SEGBL,SEG0,SEGA,20H       ;OATS
01A5 3F
01A6 77
01A7 20
01A8 AF01       D    826         DW      DIM17
01AA 00              827         DB      SEGBL,SEGBL,SEGA,04H      ;KEY A
01AB 00
01AC 77
01AD 04
01AE AF01       D    828         DW      DIM17
01B0 00              829         DB      SEGBL,SEGBL,SEGB,04H      ;KEY B
01B1 00
01B2 7C
01B3 04
01B4 AF01       D    830         DW      DIM17
01B6 00              831         DB      SEGBL,SEGBL,SEGC,04H      ;KEY C
01B7 00
01B8 39
01B9 04
01BA AF01       D    832         DW      DIM17
01BC 6D              833         DB      SEGS,SEGH,SEGF,00H        ;SHRINK FACTOR
01BD 76
01BE 71
01BF 00
01C0 4100       C    834         DW      WOM00
                     835 ;
                     836 ;;;;;;;;;;;;;;;;;;;;;;;;;;;;;;;;;;;;;;;;;;;;;;;;;;;;;;;;;;;;;;;;;;;;;;
                     837 ;
                     838 ;                    COMMODITY MESSAGES
                     839 ;
                     840 ;;;;;;;;;;;;;;;;;;;;;;;;;;;;;;;;;;;;;;;;;;;;;;;;;;;;;;;;;;;;;;;;;;;;;;
                     841 ;
01C2 20434F52        842 MCOM1:  DB      ' CORN  ',AETX
01C6 4E2020
01C9 03
01CA 20424541        843 MCOM2:  DB      ' BEANS ',AETX
01CE 4E5320
01D1 03
01D2 20574845        844 MCOM3:  DB      ' WHEAT ',AETX
01D6 415420
01D9 03
01DA 2053554E        845 MCOM4:  DB      ' SUNFLOWER ',AETX
01DE 464C4F57
01E2 455220
```

```
LOC  OBJ           LINE     SOURCE STATEMENT

01E5 03
01E6 20524943      846 MCOM5:  DB     ' RICE-A ',AETX
01EA 452D4120
01EE 03
01EF 20524943      847 MCOM6:  DB     ' RICE-B ',AETX
01F3 452D4220
01F7 03
01F8 20524943      848 MCOM7:  DB     ' RICE-C ',AETX
01FC 452D4320
0200 03
0201 204D494C      849 MCOM8:  DB     ' MILO  ',AETX
0205 4F2020
0208 03
0209 204F4154      850 MCOM9:  DB     ' OATS  ',AETX
020D 532020
0210 03
                   851 ;
0211 C201     C    852 MCMTAB: DW     MCOM1,MCOM2,MCOM3,MCOM4,MCOM5,MCOM6
0213 CA01     C
0215 D201     C
0217 DA01     C
0219 E601     C
021B EF01     C
021D F801     C    853         DW     MCOM7,MCOM8,MCOM9
021F 0102     C
0221 0902     C
                   854 ;
0223 37            855 DATSEG: DB     SEGHM,SEGHM,SEGO,SEGD,SEGA,SEGY
0224 37
0225 5C
0226 5E
0227 77
0228 6E
0229 00            856         DB     SEGBL,SEGY,SEGR,SEGBL,SEGH,SEGR
022A 6E
022B 50
022C 00
022D 76
022E 50
022F 37            857         DB     SEGHM,SEGHM,SEGI,SEGS,SEGE,SEGC
0230 37
0231 04
0232 6D
0233 79
0234 39
0235 0D            858 MBFULL: DB     ACR
0236 4E4F2054      859         DB     'NO TRANSACTIONS CAN BE DELETED'
023A 52414E53
023E 41435449
0242 4F4E5320
0246 43414E20
024A 42452044
024E 454C4554
0252 4544
0254 0D            860         DB     ACR
0255 1F            861 MFJE1:  DB     1FH,'PLEASE COMPLETE SOME TRANSACTIONS AND PRINT DAILY'
0256 504C4541
025A 53452043
025E 4F4D504C
0262 45544520
0266 534F4D45
026A 20545241
026E 4E534143
0272 54494F4E
0276 5320414E
027A 44205052
027E 494E5420
0282 4441494C
0286 59
0287 4A4F5552      862         DB     'JOURNAL TO DELETE COMPLETED TRANSACTIONS '
028B 4E414C20
028F 544F2044
0293 454C4554
0297 4520434F
029B 4D504C45
029F 54454420
02A3 5452414E
02A7 53414354
02AB 494F4E53
02AF 20
02B0 0D            863         DB     ACR,ALF,1EH,ALF,ALF,ALF,ALF,AETX
02B1 0A
02B2 1E
02B3 0A
02B4 0A
02B5 0A
02B6 0A
02B7 03
02B8 5452414E      864 MFJE:   DB     'TRANSACTION BUFFER IS FULL'
02BC 53414354
02C0 494F4E20
02C4 42554646
02C8 45522049
02CC 53204655
02D0 4C4C
02D2 0D            865         DB     ACR,ALF,ALF,ALF,ALF,ALF,ALF,AETX
02D3 0A
02D4 0A
02D5 0A
02D6 0A
02D7 0A
02D8 0A
02D9 03
```

```
LOC  OBJ        LINE     SOURCE STATEMENT

02DA 5452414E    866 MTDNE:  DB      'TRANSACTION DOES NOT EXIST'
02DE 53414354
02E2 494F4E20
02E6 444F4553
02EA 204E4F54
02EE 20455849
02F2 5354
02F4 0A          867         DB      ALF,ACR,ALF,ALF,ALF
02F5 0D
02F6 0A
02F7 0A
02F8 0A
02F9 0A          868         DB      ALF,AETX
02FA 03
02FB 20202054    869 MTRDEL: DB      '   TRANSACTION DELETED'
02FF 52414E53
0303 41435449
0307 4F4E2044
030B 454C4554
030F 4544
0311 0D          870         DB      ACR,ALF,ALF,AETX
0312 0A
0313 0A
0314 03
0315 2049533A    871 MCSUF:  DB      ' IS:'          ;MESSAGE COMOD SUFFIX
0319 0D          872         DB      ACR,AETX
031A 03
031B 20485253    873 MHRDAT: DB      ' HRS.  DATE '  ;FOR PRINT DATE AND TIME ROUTINE
031F 2E202044
0323 41544520
0327 0D          874 MCFRG:  DB      ACR,'CURRENT PROGRAMMING FOR '
0328 43555252
032C 454E5420
0330 50524F47
0334 52414D4D
0338 494E4720
033C 464F5220
0340 03          875         DB      AETX
0341 4445414C    876 MPRIC:  DB      'DEALER PURCHASE PRICE      $'
0345 45522050
0349 55524348
034D 41534520
0351 50524943
0355 45202020
0359 202024
035C 03          877         DB      AETX
035D 0D          878 MSELP:  DB      ACR,'DEALER SELLING PRICE       $'
035E 4445414C
0362 45522053
0366 454C4C49
036A 4E472050
036E 52494345
0372 20202020
0376 202024
0379 03          879         DB      AETX
037A 0A          880 MDKGPR: DB      ALF,ACR,'  DOCKAGE PROGRAMMING:'
037B 0D
037C 2020444F
0380 434B4147
0384 45205052
0388 4F475241
038C 4D4D494E
0390 473A
0392 0D          881         DB      ACR,AETX
0393 03
0394 20202020    882 MMOISA: DB      '    MOISTURE DOCK SELL   $.'
0398 4D4F4953
039C 54555245
03A0 20444F43
03A4 4B205345
03A8 4C4C2020
03AC 20242E
03AF 03          883         DB      AETX
03B0 20202020    884 MMOISB: DB      '    MOISTURE DOCK STORE  $.'
03B4 4D4F4953
03B8 54555245
03BC 20444F43
03C0 4B205354
03C4 4F524520
03C8 20242E
03CB 03          885         DB      AETX
03CC 20202020    886 MMOIST: DB      '    DRYING CHARGE        $.',AETX
03D0 44525949
03D4 4E472043
03D8 48415247
03DC 45202020
03E0 20202020
03E4 20242E
03E7 03
03E8 20202020    887 MSHFAC: DB      '    SHRINK FACTOR          '
03EC 53485249
03F0 4E4B2046
03F4 4143544F
03F8 52202020
03FC 2020
03FE 03          888         DB      AETX
03FF 20202020    889 MFM:    DB      '    FOREIGN MATERIAL    $.'
0403 464F5245
0407 49474E20
040B 4D415445
040F 5249414C
0413 20202020
0417 20242E
041A 03          890         DB      AETX
```

```
LOC  OBJ           LINE    SOURCE STATEMENT

041B 20202020       891 MDAMG:  DB      '    DAMAGE             $.'
041F 44414D41
0423 47452020
0427 20202020
042B 20202020
042F 20202020
0433 20242E
0436 03             892         DB      AETX
0437 20202020       893 MTW:    DB      '    TEST WEIGHT        $.'
043B 54455354
043F 20574549
0443 47485420
0447 20202020
044B 20202020
044F 20242E
0452 03             894         DB      AETX
0453 204C6273       895 MLBS:   DB      ' LBS',ACR,AETX
0457 0D
0458 03
0459 20202020       896 MMINTW: DB      '    TEST WEIGHT        ',AETX
045D 54455354
0461 20574549
0465 47485420
0469 20202020
046D 20202020
0471 20
0472 03
0473 20202020       897 MMINFM: DB      '    FOREIGN MATERIAL   ',AETX
0477 464F5245
047B 49474E20
047F 4D415445
0483 5249414C
0487 20202020
048B 20
048C 03
048D 20202020       898 MMNDMG: DB      '    DAMAGE             ',AETX
0491 44414D41
0495 47452020
0499 20202020
049D 20202020
04A1 20202020
04A5 20
04A6 03
04A7 0D             899 MDOCK:  DB      ACR,'  DOCKAGE POINT:',ACR,AETX
04A8 2020444F
04AC 434B4147
04B0 4520504F
04B4 494E543A
04B8 0D
04B9 03
04BA 2025           900 MMINF1: DB      ' %',ACR,AETX
04BC 0D
04BD 03
04BF 202F252F       901 MDKSUF: DB      ' /%/'
04C2 2F4C6273       902 MDLBS:  DB      '/LBS./BU.',ACR,AETX
04C6 2E2F6275
04CA 2E
04CB 0D
04CC 03
04CD 20206275       903 MBU:    DB      ' BU.',AETX
04D1 2E
04D2 03
04D3 20206377       904 MCWT:   DB      ' CWT.',AETX
04D7 742E
04D9 03
04DA 474F4F44       905 MPRPR:  DB      'GOOD DAY NOBLE BOSS! '
04DF 20444159
04E2 204E4F42
04E6 4C452042
04EA 4F535321
04EE 20
04EF 4F555220       906         DB      'OUR CHRONOLOGY IS:',AETX
04F3 4348524F
04F7 4E4F4C4F
04FB 47592049
04FF 533A
0501 03
0502 0D             907 MEOP:   DB      ACR,'TO REVIEW COMMODITY PROGRAMMING DEPRESS:'
0503 544F2052
0507 45564945
050B 5720434F
050F 4D4D4F44
0513 49545920
0517 50524F47
051B 52414D4D
051F 494E4720
0523 44455052
0527 4553533A
052B 20205052       908         DB      '  PRINT, (COMMODITY), PROGRAM, ENTER '
052F 494E542C
0533 2028434F
0537 4D4D4F44
053B 49545929
053F 2C205052
0543 4F475241
0547 4D2C2045
054B 4E544552
054F 20
0550 202D2048       909         DB      ' - HAVE A GOOD DAY!'
0554 41564520
0558 4120474F
055C 4F442044
0560 415921
0563 0D             910         DB      ACR,ALF,ALF,ALF,ALF,ALF,ALF,AETX
```

```
LOC  OBJ          LINE        SOURCE STATEMENT

0564 0A
0565 0A
0566 0A
0567 0A
0568 0A
0569 0A
056A 03
056B 20202020     911 MSO:    DB      '        GRAINMASTER 2001 V1.45'
056F 20202020
0573 20475241
0577 494E4D41
057B 53544552
057F 20323030
0583 31205631
0587 2E3435
058A 0D           912         DB      ACR,0AH,AETX
058B 0A
058C 03
058D 4E4F2050     913 MNFL:   DB      'NO PROGRAMING EXISTS AFTER POWER FAILURE'
0591 524F4752
0595 414D494E
0599 47204558
059D 49535453
05A1 20414654
05A5 45522050
05A9 4F574552
05AD 20464149
05B1 4C555245
05B5 0D           914         DB      ACR,ALF,ALF,ALF,ALF,ALF,AETX
05B6 0A
05B7 0A
05B8 0A
05B9 0A
05BA 0A
05BB 03
05BC 2020464F     915 DMSG1:  DB      '  FOR SALE:          ',AETX
05C0 52205341
05C4 4C453A20
05C8 20202020
05CC 20202020
05D0 20
05D1 03
05D2 2020464F     916 DMSG2:  DB      '  FOR STORAGE:       ',AETX
05D6 52205354
05DA 4F524147
05DE 453A2020
05E2 20202020
05E6 20
05E7 03
05E8 20204F4E     917 DMSG3:  DB      '  ON CONTRACT:       ',AETX
05EC 20434F4E
05F0 54524143
05F4 543A2020
05F8 20202020
05FC 20
05FD 03
05FE 2020464F     918 DMSG4:  DB      '  FOR DELAY PRICE:   ',AETX
0602 52204445
0606 4C415920
060A 50524943
060E 453A2020
0612 20
0613 03
0614 20205348     919 DMSG5:  DB      '  SHIPPED TODAY:     ',AETX
0618 49505045
061C 4420544F
0620 4441593A
0624 20202020
0628 20
0629 03
062A 20204752     920 DMSG6:  DB      '  GROSS INTAKE:      ',AETX
062E 4F535320
0632 494E5441
0636 4B453A20
063A 20202020
063E 20
063F 03
0640 20204D4F     921 DMSG7:  DB      '  MOISTURE REVENUE: $',AETX
0644 49535455
0648 52452052
064C 4556454E
0650 55453A20
0654 24
0655 03
0656 0D           922 DMSG8:  DB      ACR,ACR
0657 0D
0658 20204156     923         DB      '  AVG. MOISTURE IN:        ',AETX
065C 472E204D
0660 4F495354
0664 55524520
0668 494E3A20
066C 20202020
0670 2020
0672 03
0673 0D           924 MCMD1:  DB      ACR,ACR
0674 0D
0675 494E5441     925         DB      'INTAKE FOR TODAY IS',ACR,AETX
0679 4B452046
067D 4F522054
0681 4F444159
0685 204953
0688 0D
0689 03
```

```
LOC  OBJ           LINE      SOURCE STATEMENT

068A 0D             926 MCMD2:  DB      ACR
068B 20202020       927         DB      '                                   NET
068F 20202020
0693 20202020
0697 20202020
069B 20202020
069F 20202020
06A3 20202020
06A7 20202020
06AB 20204E45
06AF 54202020
06B3 20202020
06B7 20202020
06BB 20202020
06BF 20202020
06C3 20
06C4 20204752       928         DB      '  GROSS',ACR
06C8 4F5353
06CB 0D
06CC 20202020       929         DB      '                                    BU/CWT          '
06D0 20202020
06D4 20202020
06D8 20202020
06DC 20202020
06E0 20202020
06E4 20202020
06E8 20202020
06EC 2042752F
06F0 63777420
06F4 20202020
06F8 20202020
06FC 20202020
0700 20202020
0704 2020
0706 2042752F       930         DB      ' BU/CWT'
070A 637774
070D 0D             931         DB      ACR,ACR,AETX
070E 0D
070F 03
0710 1F             932 DMSG9:  DB      1FH,'    ENTER COMMODITY TO CONTINUE - DELETE TO EXIT',ACR
0711 20202020
0715 20454E54
0719 45522043
071D 4F4D4D4F
0721 44495459
0725 20544F20
0729 434F4E54
072D 494E5545
0731 202D2044
0735 454C4554
0739 4520544F
073D 20455849
0741 54
0742 0D
0743 49462049       933         DB      'IF IN CUSTOMER TRANSACTION ROUTINE - DELETE TRANSACTION KEY'
0747 4E204355
074B 53544F4D
074F 45522054
0753 52414E53
0757 41435449
075B 4F4E2052
075F 4F555449
0763 4E45202D
0767 2044454C
076B 45544520
076F 5452414E
0773 53414354
0777 494F4E20
077B 4B4559
077E 0D             934         DB      ACR,'   VOIDS TRANSACTION AND EXITS ROUTINE.'
077F 20202056
0783 4F494453
0787 20545241
078B 4E534143
078F 54494F4E
0793 20414E44
0797 20455849
079B 54532052
079F 4F555449
07A3 4E452E
07A6 0D             935         DB      ACR,1EH,ALF,ALF,ALF,ALF,ALF
07A7 1E
07A8 0A
07A9 0A
07AA 0A
07AB 0A
07AC 0A
07AD 03             936         DB      AETX
07AE 57415245       937 DMSG10: DB      'WAREHOUSE RECEIPT CANCELLED BY SALE OF GRAIN:  ',AETX
07B2 484F5553
07B6 45205245
07BA 43454950
07BE 54204341
07C2 4E43454C
07C6 4C454420
07CA 42592053
07CE 414C4520
07D2 4F462047
07D6 5241494E
07DA 3A2020
07DD 03
07DE 57415245       938 DMSG11: DB      'WAREHOUSE RECEIPT ISSUED FOR STORAGE OF GRAIN:  ',AETX
07E2 484F5553
```

```
LOC  OBJ            LINE        SOURCE STATEMENT

07E6 45205245
07EA 43454950
07EE 54204953
07F2 53554544
07F6 20464F52
07FA 2053544F
07FE 52414745
0802 204F4620
0806 47524149
080A 4E3A2020
080E 03
080F 02             939 DMSG12: DB      02,1EH,ACR,ALF,AETX
0810 1E
0811 0D
0812 0A
0813 03
0814 43555354       940 DMSG13: DB      'CUSTOMER NUMBER NOT ENTERED',ACR,ALF,ALF,AETX
0818 4F4D4552
081C 204E554D
0820 42455220
0824 4E4F5420
0828 454E5445
082C 524544
082F 0D
0830 0A
0831 0A
0832 03
0833 434F4D4D       941 DMSG14: DB      'COMMODITY AMOUNT NOT ENTERED',ACR,ALF,ALF,AETX
0837 4F444954
083B 5920414D
083F 4F554E54
0843 204E4F54
0847 20454E54
084B 45524544
084F 0D
0850 0A
0851 0A
0852 03
0853 57415245       942 DMSG15: DB      'WAREHOUSE RECEIPT ISSUED FOR WAREHOUSE COLLATERAL:  ',AETX
0857 484F5553
085B 45205245
085F 43454950
0863 54204953
0867 53554544
086B 20464F52
086F 20574152
0873 45484F55
0877 53452043
087B 4F4C4C41
087F 54455241
0883 4C3A2020
0887 03
0888 4F50454E       943 DMSG16: DB      'OPEN STORAGE LIABILITY SOLD BY DIRECTION:  ',AETX
088C 2053544F
0890 52414745
0894 204C4941
0898 42494C49
089C 54592053
08A0 4F4C4420
08A4 42592044
08A8 49524543
08AC 54494F4E
08B0 3A2020
08B3 03
08B4 20202020       944 DMSG20: DB      '               SCALE INDICATING NOT ON LINE',ACR
08B8 20202020
08BC 20202020
08C0 20205343
08C4 414C4520
08C8 494E4449
08CC 43415449
08D0 4E47204E
08D4 4F54204F
08D8 4E204C49
08DC 4E45
08DE 0D
08DF 0A             945         DB      ALF,ALF,ALF,ALF,AETX
08E0 0A
08E1 0A
08E2 0A
08E3 03
08E4 20202020       946 DMSG21: DB      '                MOISTURE METER NOT ON LINE',ACR,ALF
08E8 20202020
08EC 20202020
08F0 20202020
08F4 4D4F4953
08F8 54555245
08FC 204D4554
0900 4552204E
0904 4F54204F
0908 4E204C49
090C 4E45
090E 0D
090F 0A
0910 0A             947         DB      ALF,ALF,ALF,AETX
0911 0A
0912 0A
0913 03
0914 20202020       948 DMSG22: DB      '       CURRENT PROGRAMMED PRICE FOR EACH COMMODITY'
0918 20204355
091C 5252454E
0920 54205052
0924 4F475241
0928 4D4D4544
```

```
LOC  OBJ        LINE        SOURCE STATEMENT

092C 20505249
0930 43452046
0934 4F522045
0938 41434820
093C 434F4D4D
0940 4F444954
0944 59
0945 2057494C    949          DB        ' WILL BE ENTERED IN ALL',ACR
0949 4C204245
094D 20454E54
0951 45524544
0955 20494E20
0959 414C4C
095C 0D
095D 5452414E    950          DB        'TRANSACTIONS ENTERED AS "SELL" WHERE PRICE HAS NOT'
0961 53414354
0965 494F4E53
0969 20454E54
096D 45524544
0971 20415320
0975 2253454C
0979 4C222057
097D 48455245
0981 20505249
0985 43452048
0989 4153204E
098D 4F54
098F 20424545    951          DB        ' BEEN ENTERED.  NOTE IF',ACR
0993 4E20454E
0997 54455245
099B 442E2020
099F 4E4F5445
09A3 204946
09A6 0D
09A7 53454C4C    952          DB        'SELL, STORE, CONTRACT, OR DELAY PRICE WERE NOT '
09AB 2C205354
09AF 4F52452C
09B3 20434F4E
09B7 54524143
09BB 542C204F
09BF 52204445
09C3 4C415920
09C7 50524943
09CB 45205745
09CF 5245204E
09D3 4F5420
09D6 454E5445    953          DB        'ENTERED THE TRANSACTION IS',ACR
09DA 52454420
09DE 54484520
09E2 5452414E
09E6 53414354
09EA 494F4E20
09EE 4953
09F0 0D
09F1 434F4E53    954          DB        'CONSIDERED A "SELL" TRANSACTION.',ACR,ALF,ALF,ALF,ALF
09F5 49444552
09F9 45442041
09FD 20225345
0A01 4C4C2220
0A05 5452414E
0A09 53414354
0A0D 494F4E2E
0A11 0D
0A12 0A
0A13 0A
0A14 0A
0A15 0A
0A16 0A          955          DB        ALF,ALF,ALF,AETX
0A17 0A
0A18 0A
0A19 03
0A1A 454E4420    956 DMSG23: DB        'END OF LIST',ACR,ALF,ALF,ALF,ALF,ALF
0A1E 4F46204C
0A22 495354
0A25 0D
0A26 0A
0A27 0A
0A28 0A
0A29 0A
0A2A 0A
0A2B 0A          957          DB        ALF,ALF,AETX
0A2C 0A
0A2D 03
0A2E 54484520    958 DMSG25: DB        'THE FOLLOWING IS A LIST OF ALL INCOMPLETED TRANSACTIONS'
0A32 464F4C4C
0A36 4F57494E
0A3A 47204953
0A3E 2041204C
0A42 49535420
0A46 4F462041
0A4A 4C4C2049
0A4E 4E434F4D
0A52 504C4554
0A56 45442054
0A5A 52414E53
0A5E 41435449
0A62 4F4E53
0A65 0D          959          DB        ACR,ALF,AETX
0A66 0A
0A67 03
0A68 44455052    960 DMSG24: DB        'DEPRESS ENTER KEY TO PRINT OUT A LIST OF ALL INCOMPLETED'
0A6C 45535320
0A70 454E5445
```

```
LOC  OBJ        LINE      SOURCE STATEMENT

0A74 52204B45
0A78 5920544F
0A7C 20505249
0A80 4E54204F
0A84 55542041
0A88 204C4953
0A8C 54204F46
0A90 20414C4C
0A94 20494E43
0A98 4F4D504C
0A9C 45544544
0AA0 20545241   961        DB      ' TRANSACTIONS',ACR,ALF
0AA4 4E534143
0AA8 54494F4E
0AAC 53
0AAD 0D
0AAE 0A
0AAF 454E5445   962        DB      'ENTER CUSTOMER NUMBER AS XXX/ENTER TO PRINT OUT TICKETS ON '
0AB3 52204355
0AB7 53544F4D
0ABB 4552204E
0ABF 554D4245
0AC3 52204153
0AC7 20585858
0ACB 2F454E54
0ACF 45522054
0AD3 4F205052
0AD7 494E5420
0ADB 4F555420
0ADF 5449434B
0AE3 45545320
0AE7 4F4E20
0AEA 414C4C20   963        DB      'ALL LOADS FOR THAT ',ACR
0AEE 4C4F4144
0AF2 5320464F
0AF6 52205448
0AFA 415420
0AFD 0D
0AFE 43555354   964        DB      'CUSTOMER THAT ARE IN THE CURRENT DAILY FILE',ACR,ALF
0B02 4F4D4552
0B06 20544841
0B0A 54204152
0B0E 4520494E
0B12 20544845
0B16 20435552
0B1A 52454E54
0B1E 20444149
0B22 4C592046
0B26 494C45
0B29 0D
0B2A 0A
0B2B 454E5445   965        DB      'ENTER CUSTOMER NUMBER AND LOAD NUMBER AS XXX.XX/ENTER TO '
0B2F 52204355
0B33 53544F4D
0B37 4552204E
0B3B 554D4245
0B3F 5220414E
0B43 44204C4F
0B47 4144204E
0B4B 554D4245
0B4F 52204153
0B53 20585858
0B57 2E58582F
0B5B 454E5445
0B5F 5220544F
0B63 20
0B64 5052494E   966        DB      'PRINT OUT A TICKET FOR THAT LOAD ONLY',ACR,0CH,AETX
0B68 54204F55
0B6C 54204120
0B70 5449434B
0B74 45542046
0B78 4F522054
0B7C 48415420
0B80 4C4F4144
0B84 204F4E4C
0B88 59
0B89 0D
0B8A 0C
0B8B 03
0B8C 0D         967 DMSG26: DB     ACR,'THE FOLLOWING HAVE NOT BEEN ENTERED:',AETX
0B8D 54484520
0B91 464F4C4C
0B95 4F57494E
0B99 47204841
0B9D 5645204E
0BA1 4F542042
0BA5 45454E20
0BA9 454E5445
0BAD 5245443A
0BB1 03
0BB2 204D4F49   968 DMSG27: DB     ' MOISTURE -',AETX
0BB6 53545552
0BBA 45202D
0BBD 03
0BBE 20464D20   969 DMSG28: DB     ' FM -',AETX
0BC2 2D
0BC3 03
0BC4 2044414D   970 DMSG29: DB     ' DAMAGE -',AETX
0BC8 41474520
0BCC 2D
0BCD 03
0BCE 20574549   971 DMSG30: DB     ' WEIGHT OUT -',AETX
0BD2 47485420
```

```
LOC  OBJ        LINE      SOURCE STATEMENT

0BD6 4F555420
0BDA 2D
0BDB 03
0BDC 20544553   972 DMSG31: DB    ' TEST WEIGHT -',AETX
0BE0 54205745
0BE4 49474854
0BE8 202D
0BEA 03
0BEB 20505249   973 DMSG32: DB    ' PRICE',AETX
0BEF 4345
0BF1 03
0BF2 0D         974 DMSG33: DB    ACR,'CURRENT PROGRAMED PRICE HAS BEEN ENTERED',ACR,ALF,AETX
0BF3 43555252
0BF7 454E5420
0BFB 50524F47
0BFF 52414D45
0C03 44205052
0C07 49434520
0C0B 48415320
0C0F 4245454E
0C13 20454E54
0C17 45524544
0C1B 0D
0C1C 0A
0C1D 03
0C1E 416E7920   975 DMSG34: DB    'ANY CHANGES IN WT IN, WT OUT, OR  MOISTURE FOR THIS',ACR
0C22 6368616E
0C26 67657320
0C2A 696E2057
0C2E 5420494E
0C32 2C205754
0C36 204F5554
0C3A 2C204F52
0C3E 20204D4F
0C42 49535455
0C46 52452066
0C4A 6F722074
0C4E 686973
0C51 0D
0C52 7469636B   976         DB    'TICKET WILL CAUSE ERRORS IN   DAILY POSITION RECORD',ACR
0C56 65742077
0C5A 696C6C20
0C5E 63617573
0C62 65206572
0C66 726F7273
0C6A 20696E20
0C6E 20204441
0C72 494C5920
0C76 504F5349
0C7A 54494F4E
0C7E 20524543
0C82 4F5244
0C85 0D
0C86 616E6420   977         DB    'AND IN  DAILY  NET  AND GROSS  INTAKE RECORD.',ACR
0C8A 696E2020
0C8E 4441494C
0C92 5920204E
0C96 45542020
0C9A 414E4420
0C9E 2047524F
0CA2 53532020
0CA6 494E5441
0CAA 4B452020
0CAE 5245434F
0CB2 52442E
0CB5 0D
0CB6 49662063   978         DB    'IF CHANGES ARE NECESSARY THEN  DELETE THIS TRANSAC-',ACR
0CBA 68616E67
0CBE 65732061
0CC2 7265206E
0CC6 65636573
0CCA 73617279
0CCE 20746865
0CD2 6E202064
0CD6 656C6574
0CDA 65207468
0CDE 69732074
0CE2 72616E73
0CE6 61632D
0CE9 0D
0CEA 61637469   979         DB    'ACTION BY DEPRESSING THE  DELETE  TRANSACTION  KEY.',ACR
0CEE 6F6E2062
0CF2 79206465
0CF6 70726573
0CFA 73696E67
0CFE 20746865
0D02 20204445
0D06 4C455445
0D0A 20205452
0D0E 414E5341
0D12 4354494F
0D16 4E20206B
0D1A 65792E
0D1D 0D
0D1E 52656E74   980         DB    'RENTER THE TRANSACTION WITH PROPER CHANGES.',ACR
0D22 65722074
0D26 68652074
0D2A 72616E73
0D2E 61637469
0D32 6F6E2077
0D36 69746820
0D3A 70726F70
0D3E 65722063
0D42 68616E67
```

```
LOC  OBJ          LINE        SOURCE STATEMENT

0D46 65732E
0D49 0D
0D4A 52657461     981         DB      'RETAIN A COPY OF DELETED TRANSACTION FOR YOUR FILE.',ACR
0D4E 696E2061
0D52 20636F70
0D56 79206F66
0D5A 2064656C
0D5E 65746564
0D62 20747261
0D66 6E736163
0D6A 74696F6E
0D6E 20666F72
0D72 20796F75
0D76 72206669
0D7A 6C652E
0D7D 0D
0D7E 0D           982         DB      ACR,ALF,ALF,ALF,ALF,ALF,ALF,ALF
0D7F 0A
0D80 0A
0D81 0A
0D82 0A
0D83 0A
0D84 0A
0D85 0A
0D86 03           983         DB      AETX
0D87 02           984 DMSG35: DB      02,1EH,'MAKE THE CHOICE OF ACCOUNTING METHOD WHICH'
0D88 1E
0D89 4D616B65
0D8D 20746865
0D91 2063686F
0D95 69636520
0D99 6F662041
0D9D 43434F55
0DA1 4E54494E
0DA5 47204D45
0DA9 54484F44
0DAD 20776869
0DB1 6368
0DB3 20796F75     985         DB      ' YOU WILL LIKE TO FOLLOW IN TICKET CALCULATION:',ACR,ACR
0DB7 2077696C
0DBB 6C206C69
0DBF 6B652074
0DC3 6F20666F
0DC7 6C6C6F77
0DCB 20696E20
0DCF 7469636B
0DD3 65742063
0DD7 616C6375
0DDB 6C617469
0DDF 6F6E3A
0DE2 0D
0DE3 0D
0DE4 50757368     986         DB      'PUSH WT IN  KEY FOR POGDOG ACCOUNTING METHOD',ACR
0DE8 20575420
0DEC 494E2020
0DF0 6B657920
0DF4 666F7220
0DF8 504F4744
0DFC 4F472061
0E00 63636F75
0E04 6E74696E
0E08 67206D65
0E0C 74686F64
0E10 0D
0E11 50757368     987         DB      'PUSH WT OUT KEY FOR PONDOG ACCOUNTING METHOD',ACR
0E15 20575420
0E19 4F555420
0E1D 6B657920
0E21 666F7220
0E25 504F4E44
0E29 4F472061
0E2D 63636F75
0E31 6E74696E
0E35 67206D65
0E39 74686F64
0E3D 0D
0E3E 50757368     988         DB      'PUSH DELETE KEY IF NO CHANGE IS REQUIRED',ACR,ACR
0E42 2044454C
0E46 45544520
0E4A 4B657920
0E4E 6966206E
0E52 6F206368
0E56 616E6765
0E5A 20697320
0E5E 72657175
0E62 69726564
0E66 0D
0E67 0D
0E68 41206465     989         DB      'A DESCRIPTION OF "POGDOG AND PONDOG" CAN BE FOUND'
0E6C 73637269
0E70 7074696F
0E74 6E206F66
0E78 2022504F
0E7C 47444F47
0E80 20414E44
0E84 20504F4E
0E88 444F4722
0E8C 2063616E
0E90 20626520
0E94 666F756E
0E98 64
0E99 20696E20     990         DB      ' IN THE OPERATING MANUAL',ACR,ALF,ALF,ALF
0E9D 74686520
0EA1 4F706572
0EA5 6174696E
```

```
LOC  OBJ         LINE          SOURCE STATEMENT

0EA9 67204D61
0EAD 6E75616C
0EB1 0D
0EB2 0A
0EB3 0A
0EB4 0A
0EB5 0A           991          DB       ALF,ALF,ALF,AETX
0EB6 0A
0EB7 0A
0EB8 03
0EB9 596F7520     992 DMSG36: DB       'YOU ARE IN THE "FOGDOG" ACCOUNTING MODE-',ACR
0EBD 61726520
0EC1 696E2074
0EC5 68652022
0EC9 504F4744
0ECD 4F472220
0ED1 6163636F
0ED5 756E7469
0ED9 6E67206D
0EDD 6F64652D
0EE1 0D
0EE2 50757368     993          DB       'PUSH ENTER KEY TO CONTINUE',ACR
0EE6 20454E54
0EEA 4552204B
0EEE 65792074
0EF2 6F20636F
0EF6 6E74696E
0EFA 7565
0EFC 0D
0EFD 4F722072     994          DB       'OR RESELECT THE "WT OUT" KEY TO CHANGE',ACR,ALF,ALF
0F01 6573656C
0F05 65637420
0F09 74686520
0F0D 22575420
0F11 4F555422
0F15 204B6579
0F19 20746F20
0F1D 6368616E
0F21 6765
0F23 0D
0F24 0A
0F25 0A
0F26 0A           995          DB       ALF,ALF,ALF,ALF,ALF,AETX
0F27 0A
0F28 0A
0F29 0A
0F2A 0A
0F2B 03
0F2C 596F7520     996 DMSG37: DB       'YOU ARE IN THE "PONDOG" ACCOUNTING MODE-',ACR
0F30 61726520
0F34 696E2074
0F38 68652022
0F3C 504F4E44
0F40 4F472220
0F44 6163636F
0F48 756E7469
0F4C 6E67206D
0F50 6F64652D
0F54 0D
0F55 50757368     997          DB       'PUSH ENTER KEY TO CONTINUE',ACR
0F59 20454E54
0F5D 4552204B
0F61 65792074
0F65 6F20636F
0F69 6E74696E
0F6D 7565
0F6F 0D
0F70 204F7220     998          DB       ' OR RESELECT THE "WT IN" KEY TO CHANGE',ACR,ALF,ALF
0F74 72657365
0F78 6C656374
0F7C 20746865
0F80 20225754
0F84 20494E22
0F88 204B6579
0F8C 20746F20
0F90 6368616E
0F94 6765
0F96 0D
0F97 0A
0F98 0A
0F99 0A           999          DB       ALF,ALF,ALF,ALF,ALF,AETX
0F9A 0A
0F9B 0A
0F9C 0A
0F9D 0A
0F9E 03
0F9F 446F2079    1000 DMSG38: DB       'DO YOU WISH TO ROUND UP AUTOMATIC MOISTURE READINGS?',ACR
0FA3 6F752077
0FA7 69736820
0FAB 746F2072
0FAF 6F756E64
0FB3 20757020
0FB7 6175746F
0FBB 6D617469
0FBF 63206D6F
0FC3 69737475
0FC7 72652072
0FCB 65616469
0FCF 6E67733F
0FD3 0D
0FD4 692E652E    1001          DB       'I.E. 17.2% WILL BECOME 17.5%.',ACR,ALF
0FD8 2031372E
0FDC 32252077
0FE0 696C6C20
```

```
LOC  OBJ          LINE          SOURCE STATEMENT

0FE4 6265636F
0FE8 6D652031
0FEC 372E3525
0FF0 2E
0FF1 0D
0FF2 0A
0FF3 49662073    1002          DB      'IF SO DEPRESS THE MOISTURE KEY. IF NOT DEPRESS ENTER KEY.'
0FF7 6F206465
0FFB 70726573
0FFF 73207468
1003 65204D4F
1007 49535455
100B 5245206B
100F 65792E20
1013 4966206E
1017 6F742064
101B 65707265
101F 73732045
1023 4E544552
1027 206B6579
102B 2E
102C 0D          1003          DB      ACR,ALF,ALF,ALF,ALF,ALF,ALF,ALF,AETX
102D 0A
102E 0A
102F 0A
1030 0A
1031 0A
1032 0A
1033 03
1034 4175746F    1004 DMSG39:  DB      'AUTOMATIC MOISTURE ENTRY WILL BE ROUNDED UP TO THE '
1038 6D617469
103C 63206D6F
1040 69737475
1044 72652065
1048 6E747279
104C 2077696C
1050 6C206265
1054 20726F75
1058 6E646564
105C 20757020
1060 746F2074
1064 686520
1067 6E656172    1005          DB      'NEAREST HALF POINT.',ACR,ALF,ALF,ALF,ALF,ALF,AETX
106B 65737420
106F 68616C66
1073 20706F69
1077 6E742E
107A 0D
107B 0A
107C 0A
107D 0A
107E 0A
107F 0A
1080 03
1081 202F252F    1006 DMSGA:   DB      ' /%/BU.',ACR,AETX
1085 62752E
1088 0D
1089 03
108A 20252F25    1007 DMSGC:   DB      ' %/% MOISTURE/BU.',ACR,AETX
108E 204D4F49
1092 53545552
1096 452F6275
109A 2E
109B 0D
109C 03
109D 20252F25    1008 DMSGD:   DB      ' %/% MOISTURE/CWT.',ACR,AETX
10A1 204D4F49
10A5 53545552
10A9 452F6377
10AD 742E
10AF 0D
10B0 03
10B1 1F          1009 MNPEA:   DB      1FH
10B2 20204445    1010          DB      '  DEPRESS ENTER KEY TO CONTINUE - DELETE TO CLEAR '
10B6 50524553
10BA 5320454E
10BE 54455220
10C2 4B455920
10C6 544F2043
10CA 4F4E5449
10CE 4E554520
10D2 2D204445
10D6 4C455445
10DA 20544F20
10DE 434C4541
10E2 5220
10E4 0D          1011          DB      ACR,1EH,ALF
10E5 1E
10E6 0A
10E7 0A          1012          DB      ALF,AETX
10E8 03
10E9 424F5448    1013 SHMSG:   DB      'BOTH SHARES CUSTOMER ACCOUNTS USED'
10ED 20534841
10F1 52455320
10F5 43555354
10F9 4F4D4552
10FD 20414343
1101 4F554E54
1105 53205553
1109 4544
110B 0D          1014          DB      ACR,ALF,ALF,AETX
110C 0A
110D 0A
110E 03
```

```
LOC  OBJ              SOURCE STATEMENT

110F 424F5448         SEMSG:  DB      'BOTH SERVICE CUSTOMER ACCOUNTS USED'
1113 20534552
1117 56494345
111B 20435553
111F 544F4D45
1123 52204143
1127 434F554E
112B 54532055
112F 534544
1132 0D                       DB      ACR,ALF,ALF,AETX
1133 0A
1134 0A
1135 03
                      ;
                      ;       SEGMENT ROUTINE
                      ;
                      ;THIS ROUTINE CHANGES DATA PASSED IN THE C REGISTER
                      ;TO A SEVEN SEGMENT CODE FOR DISPLAY PURPOSES. THE
                      ;RESULT IS RETURNED IN THE ACC.
                      ;
1136 C5               SEGMR:  PUSH    B
1137 E5                       PUSH    H
1138 79                       MOV     A,C      ;DATA IN ACCUMULATOR(ACC.)
1139 E60F                     ANI     0FH      ;MASK OFF 4 MSB
113B 215000    C              LXI     H,SEGTAB         ;START OF SEGMENT TABLE
113E 010000                   LXI     B,00H    ;OFFSET HOLDER
1141 4F                       MOV     C,A      ;OFFSET TO C
1142 09                       DAD     B        ;H,L POINT TO SEGMET CODE
1143 7E                       MOV     A,M      ;FETCH CODE
1144 E1                       POP     H
1145 C1                       POP     B
1146 C9                       RET
                      ;
1147 3E08             TRAPR:  MVI     A,08H
1149 30                       SIM
114A 310000    S              LXI     SP,STACK
114D FB                       EI
114E C3692F    C              JMP     WAIT
                      ;
                      ;
                      ;       SUBROUTINE ADDS NUMBER OF SPACES TO PRINT LINE
                      ;       NUMBER OF SPACES IS PASSED IN THE ACCUMULATOR
                      ;
1151 C5               SPACE:  PUSH    B
1152 0E20                     MVI     C,ASP
1154 CD0000    E      SPACE1: CALL    PCHAR
1157 3D                       DCR     A
1158 C25411    C              JNZ     SPACE1
115B C1                       POP     B
115C C9                       RET
                      ;
                      ;
                      ;THE MAKE DOTS ROUTINE - NUMBER OF PERIODS PRINTED IS PASSED IN
                      ;THE A REGISTER
                      ;
                      ;
115D C5               DDOT:   PUSH    B
115E 0E2E                     MVI     C,PERIOD
1160 C35411    C              JMP     SPACE1
                      ;
                      ;
                      ;THE CLEAR KEYS ROUTINE CLEARS KYSTR,
                      ;       KEYCNT, AND RESETS KEYPTR
                      ;
1163 C5               CLKEYS: PUSH    B
1164 D5                       PUSH    D
1165 E5                       PUSH    H
1166 F5                       PUSH    PSW
1167 210000    D              LXI     H,KYSTR          ;START OF KEY STORAGE BUFFER
116A 222900    D              SHLD    KEYPTR           ;RESET BUFFER POINTER
116D 0628                     MVI     B,40             ;B=LENGTH OF KYSTR, C=FF(BLANK)
116F 0EFF                     MVI     C,0FFH
1171 AF                       XRA     A
1172 322800    D              STA     KEYCNT           ;RESET KEY COUNTER
1175 71               CLKEY1: MOV     M,C              ;CLEAR KEY BUFFER LOCATION
1176 23                       INX     H                ;NEXT
1177 05                       DCR     B                ;BUFFER LENGTH COUNTER
1178 C27511    C              JNZ     CLKEY1           ;IF NOT DONE, DO IT AGAIN
117B C35812    C              JMP     STRET
                      ;
117E CD0000    E      KEYDWN: CALL    KEYIN
1181 D27E11    C              JNC     KEYDWN
1184 CD0000    E              CALL    BEEP
1187 C9                       RET
                      ;
1188 CD1829    C      ERDASH: CALL    ERDIS
118B CD902B    C              CALL    GKEY
118E DA8811    C              JC      ERDASH
1191 C9                       RET
                      ;
                      ; THE DELETE ROUTINE BACKS ALL UP ONE NOTCH IN KYSTR.
                      ;                       IF THERE ARE CURRENT ENTRIES AND UPDATES
                      ;                       THE DISPLAY
                      ;
1192 AF               DELETB: XRA     A
1193 322B00    D              STA     ERFLB            ;CLEAR ERROR FLAG BYTE
1196 112800    D              LXI     D,KEYCNT         ;KYSTR COUNTER
1199 1A                       LDAX    D                ;FETCH COUNT
119A B7                       ORA     A                ;IS IT ZERO?
119B CAC011    C              JZ      DELETS           ;IF SO, CORRECT MISC AND RESET
119E 3D                       DCR     A
119F 12                       STAX    D                ;BACK UP KEYCNT BY 1
11A0 2A2900    D              LHLD    KEYPTR           ;FETCH KEY POINTER
```

```
LOC  OBJ            SOURCE STATEMENT

11A3 2B                     DCX     H               ;BACK UP ONE
11A4 CDD211    C            CALL    DRSET           ;CALL FOR CLEAR OF LIGHT DISPLAY
11A7 36FF                   MVI     M,0FFH          ;CLEAR LAST ENTRY
11A9 222900    D            SHLD    KEYPTR          ;UPDATE KEY POINTER
11AC 3E11                   MVI     A,DELET
11AE 321B02    D            STA     DELETF
11B1 CD8A29    C            CALL    DSPLYR          ;UPDATE DISPLAY
11B4 AF                     XRA     A
11B5 321B02    D            STA     DELETF
11B8 1A                     LDAX    D
11B9 B7                     ORA     A
11BA CAC011    C            JZ      DELETS          ;JUMP IF KEY COUNT IS ZERO
11BD C35212    C            JMP     STRETM
11C0 010000         DELETS: LXI     B,0
11C3 CDEA17    C            CALL    WDUPR           ;CORRECT AND ZERO THE DISPLAY
11C6 CD0229    C            CALL    FCNLCR          ;CLEAR FUNCTION LEDS
11C9 CD6311    C            CALL    CLKEYS
11CC CD321A    C            CALL    CLRSPD
11CF C35212    C            JMP     STRETM
                    ;
                    ;
                    ;DRSET TAKES KEY STORED IN MEM POINTED TO BY HL AND USES LOOK UP
                    ;TABLE TO LOCATE DISPLAY ADDRESS AND STROBE IN ORDER TO SHUT OFF
                    ;THE LIGHT DISPLAYED.  WHEN FOUND IT UPDATES THE DISPLAY.  ALL
                    ;REGISTERS ARE SAVED
                    ;
                    ;
11D2 C5             DRSET:  PUSH    B               ;SAVE ALL
11D3 D5                     PUSH    D
11D4 E5                     PUSH    H
11D5 F5                     PUSH    PSW
11D6 11B800    C            LXI     D,KEYTAB        ;STARTING LOCATION OF KEY LOOK UP
11D9 01DE00    C            LXI     B,KEYSEG        ;TABLES
11DC 1A             DRSET0: LDAX    D
11DD BE                     CMP     M               ;H&L REGISTERS HAVE KEY POINTER LOCATION
11DE CAF011    C            JZ      DRSET1          ;JUMP IF SAME AS LOOK UP TABLE
11E1 FE71                   CPI     COMODC          ;IS THIS LAST KEY IN TABLE?
11E3 CA0212    C            JZ      DRSET2          ;IF YES JUMP NO CHANGES
11E6 13                     INX     D               ;INCREMENT D BY ONE AND B BY SIX
11E7 03                     INX     B
11E8 03                     INX     B
11E9 03                     INX     B
11EA 03                     INX     B
11EB 03                     INX     B
11EC 03                     INX     B
11ED C3DC11    C            JMP     DRSET0          ;LOOK AT NEXT ITEM IN TABLE
11F0 03             DRSET1: INX     B
11F1 03                     INX     B
11F2 03                     INX     B
11F3 0A                     LDAX    B               ;RETRIEVE STROBE BYTE FOR LIGHT
11F4 2F                     CMA                     ;COMPLEMENT TO SHUT OFF
11F5 57                     MOV     D,A             ;SAVE
11F6 03                     INX     B               ;RETRIEVE ADDRESS FOR TABLE
11F7 0A                     LDAX    B
11F8 6F                     MOV     L,A
11F9 03                     INX     B
11FA 0A                     LDAX    B
11FB 67                     MOV     H,A
11FC 7A                     MOV     A,D             ;RETRIEVE STROBE
11FD A6                     ANA     M               ;AND WITH MEM LOC HL
11FE 77                     MOV     M,A
11FF CDB328    C            CALL    DISUPR          ;UPDATE DISPLAY
1202 C35812    C    DRSET2: JMP     STRET
                    ;
                    ;
                    ;  INVALID ROUTINE
                    ;
1205 3EFF           INVALR: MVI     A,0FFH
1207 322B00    D            STA     ERFLB           ;ERROR FLAG BYTE
120A CD1829    C            CALL    ERDIS
120D 010000                 LXI     B,0
1210 CDEA17    C            CALL    WDUPR
1213 322888                 STA     INTR
1216 322988                 STA     INTR + 1
1219 CD6311    C            CALL    CLKEYS
121C C35212    C            JMP     STRETM
                    ;
                    ;
                    ;   AUTOMATIC FORM FEED ROUTINE CHECKS DFORMF IF ZERO DOES NOT FORM FEED
                    ;
121F F5             AUTOFF: PUSH    PSW
1220 C5                     PUSH    B
1221 3A1402    D            LDA     DFORMF
1224 B7                     ORA     A
1225 CA3112    C            JZ      ATOFF
1228 0E0C                   MVI     C,AFF
122A CD0000    E            CALL    PCHAR
122D AF                     XRA     A
122E 321402    D            STA     DFORMF
1231 C1             ATOFF:  POP     B
1232 F1                     POP     PSW
1233 C9                     RET
                    ;
                    ;
                    ;    INT65
                    ;
1234 C5             INT65:  PUSH    B
1235 D5                     PUSH    D
1236 E5                     PUSH    H
1237 F5                     PUSH    PSW
1238 3A2888                 LDA     INTR
123B 47                     MOV     B,A
123C 322888                 STA     INTR
123F 322988                 STA     INTR + 1
```

```
LOC  OBJ          LINE        SOURCE STATEMENT

1242 20                         RIM
1243 E605                       ANI     05H
1245 F60A                       ORI     0AH
1247 30                         SIM
1248 78                         MOV     A,B
1249 FB                         EI
124A 0F                         RRC
124B DA6712    C                JC      KEYBD
124E 0F                         RRC
124F DA5D12    C                JC      REALC
1252 20               STRETM:   RIM
1253 E605                       ANI     05H
1255 F608                       ORI     08H
1257 30                         SIM
1258 F1               STRET:    POP     PSW
1259 E1                         POP     H
125A D1                         POP     D
125B C1                         POP     B
125C C9                         RET
                      ;
                      ;
                      ;         REAL CLOCK
                      ;
                      ;;;;;;;;;;;;;;;;;;;;;;;;;;;;;;;;;;;;;;;;;;;;;;;;;;;;;;;;;;;;;;;;
                      ;
125D CD0000    E      REALC:    CALL    KEYIN
1260 DA6D12    C                JC      KBRCE
1263 FB                         EI
1264 C35212    C                JMP     STRETM
                      ;                                 ***********************************
1267 CD0000    E      KEYBD:    CALL    KEYIN
126A D25212    C                JNC     STRETM          ;IF NO CARRY, THEN NO KEYIN
126D 47               KBRCE:    MOV     B,A             ;STORE KEY CLOSURE IN B
                      ;         LDA     ERFLB           ;ERROR FLAG BYTE
                      ;         ORA     A               ;IS IT SET?
                      ;         JNZ     KEYBD2          ;IF SO JUMP
126E CD0000    E                CALL    BEEP
1271 3A2C00    D                LDA     LOCKFL          ;LOCK FLAG
1274 B7                         ORA     A               ;IS IT SET?
1275 C2F712    C                JNZ     KEYBD6          ;IF SO JUMP
1278 78                         MOV     A,B             ;REFETCH KEY CLOSURE INFO
1279 FE11                       CPI     DELET
127B CA9211    C                JZ      DELETR
127E FE43                       CPI     FFEED
1280 CA5A13    C                JZ      FFEEDF
1283 FE56                       CPI     SETSHT
1285 CAEF2F    C                JZ      SETPR
1288 FE77                       CPI     CNTRL
128A CA9D31    C                JZ      CNTRLR
128D FE75                       CPI     BEPOFF
128F CA8930    C                JZ      BPOFFR
1292 FE46                       CPI     DFRK
1294 CA6713    C                JZ      DAYPR
1297 FE52                       CPI     PROGDT
1299 CA5B1F    C                JZ      PROGDR
129C FE63                       CPI     PRICE
129E CA4117    C                JZ      CSPRT
12A1 FE72                       CPI     PJOURN          ;COMPARE WITH PRINT JOURNAL KEY
12A3 CA0013    C                JZ      PRJRR           ;JUMP IF IT IS PRINT JOURNAL KEY
12A6 FE57                       CPI     DTRANS
12A8 CA2518    C                JZ      DTRANR
12AB FE53                       CPI     PROGRM
12AD CAD71A    C                JZ      PRGMR
12B0 FE65                       CPI     ENTER
12B2 CAF41D    C                JZ      ENTERR
12B5 FE76                       CPI     LOCK
12B7 CA8E19    C                JZ      LOCKR
12BA FE47                       CPI     OFF
12BC CAEB12    C                JZ      KEYBD4
12BF FE64                       CPI     PRINT
12C1 CA6E2A    C                JZ      PRNTR
12C4 2A2900    D      KEYBD0:   LHLD    KEYPTR          ;KEY POINTER
12C7 77                         MOV     M,A             ;HAVE IT POINT TO APPROPRIATE PLACE
12C8 23                         INX     H
12C9 222900    D                SHLD    KEYPTR          ;POINTS TO NEXT EMPTY BYTE
12CC 4F                         MOV     C,A             ;STORE KEY CLOSURE INFO IN C
12CD CD8A29    C                CALL    DSPLYR
12D0 3A2800    D                LDA     KEYCNT          ;KEYCOUNT
12D3 3C                         INR     A               ;INCREMENT IT
12D4 322800    D                STA     KEYCNT          ;AND STORE
12D7 FE14                       CPI     KMAX
12D9 C25212    C                JNZ     STRETM
12DC CD6311    C                CALL    CLKEYS
12DF C30512    C                JMP     INVALR
12E2 78               KEYBD2:   MOV     A,B             ;REFETCH KEY CLOSURE INFO
12E3 FE11                       CPI     DELET
12E5 C25212    C                JNZ     STRETM
12E8 C39211    C                JMP     DELETR
12EB 47               KEYBD4:   MOV     B,A             ;STORE KEY INFO
12EC 3A2800    D                LDA     KEYCNT          ;KEY COUNT
12EF B7                         ORA     A               ;IS IT ZERO?
12F0 78                         MOV     A,B             ;KEY CLOSURE INFO IN A REG
12F1 CA8D2F    C                JZ      OFFR
12F4 C3C412    C                JMP     KEYBD0          ;KEY COUNT NOT ZERO
12F7 78               KEYBD6:   MOV     A,B             ;FETCH FROM TEMPORARY STORE
12F8 FE76                       CPI     LOCK            ;IS IT LOCK?
12FA CA8E19    C                JZ      LOCKR           ;IF IT IS LOCK, JUMP TO LOCKR
12FD C35212    C                JMP     STRETM
                      ;
                      ;
                      ;
1300 CDC519    C      PRJRR:    CALL    KEYDIS          ;CLEAR MANUAL FLAG
1303 AF                         XRA     A
```

```
LOC  OBJ           SOURCE STATEMENT

1304 323700   D              STA    PRLOC0     ;FOR PRINTING COPY
1307 CD7E11   C     PRJRR1:  CALL   KEYDWN     ;LOOK FOR KEY
130A FE11           PRJRR4:  CPI    DELET      ;JUMP IF DELET KEY
130C CA541D   C              JZ     PRGM7
130F FE65                    CPI    ENTER      ;ENTER KEY?
1311 C23013   C              JNZ    PRJRR2     ;JUMP IF NOT ENTER KEY
1314 3A3600   D              LDA    PRLOCK
1317 B7                      ORA    A
1318 C22713   C              JNZ    PRJRR6
131B 3A3700   D              LDA    PRLOC0
131E B7                      ORA    A
131F C22713   C              JNZ    PRJRR6
1322 3E01                    MVI    A,01
1324 323700   D              STA    PRLOC0
1327 CD0000   E     PRJRR6:  CALL   PRJR       ;PRINT THE JOURNAL
132A CD321A   C              CALL   CLRSPD
132D C3541D   C              JMP    PRGM7      ;JUMP TO PRGM7
1330 FE64           PRJRR2:  CPI    PRINT      ;IS IT PRINT KEY?
1332 C24F13   C              JNZ    PRJRR5     ;JUMP IF IT IS NOT PRINT KEY
1335 111101                  LXI    D,0111H    ;LOOK FOR 1 DIGIT KEY
1338 CDAA20   C              CALL   DIGINR
133B D20A13   C              JNC    PRJRR4     ;JUMP AND DECODE THE KEY
133E F5                      PUSH   PSW
133F 210100   D              LXI    H,KYSTR+1
1342 1601                    MVI    D,01       ;CONVERT KEY CODE TO BCD
1344 CDAD1E   C              CALL   BLOADR
1347 79                      MOV    A,C
1348 323700   D              STA    PRLOC0     ;STORE MANUAL ENTRY INTO PRLOC0
134B F1                      POP    PSW
134C C30A13   C              JMP    PRJRR4
134F CD8811   C     PRJRR5:  CALL   ERDASH     ;DISPLAY ERROR ON DISPLAY
1352 CD321A   C              CALL   CLRSPD
1355 3E72                    MVI    A,PJOURN
1357 C30013   C              JMP    PRJRR      ;LOOP AGAIN
                    ;
                    ;
135A CD6013   C     FFEEDF:  CALL   MFORM      ;TO PRODUCE A FORM FEED
135D C35212   C              JMP    STRETM
                    ;
1360 CD4F15   C     MFORM:   CALL   STFRMF     ;TO FORM FEED AND CLEAR FLAG
1363 CD1F12   C              CALL   AUTOFF
1366 C9                      RET
                    ;
1367 CDC519   C     DAYPR:   CALL   KEYDIS
136A CD101D   C              CALL   CMDKEY     ;SEQUENCE FOR PRINTING THE DAILY
136D D2541D   C              JNC    PRGM7      ;POSITION REPORT
1370 CD902B   C     DAYPR2:  CALL   GKEY
1373 D2541D   C              JNC    PRGM7
1376 FE53                    CPI    PROGRM
1378 CA8813   C              JZ     DAYPRP
137B CDD71C   C              CALL   ENTKYA
137E D2541D   C              JNC    PRGM7
1381 3A7200   D              LDA    COMB
1384 4F                      MOV    C,A
1385 C30000   E              JMP    POSRCD
                    ;
1388 CDD71C   C     DAYPRP:  CALL   ENTKEY     ;THIS ROUTINE ALLOWS WAREHOUSE RECEIPTS
138B D2541D   C              JNC    PRGM7      ;TO BE ISSUED AND CANCELLED.  WTIN KEY
138E AF                      XRA    A          ;ISSUES RECEIPT AND WTOUT CANCELS THEM
138F 32B601   D              STA    DESTOR     ;THE APPROPRIATE ENTRIES ARE MADE TO THE
1392 32B701   D              STA    DSTOR0     ;DAILY POSITION REPORT STORAGE BINS
1395 CD902B   C     DYPRP1:  CALL   GKEY
1398 D2541D   C              JNC    PRGM7
139B 32BA01   D              STA    TKSTR
139E CDC519   C     DYPRP0:  CALL   KEYDIS
13A1 FE33                    CPI    WTIN       ;TO ISSUE A WAREHOUSE RECEIPT
13A3 CAF413   C              JZ     DYPP0
13A6 FE37                    CPI    WTOUT      ;TO CANCEL A WAREHOUSE RECEIPT
13A8 CAF413   C              JZ     DYPP0      ;(SELL GRAIN)
13AB FE71                    CPI    COMODC     ;TO ISSUE A WAREHOUSE RECEIPT TO THE
13AD CAF413   C              JZ     DYPP0      ;WAREHOUSE (COLLATERAL FOR BORROWING)
13B0 FE06                    CPI    DLYPR      ;TO SHIP GRAIN IN OPEN STORAGE LIA.
13B2 CAF413   C              JZ     DYPP0
13B5 FE65                    CPI    ENTER
13B7 CA2A14   C              JZ     PADJ
13BA FE60                    CPI    CUST
13BC CACF13   C              JZ     DYPP01
13BF FE53                    CPI    PROGRM
13C1 CA0000   E              JZ     SETGRN
13C4 FE11                    CPI    DELET
13C6 CA4915   C              JZ     DYPP9
13C9 CD8811   C              CALL   ERDASH
13CC C39513   C              JMP    DYPRP1
13CF 32B701   D     DYPP01:  STA    DSTOR0     ;SET UP TO TAKE CUSTOMER NUMBER
13D2 111404                  LXI    D,0414H
13D5 CDAA20   C              CALL   DIGINR
13D8 D24915   C              JNC    DYPP9
13DB 32BA01   D              STA    TKSTR
13DE 3E04                    MVI    A,4        ;SET UP NUMBER OF DIGITS FOR BLOADR
13E0 92                      SUB    D
13E1 57                      MOV    D,A
13E2 69                      MOV    L,C
13E3 60                      MOV    H,B        ;SET UP HL REGISTERS FOR BLOADR
13E4 23                      INX    H
13E5 CDAD1E   C              CALL   BLOADR
13E8 215401   D              LXI    H,PNUMD
13EB 71                      MOV    M,C
13EC 23                      INX    H
13ED 70                      MOV    M,B
13EE 3ABA01   D              LDA    TKSTR
13F1 C39E13   C              JMP    DYPRP0
13F4 32B601   D     DYPP0:   STA    DESTOR     ;STORE THAT WTIN/WTOUT HAS BEEN ENTERED
13F7 119705                  LXI    D,0597H
13FA CDAA20   C              CALL   DIGINR
```

```
LOC  OBJ          LINE        SOURCE STATEMENT

13FD D24915   C  1418            JNC      DYPP9
1400 323100   D  1419            STA      TRFSTR
1403 CD0914   C  1420            CALL     BYDCHG
1406 C39E13   C  1421            JMP      DYPRP0
                 1422 ;
1409 C5          1423 BYDCHG:    PUSH     B
140A D5          1424            PUSH     D              ;TO SAVE THE BINARY NUMBERS FROM DIGINR
140B E5          1425            PUSH     H
140C F5          1426            PUSH     PSW
140D 0604        1427            MVI      B,4
140F 211602   D  1428            LXI      H,BYDIGT
1412 111D02   D  1429            LXI      D,BYDIG0
1415 7E          1430 BYDG:      MOV      A,M
1416 12          1431            STAX     D
1417 23          1432            INX      H
1418 13          1433            INX      D
1419 05          1434            DCR      B
141A C21514   C  1435            JNZ      BYDG
141D C35812   C  1436            JMP      STRET
                 1437 ;
                 1438 ;
1420 CD0000   E  1439 PADJST:    CALL     ADJPTR
1423 CD0000   E  1440            CALL     FADD
1426 CD0000   E  1441            CALL     FSTOR
1429 C9          1442            RET
                 1443 ;
142A 3AB601   D  1444 PADJ:      LDA      DESTOR         ;HAS WTIN/WTOUT NUMBER BEEN ENTERED?
142D B7          1445            ORA      A
142E CA3115   C  1446            JZ       FFWT           ;PRINT NO NUMBER
1431 CDC519   C  1447            CALL     KEYDIS
1434 3AB701   D  1448            LDA      DSTOR0         ;HAS CUSTOMER NUMBER BEEN ENTERED
1437 B7          1449            ORA      A
1438 CA3D15   C  1450            JZ       PPCUST
143B CD1F12   C  1451            CALL     AUTOFF
143E CD0000   E  1452            CALL     HEADG          ;PRINT HEADING
1441 0E03        1453            MVI      C,3            ;THREE LINE FEEDS
1443 CD0220   C  1454            CALL     CHGEN
1446 110000   E  1455            LXI      D,MSGELB       ;PRINT CUSTOMER MESSAGE
1449 CD0000   E  1456            CALL     PMASG
144C 215401   D  1457            LXI      H,FNUMD
144F CD0000   E  1458            CALL     PCUSN          ;PRINT CUSTOMER NAME
1452 3E14        1459            MVI      A,20           ;LEAVE SPACE
1454 CD5111   C  1460            CALL     SPACE
1457 110000   E  1461            LXI      D,MSGELC       ;PRINT COMMODITY MESSAGE
145A CD0000   E  1462            CALL     PMASG
145D 3A7200   D  1463            LDA      COMB
1460 4F          1464            MOV      C,A
1461 CD0000   E  1465            CALL     PCMNAM         ;PRINT COMMODITY NAME
1464 110F08   C  1466            LXI      D,DMSG12       ;CARRAIGE RETURN MSG
1467 CD0000   E  1467            CALL     PMASG          ;FOR FORMAT
146A 3AB601   D  1468            LDA      DESTOR
146D FE71        1469 PADJ1:     CPI      COMODC
146F CAE914   C  1470            JZ       PADJ8
1472 FE06        1471            CPI      DLYFR
1474 CA0D15   C  1472            JZ       PADJ9
1477 FE33        1473            CPI      WTIN
1479 CAA014   C  1474            JZ       PADJ4
147C 11AE07   C  1475            LXI      D,DMSG10       ;IF NOT ANY OF THE ABOVE MUST BE WTOUT
147F CD0000   E  1476            CALL     PMASG          ;PRINT CANCEL MESSAGE
1482 014D00   D  1477            LXI      B,FPR          ;THIS IS A WAREHOUSE RECEIPT CANCELLED
1485 111D02   D  1478            LXI      D,BYDIG0       ;USUALLY BY SALE OF GRAIN
1488 D5          1479            PUSH     D
1489 CD0000   E  1480            CALL     FLOAD
148C 1168FD      1481            LXI      D,WRLCAN       ;WAREHOUSE RECEIPT CANCELLED
148F CD2014   C  1482            CALL     PADJST
1492 D1          1483            POP      D
1493 D5          1484            PUSH     D
1494 CD0000   E  1485            CALL     FLOAD
1497 11B0FD      1486            LXI      D,WOGINC       ;INCREASE WAREHOUSE OUWNED GRAIN
149A CD2014   C  1487            CALL     PADJST
149D C3C114   C  1488            JMP      PADJ5
14A0 11DE07   C  1489 PADJ4:     LXI      D,DMSG11       ;THIS IS AN ISSUANCE OF A WAREHOUSE
14A3 CD0000   E  1490            CALL     PMASG          ;RECEIPT
14A6 014D00   D  1491            LXI      B,FPR
14A9 111D02   D  1492            LXI      D,BYDIG0
14AC D5          1493            PUSH     D
14AD CD0000   E  1494            CALL     FLOAD
14B0 1144FD      1495            LXI      D,WRLISS       ;ISSUED
14B3 CD2014   C  1496            CALL     PADJST
14B6 D1          1497            POP      D
14B7 D5          1498            PUSH     D
14B8 CD0000   E  1499            CALL     FLOAD
14BB 118CFD      1500            LXI      D,OSLDEC       ;DECREASE OPEN STORAGE LIABILITY
14BE CD2014   C  1501            CALL     PADJST
14C1 D1          1502 PADJ5:     POP      D
14C2 CD0000   E  1503            CALL     FLOAD
14C5 EB          1504            XCHG
14C6 CD0000   E  1505            CALL     B2D1A7
14C9 111D02   D  1506            LXI      D,BYDIG0
14CC CD0000   E  1507            CALL     FRSLT
14CF CD0000   E  1508            CALL     PNET1
14D2 CADB14   C  1509            JZ       PADJ6
14D5 11CD04   C  1510            LXI      D,MBU
14D8 C3DE14   C  1511            JMP      PADJ7
14DB 11D304   C  1512 PADJ6:     LXI      D,MCWT
14DE CD0000   E  1513 PADJ7:     CALL     PMASG
14E1 0E0C        1514            MVI      C,0CH
14E3 CD0000   E  1515            CALL     PCHAR
14E6 C3541D   C  1516            JMP      PRGM7
                 1517 ;
14E9 115308   C  1518 PADJ8:     LXI      D,DMSG15       ;THIS IS A WAREHOUSE RECEIPT FOR
14EC CD0000   E  1519            CALL     PMASG          ;COLLATERAL
14EF 014D00   D  1520            LXI      B,FPR
```

```
LOC  OBJ            SOURCE STATEMENT

14F2 111DØ2   D            LXI    D,BYDIGØ
14F5 D5                    PUSH   D
14F6 CDØØØØ   E            CALL   FLOAD
14F9 11D4FD                LXI    D,WOGDEC          ;DECREASE WAREHOUSE OWNED GRAIN
14FC CD2Ø14   C            CALL   FADJST
14FF D1                    POP    D
15ØØ D5                    PUSH   D
15Ø1 CDØØØØ   E            CALL   FLOAD
15Ø4 1144FD                LXI    D,WRLISS          ;ISSUE A WAREHOUSE RECEIPT
15Ø7 CD2Ø14   C            CALL   FADJST
15ØA C3C114   C            JMP    FADJ5
                    ;
15ØD 1188Ø8   C    FADJ9:  LXI    D,DMSG16
151Ø CDØØØØ   E            CALL   PMASG             ;STORED MATERIAL SOLD BEFORE A WAREHOUSE
1513 Ø14DØØ   D            LXI    B,FPR             ;RECEIPT COULD BE GIVEN
1516 111DØ2   D            LXI    D,BYDIGØ
1519 D5                    PUSH   D
151A CDØØØØ   E            CALL   FLOAD
151D 118CFD                LXI    D,OSLDEC          ;DECREASE OPEN STORAGE LIABILITY
152Ø CD2Ø14   C            CALL   FADJST
1523 D1                    POP    D
1524 D5                    PUSH   D
1525 CDØØØØ   E            CALL   FLOAD
1528 11BØFD                LXI    D,WOGINC          ;INCREASE WAREHOUSE OWNED GRAIN
152B CD2Ø14   C            CALL   FADJST
152E C3C114   C            JMP    FADJ5
                    ;
1531 1133Ø8   C    FFWT:   LXI    D,DMSG14
1534 CDØØØØ   E            CALL   PMASG
1537 CD4F15   C            CALL   STFRMF
153A C3541D   C            JMP    FRGM7
153D 1114Ø8   C    PPCUST: LXI    D,DMSG13
154Ø CDØØØØ   E            CALL   PMASG
1543 CD4F15   C            CALL   STFRMF
1546 C3541D   C            JMP    FRGM7
                    ;
1549 CDØA28   C    DYPF9:  CALL   DRSETV
154C C39513   C            JMP    DYPRP1
                    ;
                    ;  SET FORM FEED SETS DFORMF FLAG TO ØFFH TO CAUSE A FORM FEED
                    ;
154F F5            STFRMF: PUSH   PSW
155Ø 3EFF                  MVI    A,ØFFH
1552 3214Ø2   D            STA    DFORMF
1555 F1                    POP    PSW
1556 C9                    RET
                    ;
                    ;      INT75
                    ;
1557 C5            INT75:  PUSH   B
1558 D5                    PUSH   D
1559 E5                    PUSH   H
155A F5                    PUSH   PSW
155B 2Ø                    RIM
155C E61Ø                  ANI    1ØH
155E CCD217   C            CZ     CLRPFR            ;CLEAR POWER FLAG ROUTINE
1561 3A2EØØ   D            LDA    OPFFL
1564 B7                    ORA    A
1565 CCFA3Ø   C            CZ     CNCHKR
1568 3A3BØØ   D            LDA    BEEPFL
156B B7                    ORA    A
156C C4ØØØØ   E            CNZ    BEEP
156F 2146ØØ   D            LXI    H,SECS            ;SECONDS
1572 7E                    MOV    A,M               ;FETCH SECONDS
1573 3C                    INR    A                 ;INCREMENT
1574 27                    DAA
1575 FE6Ø                  CPI    6ØH               ;IS IT 6Ø SECONDS YET?
1577 C2AB15   C            JNZ    INT751            ;IF NOT JUMP
157A AF                    XRA    A                 ;IF SO, ZERO SECONDS
157B 77                    MOV    M,A               ;RESTORE
157C 2145ØØ   D            LXI    H,MIN             ;MINUTES
157F 7E                    MOV    A,M               ;FETCH MIN
158Ø 3C                    INR    A                 ;AND INCREMENT
1581 27                    DAA                      ;AND ADJUST
1582 FE6Ø                  CPI    6ØH               ;6Ø MINUTES YET?
1584 C2AB15   C            JNZ    INT751            ;IF NOT JUMP
1587 AF                    XRA    A
1588 77                    MOV    M,A               ;IF SO, ZERO MINUTES
1589 2144ØØ   D            LXI    H,HOUR            ;HOURS
158C 7E                    MOV    A,M               ;FETCH HOUR
158D 3C                    INR    A                 ;AND INCREMENT
158E 27                    DAA                      ;AND ADJUST
158F FE24                  CPI    24H               ;24 HOURS YET?
1591 C2AB15   C            JNZ    INT751
1594 AF                    XRA    A
1595 77                    MOV    M,A               ;ZERO HOURS
1596 2142ØØ   D            LXI    H,MONTH
1599 7E                    MOV    A,M               ;FETCH DAY
159A 3C                    INR    A                 ;AND INCREMENT
159B 27                    DAA                      ;AND ADJUST
159C FE29                  CPI    29H               ;29 DAYS YET?
159E CABØ15   C            JZ     INT752            ;IF SO JUMP
15A1 FE31                  CPI    31H               ;3Ø DAYS?
15A3 CACF15   C            JZ     INT754
15A6 FE32                  CPI    32H               ;31 DAYS?
15A8 CABA15   C            JZ     INT753
15AB 77            INT751: MOV    M,A               ;STORE IN MEMORY
15AC FB                    EI
15AD C35812   C            JMP    STRET
15BØ 47            INT752: MOV    B,A               ;STORE DAY INFO IN B
15B1 2B                    DCX    H                 ;MONTH
15B2 7E                    MOV    A,M               ;FETCH MONTH
15B3 23                    INX    H                 ;WANT TO CHECK IF RIGHT MONTH FOR
                                                    ;THAT # OF DAYS
```

```
LOC  OBJ              SOURCE STATEMENT

15B4 FE02                       CPI     02H              ;MONTH #2?
15B6 78                         MOV     A,B              ;FETCH DAY INFO
15B7 C2AB15     C               JNZ     INT751           ;IF NOT, WRONG SO JUMP
15BA 3601            INT753:    MVI     M,01
15BC 2B                         DCX     H                ;MONTH
15BD 7E                         MOV     A,M              ;FETCH MONTH
15BE 3C                         INR     A                ;INCREMENT MONTH
15BF 27                         DAA                      ;AND ADJUST
15C0 FE13                       CPI     13H              ;13TH MONTH?
15C2 C2AB15     C               JNZ     INT751           ;JMP IF NOT 13
15C5 3601            INT755:    MVI     M,01
15C7 23                         INX     H
15C8 23                         INX     H                ;YEAR
15C9 7E                         MOV     A,M              ;FETCH YEAR
15CA 3C                         INR     A                ;INCREMENT YEAR
15CB 27                         DAA                      ;AND ADJUST
15CC C3AB15     C               JMP     INT751
15CF 47              INT754:    MOV     B,A              ;STORE DAYS IN B REG.
15D0 2B                         DCX     H                ;MONTH
15D1 7E                         MOV     A,M              ;FETCH MONTH
15D2 23                         INX     H                ;DAYS
15D3 FE04                       CPI     04H              ;MONTH #4?
15D5 CABA15     C               JZ      INT753           ;IF SO JUMP
15D8 FE06                       CPI     06H              ;6TH MONTH?
15DA CABA15     C               JZ      INT753
15DD FE09                       CPI     09H              ;9TH MONTH
15DF CABA15     C               JZ      INT753
15E2 FE11                       CPI     11H              ;11TH MONTH
15E4 CABA15     C               JZ      INT753
15E7 78                         MOV     A,B              ;REFETCH DAYS
15E8 C3AB15     C               JMP     INT751
                     ;
                     ;CUSTOMER PRICING ROUTINE ENTERS PRICE ON ALL SELL TRANSACTIONS CURRENTLY
                     ;IN EXISTANCE WHERE PRICE HAS NOT BEEN ENTERED.  USED WHEN AN ELEVATOR
                     ;CHOOSES NOT TO ENTER PRICE UNTIL CLOSE OF MARKET FOR THE DAY.
                     ;
15EB 111409     C    CUSPR:     LXI     D,DMSG22         ;HEADING MSG
15EE CD0000     E               CALL    PMASG
15F1 11B110     C               LXI     D,MNFEA          ;ENTER KEY TO CONTINUE
15F4 CD0000     E               CALL    PMASG
15F7 CD4F15     C               CALL    STPRMP
15FA CDDF1C     C               CALL    ENTKEY
15FD D2541D     C               JNC     PRGM7            ;DELETE KEY BUMPS US OUT
1600 2100C0                     LXI     H,EXRAM          ;START OF TRANSACTIONS HERE WE GO
1603 112700                     LXI     D,39             ;LENGTH OF TRANSACTION PLUS STATUS BYTE
1606 01D200                     LXI     B,NTRANS         ;NUMBER OF TRANSACTIONS TO SEARCH
1609 C5              CUSPR1:    PUSH    B
160A CDB117     C               CALL    BUSYB            ;IS THERE A VALID TRANSACTION HERE?
160D DA1F16     C               JC      CUSPR0           ;HAS A TRANSACTION SO CHECK
1610 19              CUSPRA:    DAD     D
1611 C1                         POP     B
1612 0D                         DCR     C                ;DECREMENT COUNTER
1613 C20916     C               JNZ     CUSPR1           ;JUMP BACK TO CHECK NEXT BUSY BYTE
1616 78                         MOV     A,B
1617 B7                         ORA     A
1618 CABC16     C               JZ      CUSPRE           ;CHECK BALANCE OF COUNTER
161B 0B                         DCX     B
161C C30916     C               JMP     CUSPR1           ;NOT ALL FINISHED SO GO BACK
161F 3AB601     D    CUSPR0:    LDA     DESTOR
1622 FEFF                       CPI     0FFH
1624 CA2A16     C               JZ      CUSPR2
1627 C31016     C               JMP     CUSPRA
162A AF              CUSPR2:    XRA     A
162B 32B601     D               STA     DESTOR
162E E5                         PUSH    H
162F D5                         PUSH    D
1630 E5                         PUSH    H
1631 110600                     LXI     D,6              ;THE LOCATION OF THE COMMODITY NUMBER
1634 19                         DAD     D
1635 4E                         MOV     C,M              ;PLACE COMMODITY NUMBER IN THE C REG
1636 CD701D     C               CALL    CMDADR           ;GET ADDRESS
1639 DA4216     C               JC      CUSPR3           ;GOOD NUMBER SO JUMP
163C E1                         POP     B                ;NO COMMODITY NUMBER SO RETURN
163D D1                         POP     D
163E E1                         POP     H
163F C31016     C               JMP     CUSPRA
1642 5E              CUSPR3:    MOV     E,M
1643 23                         INX     H
1644 56                         MOV     D,M              ;RETRIEVE PRICE FROM MEMORY IN PROGRAM
1645 E1                         POP     H
1646 011F00                     LXI     B,31             ;SET UP PRICE OFFSET
1649 09                         DAD     B
164A 73                         MOV     M,E              ;PLACE IN TRANSACTION MEMORY
164B 23                         INX     H
164C 72                         MOV     M,D
164D D1                         POP     D
164E E1                         POP     H
164F D5                         PUSH    D                ;SET UP FOR PRINTING
1650 54                         MOV     D,H
1651 5D                         MOV     E,L
1652 13                         INX     D
1653 3ABA01     D               LDA     TKSTR            ;WAS A PRINT KEY ENTERED?
1656 FE64                       CPI     PRINT
1658 C27916     C               JNZ     CUSPR4           ;NO    SO PRINT SHORT FORM
165B 3AB701     D               LDA     DSTOR0           ;IS THIS TRANSACTION COMPLETE
165E FE1F                       CPI     1FH
1660 C27916     C               JNZ     CUSPR4           ;IF NOT PRINT OUT SHORT FORM
1663 AF                         XRA     A
1664 32B701     D               STA     DSTOR0
1667 E5                         PUSH    H                ;YES SO DO WHOLE WORKS
1668 3A3100     D               LDA     TRPSTR           ;HOW MANY COPIES?
166B 323700     D    CUSPR5:    STA     PRLOC0
166E CD1F12     C               CALL    AUTOFF
```

```
LOC  OBJ          LINE        SOURCE STATEMENT

1671 CD0000   E  1728           CALL     PRLR
1674 E1          1729           POP      H
1675 D1          1730           POP      D
1676 C31016   C  1731           JMP      CUSPRA
1679 E5          1732 CUSPR4:   PUSH     H               ;JUST PRINT OUT SHORT FORM
167A EB          1733           XCHG
167B CD0000   E  1734           CALL     PFORMA
167E CD4F15   C  1735           CALL     STFRMF
1681 11F20B   C  1736           LXI      D,DMSG33
1684 CD0000   E  1737           CALL     PMASG
1687 E1          1738           POP      H
1688 D1          1739           POP      D
1689 C31016   C  1740           JMP      CUSPRA
168C 111A0A   C  1741 CUSPRE:   LXI      D,DMSG23
168F CD0000   E  1742           CALL     PMASG
1692 CD4F15   C  1743           CALL     STFRMF
1695 C3541D   C  1744           JMP      PRGM7
                 1745 ;
                 1746 ;
                 1747 ;CUSTOMER LIST ROUTINE - PRINTS OUT A LIST OF ALL INCOMPLETED TRANSACTIONS
                 1748 ;AND WHAT IS MISSING
                 1749 ;
1698 112E0A   C  1750 CUSLST:   LXI      D,DMSG25        ;DIRECTIONS
169B CD0000   E  1751           CALL     PMASG
169E 2100C0      1752           LXI      H,EXRAM
16A1 112700      1753           LXI      D,39
16A4 01D200      1754           LXI      B,NTRANS
16A7 C5          1755 CUSLT1:   PUSH     B
16A8 CDB117   C  1756           CALL     BUSYB           ;CHECK BUSY BIT
16AB D2BE16   C  1757           JNC      CUSLTA
16AE 7E          1758           MOV      A,M             ;CHECK STATUS IS ANY THING MISSING?
16AF E61F        1759           ANI      1FH
16B1 FE1F        1760           CPI      1FH
16B3 C2CD16   C  1761           JNZ      CUSLT0          ;JUMP IF SOMTHING IS MISSING
16B6 3AB601   D  1762           LDA      DESTOR
16B9 FEFF        1763           CPI      0FFH
16BB CACD16   C  1764           JZ       CUSLT0
16BE 19          1765 CUSLTA:   DAD      D
16BF C1          1766           POP      B
16C0 0D          1767           DCR      C
16C1 C2A716   C  1768           JNZ      CUSLT1
16C4 78          1769           MOV      A,B
16C5 B7          1770           ORA      A               ;COUNT DOWN ROUTINE
16C6 CA3317   C  1771           JZ       CUSLTE          ;JUMP   IF FINISHED
16C9 0B          1772           DCX      B
16CA C3A716   C  1773           JMP      CUSLT1
16CD 7E          1774 CUSLT0:   MOV      A,M
16CE 32BA01   D  1775           STA      TKSTR           ;TEMP STORE STATUS BYTE
16D1 E5          1776           PUSH     H
16D2 D5          1777           PUSH     D
16D3 5D          1778           MOV      E,L
16D4 54          1779           MOV      D,H             ;SET UP FOR PFORMA
16D5 13          1780           INX      D
16D6 EB          1781           XCHG
16D7 CD0000   E  1782           CALL     PFORMA
16DA 118C0B   C  1783           LXI      D,DMSG26
16DD CD0000   E  1784           CALL     PMASG
16E0 3ABA01   D  1785           LDA      TKSTR
16E3 B7          1786           ORA      A               ;NOW LETS SEE WHATS MISSING
16E4 0F          1787           RRC
16E5 DAEE16   C  1788           JC       CLTA
16E8 11B20B   C  1789           LXI      D,DMSG27
16EB CD0000   E  1790           CALL     PMASG           ;MOISTURE MISSING
16EE 0F          1791 CLTA:     RRC
16EF DAF816   C  1792           JC       CLTB
16F2 11BE0B   C  1793           LXI      D,DMSG28        ;FM MISSING
16F5 CD0000   E  1794           CALL     PMASG
16F8 0F          1795 CLTB:     RRC
16F9 DA0217   C  1796           JC       CLTC
16FC 11C40B   C  1797           LXI      D,DMSG29        ;DAMAGE MISSING
16FF CD0000   E  1798           CALL     PMASG
1702 0F          1799 CLTC:     RRC
1703 DA0C17   C  1800           JC       CLTD
1706 11CE0B   C  1801           LXI      D,DMSG30        ;WT OUT MISSING
1709 CD0000   E  1802           CALL     PMASG
170C 0F          1803 CLTD:     RRC
170D DA1617   C  1804           JC       CLTE
1710 11DC0B   C  1805           LXI      D,DMSG31        ;TEST WEIGHT MISSING
1713 CD0000   E  1806           CALL     PMASG
1716 3AB601   D  1807 CLTE:     LDA      DESTOR
1719 FEFF        1808           CPI      0FFH
171B C22817   C  1809           JNZ      CLTF
171E AF          1810           XRA      A
171F 32B601   D  1811           STA      DESTOR
1722 11EB0B   C  1812           LXI      D,DMSG32
1725 CD0000   E  1813           CALL     PMASG
1728 D1          1814 CLTF:     POP      D
1729 E1          1815           POP      H
172A 3E02        1816           MVI      A,02
172C 00          1817           NOP
172D CD0000   E  1818           CALL     ACRR
1730 C3BE16   C  1819           JMP      CUSLTA
1733 111A0A   C  1820 CUSLTE:   LXI      D,DMSG23
1736 CD0000   E  1821           CALL     PMASG
1739 0E0C        1822           MVI      C,AFF
173B CD0000   E  1823           CALL     PCHAR
173E C3541D   C  1824           JMP      PRGM7
                 1825 ;
1741 AF          1826 CSPRT:    XRA      A
1742 32BA01   D  1827           STA      TKSTR
1745 323100   D  1828           STA      TRFSTR
1748 32B601   D  1829           STA      DESTOR
174B CDC519   C  1830           CALL     KEYDIS
```

```
LOC  OBJ          LINE        SOURCE STATEMENT

174E CD902B    C             CALL    GKEY
1751 D2541D    C             JNC     PRGM7
1754 CDC519    C             CALL    KEYDIS
1757 FE60                    CPI     CUST
1759 CA6417    C             JZ      CSPRT4
175C CD8811    C             CALL    ERDASH
175F 3E63                    MVI     A,PPRICE
1761 C34117    C             JMP     CSPRT
1764 CD902B    C    CSPRT4:  CALL    GKEY
1767 D2541D    C             JNC     PRGM7
176A CDC519    C             CALL    KEYDIS
176D FE64                    CPI     PRINT
176F CA7A17    C             JZ      CSPRT3
1772 FE65                    CPI     ENTER
1774 C2AB17    C             JNZ     CSPRT2
1777 C3EB15    C             JMP     CUSPR
177A 32BA01    D    CSPRT3:  STA     TKSTR
177D CD902B    C             CALL    GKEY
1780 D2541D    C             JNC     PRGM7
1783 CDC519    C             CALL    KEYDIS
1786 CD0D1A    C             CALL    DIGITP
1789 D29E17    C             JNC     CSPRT1
178C 323100    D             STA     TRPSTR
178F 4F                      MOV     C,A
1790 0600                    MVI     B,0
1792 CDD528    C             CALL    SDUPR
1795 CDDF1C    C    CSPRT0:  CALL    ENTKEY
1798 D2541D    C             JNC     PRGM7
179B C3EB15    C             JMP     CUSPR
179E FE65           CSPRT1:  CPI     ENTER
17A0 C2AB17    C             JNZ     CSPRT2
17A3 3E01                    MVI     A,1
17A5 323100    D             STA     TRPSTR
17A8 C3EB15    C             JMP     CUSPR
17AB CD8811    C    CSPRT2:  CALL    ERDASH
17AE C39517    C             JMP     CSPRT0
                    ;
17B1 B7             BUSYB:   ORA     A
17B2 7E                      MOV     A,M
17B3 E680                    ANI     80H
17B5 CAD117    C             JZ      BUSYBA
17B8 7E                      MOV     A,M
17B9 E660                    ANI     60H
17BB C2D017    C             JNZ     BUSYBE
17BE 7E                      MOV     A,M
17BF E61F                    ANI     1FH
17C1 32B701    D             STA     DSTOR0
17C4 E5                      PUSH    H
17C5 D5                      PUSH    D
17C6 111F00                  LXI     D,31
17C9 19                      DAD     D
17CA 7E                      MOV     A,M
17CB 32B601    D             STA     DESTOR
17CE D1                      POP     D
17CF E1                      POP     H
17D0 37             BUSYBE:  STC
17D1 C9             BUSYBA:  RET
                    ;
                    ;
                    ;CLEAR POWER FLAG ROUTINE
                    ;
17D2 AF             CLRPFR:  XRA     A
17D3 322F00    D             STA     PWRFL              ;POWER FLAG
17D6 20                      RIM
17D7 E60E                    ANI     0EH
17D9 F608                    ORI     08H
17DB 30                      SIM
17DC C9                      RET
                    ;
                    ;
                    ;     INT55
                    ;
17DD F5             INT55:   PUSH    PSW
17DE 3EFF                    MVI     A,0FFH
17E0 322F00    D             STA     PWRFL              ;POWER FLAG
17E3 20                      RIM
17E4 F609                    ORI     09H
17E6 30                      SIM
17E7 F1                      POP     PSW
17E8 FB                      EI
17E9 C9                      RET
                    ;
                    ;
                    ;   WEIGHT DISPLAY UPDATE ROUTINE
                    ;        B,C HOLD 4 DIGIT BCD # TO BE DISPLAYED ON WT. DISPLAY
                    ;
17EA C5             WDUPR:   PUSH    B
17EB D5                      PUSH    D
17EC E5                      PUSH    H
17ED F5                      PUSH    PSW
17EE 21AD01    D             LXI     H,DIM11            ;MS WEIGHT DISPLAY
17F1 AF                      XRA     A
17F2 C5                      PUSH    B
17F3 010000                  LXI     B,0
17F6 CD3611    C             CALL    SEGMR
17F9 C1                      POP     B
17FA 77                      MOV     M,A                ;WANT TO DISPLAY ZERO
17FB 21B201    D             LXI     H,DIM24            ;LS WEIGHT DISPLAY
17FE CD3611    C             CALL    SEGMR
1801 77                      MOV     M,A
1802 23                      INX     H
1803 79                      MOV     A,C
1804 0F                      RRC
```

```
LOC  OBJ              SOURCE STATEMENT

1805 0F                        RRC
1806 0F                        RRC
1807 0F                        RRC
1808 4F                        MOV    C,A
1809 CD3611     C              CALL   SEGMR
180C 77                        MOV    M,A
180D 23                        INX    H
180E 78                        MOV    A,B
180F 4F                        MOV    C,A
1810 CD3611     C              CALL   SEGMR
1813 77                        MOV    M,A
1814 23                        INX    H
1815 78                        MOV    A,B
1816 0F                        RRC
1817 0F                        RRC
1818 0F                        RRC
1819 0F                        RRC
181A 4F                        MOV    C,A
181B CD3611     C              CALL   SEGMR
181E 77                        MOV    M,A
181F CDB328     C              CALL   DISUPR
1822 C35612     C              JMP    STRET
                      ;
                      ;
                      ;   DELETE TRANSACTION ROUTINE
                      ;
                      ;
1825 CDC519     C     DTRANR:  CALL   KEYDIS
1828 111404                    LXI    D,0414H          ;SET-UP FOR DIGINR
182B CDAA20     C              CALL   DIGINR           ;TAKE TRANS # DIGITS
182E D2541D     C              JNC    PRGM7
1831 03                        INX    B
1832 69                        MOV    L,C
1833 60                        MOV    H,B              ;SET-UP FOR BLOADR
1834 3E04                      MVI    A,04H
1836 92                        SUB    D                ;GET # OF DIGITS ENTERED
1837 57                        MOV    D,A
1838 CDAD1E     C              CALL   BLOADR
183B CD0000     E              CALL   TRFIND           ;GET HIS POINTERS
183E D27C18     C              JNC    DTR3
1841 3EFF             DTRAN0:  MVI    A,0FFH
1843 320A02     D              STA    DTRFL            ;SET THE DTR FLAG
1846 CDD22A     C              CALL   PRNDV            ;ONE LAST LOOK
1849 AF                        XRA    A
184A 320A02     D              STA    DTRFL            ;CLEAR THE DTR FLAG
184D E5                        PUSH   H                ;2/24/81 UPDATED FROM DTRAN0 TO DTR1
184E 211D00                    LXI    H,29             ;CHECKS STATUS BYTE 29 TO SEE IF TRANS
1851 19                        DAD    D                ;IS COMPLETE AND HAS BEEN ENTERED IN
1852 7E                        MOV    A,M              ;THE DAILY POSITION REPORT.  IF SO UPDATES
1853 E601                      ANI    1                ;THE DPR THEN PRINTS OUT COPY AND DELETES
1855 E1                        POP    H
1856 C26518     C              JNZ    DTR1
1859 3EFF                      MVI    A,0FFH
185B 320A02     D              STA    DTRFL
185E CD0000     E              CALL   ADDNTA
1861 AF                        XRA    A
1862 320A02     D              STA    DTRFL
1865 3600             DTR1:    MVI    M,00H
1867 EB                        XCHG
1868 112600                    LXI    D,0036           ;LENGTH OF TRANS
186B 0EFF                      MVI    C,0FFH
186D CD0000     E              CALL   SMLR             ;STUFF WITH FF
1870 11FB02     C              LXI    D,MTRDEL         ;TR DELETED MESSAGE
1873 CD0000     E              CALL   PMASG
1876 CD4F15     C              CALL   STFRMF
1879 C3541D     C              JMP    PRGM7            ;AND EXIT
187C 11DA02     C     DTR3:    LXI    D,MTDNE          ;TRANS DOES NOT EXIST MESSAGE
187F CD0000     E              CALL   PMASG
1882 CD4F15     C              CALL   STFRMF
1885 C3541D     C              JMP    PRGM7
                      ;
                                                       ;TRANSACTION DISPLAY ROUTINE
                                                       ;TURNS ON LED FOR THE TRANSACTION ENTERED
                                                       ;H&L POINTS BUFFER BYTE
                                                       ;D&E POINTS TO STATUS BYTE
                      ;
1888 C5               TRADIS:  PUSH   B
1889 D5                        PUSH   D
188A E5                        PUSH   H
188B F5                        PUSH   PSW
188C 7E                        MOV    A,M              ;BRING THE STATUS BYTE
188D F5                        PUSH   PSW              ;STORE
188E 210500                    LXI    H,05H            ;OFFSET TO COMMODITY NO IN BUFFER
1891 19                        DAD    D
1892 7E                        MOV    A,M
1893 FEFF                      CPI    0FFH             ;COMMODITY ENTERED?
1895 CA1F19     C              JZ     TRADE
1898 3D                        DCR    A
1899 214300     C              LXI    H,KYTAB2         ;POINT TO COMMODITY KEY CODE TABLE
189C 0600                      MVI    B,0
189E 4F                        MOV    C,A
189F 09                        DAD    B
18A0 7E                        MOV    A,M              ;BRING THE KEYCODE FOR THAT COMMODITY
18A1 CDC519     C              CALL   KEYDIS           ;CLEAR THE COMMODITY NAME FROM SCRATCH PAD
18A4 210600                    LXI    H,06H
18A7 19                        DAD    D
18A8 7E                        MOV    A,M              ;BRING THE WT. IN
18A9 FEFF                      CPI    0FFH
18AB CAB318     C              JZ     TRAD1            ;JUMP IF WT. IN NOT ENTERED
18AE 3E33                      MVI    A,WTIN           ;LOAD THE KEY
18B0 CDC519     C              CALL   KEYDIS
18B3 F1               TRAD1:   POP    PSW
18B4 F5                        PUSH   PSW
```

```
LOC  OBJ             SOURCE STATEMENT

18B5 E608                    ANI     1000B           ;WEIGHT OUT ENTERED?
18B7 CABF18     C            JZ      TRAD2
18BA 3E37                    MVI     A,WTOUT
18BC CDC519     C            CALL    KEYDIS
18BF F1              TRAD2:  POP     PSW
18C0 F5                      PUSH    PSW
18C1 E601                    ANI     1B              ;MOIST?
18C3 CACB18     C            JZ      TRAD3
18C6 3E67                    MVI     A,MOIST
18C8 CDC519     C            CALL    KEYDIS
18CB F1              TRAD3:  POP     PSW
18CC F5                      PUSH    PSW
18CD E602                    ANI     10B             ;FM?
18CF CAD718     C            JZ      TRAD4
18D2 3E62                    MVI     A,FM
18D4 CDC519     C            CALL    KEYDIS
18D7 F1              TRAD4:  POP     PSW
18D8 F5                      PUSH    PSW
18D9 E604                    ANI     100B            ;DAMAGE?
18DB CAE318     C            JZ      TRAD5
18DE 3E66                    MVI     A,DAMAGE
18E0 CDC519     C            CALL    KEYDIS
18E3 F1              TRAD5:  POP     PSW
18E4 F5                      PUSH    PSW
18E5 E610                    ANI     10000B          ;TEST WT?
18E7 CAEF18     C            JZ      TRAD6
18EA 3E73                    MVI     A,TESTWT
18EC CDC519     C            CALL    KEYDIS
18EF F1              TRAD6:  POP     PSW
18F0 F5                      PUSH    PSW
18F1 E660                    ANI     60H
18F3 07                      RLC
18F4 07                      RLC
18F5 07                      RLC
18F6 214C00     C            LXI     H,KYTAB1        ;TYPE OF HANDLING
18F9 0600                    MVI     B,0
18FB 4F                      MOV     C,A
18FC 09                      DAD     B
18FD 7E                      MOV     A,M
18FE CDC519     C            CALL    KEYDIS
1901 211400                  LXI     H,20            ;SERVICE ENTERED?
1904 19                      DAD     D
1905 7E                      MOV     A,M
1906 FEFF                    CPI     0FFH
1908 CA1019     C            JZ      TRAD7
190B 3E36                    MVI     A,SERVIC
190D CDC519     C            CALL    KEYDIS
1910 212000          TRAD7:  LXI     H,32            ;SHARE ENTERED?
1913 19                      DAD     D
1914 7E                      MOV     A,M
1915 FEFF                    CPI     0FFH
1917 CA1F19     C            JZ      TRAD8
191A 3E32                    MVI     A,SHARE
191C CDC519     C            CALL    KEYDIS
191F 211F00          TRAD8:  LXI     H,31
1922 19                      DAD     D
1923 7E                      MOV     A,M
1924 FEFF                    CPI     0FFH
1926 CA2E19     C            JZ      TRAD9
1929 3E63                    MVI     A,PRICE
192B CDC519     C            CALL    KEYDIS
192E F1              TRAD9:  POP     PSW
192F C35812     C            JMP     STRET
                     ;
                     ;
                     ;
                     ;
                     ; BCD TO BINARY IN A 16 BIT QUANTITY
                     ;               B,C REGS HOLD # TO BE CHANGED AND
                     ;               ALSO CHANGED # IS RETURNED IN B,C REGS
                     ;
1932 D5              B2BI16: PUSH    D
1933 E5                      PUSH    H
1934 F5                      PUSH    PSW
1935 210000                  LXI     H,0000H         ;INITIALIZE THE #
1938 78                      MOV     A,B             ;MS BYTE
1939 E6F0                    ANI     0F0H            ;LOOK AT 1000'S PLACE ONLY
193B 0F                      RRC                     ;MOVE TO LS NIBBLE
193C 0F                      RRC
193D 0F                      RRC
193E 0F                      RRC
193F 11E803                  LXI     D,1000          ;USED FOR ADDING 1000, N TIMES
1942 B7                      ORA     A               ;IS THOUSANDS PLACE ZERO?
1943 C46B19     C            CNZ     B2BIA           ;ADDS 1000, A REG. TIMES
1946 78                      MOV     A,B             ;MS BYTE REFETCH
1947 E60F                    ANI     0FH             ;THIS TIME LOOK AT ONLY 100'S PLACE
1949 116400                  LXI     D,100           ;FOR ADDING 100, A REG. TIMES
194C B7                      ORA     A               ;IS 100'S ZERO?
194D C46B19     C            CNZ     B2BIA
1950 79                      MOV     A,C             ;LS BYTE
1951 E6F0                    ANI     0F0H            ;LOOK AT TENS PLACE ONLY
1953 0F                      RRC                     ;MOVE IT TO LS NIBBLE
1954 0F                      RRC
1955 0F                      RRC
1956 0F                      RRC
1957 110A00                  LXI     D,10            ;USED FOR ADDING TEN, N TIMES
195A B7                      ORA     A               ;IS IT ZERO?
195B C46B19     C            CNZ     B2BIA
195E 79                      MOV     A,C             ;LS BYTE
195F E60F                    ANI     0FH             ;LOOK AT ONES PLACE ONLY
1961 5F                      MOV     E,A             ;SET UP FOR
1962 1600                    MVI     D,00H               ;ADDITION
1964 19                      DAD     D               ;ADDS TO H,L REGISTERS
1965 4D                      MOV     C,L             ;NOW B,C REGS HOLD 16 BIT BINARY#
```

```
LOC  OBJ             SOURCE STATEMENT

1966 44                      MOV    B,H             ;    DITTO AS ABOVE
1967 F1                      POP    PSW
1968 E1                      POP    H
1969 D1                      POP    D
196A C9                      RET
                     ;
                     ;
                     ;    B2BIA ROUTINE USES A REGISTER AS A COUNTER
                     ;                   AND D REGISTER AS THE # TO ADD
                     ;                   EACH TIME TO THE H,L REGISTERS
                     ;
196B 19              B2BIA:  DAD    D
196C 3D                      DCR    A               ;DECREMENT CONTER
196D C26B19     C            JNZ    B2BIA
1970 C9                      RET
                     ;
                     ;
                     ;       THE SERIAL NUMBER ROUTINE COMPARES KEY ENTRIES WITH
                     ;                      THE SERIAL # TABLE.  IF ALL FOUR
                     ;                      ARE ENTERED IN SEQUENCE A CARRY IS
                     ;                      RETURNED, IF NOT, NO CARRY IS RETURNED
                     ;
1971 B7              SERNR:  ORA    A
1972 C5                      PUSH   B
1973 D5                      PUSH   D
1974 E5                      PUSH   H
1975 F5                      PUSH   PSW             ;SAVE ALL
1976 21F5FE                  LXI    H,SERNO         ;SERIAL # TABLE
1979 0604                    MVI    B,04H           ;LENGTH OF TABLE
197B CD7E11     C    SERNR1: CALL   KEYDWN          ;ANY KEY ENTRIES?
197E B7                      ORA    A               ;CLEAR CARRY
197F BE                      CMP    M               ;DOES IT MATCH TABLE
1980 C25812     C            JNZ    STRET           ;IF NOT , SORRY
1983 23                      INX    H               ;NEXT ENTRY IN SERN
1984 05                      DCR    B               ;LAST ENTRY?
1985 C27B19     C            JNZ    SERNR1          ;IF NOT, DO IT AGAIN
1988 F1                      POP    PSW
1989 37                      STC
198A E1                      POP    H
198B D1                      POP    D
198C C1                      POP    B
198D C9                      RET
                     ;
                     ;
                     ;
                     ;     LOCK ROUTINE
                     ;
                     ;       THIS ROUTINE CHECKS FOR CORRECT SERIAL # SEQUENCE
                     ;       UNLOCKS AND CLEARS SCRATCH PAD DISP.  IF NOT SET,
                     ;       DISPLAYS LOCK DISP. ON SCR. PD. AND SETS LOCKFL
                     ;
198E CDC519     C    LOCKR:  CALL   KEYDIS
1991 3A2C00     D            LDA    LOCKFL          ;LOCK FLAG
1994 B7                      ORA    A               ;IS IT SET?
1995 C2AD19     C            JNZ    LOCK3           ;IF SO, JUMP
1998 CD7E11     C    LOCK1:  CALL   KEYDWN
199B FE11                    CPI    DELET
199D CA541D     C            JZ     PRGM7
19A0 FE65                    CPI    ENTER
19A2 C20512     C            JNZ    INVALR
19A5 3EFF                    MVI    A,0FFH
19A7 322C00     D            STA    LOCKFL
19AA C3541D     C            JMP    PRGM7
19AD CD7119     C    LOCK3:  CALL   SERNR
19B0 D2541D     C            JNC    PRGM7
19B3 AF                      XRA    A
19B4 322C00     D            STA    LOCKFL          ;CLEAR LOCK FLAG
19B7 0EFF                    MVI    C,0FFH
19B9 CD0000     E            CALL   DLYR
19BC CD0000     E            CALL   BEEP
19BF CD0000     E            CALL   BEEP
19C2 C3541D     C            JMP    PRGM7
                     ;
                     ;
                     ;
                     ;       KEYDIS ROUTINE TAKES WHAT IS PASSED IN THE A REGISTER,
                     ;                     COMPARES WITH KEYTAB, CHANGES IT TO A
                     ;                     SEGMENT CODE(USING KEYSEG), DISPLAYS IT,
                     ;                     AND PASSES THE KEYCODE OF THE KEY PRESSED
                     ;                     IN THE A REG.
                     ;
19C5 C5              KEYDIS: PUSH   B
19C6 D5                      PUSH   D
19C7 E5                      PUSH   H
19C8 F5                      PUSH   PSW
19C9 21B800     C            LXI    H,KEYTAB        ;KEY TABLE
19CC 11DE00     C            LXI    D,KEYSEG        ;SEGMENT TABLE OF THE KEYS
19CF 012600                  LXI    B,KEYSEG-KEYTAB ;LENGTH OF TABLE
19D2 BE              KEYDS1: CMP    M               ;IS IT WHAT WE ARE LOOKING FOR
19D3 CAF319     C            JZ     KEYDS3          ;IF FOUND IT, JUMP
19D6 23                      INX    H               ;NEXT TABLE ENTRY
19D7 13                      INX    D               ;NEXT SEGMENT ENTRY
19D8 13                      INX    D
19D9 13                      INX    D
19DA 13                      INX    D
19DB 13                      INX    D
19DC 13                      INX    D
19DD 0D                      DCR    C               ;DECREMENT COUNTER
19DE C2D219     C            JNZ    KEYDS1          ;IF NOT THRU, REDO LOOP
19E1 CD321A     C            CALL   CLRSPD          ;CLEAR SCRATCH PAD DISPLAY
19E4 AF                      XRA    A
19E5 21AC01     D            LXI    H,DIM10         ;MS SCRATCH PAD DISP. RAM
19E8 77                      MOV    M,A
19E9 2B                      DCX    H
```

```
LOC  OBJ                 SOURCE STATEMENT

19EA 77                       MOV    M,A              ;STORE AT MS SPDISP.
19EB 2B                       DCX    H                ;NEXT LOC.
19EC 77                       MOV    M,A              ;STORE
19ED CDB328   C       KEYDS2: CALL   DISUPR           ;UPDATE DISPLAY
19F0 C35812   C               JMP    STRET
19F3 21AC01   D       KEYDS3: LXI    H,DIM10          ;MS SCRATCH PAD DISPLAY
19F6 1A                       LDAX   D                ;FETCH KEYSEG
19F7 77                       MOV    M,A              ;STORE IN MS SCR. PD DISP MEMORY
19F8 13                       INX    D                ;NEXT KEYSEG
19F9 2B                       DCX    H                ;MID SCRATCH PAD DISPLAY LOC
19FA 1A                       LDAX   D                ;FETCH KEYSEG
19FB 77                       MOV    M,A              ;STORE IN MID SCR PD DISP MEMORY
19FC 13                       INX    D                ;NEXT KEYSEG
19FD 2B                       DCX    H                ;LS SCRATCH PAD DIS LOC
19FE 1A                       LDAX   D                ;FETCH KEYSEG
19FF 77                       MOV    M,A              ;STORE IN MEMORY LOC
1A00 13                       INX    D                ;NEXT KEYSEG
1A01 EB                       XCHG                    ;D,E-LAMP FLD 1....H,L-KEYSEG
1A02 7E                       MOV    A,M              ;MASK
1A03 23                       INX    H
1A04 46                       MOV    B,M              ;LS ADDR BYTE
1A05 23                       INX    H
1A06 66                       MOV    H,M              ;MS ADDR BYTE
1A07 68                       MOV    L,B
1A08 B6                       ORA    M                ;SET MASK WITHOUT CHANGING OTHERS
1A09 77                       MOV    M,A              ;LED MASK TO RAM COPY
1A0A C3ED19   C               JMP    KEYDS2
                      ;
                      ;
                      ;
                      ;       THE DIGIT ROUTINE SCOURS THE DIGIT TABLE AND CHANGES
                      ;                      THE A  REG. TO A BINARY DIGIT IF IT
                      ;                      CONTAINS A VALID KEY CODE FOR A DIGIT
                      ;                      KEY.  THE CARRY FLAG IS SET IF THE A
                      ;                      REG. WAS A DIGIT KEY CODE UPON ENTRY
                      ;
1A0D C5               DIGITR: PUSH   B
1A0E E5                       PUSH   H
1A0F F5                       PUSH   PSW   ;SAVE ALL
1A10 216000   C               LXI    H,KEYDIG         ;START OF KEY DIGIT TABLE
1A13 0600                     MVI    B,00H ;INITIALIZE DIGIT COUNTER
1A15 BE               DIG1:   CMP    M     ;THIS DIGIT?
1A16 CA2C1A   C               JZ     DIG4  ;IF SO, B HOLDS DIGIT #
1A19 4F                       MOV    C,A   ;IF NOT, CHECK NEXT LOCATION
1A1A 78                       MOV    A,B
1A1B 3C                       INR    A     ;INCREMENT DIGIT COUNTER
1A1C FE0A                     CPI    0AH   ;LENGTH OF KEYDIG TABLE
1A1E C2261A   C               JNZ    DIG3  ;IF NOT LAST POSSIBLE DIGIT, CHECK NEXT
1A21 F1                       POP    PSW
1A22 B7                       ORA    A     ;CLEAR CARRY TO SHOW NO SUCCESS
1A23 E1               DIG2:   POP    H
1A24 C1                       POP    B
1A25 C9                       RET
1A26 47               DIG3:   MOV    B,A   ;RESTORE DIGIT COUNTER
1A27 79                       MOV    A,C   ;RESTORE KEY CODED ENTRY
1A28 23                       INX    H     ;NEXT KEYDIG LOCATION
1A29 C3151A   C               JMP    DIG1  ;AND CHECK NEXT LOCATION
1A2C F1               DIG4:   POP    PSW   ;BINARY DIGIT TO A-REGISTER
1A2D 78                       MOV    A,B
1A2E 37                       STC          ;SET CARRY FLAG TO SHOW SUCCESS
1A2F C3231A   C               JMP    DIG2  ;AND EXIT
                      ;
                      ;
                      ;       CLEAR SCRATCH PAD DISPLAY ROUTINE DISPLAYS ZEROES
                      ;                            IN THE SCRATCH PAD DISPLAY
                      ;
1A32 E5               CLRSPD: PUSH   H
1A33 C5                       PUSH   B
1A34 21AC01   D               LXI    H,DIM10          ;MS SCRATCH PAD DISPLAY LOCATION
1A37 063F                     MVI    B,SEG0           ;FOR DISPLAYING ZEROES
1A39 0E03                     MVI    C,03H            ;# OF SCRATCH PD LOCATIONS
1A3B 70               SPD1:   MOV    M,B              ;SEG0 TO MEMORY LOCATION
1A3C 2B                       DCX    H                ;NEXT LOWER LOCATION
1A3D 0D                       DCR    C                ;COUNTER
1A3E C23B1A   C               JNZ    SPD1             ;IF NOT THRU, REDO LOOP
1A41 CDB328   C               CALL   DISUPR           ;UPDATE DISPLAY
1A44 C1                       POP    B
1A45 E1                       POP    H
1A46 C9                       RET
                      ;
                      ;
                      ;       COMMODITY CHECK ROUTINE
                      ;                      C REGISTER HOLDS KEYIN INFO TO BE CHECKED
                      ;                      CARRY IS SET IF OK AND THE A REGISTER WILL
                      ;                      HOLD THE COMMODITY #...THE CARRY IS CLEARED
                      ;                      AND 1ST KEYCODE IS RETURNED IN A IF NOT OK
                      ;
1A47 C5               CMDCHK: PUSH   B
1A48 D5                       PUSH   D
1A49 E5                       PUSH   H
1A4A F5                       PUSH   PSW
1A4B 216A00   C       CMDCH1: LXI    H,COMTAB         ;HOLD 7 MAJOR COMOD KEYS
1A4E 118B00   C               LXI    D,CMSTAT         ;(1 PER COMOD) BIT7=1:LOOK FOR 2 KEY
                                                      ;                   ENTRY
1A51 D5                       PUSH   D
1A52 118300   C               LXI    D,COMNUM         ;HOLDS COMOD #
1A55 79                       MOV    A,C              ;FETCH KEYCODE
1A56 0607                     MVI    B,ENCMTB-COMTAB  ;LENGTH OF COMTAB TABLE
1A58 BE               CMDCH2: CMP    M                ;IS IT THIS COMOD KEY?
1A59 CA6A1A   C               JZ     CMDCH5           ;IF MATCHES, JUMP
1A5C 23                       INX    H                ;NEXT COMOD KEY IN TABLE
1A5D 13                       INX    D                ;INCREMENT COMOD#
1A5E 05                       DCR    B                ;DECREMENT COUNTER
```

```
LOC  OBJ         LINE        SOURCE STATEMENT

1A5F C2581A   C               JNZ     CMDCH2          ;IF NOT THRU TABLE, REDO LOOP
1A62 D1               CMDCH3: POP     D               ;NO SUCCESS PATH
1A63 F1               CMDCH4: POP     PSW
1A64 79                       MOV     A,C             ;ORIGINAL KEYCODE IN ACC
1A65 B7                       ORA     A               ;CLEAR CARRY TO SHOW NO SUCCESS
1A66 F5                       PUSH    PSW             ;SAVE IT
1A67 C35812   C               JMP     STRET
1A6A CDC519   C       CMDCH5: CALL    KEYDIS
1A6D 1A                       LDAX    D               ;COMOD#
1A6E 6F                       MOV     L,A             ;STORE COMOD# IN L
1A6F 13                       INX     D               ;INCREMENT COMOD#(NEXT COMOD)
1A70 1A                       LDAX    D               ;FETCH IT
1A71 D1                       POP     D               ;COMSTAT
1A72 95                       SUB     L               ;GET DIFFERENCE TO FIND # OF TYPES
1A73 F5                       PUSH    PSW             ;SAVE RESULT
1A74 EB                       XCHG                    ;E HOLDS COMOD#
1A75 1600                     MVI     D,00H
1A77 1D                       DCR     E               ;DECREMENT COMOD# BECAUSE OF 0 PLACE
1A78 19                       DAD     D               ;OFFSET IN TABLE
1A79 7E                       MOV     A,M             ;FETCH CMSTAT BYTE
1A7A E680                     ANI     80H             ;CHECK BIT7... IF 0:ONE KEY ENTRY
                                                      ;          ... IF 1:TWO KEY ENTRY
1A7C CACE1A   C               JZ      CMDCHA          ;IF ONE KEY ENTRY , JUMP
1A7F F1                       POP     PSW             ;TWO KEY ENTRY PATH, RESTORE DIFF.
1A80 47                       MOV     B,A             ;STORE IN B
1A81 1C                       INR     E               ;COMOD#, C STILL HOLDS ORIG. KEY ENTRY
1A82 CD7E11   C       CMDCH6: CALL    KEYDWN
1A85 FE41                     CPI     COMODA          ;IS IT A-KEY
1A87 CABA1A   C               JZ      CMCH7A          ;IF SO, JUMP
1A8A 1C                       INR     E               ;INCREMENT COMOD#
1A8B 05                       DCR     B               ;B HOLDS # OF TYPES/COMOD
1A8C CA631A   C               JZ      CMDCH4          ;IF ZERO, RAN OUT OF TYPES (NO SUCCESS)
1A8F FE75                     CPI     COMODB          ;IS IT B-KEY
1A91 CABA1A   C               JZ      CMCH7A          ;IF SO, JUMP
1A94 1C                       INR     E               ;INCREMENT COMOD#
1A95 05                       DCR     B               ;DECREMENT # OF TYPES POSSIBLE
1A96 CA631A   C               JZ      CMDCH4          ;JUMP IF NO MORE TYPES LEFT
1A99 FE71                     CPI     COMODC          ;IS IT C-KEY
1A9B CABA1A   C               JZ      CMCH7A          ;IF SO JUMP
1A9E 1C                       INR     E
1A9F 05                       DCR     B
1AA0 CA631A   C               JZ      CMDCH4
1AA3 FE83                     CPI     COMODD
1AA5 CABD1A   C               JZ      CMDCH7
1AA8 1C                       INR     E
1AA9 05                       DCR     B
1AAA CA631A   C               JZ      CMDCH4
1AAD FE84                     CPI     COMODE
1AAF CABD1A   C               JZ      CMDCH7
1AB2 FE11                     CPI     DELET
1AB4 CAC11A   C               JZ      CMDCH8
1AB7 C3631A   C               JMP     CMDCH4
1ABA CDC519   C       CMCH7A: CALL    KEYDIS
1ABD F1               CMDCH7: POP     PSW
1ABE C3D11A   C               JMP     CMDCHB
1AC1 CDC519   C       CMDCH8: CALL    KEYDIS
1AC4 CD7E11   C       CMDCH9: CALL    KEYDWN
1AC7 4F                       MOV     C,A             ;KEYCODE OF KEYIN IN C REG.
1AC8 CDC519   C               CALL    KEYDIS
1ACB C34B1A   C               JMP     CMDCH1          ;JUMP TO REENTER A COMOD(START OVER)
1ACE F1               CMDCHA: POP     PSW             ;ONE KEY ENTRY PATH
1ACF F1                       POP     PSW
1AD0 1C                       INR     E               ;BECAUSE OF ZERO SPOT
1AD1 7B               CMDCHB: MOV     A,E             ;COMOD# TO ACC.
1AD2 37                       STC                     ;SET CARRY TO SHOW SUCCESS
1AD3 F5                       PUSH    PSW             ;SAVE
1AD4 C35812   C               JMP     STRET
                      ;
                      ;
                      ;
                      ;         PROGRAM ROUTINE
                      ;                       THE ACC. HOLDS KEYCODE OF KEY PRESSED
                      ;
                      ;
1AD7 CDC519   C       PRGMR:  CALL    KEYDIS
1ADA CD6311   C               CALL    CLKEYS
1ADD CD7119   C               CALL    SERNR
1AE0 D2541D   C               JNC     PRGM7
1AE3 CDDF1C   C               CALL    ENTKEY
1AE6 D2541D   C               JNC     PRGM7
1AE9 CD902B   C       PRGM1:  CALL    GKEY
1AEC D2541D   C               JNC     PRGM7
1AEF CDC519   C               CALL    KEYDIS
1AF2 FE53             PRGM11: CPI     PROGRM
1AF4 CA1B1B   C               JZ      PRSET
1AF7 CD091D   C               CALL    CMDKYA
1AFA D2541D   C               JNC     PRGM7
1AFD 3A7200   D               LDA     COMB
1B00 4F                       MOV     C,A
1B01 327001   D               STA     SCOMN
1B04 CD701D   C               CALL    CMDADF          ;COMMIDITY ADDRESS FETCH
1B07 E5               PRGM1A: PUSH    H
1B08 CD7E11   C       PRGM2:  CALL    KEYDWN
1B0B CDC519   C       PRGM2A: CALL    KEYDIS
1B0E FE11             PRGM5:  CPI     DELET
1B10 C2961B   C               JNZ     PRGM3
1B13 CD0A28   C       PRGM5A: CALL    DRSETV
1B16 E1                       POP     H
1B17 E5                       PUSH    H
1B18 C3081B   C               JMP     PRGM2
1B1B CD0000   F       PRSET:  CALL    MHEADG          ;ALLOW CUSTOMER TO PROGRAM ELEVATOR NAME
1B1E 11870D   C               LXI     D,DMSG35        ;SERIAL NO. AND CODE NO. AND GOVERNMENT MESSAGE
1B21 CD0000   E               CALL    PMASG
```

```
LOC  OBJ            LINE      SOURCE STATEMENT

1B24 CD902B   C     PRSET2: CALL    GKEY
1B27 D2471B   C             JNC     PRSET4
1B2A CDC519   C             CALL    KEYDIS
1B2D FE65                   CPI     ENTER
1B2F CA471B   C             JZ      PRSET4
1B32 FE33                   CPI     WTIN
1B34 CA751B   C             JZ      PRSET0
1B37 FE37                   CPI     WTOUT
1B39 CA821B   C             JZ      PRSET1
1B3C FE11                   CPI     DELET
1B3E CA471B   C             JZ      PRSET4
1B41 CD8811   C             CALL    ERDASH
1B44 C3241B   C             JMP     PRSET2
1B47 AF             PRSET4: XRA     A
1B48 32C1FF                 STA     CHEATF
1B4B 119F0F   C             LXI     D,DMSG38
1B4E CD0000   E             CALL    PMASG
1B51 CD902B   C     PRSET6: CALL    GKEY
1B54 D2541D   C             JNC     PRGM7
1B57 FE67                   CPI     MOIST
1B59 CA671B   C             JZ      PRSET5
1B5C FE65                   CPI     ENTER
1B5E CA901B   C             JZ      PRSET3
1B61 CD8811   C             CALL    ERDASH
1B64 C3511B   C             JMP     PRSET6
1B67 113410   C     PRSET5: LXI     D,DMSG39
1B6A CD0000   E             CALL    PMASG
1B6D 3EFF                   MVI     A,0FFH
1B6F 32C1FF                 STA     CHEATF
1B72 C3901B   C             JMP     PRSET3
1B75 AF             PRSET0: XRA     A
1B76 321C02   D             STA     CONSA
1B79 11B90E   C             LXI     D,DMSG36
1B7C CD0000   E             CALL    PMASG
1B7F C3241B   C             JMP     PRSET2
1B82 3EFF           PRSET1: MVI     A,0FFH
1B84 321C02   D             STA     CONSA
1B87 112C0F   C             LXI     D,DMSG37
1B8A CD0000   E             CALL    PMASG
1B8D C3241B   C             JMP     PRSET2
1B90 CD6013   C     PRSET3: CALL    MFORM
1B93 C3541D   C             JMP     PRGM7
1B96 32BA01   D     PRGM3:  STA     TKSTR
1B99 FE67                   CPI     MOIST
1B9B CAA21C   C             JZ      PRGMX
1B9E FE63           PRGM6:  CPI     PRICE
1BA0 CAF41B   C             JZ      PRGM6A
1BA3 FE03                   CPI     SELL
1BA5 CAF41B   C             JZ      PRGM6A
1BA8 FE62                   CPI     PM
1BAA CA0D1C   C             JZ      PRGM67
1BAD FE66                   CPI     DAMAGE
1BAF CA391C   C             JZ      PRGM68
1BB2 FE33                   CPI     WTIN
1BB4 CAFF1B   C             JZ      PRGM6E
1BB7 FE37                   CPI     WTOUT
1BB9 CA541C   C             JZ      PRGM6F
1BBC 119400                 LXI     D,0094H
1BBF 4F             PRGM6B: MOV     C,A
1BC0 CD901D   C             CALL    CMDOSF          ;COMMODITY OFFSET FINDER
1BC3 D2781C   C             JNC     PRGM4
1BC6 CDAA20   C             CALL    DIGINR
1BC9 D20E1B   C             JNC     PRGM5
1BCC 32BA01   D     PRGM66: STA     TKSTR
1BCF E5                     PUSH    H
1BD0 CDD627   C             CALL    EXTEND
1BD3 CDAD1E   C             CALL    BLOADR
1BD6 E1                     POP     H
1BD7 B7                     ORA     A
1BD8 78                     MOV     A,B
1BD9 B1                     ORA     C
1BDA 32B601   D             STA     DESTOH
1BDD 71                     MOV     M,C
1BDE 7D                     MOV     A,L
1BDF 23                     INX     H
1BE0 70                     MOV     M,B
1BE1 E1                     POP     H
1BE2 E5                     PUSH    H
1BE3 95                     SUB     L
1BE4 FE06                   CPI     6
1BE6 CAFA1B   C             JZ      PRGM6C
1BE9 FE08                   CPI     8
1BEB CA5C1C   C             JZ      PRGM6D
1BEE 3ABA01   D     PRGM62: LDA     TKSTR
1BF1 C30B1B   C             JMP     PRGM2A
1BF4 119402         PRGM6A: LXI     D,0294H
1BF7 C3BF1B   C             JMP     PRGM6B
1BFA 1602           PRGM6C: MVI     D,2
1BFC C35E1C   C             JMP     PRGM60
1BFF CD0A26   C     PRGM6E: CALL    DRSETV
1C02 3E85                   MVI     A,MINTW
1C04 320000   D     PRGM61: STA     KYSTR
1C07 CDC519   C             CALL    KEYDIS
1C0A C3F41B   C             JMP     PRGM6A
1C0D 4F             PRGM67: MOV     C,A             ;SAVE THE COMMODITY NO.
1C0E CD901D   C             CALL    CMDOSF          ;FIND THE OFFSET FOR THAT COMMODITY
1C11 D2781C   C             JNC     PRGM4           ;JUMP IF UNSUCCESSFUL
1C14 118400                 LXI     D,0084H         ;LOOK FOR DIGIT KEY OR BREAK POINT
1C17 CDAA20   C             CALL    DIGINR
1C1A D20E1B   C             JNC     PRGM5           ;JUMP IF DIGIT KEY WAS PUSHED
1C1D FE75                   CPI     COMODB
1C1F C2CC1B   C             JNZ     PRGM66          ;JUMP IF IT IS NOT COMODITY B KEY
1C22 3E87                   MVI     A,MINFM
1C24 F5                     PUSH    PSW
1C25 CD0A28   C     PRGM69: CALL    DRSETV
```

```
LOC  OBJ                 SOURCE STATEMENT

1C28 320000   D                    STA   KYSTR
1C2B CDC519   C                    CALL  KEYDIS
1C2E 3A7001   D                    LDA   SCOMN
1C31 4F                            MOV   C,A
1C32 CD701D   C                    CALL  CMDADF
1C35 F1                            POF   PSW         ;LOAD OFF SET FOR STORAGE
1C36 C3F41B   C                    JMP   PRGM6A
1C39 4F                   PRGM68:  MOV   C,A         ;SAVE COMMODITY NO.
1C3A CD901D   C                    CALL  CMDOSF      ;FIND THE OFFSET FOR THAT COMMODITY
1C3D D2761C   C                    JNC   PRGM4       ;JUMF IF UNSUCCESSFUL
1C40 118400                        LXI   D,00H4H     ;LOOK FOR DIGIT KEY OR BREAK POINT
1C43 CDAA20   C                    CALL  DIGINR
1C46 D20E1B   C                    JNC   FRGM5
1C49 FE75                          CPI   COMODB
1C4B C2CC1B   C                    JNZ   PRGM66      ;JUMP IF IT IS COMODITY B KEY
1C4E 3E86                          MVI   A,MINDMG
1C50 F5                            PUSH  PSW
1C51 C3251C   C                    JMP   PRGM69
1C54 CD0A28   C           PRGM6F:  CALL  DRSETV
1C57 3E82                          MVI   A,SHRFAC
1C59 C3041C   C                    JMP   PRGM61
1C5C 1604                 PRGM6D:  MVI   D,4
1C5E 3AB601   D           PRGM60:  LDA   DESTOR
1C61 B7                            ORA   A
1C62 C2EE1B   C                    JNZ   PRGM62
1C65 E5                            PUSH  H
1C66 3A7200   D                    LDA   COMB
1C69 3D                            DCR   A
1C6A 0600                          MVI   B,0
1C6C 4F                            MOV   C,A
1C6D 216900   D                    LXI   H,CMSMSK
1C70 09                            DAD   B
1C71 7A                            MOV   A,D
1C72 B6                            ORA   M
1C73 77                            MOV   M,A
1C74 E1                            POP   H
1C75 C3EE1B   C                    JMP   PRGM62
1C78 E1                   PRGM4:   POF   H
1C79 FE64                          CPI   PRINT
1C7B CA951C   C                    JZ    PRGM4C
1C7E FE65                          CPI   ENTER
1C80 CA891C   C                    JZ    PRGM4B
1C83 CD8811   C           PRGM4A:  CALL  ERDASH
1C86 C3071B   C                    JMP   PRGM1A
1C89 110205   C           PRGM4B:  LXI   D,MEOF
1C8C CD0000   E                    CALL  PMASG
1C8F CD4F15   C                    CALL  STFRMF
1C92 C3541D   C                    JMP   PRGM7
1C95 CDDF1C   C           PRGM4C:  CALL  ENTKEY
1C98 3A7001   D                    LDA   SCOMN
1C9B 4F                            MOV   C,A
1C9C CD4E2D   C                    CALL  FFROG1
1C9F C3541D   C                    JMP   PRGM7
1CA2 3A1C02   D           PRGMX:   LDA   CONSA
1CA5 B7                            ORA   A
1CA6 CAAF1C   C                    JZ    PRGMX3
1CA9 3ABA01   D                    LDA   TKSTR
1CAC C39E1B   C                    JMP   FRGM6
1CAF CD7E11   C           PRGMX3:  CALL  KEYDWN
1CB2 CDC519   C                    CALL  KEYDIS
1CB5 FE11                          CPI   DELET
1CB7 CA131B   C                    JZ    PRGM5A
1CBA 32BA01   D                    STA   TKSTR
1CBD FE41                          CPI   COMODA
1CBF CACD1C   C                    JZ    PRGMX1
1CC2 FE75                          CPI   COMODB
1CC4 CAD21C   C                    JZ    PRGMX2
1CC7 CD8811   C           PRGMX0:  CALL  ERDASH
1CCA C3A21C   C                    JMP   PRGMX
1CCD 3E80                 PRGMX1:  MVI   A,MOISTA
1CCF C39E1B   C                    JMP   FRGM6
1CD2 3E81                 PRGMX2:  MVI   A,MOISTB
1CD4 C39E1B   C                    JMP   PRGM6
                          ;
                          ;        ENTER KEY SUBROUTINE - LOOKS FOR ENTER KEY OR DELETE KEY
                          ;        CALLS ERROR MESSAGE IF NOT DEPRESSED - REUTRNS NO CARRY
                          ;        IF DELETE KEY IS PRESSED
                          ;
1CD7 C5                   ENTKYA:  PUSH  B
1CD8 D5                            PUSH  D
1CD9 0602                          MVI   B,2
1CDB B7                            ORA   A
1CDC C3E71C   C                    JMP   ENTKY4
                          ;
1CDF C5                   ENTKEY:  PUSH  B
1CE0 D5                            PUSH  D
1CE1 0602                          MVI   B,2
1CE3 CD7E11   C           ENTKY2:  CALL  KEYDWN
1CE6 B7                            ORA   A
1CE7 FE65                 ENTKY4:  CPI   ENTER
1CE9 CA051D   C                    JZ    ENTKY0
1CEC FE11                          CPI   DELET
1CEE CA061D   C                    JZ    ENTKY1
1CF1 CD8811   C           ENTKY3:  CALL  ERDASH
1CF4 05                            DCR   B
1CF5 C2E31C   C                    JNZ   ENTKY2
1CF8 11B110   C                    LXI   D,MNPEA
1CFB CD0000   E                    CALL  PMASG
1CFE 04                            INR   B
1CFF CD4F15   C                    CALL  STFRMF
1D02 C3E31C   C                    JMP   ENTKY2
1D05 37                   ENTKY0:  STC
1D06 D1                   ENTKY1:  POP   D
```

```
LOC  OBJ         LINE    SOURCE STATEMENT

1D07 C1                   POP     B
1D08 C9                   RET
                    ;
                    ;        COMMODITY KEY ROUTINE - LOOKS FOR THE COMMODITY KEY SETS CARRY
                    ;               FLAG IF FOUND - RETURNS NO CARRY IF DELETE KEY IS DEPRESSED
                    ;               THE COMODITY NUMBER IS RETURNED IN THE A REGISTER AND ALSO
                    ;               STORED IN DS COMB.
                    ;
1D09 C5             CMDKYA: PUSH    B
1D0A D5                     PUSH    D
1D0B 0602                   MVI     B,2
1D0D C31A1D    C            JMP     CMDKYB
                    ;
1D10 C5             CMDKEY: PUSH    B
1D11 D5                     PUSH    D
1D12 0602                   MVI     B,2
1D14 CD7E11    C    CMDKY0: CALL    KEYDWN
1D17 CDC519    C            CALL    KEYDIS
1D1A 32BA01    D    CMDKYB: STA     TKSTR
1D1D B7                     ORA     A
1D1E FE11                   CPI     DELET
1D20 CA4C1D    C            JZ      CMDKY2
1D23 FE57                   CPI     DTRANS
1D25 CA4F1D    C            JZ      CMDKY4
1D28 4F                     MOV     C,A
1D29 CD471A    C            CALL    CMDCHK
1D2C DA461D    C            JC      CMDKY1
1D2F CD8811    C    CMDKY3: CALL    ERDASH
1D32 CD0A28    C            CALL    DRSETV
1D35 05                     DCR     B
1D36 C2141D    C            JNZ     CMDKY0
1D39 111007    C            LXI     D,DMSG9
1D3C CD0000    E            CALL    PMASG
1D3F 04                     INR     B
1D40 CD4F15    C            CALL    STFRMF
1D43 C3141D    C            JMP     CMDKY0
1D46 327200    D    CMDKY1: STA     COMB
1D49 327001    D            STA     SCOMN
1D4C D1             CMDKY2: POP     D
1D4D C1                     POP     B
1D4E C9                     RET
1D4F 3EFF           CMDKY4: MVI     A,0FFH
1D51 C34C1D    C            JMP     CMDKY2
                    ;
1D54 CD321A    C    FRGM7:  CALL    CLRSPD          ;CLEAR SCRATCH PAD DISPLAY
1D57 010000                 LXI     B,0
1D5A CDEA17    C            CALL    WDUPF
1D5D CD0229    C    FRGM7A: CALL    FCNLCR          ;FUNCTION LAMP CLEAR ROUTINE
1D60 CD6311    C            CALL    CLKEYS
1D63 0E1E                   MVI     C,ARS
1D65 CD0000    E            CALL    PCHAR
1D68 0E0F                   MVI     C,ASIA
1D6A CD0000    E            CALL    PCHAR
1D6D C35212    C            JMP     STRETM
                    ;
                    ;
                    ;        COMODITY ADDRESS FIND ROUTINE- C HOLD COMOD#
                    ;                               H,L HOLD PRICE BYTE FOR THIS COMOD
                    ;                               CARRY SHOWS THAT COMOD# .LE. NCOMOD
                    ;
1D70 F5             CMDADF: PUSH    PSW
1D71 79                     MOV     A,C             ;
1D72 E67F                   ANI     7FH
1D74 C5                     PUSH    B      ;
1D75 211600                 LXI     B,CMDSL ;LENGTH OF COMODS FOR EACH COMMODITY
1D78 217300    D            LXI     H,COMODS
1D7B FE0A                   CPI     NCOMOD+1
1D7D F2881D    C            JP      CMDAD2  ;
1D80 3D             CMDAD1: DCR     A
1D81 CA8C1D    C            JZ      CMDAD3  ;
1D84 09                     DAD     B       ;OFFSET
1D85 C3801D    C            JMP     CMDAD1
1D88 C1             CMDAD2: POP     B       ;
1D89 F1                     POP     PSW     ;
1D8A B7                     ORA     A       ;CLEAR CARRY TO SHOW COMOD# > NCOMOD
1D8B C9                     RET
1D8C C1             CMDAD3: POP     B
1D8D F1                     POP     PSW
1D8E 37                     STC             ;SET CARRY TO SHOW COMOD# .LE. NCOMOD'S
1D8F C9                     RET
                    ;
                    ;
                    ;        COMMODITY OFFSET FINDFR ROUTINE-C HOLDS KEYCODE FOR PRICE
                    ;                                     SELL, ETC
                    ;                                     H,L PRICE BYTE0, RETURNS
                    ;                                     H,L OFFSET AND CARRY SET
                    ;
1D90 F5             CMDOSF: PUSH    PSW     ;
1D91 C5                     PUSH    B       ;
1D92 79                     MOV     A,C     ;
1D93 010000                 LXI     B,0000H ;
1D96 FE63                   CPI     PRICE
1D98 CABE1D    C            JZ      CMDOS1  ;
1D9B 03                     INX     B       ;IF NOT PRICE, INCREMENT TO SELL AND COMPARE
1D9C 03                     INX     B
1D9D FE03                   CPI     SELL    ;
1D9F CABE1D    C            JZ      CMDOS1  ;
1DA2 03                     INX     B       ;IF NOT SELL, INCREMENT TO MOIST A AND COMPARE
1DA3 03                     INX     B       ;
1DA4 FE67                   CPI     MOIST
1DA6 CABE1D    C            JZ      CMDOS1  ;
1DA9 03                     INX     B       ;IF NOT MOISTA, INCREMENT TO FM AND COMPARE
1DAA 03                     INX     B       ;
1DAB FE62                   CPI     FM      ;
```

```
LOC  OBJ            LINE        SOURCE STATEMENT

1DAD CABE1D   C               JZ      CMDOS1   ;
1DB0 03                       INX     B        ;
1DB1 03                       INX     B        ;
1DB2 FE66                     CPI     DAMAGE   ;
1DB4 CABE1D   C               JZ      CMDOS1   ;
1DB7 03                       INX     B        ;
1DB8 03                       INX     B        ;
1DB9 FE73                     CPI     TESTWT
1DBB C2C71D   C               JNZ     CMDOS3   ;IF NOT TEST WT JUMP TO SEE IF MOISTB OR MFKP
1DBE 09                 CMDOS1: DAD   B        ;
1DBF C1                       POP     B        ;
1DC0 F1                       POP     PSW      ;
1DC1 37                       STC              ;SET CARRY TO SHOW SUCCESS
1DC2 C9                       RET
1DC3 C1                 CMDOS2: POP   B        ;
1DC4 F1                       POP     PSW      ;
1DC5 B7                       ORA     A        ;CLEAR CARRY TO SHOW NO SUCCESS
1DC6 C9                       RET
1DC7 03                 CMDOS3: INX   B        ;INCREMENT TO MOISTB AND COMPARE
1DC8 03                       INX     B
1DC9 FE80                     CPI     MOISTA
1DCB CABE1D   C               JZ      CMDOS1
1DCE 03                       INX     B
1DCF 03                       INX     B
1DD0 FE81                     CPI     MOISTB
1DD2 CABE1D   C               JZ      CMDOS1
1DD5 03                 CMDOS4: INX   B        ;IF NOT MOIST-B CHECK FOR SHRINK FACTOR
1DD6 03                       INX     B
1DD7 FE82                     CPI     SHRFAC
1DD9 CABE1D   C               JZ      CMDOS1
1DDC 03                       INX     B
1DDD 03                       INX     B
1DDE FE85                     CPI     MINTW
1DE0 CABE1D   C               JZ      CMDOS1
1DE3 03                       INX     B
1DE4 03                       INX     B
1DE5 FE87                     CPI     MINFM         ;COMPARE WITH MINIMUM FM DOCKAGE POINT
1DE7 CABE1D   C               JZ      CMDOS1
1DEA 03                       INX     B
1DEB 03                       INX     B
1DEC FE86                     CPI     MINDMG        ;COMPARE WITH MINIMUM DAMAGE DOCKAGE POINT
1DEE CABE1D   C               JZ      CMDOS1
1DF1 C3C31D   C               JMP     CMDOS2   ;IF NOT ANY ONE OF THESE CLEAR CARRY AND RET
                        ;
                        ;
                        ;
                        ;
                        ;             ENTER ROUTINE
                        ;
1DF4 210000   D         ENTERR: LXI   H,KYSTR
1DF7 7E                       MOV     A,M           ;FETCH KYSTR ENTRY
1DF8 23                       INX     H             ;KYSTR + 1
1DF9 FE60                     CPI     CUST          ;CUSTOMER KEY?
1DFB CA261E   C               JZ      ENTER2        ;IF SO, JUMP
1DFE FE72                     CPI     PJOURN
1E00 CA201E   C               JZ      ENTR01
1E03 FE42                     CPI     PLOCK
1E05 CA6029   C               JZ      PLOCKR
1E08 CD0D1A   C               CALL    DIGITR        ;IS IT A DIGIT?
1E0B DA761E   C               JC      ENTER7        ;IF SO, JUMP
1E0E CD6311   C         ENTER1: CALL  CLKEYS
1E11 CD321A   C               CALL    CLRSPD        ;CLEAR SCRATCH PAD DISPLAY
1E14 010000                   LXI     B,00H         ;B,C HOLD BCD DIGIT TO BE DISPLAYED
1E17 CDEA17   C               CALL    WDUPR         ;WEIGHT DISPLAY UPDATE
1E1A CD1829   C               CALL    EHDIS
1E1D C35D1D   C               JMP     PRGM7A
1E20 CD0000   E         ENTR01: CALL  PRJR
1E23 C3541D   C               JMP     PRGM7
1E26 1600               ENTER2: MVI   D,00H         ;INITIALIZE DIGIT COUNTER
1E28 7E                 ENTER3: MOV   A,M           ;FETCH KYSTR + 1
1E29 CD0D1A   C               CALL    DIGITR        ;IS IT A DIGIT?
1E2C D2411E   C               JNC     ENTER4        ;IF NOT JUMP
1E2F 14                       INR     D             ;INCREMENT DIGIT COUNTER
1E30 23                       INX     H             ;NEXT KYSTR
1E31 D5                       PUSH    D
1E32 E5                       PUSH    H
1E33 CDAD1E   C               CALL    BLOADR
1E36 E1                       POP     H
1E37 D1                       POP     D
1E38 7A                       MOV     A,D           ;DIGIT COUNTER TO ACC.
1E39 FE04                     CPI     04H           ;DOES IT EXCEED # OF POSSIBLE DIGITS
1E3B C2281E   C               JNZ     ENTER3        ;IF NOT, JUMP TO REDO LOOP
1E3E C30512   C               JMP     INVALR
1E41 FE31               ENTER4: CPI   DOT           ;IF NOT A DIGIT, IS IT A DOT?
1E43 C21D28   C               JNZ     TRANSR        ;IF SO, JUMP
1E46 E5                 ENTER5: PUSH  H             ;SAVE KYSTR
1E47 CDAD1E   C               CALL    BLOADR
1E4A E1                       POP     H             ;RESTORE KYSTR
1E4B C5                       PUSH    B
1E4C 23                       INX     H             ;NEXT KYSTR ENTRY
1E4D 010000                   LXI     B,00H         ;INITIALIZE B TO ZERO
1E50 1600                     MVI     D,00H         ;INITIALIZE DIGIT COUNTER
1E52 7E                       MOV     A,M           ;FETCH KYSTR ENTRY
1E53 CD0D1A   C               CALL    DIGITR        ;IS IT A DIGIT?
1E56 D20512   C               JNC     INVALR        ;IF NOT ITS INVALID
1E59 23                       INX     H             ;NEXT KYSTR ENTRY
1E5A 14                       INR     D             ;INCREMENT DIGIT COUNTER
1E5B 7E                       MOV     A,M           ;FETCH KYSTR ENTRY
1E5C CD0D1A   C               CALL    DIGITR        ;IS IT A DIGIT?
1E5F D26B1E   C               JNC     ENTER6        ;IF NOT, JUMP
1E62 23                       INX     H             ;NEXT KYSTR ENTRY
1E63 14                       INR     D             ;INCREMENT DIGIT COUNTER
```

```
LOC  OBJ             SOURCE STATEMENT

1E64 7E                      MOV     A,M             ;FETCH KYSTR ENTRY
1E65 CD0D1A    C             CALL    DIGITR          ;IS IT A DIGIT?
1E68 DA0512    C             JC      INVALR          ;IF SO, INVALID
1E6B CDAD1E    C     ENTER6: CALL    BLOADR          ;B,C REGS WILL HOLD BCD NUM
1E6E 79                      MOV     A,C
1E6F C1                      POP     B               ;CUST# RESTORED
1E70 DA991E    C             JC      ENTR10
1E73 C30512    C             JMP     INVALR
1E76 010000          ENTER7: LXI     H,0000H
1E79 1601                    MVI     D,01H           ;DIGIT COUNTER
1E7B 7E              ENTER8: MOV     A,M             ;FETCH KYSTR
1E7C CD0D1A    C             CALL    DIGITR          ;IS IT A DIGIT?
1E7F D28D1E    C             JNC     ENTER9
1E82 23                      INX     H               ;NEXT KYSTR ENTRY
1E83 14                      INR     D               ;INCREMENT DIGIT COUNTER
1E84 7A                      MOV     A,D             ;DIGIT COUNTER TO ACC.
1E85 FE05                    CPI     05H             ;DOES IT EXCEED MAXIMUM?
1E87 C27B1E    C             JNZ     ENTER8          ;IF NOT, REDO LOOP
1E8A C30512    C             JMP     INVALR
1E8D CDAD1E    C     ENTER9: CALL    BLOADR
1E90 CD0000    E             CALL    TRFIND          ;TRANSACTION FIND
1E93 D2A11E    C             JNC     ENTR11
1E96 C3B722    C             JMP     TRPMER          ;AND TAKE ENTRIES
1E99 1600            ENTR10: MVI     D,0
1E9B CD0000    E             CALL    CUFIND          ;SEE IF & WHERE HE IS
1E9E DAB722    C             JC      TRPMER          ;GO GET UPDATED INFO
1EA1 11DA02    C     ENTR11: LXI     D,MTDNE         ;TRANS DOES NOT EXITS
1EA4 CD0000    E             CALL    PMASG
1EA7 CD4F15    C             CALL    STPRMP
1EAA C3541D    C             JMP     PRGM7
                     ;
                     ;
                     ;       THIS ROUTINE HAS LAST DIGIT + 1 IN H,L REGS AND
                     ;               D HAS THE # OF DIGITS. BCD NUMBER IS RETURNED
                     ;               IN THE B,C REGISTERS.
                     ;
1EAD 010000          BLOADR: LXI     B,0000H         ;INITIALIZE B,C REG. AS ZERO
1EB0 7A                      MOV     A,D
1EB1 B7                      ORA     A
1EB2 C8                      RZ
1EB3 2B                      DCX     H               ;BECAUSE H,L POINT TO LAST DIG + 1
1EB4 7E                      MOV     A,M             ;LAST DIGIT
1EB5 CD0D1A    C             CALL    DIGITR          ;IS IT A DIGIT?
1EB8 D2EE1E    C             JNC     BLOAD1
1EBB 4F                      MOV     C,A             ;MOVE TO C
1EBC 15                      DCR     D               ;DECREMENT DIGIT COUNTER
1EBD CAED1E    C             JZ      BLOAD2          ;IF ZERO, JUMP
1EC0 2B                      DCX     H               ;NEXT LOWER DIGIT
1EC1 7E                      MOV     A,M             ;FETCH
1EC2 CD0D1A    C             CALL    DIGITR          ;CHANGE TO BINARY DIGIT
1EC5 D2EE1E    C             JNC     BLOAD1
1EC8 07                      RLC
1EC9 07                      RLC
1ECA 07                      RLC
1ECB 07                      RLC                     ;MOVE TO MSB
1ECC B1                      ORA     C               ;BCD IN ACC.
1ECD 4F                      MOV     C,A             ;STORE IN C
1ECE 15                      DCR     D               ;DECREMENT DIGIT COUNTER
1ECF CAED1E    C             JZ      BLOAD2          ;CHANGE TO BCD IN B,C REGS.
1ED2 2B                      DCX     H               ;NEXT LOWER DIGIT
1ED3 7E                      MOV     A,M             ;FETCH
1ED4 CD0D1A    C             CALL    DIGITR          ;CHANGE TO A BINARY DIGIT
1ED7 D2EE1E    C             JNC     BLOAD1
1EDA 47                      MOV     B,A             ;STORE IN B
1EDB 15                      DCR     D               ;DECREMENT DIGIT COUNTER
1EDC CAED1E    C             JZ      BLOAD2          ;IF ZERO, CHANGE TO BCD
1EDF 2B                      DCX     H               ;NEXT LOWER DIGIT
1EE0 7E                      MOV     A,M             ;FETCH
1EE1 CD0D1A    C             CALL    DIGITR          ;CHANGE TO A BINARY DIGIT
1EE4 D2EE1E    C             JNC     BLOAD1
1EE7 07                      RLC
1EE8 07                      RLC
1EE9 07                      RLC
1EEA 07                      RLC                     ;CHANGE TO MS NIBBLE
1EEB B0                      ORA     B               ;OR WITH BIN DIG. IN B
1EEC 47                      MOV     B,A             ;STORE IN B
1EED 37              BLOAD2: STC
1EEE C9              BLOAD1: RET
                     ;
                     ;
                     ;
                     ;       THE DATE DISPLAY ROUTINE DISPLAYS IN THE SCRATCH
                     ;                       DISPLAY DAY, MONTH, YEAR, SEC,
                     ;                       MINUTE, OR HOUR.  THE COUNTER
                     ;                       USED FOR OFFSET IS PASSED IN THE
                     ;                       A-REGISTER. THE SEGMENT CODES ARE
                     ;                       IN THE DATSEG TABLE
                     ;
1EEF C5              DTDISR: PUSH    B
1EF0 D5                      PUSH    D
1EF1 E5                      PUSH    H
1EF2 F5                      PUSH    PSW
1EF3 112302    C             LXI     D,DATSEG        ;SEG CODES FOR DAY, MONTH, ETC.
1EF6 4F                      MOV     C,A             ;COUNTER TO C
1EF7 07                      RLC
1EF8 81                      ADD     C               ;THESE 3 INSTRUCTIONS MULTS BY 3
                                                     ;       FOR OFFSET IN TABLE
1EF9 83                      ADD     E               ;OFFSET COMPLETE
1EFA 5F                      MOV     E,A             ;STORE BACK
1EFB 3E00                    MVI     A,00H
1EFD 8A                      ADC     D               ;ADD CARRY IF ANY
1EFE 57                      MOV     D,A
1EFF 21AC01    D             LXI     H,DIM10         ;MS SCRATCH PAD RAM DISPLAY
```

```
LOC  OBJ          LINE       SOURCE STATEMENT

1F02 0603                            MVI    B,03H           ;COUNTER, # OF DISP. IN SCR. PD
1F04 1A                      DTDIS1: LDAX   D               ;FETCH SEG CODE
1F05 77                              MOV    M,A             ;AND STORE
1F06 2B                              DCX    H               ;NEXT LOWER RAM LOC.
1F07 13                              INX    D               ;NEXT ENTRY IN SEG TABLE
1F08 05                              DCR    B               ;DECREMENT COUNTER
1F09 C2041F    C                     JNZ    DTDIS1          ;IF NOT ZERO, REDO LOOP
1F0C CDB326    C                     CALL   DISUPR
1F0F C35812    C                     JMP    STRET
                             ;**********THE ABOVE ROUTINE USED BY PROGDR*************
                             ;
                             ;
                             ;       THE DATE STUFFER ROUTINE STUFFS KYSTR ENTRIES INTO
                             ;                       DAY, MONTH, ETC. RAM BYTES. THIS ROUTINE IS
                             ;                       CALLED BY PROGDR.
                             ;
1F12 F3                      DTSTFR: DI
1F13 115501    D                     LXI    D,FNUMD + 1     ;D,E HOLDS BEGINNING OF ENTRIES
1F16 214100    D                     LXI    H,DAY           ;1ST RAM LOCATION
1F19 0606                            MVI    B,06H           ;COUNTER
1F1B 1A                              LDAX   D               ;FETCH ENTRY
1F1C CD0D1A    C             DTSTF1: CALL   DIGITR          ;IS IT A DIGIT?
1F1F D2381F    C                     JNC    DTSTF2          ;IF NOT CHECK DOT
1F22 4F                              MOV    C,A             ;TEMP STORE IN C-REGISTER
1F23 13                              INX    D               ;NEXT ENTRY
1F24 1A                              LDAX   D               ;AND FETCH
1F25 CD0D1A    C                     CALL   DIGITR          ;DIGIT?
1F28 D24F1F    C                     JNC    DTSTF5          ;IF NOT, ONLY ONE DIGIT SO JUMP
1F2B D5                              PUSH   D               ;SAVE KYSTR
1F2C 5F                              MOV    E,A             ;TEMP STORE
1F2D 79                              MOV    A,C             ;FETCH 1ST DIGIT
1F2E B7                              ORA    A               ;CLEAR CARRY
1F2F 07                              RLC
1F30 07                              RLC
1F31 07                              RLC
1F32 07                              RLC                    ;MOVE TO MS NIBBLE
1F33 B3                              ORA    E               ;TWO DIGITS IN BCD IN ACC
1F34 77                              MOV    M,A             ;STORE
1F35 D1                              POP    D               ;RESTORE KYSTR
1F36 13                              INX    D               ;NEXT KYSTR
1F37 1A                              LDAX   D               ;FETCH
1F38 FE31                    DTSTF2: CPI    DOT             ;IS IT A DOT?
1F3A C23F1F    C                     JNZ    DTSTF3          ;IF NOT CHECK FOR FF
1F3D 13                              INX    D
1F3E 1A                              LDAX   D               ;FETCH NEXT KYSTR ENTRY
1F3F FEFF                    DTSTF3: CPI    0FFH            ;IS IT FF?
1F41 C2531F    C                     JNZ    DTSTF6          ;IF NOT CHECK COUNTER
1F44 010000                  DTSTF4: LXI    B,0000H
1F47 CDEA17    C                     CALL   WDUPR           ;WT. DISPLAYS ZERO
1F4A CD321A    C                     CALL   CLRSPD          ;CLEAR SCRATCH PAD
1F4D FB                              EI
1F4E C9                              RET
1F4F 71                      DTSTF5: MOV    M,C             ;ONLY ONE DIGIT SO STORE
1F50 C3381F    C                     JMP    DTSTF2
1F53 23                      DTSTF6: INX    H               ;NEXT RAM STORE(MONTH, YEAR ETC.)
1F54 05                              DCR    B               ;DECREMENT COUNTER
1F55 C21C1F    C                     JNZ    DTSTF1          ;IF NOT ZERO, REDO LOOP
1F58 C3441F    C                     JMP    DTSTF4          ;COMPLETE RETURN
                             ;
                             ;
                             ;       PROGRAM DATE ROUTINE,  THIS ROUTINE IS ENTERED FROM ENTERR
                             ;                              CHECKS ENTRIES OF DATE, AND STUFFS
                             ;                              IN APPROPRIATE RAM LOCATIONS
                             ;
1F5B CDC519    C             PROGDR: CALL   KEYDIS
1F5E CD6311    C                     CALL   CLKEYS          ;CLEAR KEY BOARD RAM
1F61 CDDF1C    C             PRGD0:  CALL   ENTKEY
1F64 D2541D    C                     JNC    PRGM7
1F67 215401    D             PRGDA:  LXI    H,FNUMD
1F6A 3E31                            MVI    A,DOT
1F6C 77                              MOV    M,A
1F6D 23                              INX    H
1F6E AF                              XRA    A
1F6F 323100    D                     STA    TRPSTR
1F72 F5                      PRGD1:  PUSH   PSW
1F73 E5                              PUSH   H               ;SAVE
1F74 CDEF1E    C                     CALL   DTDISR          ;DISPLAY DAY, MONTH, ETC.
1F77 110202                          LXI    D,0202H         ;ONE OR TWO DIGITS MAX
1F7A CDAA20    C                     CALL   DIGINR          ;GET THEM FROM KEYBOARD
1F7D D2C51F    C                     JNC    PRGD10          ;SORRY CHARLIE
1F80 FE31                            CPI    DOT             ;DE-LIMITER?
1F82 C2BA1F    C                     JNZ    PRGD2           ;IF NOT, CHECK ENTER
1F85 E1                      PRGD6:  POP    H               ;BUFFER
1F86 7A                              MOV    A,D
1F87 FE02                            CPI    02H
1F89 CA9E1F    C                     JZ     PRGD60
1F8C B7                              ORA    A
1F8D CAF71F    C                     JZ     PRGD4           ;TWO DIGIT ENTRY
1F90 3601                            MVI    M,ZERO          ;KEYCODE
1F92 23                      PRGD8:  INX    H
1F93 0A                              LDAX   B               ;FETCH DIGIT
1F94 77                              MOV    M,A             ;STUFF INTO BUFFER
1F95 23                              INX    H
1F96 3A3100    D                     LDA    TRPSTR
1F99 FE65                            CPI    ENTER
1F9B CAFE1F    C                     JZ     PRGD9           ;UPDATE & EXIT
1F9E 3631                    PRGD60: MVI    M,DOT
1FA0 23                              INX    H
1FA1 F1                              POP    PSW             ;COUNTER
1FA2 3C                              INR    A
1FA3 FE06                            CPI    06              ;ALL ENTERED?
1FA5 C2721F    C                     JNZ    PRGD1           ;IF NOT, LOOK FOR MORE
1FA8 CDDF1C    C                     CALL   ENTKEY
1FAB D2541D    C                     JNC    PRGM7
```

```
LOC  OBJ          LINE        SOURCE STATEMENT

1FAE CD121F    C  3073 PRGD7:  CALL    DTSTFR
1FB1 CDCB2C    C  3074         CALL    PRDTR
1FB4 CD0000    E  3075         CALL    MACR
1FB7 C3541D    C  3076         JMP     PRGM7          ;GROSS EXIT
1FBA FE65         3077 PRGD2:  CPI     ENTER
1FBC C2C51F    C  3078         JNZ     PRGD10
1FBF 323100    D  3079         STA     TRPSTR
1FC2 C3851F    C  3080         JMP     PRGD6
1FC5 FE11         3081 PRGD10: CPI     DELET
1FC7 CAD41F    C  3082         JZ      PRGD3
1FCA E1           3083         POP     H
1FCB F1           3084         POP     PSW
1FCC F5           3085 PRGD12: PUSH    PSW
1FCD CD8811    C  3086         CALL    ERDASH
1FD0 F1           3087         POP     PSW
1FD1 C3721F    C  3088         JMP     PRGD1
1FD4 E1           3089 PRGD3:  POP     H
1FD5 F1           3090         POP     PSW
1FD6 B7           3091         ORA     A              ;DID HE DELETE OUT OF THE ROUTINE?
1FD7 CA541D    C  3092         JZ      PRGM7
1FDA F5           3093         PUSH    PSW
1FDB 2B           3094         DCX     H
1FDC 7E           3095         MOV     A,M
1FDD FE31         3096         CPI     DOT
1FDF CAE51F    C  3097         JZ      PRGD31
1FE2 C3E81F    C  3098         JMP     PRGD30
1FE5 F1           3099 PRGD31: POP     PSW
1FE6 3D           3100         DCR     A
1FE7 F5           3101         PUSH    PSW
1FE8 3EFF         3102 PRGD30: MVI     A,0FFH
1FEA 77           3103         MOV     M,A
1FEB 2B           3104         DCX     H
1FEC 7E           3105         MOV     A,M
1FED FE31         3106         CPI     DOT
1FEF C2E81F    C  3107         JNZ     PRGD30
1FF2 23           3108         INX     H
1FF3 F1           3109         POP     PSW
1FF4 C3721F    C  3110         JMP     PRGD1
1FF7 0B           3111 PRGD4:  DCX     B
1FF8 0A           3112         LDAX    B              ;FETCH FIRST OF TWO DIGITS
1FF9 77           3113         MOV     M,A
1FFA 03           3114         INX     B
1FFB C3921F    C  3115         JMP     PRGD8          ;TO GET SECOND DIGIT
1FFE F1           3116 PRGD9:  POP     PSW
1FFF C3AE1F    C  3117         JMP     PRGD7
                  3118 ;
2002 C5           3119 CRGEN:  PUSH    B
2003 41           3120         MOV     B,C
2004 0E0D         3121         MVI     C,ACR
2006 CD0000    E  3122 CRGEN1: CALL    PCHAR
2009 05           3123         DCR     B
200A C20620    C  3124         JNZ     CRGEN1
200D C1           3125         POP     B
200E C9           3126         RET
                  3127 ;
                  3128 ;
200F C5           3129 DIGNA:  PUSH    B
2010 D5           3130         PUSH    D
2011 E5           3131         PUSH    H
2012 F5           3132         PUSH    PSW
2013 218101    D  3133         LXI     H,FNUMF1       ;STORE THE ENTERING FORMAT OF DIGINR AT
2016 7A           3134         MOV     A,D
2017 E60F         3135         ANI     0FH
2019 C22320    C  3136         JNZ     DIGNA1
201C 7A           3137         MOV     A,D
201D E6F0         3138         ANI     0F0H
201F 0F           3139         RRC
2020 0F           3140         RRC
2021 0F           3141         RRC
2022 0F           3142         RRC
2023 77           3143 DIGNA1: MOV     M,A
2024 23           3144         INX     H
2025 73           3145         MOV     M,E
2026 0E00         3146         MVI     C,00           ;CLEAR BINARY DIGIT LOCATIONS
2028 110500       3147         LXI     D,05
202B 211602    D  3148         LXI     H,BYDIGT
202E CD0000    E  3149         CALL    SMLR
2031 C35812    C  3150         JMP     STRET
                  3151 ;
                  3152 ;
2034 C5           3153 DIGNB:  PUSH    B
2035 D5           3154         PUSH    D
2036 E5           3155         PUSH    H
2037 F5           3156         PUSH    PSW
2038 7B           3157         MOV     A,E
2039 E60F         3158         ANI     0FH
203B 4F           3159         MOV     C,A
203C 3A8201    D  3160         LDA     FNUMF1+1
203F E60F         3161         ANI     0FH
2041 91           3162         SUB     C
2042 326600    D  3163         STA     DLNGTH         ;STORE THE LENGTH OF DIGITS
2045 CA5812    C  3164         JZ      STRET          ;RETURN IF LENGTH IS ZERO
2048 111900    D  3165         LXI     D,KYSTR+25     ;STORAGE FOR ASCII DIGITS
204B 210000    D  3166         LXI     H,KYSTR        ;START WITH M.S.B.
204E F5           3167 DIGNB1: PUSH    PSW
204F 7E           3168         MOV     A,M
2050 CD0D1A    C  3169         CALL    DIGITR
2053 C630         3170         ADI     30H
2055 12           3171         STAX    D              ;STORE AT LOCATION ADDRESSED BY KYSTR
2056 23           3172         INX     H
2057 13           3173         INX     D
2058 F1           3174         POP     PSW
2059 3D           3175         DCR     A              ;LOOP TILL ALL NOS. ARE CONVERTED
205A C24E20    C  3176         JNZ     DIGNB1
```

```
LOC  OBJ                 SOURCE STATEMENT

205D F1                          POP     PSW          ;BRING FORMATING UPON RETURN
205E E1                          POP     H
205F D1                          POP     D
2060 D5                          PUSH    D
2061 E5                          PUSH    H
2062 F5                          PUSH    PSW
2063 7A                          MOV     A,D          ;BRING MAXIMUM DIGIT BEFORE DECIMAL POINT
2064 E60F                        ANI     0FH
2066 47                          MOV     B,A          ;TEMPORARY STORE
2067 3A8101     D                LDA     FNUMF1       ;BRING ORIGINAL FORMATING UPON ENTRY
206A E60F                        ANI     0FH
206C 90                          SUB     B
206D 47                          MOV     B,A          ;SUBTRACT MAX. DIGIT(ORIGINAL FORMAT-FORMAT
                                                      ;UPON RETURN)
206E 7B                          MOV     A,E          ;BRING MAXIMUM TOTAL DIGITS
206F E60F                        ANI     0FH
2071 4F                          MOV     C,A          ;TEMPORARY STORE
2072 3A8201     D                LDA     FNUMF1+1     ;BRING MAX TOTAL DIGIT UPON ENTRY
2075 E60F                        ANI     0FH
2077 91                          SUB     C
2078 90                          SUB     B            ;NOW ACCUMULATOR HAS THE DIGITS AFTER DP
2079 2F                          CMA
207A 3C                          INR     A
207B 326400     D                STA     DSCALE       ;STORE IN DSCALE
207E FA8520     C                JM      DIGNB2
2081 AF                          XRA     A
2082 C38720     C                JMP     DIGNB3
2085 3EFF                DIGNB2: MVI     A,0FFH
2087 326500     D        DIGNB3: STA     DSCALE+1
208A 014D00     D                LXI     B,FPH        ;CONVERT THE NO. TO FLOATING POINT
208D 211900     D                LXI     H,KYSTR+25
2090 226700     D                SHLD    DADDR
2093 3E2B                        MVI     A,'+'        ;STORE PLUS SIGN
2095 326300     D                STA     DSIGN
2098 116300     D                LXI     D,DSIGN
209B CD0000     E                CALL    FQFD2B
209E 014D00     D                LXI     B,FPH
20A1 111602     D                LXI     D,BYDIGT     ;STORE BINARY NO. AT BYDIGT
20A4 CD0000     E                CALL    FSTOR
20A7 C35812     C                JMP     STRET
                         ;
                         ;
                         ;
                         ;       DIGIT INPUT ROUTINE,    B,C HOLD KYSTR (KEYCODES)
                         ;                               FORMAT UPON ENTRY IN D,E
                         ;                                 D                  E
                         ;                       MAND DIG.  MAX. DIG.   MIN TOT.   MAX TOT
                         ;                       BEFORE     BEFORE      DIGITS     DIGITS
                         ;                       D.P.       D.P.
                         ;                       ----       ----        ----       ----
                         ;RETURNS KEYCODE IN A OF NON-DIGIT OR DOT, CARRY INDICATES SUCCESS
                         ;B,C POINT TO LAST KYSTR ENTRY
                         ;
20AA CD0F20     C        DIGINR: CALL    DIGNA        ;ROUTINE ADDED TO SAVE THE FORMAT AND
                                                      ;CLEAR THE MEMORY LOCATION BYDIGT TO ZERO
20AD 010000                      LXI     B,0000H
20B0 CDEA17     C                CALL    WDUPR
20B3 E5                          PUSH    H            ;SAVE H REGISTER
20B4 7A                          MOV     A,D          ;FETCH FORMAT FOR MAX AND MIN # DIGITS B 4 DP
20B5 E6F0                        ANI     0F0H         ;LOOK AT MAN# DIGITS BEFORE DP
20B7 C20C21     C                JNZ     DGN1         ;IF NOT ZERO, THEN JUMP TO SET DP BIT
                                                      ;IF NOT ZERO DO NOT SET DP BIT
20BA 210000                      LXI     H,0000H
20BD 01FFFF     D        DGN2:   LXI     B,KYSTR-1    ;H-DIGITS BEFORE DP,BIT7-MAND
                                                      ;L-DIGITS AFTER DP
20C0 CD7E11     C        DGN3:   CALL    KEYDWN       ;ANY KEYINS
20C3 F5                  DGN02:  PUSH    PSW          ;SAVE KEYIN KEYCODE INFO
20C4 CD0D1A     C                CALL    DIGITR       ;IS IT A DIGIT?
20C7 D20322     C                JNC     DGN26        ;IF NOT, JUMP TO COMPARE WITH DOT OR DELETE
                                                      ;IF ANYTHING ELSE, EXIT
20CA 7C                          MOV     A,H          ;FETCH HIGH BYTE
20CB E680                        ANI     80H          ;IS DP BIT SET? (1000 0000)
20CD CA5521     C                JZ      DGN8         ;IF NOT, JUMP TO CHECK MAX# DIG BEF DP
20D0 7A                          MOV     A,D          ;MAND, SO LOOK AT MAND DIG BEFORE DP
20D1 E6F0                        ANI     0F0H         ;MASK OFF 4 LSB TO GET MAND #
20D3 CA5521     C                JZ      DGN8         ;IF ZERO, JUMP
20D6 7A                          MOV     A,D          ;SUBTRACT 1 FROM MAND AND MAX
20D7 E60F                        ANI     0FH
20D9 7A                          MOV     A,D
20DA CADF20     C                JZ      DGN03
20DD D601                        SUI     1
20DF D610                DGN03:  SUI     10H          ;SUBTRACT 1 FROM MAND #
20E1 57                          MOV     D,A          ;AND STORE BACK
20E2 7B                  DGN10:  MOV     A,E          ;FETCH AFTER DP INFO
20E3 E670                        ANI     70H          ;MINIMUM TOTAL DIGITS
20E5 CA6921     C                JZ      DGN11        ;IF MIN. TOTAL DIGITS IS ZERO JUMP
20E8 7B                          MOV     A,E          ;IF MIN. TOT. DIG.NOT ZERO
20E9 D611                        SUI     11H          ;SUBTRACT 1 FROM MIN TOTAL AND MAX TOTAL DIGITS
20EB 5F                          MOV     E,A          ;STORE BACK IN E
20EC 24                  DGN12:  INR     H            ;INCREMENT DIGIT COUNTER BEFORE DP
20ED F1                          POP     PSW          ;RESTORE KEYIN INFO
20EE 03                          INX     B            ;NEXT KYSTR
20EF 02                          STAX    B            ;STORE KEYIN KEYCODE IN B
20F0 D5                  DGN13:  PUSH    D            ;SAVE FORMAT INFO AFTER DECREMENTING ETC.
20F1 7C                          MOV     A,H          ;FETCH DIGITS BEFORE DP
20F2 E67F                        ANI     7FH          ;MASK OFF DP BIT (MSB)
20F4 57                          MOV     D,A          ;STORE BACK IN D
20F5 E5                          PUSH    H            ;SAVE DIGITS BEFORE DP AND AFTER DP COUNTER
20F6 03                          INX     B            ;NEXT KYSTR ENTRY
20F7 69                          MOV     L,C          ;SET UP FOR BLOADR
20F8 60                          MOV     H,B          ;
20F9 C5                          PUSH    B
20FA C6FB                        ADI     -5           ;5 DIGITS BEFORE DP?
20FC F25422     C                JP      DGN14        ;JUMP TO ROLLOVER THE DIGIT TO BOTTOM DIGIT
```

```
LOC  OBJ         LINE        SOURCE STATEMENT

20FF CDAD1E   C  3281          CALL   BLOADR       ;PUT INTO BCD
2102 CDEA17   C  3282          CALL   WDUPR        ;AND DISPLAY IN WT. DISPLAY
2105 C1          3283 DGN15:   POP    B
2106 E1          3284          POP    H
2107 D1          3285          POP    D
2108 0B          3286          DCX    B            ;NEXT LOWER KYSTR ENTRY
2109 C3C020   C  3287          JMP    DGN3         ;AND JUMP
210C 210080      3288 DGN1:    LXI    H,8000H      ;SET DP BIT
210F C3BD20   C  3289          JMP    DGN2         ;AND JUMP
2112 FE31        3290 DGN4:    CPI    DOT          ;IS IT DOT?
2114 C23C21   C  3291          JNZ    DGN5         ;IF NOT, JUMP
2117 7C          3292          MOV    A,H          ;FETCH DIGITS BEFORE DP
2118 E680        3293          ANI    80H          ;1000 0000, MASKS OF BITS 0-6
211A CA2321   C  3294          JZ     DGN7         ;IF DP BIT IS ZERO JUMP
211D 7A          3295          MOV    A,D          ;FETCH BEFORE DP FORMAT INFO
211E E6F0        3296          ANI    0F0H         ;LOOK AT MAND # OF DIGITS BEFORE DP
2120 C28522   C  3297          JNZ    DGN90        ;IF ITS NOT ZERO, JUMP
2123 F1          3298 DGN7:    POP    PSW
2124 7B          3299          MOV    A,E          ;FETCH TOTAL DIGIT FORMAT INFO
2125 E680        3300          ANI    80H          ;DP ALLOWED?
2127 CA5F21   C  3301          JZ     DGN31        ;JMP IF NOT
212A 7B          3302          MOV    A,E          ;REFETCH
212B E67F        3303          ANI    7FH          ;MASK OFF DP OK BIT
212D 5F          3304          MOV    E,A          ;STORE BACK IN E
212E 3AB201   D  3305          LDA    DIM24        ;LS WEIGHT DISPLAY
2131 F680        3306          ORI    80H          ;WANT TO DISPLAY DP
2133 32B201   D  3307          STA    DIM24        ;STORE IN LS WT. DISPLAY
2136 CDB328   C  3308          CALL   DISUPR       ;AND UPDATE DISPLAY
2139 C37321   C  3309          JMP    DGN16        ;AND JUMP
213C 7C          3310 DGN5:    MOV    A,H          ;NOT A DOT, SO LOOK AT DP BIT
213D E680        3311          ANI    80H          ;1000 0000
213F CA4821   C  3312          JZ     DGN6         ;IF ITS ZERO, THEN JUMP
2142 7A          3313          MOV    A,D          ;FETCH BEFORE DP FORMAT INFO
2143 E6F0        3314          ANI    0F0H         ;LOOK AT MAND # DIGITS
2145 C28522   C  3315          JNZ    DGN90        ;IF OTHER THAN ZERO JUMP
2148 7B          3316 DGN6:    MOV    A,E          ;ZERO MAND DIG, SO FETCH TOTAL DIGIT FORMAT
2149 E670        3317          ANI    70H          ;LOOK AT MIN TOTAL DIGITS
214B C28522   C  3318          JNZ    DGN90        ;IF NOT SATISFIED JUMP (NO SUCCESS)
214E CD3420   C  3319 DGN25:   CALL   DIGNB        ;CONVERT THE NO. TO BINARY FLOATING POINT
2151 F1          3320          POP    PSW
2152 E1          3321          POP    H
2153 37          3322          STC
2154 C9          3323          RET
2155 7A          3324 DGN8:    MOV    A,D          ;FETCH DIGIT FORMAT BEFORE DP
2156 E60F        3325          ANI    0FH          ;LOOK AT MAX. # DIGITS BEFORE DP
2158 CA8522   C  3326          JZ     DGN90        ;IF ZERO, JUMP
215B 15          3327          DCR    D            ;IF NOT ZERO, DECREMENT MAX #
215C C3E220   C  3328          JMP    DGN10        ;AND JUMP
215F 3E31        3329 DGN31:   MVI    A,DOT
2161 F5          3330          PUSH   PSW
2162 C34821   C  3331          JMP    DGN6
2165 F1          3332 DGN9:    POP    PSW
2166 E1          3333          POP    H
2167 B7          3334          ORA    A            ;CLEAR CARRY TO SHOW NO SUCCESS
2168 C9          3335          RET                 ;AND RETURN
2169 7B          3336 DGN11:   MOV    A,E          ;FETCH TOTAL DIGIT FORMAT
216A E60F        3337          ANI    0FH          ;LOOK AT MAX TOTAL DIGITS
216C CA8522   C  3338          JZ     DGN90  ;IF ZERO, JUMP
216F 1D          3339          DCR    E            ;IF NOT ZERO, DECREMENT MAX #
2170 C3EC20   C  3340          JMP    DGN12        ;AND JUMP
2173 CD7E11   C  3341 DGN16:   CALL   KEYDWN       ;ANY KEYINS?
2176 F5          3342          PUSH   PSW          ;SAVE KEYCODE INFO
2177 CD0D1A   C  3343          CALL   DIGITR       ;IS IT A DIGIT?
217A D21E22   C  3344          JNC    DGN28        ;IF NOT JUMP
217D 7B          3345          MOV    A,E          ;IF DIGIT, FETCH TOTAL DIGIT FORMAT INFO
217E E67F        3346          ANI    7FH          ;CLEAR DP BIT
2180 CAA222   C  3347          JZ     DGN80        ;IS REST ZERO, IF SO JUMP
2183 E670        3348          ANI    70H          ;IF NOT ZERO, LOOK AT MIN. TOTAL DIGITS
2185 CACB21   C  3349          JZ     DGN18        ;IF MIN TOT DIG ARE ZERO JUMP
2188 7B          3350          MOV    A,E          ;FETCH TOTAL DIGIT FORMAT INFO
2189 D611        3351          SUI    11H          ;SUBTRACT 1 FROM MIN AND MAX TOTAL
218B 5F          3352          MOV    E,A          ;STORE BACK IN E
218C F1          3353 DGN19:   POP    PSW
218D 03          3354          INX    B
218E 02          3355          STAX   B            ;STUFF LAST DIGIT
218F F5          3356          PUSH   PSW
2190 2C          3357          INR    L            ;INCREMENT DIGITS AFTER DP
2191 7C          3358 DGN19A:  MOV    A,H          ;FETCH DIGITS BEFORE DP
2192 E67F        3359          ANI    7FH          ;LOOK AT DP BIT
2194 85          3360          ADD    L            ;GETS US TOTAL DIGITS
2195 E5          3361          PUSH   H            ;SAVE SO WE CAN SET UP FOR BLOADR
2196 D5          3362          PUSH   D            ;DITTO
2197 57          3363          MOV    D,A          ;TOTAL DIGITS IN D
2198 03          3364          INX    B            ;NEXT KYSTR
2199 69          3365          MOV    L,C          ;SET UP L FOR BLOADR
219A 60          3366          MOV    H,B          ;SET UP H FOR BLOADR
219B C6FB        3367          ADI    -5           ;IS TOTAL DIGITS 5?
219D F2D221   C  3368          JP     DGN20        ;IF SO, JUMP
21A0 C5          3369          PUSH   B
21A1 CDAD1E   C  3370          CALL   BLOADR       ;IF NOT 5 CALL BLOADR
21A4 CDEA17   C  3371          CALL   WDUPR        ;DISPLAY BCD NUMBER ON WT. DISPLAY
21A7 C1          3372          POP    B
21A8 0B          3373 DGN22:   DCX    B            ;NEXT LOWER KYSTR
21A9 D1          3374          POP    D            ;POP BACK REGS SET BEFORE BLOADR
21AA E1          3375          POP    H
21AB 7D          3376          MOV    A,L          ;FETCH DIGITS AFTER DP
21AC E5          3377          PUSH   H            ;SAVE DIGITS BEFORE AND AFTER DP
21AD 21B201   D  3378          LXI    H,DIM24      ;LS WT. DISPLAY
21B0 B7          3379          ORA    A            ;ANY DIGITS AFTER DP?
21B1 CAB921   C  3380          JZ     DGN24        ;IF NOT, JUMP
21B4 23          3381 DGN23:   INX    H            ;IF SO, INCREMENT
21B5 3D          3382          DCR    A            ;LAST ONE AFTER DP?
21B6 C2B421   C  3383          JNZ    DGN23        ;IF NOT ZERO, REDO LOOP
21B9 7E          3384 DGN24:   MOV    A,M          ;FETCH
```

```
LOC  OBJ            SOURCE STATEMENT

21BA F680                   ORI    80H         ;OR-IN DECIMAL POINT FOR DISPLAY
21BC 77                     MOV    M,A         ;STORE BACK
21BD E1                     POP    H           ;RESTORE DIGITS BEFORE AND AFTER DP
21BE CDB328   C             CALL   DISUPR      ;AND UPDATE DISPLAY
21C1 F1                     POP    PSW
21C2 C37321   C             JMP    DGN16       ;AND JUMP
21C5 7B            DGN17:   MOV    A,E         ;FETCH FORMAT FOR TOTAL DIGITS
21C6 E670                   ANI    70H         ;LOOK AT MIN TOTAL DIGITS
21C8 CA4E21   C             JZ     DGN25       ;IF ZERO JUMP
21CB C3A222   C             JMP    DGN80
21CE 1D            DGN18:   DCR    E           ;DECREMENT MAX TOTL DIGITS
21CF C38C21   C             JMP    DGN19       ;AND JUMP
21D2 C5            DGN20:   PUSH   B
21D3 7A                     MOV    A,D
21D4 D605                   SUI    5
21D6 CAE921   C             JZ     DGN200
21D9 57                     MOV    D,A
21DA E5                     PUSH   H
21DB 2B                     DCX    H
21DC 2B                     DCX    H
21DD 2B                     DCX    H
21DE 2B                     DCX    H
21DF 2B                     DCX    H
21E0 CDAD1E   C             CALL   BLOADR
21E3 CDD528   C             CALL   SDUPR
21E6 E1                     POP    H
21E7 1605                   MVI    D,5
21E9 15            DGN200:  DCR    D           ;DECREMENT MAX # DIG BEFORE DP
21EA CDAD1E   C             CALL   BLOADR      ;CHANGE TO BCD #
21ED CDEA17   C             CALL   WDUPR       ;AND UPDATE WT. DISPLAY
21F0 2B                     DCX    H           ;
21F1 7E                     MOV    A,M
21F2 CD0D1A   C             CALL   DIGITR      ;IS IT A DIGIT?
21F5 4F                     MOV    C,A
21F6 CD3611   C    DGN21:   CALL   SEGMR       ;CHANGE TO SEG CODE SUITABLE FOR DISPLAY
21F9 32AD01   D             STA    DIM11       ;MS WEIGHT DISPLAY
21FC CDB328   C             CALL   DISUPR
21FF C1                     POP    B
2200 C3A821   C             JMP    DGN22       ;
2203 FE11          DGN26:   CPI    DELET       ;IF NOT A DIGIT, IS IT DELETE?
2205 C21221   C             JNZ    DGN4        ;IF NOT DELETE JUMP TO SEE IF DOT?
2208 79                     MOV    A,C         ;FETCH IS BYTE OF KYSTR
2209 FEFF                   CPI    0FFH        ;IS IT FF?
220B CA1222   C             JZ     DGN27       ;IF SO WE WANT OUT OF DIGINR
220E 0B                     DCX    B           ;IF NOT, NEXT LOWER KYSTR
220F C34022   C             JMP    DGNZ        ;AND JUMP
2212 010000        DGN27:   LXI    B,0000H
2215 CDEA17   C             CALL   WDUPR
2218 F1                     POP    PSW
2219 B7                     ORA    A           ;CLEAR CARRY TO INDICATE NO SUCCESS
221A 3E11                   MVI    A,DELET
221C E1                     POP    H
221D C9                     RET
221E F1            DGN28:   POP    PSW         ;IF NOT A DIGIT
221F F5                     PUSH   PSW         ;SAVE KEYIN KEYCODE INFO
2220 FE11                   CPI    DELET       ;IS IT DELETE?
2222 CA2822   C             JZ     DGN29       ;IF SO, JUMP
2225 C3C521   C             JMP    DGN17       ;IF NOT, JUMP
2228 79            DGN29:   MOV    A,C
2229 FEFF                   CPI    0FFH        ;ARE WE DELETEING OUT OF DIGINR?
222B CA1222   C             JZ     DGN27
222E 0B                     DCX    B           ;NEXT LOWER KYSTR
222F 7D                     MOV    A,L         ;CHECK NO DIGITS AFTER DECIMAL
2230 B7                     ORA    A
2231 CA3C22   C             JZ     DGN30       ;IF 0, JUMP
2234 2D                     DCR    L           ;DECREMENT DIGITS AFTER DP
2235 7B                     MOV    A,E         ;FETCH TOTAL DIGIT FORMAT INFO
2236 C611                   ADI    11H         ;INCREMENT MIN AND MAX TOTAL DIGITS
2238 5F                     MOV    E,A
2239 C39121   C             JMP    DGN19A      ;AND JUMP
223C 7B            DGN30:   MOV    A,E         ;FETCH TOT DIG FORMAT INFO
223D F680                   ORI    80H         ;WANT TO HAVE DP SO OR-IN THAT BIT
223F 5F                     MOV    E,A         ;STORE BACK IN E
2240 7C            DGNZ:    MOV    A,H         ;FETCH DIGITS BEFORE DP
2241 E680                   ANI    80H         ;CHECK DP BIT
2243 CA4A22   C             JZ     DGNX        ;IF ZERO JUMP
2246 7A                     MOV    A,D         ;SINCE MAD DIGIT MODE ADD 1
2247 C610                   ADI    10H
2249 57                     MOV    D,A
224A 14            DGNX:    INR    D
224B 25                     DCR    H
224C 7B                     MOV    A,E
224D C611                   ADI    11H
224F 5F                     MOV    E,A
2250 F1                     POP    PSW
2251 C3F020   C             JMP    DGN13
2254 C5            DGN14:   PUSH   B
2255 7A                     MOV    A,D         ;BRING NO. OF DIGITS
2256 D605                   SUI    5
2258 CA6B22   C             JZ     DGN140      ;JUMP IT THIS IS 5TH DIGIT
225B 57                     MOV    D,A
225C E5                     PUSH   H
225D 2B                     DCX    H
225E 2B                     DCX    H
225F 2B                     DCX    H
2260 2B                     DCX    H
2261 2B                     DCX    H
2262 CDAD1E   C             CALL   BLOADR
2265 CDD528   C             CALL   SDUPR       ;UP DATE SCRATCH PAD DISPLAY
2268 E1                     POP    H
2269 1605                   MVI    D,5
226B 15            DGN140:  DCR    D           ;GET 4 DIGITS FIRST TIME
226C CDAD1E   C             CALL   BLOADR      ;LOAD TO B,C PAIR
```

```
LOC   OBJ          LINE      SOURCE STATEMENT

226F  CDEA17   C                  CALL   WDUPR
2272  2B                          DCX    H
2273  7E                          MOV    A,M
2274  CD0D1A   C                  CALL   DIGITR           ;5TH DIGIT
2277  4F                          MOV    C,A
2278  CD3611   C                  CALL   SEGMR
227B  32AD01   D                  STA    DIM11
227E  CDB328   C                  CALL   DISUPR
2281  C1                          POP    B
2282  C30521   C                  JMP    DGN15
2285  CD1829   C        DGN90:    CALL   ERDIS
2288  CD7E11   C        DGN91:    CALL   KEYDWN
228B  FE11                        CPI    DELET
228D  CA9322   C                  JZ     DGN93
2290  C38522   C                  JMP    DGN90
2293  79                DGN93:    MOV    A,C
2294  FEFF                        CPI    0FFH
2296  CA9C22   C                  JZ     DGN94
2299  C34022   C                  JMP    DGNZ
229C  CD321A   C        DGN94:    CALL   CLRSPD
229F  C31222   C                  JMP    DGN27
22A2  CD1829   C        DGN80:    CALL   ERDIS
22A5  CD7E11   C        DGN81:    CALL   KEYDWN
22A8  FE11                        CPI    DELET
22AA  CAB022   C                  JZ     DGN83
22AD  C3A222   C                  JMP    DGN80
22B0  CD321A   C        DGN83:    CALL   CLRSPD
22B3  F1                          POP    PSW
22B4  C37321   C                  JMP    DGN16
                        ;
                        ;
                        ;
                        ;
                        ;         TRANSACTION PIECE MEAL ENTER ROUTINE
                        ;                    D,E-BUFFER BYTE 0
                        ;                    H,L-STATUS BYTE
                        ;
22B7  CD8818   C        TRPMER:   CALL   TRADIS  ;UPDATE THE TRANSACTION LAMP ON DISPLAY
22BA  EB                          XCHG           ;D,E HOLD STATUS BYTE - H,L HOLD BUFFER BYTE0
22BB  E5                          PUSH   H       ;SAVE BUFFER BYTE0
22BC  4E                          MOV    C,M     ;SET UP FOR DISPLAYING TRANSACTION NUMBER
22BD  23                          INX    H       ;      "
22BE  46                          MOV    B,M     ;      "
22BF  CDEA17   C                  CALL   WDUPR   ;      "
22C2  23                          INX    H       ;CUST#
22C3  4E                          MOV    C,M     ;SET UP TO DISP. ON SCR. PAD
22C4  23                          INX    H       ;
22C5  46                          MOV    B,M     ;      "
22C6  CDD528   C                  CALL   SDUPR   ;SCRATCH PAD DISPLAY UPDATE ROUTINE
22C9  AF                          XRA    A
22CA  323700   D                  STA    PRLOC0
22CD  320502   D                  STA    GACFLG
22D0  320000   E                  STA    KEYFLG
22D3  320000   E                  STA    WTSTOR
22D6  320100   E                  STA    WTSTOR+1
22D9  320200   E                  STA    WTSTOR+2
22DC  321502   D                  STA    MORGFL
22DF  E1                          POP    H
22E0  E5                          PUSH   H
22E1  010500                      LXI    B,0005H          ;COMODITY OFFSET
22E4  09                          DAD    B
22E5  7E                          MOV    A,M              ;HAS COMODITY BEEN ENTERED?
22E6  FEFF                        CPI    0FFH
22E8  C21623   C                  JNZ    TRPM1            ;YES IF NOT 0FFH
22EB  E1                          POP    H
22EC  E5                          PUSH   H                ;SET THE MAIN BIT FOR FUTURE DELETION
22ED  011D00                      LXI    B,29
22F0  09                          DAD    B
22F1  3EDF                        MVI    A,0DFH           ;MAIN BIT MASK
22F3  A6                          ANA    M
22F4  77                          MOV    M,A              ;RE-ENTER TO MEMORY
22F5  E1                TRPM0:    POP    H                ;NO SO GET COMODITY FIRST B/4 PROCEEDING
22F6  CD6311   C                  CALL   CLKEYS
22F9  E5                          PUSH   H
22FA  CD101D   C        TRPM01:   CALL   CMDKEY
22FD  DAAC23   C                  JC     TRPM05
2300  FEFF                        CPI    0FFH
2302  CA0528   C                  JZ     DPMD10
2305  C3FA22   C                  JMP    TRPM01
2308  111E0C   C        MRGFL:    LXI    D,DMSG34
230B  CD0000   E                  CALL   FMASG
230E  F1                          POP    PSW
230F  CD4F15   C                  CALL   STPRMP
2312  D1                          POP    D
2313  C32F23   C                  JMP    TRPM3
2316  E1                TRPM1:    POP    H
2317  E5                          PUSH   H
2318  011D00                      LXI    B,29
231B  09                          DAD    B
231C  7E                          MOV    A,M
231D  E601                        ANI    01
231F  C22723   C                  JNZ    TRPMM1
2322  3EFF                        MVI    A,0FFH
2324  321502   D                  STA    MORGFL
2327  E1                TRPMM1:   POP    H       ;RESTORE BUFFER BYTE0
2328  CD6311   C        TRPM2:    CALL   CLKEYS
232B  E5                          PUSH   H       ;SAVE BUFFER BYTE 0
232C  221202   D                  SHLD   SAVPTR  ;SAVE HL FOR LATER USE
232F  CD7E11   C        TRPM3:    CALL   KEYDWN
2332  CDC519   C        TRPM4:    CALL   KEYDIS  ;UPDATE DISPLAY
2335  FE11                        CPI    DELET
2337  CA7224   C                  JZ     TRPM24
233A  FE57                        CPI    DTRANS
233C  CA0528   C                  JZ     DPMD10
```

```
LOC  OBJ          LINE      SOURCE STATEMENT

233F 32BA01  D                        STA   TKSTR
2342 D5                               PUSH  D           ;SAVE STATUS BYTE ADDR
2343 FE65                             CPI   ENTER
2345 CA8927  C                        JZ    TRPM50
2348 FE32                             CPI   SHARE
234A CA8926  C                        JZ    TRPM6
234D FE36                             CPI   SERVIC
234F CA2227  C                        JZ    TRPM7
2352 FE43                             CPI   FFEED
2354 CAA223  C                        JZ    TRPM07
2357 FE67                             CPI   MOIST
2359 CA1F25  C                        JZ    TRPM8
235C FE62                             CPI   FM
235E CA3025  C                        JZ    TRPM9
2361 FE66                             CPI   DAMAGE
2363 CA3F25  C                        JZ    TRPM10
2366 FE33                             CPI   WTIN
2368 CADE25  C                        JZ    TRPM12
236B FE37                             CPI   WTOUT
236D CADD25  C                        JZ    TRPM13
2370 FE03                             CPI   SELL
2372 CA5626  C                        JZ    TRPM15
2375 FE07                             CPI   STORE
2377 CA5B26  C                        JZ    TRPM16
237A FE47                             CPI   OFF
237C CABF23  C                        JZ    TRPM71
237F FE02                             CPI   CONTR
2381 CA6026  C                        JZ    TRPM17
2384 FE06                             CPI   DLYPR
2386 CA6526  C                        JZ    TRPM18
2389 FE63                             CPI   PRICE
238B CAE123  C                        JZ    TRPM34
238E FE64                             CPI   PRINT
2390 CA2D24  C                        JZ    TRPM60
2393 FE73                             CPI   TESTWT
2395 CA7E26  C                        JZ    TRPM20
2398 4F                               MOV   C,A
2399 CD471A  C                        CALL  CMDCHK
239C DAAB23  C                        JC    TRPM06
239F C36924  C                        JMP   TRPM23
23A2 0E0C                   TRPM07:   MVI   C,0CH
23A4 CD0000  E                        CALL  FCHAR
23A7 D1                               POP   D
23A8 C32F23  C                        JMP   TRPM3
23AB D1                     TRPM06:   POP   D
23AC 010500                 TRPM05:   LXI   B,0005          ;TEST WEIGHT OFFSET
23AF 09                               DAD   B
23B0 77                               MOV   M,A             ;COMOD # TO BUFFER
23B1 4F                               MOV   C,A
23B2 0D                               DCR   C
23B3 216900  D                        LXI   H,CMSMSK        ;COMMODITY ZERO PROGRAM MASK
23B6 09                               DAD   B               ;OFFSET BY 2(COMMOD# -1)
23B7 7E                               MOV   A,M
23B8 EB                               XCHG
23B9 B6                               ORA   M
23BA 77                               MOV   M,A             ;SET MASK BITS FOR ZERO PROGRAMMING
23BB EB                               XCHG
23BC C31623  C                        JMP   TRPM1           ;FETCH NEXT KEYIN
23BF 2A1202  D              TRPM71:   LHLD  SAVPTR
23C2 111D00                           LXI   D,29
23C5 19                               DAD   D
23C6 E5                               PUSH  H
23C7 CD902B  C                        CALL  GKEY
23CA E1                               POP   H
23CB F5                               PUSH  PSW
23CC D2D823  C                        JNC   TRPM72          ;DELETE KEY?
23CF 3E7F                             MVI   A,7FH
23D1 A6                               ANA   M
23D2 77                     TRPM73:   MOV   M,A             ;THE FLAG IS SET WHEN DRIVER IS OFF THE TRUCK
23D3 F1                               POP   PSW
23D4 D1                               POP   D
23D5 C33223  C                        JMP   TRPM4
23D8 3E80                   TRPM72:   MVI   A,80H
23DA B6                               ORA   M
23DB C3D223  C                        JMP   TRPM73
23DE CDC519  C              TRPM04:   CALL  KEYDIS
23E1 325401  D              TRPM34:   STA   FNUMD
23E4 118402                           LXI   D,0284H
23E7 CDAA20  C                        CALL  DIGINR
23EA 323100  D                        STA   TRPSTR
23ED D26924  C                        JNC   TRPM23
23F0 FE03                             CPI   SELL
23F2 CADE23  C                        JZ    TRPM04
23F5 7A                               MOV   A,D
23F6 FE02                             CPI   2
23F8 CA0424  C                        JZ    TRPM36
23FB CDD627  C                        CALL  EXTEND
23FE CDAD1E  C                        CALL  BLOADR
2401 C31924  C                        JMP   TRPM37
2404 010500                 TRPM36:   LXI   B,0005H
2407 09                               DAD   B
2408 4E                               MOV   C,M
2409 CD701D  C                        CALL  CMDADF
240C D26024  C                        JNC   TRPM35
240F 3A5401  D                        LDA   FNUMD
2412 4F                               MOV   C,A
2413 CD901D  C                        CALL  CMDOSF
2416 4E                               MOV   C,M
2417 23                               INX   H
2418 46                               MOV   B,M
2419 D1                     TRPM37:   POP   D
241A E1                               POP   H
241B E5                               PUSH  H
```

```
LOC  OBJ              SOURCE STATEMENT

241C C5                        PUSH   B
241D 011E00                    LXI    B,30
2420 09                        DAD    B
2421 C1                        POP    B
2422 71                        MOV    M,C
2423 23                        INX    H
2424 70                        MOV    M,B
2425 3A3100    D               LDA    TRPSTR
2428 E1                        POP    H
2429 E5                        PUSH   H
242A C33223    C      TRPM64:  JMP    TRPM4
242D 110202           TRPM60:  LXI    D,0202H
2430 CDAA20    C               CALL   DIGINR
2433 323100    D               STA    TRPSTR
2436 D25B24    C               JNC    TRPM61
2439 3E02                      MVI    A,02
243B 92                        SUB    D
243C CA5624    C               JZ     TRPM63
243F 57                        MOV    D,A
2440 E5                        PUSH   H
2441 69                        MOV    L,C
2442 60                        MOV    H,B
2443 23                        INX    H
2444 CDAD1E    C               CALL   BLOADR
2447 CD3219    C               CALL   B2BI16
244A 79                        MOV    A,C
244B E1                        POP    H
244C 323700    D      TRPM62:  STA    PRLOC0
244F D1                        POP    D
2450 3A3100    D               LDA    TRPSTR
2453 C33223    C               JMP    TRPM4
2456 3E01             TRPM63:  MVI    A,1
2458 C34C24    C               JMP    TRPM62
245B FE11             TRPM61:  CPI    DELET
245D CA6924    C               JZ     TRPM23
2460 D1               TRPM35:  POP    D
2461 CD8811    C      TRPDV0:  CALL   ERDASH
2464 E1                        POP    H
2465 C32823    C               JMP    TRPM2
2468 F1               TRPM22:  POP    PSW
2469 D1               TRPM23:  POP    D
246A 3A3100    D               LDA    TRPSTR        ;LAST KEY ENTRY
246D FE11                      CPI    DELET
246F C26124    C               JNZ    TRPDV0
2472 CD321A    C      TRPM24:  CALL   CLRSPD
2475 CD0A28    C               CALL   DRSETV
2478 E1                        POP    H
2479 C32823    C               JMP    TRPM2
247C E1               TRPM5:   POP    H             ;BUFFER BYTE 0
247D C3541D    C               JMP    PRGM7         ;AND EXIT PATH
2480 F1               TRPME4:  POP    PSW           ;THE FOLLOWING PROGRAM STEPS UP TO TRPM8
2481 3A0502    D               LDA    GACFLG        ;HAVE BEEN ADDED TO READ THE DICKEY JOHN
2484 B7                        ORA    A             ;MOISTURE TESTER
2485 C2A324    C               JNZ    TRPME9
2488 CD0000    E               CALL   GACMN
248B DAB024    C      TRPME7:  JC     TRPGAC
248E 3A0000    E               LDA    KEYFLG
2491 B7                        ORA    A
2492 C2A624    C               JNZ    TRPME6
2495 D5                        PUSH   D
2496 11E408    C               LXI    D,DMSG21
2499 CD0000    E               CALL   PMASG
249C CD4F15    C               CALL   STPRMP
249F D1                        POP    D
24A0 C3A624    C               JMP    TRPME6
24A3 CD8811    C      TRPME9:  CALL   ERDASH
24A6 CD0A28    C      TRPME6:  CALL   DRSETV
24A9 F1                        POP    PSW
24AA D1                        POP    D
24AB E1                        POP    H
24AC E5                        PUSH   H
24AD C32F23    C               JMP    TRPM3
24B0 E5               TRPGAC:  PUSH   H
24B1 210000    E               LXI    H,PMOSTB
24B4 46                        MOV    B,M
24B5 23                        INX    H
24B6 4E                        MOV    C,M
24B7 3AC1FF                    LDA    CHEATF
24BA B7                        ORA    A
24BB CAD724    C               JZ     TRP00
24BE 79                        MOV    A,C
24BF B7                        ORA    A
24C0 CAD724    C               JZ     TRP00
24C3 FE50                      CPI    50H
24C5 CAD724    C               JZ     TRP00
24C8 D2D024    C               JNC    TRP10
24CB 0E50                      MVI    C,50H
24CD C3D724    C               JMP    TRP00
24D0 78               TRP10:   MOV    A,B
24D1 C601                      ADI    1
24D3 27                        DAA
24D4 47                        MOV    B,A
24D5 0E00                      MVI    C,0
24D7 E1               TRP00:   POP    H
24D8 71                        MOV    M,C
24D9 23                        INX    H
24DA 70                        MOV    M,B
24DB CDEA17    C               CALL   WDUPR
24DE 3AB401    D               LDA    DIM26
24E1 F680                      ORI    80H
24E3 32B401    D               STA    DIM26
24E6 CDB328    C               CALL   DISUPR
24E9 F1                        POP    PSW
```

```
LOC  OBJ             SOURCE STATEMENT

24EA D1                      POP    D
24EB EB                      XCHG
24EC B6                      ORA    M
24ED 77                      MOV    M,A
24EE EB                      XCHG
24EF E1                      POP    H
24F0 E5                      PUSH   H
24F1 D5                      PUSH   D
24F2 010C00                  LXI    B,12
24F5 3E10                    MVI    A,10H
24F7 F5                      PUSH   PSW
24F8 09                      DAD    B
24F9 E5                      PUSH   H
24FA 210000   E              LXI    H,TSTWTB
24FD 46                      MOV    B,M
24FE 23                      INX    H
24FF 4E                      MOV    C,M
2500 E1                      POP    H
2501 71                      MOV    M,C
2502 23                      INX    H
2503 70                      MOV    M,B
2504 F1                      POP    PSW
2505 D1                      POP    D
2506 EB                      XCHG
2507 B6                      ORA    M
2508 77                      MOV    M,A
2509 EB                      XCHG
250A E1                      POP    H
250B E5                      PUSH   H
250C 3EFF                    MVI    A,0FFH
250E 320502   D              STA    GACFLG
2511 CD0000   E              CALL   BEEP
2514 0E96                    MVI    C,150
2516 CD0000   E              CALL   DLYR
2519 CD0000   E              CALL   BEEP
251C C32F23   C              JMP    TRPM3
251F 010E00          TRPM8:  LXI    B,14          ;SET UP FOR MOISTURE
2522 3E01                    MVI    A,1
2524 F5                      PUSH   PSW
2525 3A1502   D              LDA    MORGFL
2528 B7                      ORA    A
2529 C20823   C              JNZ    MRGFL
252C F1                      POP    PSW
252D C34625   C              JMP    TRPM11
2530 011000          TRPM9:  LXI    B,0016        ;FM OFFSET
2533 3E02                    MVI    A,02H         ;FM STATUS BIT
2535 119402                  LXI    D,0294H
2538 C34925   C              JMP    TRPM21
253B 011200          TRPM10: LXI    B,0018        ;DAMAGE OFFSET
253E 3E04                    MVI    A,04H         ;DAMAGE STATUS BIT
2540 119402                  LXI    D,0294H
2543 C34925   C              JMP    TRPM21
2546 118402          TRPM11: LXI    D,0284H       ;SET-UP FOR DIGINR
2549 F5              TRPM21: PUSH   PSW           ;SAVE STATUS BYTE
254A 09                      DAD    B             ;CALC OFFSET FROM BUFFER BYTE 0
254B CDAA20   C              CALL   DIGINR        ;FETCH DIGITS
254E F5                      PUSH   PSW
254F FE41                    CPI    COMODA        ;REQUEST FOR AUTOMATIC
2551 CA8024   C              JZ     TRPME4        ;MOISTURE ENTRY?
2554 F1                      POP    PSW
2555 323100   D              STA    TRPSTR        ;SAVE KEY ENTRY FROM DIGINR
2558 D26824   C              JNC    TRPM22        ;NOT SATISFIED WITH DIGITS
255B E5                      PUSH   H             ;SAVE
255C 3E04                    MVI    A,4           ;2/21/81 ADDED TO HANDLE NON ENTRIES
255E 93                      SUB    E             ;
255F CA7A25   C              JZ     TRPM08        ;
2562 CDD627   C              CALL   EXTEND        ;EXTEND DIGITS IF NESC.
2565 CDAD1E   C              CALL   BLOADR        ;LOAD IN BCD INTO B,C PAIR
2568 E1                      POP    H             ;BUFFER POINTER
2569 71                      MOV    M,C           ;LS BYTE LOADED
256A 23                      INX    H
256B 70                      MOV    M,B           ;MS BYTE LOADED
256C F1                      POP    PSW
256D D1                      POP    D
256E EB                      XCHG
256F B6                      ORA    M
2570 77                      MOV    M,A
2571 EB                      XCHG
2572 E1              TRPM09: POP    H
2573 E5                      PUSH   H
2574 3A3100   D              LDA    TRPSTR        ;LAST KEY ENTRY
2577 C33223   C              JMP    TRPM4         ;& INTERROGATE KEY ENTRY
257A F1              TRPM08: POP    PSW           ;ADDED 2/21/81 TO HANDLE NON ENTRIES
257B D1                      POP    D
257C C37225   C              JMP    TRPM09        ;
257F 3A0000   E      TRPME2: LDA    SKYFLG        ;HAS DELETE KEY BEEN PRESSED?
2582 B7                      ORA    A
2583 CA8A25   C              JZ     TRPME1
2586 E1                      POP    H
2587 C3A624   C              JMP    TRPME6
258A D5              TRPME1: PUSH   D
258B 11B408   C              LXI    D,DMSG20
258E CD0000   E              CALL   PMASG
2591 CD4F15   C              CALL   STFRMF
2594 D1                      POP    D
2595 E1                      POP    H
2596 F1                      POP    PSW
2597 3ABA01   D              LDA    TKSTR
259A D1                      POP    D
259B E1                      POP    H
259C E5                      PUSH   H
259D C33223   C              JMP    TRPM4
25A0 F1              TRPME3: POP    PSW
25A1 E5                      PUSH   H
```

```
LOC  OBJ                SOURCE STATEMENT

                        IF      SCALEA
                        CALL    GETWT          ;AUTOMATIC WEIGHT ROUTINE
                        ENDIF
                        IF      SCALEB
25A2 CD0000    E        CALL    GETWT2
                        ENDIF
25A5 D27F25    C        JNC     TRPME2
25A8 210000    E        LXI     H,WTSTOR       ;LOAD STARTING LOCATION FOR WT
25AB 7E                 MOV     A,M
25AC 23                 INX     H
25AD 46                 MOV     B,M
25AE 23                 INX     H
25AF 4E                 MOV     C,M
25B0 C5                 PUSH    B
25B1 F5                 PUSH    PSW
25B2 CDFA17    C        CALL    WDUPR
25B5 F1                 POP     PSW
25B6 F5                 PUSH    PSW
25B7 4F                 MOV     C,A
25B8 CD3611    C        CALL    SEGMR
25BB 32AD01    D        STA     DIM11
25BE CDB328    C        CALL    DISUPR
25C1 CD0000    E        CALL    BEEP
25C4 0EC8               MVI     C,200
25C6 CD0000    E        CALL    DLYR
25C9 CD0000    E        CALL    BEEP
25CC 3EFF               MVI     A,0FFH
25CE 323100    D        STA     TRPSTR
25D1 F1                 POP     PSW
25D2 C1                 POP     B
25D3 C32B26    C        JMP     TRPM27
25D6 010600     TRPM12: LXI     B,0006         ;WT IN OFFSET
25D9 AF                 XRA     A              ;0 FOR STATUS BIT MASK
25DA C3E225    C        JMP     TRPM14
25DD 010900     TRPM13: LXI     B,0009         ;WT OUT OFFSET
25E0 3E08               MVI     A,08           ;WT OUT MASK
25E2 F5         TRPM14: PUSH    PSW            ;SAVE MASK
25E3 3A1502    D        LDA     MORGFL
25E6 B7                 ORA     A
25E7 C20823    C        JNZ     MRGFL
25EA 09                 DAD     B              ;CALCULATE OFFSET
25EB 7E                 MOV     A,M
25EC FEFF               CPI     0FFH
25EE C20823    C        JNZ     MRGFL
25F1 110505             LXI     D,0505H        ;DIGIT FORMAT FOR DIGINR
25F4 CDAA20    C        CALL    DIGINR
25F7 323100    D        STA     TRPSTR         ;SAVE LAST KEYIN
25FA F5                 PUSH    PSW
25FB FE41               CPI     COMODA         ;IS IT AN AUTOMATIC INPUT REQUEST?
25FD CAA025    C        JZ      TRPME3
2600 F1                 POP     PSW
2601 D26824    C        JNC     TRPM22         ;IF NOT HAPPY
2604 E5                 PUSH    H              ;MANUAL ENTRY FLAG
2605 D5                 PUSH    D
2606 C5                 PUSH    B
2607 F5                 PUSH    PSW
2608 2A1202    D        LHLD    SAVPTR
260B 011D00             LXI     B,29
260E 09                 DAD     B
260F 7E                 MOV     A,M
2610 E6BF               ANI     0BFH
2612 77                 MOV     M,A
2613 F1                 POP     PSW
2614 C1                 POP     B
2615 D1                 POP     D
2616 E1                 POP     H
2617 3E05               MVI     A,05H          ;MAX DIGIT #
2619 92                 SUB     D              ;DIFFERENCE = TOTAL DIGITS RECEIVED
261A CA4426    C        JZ      TRPM02         ;ADDED 2/21/81 TO HANDLE NON ENTRIES
261D 57                 MOV     D,A            ;TO D FOR BLOADR SET-UP
261E 03                 INX     B
261F E5                 PUSH    H              ;SAVE BUFFER POINTER
2620 69                 MOV     L,C
2621 60                 MOV     H,B
2622 FE05               CPI     05H            ;5 DIGITS RECEIVED
2624 CA4926    C        JZ      TRPM26         ;IF SO, DO IT DIFFERENTLY
2627 CDAD1E    C        CALL    BLOADR
262A AF                 XRA     A              ;DIGITS IN B,C A HOLDS 0
262B E1         TRPM27: POP     H              ;FETCH POINTER
262C 71                 MOV     M,C            ;LS BYTE
262D 23                 INX     H
262E 70                 MOV     M,B            ;NEXT
262F 23                 INX     H
2630 77                 MOV     M,A            ;MS BYTE
2631 F1                 POP     PSW
2632 D1                 POP     D
2633 EB                 XCHG
2634 B6                 ORA     M
2635 77                 MOV     M,A
2636 EB                 XCHG
2637 E1         TRPM03: POP     H
2638 E5                 PUSH    H
2639 3A3100    D        LDA     TRPSTR         ;LAST KEY ENTRY
263C FEFF               CPI     0FFH           ;FF STORED WHEN IN AUTOMATIC MODE
263E CA2F23    C        JZ      TRPM3
2641 C33223    C        JMP     TRFM4          ;& INTERROGATE
2644 F1         TRPM02: POP     PSW            ;ADDED 1/21/81 TO HANDLE NON ENTRIES
2645 D1                 POP     D
2646 C37225    C        JMP     TRPM09
2649 15         TRPM26: DCR     D              ;PREPARE TO GET JUST 4 OF THE DIGITS
264A CDAD1E    C        CALL    BLOADR
264D 3A0000    D        LDA     KYSTR
2650 CD0D1A    C        CALL    DIGITR         ;A GETS 5TH DIGIT
2653 C32B26    C        JMP     TRPM27
```

```
LOC  OBJ            LINE     SOURCE STATEMENT

2656 0600                TRPM15: MVI    B,00H          ;SELL MASK
2658 C36726      C               JMP    TRPM19
265B 0620                TRPM16: MVI    B,20H          ;STORE MASK
265D C36726      C               JMP    TRPM19
2660 0640                TRPM17: MVI    B,40H          ;CONTRACT MASK
2662 C36726      C               JMP    TRPM19
2665 0660                TRPM18: MVI    B,60H          ;DELAY PRICE MASK
2667 CD7E11      C       TRPM19: CALL   KEYDWN
266A 323100      D               STA    TRPSTR
266D FE11                        CPI    DELET
266F CA6924      C               JZ     TRPM23
2672 D1                          POP    D              ;STATUS BYTE ADDRS
2673 1A                          LDAX   D
2674 E69F                        ANI    9FH            ;MASK OFF HANDLING BITS
2676 B0                          ORA    B              ;SET TO NEW HANDLING BITS
2677 12                          STAX   D              ;AND RESTORE TO MEMORY
2678 3A3100      D               LDA    TRPSTR
267B C33223      C               JMP    TRPM4          ;AND GET NEXT KEY ENTRIES
267E 010C00              TRPM20: LXI    B,12           ;TEST WEIGHT OFFSET
2681 11A422                      LXI    D,22A4H        ;DIGINR FORMAT
2684 3E10                        MVI    A,10H          ;TEST WT BIT MASK
2686 C34925      C               JMP    TRPM21
2689 012100              TRPM6:  LXI    B,0033         ;BUFFER OFFSET FOR 1ST SHARE BYTE
268C 09                          DAD    B
268D 010300                      LXI    B,0003         ;TO NEXT SHARE BYTE
2690 3EF7                        MVI    A,0F7H         ;SET SHARE MASK
2692 32B601      D               STA    DESTOR
2695 7E                          MOV    A,M            ;FETCH 2ND CUST # BYTE
2696 FEFF                        CPI    0FFH           ;IS IT BLANK
2698 CAB526      C               JZ     TRPM28         ;IF YES, LOAD HERE
269B 09                          DAD    B              ;NEXT
269C 3EFF                        MVI    A,0FFH         ;SET SECOND SHARE MASK
269F 32B601      D               STA    DESTOR
26A1 7E                          MOV    A,M            ;FETCH
26A2 FEFF                        CPI    0FFH
26A4 CAB526      C               JZ     TRPM28
26A7 11E910      C               LXI    D,SHMSG
26AA CD0000      E       TPMD1:  CALL   PMAS3
26AD CD4F15      C               CALL   STFRMF
26B0 D1                          POP    D
26B1 E1                          POP    H
26B2 C32823      C               JMP    TRPM2
26B5 23                  TRPM28: INX    H              ;TO SHARE.% BYTE
26B6 111202                      LXI    D,0212H        ;FORMAT FOR DIGINR
26B9 CDAA20      C               CALL   DIGINR
26BC 323100      D               STA    TRPSTR         ;SAVE LAST KEY ENTRY
26BF D26924      C               JNC    TRPM23
26C2 E5                          PUSH   H              ;SAVE BUFFER POINTER
26C3 03                          INX    B
26C4 69                          MOV    L,C
26C5 60                          MOV    H,B
26C6 3E02                        MVI    A,02H
26C8 92                          SUB    D              ;GET # OF DIGITS RECEIVED
26C9 57                          MOV    D,A            ;TO D FOR BLOADR
26CA CDAD1E      C               CALL   BLOADR
26CD E1                          POP    H
26CE 71                          MOV    M,C            ;SHARE % TO BUFFER
26CF 2B                          DCX    H
26D0 2B                          DCX    H              ;TO CUST # BYTE
26D1 3EFF                        MVI    A,0FFH
26D3 324900      D               STA    CUSTFL         ;SET FLAG FOR CUST KEY
26D6 3A3100      D       TRPM29: LDA    TRPSTR         ;GET LAST KEY ENTRY
26D9 FE60                        CPI    CUST           ;WELL IS IT?
26DB C21527      C               JNZ    TRPM30
26DE CDC519      C               CALL   KEYDIS         ;CUS TO DSPLY
26E1 111303                      LXI    D,0313H        ;FORMAT FOR DIGINR
26E4 CDAA20      C               CALL   DIGINR
26E7 323100      D               STA    TRPSTR
26EA D26924      C               JNC    TRPM23         ;IF NOT HAPPY SEE WHAT ELSE HE WANTS
26ED 03                          INX    B
26EE E5                          PUSH   H
26EF 69                          MOV    L,C
26F0 60                          MOV    H,B            ;SET-UP FOR BLOADR
26F1 3E03                        MVI    A,03H          ;MAX DIGITS #
26F3 92                          SUB    D              ;DIFFERENCE = # RECEIVED
26F4 57                          MOV    D,A            ;FOR BLOADR
26F5 CDAD1E      C               CALL   BLOADR
26F8 E1                          POP    H              ;FETCH POINTER
26F9 71                  TRPM31: MOV    M,C            ;LS BYTE OF CUST #
26FA 23                          INX    H
26FB 70                          MOV    M,B            ;MS BYTE TO RAM
26FC D1                          POP    D
26FD E1                          POP    H
26FE E5                          PUSH   H
26FF 011D00                      LXI    B,29           ;SET THE BYTE MASK STORED IN DESTOR
2702 09                          DAD    B
2703 3AB601      D               LDA    DESTOR
2706 A6                          ANA    M
2707 77                          MOV    M,A
2708 E1                          POP    H
2709 E5                          PUSH   H
270A 3EFF                        MVI    A,0FFH
270C 32B601      D               STA    DESTOR
270F 3A3100      D               LDA    TRPSTR         ;RESTORE STATUS ADDRS,BYTE 0 ADDRS, & LASTKY
2712 C33223      C               JMP    TRPM4
2715 3A4900      D       TRPM30: LDA    CUSTFL
2718 B7                          ORA    A              ;REFERENCE TO CUSTOMER 0
2719 C26924      C               JNZ    TRPM23         ;IF NOT, SORRY
271C 010000                      LXI    B,0000H        ;CUSTOMER 0
271F C3F926      C               JMP    TRPM31
2722 011500              TRPM7:  LXI    B,0021         ;SERVICE CUST # OFFSET
2725 09                          DAD    B
2726 010400                      LXI    B,0004         ;OFFSET TO NEXT
```

```
LOC  OBJ           SOURCE STATEMENT

2729 3EFD                   MVI    A,0FDH
272B 32B601    D            STA    DESTOR
272E 7E                     MOV    A,M          ;FETCH 2ND CUST #
272F FEFF                   CPI    0FFH         ;IS IT BLANK
2731 CA4627    C            JZ     TRPM32
2734 09                     DAD    B
2735 3EFB                   MVI    A,0FBH
2737 32B601    D            STA    DESTOR
273A 7E                     MOV    A,M          ;LOOK FOR NEXT
273B FEFF                   CPI    0FFH         ;IS HE BLANK
273D CA4627    C            JZ     TRPM32
2740 110F11    C            LXI    D,SEMSG
2743 C3AA26    C            JMP    TPMD1
2746 23             TRPM32: INX    H            ;TO PRICE BYTE
2747 119300                 LXI    D,0093H      ;FORMAT FOR DIGINR
274A CDAA20    C            CALL   DIGINR
274D 323100    D            STA    TRPSTR
2750 D26E27    C            JNC    TRPM40
2753 3E10                   MVI    A,10H
2755 324900    D            STA    CUSTFL
2758 E5             TRPM33: PUSH   H
2759 CDD627    C            CALL   EXTEND
275C 15                     DCR    D
275D CDAD1E    C            CALL   BLOADR
2760 E1                     POP    H
2761 71                     MOV    M,C
2762 23                     INX    H
2763 3A4900    D            LDA    CUSTFL
2766 B0                     ORA    B            ;TO SET COMPUTATION PROC. BIT
2767 77                     MOV    M,A
2768 2B                     DCX    H
2769 2B                     DCX    H
276A 2B                     DCX    H            ;TO SERVICE CUST #
276B C3D626    C            JMP    TRPM29
276E FE63           TRPM40: CPI    PRICE
2770 C26924    C            JNZ    TRPM23       ;IF NOT- WOOPS
2773 CDC519    C            CALL   KEYDIS
2776 AF                     XRA    A
2777 324900    D            STA    CUSTFL
277A 119300                 LXI    D,0093H      ;FOR DIGINR
277D CDAA20    C            CALL   DIGINR       ;TRY AGAIN
2780 323100    D            STA    TRPSTR
2783 D26924    C            JNC    TRPM23       ;SORRY
2786 C35827    C            JMP    TRPM33
2789 D1             TRPM50: POP    D            ;STATUS BYTE
278A E1                     POP    H            ;BUFFER BYTE 0
278B 3A3700    D            LDA    PRLOC0
278E B7                     ORA    A
278F C29927    C            JNZ    TRPM52
2792 3A3600    D            LDA    PRLOCK
2795 B7                     ORA    A
2796 CAB827    C            JZ     TRPM51       ;IF NOT 0 PRINT TICKET(S)
2799 CD1F12    C    TRPM52: CALL   AUTOFF
279C EB             TRPM53: XCHG
279D CD0000    E            CALL   PRLR
27A0 CD0000    E            CALL   BUFBLR       ;STILL ONE BLANK IN BUFFER?
27A3 DA541D    C            JC     PRGM7        ;IF SO, EXIT
27A6 11B802    C            LXI    D,MPJE
27A9 CD0000    E            CALL   PMASG
27AC 115502    C            LXI    D,MPJE1
27AF CD0000    E            CALL   PMASG
27B2 CD4F15    C            CALL   STFRMF
27B5 C3541D    C            JMP    PRGM7
27B8 D5             TRPM51: PUSH   D
27B9 E5                     PUSH   H
27BA 3EFF                   MVI    A,0FFH
27BC 32C0FF                 STA    SHORTF
27BF CD0000    E            CALL   PFORMA
27C2 CD0000    E            CALL   PFORMB
27C5 AF                     XRA    A
27C6 32C0FF                 STA    SHORTF
27C9 CD4F15    C            CALL   STFRMF
27CC 0E0A                   MVI    C,ALF
27CE CD0000    E            CALL   PCHAR
27D1 E1                     POP    H
27D2 D1                     POP    D
27D3 C39C27    C            JMP    TRPM53
27D6 60             EXTEND: MOV    H,B          ;ONE PAST LAST DIGIT ENTRY
27D7 69                     MOV    L,C          ;TO H,L
27D8 23                     INX    H            ;BACK TO LAST DIGIT
27D9 7A                     MOV    A,D          ;DIGITS BEFORE DP FORMAT
27DA B7                     ORA    A            ;DID WE GET ALL WE WANTED
27DB CAF527    C            JZ     EXT3         ;IF SO, CHECK AFTER DP.
27DE E5             EXT1:   PUSH   H
27DF C5                     PUSH   B            ;SAVE POINTER TO KEYSTR
27E0 0A             EXT2:   LDAX   B            ;LAST DIGIT ENTRY
27E1 77                     MOV    M,A          ;PUSH IT DOWN ONE
27E2 2B                     DCX    H
27E3 0B                     DCX    B            ;PREPARE TO PUSH NEXT DIGIT
27E4 79                     MOV    A,C          ;00H AT KYSTR ENTRY
27E5 FEFF                   CPI    0FFH         ;ARE WE THERE
27E7 C2E027    C            JNZ    EXT2         ;IF NOT, DO IT AGAIN
27EA 3601                   MVI    M,ZERO       ;0 KEY CODE
27EC C1                     POP    B
27ED E1                     POP    H
27EE 03                     INX    B
27EF 23                     INX    H            ;INC. ENT OF STORE POINTERS
27F0 1D                     DCR    E            ;TOTAL DIGIT FORMAT
27F1 15                     DCR    D            ;BEFORE DP FORMAT
27F2 C2DE27    C            JNZ    EXT1         ;IF NOT DONE, DO IT AGAIN
27F5 1604           EXT3:   MVI    D,04H        ;SET-UP FOR BLOADR UPON RET
27F7 7B                     MOV    A,E          ;AFTER DP FORMAT
27F8 E607                   ANI    07H          ;MAX DIGIT FORMAT
27FA 0601                   MVI    B,ZERO
```

```
LOC  OBJ              SOURCE STATEMENT

27FC B7                       ORA     A          ;REQUIRED TO EXTEND AFTER DP?
27FD C8                       RZ                 ;IF NOT, RETURN
27FE 70               EXT4:   MOV     M,B        ;EXTEND ZERO
27FF 23                       INX     H          ;ONE PAST LAST DIGIT
2800 3D                       DCR     A          ;DONE?
2801 C2FE27     C             JNZ     EXT4       ;IF NOT, DO IT AGAIN
2804 C9                       RET                ;DONE
2805 E1               DPMD10: POP     H
2806 EB                       XCHG
2807 C34118     C             JMP     DTRAN0     ;2/24/81 TO CORRECT DELETE PROCEEDURE
                      ;
                      ;THIS SUBROUTINE CLEARS THE LED DISPLAY. THE KEY MUST BE STORED
                      ;IN TKSTR
                      ;
280A E5               DRSETV: PUSH    H          ;CORRECT LED DISPLAY
280B 210000     D             LXI     H,KYSTR
280E 3ABA01     D             LDA     TKSTR
2811 77                       MOV     M,A
2812 CDD211     C             CALL    DRSET
2815 E1                       POP     H
2816 CD6311     C             CALL    CLKEYS
2819 CD321A     C             CALL    CLRSFD
281C C9                       RET
                      ;
                      ;
                      ;
                      ;       TRANSACTON ROUTINE
                      ;               B,C HOLD CUST #
                      ;
281D CD0000     E     TRANSR: CALL    BUFBLR     ;BUFFER BLANK (FINDS BLANK SPOT)
2820 D28C28     C             JNC     TRANS3     ;JUMP IF NO BLANK SPOT
2823 D5               TRANS1: PUSH    D          ;
2824 E5                       PUSH    H          ;HL-STATUS BYTE,DE-BYTE0
2825 C5                       PUSH    B          ;SAVE CUST#
2826 0EFF                     MVI     C,0FFH     ;DATA TO BE STUFFED
2828 EB                       XCHG               ;DE-STATUS BYTE,HL-BUFF BYTE0
2829 112600                   LXI     D,0038     ;LENGTH ( FOR SMLR)
282C CD0000     E             CALL    SMLR       ;AND STUFF
282F C1                       POP     B          ;CUST#
2830 E1                       POP     H          ;STATUS BYTE
2831 D1                       POP     D          ;BUFFER BYTE0
2832 D5                       PUSH    D          ;BUFFER BYTE
2833 E5                       PUSH    H          ;STATUS BYTE
2834 2A3200     D             LHLD    TRNCTR     ;TRANS. COUNTER
2837 7D                       MOV     A,L        ;LOW BYTE ADDR
2838 C601                     ADI     1          ;INCREMENT TRANSACTION NUMBER
283A 27                       DAA                ;AND ADJUST
283B 6F                       MOV     L,A        ;STORE BACK
283C 7C                       MOV     A,H        ;HIGH TRANS # BYTE
283D CE00                     ACI     00H        ;IN CASE OF A CARRY FROM INR-ING LOW BYTE
283F 27                       DAA                ;AND ADJUST
2840 67                       MOV     H,A        ;STORE BACK
2841 B5                       ORA     L
2842 C25428     C             JNZ     TRANS4
2845 23                       INX     H
2846 E5                       PUSH    H
2847 213400     D             LXI     H,TRNCTR+2
284A 34                       INR     M
284B 7E                       MOV     A,M
284C FE5B                     CPI     5BH
284E C2AF28     C             JNZ     TRANS5
2851 3641                     MVI     M,41H
2853 E1                       POP     H
2854 223200     D     TRANS4: SHLD    TRNCTR     ;COUNTER IS UPDATED
2857 7D                       MOV     A,L        ;FETCH UPDATED LOW BYTE ADDR
2858 12                       STAX    D          ;STORE IN D REG.
2859 13                       INX     D          ;NEXT BUFFER BYTE
285A 7C                       MOV     A,H        ;FETCH HIGH ADDR. BYTE
285B 12                       STAX    D          ;AND STORE
285C 13                       INX     D          ;NEXT BUFFER BYTE
285D 79                       MOV     A,C        ;LAST TWO CUST# DIGITS IN BCD
285E 12                       STAX    D          ;STORE IN BUFFER CUST # BYTE
285F 13                       INX     D          ;NEXT BUFFER CUST# BYTE
2860 78                       MOV     A,B        ;FETCH HIGH CUST#
2861 12                       STAX    D          ;STORE IN BUFFER
2862 210084                   LXI     H,CRAM     ;CUSTOMER RAM
2865 CD3219     C             CALL    B2BI16     ;CHANGE TO BINARY
2868 79                       MOV     A,C        ;LOW BYTE OF BINARY CUST#
2869 B0                       ORA     B          ;ARE WE ZERO?
286A CA7828     C             JZ      TRANS2     ;IF SO JUMP
286D 0B                       DCX     B          ;******WHAT IF CUST 0***************
286E 09                       DAD     B
286F 7E                       MOV     A,M
2870 C601                     ADI     1
2872 27                       DAA
2873 B7                       ORA     A
2874 CCBA28     C             CZ      LDINC
2877 77                       MOV     M,A
2878 13               TRANS2: INX     D          ;NEXT BUFFER BYTE
2879 12                       STAX    D          ;T# TO EX RAM BUFFER
287A EB                       XCHG
287B 011800                   LXI     B,24
287E 09                       DAD     B
287F 3A3400     D             LDA     TRNCTR+2
2882 77                       MOV     M,A
2883 E1                       POP     H
2884 D1                       POP     D          ;
2885 3680                     MVI     M,80H      ;BUSY BIT
2887 C3B722     C             JMP     TRPMER     ;TRANS PIECEMEAL ENTRY ROUTINE
288A 3C               LDINC:  INR     A
288B C9                       RET
288C 11B802     C     TRANS3: LXI     D,MPJE     ;MESSAGE BUFFER FULL
288F CD0000     E             CALL    PMASG      ;PRINT MESSAGE ROUTINE
```

```
LOC  OBJ          LINE        SOURCE STATEMENT

2892 C5                         PUSH    B       ;
2893 D5                         PUSH    D       ;
2894 E5                         PUSH    H       ;
2895 F5                         PUSH    PSW     ;
2896 CD0000   E                 CALL    PRJR    ;PRINT JOURNAL ROUTINE
2899 F1                         POP     PSW
289A E1                         POP     H
289B D1                         POP     D
289C C1                         POP     B
289D CD0000   E                 CALL    BUFBLR  ;BUFFER BLANK (FIND OUT IF EMPTY SPOT)
28A0 DA2328   C                 JC      TRANS1  ;
28A3 113502   C                 LXI     D,MBFULL        ;BUFFER FULL MESSAGE
28A6 CD0000   E                 CALL    PMASG
28A9 CD4F15   C                 CALL    STFRMF
28AC C30512   C                 JMP     INVALR
28AF E1                 TRANS5: POP     H
28B0 C35428   C                 JMP     TRANS4
                        ;
                        ;
                        ;
                        ;       DISPLAY UPDATE ROUTINE
                        ;                       ROUTINE TO UPDATE THE DISPLAY FROM MEMORY
                        ;
28B3 C5                 DISUPR: PUSH    B
28B4 D5                         PUSH    D
28B5 E5                         PUSH    H
28B6 F5                         PUSH    PSW
28B7 0E04                       MVI     C,04H
28B9 210088                     LXI     H,DIS00 ;STARTING LOCATION OF DISPLAY PORT
28BC 11A601   D                 LXI     D,DIM00 ;STARTING LOC. OF MEMORY
28BF 0604               DISUP1: MVI     B,04H
28C1 1A                 DISUP2: LDAX    D
28C2 77                         MOV     M,A
28C3 13                         INX     D       ;NEXT LOC. IN MEMORY
28C4 23                         INX     H       ;NEXT LED
28C5 05                         DCR     B
28C6 C2C128   C                 JNZ     DISUP2
28C9 0D                         DCR     C
28CA 79                         MOV     A,C
28CB CA5812   C                 JZ      STRET
28CE 3E04                       MVI     A,04H   ;INCREMENT DISPLAY LOC. BY 4
28D0 85                         ADD     L
28D1 6F                         MOV     L,A
28D2 C3BF28   C                 JMP     DISUP1
                        ;
                        ;
                        ;       SCRATCH PAD DISPLAY UPDATE ROUTINE-DECODES THE DIGITS IN BCD
                        ;                       FROM BC REGS AND DISPLAYS IT ON SCRATCH PAD
                        ;
28D5 E5                 SDUPR:  PUSH    H
28D6 F5                         PUSH    PSW
28D7 C5                         PUSH    B
28D8 21AA01   D                 LXI     H,DIM08 ;LOAD STARTING ADDR. OF RAM
28DB 3E0F                       MVI     A,0FH
28DD A1                         ANA     C       ;MASK OFF THE LAST FOUR BITS
28DE 4F                         MOV     C,A
28DF CD3611   C                 CALL    SEGMR
28E2 77                         MOV     M,A
28E3 23                         INX     H       ;DISPLAY 1S DIGIT
28E4 C1                         POP     B
28E5 C5                         PUSH    B
28E6 3EF0                       MVI     A,0F0H
28E8 A1                         ANA     C       ;MASK OFF THE FIRST 4 BITS
28E9 0F                         RRC
28EA 0F                         RRC
28EB 0F                         RRC
28EC 0F                         RRC             ;MOVE MS 4 BITS TO LS 4 BITS
28ED 4F                         MOV     C,A
28EE CD3611   C                 CALL    SEGMR
28F1 77                         MOV     M,A     ;DISPLAY 10S DIGIT
28F2 23                         INX     H
28F3 3E0F                       MVI     A,0FH
28F5 A0                         ANA     B
28F6 4F                         MOV     C,A
28F7 CD3611   C                 CALL    SEGMR
28FA 77                         MOV     M,A     ;DISPLAY 100'S DIGIT
28FB CDB328   C                 CALL    DISUPR
28FE C1                         POP     B
28FF F1                         POP     PSW
2900 E1                         POP     H
2901 C9                         RET
                        ;
                        ;
                        ;       FUNCTION LAMP CLEAR ROUTINE
                        ;*******NOTE: ALL ROUTINES TO CALL THIS ON 2ND ENTER
                        ;
2902 C5                 FCNLCR: PUSH    B
2903 D5                         PUSH    D
2904 E5                         PUSH    H
2905 F5                         PUSH    PSW
2906 21AE01   D                 LXI     H,DIM16 ;1ST MEMORY LOC. OF LAMP FIELD (1-6)
2909 AF                         XRA     A
290A 0604                       MVI     B,04H   ;COUNTER
290C 77                 FCN1:   MOV     M,A     ;ZERO MEMORY
290D 05                         DCR     B       ;DECREMENT COUNTER OF MEMORY LOCATIONS
290E 23                         INX     H       ;NEXT MEM. LOC
290F C20C29   C                 JNZ     FCN1    ;LOOP UNTIL ALL MEMORY LOC. ARE ZEROED OUT
2912 CDB328   C                 CALL    DISUPR
2915 C35812   C                 JMP     STRET
                        ;
                        ;
                        ;       ERROR DISPLAY ROUTINE
                        ;                       DISPLAYS ERROR ON SCRATCH PAD
                        ;
```

```
LOC  OBJ          LINE        SOURCE STATEMENT

2918 E5                4420 ERDIS:  PUSH    H
2919 C5                4421         PUSH    B
291A 21AC01       D    4422         LXI     H,DIM10 ;LS SCRATCH PAD DISPLAY LOC
291D 3679              4423         MVI     M,SEGE
291F 2B                4424         DCX     H
2920 3650              4425         MVI     M,SEGR
2922 2B                4426         DCX     H
2923 3650              4427         MVI     M,SEGR
2925 CDB328       C    4428         CALL    DISUPR
2928 0EC8              4429         MVI     C,200
292A CD0000       E    4430         CALL    DLYR
292D CD0000       E    4431         CALL    BEEP
2930 0E32              4432         MVI     C,50
2932 CD0000       E    4433         CALL    DLYR
2935 CD0000       E    4434         CALL    BEEP
2938 0E32              4435         MVI     C,50
293A CD0000       E    4436         CALL    DLYR
293D CD0000       E    4437         CALL    BEEP
2940 C1                4438         POP     B
2941 E1                4439         POP     H
2942 C9                4440         RET
                       4441 ;
                       4442 ;
2943 CD321A       C    4443 DELETZ: CALL    CLRSPD
2946 2A2900       D    4444         LHLD    KEYPTR
2949 112900       D    4445         LXI     D,KEYPTR
294C 12                4446         STAX    D
294D B7                4447         ORA     A
294E CA5D29       C    4448         JZ      DELEZZ
2951 2B                4449         DCX     H
2952 CDD211       C    4450         CALL    DBSET
2955 36FF              4451         MVI     M,0FFH
2957 222900       D    4452         SHLD    KEYPTR
295A CD8A29       C    4453         CALL    DSPLYR
295D C35812       C    4454 DELEZZ: JMP     STRET
                       4455 ;
                       4456 ;
                       4457 ;
                       4458 ;
                       4459 ;         PRINT LOCK ROUTINE-SETS PRLOCK BITS ACCORDING TO
                       4460 ;                             KYSTR ENTRIES
                       4461 ;
                       4462 ;                    PRLOCK FLAG FORMAT:  ?000 XXXX
                       4463 ;                             ?- IF 1-SUPPRESS $ AND CENTS
                       4464 ;                                   0-DONT SUPPRESS
                       4465 ;                             XXXX-# OF COPIES TO MAKE NOT EXCEEDING NINE
                       4466 ;
                       4467 ;                    SEQUENCES-  PRLOCK,ENTER
                       4468 ;                                PRLOCK,X,ENTER
                       4469 ;                                PRLOCK,0, . ,ENTER
                       4470 ;                                PRLOCK,0, . ,X,ENTER
                       4471 ;
2960 7E                4472 PLOCKR: MOV     A,M     ;FETCH KYSTR
2961 FEFF              4473         CPI     0FFH    ;IS IT ENTER(FF)
2963 CA7629       C    4474         JZ      PLOC2   ;IF SO, JUMP
2966 CD0D1A       C    4475         CALL    DIGITR
2969 DA7B29       C    4476         JC      PLOC3   ;IF A DIGIT, JUMP
296C CD1829       C    4477 PLOC1:  CALL    ERDIS
296F AF                4478         XRA     A       ;USED TO ZERO PRLOCK FLAG
2970 323600       D    4479         STA     PRLOCK
2973 C3541D       C    4480         JMP     PRGM7
2976 3E01              4481 PLOC2:  MVI     A,01H   ;1000 0001
2978 C38429       C    4482         JMP     PLOCC
297B 47                4483 PLOC3:  MOV     B,A     ;TEMP STORE FOR DIGIT INFO
297C 23                4484         INX     H       ;NEXT KYSTR
297D 7E                4485         MOV     A,M     ;FETCH IT
297E FEFF              4486         CPI     0FFH    ;ENTER?
2980 C26C29       C    4487         JNZ     PLOC1   ;IF NOT JUMP
2983 78                4488         MOV     A,B
2984 323600       D    4489 PLOCC:  STA     PRLOCK  ;AND SET FLAG APPROPRIATELY
2987 C3541D       C    4490         JMP     PRGM7
                       4491 ;
                       4492 ;
                       4493 ;         DISPLYR ROUTINE-   H,L REGS HOLD KEYPTR WHICH POINTS TO NEXT
                       4494 ;                            BLANK KYSTR LOCATION
                       4495 ;                            KCOUNT+1 HOLDS # OF ENTRIES
                       4496 ;
                       4497 ;                    KEY SEQUENCES OFF OF ENTERR:
                       4498 ;                       CUST,XXX,ENTER       PRLOCK,0(OR 1).X,ENTER
                       4499 ;                       CUST,XXX.XX,ENTER    SELEC,X,ENTER
                       4500 ;                       PJOURN,ENTER         ENTPR,X,ENTER
                       4501 ;                                            PROGDT,ENTER
                       4502 ;                                            XXXX,ENTER
                       4503 ;                       PRLOCK,ENTER
                       4504 ;                       PRLOCK,X,ENTER
                       4505 ;
298A 3A2800       D    4506 DSPLYR: LDA     KEYCNT  ;# OF ENTRIES-1
298D B7                4507         ORA     A       ;ANY ENTRIES?
298E CAC629       C    4508         JZ      DSPLY2  ;IF NOT, JUMP
2991 57                4509         MOV     D,A     ;TEMP STORE IN D
2992 3A3500       D    4510         LDA     WAITFL  ;
2995 B7                4511         ORA     A       ;IS IT SET?
2996 C2DA29       C    4512         JNZ     DSPLY4  ;IF SO JUMP
2999 2B                4513         DCX     H       ;DECREMENT KEYPTR
299A 7E                4514         MOV     A,M     ;FETCH IT
299B CD0D1A       C    4515         CALL    DIGITR  ;IS IT A DIGIT?
299E D21C2A       C    4516         JNC     DSPLY8  ;IF NOT, JUMP
29A1 1601              4517         MVI     D,01H   ;COUNTER OF DIGITS
29A3 0602              4518         MVI     B,02H   ;3 DIGITS MAXIMUM
29A5 2B                4519 DSPLY1: DCX     H       ;DECREMENT KEY POINTER
29A6 7E                4520         MOV     A,M     ;FETCH KYSTR
29A7 CD0D1A       C    4521         CALL    DIGITR
29AA D25D2A       C    4522         JNC     DSPL14  ;IF NOT A DIGIT, JUMP
29AD 14                4523         INR     D       ;INCREMENT DIGIT COUNTER
```

```
LOC  OBJ              SOURCE STATEMENT

29AE 05                        DCR    B        ;MAX. ?
29AF C2A529    C               JNZ    DSPLY1   ;REDO LOOP IF NOT ZERO
29B2 2B                        DCX    H        ;NEXT LOWER KYSTR
29B3 7E                        MOV    A,M      ;FETCH IT
29B4 CD0D1A    C               CALL   DIGITR
29B7 D25D2A    C               JNC    DSPL14   ;IF NOT A DIGIT, JUMP
29BA 14                        INR    D        ;INCREMENT DIGIT COUNTER
29BB 2B                        DCX    H        ;NEXT LOWER KYSTR
29BC 7E                        MOV    A,M      ;FETCH IT
29BD CD0D1A    C               CALL   DIGITR   ;DIGIT?
29C0 DA482A    C               JC     DSPL11   ;IF SO, JUMP
29C3 C3482A    C               JMP    DSPL11
29C6 2B               DSPLY2:  DCX    H        ;NEXT LOWER KYSTR
29C7 7E                        MOV    A,M      ;FETCH IT
29C8 CD0D1A    C               CALL   DIGITR
29CB D2672A    C               JNC    DSPLYA   ;IF NOT A DIGIT, JUMP
29CE 4F                        MOV    C,A      ;STORE DIGIT INFO IN C
29CF 0600                      MVI    B,00H    ;SET UP FOR WDUPR
29D1 CDEA17    C               CALL   WDUPR
29D4 3EFF                      MVI    A,0FFH
29D6 323500    D      DSPLY3:  STA    WAITFL
29D9 C9                        RET
29DA 2B               DSPLY4:  DCX    H        ;NEXT LOWER KYSTR
29DB 7E                        MOV    A,M      ;FETCH IT
29DC CD0D1A    C               CALL   DIGITR
29DF D2672A    C               JNC    DSPLYA   ;IF NOT A DIGIT, JUMP
29E2 1601                      MVI    D,01H    ;DIGIT COUNTER
29E4 0603                      MVI    B,03H    ;MAX # OF DIGITS IS 4
29E6 2B               DSPLY5:  DCX    H        ;NEXT LOWER KYSTR
29E7 7E                        MOV    A,M      ;FETCH IT
29E8 CD0D1A    C               CALL   DIGITR
29EB D2FB29    C               JNC    DSPLY6   ;IF NOT A DIGIT, JUMP
29EE 14                        INR    D        ;INCREMENT DIGIT COUNTER
29EF 05                        DCR    B        ;DECREMENT MAX DIGITS
29F0 C2E629    C               JNZ    DSPLY5   ;REDO LOOP IF NOT ZERO
29F3 2B                        DCX    H        ;NEXT LOWER KYSTR
29F4 7E                        MOV    A,M      ;FETCH IT
29F5 CD0D1A    C               CALL   DIGITR
29F8 DA482A    C               JC     DSPL11   ;IF IT'S A DIGIT, JUMP
29FB 2A2900    D      DSPLY6:  LHLD   KEYPTR
29FE D5                        PUSH   D
29FF CDAD1E    C               CALL   BLOADR
2A02 CDEA17    C               CALL   WDUPR
2A05 D1                        POP    D
2A06 3A3500    D               LDA    WAITFL   ;WAITFL
2A09 FE31                      CPI    DOT      ;IS IT DOT?
2A0B C0                        RNZ
2A0C 21B101    D               LXI    H,DIM24-1     ;WT DISP. LS DIG - 1
2A0F 14                        INR    D        ;# OF DIGITS + 1
2A10 3E80                      MVI    A,80H    ;TO DISP. DP
2A12 23               DSPLY7:  INX    H        ;NEXT KYSTR
2A13 15                        DCR    D
2A14 C2122A    C               JNZ    DSPLY7   ;IF NOT ZERO REDO LOOP
2A17 77                        MOV    M,A      ;DP SET IN # DIG + 1 MEMORY LOC.
2A18 CDB328    C               CALL   DISUPR
2A1B C9                        RET
2A1C 010000    D      DSPLY8:  LXI    B,KYSTR
2A1F 0A                        LDAX   B        ;FETCH KYSTR
2A20 03                        INX    B        ;NEXT KYSTR
2A21 FE60                      CPI    CUST
2A23 C23E2A    C               JNZ    DSPL10   ;IF NOT CUST, JUMP
2A26 7E                        MOV    A,M      ;CUST ROUTE
2A27 FE31                      CPI    DOT      ;NEXT KYSTR DOT?
2A29 C2482A    C               JNZ    DSPL11   ;IF NOT DOT, JUMP
2A2C 323500    D      DSPLY9:  STA    WAITFL   ;WAIT FLAG
2A2F 010000                    LXI    B,0000H
2A32 CDEA17    C               CALL   WDUPR    ;DISPLAY ZEROES
2A35 3E80                      MVI    A,80H    ;DP BIT
2A37 32B201    D               STA    DIM24    ;STORE DP IN MEMORY
2A3A CDB328    C               CALL   DISUPR
2A3D C9                        RET
2A3E FE42             DSPL10:  CPI    PLOCK
2A40 C2482A    C               JNZ    DSPL11   ;IF NOT PRLOCK, JUMP
2A43 3E31                      MVI    A,DOT
2A45 C32C2A    C               JMP    DSPLY9   ;TO STORE DOT IN WAITFL AND ETC.
2A48 3A1B02    D      DSPL11:  LDA    DELETF
2A4B FE11                      CPI    DELET
2A4D C8                        RZ
2A4E CD1829    C               CALL   ERDIS    ;ERROR DISPLAY
2A51 CD6311    C               CALL   CLKEYS
2A54 C9                        RET
2A55 FE53             DSPL13:  CPI    PROGRM
2A57 CA672A    C               JZ     DSPLYA   ;IF PROGRAM, JUMP
2A5A C3482A    C               JMP    DSPL11
2A5D 2A2900    D      DSPL14:  LHLD   KEYPTR
2A60 CDAD1E    C               CALL   BLOADR
2A63 CDD528    C               CALL   SDUPR    ;SCRATCH PAD DISPLAY UPDATE
2A66 C9                        RET
2A67 CDC519    C      DSPLYA:  CALL   KEYDIS
2A6A AF                        XRA    A
2A6B C3D629    C               JMP    DSPLY3   ;JUMP TO ZERO OUT WAIT FLAG AND RETURN
                      ;
                      ;
                      ;        PRINT ROUTINE-H,L REGS HOLD KYSTR+1 UPON ENTRY
                      ;
2A6E CDC519    C      PRNTR:   CALL   KEYDIS
2A71 110404                    LXI    D,0404H
2A74 CDAA20    C               CALL   DIGINR
2A77 FE60                      CPI    CUST
2A79 CA062B    C               JZ     PRNB
2A7C FE65                      CPI    ENTER
2A7E CAAF2A    C               JZ     PRN4
2A81 FE52                      CPI    PROGDT
```

```
LOC  OBJ          LINE          SOURCE STATEMENT

2A83 CAA02A    C  4627          JZ    PRN41
2A86 FE11         4628          CPI   DELET
2A88 CA541D    C  4629          JZ    PRGM7
2A8B 4F           4630          MOV   C,A
2A8C CD471A    C  4631          CALL  CMDCHK
2A8F DAA22B    C  4632          JC    COMODR
2A92 CD8811    C  4633 PRNC:    CALL  ERDASH
2A95 010000       4634          LXI   B,0
2A98 CDEA17    C  4635          CALL  WDUPR
2A9B 3E64         4636          MVI   A,PRINT
2A9D C36E2A    C  4637          JMP   PRNTR
2AA0 CDDF1C    C  4638 PRN41:   CALL  ENTKFY
2AA3 D2541D    C  4639          JNC   PRGM7
2AA6 CDCB2C    C  4640          CALL  PRDTR
2AA9 CD4F15    C  4641          CALL  STFRMF
2AAC C3541D    C  4642          JMP   PRGM7
2AAF 69           4643 PRN4:    MOV   L,C
2AB0 60           4644          MOV   H,B
2AB1 7A           4645          MOV   A,D
2AB2 FE04         4646          CPI   4
2AB4 CA922A    C  4647          JZ    PRNC
2AB7 1604         4648          MVI   D,4
2AB9 B7           4649          ORA   A
2ABA CAC22A    C  4650          JZ    PRN5
2ABD 15           4651 PRN40:   DCR   D
2ABE 3D           4652          DCR   A
2ABF C2BD2A    C  4653          JNZ   PRN40
2AC2 23           4654 PRN5:    INX   H
2AC3 CDAD1E    C  4655          CALL  BLOADR
2AC6 CD0000    E  4656          CALL  TRFIND
2AC9 D2E72A    C  4657          JNC   PRND
2ACC CDD22A    C  4658 PRNE:    CALL  PRNDV
2ACF C3541D    C  4659          JMP   PRGM7
2AD2 CD1F12    C  4660 PRNDV:   CALL  AUTOFF
2AD5 F5           4661          PUSH  PSW
2AD6 3EFF         4662          MVI   A,0FFH
2AD8 329F01    D  4663          STA   FRESFL
2ADB F1           4664          POP   PSW
2ADC CD0000    E  4665          CALL  PTIKT
2ADF AF           4666          XRA   A
2AE0 329F01    D  4667          STA   FRESFL
2AE3 CD4F15    C  4668          CALL  STFRMF
2AE6 C9           4669          RET
2AE7 11DA02    C  4670 FRND:    LXI   D,MTDNE
2AEA CD0000    E  4671          CALL  PMASG
2AED CD4F15    C  4672          CALL  STFRMF
2AF0 C3541D    C  4673          JMP   PRGM7
2AF3 3ABA01    D  4674 FRNB01:  LDA   TKSTR
2AF6 FE65         4675          CPI   ENTER
2AF8 CA9816    C  4676          JZ    CUSLST
2AFB CD8811    C  4677          CALL  ERDASH
2AFE 11680A    C  4678          LXI   D,DMSG24        ;INCLUDES FORM FEED
2B01 CD0000    E  4679          CALL  PMASG
2B04 3E60         4680          MVI   A,CUST
2B06 CDC519    C  4681 FRNB:    CALL  KEYDIS
2B09 118503       4682          LXI   D,0385H
2B0C CDAA20    C  4683          CALL  DIGINR
2B0F D2541D    C  4684          JNC   PRGM7
2B12 32BA01    D  4685          STA   TKSTR
2B15 7B           4686          MOV   A,E
2B16 E60F         4687          ANI   0FH
2B18 FE05         4688          CPI   5
2B1A CAF32A    C  4689          JZ    PRNB01
2B1D 69           4690          MOV   L,C
2B1E 60           4691          MOV   H,B
2B1F E5           4692          PUSH  H
2B20 7B           4693          MOV   A,E
2B21 E680         4694          ANI   80H
2B23 7B           4695          MOV   A,E
2B24 CA682B    C  4696          JZ    FRNB10
2B27 23           4697          INX   H
2B28 3E03         4698 PRNB11:  MVI   A,3
2B2A 92           4699          SUB   D
2B2B D5           4700          PUSH  D
2B2C 57           4701          MOV   D,A             ;#OF DIGITS TO FETCH FOR BLOADR
2B2D CDAD1E    C  4702 PRNB1:   CALL  BLOADR
2B30 D1           4703          POP   D               ;RE-FETCH DIGIT FORMAT
2B31 E1           4704          POP   H
2B32 7B           4705          MOV   A,E
2B33 E680         4706          ANI   80H
2B35 C24F2B    C  4707          JNZ   PRN9
2B38 3E02         4708          MVI   A,02
2B3A 82           4709          ADD   D
2B3B 93           4710          SUB   E
2B3C 57           4711          MOV   D,A
2B3D C5           4712          PUSH  B
2B3E 23           4713          INX   H
2B3F CDAD1E    C  4714 FRNB5:   CALL  BLOADR  ;PUT INTO BCD
2B42 79           4715          MOV   A,C     ;1-2 BCD DIGIT TO ACC.
2B43 C1           4716          POP   B       ;RESTORE BCD
2B44 1600         4717          MVI   D,0
2B46 CD0000    E  4718          CALL  CUFIND
2B49 D2E72A    C  4719          JNC   FRND    ;NOT FOUND SO JUMP
2B4C C3CC2A    C  4720          JMP   PRNE    ;FOUND SO JUMP TO PRINT
2B4F 210084       4721 FRN9:    LXI   H,CRAM  ;CUSTOMER RAM
2B52 C5           4722          PUSH  B       ;SAVE BCD CUST#
2B53 CD3219    C  4723          CALL  B2BI16
2B56 0B           4724          DCX   B       ;DECRMENT BECAUSE OF BYTE 0
2B57 09           4725          DAD   B       ;OFFSET TO CUST RAM 1ST BYTE
2B58 C1           4726          POP   B       ;RESTORE BCD CUST #
2B59 7E           4727          MOV   A,M     ;FETCH CRAM
2B5A B7           4728          ORA   A       ;IS IT ZERO?
2B5B CA732B    C  4729          JZ    PRNB8   ;IF SO-NOTHING IN CRAM
2B5E AF           4730          XRA   A
```

```
LOC  OBJ         LINE        SOURCE STATEMENT

2B5F 3C          4731 FRNB6:  INR    A
2B60 F5          4732         PUSH   PSW      ;SAVE CUST NTH COUNTER
2B61 1680        4733         MVI    D,80H
2B63 CD0000   E  4734         CALL   CUFIND
2B66 D2702B   C  4735         JNC    FRNB9    ;IF FOUND JUMP TO PRINT TICKET
2B69 CDD22A   C  4736         CALL   PRNDV    ;PRINT OUT TICKET
2B6C F1          4737         POP    PSW
2B6D C35F2B   C  4738         JMP    PRNB6    ;AND LOOK AGAIN
2B70 F1          4739 FRNB9:  POF    FSW
2B71 AF          4740         XRA    A
2B72 5F          4741         MOV    E,A
2B73 1C          4742 FRNB8:  INR    E
2B74 D5          4743         PUSH   D        ;TEMP STORE FOR NTH COUNT
2B75 16FF        4744         MVI    D,0FFH
2B77 CD0000   E  4745         CALL   SSFIND   ;A HOLDS WHICH OCCURANCE IN SHARE AND
                 4746                          ;SERVICE IN WHICH WE WANT TO FIND CUST#
2B7A D2842B   C  4747         JNC    PRNB9A
2B7D CDD22A   C  4748         CALL   PRNDV    ;PRINT TICKET ROUTINE
2B80 D1          4749         POP    D
2B81 C3732B   C  4750         JMF    FRNB8    ;REDO LOOF UNTIL NO CARRY IS RET FROM SSFIND
2B84 D1          4751 PRNB9A: POP    D
2B85 C3541D   C  4752         JMP    PRGM7
2B88 92          4753 FRNB10: SUB    D
2B89 C2282B   C  4754         JNZ    PRNB11
2B8C 2B          4755         DCX    H
2B8D C3282B   C  4756         JMP    PRNB11
2B90 CD7E11   C  4757 GKEY:   CALL   KEYDWN
2B93 B7          4758         ORA    A
2B94 FE11        4759         CPI    DELET
2B96 CA9E2B   C  4760         JZ     GKEY1
2B99 CDC519   C  4761         CALL   KEYDIS
2B9C 37          4762         STC
2B9D C9          4763 GKEY2:  RET
2B9E CD321A   C  4764 GKEY1:  CALL   CLRSPD
2BA1 C9          4765         RET
                 4766 ;
                 4767 ;
                 4768 ;
                 4769 ;        COMMODITY ROUTINE-   THE A REG. HOLDS COMMODITY#
                 4770 ;
2BA2 F5          4771 COMODR: PUSH   PSW              ;COMOD#
2BA3 CD7E11   C  4772 CMD1:   CALL   KEYDWN           ;LOOP UNTIL KEYIN IS SENSED
2BA6 FE65        4773         CFI    ENTER
2BA8 C2A02C   C  4774         JNZ    CMD7             ;IF NOT ENTER, JUMP TO SEE IF DELETE
2BAB F1          4775         POP    PSW              ;RESTORE STACK
2BAC 4F          4776         MOV    C,A              ;PASS COMMODITY NO. IN REG. C
2BAD CDB32B   C  4777         CALL   FINTAK           ;FRINT THE TOTAL IN TAKE
2BB0 C3541D   C  4778         JMP    PRGM7
                 4779 ;
                 4780 ;
2BB3 C5          4781 FINTAK: PUSH   B
2BB4 D5          4782         PUSH   D
2BB5 E5          4783         PUSH   H
2BB6 F5          4784         PUSH   PSW
2BB7 79          4785         MOV    A,C              ;LOAD COMMODITY NO.
2BB8 327001   D  4786         STA    SCOMN            ;STORE IT IN SCOMN
2BBB CD1F12   C  4787         CALL   AUTOFF           ;GIVE FORM FEED
2BBE CD0000   E  4788         CALL   HEADG            ;FRINT THE ELEVATOR NAME AND ADRRESS
2BC1 3E02        4789         MVI    A,02
2BC3 CD0000   E  4790         CALL   ACRR
2BC6 110000   E  4791         LXI    D,MFOSR7         ;FRINT 'TYPE & CLASS OF GRAIN'
2BC9 CD0000   E  4792         CALL   PMASG
2BCC 3A7001   D  4793         LDA    SCOMN
2BCF 4F          4794         MOV    C,A
2BD0 CD0000   E  4795         CALL   FCMNAM           ;FRINT THE COMMODITY NAME
2BD3 117306   C  4796         LXI    D,MCMD1          ;PRINT 'INTAKE FOR'
2BD6 CD0000   E  4797         CALL   PMASG
2BD9 118A06   C  4798         LXI    D,MCMD2          ;PRINT THE HEADING
2BDC CD0000   E  4799         CALL   PMASG
2BDF 11FC05   C  4800         LXI    D,DMSG1          ;PRINT 'FOR SALE
2BE2 CD0000   E  4801         CALL   PMASG
2BE5 1100FC      4802         LXI    D,NETCMB         ;FRINT THE WEIGHT
2BE8 CD762C   C  4803         CALL   INTAK1           ;ROUTINE AUTOMATICALLY ADJUSTS THE POINTER
                 4804                                  ;CONVERTS NO. TO BCD AND PRINTS
2BEB 112702   D  4805         LXI    D,GRSCMB         ;PRINT GROSS BUSHELS IN TAKE
2BEE CD8A2C   C  4806         CALL   INTAK2           ;ROUTINE AUTOMATICALLY ADJUSTS THE POINTER
2BF1 11D205   C  4807         LXI    D,DMSG2          ;PRINT 'FOR STORAGE'
2BF4 CD0000   E  4808         CALL   PMASG
2BF7 1124FC      4809         LXI    D,NETCMS         ;FRINT NET STORAGE IN TAKE
2BFA CD762C   C  4810         CALL   INTAK1
2BFD 114B02   D  4811         LXI    D,GRSCMS         ;PRINT GROSS WEIGHT FOR STORAGE IN TAKE
2C00 CD8A2C   C  4812         CALL   INTAK2
2C03 11E805   C  4813         LXI    D,DMSG3          ;FRINT 'ON CONTRACT'
2C06 CD0000   E  4814         CALL   PMASG
2C09 1148FC      4815         LXI    D,NETCMC         ;PRINT NET CONTRACT IN TAKE
2C0C CD762C   C  4816         CALL   INTAK1
2C0F 116F02   D  4817         LXI    D,GRSCMC         ;PRINT GROSS CONTRACT IN TAKE
2C12 CD8A2C   C  4818         CALL   INTAK2
2C15 11FE05   C  4819         LXI    D,DMSG4          ;PRINT 'FOR DELAY PRICE'
2C18 CD0000   E  4820         CALL   FMASG
2C1B 116CFC      4821         LXI    D,NETCMD         ;PRINT NET DELAY PRICE IN TAKE
2C1E CD762C   C  4822         CALL   INTAK1
2C21 119302   D  4823         LXI    D,GRSCMD         ;FRINT GROSS DELAY FRICE IN TAKE
2C24 CD8A2C   C  4824         CALL   INTAK2
2C27 111406   C  4825         LXI    D,DMSG5          ;PRINT 'SHIPPED TODAY'
2C2A CD0000   E  4826         CALL   PMASG
2C2D 1190FC      4827         LXI    D,NETCMT         ;FRINT NET SHIFFED OUT
2C30 CD762C   C  4828         CALL   INTAK1
2C33 11B702   D  4829         LXI    D,GRSCMT         ;PRINT GROSS SHIPPED OUT
2C36 CD8A2C   C  4830         CALL   INTAK2
2C39 114006   C  4831         LXI    D,DMSG7          ;PRINT 'MOISTURE REVENUE $'
2C3C CD0000   E  4832         CALL   PMASG
2C3F 11D8FC      4833         LXI    D,NETMST         ;PRINT NET MOISTURE IN TAKE
```

```
LOC  OBJ                SOURCE STATEMENT

2C42 CD762C    C              CALL    INTAK1
2C45 115606    C              LXI     D,DMSG8         ;PRINT 'AVG. MOISTURE IN'
2C48 CD0000    E              CALL    PMASG
2C4B 3A7001    D              LDA     SCOMN           ;LOAD THE COMMODITY NO.
2C4E CD0000    E              CALL    MSTAVG          ;CALCULATE THE MOISTURE AVERAGE
2C51 114C01    D              LXI     D,NFTAVG
2C54 CD0000    E              CALL    SETPTA          ;PRINT THE RESULT
2C57 3E01                     MVI     A,1
2C59 CD5111    C              CALL    SPACE
2C5C 0E25                     MVI     C,'%'
2C5E CD0000    E              CALL    PCHAR
2C61 3E03                     MVI     A,3             ;LEAVE 2 SPACE
2C63 CD0000    E              CALL    ACRR
2C66 3E12                     MVI     A,18
2C68 CD5111    C              CALL    SPACE
2C6B 3E1E                     MVI     A,30
2C6D CD5D11    C              CALL    DDOT
2C70 CD6013    C              CALL    MFORM
2C73 C35812    C              JMP     STRET           ;RETURN FROM ROUTINE
                   ;
                   ;
2C76 C5                INTAK1: PUSH   B
2C77 D5                       PUSH    D
2C78 E5                       PUSH    H
2C79 F5                       PUSH    PSW
2C7A 3E05                     MVI     A,05            ;LEAVE 5 SPACE
2C7C CD5111    C              CALL    SPACE
2C7F CD0000    E              CALL    SETPT
2C82 3E0F                     MVI     A,15
2C84 CD5111    C              CALL    SPACE
2C87 C35812    C              JMP     STRET
                   ;
2C8A C5                INTAK2: PUSH   B
2C8B D5                       PUSH    D
2C8C E5                       PUSH    H
2C8D F5                       PUSH    PSW
2C8E CD0000    E              CALL    SETPT
2C91 3E02                     MVI     A,2
2C93 CD0000    E              CALL    ACRR
2C96 C35812    C              JMP     STRET
                   ;
                   ;
2C99 C5                GPRSLT: PUSH   B               ;GO TO PRINT RESULT PROGRAM IN GRNPR
2C9A D5                       PUSH    D
2C9B E5                       PUSH    H
2C9C F5                       PUSH    PSW
2C9D C30000    E              JMP     PRSLTA
                   ;
2CA0 FE53              CMD7:  CPI     PROGRM
2CA2 CABA2C    C              JZ      CMD12
2CA5 FE11              CMD2:  CPI     DELET
2CA7 C2B62C    C              JNZ     CMD11
2CAA C3B22C    C              JMP     CMD100
2CAD 0E0C              CMD10: MVI     C,AFF
2CAF CD0000    E              CALL    PCHAR
2CB2 F1                CMD100: POP    PSW
2CB3 C3541D    C              JMP     PRGM7
2CB6 F1                CMD11: POP     PSW
2CB7 C30512    C              JMP     INVALR
2CBA CDC519    C       CMD12: CALL    KEYDIS
2CBD CDDF1C    C              CALL    ENTKEY
2CC0 D2B22C    C              JNC     CMD100
2CC3 F1                       POP     PSW
2CC4 4F                       MOV     C,A
2CC5 CD4E2D    C              CALL    PPROG1
2CC8 C3541D    C              JMP     PRGM7
                   ;
                   ;
                   ;          PRINT DATE AND TIME ROUTINE
                   ;
2CCB C5                PRDTR: PUSH    B
2CCC D5                       PUSH    D
2CCD E5                       PUSH    H
2CCE F5                       PUSH    PSW
2CCF 3E15                     MVI     A,21
2CD1 CD5111    C              CALL    SPACE   ;20 SPACES FOR CENTERING
2CD4 214400    D              LXI     H,HOUR
2CD7 010000    D              LXI     B,KYSTR
2CDA 1602                     MVI     D,02H
2CDC 7A                PRDT1: MOV     A,D
2CDD FE01                     CPI     01H
2CDF CC392D    C              CZ      PRCOLN
2CE2 7E                       MOV     A,M     ;
2CE3 E6F0                     ANI     0F0H    ;
2CE5 07                       RLC
2CE6 07                       RLC
2CE7 07                       RLC
2CE8 07                       RLC             ;
2CE9 F630                     ORI     30H     ;
2CEB 02                       STAX    B       ;
2CEC 03                       INX     B       ;NEXT KYSTR
2CED 7E                       MOV     A,M     ;FETCH HOUR (OR ETC.)
2CEE E60F                     ANI     0FH
2CF0 F630                     ORI     30H     ;
2CF2 02                       STAX    B       ;STORE IN KYSTR
2CF3 03                       INX     B       ;NEXT KYSTR
2CF4 23                       INX     H
2CF5 15                       DCR     D
2CF6 C2DC2C    C              JNZ     PRDT1
2CF9 E5                       PUSH    H
2CFA 211B03    C              LXI     H,MHRDAT
2CFD 160C                     MVI     D,12
2CFF 7E                PRDT2: MOV     A,M
2D00 02                       STAX    B       ;
```

```
LOC  OBJ           LINE        SOURCE STATEMENT

2D01 03             4938         INX     B         ;
2D02 23             4939         INX     H         ;
2D03 15             4940         DCR     D         ;
2D04 C2FF2C     C   4941         JNZ     PRDT2
2D07 E1             4942         POP     H         ;
2D08 214100     D   4943         LXI     H,DAY
2D0B 1603           4944         MVI     D,03H     ;
2D0D 7E             4945 PRDT3:  MOV     A,M       ;
2D0E E6F0           4946         ANI     0F0H      ;
2D10 07             4947         RLC               ;
2D11 07             4948         RLC
2D12 07             4949         RLC
2D13 07             4950         RLC
2D14 F630           4951         ORI     30H       ;
2D16 02             4952         STAX    B         ;
2D17 03             4953         INX     B         ;
2D18 7E             4954         MOV     A,M       ;
2D19 E60F           4955         ANI     0FH       ;
2D1B F630           4956         ORI     30H       ;
2D1D 02             4957         STAX    B         ;
2D1E 03             4958         INX     B
2D1F 3E2F           4959         MVI     A,RSLASH        ;RIGHT SLASH IN ASCII
2D21 02             4960         STAX    B         ;
2D22 03             4961         INX     B         ;
2D23 23             4962         INX     H         ;
2D24 15             4963         DCR     D         ;
2D25 C20D2D     C   4964         JNZ     PRDT3     ;
2D28 0B             4965         DCX     B         ;
2D29 3E0D           4966         MVI     A,ACR
2D2B 02             4967         STAX    B
2D2C 03             4968         INX     B
2D2D 3E03           4969         MVI     A,AETX
2D2F 02             4970         STAX    B         ;STORE IN KYSTR
2D30 110000     D   4971         LXI     D,KYSTR ;
2D33 CD0000     E   4972         CALL    PMASG     ;PRINT MESSAGE ROUTINE
2D36 C35812     C   4973         JMP     STRET
                    4974 ;
2D39 3E3A           4975 PRCOLN: MVI     A,COLON
2D3B 02             4976         STAX    B
2D3C 03             4977         INX     B
2D3D C9             4978         RET
                    4979 ;
                    4980 ;
                    4981 ;        PRINT PROGRAM ROUTINE-PRINTS OUT ENTIRE PROGRAM
                    4982 ;
2D3E 11DA04     C   4983 PRPRGR: LXI     D,MPRPR
2D41 CD0000     E   4984         CALL    PMASG
2D44 CDCB2C     C   4985         CALL    PRDTR
2D47 110205     C   4986         LXI     D,MEOP
2D4A CD0000     E   4987         CALL    PMASG
2D4D C9             4988         RET
                    4989 ;
                    4990 ;        PRINT PROGRAM 1- C HOLDS COMOD #
                    4991 ;
2D4E C5             4992 PPROG1: PUSH    B
2D4F D5             4993         PUSH    D
2D50 E5             4994         PUSH    H
2D51 F5             4995         PUSH    PSW
2D52 CD1F12     C   4996         CALL    AUTOFF
2D55 CD701D     C   4997         CALL    CMDADF
2D58 E5             4998         PUSH    H
2D59 112703     C   4999         LXI     D,MCPRG
2D5C CD0000     E   5000         CALL    PMASG
2D5F CD0000     E   5001         CALL    PCMNAM
2D62 218B00     C   5002         LXI     H,CMSTAT
2D65 0600           5003         MVI     B,00H
2D67 0D             5004         DCR     C
2D68 09             5005         DAD     B
2D69 7E             5006         MOV     A,M
2D6A E60F           5007         ANI     0FH
2D6C 323100     D   5008         STA     TRPSTR
2D6F 0E02           5009         MVI     C,02
2D71 CD0220     C   5010         CALL    CRGEN
2D74 E1             5011         POP     H
2D75 114103     C   5012         LXI     D,MPRIC
2D78 CD572E     C   5013         CALL    LOADA
2D7B 115D03     C   5014         LXI     D,MSELF
2D7E CD572E     C   5015         CALL    LOADA
2D81 117A03     C   5016         LXI     D,MDKGPR
2D84 CD0000     E   5017         CALL    PMASG
2D87 3A1C02     D   5018         LDA     CONSA
2D8A B7             5019         ORA     A
2D8B C2932D     C   5020         JNZ     PPROG2
2D8E 23             5021         INX     H
2D8F 23             5022         INX     H
2D90 C39F2D     C   5023         JMP     PPROG3
2D93 11CC03     C   5024 PPROG2: LXI     D,MMOIST
2D96 CD4A2E     C   5025         CALL    LOADB
2D99 CD3D2E     C   5026         CALL    PPROG6
2D9C CD0000     E   5027         CALL    PMASG
2D9F 11FF03     C   5028 PPROG3: LXI     D,MFM
2DA2 CD4A2E     C   5029         CALL    LOADB
2DA5 CD3D2E     C   5030         CALL    PPROG6
2DA8 CD0000     E   5031         CALL    PMASG
2DAB 111B04     C   5032         LXI     D,MDAMG
2DAE CD4A2E     C   5033         CALL    LOADB
2DB1 CD3D2E     C   5034         CALL    PPROG6
2DB4 CD0000     E   5035         CALL    PMASG
2DB7 113704     C   5036         LXI     D,MTW
2DBA CD4A2E     C   5037         CALL    LOADB
2DBD 11C204     C   5038         LXI     D,MDLBS
2DC0 3A3100     D   5039         LDA     TRPSTR
2DC3 FE0B           5040         CPI     0BH
```

```
LOC  OBJ                SOURCE STATEMENT

2DC5 CACB2D   C                  JZ      PPROG7
2DC8 110000   E                  LXI     D,MSGA4          ;PRINT 'LB/CWT.'
2DCB CD0000   E         PPROG7:  CALL    PMASG
2DCE 3A1C02   D                  LDA     CONSA
2DD1 B7                          ORA     A
2DD2 CADC2D   C                  JZ      PPROG4
2DD5 23                          INX     H
2DD6 23                          INX     H
2DD7 23                          INX     H
2DD8 23                          INX     H
2DD9 C3F42D   C                  JMP     PPROG5
2DDC 119403   C         PPROG4:  LXI     D,MMOISA
2DDF CD4A2E   C                  CALL    LOADB
2DE2 CD3D2E   C                  CALL    PPROG6
2DE5 CD0000   E                  CALL    PMASG
2DE8 11B003   C                  LXI     D,MMOISB
2DEB CD4A2E   C                  CALL    LOADB
2DEE CD3D2E   C                  CALL    PPROG6
2DF1 CD0000   E                  CALL    PMASG
2DF4 11E803   C         PPROG5:  LXI     D,MSHFAC
2DF7 CD572E   C                  CALL    LOADA
2DFA 118A10   C                  LXI     D,DMSGC
2DFD 3A3100   D                  LDA     TRPSTR
2E00 FE0B                        CPI     0BH
2E02 CA082E   C                  JZ      PPROG8
2E05 119D10   C                  LXI     D,DMSGD
2E08 CD0000   E         PPROG8:  CALL    PMASG
2E0B 11A704   C                  LXI     D,MDOCK          ;PRINT 'DOCKAGE POINT:'
2E0E CD0000   E                  CALL    PMASG
2E11 115904   C                  LXI     D,MMINTW
2E14 CD572E   C                  CALL    LOADA
2E17 115304   C                  LXI     D,MLBS
2E1A CD0000   E                  CALL    PMASG
2E1D 117304   C                  LXI     D,MMINFM         ;PRINT 'FOREIGN MATERIAL:'
2E20 CD572E   C                  CALL    LOADA
2E23 11BA04   C                  LXI     D,MMINF1         ;PRINT '%'
2E26 CD0000   E                  CALL    PMASG
2E29 118D04   C                  LXI     D,MMNDMG         ;PRINT 'DAMAGE'
2E2C CD572E   C                  CALL    LOADA
2E2F 11BA04   C                  LXI     D,MMINF1
2E32 CD0000   E                  CALL    PMASG
2E35 0E0C                        MVI     C,AFF
2E37 CD0000   E                  CALL    FCHAR
2E3A C35812   C                  JMP     STRET
                        ;
2E3D 118110   C         PPROG6:  LXI     D,DMSGA          ;PRINT MESSAGE ' %/BU.'
2E40 3A3100   D                  LDA     TRPSTR
2E43 FE0B                        CPI     0BH
2E45 C8                          RZ
2E46 110000   E                  LXI     D,MSGA5
2E49 C9                          RET
                        ;
2E4A CD0000   E         LOADB:   CALL    PMASG
2E4D 23                          INX     H
2E4E 010000   D                  LXI     B,KYSTR
2E51 CD882E   C                  CALL    LOAD10
2E54 C36F2E   C                  JMP     LOADA3
2E57 CD0000   E         LOADA:   CALL    PMASG
2E5A 23                          INX     H
2E5B 010000   D                  LXI     B,KYSTR
2E5E 7E                          MOV     A,M
2E5F E6F0                        ANI     0F0H
2E61 C27F2E   C                  JNZ     LOADA1
2E64 3E20                        MVI     A,ASP
2E66 02                 LOADA2:  STAX    B
2E67 03                          INX     B
2E68 CD932E   C                  CALL    LOAD20
2E6B 3E2E                        MVI     A,PERIOD
2E6D 02                          STAX    B
2E6E 03                          INX     B
2E6F 2B                 LOADA3:  DCX     H
2E70 CD882E   C                  CALL    LOAD10
2E73 23                          INX     H
2E74 23                          INX     H
2E75 3E03                        MVI     A,AETX
2E77 02                          STAX    B
2E78 110000   D                  LXI     D,KYSTR
2E7B CD0000   E                  CALL    PMASG
2E7E C9                          RET
2E7F 1F                 LOADA1:  RAR
2E80 1F                          RAR
2E81 1F                          RAR
2E82 1F                          RAR
2E83 F630                        ORI     30H
2E85 C3662E   C                  JMP     LOADA2
2E88 7E                 LOAD10:  MOV     A,M
2E89 E6F0                        ANI     0F0H
2E8B 1F                          RAR
2E8C 1F                          RAR
2E8D 1F                          RAR
2E8E 1F                          RAR
2E8F F630                        ORI     30H
2E91 02                          STAX    B
2E92 03                          INX     B
2E93 7E                 LOAD20:  MOV     A,M
2E94 E60F                        ANI     0FH
2E96 F630                        ORI     30H
2E98 02                          STAX    B
2E99 03                          INX     B
2E9A C9                          RET
                        ;
                        ;
                        ;
                        ;
```

```
LOC  OBJ      LINE      SOURCE STATEMENT

;SUBROUTINES ALREADY WRITTEN
;
;SEGMR:   THIS ROUTINE CHANGES DATA PASSED IN THE C-REG TO A SEVEN
;         SEGMENT CODE FOR DISPLAY PURPOSES. THE RESULT IS RETURNED
;         IN THE ACC.
;CLKEYS:  CLEARS KYSTR, KEYCNT, AND RESETS KEYPTR
;SMLR:  STUFF MANY LOCATIONS ROUTINE. C-DATA TO BE STUFFED,
;         HL-START ADDR/DE-LENGTH
;DLYR:    DELAY ROUTINE-GIVES 1MS. DELAY TIMES THE CONTENTS OF THE
;         C REG. NO OTHER DATA IS PASSED TO OR FROM THE ROUTINE
;KEYIN:   CHECKS FOR A KEY CLOSURE AND RETURNS A CARRY FLAG PLUS
;         THE ROW X COLUMN LOCATION IN THE A REG. IF NO KEY CLOSURE IS
;         SENSED, THE CARRY FLAG IS CLEARED UPON RETURN
;DELETR:  BACKS ALL UP ONE NOTCH IN KYSTR. IF THERE ARE CURRENT
;         ENTRIES, UPDATES THE DISPLAY
;BPSEL:   SELECTS ONE OF 4 RAM BUFFERS IN SEQUENCE. HL-HOLDS ADDR.
;INVALR:  SETS ERFLB AND DISPLAYS 'ER' ON SCRATCH PAD.
;INT65:
;REALC:   REAL CLOCK
;KEYBD:   KEYBOARD ROUTINE CHECKS FOR KEYBOARD ENTRIES BY CALLING
;         KEYIN.  IF A KEYIN IS SENSED, APPROPRIATE ACTION IS TAKEN
;INT75:
;CLRPFR:  CLEAR POWER FLAG ROUTINE
;INT55:
;WDUPR:   WEIGHT DISPLAY UPDATE ROUTINE-TAKES 4 DIGIT BCD # IN BC
;         REGS AND PUTS IT ON WT DISPLAY
;DTRANR:  DELETE TRANSACTION ROUTINE. DELETES AND PRINTS OUT TRANS.
;         DELETED
;TRFIND:  TRANSACTION FIND ROUTINE. TRANS# IS PASSED IN BC REGS.
;         IF FOUND A CARRY IS SET, HL-STATUS BYTE, DE-1ST BYTE
;         OF TRANSACTION
;B2BI16:  BCD TO BINARY IN A 16-BIT QUANTITY.  # IN BCD IN BC REGS.
;         BINARY # IS RETURNED IS BC REGS
;SERNR:  SERIAL # ROUTINE COMPARES KEY ENTRIES WITH THE SERIAL # TABLE.
;         IF ALL FOUR ARE RETURNED IN SEQUENCE, A CARRY IS RETURNED
;         IF NOT, NO CARRY IS RETURNED
;LOCKR:   THIS ROUTINE CHECKS LOCKFL.  IF IT IS SET, CHECK SERNR FOR
;         CORRECT SER.# SEQUENCE, THEN UNLOCKS.  IF LOCKFL IS NOT
;         SET, LOCKR SETS IT AND LOCKS. ALSO DISPLAYS 'LOC'
;CUFIND:  CUSTOMER FIND ROUTINE. BC-CUST#, ACC HOLDS TRANS#
;         RETURN WITH:    HL-POINTS TO STATUS BYTE
;                         DE-POINT TO BUFFER LOC BYTE0
;                         CARRY SET IF FOUND
;KEYDIS:  (24 LEDS) TAKES WHAT IS PASSED IN A-REG AND CHANGES
;         IT TO A SEGMENT CODE AND DISPLAYS IT.  AND PASSES THE KEY-
;         CODE OF THE KEY PUSHED IN THE A-REG.
;CLRSPD:  CLEARS SCRATCH PAD DISPLAY, DISPLAYS ZEROES
;CMDCHK:  KEYCODE PASSED IN C, COMMODITY CHECK ROUTINE SETS CARRY
;         AND RETURNS COMOD# IN ACC. IF OK..CLEARS CARRY AND RETURNS
;         1ST KEYCODE IN A IF NOT
;DIGITR:  KEYCODE PASSED THRU A-REG., AND IF VALID DIGIT,CARRY
;         IS RETURNED ALONG WITH BINARY # IN A-REG. CARRY IS
;         CLEARED UPON RETURN IF NOT A VALID DIGIT
;PRGMR:  THE ACC. HOLDS KEYCODE OF KEY PRESSED.  THE PROGRAM ROUTINE
;         CHECKS OUT THE DIFFERENT COMBINATIONS POSSIBLE AND TAKES
;         THE APPR.ACTION
;CMDADF:  COMODITY ADDRESS FIND ROUTINE. C HOLDS COMOD#
;         H,L HOLD PRICE BYTE FOR THIS COMODITY,CARRY INDICATES
;         THAT COMOD# IS LESS THAN NCOMOD
;CMDOSF:  COMODITY OFFSET FINDER:   C HOLDS KEYCODE FOR PRICE, SELL,
;         ETC....... H,L HOLD PRICE BYTE0, AND RETURN H,L OFFSET AND
;         CARRY SET
;ENTERR:  THE ENTER ROUTINE IS SIMIIAR TO THE JUMPER ROUTINE.
;         THIS ROUTINE IS ROUTED TO BY PRESSING THE ENTER KEY
;         AFTER VARIOUS ENTRIES THAT ARE NOT ROUTED ELSEWHERE
;         (SUCH AS PROGRAM ROUTINE)
;BLOADR:  THIS ROUTINE HAS LAST DIGIT + 1 IN HL REGS
;         D HAS # OF DIGITS, BCD # IS RETURNED IN THE B,C REGS
;DTDISR:  DATE DISPLAY ROUTINE DISPLAYS IN THE SCRATCH PAD DISPLAY
;         'DAY','MONTH','YEAR', ETC. OFFSET COUNTER IS PASSED IN THE
;         A REG. SEGMENT CODES ARE IN THE DATSEG TABLE
;DTSTFR:  THE DATE STUFFER ROUTINE STUFFS KYSTR ENTRIES INTO DAY,
;         MONTH, YEAR, ETC. RAM BYTES. THIS ROUTINE IS CALLED BY PROGDR
;PROGDR:  THE PROGRAM DATE ROUTINE IS ENTERED FROM THE ENTER
;         ROUTINE.  ENTRIES OF DATE ARE CHECKED AND STUFFED IN THE
;         APPRO, RAM LOCATIONS
;DIGINR:  DE HOID FORMAT, RETURNS KEYCODE IN ACC OF NON-DIGIT
;         OR DOT, CARRY INDICATES FORMAT WAS FOLLOWED. BC POINT
;         TO LAST KYSTR ENTRY (NON-DIGIT)
;                   D                  E
;              ----      ----      ----      ----
;         MAND DIG   MAX DIG    MIN TOT   MAX TOT
;         BEFORE DP  BEFORE DP  DIGITS    DIGITS
;
;TRPMER:  TRANSACTION PIECE MEAL ENTER ROUTINE.
;         DE HOLD BUFFER BYTE 0 ( UPON ENTRY)
;         HL HOLD STATUS BYTE  (  "      "    )
;TRANSR:  TRANSACTION ROUTINE, BC HOLD CUSTOMER # UPON ENTRY
;DISUPR:  DISPLAY UPDATE ROUTINE-DISPLAYS WHAT IS STORED IN
;         RAM DISPLAY LOCATIONS.
;SDUPR:   SCRATCH PAD DISPLAY UPDATE ROUTINE, TAKES BCD DIGITS
;         FROM B,C REGS AND DISPLAYS ON SCRATCH PAD
;FFDP:    FORM FEED PROGRAM
;FCNLCR:  FUNCTION LAMP CLEAR ROUTINE***NOTE: ALL ROUTINES TO CALL
;         ***THIS ON SECOND ENTER***********************************
;ERDIS:   ROUTINE TO DISPLAY ERROR ON SCRATCH PAD DISPLAY
;PRLOCK:  PRINT LOCK ROUTINE SETS THE PLOCK FLAG ACCORDING TO THE
;         FORMAT. MS BIT-0 MEANS NOT TO SUPPRESS THE $ AND CENTS
;                   1 MEANS TO SUPPRESS THE $ AND CENTS
;DSPLYR:  DISPLAY ROUTINE-H,L REGS HOLD KEYPTR WHICH POINTS
;         TO THE NEXT BLANK KYSTR LOCATION .....KCOUNT+1 HOLDS THE
;         # OF ENTRIES
;PRINTR:  PRINT ROUTINE-H,L REGS HOLD KYSTR+1 AND IS ROUTED TO
```

```
LOC  OBJ            LINE        SOURCE STATEMENT

                         ;        BY THE ENTERR.
                         ;SSFIND:    SHARE AND SERVICE FIND-A REG HOLDS THE NTH ONE
                         ;        B,C REGS HOLD CUST#
                         ;BUFBLR:    BUFFER BLANK ROUTINE SEARCHES FOR A BLANK SLOT IN THE
                         ;        BUFFER AND RETURNS A CARRY PLUS D,E-BUFFER BYTE0 AND
                         ;        H,L-STATUS BYTE
                         ;COMODR:    COMMODITY ROUTINE-A REG HOLDS THE COMOD#... THIS
                         ;        ROUTINE CAN PRINT NET COMMODITY VALUES, OR PROGRAMS
                         ;        FOR CERTAIN COMMODITIES AND/OR PRINT OUT DATE AND
                         ;        TIME BY CALLING PRDTR
                         ;BEEP:      BEEPS FOR 10MS AND STOPS
                         ;PRDTR:     PRINT DATE AND TIME ROUTINE
                         ;PRPRGR:    PRINT HELLO MESSAGE ROUTINE
                         ;PPROG1:    PRINT PROGRAM 1, C HOLDS COMOD#
                         ;
                         ;.............................................................
                         ;CUST RAM FORMAT
                         ;        1ST BYTE-MAX. T# IN BUFFER          | CUST#
                         ;        2ND BYTE-(T#-3),(T#-2),(T#-1),(T#) ]
                         ;.............................................................
                         ;        STATUS BYTE FORMAT
                         ;
                         ;       B7   . B6      B5   .  B4  .  B3  .  B2  .  B1 .   B0
                         ;       BUSY . HANDLING     . TST  .  WT  . DAM  .  FM . MOIST
                         ;       1-YES . 00-SELL     ,  WT  . OUT  .
                         ;       0-NO  . 01-STORE    .
                         ;             . 10-CONTRA   .
                         ;             . 11-DLYPR    .
                         ;.............................................................
                         ;        TRANSACTION BUFFER FORMAT
                         ;
                         ;        BUFFER             FUNCTION                FORMAT
                         ;         0,1               TRANS #                 XX XX
                         ;         2,3               CUST #                  0X XX
                         ;          4                T#                      XX
                         ;          5                COMOD#                  XX     ;BINARY
                         ;        6,7,8              WT IN                   0X XX XX
                         ;        9,10,11            WT OUT                  0X XX XX
                         ;        12,13              TEST WT                 XX . XX LBS
                         ;        14,15              MOIST                   XX   XX  %
                         ;        16,17              FM                      XX   XX  %
                         ;        18,19              DAMAGE                  XX   XX  %
                         ;        20,21              SERVICE(A) CUST#        0X XX
                         ;        22,23              HIS PRICE               ?.X XX
                         ;                                                   1-CENTS/BU
                         ;                                                   0-CENTS/%/BU
                         ;        24,25,26,27        SERVICE(B) CUST#/$      SAME AS ABOVE
                         ;        28                 USED TO STORE ASCII CHARACTER OF TRANSACTION NO.
                         ;        29                 USED TO INDICATE ORIG TICKET PRINT 00=ORIGINAL PRINTED
                         ;        30,31              USED FOR STORING CURRENT PRICE WHEN PRICE/SELL IS USED
                         ;        32,33              SHARES(X) CUST#         0X XX
                         ;        34                 HIS %                   XX %
                         ;        35,36              SHARES(Y) CUST#         0X XX
                         ;        37                 HIS %                   XX %
                         ;4 M.S.B OF BYTE 8 IS USED TO INDICATE THAT MOISTURE REV. HAS BEEN ADDED ONCE
                         ;FORMAT FOR BYTE 29 WHICH IS USED AS FLAG
                         ;BIT 0-ORIGINAL TICKET PRINTED? ( 0 INDICATES YES)
                         ;BIT 1-SETTLEMENT SHEET FOR CUSTOMER IN SERVICE 1 PRINTED? (1 INDICATES YES)
                         ;BIT 2-SETTLEMENT SHEET FOR CUSTOMER IN SERVICE 2 PRINTED? (1 INDICATES YES)
                         ;BIT 3-SETTLEMENT SHEET FOR CUSTOMER IN SHARES  1 PRINTED? (1 INDICATES YES)
                         ;BIT 4-SETTLEMENT SHEET FOR CUSTOMER IN SHARES  2 PRINTED? (1 INDICATES YES)
                         ;BIT 5-SETTLEMENT SHEET FOR MAIN CUSTOMER PRINTED? (1 INDICATES YES)
                         ;BIT 6-WEIGHT MANUALLY ENTERED OR AUTOMATICALLY ENTERED
                         ;BIT 7-USED TO INDICATE WHETHER DRIVER WAS ON THE TRUCK OR OFF THE TRUCK
                         ;.............................................................
                         ;
2E9B 310000    S         INIT0:  LXI    SP,STACK
2E9E 3E08                        MVI    A,08H
2EA0 30                          SIM
2EA1 3E55                        MVI    A,55H
2EA3 320083                      STA    ENSTAK
2EA6 2F                          CMA
2EA7 32FF83                      STA    STSTAK
2EAA AF                          XRA    A
2EAB 210080                      LXI    H,RAM
2EAE 110003                      LXI    D,ENSTAK - RAM          ;CLEAR RAM TO ZERO
2EB1 4F                          MOV    C,A
2EB2 CD0000    E                 CALL   SMLR
2EB5 CDB328    C                 CALL   DISUPR
2EB8 CD0000    E                 CALL   DLYR
2EBB CD0000    E                 CALL   BEEP             ;0.5 SECOND ON DELAY THEN BEEP TO TURN OFF
2EBE 21AB01    D                 LXI    H,DIM09
2EC1 3673                        MVI    M,SEGP
2EC3 2B                          DCX    H
2EC4 3671                        MVI    M,SEGF
2EC6 CDB328    C                 CALL   DISUPR    ;PF TO DISPLAY
2EC9 210084                      LXI    H,CRAM
2ECC 110004                      LXI    D,400H
2ECF 0E00                        MVI    C,00H
2ED1 CD0000    E                 CALL   SMLR      ;ALL 0 TO CUSTOMER RAM
2ED4 2100FC                      LXI    H,KRAM
2ED7 110004                      LXI    D,400H
2EDA 0E00                        MVI    C,00H
2EDC CD0000    E                 CALL   SMLR
```

```
LOC  OBJ              SOURCE STATEMENT

2EDF 1101C0                   LXI   D,EXRAM + 1
2EE2 2100C0                   LXI   H,EXRAM
2EE5 012700                   LXI   B,TRANSL+1
2EE8 3ED2                     MVI   A,NTRANS
2EEA F5               INIT1:  PUSH  PSW
2EEB CD0000   E               CALL  PRJRA          ;CLEAR TRANS BUFFER
2EEE F1                       POP   PSW
2EEF 09                       DAD   B
2EF0 EB                       XCHG
2EF1 09                       DAD   B
2EF2 EB                       XCHG
2EF3 3D                       DCR   A
2EF4 C2EA2E   C               JNZ   INIT1
2EF7 CD6311   C               CALL  CLKEYS
2EFA 212B00   D               LXI   H,ERFLB
2EFD 117501                   LXI   D,NPRGFL - ERFLB
2F00 0E00                     MVI   C,00H
2F02 CD0000   E               CALL  SMLR
2F05 3E41                     MVI   A,41H
2F07 323400   D               STA   TRNCTR + 2
2F0A 32A001   D               STA   NPRGFL
2F0D 322E00   D               STA   OFFFL
2F10 014D00   D       INIT3:  LXI   B,FFR
2F13 C5                       PUSH  B
2F14 010000                   LXI   B,0000H
2F17 CD0000   E               CALL  FSET
2F1A 322868                   STA   INTR
2F1D 322988                   STA   INTR+1
2F20 310000   S               LXI   SP,STACK
2F23 CD7119   C       INIT2:  CALL  SERNR
2F26 D2232F   C               JNC   INIT2
2F29 310000   S       INIT20: LXI   SP,STACK
2F2C 210083                   LXI   H,ENSTAK
2F2F 3655                     MVI   M,55H
2F31 21FF83                   LXI   H,STSTAK
2F34 36AA                     MVI   M,0AAH
2F36 210790                   LXI   H,PRINTR
2F39 22C2FF                   SHLD  PPORT
2F3C 010000                   LXI   B,0000H
2F3F CDD528   C               CALL  SDUPR
2F42 CDEA17   C               CALL  WDUPR
2F45 AF                       XRA   A
2F46 322E00   D               STA   OFFFL
2F49 0E1E                     MVI   C,ARS
2F4B CD0000   E               CALL  PCHAR
2F4E 0E0F                     MVI   C,ASIA
2F50 CD0000   E               CALL  PCHAR
2F53 116B05   C               LXI   D,MSO
2F56 CD0000   E               CALL  PMASG
2F59 CD4F15   C               CALL  STFRMF
2F5C 3AA001   D               LDA   NPRGFL
2F5F B7                       ORA   A
2F60 C2E32F   C               JNZ   NPRGR
2F63 CD3E2D   C               CALL  PRPRGR
2F66 CD6311   C       INIT6:  CALL  CLKEYS
2F69 322888           WAIT:   STA   INTR
2F6C 322988                   STA   INTR + 1
2F6F FB                       EI
2F70 76                       HLT
2F71 20                       RIM
2F72 E605                     ANI   05H
2F74 F608                     ORI   08H
2F76 30                       SIM
2F77 C3692F   C               JMP   WAIT
                      ;
2F7A F5               INIT4:  PUSH  PSW
2F7B 2E00                     MVI   L,00H
2F7D 7C                       MOV   A,H     ;CHECK FOR BANK
2F7E E610                     ANI   10H     ;A12 SET?
2F80 CA892F   C               JZ    INIT5   ;IF NOT, PREPARE TO RE-ENTER LOOP
2F83 7C                       MOV   A,H     ;RE-FETCH
2F84 E6E0                     ANI   0E0H    ;MASK OFF 3 LSB
2F86 F680                     ORI   80H     ;SET A15
2F88 67                       MOV   H,A     ;RESTORE
2F89 F1               INIT5:  POP   PSW
2F8A C3EA2E   C               JMP   INIT1   ;AND RE-ENTER
                      ;
2F8D CDC519   C       OFFR:   CALL  KEYDIS
2F90 CD7119   C               CALL  SERNR
2F93 D2541D   C               JNC   PRGM7
2F96 F3                       DI
2F97 0E00                     MVI   C,00H
2F99 21A601   D               LXI   H,DIM00
2F9C 111000                   LXI   D,DIM27 - DIM00 + 1
2F9F CD0000   E               CALL  SMLR
2FA2 CDB328   C               CALL  DISUFR
2FA5 AF                       XRA   A
2FA6 32A001   D               STA   NPRGFL
2FA9 2F                       CMA
2FAA 322E00   D               STA   OFFFL
2FAD CD6311   C               CALL  CLKEYS
2FB0 20                       RIM
2FB1 F60A                     ORI   0AH     ;MASK OFF INT65 TILL SERIAL #
2FB3 30                       SIM
2FB4 FB                       EI
2FB5 C3102F   C               JMP   INIT3
                              ;
2FB8 D5               B2BI8:  PUSH  D
2FB9 E5                       PUSH  H
2FBA F5                       PUSH  PSW
2FBB 210000                   LXI   H,0000H
2FBE 110A00                   LXI   D,0010
2FC1 79                       MOV   A,C
```

```
LOC  OBJ           LINE       SOURCE STATEMENT

2FC2 07                          RLC
2FC3 07                          RLC
2FC4 07                          RLC
2FC5 07                          RLC
2FC6 E60F                        ANI    0FH
2FC8 CAD02F      C               JZ     B2B2
2FCB 19                   B2B1:  DAD    D
2FCC 3D                          DCR    A
2FCD C2CB2F      C               JNZ    B2B1
2FD0 110100               B2B2:  LXI    D,0001
2FD3 79                          MOV    A,C
2FD4 E60F                        ANI    0FH
2FD6 CADE2F      C               JZ     B2B4
2FD9 19                   B2B3:  DAD    D
2FDA 3D                          DCR    A
2FDB C2D92F      C               JNZ    B2B3
2FDE 4D                   B2B4:  MOV    C,L
2FDF F1                          POP    PSW
2FE0 E1                          POP    H
2FE1 D1                          POP    D
2FE2 C9                          RET
                          ;
2FE3 118D05      C        NPRGR: LXI    D,MNPL
2FE6 CD0000      E               CALL   FMASG
2FE9 CD4F15      C               CALL   STFRMF
2FEC C3662F      C               JMP    INIT6
                          ;
2FEF 3E56                 SETPR: MVI    A,SETSHT
2FF1 CDC519      C               CALL   KEYDIS
2FF4 CD902F      C        SET1:  CALL   GKEY
2FF7 D2541D      C               JNC    PRGM7
2FFA FE60                        CPI    CUST
2FFC CA0530      C               JZ     SETPR1
2FFF CD8811      C               CALL   ERDASH
3002 C3EF2F      C               JMP    SETPR
3005 AF                   SETPR1: XRA   A
3006 323700      D               STA    PRLOC0           ;ZERO OUT MANUAL ENTRY
3009 111404                      LXI    D,0414H
300C CDAA20      C               CALL   DIGINR
300F F5                          PUSH   PSW              ;SAVE KEY CODE
3010 69                          MOV    L,C              ;FIND OFFSET TO CUSTOMER NO.
3011 60                          MOV    H,B
3012 23                          INX    H
3013 3E04                        MVI    A,4
3015 92                          SUB    D
3016 57                          MOV    D,A
3017 CDAD1E      C               CALL   BLOADR
301A C5                          PUSH   B
301B CD3219      C               CALL   B2PI16
301E 210084                      LXI    H,CRAM
3021 09                          DAD    B
3022 2B                          DCX    H
3023 C1                          POP    B
3024 F1                          POP    PSW
3025 FE11                 SETPR5: CPI   DELET
3027 CA541D      C               JZ     PRGM7
302A FE65                 SETPR8: CPI   ENTER
302C CA6830      C               JZ     SETPR3
302F FE64                 SETPR2: CPI   PRINT
3031 C25F30      C               JNZ    SETPR4           ;LOOK FOR PRINT KEY
3034 C5                          PUSH   B
3035 D5                          PUSH   D
3036 E5                          PUSH   H
3037 111101                      LXI    D,0111H          ;LOOK FOR 1 DIGIT IF IT IS PRINT KEY
303A CDAA20      C               CALL   DIGINR
303D D25430      C               JNC    SETPR7           ;JUMP IF IT IS NOT DIGIT KEY
3040 F5                          PUSH   PSW
3041 210100      D               LXI    H,KYSTR+1
3044 1601                        MVI    D,01H            ;CONVERT KEY CODE TO BCD
3046 CDAD1E      C               CALL   BLOADR           ;
3049 79                          MOV    A,C
304A 323700      D               STA    PRLOC0
304D F1                          POP    PSW
304E E1                          POP    H
304F D1                          POP    D
3050 C1                          POP    B
3051 C32A30      C               JMP    SETPR8
3054 E1                   SETPR7: POP   H
3055 D1                          POP    D
3056 C1                          POP    B
3057 FE11                        CPI    DELET
3059 C22530      C               JNZ    SETPR5
305C C36230      C               JMP    SET10
305F CD8811      C        SETPR4: CALL  ERDASH
3062 CD7E11      C        SET10: CALL   KEYDWN
3065 C32530      C               JMP    SETPR5
3068 3EFF                 SETPR3: MVI   A,0FFH
306A 320302      D               STA    SETLEF
306D 3A3600      D               LDA    PRLOCK
3070 B7                          ORA    A
3071 C28030      C               JNZ    SETPR6
3074 3A3700      D               LDA    PRLOC0
3077 B7                          ORA    A
3078 C28030      C               JNZ    SETPR6
307B 3E01                        MVI    A,01H
307D 323700      D               STA    PRLOC0
3080 CD0000      E        SETPR6: CALL  PRJDA
3083 CD321A      C               CALL   CLRSFD
3086 C3541D      C               JMP    PRGM7
                          ;
                          ;
                          ;      BEEP OFF ROUTINE
                          ;
```

```
LOC  OBJ              SOURCE STATEMENT

3089 F5               BPOFFR: PUSH   PSW
308A AF                       XRA    A
308B 323B00    D              STA    BEEPFL
308E F1                       POP    PSW
308F C35212    C              JMP    STRETM
                      ;
                      ;
                      ;       CONTROL DISPLAY CLEAR ROUTINE-CLEARS LED DISP.
3092 F5               CDISCR: PUSH   PSW
3093 E5                       PUSH   H
3094 C5                       PUSH   B
3095 0604                     MVI    B,04H   ;COUNTER OF MEMORY LOC.
3097 AF                       XRA    A
3098 21A601    D              LXI    H,DIM00
309B 77               CDISC1: MOV    M,A     ;ZERO OUT
309C 23                       INX    H
309D 05                       DCR    B       ;DECREMENT COUNTER
309E C29B30    C              JNZ    CDISC1  ;LOOP UNTIL COUNTER IS ZERO
30A1 C1                       POP    B
30A2 E1                       POP    H
30A3 F1                       POP    PSW
30A4 C3B328    C              JMP    DISUPR
                      ;
                      ;
                      ;       CONTROL BYTE DISPLAY ROUTINE
                      ;
                      ;              A HOLDS CONTROL#, C HOLDS MAST/IND MASK
                      ;              1100 0000-BOTH LEDS
                      ;              1000 0000-MASTER LED(RED)
                      ;              0100 0000-IND LED(GRN)
                      ;
30A7 B7               DBDISR: ORA    A
30A8 C8                       RZ             ;IF CONTROL # IS 00, RETURN BECAUSE NO SUCH
                                             ;                  CONTROL #
30A9 C5                       PUSH   B
30AA D5                       PUSH   D
30AB E5                       PUSH   H
30AC F5                       PUSH   PSW
30AD 0604                     MVI    B,04H   ;COUNT # OF TIMES WE ROTATE MASK
30AF 1604             DBDIS1: MVI    D,04H   ;COUNTER FOR H,L DECREMENT
30B1 21A901    D              LXI    H,DIM03 ;MEMORY LOC. OF LAST DISP. LOC
30B4 3D               DBDIS2: DCR    A       ;DECREMENT CONTROL#
30B5 CACA30    C              JZ     DBDIS5  ;JUMP, NO CONTROL#=0
30B8 2B                       DCX    H       ;NEXT LOWER LOC.
30B9 15                       DCR    D       ;DECREMENT COUNTER
30BA C2B430    C              JNZ    DBDIS2  ;REDO LOOP UNTIL ZERO
30BD 05               DBDIS3: DCR    B       ;DECREMENT FOR 1ST ROTATION
30BE CA5812    C              JZ     STRET
30C1 F5               DBDIS4: PUSH   PSW
30C2 79                       MOV    A,C     ;MASK TO ACC
30C3 0F                       RRC
30C4 0F                       RRC
30C5 4F                       MOV    C,A     ;STORE BACK IN C
30C6 F1                       POP    PSW
30C7 C3AF30    C              JMP    DBDIS1  ;FINISHED AN OUTER LOOP
30CA 79               DBDIS5: MOV    A,C     ;CONTROL# TO ACC
30CB B6                       ORA    M       ;SET APPROPRIATE BITS IN MEMORY LOC
30CC 77                       MOV    M,A     ;STORE IN MEMORY
30CD CDB328    C              CALL   DISUPR
30D0 C35812    C              JMP    STRET
                      ;
                      ;
                      ;       CONTROL BYTE UPDATE DISPLAY
                      ;
                      ;              H,L HOLD CONTROL STORE 1ST BYTE, A HOLDS CONTROL#
                      ;
30D3 B7               CBUPD:  ORA    A
30D4 C8                       RZ             ;IF CONTROL#=0, RETURN
30D5 E5                       PUSH   H
30D6 C5                       PUSH   B
30D7 F5                       PUSH   PSW
30D8 FE09                     CPI    09H     ;HAVE TO DIVIDE THE POSSIBLE 1-16 CONTROL#'S
                                             ;IN HALF IN ORDER TO PUT ON TWO BYTES
30DA F2EE30    C              JP     CB2     ;POSITIVE-GREATER THAN #8
30DD 47               CB1A:   MOV    B,A     ;STORE ADJUSTED # IN B
30DE 3E01                     MVI    A,01H   ;MASK
30E0 0E08                     MVI    C,08H
30E2 05               CB1B:   DCR    B       ;DECREMENT #
30E3 CAF430    C              JZ     CB3
30E6 07                       RLC            ;MOVES TO NEXT BIT
30E7 0D                       DCR    C       ;DECREMENT # OF BITS OR CONTROL#'S POSSIBLE
30E8 C2E230    C              JNZ    CB1B    ;REDO LOOP IF NOT DONE
30EB C3F630    C              JMP    CB4
30EE D608             CB2:    SUI    08H     ;TO GET TO RIGHT BIT IN 2ND BYTE
30F0 23                       INX    H       ;2ND BYTE
30F1 C3DD30    C              JMP    CB1A
30F4 B6               CB3:    ORA    M       ;MASK APPROPRIATE BIT
30F5 77                       MOV    M,A     ;STORE BACK IN MEMORY
30F6 F1               CB4:    POP    PSW
30F7 C1                       POP    B
30F8 E1                       POP    H
30F9 C9                       RET
                      ;
                      ;
                      ;       CONTROL CHECKER ROUTINE-THIS ROUTINE CHECKS FOR LOGIC 0'S
                      ;                      THIS TIME ONLY FOR BEEPFL. ALL REGS SAVED.
                      ;
30FA C5               CNCHKR: PUSH   B
30FB D5                       PUSH   D
30FC E5                       PUSH   H
30FD F5                       PUSH   PSW
30FE 3A4A00    D              LDA    CNTRFL
3101 B7                       ORA    A
```

```
LOC  OBJ              SOURCE STATEMENT

3102 C25812   C         JNZ     STRET
3105 0E00               MVI     C,00H
3107 110400             LXI     D,04H
310A 21A601   D         LXI     H,DIM00
310D CD0000   E         CALL    SMLR
3110 AF                 XRA     A
3111 323E00   D         STA     FSTFL   ;FIRST TIME FLAG
3114 113F00   D         LXI     D,INPB  ;INPORT BYTE-1 BYTE PER PORT...LAST LOOK..
3117 010090             LXI     B,OUTPT ;OUTPORT-WHERE INPUTS COME IN AT
311A 214B00   D         LXI     H,CNTRLB
311D 3E02               MVI     A,NPORTS
311F B7                 ORA     A       ;IS # OF PORTS ZERO?
3120 CA4B31   C         JZ      CNR4    ;IF SO, JUMP
3123 F5         CNR1:   PUSH    PSW     ;NPORTS
3124 0A                 LDAX    B       ;FETCH OUTPT
3125 F5                 PUSH    PSW     ;SAVE OUTPT INFO
3126 A6                 ANA     M       ;PUTS 1'S WHENEVER WE HAVE GONE FROM 1 TO 0
3127 F5                 PUSH    PSW     ;SAVE THESE 1'S (BAD GUYS)
3128 EB                 XCHG
3129 AE                 XRA     M       ;GETS US ONES WHICH WENT BAD THIS TIME
312A EB                 XCHG
312B A6                 ANA     M
312C C45131   C         CNZ     CNR5    ;IF SOMETHING OTHER THAN ZERO, JUMP TO SET BEEPFL
312F F1         CNR2:   POP     PSW     ;RESTORE BAD GUYS
3130 12                 STAX    D       ;UPDATE INPB
3131 CD5531   C         CALL    REDLIT  ;TO LIGHT LED'S OF BAD GUYS RED
3134 F1                 POP     PSW     ;OUTPT INFO, CURRENT LOOK
3135 2F                 CMA             ;COMPL OF OUTPUT INFO
3136 A6                 ANA     M       ;MASK WITH CNTRLB
3137 CD8831   C         CALL    GRNLIT  ;AND DO IT
313A 03                 INX     B       ;FOR NEXT LOOK
313B 13                 INX     D       ;INCREMENT INPORT BYTE
313C 23                 INX     H       ;INCREMENT CONTROL BYTE
313D F1                 POP     PSW     ;PORT COUNTER
313F 3D                 DCR     A       ;DECREMENT IT
313F 323E00   D         STA     FSTFL   ;FIRST TIME FLAG
3142 C22331   C         JNZ     CNR1    ;IF NOT ZERO, REDO LOOP
3145 CDB326   C CNR3:   CALL    DISUPR  ;CLEAR LAST LED
3148 C35812   C         JMP     STRET
314B CD9230   C CNR4:   CALL    CDISCR  ;CONTROL DISP. CLEAR ROUTINE
314E C34531   C         JMP     CNR3
3151 323B00   D CNR5:   STA     BEEPFL  ;BEEP FLAG
3154 C9                 RET
                ;
                ;
                ;       RED LIGHT ROUTINE
                ;
3155 C5         REDLIT: PUSH    B       ;SAVE OUTPT
3156 F5                 PUSH    PSW     ;SAVE BAD GUYS
3157 3A3E00   D         LDA     FSTFL   ;FIRST TIME FLAG-TELLS US WHETHER PORT 1 OR 2
315A B7                 ORA     A       ;IS IT ZERO?
315B C27731   C         JNZ     RDL4    ;IF 0-PORT1,1-PORT2
315E 018001             LXI     B,0180H ;PORT1-80H INDICATES RED LIGHT
3161 F1         RDL1:   POP     PSW     ;RESTORE BAD/GOOD GUYS
3162 0F         RDL2:   RRC             ;ROTATE RIGHT COUNTING TO FIND THEM
3163 DA7D31   C         JC      RDL5    ;IF FIND, JUMP
3166 F5                 PUSH    PSW     ;NOT FIND SO SAVE ROTATED BAD/GOOD GUYS
3167 04         RDL3:   INR     B
3168 78                 MOV     A,B     ;FETCH INCREMENTED COUNTER
3169 FE09               CPI     09      ;IF PORT1- HAVE WE EXCEEDED 8
316B CA8531   C         JZ      RDL6    ;IF SO, JUMP
316E FE11               CPI     17      ;IF PORT2-HAVE WE EXCEEDED 16
3170 CA8531   C         JZ      RDL6    ;IF SO, JUMP
3173 F1                 POP     PSW     ;NOT EXCEEDED SO RESTORE BAD/GOOD GUYS
3174 C36231   C         JMP     RDL2
                ;
3177 018009     RDL4:   LXI     B,0980H ;PORT2-SO START COUNTING AT 9 (80=RED LIT)
317A C36131   C         JMP     RDL1
                ;
317D F5         RDL5:   PUSH    PSW     ;FOUND BAD(OR GOOD)GUY SO SAVE INFO
317E 78                 MOV     A,B     ;FETCH COUNTER
317F CDA730   C         CALL    DBDISR  ;CONTROL BYTE DISPLAY ROUTINE
3182 C36731   C         JMP     RDL3
                ;
3185 F1         RDL6:   POP     PSW     ;
3186 C1                 POP     B       ;RESTORE OUTPT INFO
3187 C9                 RET
                ;
                ;
                ;       GREEN LIGHT ROUTINE
                ;
3188 C5         GRNLIT: PUSH    B
3189 F5                 PUSH    PSW
318A 3A3E00   D         LDA     FSTFL   ;FIRST TIME FLAG
318D B7                 ORA     A       ;IS IT SET?
318F C29731   C         JNZ     GL1     ;IF SO, JUMP
3191 014001             LXI     B,0140H ;PORT1-GRN LITE
3194 C36131   C         JMP     RDL1
                ;
3197 014009     GL1:    LXI     B,0940H ;PORT2-GRN LITE(40H)
319A C36131   C         JMP     RDL1
                ;
319D CDC519   C CNTRLR: CALL    KEYDIS  ;DISPLAY CNL
31A0 AF                 XRA     A
31A1 323100   D         STA     TRPSTR  ;TEMP
31A4 111202             LXI     D,0212H ;SET-UP FOR DIGINR
31A7 CDAA20   C         CALL    DIGINR  ;FETCH DIGITS
31AA D20732   C         JNC     CNT1    ;NO SUCCESS
31AD 323100   D         STA     TRPSTR  ;TEMP
31B0 0C                 INR     C       ;LS BYTE OFFSET INTO KYSTR
31B1 51                 MOV     D,C     ;TO D
31B2 69                 MOV     L,C
31B3 60                 MOV     H,B     ;SET-UP FOR BLOADR
```

```
LOC  OBJ          LINE          SOURCE STATEMENT

31B4 CDAD1E    C  5754          CALL    BLOADR
31B7 D20512    C  5755          JNC     INVALR   ;NOT DIGITS
31BA CDBE2F    C  5756          CALL    B2BI8    ;CHANGE TO BINARY
31BD 214B00    D  5757          LXI     H,CNTRLB
31C0 79           5758          MOV     A,C      ;FETCH BINARY #
31C1 FE11         5759          CPI     NCNTRL + 1       ;TOO MANY?
31C3 F20512    C  5760          JP      INVALR
31C6 B7           5761          ORA     A
31C7 CA0512    C  5762          JZ      INVALR
31CA FE09         5763          CPI     09H      ;1ST PORT OR SECOND
31CC FAD231    C  5764          JM      CNT2
31CF 23           5765          INX     H
31D0 D608         5766          SUI     08H      ;SET-UP FOR PORT 2
31D2 4F           5767 CNT2:    MOV     C,A      ;CONTROL # AT PORT BACK TO C
31D3 AF           5768          XRA     A
31D4 37           5769          STC
31D5 17           5770 CNT3:    RAL
31D6 0D           5771          DCR     C        ;FORM BIT MASK
31D7 C2D531    C  5772          JNZ     CNT3
31DA 4F           5773          MOV     C,A      ;MASK TO C
31DB 3A3100    D  5774          LDA     TRPSTR   ;KEY ENTRY FROM DIGINR
31DE FE47         5775          CPI     OFF      ;OFF KEY?
31E0 C2F631    C  5776          JNZ     CNT4     ;IF NOT, CHECK FOR ENTER
31E3 CDC519    C  5777          CALL    KEYDIS
31E6 CD7E11    C  5778 CNT5:    CALL    KEYDWN
31E9 FE65         5779          CPI     ENTER
31EB CA0132    C  5780          JZ      CNT6
31EE FE11         5781          CPI     DELET
31F0 C20512    C  5782          JNZ     INVALR
31F3 C3541D    C  5783          JMP     PRGM7
31F6 FE65         5784 CNT4:    CPI     ENTER
31F8 C20512    C  5785          JNZ     INVALR
31FB 79           5786          MOV     A,C
31FC B6           5787          ORA     M        ;SET BIT
31FD 77           5788 CNT7:    MOV     M,A      ;UPDATE
31FE C3541D    C  5789          JMP     PRGM7
3201 79           5790 CNT6:    MOV     A,C
3202 2F           5791          CMA
3203 A6           5792          ANA     M        ;TURN OFF BIT
3204 C3FD31    C  5793          JMP     CNT7
3207 FE11         5794 CNT1:    CPI     DELET
3209 C20512    C  5795          JNZ     INVALR
320C C3541D    C  5796          JMP     PRGM7
                  5797 ;
                  5798 ;
                  5799          END

PUBLIC SYMBOLS
AMOUNT D 01E5   AUTOFF C 121F   BASEPR D 01DA   BLOADR C 1EAD   BYDIGT D 0216   CLRSPD C 1A32   CMDADF C 1D70
CMDFLT C 0071   CMDOSF C 1D90   CMSTAT C 008B   CODNO  A FFB5   CONSA  D 021C   CRAM   A 8400   CRNTCM D 01E2
CRNTST D 01A1   DADDR  D 0067   DAMAGE A 0066   DDOT   C 115D   DESTOR D 01B6   DIGINR C 20AA   DIM11  D 01AD
DIM19  D 01B1   DIM27  D 01B5   DISCNT D 01F4   DLNGTH D 0066   DMGFL  D 01D6   DSCALE D 0064   DSIGN  D 0263
DSTOR0 D 01B7   DTRFL  D 020A   ENTKEY C 1CDF   ERDIS  C 2918   FLAG1  D 0168   FLAG2  D 0169   FM     A 0062
FMFL   D 01D2   FNUMD  D 0154   FNUMD1 D 0171   FNUMD2 D 017C   FNUMD3 D 018B   FNUMF1 D 0181   FNUMF2 D 0186
FNUMF3 D 0190   FPR    D 004D   GACFLG D 0205   GMSGFL D 0226   GRICON A FEAC   GRISAL A FE88   GRISTR A FED0
GROSBU D 01C4   GRSCMB D 0227   GRSCMC D 026F   GRSCMD D 0293   GRSCMS D 024B   GRSCMT D 02B7   GRSDOL D 01A2
GRSNET D 0150   GRSSTK A FE1C   HADCT1 A FEF4   HADCT2 A FF6B   HADCT3 A FF6C   KEYDIS C 19C5   KEYDWN C 117E
KRAM   A FC00   KYSTR  D 0000   LINEFL D 01E0   LOADNO D 01E4   MAXLOD D 01E3   MCMTAB C 0211   MCPRG  C 0327
MDAMG  C 041B   MFM    C 03FF   MFORM  C 1360   MHEAD1 A FEF9   MHEAD2 A FF23   MHEAD3 A FF6D   MKRAM  A FDF8
MMOISA C 0394   MMOISB C 03B0   MMOIST C 03CC   MOISTF D 019A   MSTAMT D 0206   MSTFL  D 01CE   MSTMIN C 0094
MSTSTA D 014B   MTRDEL C 02FB   MTW    C 0437   NETAMG A FD20   NETAMS A FCFC   NETAVG D 014C   NETFU  D 01C9
NETCMB A FC00   NETCMC A FC48   NETCMD A FC6C   NETCMG A FCB4   NETCMS A FC24   NETCMT A FC90   NETMST A FCD6
NETWT  D 01BF   OFFFL  D 002E   OSLDEC A FD8C   OSLTOT A FE40   PERRFL D 0030   POSNO  A FFBE   PPORT  A FFC2
PRDTR  C 2CCB   PRESFL D 019F   PRGM7  C 1D54   PRICEF D 016B   PRINTR A F007   PRJRFL D 016A   PRLOC0 D 0037
PRLOC1 D 0038   PRLOCK D 0036   PWRFL  D 002F   ROUNDF D 020B   RUNFR  D 0195   SCOMN  D 0170   SELLFL D 019E
SERNO  A FEF5   SERV   D 01EA   SERVFL D 01E1   SETLEF D 0203   SHAREF D 0202   SHORTF A FFC0   SHRFAC A 00F2
SPACE  C 1151   SRNKFL D 003C   SRVRT  D 01EF   SSNO   A FFBC   STATUS D 003D   STRET  C 1258   STRETM C 1252
TOTDOC D 01F9   TRANFI D 01BB   TRAPR  C 1147   TRASTA D 01DF   TRNCTH D 0032   TWFL   D 01FE   WOGDEC A FDD4
WOGINC A FDB0   WOGTOT A FE64   WRLCAN A FD68   WRLISS A FD44   WRLOUT A FDF8

EXTERNAL SYMBOLS
ACRR   E 0000   ADDNTA E 0000   ADJPTR E 0000   B2D1A7 E 0000   BEEP   E 0000   BUFBLR E 0000   CUFIND E 0000
D2B1   E 0000   D2BB   E 0000   DLYR   E 0000   FADD   E 0000   FLOAD  E 0000   FQFB2D E 0000   FQFD2B E 0000
FRESET E 0000   FSET   E 0000   FSTAT  E 0000   FSTOR  E 0000   GACMN  E 0000   GETWT2 E 0000   HEADG  E 0000
KEYFLG E 0000   KEYIN  E 0000   MACR   E 0000   MHEADG E 0000   MPOSR7 E 0000   MSGA4  E 0000   MSGA5  E 0000
MSGELB E 0000   MSGELC E 0000   MSTAVG E 0000   PCHAR  E 0000   PCMNAM E 0000   PCUSN  E 0000   PFORMA E 0000
PFORMB E 0000   PMASG  E 0000   PMOSTB E 0000   PNET1  E 0000   POSRCD E 0000   PRJDA  E 0000   PRJR   E 0000
PRJRA  E 0000   PRLR   E 0000   PRSLT  E 0000   PRSLTA E 0000   PTIKT  E 0000   SETGRN E 0000   SETPT  E 0000
SETPTA E 0000   SKYFLG E 0000   SMLR   E 0000   SSFIND E 0000   TBFIND E 0000   TSTWTB E 0000   WTSTOR E 0000

USER SYMBOLS
AA     A 0041   AACK   A 0006   AB     A 0042   ABEL   A 0007   ABS    A 0008   AC     A 0043   ACAN   A 0018
ACR    A 000D   ACRR   E 0000   ACSNT  A 0060   AD     A 0044   ADC1   A 0011   ADC2   A 0012   ADC3   A 0013
ADC4   A 0014   ADDNTA E 0000   ADJPTR E 0000   ADLE   A 0010   AE     A 0045   AEM    A 0019   AENQ   A 0005
AEOT   A 0004   AESC   A 001B   AETB   A 0017   AETX   A 0003   AF     A 0046   AFF    A 000C   AFS    A 001C
AG     A 0047   AGS    A 001D   AH     A 0048   AHT    A 0009   AI     A 0049   AJ     A 004A   AK     A 004B
AL     A 004C   ALF    A 000A   ALFT   A 005F   ALP    A 0070   ALS    A 0073   AM     A 004D   AMOUNT D 01E5
AMPSND A 0026   AN     A 004E   ANAK   A 0015   ANUL   A 0000   AO     A 004F   AP     A 0050   APOS   A 0027
AQ     A 0051   AR     A 0052   ARS    A 001E   AS     A 0053   ASA    A 0061   ASB    A 0062   ASC    A 2063
ASD    A 0064   ASE    A 0065   ASF    A 0066   ASG    A 0067   ASH    A 0068   ASI    A 0069   ASIA   A 000F
ASJ    A 006A   ASK    A 006B   ASL    A 006C   ASM    A 006D   ASN    A 006E   ASO    A 006F   ASOA   A 000E
ASOH   A 0001   ASP    A 0020   ASQ    A 0071   ASR    A 0072   AST    A 0074   ASTRIC A 002A   ASTX   A 0002
ASU    A 0075   ASUB   A 001A   ASV    A 0076   ASW    A 0077   ASX    A 0078   ASY    A 0079   ASYN   A 0016
ASZ    A 007A   AT     A 0054   ATOFF  C 1231   AU     A 0055   AUS    A 001F   AUTOFF C 121F   AV     A 0056
AVT    A 000B   AW     A 0057   AX     A 0058   AY     A 0059   AZ     A 005A   B2B1   C 2FCB   B2B2   C 2FD0
B2B3   C 2FD9   B2B4   C 2FDE   B2BI16 C 1932   B2BI8  C 2FB8   B2BIA  C 196B   B2D1A7 E 0000   BASEPR D 01DA
BEEP   E 0000   BEEPFL D 003B   BEGIN  A 0000   BEPOFF A 0075   BLANK  A 002C   BLOAD1 C 1EEE   BLOAD2 C 1EED
BLOADR C 1EAD   BPOFFR C 3089   BUFBLR E 0000   BUSYB  C 17B1   BUSYBA C 17D1   BUSYBE C 17D0   BYDCHG C 1409
BYDG   C 1415   BYDIG0 D 021D   BYDIGT D 0216   CB1A   C 30DD   CB1B   C 30E2   CB2    C 30EE   CB3    C 30F4
CB4    C 30F6   CBUPD  C 30D3   CDISC1 C 309B   CDISCR C 3092   CHRATF A FFC1   CLKEY1 C 1175   CLKEYS C 1163
CLRFFR C 17D2   CLRSPD C 1A32   CLTA   C 16FE   CLTB   C 16F8   CLTC   C 1702   CLTD   C 170C   CLTE   C 1716
CLTF   C 1726   CMCB7A C 1ABA   CMD1   C 2BA3   CMD10  C 2CAD   CMD100 C 2CB2   CMD11  C 2CB6   CMD12  C 2CBA
CMD2   C 2CA5   CMD7   C 2CA0   CMDAD1 C 1D80   CMDAD2 C 1D88   CMDAD3 C 1D8C   CMDADF C 1D70   CMDCH1 C 1A4B
```

| | | | | | | |
|---|---|---|---|---|---|---|
| CMDCH2 C 1A58 | CMDCH3 C 1A62 | CMDCH4 C 1A63 | CMDCH5 C 1A6A | CMDCH6 C 1A82 | CMDCH7 C 1ABD | CMDCH8 C 1AC1 |
| CMDCH9 C 1AC4 | CMDCHA C 1ACE | CMDCHB C 1AD1 | CMDCHK C 1A47 | CMDFLT C 0071 | CMDKEY C 1D10 | CMDKY0 C 1D14 |
| CMDKY1 C 1D46 | CMDKY2 C 1D4C | CMDKY3 C 1D2F | CMDKY4 C 1D4F | CMDKYA C 1D39 | CMDKYB C 1D1A | CMDOS1 C 1DBE |
| CMDOS2 C 1DC3 | CMDOS3 C 1DC7 | CMDOS4 C 1DD5 | CMDOSF C 1D90 | CMDSL A 0018 | CMSMSK D 0069 | CMSTAT C 008B |
| CNCHKR C 30FA | CNR1 C 3123 | CNR2 C 312F | CNR3 C 3145 | CNR4 C 314B | CNR5 C 3151 | CNT1 C 3207 |
| CNT2 C 31D2 | CNT3 C 31D5 | CNT4 C 31F6 | CNT5 C 31E6 | CNT6 C 3201 | CNT7 C 31FD | CNTRFL D 004A |
| CNTRL A 0077 | CNTRLB D 004B | CNTRLR C 319D | CODNO A FFB5 | COLON A 003A | COMB D 0072 | COMDNN D 0204 |
| COMER A 0040 | COMNUM C 0083 | COMOD1 A 0044 | COMOD2 A 0040 | COMOD3 A 0045 | COMOD4 A 0054 | COMOD5 A 0050 |
| COMOD6 A 0055 | COMOD7 A 0051 | COMODA A 0041 | COMODB A 0075 | COMODC A 0071 | COMODD A 0083 | COMODE A 0064 |
| COMODR C 2BA2 | COMODS D 0073 | COMTAB C 006A | CONSA E 021C | CONTR A 0022 | CRAM A 6400 | CRGEN C 2202 |
| CRGEN1 C 2006 | CRNTCM D 01B2 | CRNTST D 01A1 | CSPRT C 1741 | CSPRT0 C 1795 | CSPRT1 C 179E | CSPRT2 C 17AB |
| CSPRT3 C 177A | CSPRT4 C 1764 | CUFIND E 0000 | CUFTS D 0048 | CUSLST C 1698 | CUSLT0 C 16CD | CUSLT1 C 16A7 |
| CUSLTA C 16BE | CUSLTE C 1733 | CUSPR C 15EB | CUSPR0 C 161F | CUSPR1 C 1609 | CUSPR2 C 162A | CUSPR3 C 1642 |
| CUSPR4 C 1679 | CUSPR5 C 166B | CUSPRA C 1610 | CUSPRE C 168C | CUST A 0060 | CUSTFL D 0049 | D2B1 E 0000 |
| D2BP E 0000 | DADDR D 0067 | DAMAGE A 0066 | DATSEG C 0223 | DAY D 0041 | DAYPR C 1367 | DAYPR2 C 1370 |
| DAYPRP C 1388 | DBDIS1 C 30AF | DBDIS2 C 30B4 | DBDIS3 C 30BD | DBDIS4 C 30C1 | DBDIS5 C 30CA | DBDISR C 30A7 |
| DDOT C 115D | DELET A 0011 | DELETF D 021B | DELETR C 1192 | DELETS C 11C0 | DELETZ C 2943 | DELEZZ C 295D |
| DESTOR D 01F6 | DFORMP D 0214 | DGN02 C 20C3 | DGN03 C 20DF | DGN1 C 210C | DGN10 C 20E2 | DGN11 C 2169 |
| DGN12 C 20EC | DGN13 C 20F0 | DGN14 C 2254 | DGN140 C 226B | DGN15 C 2105 | DGN16 C 2173 | DGN17 C 21C5 |
| DGN18 C 21CE | DGN19 C 218C | DGN19A C 2191 | DGN2 C 20BD | DGN20 C 21D2 | DGN200 C 21E9 | DGN21 C 21F6 |
| DGN22 C 21A8 | DGN23 C 21B4 | DGN24 C 21B9 | DGN25 C 214E | DGN26 C 2203 | DGN27 C 2212 | DGN28 C 221E |
| DGN29 C 2228 | DGN3 C 20C0 | DGN30 C 223C | DGN31 C 215F | DGN4 C 2112 | DGN5 C 213C | DGN6 C 2148 |
| DGN7 C 2123 | DGN8 C 2155 | DGN80 C 22A2 | DGN81 C 22A5 | DGN83 C 22B0 | DGN9 C 2165 | DGN90 C 2285 |
| DGN91 C 2288 | DGN93 C 2293 | DGN94 C 229C | DGNX C 224A | DGNZ C 2240 | DIG1 C 1A15 | DIG2 C 1A23 |
| DIG3 C 1A26 | DIG4 C 1A2C | DIGINR C 20AA | DIGITR C 1A0D | DIGNA C 200F | DIGNA1 C 2023 | DIGNB C 2034 |
| DIGNB1 C 204E | DIGNB2 C 2085 | DIGNB3 C 2087 | DIM00 D 01A6 | DIM01 D 01A7 | DIM02 D 01A8 | DIM03 D 01A9 |
| DIM08 D 01AA | DIM09 D 01AB | DIM10 D 01AC | DIM11 D 01AD | DIM16 D 01AE | DIM17 D 01AF | DIM18 D 01B0 |
| DIM19 D 01B1 | DIM24 D 01B2 | DIM25 D 01B3 | DIM26 D 01B4 | DIM27 D 01B5 | DIS00 A 8800 | DIS01 A 8801 |
| DIS02 A 8802 | DIS03 A 8803 | DIS08 A 8808 | DIS09 A 8809 | DIS10 A 880A | DIS11 A 880B | DIS16 A 8810 |
| DIS17 A 8811 | DIS18 A 8812 | DIS19 A 8813 | DIS24 A 8818 | DIS25 A 8819 | DIS26 A 881A | DIS27 A 881B |
| DISCNT D 01F4 | DISUP1 C 28BF | DISUP2 C 28C1 | DISUPR C 28B3 | DLNGTH D 0066 | DLYPR A 0006 | DLYR E 0000 |
| DMGFL D 01D6 | DMSG1 C 05BC | DMSG10 C 07AE | DMSG11 C 07DE | DMSG12 C 080F | DMSG13 C 0814 | DMSG14 C 0833 |
| DMSG15 C 0853 | DMSG16 C 0888 | DMSG2 C 05D2 | DMSG20 C 08B4 | DMSG21 C 08E4 | DMSG22 C 0914 | DMSG23 C 0A1A |
| DMSG24 C 0A68 | DMSG25 C 0A2E | DMSG26 C 0B8C | DMSG27 C 0BB2 | DMSG28 C 0BBE | DMSG29 C 0BC4 | DMSG3 C 05E6 |
| DMSG30 C 0BCE | DMSG31 C 0BDC | DMSG32 C 0BEB | DMSG33 C 0BF2 | DMSG34 C 0C1E | DMSG35 C 0D87 | DMSG36 C 0EB9 |
| DMSG37 C 0F2C | DMSG38 C 0F9F | DMSG39 C 1034 | DMSG4 C 05FE | DMSG5 C 0614 | DMSG6 C 062A | DMSG7 C 0640 |
| DMSG8 C 0656 | DMSG9 C 0710 | DMSGA C 1081 | DMSGC C 108A | DMSGD C 109D | DOLLAR A 0024 | DOT A 0031 |
| DPFLAG D 0047 | DPMD10 C 2805 | DPRK A 0046 | DRSET C 11D2 | DRSET0 C 11DC | DRSET1 C 11F0 | DRSET2 C 1202 |
| DRSETY C 280A | DSCALE D 0064 | DSIGN D 0063 | DSPL10 C 2A3E | DSPL11 C 2A48 | DSPL13 C 2A55 | DSPL14 C 2A5D |
| DSPLY1 C 29A5 | DSPLY2 C 29C6 | DSPLY3 C 29D6 | DSPLY4 C 29DA | DSPLY5 C 29E6 | DSPLY6 C 29FB | DSPLY7 C 2A12 |
| DSPLY8 C 2A1C | DSPLY9 C 2A2C | DSPLYA C 2A67 | DSPLYR C 298A | DSTOR0 D 01B7 | DSTOR1 D 01B9 | DTDIS1 C 1F04 |
| DTDISR C 1EEF | DTR1 C 1865 | DTR3 C 187C | DTRAN0 C 1841 | DTRANR C 1825 | DTRANS A 0057 | DTRFL D 020A |
| DTSTF1 C 1F1C | DTSTF2 C 1F38 | DTSTF3 C 1F3F | DTSTF4 C 1F44 | DTSTF5 C 1F4F | DTSTF6 C 1F53 | DTSTFR C 1F12 |
| DYPP0 C 13F4 | DYPP01 C 13CF | DYPP9 C 1549 | DYPRP0 C 139E | DYPRP1 C 1395 | EIGHT A 0004 | EMERFL D 002D |
| ENCMTR C 0071 | ENSTAK A 8300 | ENTER A 0065 | ENTER1 C 1E0E | ENTER2 C 1E26 | ENTER3 C 1E28 | ENTER4 C 1E41 |
| ENTER5 C 1E46 | ENTER6 C 1E6B | ENTER7 C 1E76 | ENTER8 C 1E7B | ENTER9 C 1E8D | ENTERR C 1DF4 | ENTKEY C 1CDF |
| ENTKY0 C 1D05 | ENTKY1 C 1D06 | ENTKY2 C 1CE3 | ENTKY3 C 1CF1 | ENTKY4 C 1CE7 | ENTKYA C 1CD7 | ENTR01 C 1E20 |
| ENTR10 C 1E99 | ENTR11 C 1EA1 | EQUAL A 003D | ERDASH C 1186 | ERDIS C 2918 | ERFLB D 002B | EXC A 0021 |
| EXRAM A C000 | EXT1 C 27DE | EXT2 C 27E0 | EXT3 C 27F5 | EXT4 C 27FE | EXTEND C 27D6 | FADD E 0000 |
| FALSE A 0000 | FCN1 C 293C | FCNLCR C 2902 | FFEED A 0043 | FFEEDF C 135A | FIVE A 0000 | FLAG1 D 0168 |
| FLAG2 D 0169 | FLOAD E 0000 | FM A 0062 | FMFL D 01D2 | FNUMD D 0154 | FNUMD1 D 0171 | FNUMD2 D 017C |
| FNUMD3 D 018B | FNUMF D 005F | FNUMF1 D 0181 | FNUMF2 D 0186 | FNUMF3 D 0190 | FOUR A 0010 | FPR D 004D |
| FQFB2D E 0000 | FQFD2B E 0000 | FRFSET E 0000 | FSET E 0000 | FSTAT E 0000 | FSTFL D 003E | FSTOR E 0000 |
| GACFLG D 0205 | GACMN E 0000 | GETWT2 E 0000 | GKEY C 2B90 | GKEY1 C 2B9E | GKEY2 C 2B9D | GL1 C 3197 |
| GMSGFL D 0226 | GPRSLT C 2C99 | GRICON A FEAC | GRISAL A FE68 | GRISTR A FED0 | GRNLIT C 3188 | GROSBU D 01C4 |
| GRSCMB D 0227 | GRSCMC D 026F | GRSCMD D 0293 | GRSCMS D 024B | GRSCMT D 02B7 | GRSDOL D 01A2 | GRSNET D 0150 |
| GRSSTK A FE1C | HADCT1 A FEF4 | HADCT2 A FF6B | HADCT3 A FF6C | HEADG E 0000 | HOUR D 0044 | INIT0 C 2E5B |
| INIT1 C 2EEA | INIT2 C 2F23 | INIT20 C 2F29 | INIT3 C 2F10 | INIT4 C 2F7A | INIT5 C 2F89 | INIT6 C 2F66 |
| INPB D 003F | INT55 C 17DD | INT65 C 1234 | INT75 C 1557 | INT751 C 15AB | INT752 C 15B0 | INT753 C 15BA |
| INT754 C 15CF | INT755 C 15C5 | INTAK1 C 2C76 | INTAK2 C 2C8A | INTR A 8828 | INVALR C 1205 | KBRCE C 126D |
| KEYBD C 1267 | KEYBD0 C 12C4 | KEYBD2 C 12E2 | KEYBD4 C 12E8 | KEYBD6 C 12F7 | KEYCNT D 0028 | KEYDIG C 0060 |
| KEYDIS C 19C5 | KEYDS1 C 19D2 | KEYDS2 C 19ED | KEYDS3 C 19F3 | KEYDWN C 117E | KEYFLG E 0000 | KEYIN E 0000 |
| KEYPTR D 0029 | KEYSEG C 00DE | KEYTAB C 00B8 | KMAX A 0014 | KRAM A FC00 | KYSTR D 0000 | KYTAB1 C 004C |
| KYTAB2 C 0043 | LABR A 003C | LDINC C 286A | LEFT A 007B | LFTB A 005B | LINEFL D 01E0 | LOAD10 C 2E66 |
| LOAD20 C 2E93 | LOADA C 2E57 | LOADA1 C 2E7F | LOADA2 C 2E66 | LOADA3 C 2E6F | LOADB C 2E4A | LOADNO D 01E4 |
| LOCK A 0076 | LOCK1 C 1998 | LOCK3 C 19AD | LOCKFL D 002C | LOCKR C 198E | LPAR A 0028 | LSLASH A 005C |
| MACR E 0000 | MAXLCD D 01E3 | MBFULL C 0235 | MBU C 04CD | MCMD1 C 0673 | MCMD2 C 068A | MCMTAB C 0211 |
| MCOM1 C 01C2 | MCOM2 C 01CA | MCOM3 C 01D2 | MCOM4 C 01DA | MCOM5 C 01E6 | MCOM6 C 01EF | MCOM7 C 01F8 |
| MCOM8 C 0201 | MCOM9 C 0209 | MCPRG C 0327 | MCSUF C 0315 | MCWT C 04D3 | MDANG C 041B | MDKGFR C 037A |
| MDKSUF C 04BE | MDLBS C 04C2 | MDOCK C 04A7 | MFOP C 0502 | MFM C 03FF | MFORM C 1360 | MHEAD1 A FEF9 |
| MHEAD2 A FF23 | MHEAD3 A FF6D | MHEADG E 0000 | MHRDAT C 031B | MIN D 0045 | MINDMG A 0086 | MINFM A 0067 |
| MINTW A 0085 | MINUS A 002D | MKRAM A FDF8 | MLBS C 0453 | MMINF1 C 04BA | MMINFM C 0473 | MMINTW C 0459 |
| MMNDMG C 048D | MMOISA C 0394 | MMOISB C 03B0 | MMOIST C 03CC | MNPEA C 10B1 | MNPL C 056D | MOIST A 0067 |
| MOISTA A 0080 | MOISTB A 0081 | MOISTP D 019A | MONTH D 0042 | MORGFL D 0215 | MPJE C 02B8 | MPJE1 C 0255 |
| MPOSR7 E 0000 | MPRIC C 0341 | MPRER C 04DA | MRGFL C 2308 | MSELF C 035D | MSGA4 E 0000 | MSGA5 E 0000 |
| MSGELB E 0000 | MSGELC E 0000 | MSHPAC C 03E8 | MSO C 056B | MSTAMT D 0206 | MSTAVG E 0000 | MSTFL D 01CE |
| MSTMIN C 0094 | MSTSTA D 014B | MTDNE C 02DA | MTRDEL C 02FB | MTW C 0437 | NCNTRL A 0010 | NCOMOD A 0209 |
| NETAMG A FD20 | NETAMS A FCFC | NETAVG D 014C | NETBU D 01C9 | NETCMB A FC00 | NETCMC A FC48 | NETCMD A FC6C |
| NETCMG A FCB4 | NETCMS A FC24 | NETCMT A FC90 | NETMST A FCD8 | NETWT D 01BF | NINE A 0034 | NPORTS A 0002 |
| NPRGFL D 01A0 | NPRGR C 2FE3 | NTRANS A 00D2 | NUM A 0023 | OFF A 0047 | OFFFL D 002E | OFFR C 2F8D |
| ONE A 0015 | OSLDFC A FD8C | OSLTOT A FE40 | OUTPT A 9000 | PADJ C 142A | PADJ1 C 146D | PADJ4 C 14A0 |
| PADJ5 C 14C1 | PADJ6 C 14DB | PADJ7 C 14DE | PADJ8 C 14E9 | PADJ9 C 150D | PADJST C 1420 | PCHAR E 0000 |
| PCMNAM E 0000 | PCUSN E 0000 | PERCNT A 0025 | PERIOD A 002E | PERRFL D 0030 | PFORMA E 0000 | PFORMB E 0000 |
| PINTAK C 2BB3 | PJOURN A 0072 | PLOC1 C 296C | PLOC2 C 2976 | PLOC3 C 297B | PLOCC C 2984 | PLOCK A 0042 |
| PLOCKR C 2960 | PLUS A 002B | PMASG E 0000 | PMOSTB E 0000 | PNET1 E 0000 | PORTS A 8600 | POSNO A FFEE |
| POSRCD E 0000 | PPCUST C 153D | PPORT A FFC2 | PPROG1 C 2D4E | PPROG2 C 2D93 | PPROG3 C 2D9F | PPROG4 C 2DDC |
| PPROG5 C 2DF4 | PPROG6 C 2E3D | PPROG7 C 2DCB | PPROGA C 2E08 | PPWT C 1531 | PRCOLN C 2D39 | PRDT1 C 2CDC |
| PRDT2 C 2CFF | PRDT3 C 2D0D | PRDTR C 2CCB | PRESFL D 019F | PRGD0 C 1F61 | PRGD1 C 1F72 | PRGD10 C 1FC5 |
| PRGD12 C 1FCC | PRGD2 C 1FBA | PRGD3 C 1FD4 | PRGD30 C 1FE8 | PRGD31 C 1FE5 | PRGD4 C 1FF7 | PRGD6 C 1F85 |
| PRGD60 C 1F9E | PRGD7 C 1FAE | PRGD8 C 1F92 | PRGD9 C 1FFE | PRGDA C 1F67 | PRGFL D 003A | PRGM1 C 1AE9 |
| PRGM11 C 1AF2 | PRGM1A C 1B07 | PRGM2 C 1B08 | PRGM2A C 1B0B | PRGM3 C 1B96 | PRGM4 C 1C78 | PRGM4A C 1C83 |
| PRGM4B C 1C69 | PRGM4C C 1C95 | PRGM5 C 1B0E | PRGM5A C 1B13 | PRGM6 C 1B9E | PRGM60 C 1C5E | PRGM61 C 1C04 |
| PRGM62 C 1BFE | PRGM66 C 1BCC | PRGM67 C 1C0D | PRGM68 C 1C39 | PRGM69 C 1C25 | PRGM6A C 1BF4 | PRGM6B C 1BBF |
| PRGM6C C 1BFA | PRGM6D C 1C5C | PRGM6E C 1BFF | PRGM6F C 1C54 | PRGM7 C 1D54 | PRGM7A C 1D5D | PRGMR C 1AD7 |
| PRGMX C 1CA2 | PRGMX0 C 1CC7 | PRGMX1 C 1CCD | PRGMX2 C 1CD2 | PRGMX3 C 1CAF | PRICE A 0063 | PRICFF D 016B |
| PRINT A 0064 | PRINTF D 0039 | PRINTR A 9007 | PRJDA E 0000 | PRJR E 0000 | PRJRA E 0000 | PRJRFL D 016A |
| PRJRR C 1300 | PRJRR1 C 1307 | PRJRR2 C 1330 | PRJRR4 C 130A | PRJRR5 C 134F | PRJRR6 C 1327 | PRLOC0 D 0037 |
| PRLOC1 D 0038 | PRLOCK D 0036 | PRLR E 0000 | PRN4 C 2AAF | PRN40 C 2ABD | PRN41 C 2AA0 | PRN5 C 2AC2 |
| PRN9 C 2B4F | PRNB C 2B06 | PRNB01 C 2AF3 | PRNB1 C 2B2D | PRNB10 C 2B88 | PRNB11 C 2B28 | PRNB5 C 2B3F |
| PRNB6 C 2B5F | PRNB8 C 2B73 | PRNB9 C 2B70 | PRNB9A C 2B84 | PRNC C 2A92 | PRND C 2AE7 | PRNDV C 2AD2 |
| PRNE C 2ACC | PRNTR C 2A6E | PROGDR C 1F5F | PROGDT A 0052 | PROGRM A 0053 | PRPRGR C 2D3E | PRSET C 1B1E |
| PRSET0 C 1B75 | PRSET1 C 1B82 | PRSET2 C 1B24 | PRSET3 C 1B90 | PRSET4 C 1B47 | PRSET5 C 1B67 | PRSET6 C 1B51 |
| PRSLT E 0000 | PRSLTA E 0000 | PTIKT E 0000 | PWRFL D 002F | QUES A 003F | QUOTE A 0022 | RABR A 003E |
| RAM A 8000 | RBOUT A 007F | RBUFF0 A 0C00 | RDL1 C 3161 | RDL2 C 3162 | RDL3 C 3167 | RDL4 C 3177 |
| RDL5 C 317D | RDL6 C 3185 | REALC C 125D | REDLIT C 3155 | RGHT A 007D | ROM A 0000 | ROUNDF D 020B |

```
RPAR    A 0029   RSLASH A 002F   RTB    A 005D   RUNFR  D 0195   SAVFTR D 0212   SCALEA A 0000   SCALEB A 00FF
SCOMN   D 0170   SDUPR  C 28D5   SECS   D 0046   SEG0   A 003F   SEG1   A 0006   SEG2   A 005B   SEG3   A 004F
SEG4    A 0066   SEG5   A 006D   SEG6   A 007C   SEG7   A 0007   SEG8   A 007F   SEG9   A 0067   SEGA   A 0077
SEGB    A 007C   SEGBL  A 0000   SEGC   A 0039   SEGD   A 005E   SEGDF  A 0080   SEGE   A 0079   SEGF   A 0071
SEGG    A 006F   SEGH   A 0076   SEGHM  A 0037   SEGI   A 0004   SEGJ   A 001E   SEGL   A 0038   SEGLC  A 0058
SEGHR   C 1136   SEGN   A 0054   SEGO   A 005C   SEGP   A 0073   SEGR   A 0050   SFGS   A 006D   SEGT   A 0078
SEGTAB  C 0050   SEGU   A 001C   SEGY   A 006E   SELL   A 0003   SELLFL D 019E   SEMCOL A 003B   SEMSG  C 110F
SERNO   A FEF5   SERNR  C 1971   SERNR1 C 197B   SERV   D 01EA   SERVFL D 01E1   SERVIC A 0036   SFT1   C 2FF4
SET10   C 3062   SETGRN E 0000   SETLEF D 0203   SETPR  C 2FEF   SETPR1 C 3005   SETPR2 C 302F   SETPR3 C 3066
SETPR4  C 305F   SETPR5 C 3025   SETPR6 C 3060   SETPR7 C 3054   SETPR8 C 302A   SETPT  E 0000   SETPTA E 0000
SETSHT  A 0056   SEVEN  A 0014   SHARE  A 0032   SHAREF D 0202   SHMSG  C 10E9   SHORTF A FFC0   SHRFAC A 0082
SIX     A 0030   SKYFIG E 0000   SMLR   E 0000   SPACE  C 1151   SPACE1 C 1154   SPD1   C 1A3B   SHNKFL D 003C
SRVRT   D 01EF   SSFIND E 0000   SSNO   A FFBC   STATUS D 003D   STFRMF C 154F   STORE  A 0007   STRET  C 1258
STRETM  C 1252   STSTAK A 83FF   TESTWT A 0073   THREE  A 0035   TKSTR  D 01BA   TOTDOC D 01F9   TPMD1  C 26AA
TRAD1   C 18B3   TRAD2  C 18PF   TRAD3  C 18CF   TRAD4  C 18D7   TRAD5  C 18E3   TRAD6  C 18EF   TRAD7  C 1910
TRAD8   C 191F   TRAD9  C 192E   TRADIS C 1888   TRANFL D 01BB   TRANS1 C 2823   TRANS2 C 2878   TRANS3 C 288C
TRANS4  C 2854   TRANS5 C 28AF   TRANSL A 0026   TRANSR C 281D   TRAPR  C 1147   TRASTA D 01DF   TRFIND E 0000
TRNCTR  D 0032   TRP00  C 24D7   TRP10  C 24D0   TRPDV0 C 2461   TRPGAC C 24B0   TRPM0  C 22F5   TRPM01 C 22FA
TRPM02  C 2644   TRPM03 C 2637   TRPM04 C 23DE   TRPM05 C 23AC   TRPM06 C 23AB   TRPM07 C 23A2   TRPM08 C 257A
TRPM09  C 2572   TRPM1  C 2316   TRPM10 C 253B   TRPM11 C 2546   TRPM12 C 25D6   TRPM13 C 25DD   TRPM14 C 25E2
TRPM15  C 2656   TRPM16 C 265B   TRPM17 C 2660   TRPM18 C 2665   TRPM19 C 2667   TRPM2  C 2328   TRPM20 C 267E
TRPM21  C 2549   TRPM22 C 2468   TRPM23 C 2469   TRPM24 C 2472   TRPM26 C 2649   TRPM27 C 262B   TRPM28 C 26F5
TRPM29  C 26D6   TRPM3  C 232F   TRPM30 C 2715   TRPM31 C 26F9   TRPM32 C 2746   TRPM33 C 2758   TRPM34 C 23E1
TRPM35  C 2460   TRPM36 C 2404   TRPM37 C 2419   TRPM4  C 2332   TRPM40 C 276E   TRPM5  C 247C   TRPM50 C 2789
TRPM51  C 27B8   TRPM52 C 2799   TRPM53 C 279C   TRPM6  C 2669   TRPM60 C 242D   TRPM61 C 245E   TRPM62 C 244C
TRPM63  C 2456   TRPM64 C 242A   TRPM7  C 2722   TRPM71 C 23FF   TRPM72 C 23D8   TRPM73 C 23D2   TRPM8  C 251F
TRPM9   C 2530   TRPME1 C 258A   TRPME2 C 257F   TRPME3 C 25A0   TRPME4 C 2460   TRPME6 C 24A6   TRPME7 C 248B
TRPME9  C 24A3   TRPMER C 22B7   TRPMM1 C 2327   TRPSTR D 0031   TRUE   A 00FF   TSTWTB E 0000   TWFL   D 01FE
TWO     A 0005   UF     A 005E   VLIN   A 007C   WAIT   C 2F69   WAITFL D 0035   WAVY   A 007E   WDUPR  C 17EA
WOGDEC  A FDD4   WOGINC A FDB0   WOGTOT A FE64   WOM00  C 0041   WRLCAN A FD68   WRLISS A FD44   WRLOUT A FDF8
WTIN    A 0033   WTOUT  A 0037   WTSTOR E 0000   YEAR   D 0043   ZERO   A 0001

ASSEMBLY COMPLETE,   NO ERRORS
```

ISIS-II 8080/8085 MACRO ASSEMBLER, V3.0          PRCHAR

```
LOC  OBJ          LINE        SOURCE STATEMENT

                        ;
                        ;;;;;;;;;;;;;;;;;;;;;;;;;;;;;;;;;;;;;;;;;;;;;;;;;;;;;;;;;;;;;;;
                        ;
                        ;       PRINT CHARACTER ROUTINE
                        ;
                        ;       THIS ROUTINE IS PASSED AN ASCII CHARACTER IN THE
                        ;       C REGISTER AND OUTPUTS IT TO THE PRINTER
                        ;       WHOSE ABSOLUTE ADDRESS IS IN AN EXTERNAL
                        ;       WORD STORE CALLED "PPORT". IT FIRST CHECKS
                        ;       THE FOLLOWING PRINTER STATUS (IN ORDER):
                        ;               A)PAPER OUT
                        ;               B)ON LINE
                        ;               C)BUSY (3 SECOND TIME-OUT)
                        ;
                        ;       THE BIT INFORMATION IS RETURNED BY THE PRINTER
                        ;       AND READ ON THE PD-3 INTERFACE BOARD AT "PPORT"
                        ;       IN BIT LOCATIONS:
                        ;
                        ;       B0) BUSY/READY-BAR
                        ;       B1) ACKNOWLEDGE-BAR
                        ;       B2) PAPER OUT
                        ;       B3) ON-LINE
                        ;       B4) ENABLED
                        ;       B5) FAULT
                        ;       B6) NOT USED (LOGIC 1 FOR A READ)
                        ;       B7) NOT USED (LOGIC 1 FOR A READ
                        ;
                        ;       THE STATUS BYTE "PSTAT" UPON RETURN FROM PCHAR
                        ;       WILL HOLD ENCODED RESULTS OF THE ATTEMPT
                        ;       TO SEND THE CHARACTER. THIS ENCODING IS
                        ;
                        ;       PSTAT           MEANING
                        ;       -----           --------
                        ;       00H             NO ERROR. CHARACTER WAS SENT
                        ;       01H             PAPER OUT. CHARACTER NOT SENT
                        ;       02H             OFF LINE. CHARACTER NOT SENT
                        ;       03H             BUSY TIME-OUT. CHAR NOT SENT
                        ;
                        ;       THE CY FLAG UPON RETURN WILL ALSO INDICATE
                        ;       THE SUCCESS OR FAILURE OF OF THE ATTEMPT
                        ;       TO SEND THE CHARACTER
                        ;       CY = 1      SUCCESS
                        ;       CY = 0      NO SUCCESS
                        ;
                        ;;;;;;;;;;;;;;;;;;;;;;;;;;;;;;;;;;;;;;;;;;;;;;;;;;;;;;;;;;;;;;;;
                        ;
                                NAME    PRCHAR
                        ;
                        ;;;;;;;;;;;;;;;;;;;;;;;;;;;;;;;;;;;;;;;;;;;;;;;;;;;;;;;;;;;;;;;;
                        ;
                                PUBLIC  PCHAR,PSTAT
                        ;
                        ;;;;;;;;;;;;;;;;;;;;;;;;;;;;;;;;;;;;;;;;;;;;;;;;;;;;;;;;;;;;;;;;
                        ;
                                EXTRN   PPORT,DLYR,OFFFL,PERR
                        ;
                        ;;;;;;;;;;;;;;;;;;;;;;;;;;;;;;;;;;;;;;;;;;;;;;;;;;;;;;;;;;;;;;;;
                        ;
                        ;       PRINTER PORT EQUATES
                        ;
```

```
LOC  OBJ              SOURCE STATEMENT

                      ;;;;;;;;;;;;;;;;;;;;;;;;;;;;;;;;;;;;;;;;;;;;;;;;;;;;;;;;;;;;;;;;;;;;;;;;;;;;
                      ;
0001                  BSYM    EQU     01H          ;BUSY MASK
0002                  ACKM    EQU     02H          ;ACKNOWLEDGE-BAR MASK
0004                  POUTM   EQU     04H          ;PAPER OUT MASK
0008                  ONLINM  EQU     08H          ;ON-LINE MASK
0010                  ENABM   EQU     10H          ;ENABLED MASK
0020                  FAULTM  EQU     20H          ;FAULT MASK
0080                  STROFF  EQU     80H          ;STROBE OFF MASK
007F                  STRON   EQU     7FH          ;STROBE ON MASK
                      ;
                      ;;;;;;;;;;;;;;;;;;;;;;;;;;;;;;;;;;;;;;;;;;;;;;;;;;;;;;;;;;;;;;;;;;;;;;;;;;;;
                      ;
                              DSEG
                      ;
0000                  PSTAT:  DS      1            ;PRINTER STATUS BYTE
                      ;
                              CSEG
                      ;
0000 B7               PCHAR:  ORA     A            ;CLEAR CY
0001 C5                       PUSH    B
0002 D5                       PUSH    D
0003 E5                       PUSH    H
0004 F5                       PUSH    PSW          ;SAVE ALL REGS
0005 3A0000   E               LDA     OFFFL        ;ARE WE OFF
0008 B7                       ORA     A
0009 C25000   C               JNZ     PCHAR4       ;IF SO, TAKE SUCCESSFUL EXIT PATH
000C AF                       XRA     A
000D 320000   D               STA     PSTAT        ;STATUS = 0 UPON ENTRY
0010 47                       MOV     B,A
0011 04                       INR     B            ;B REG AN ERROR COUNTER, B=1
0012 2A0000   E               LHLD    PPORT        ;ADDRESS OF ACTIVE PRINTER
0015 3E04                     MVI     A,POUTM
0017 A6                       ANA     M            ;PAPER OUT CHECK
0018 C23900   C               JNZ     PCHAR2       ;ERROR EXIT PATH
001B 3E08                     MVI     A,ONLINM
001D 04                       INR     B            ;ERROR COUNTER = 2
001E A6                       ANA     M            ;ON-LINE CHECK
001F CA3900   C               JZ      PCHAR2       ;ERROR EXIT PATH
0022 11B80B                   LXI     D,3000       ;3 SECOND BUSY TIME-OUT COUNTER
0025 04                       INR     B            ;ERROR COUNTER = 3
0026 C5                       PUSH    B            ;SAVE COUNTER & CHARACTER
0027 0E01                     MVI     C,1          ;1MS. DELAY SET-UP
0029 CD0000   E       PCHAR1: CALL    DLYR         ;DELAY
002C 3E01                     MVI     A,BSYM
002E A6                       ANA     M            ;CHECK FOR PRINTER BUSY
002F CA4500   C               JZ      PCHAR3       ;PRINTER READY, TAKE JUMP
0032 1B                       DCX     D            ;TIME-OUT COUNTER
0033 7B                       MOV     A,E
0034 B2                       ORA     D            ;TIME-OUT COUNTER = 0?
0035 C22900   C               JNZ     PCHAR1       ;NO, TRY AGAIN
0038 C1                       POP     B            ;STACK NEUTRAL
0039 78               PCHAR2: MOV     A,B          ;FETCH ERROR COUNTER
003A 320000   D               STA     PSTAT        ;STATUS BYTE SET
003D CD0000   E               CALL    PERR         ;PRINTER ERROR HANDLER
0040 F1                       POP     PSW
0041 E1                       POP     H
0042 D1                       POP     D
0043 C1                       POP     B
0044 C9                       RET                  ;POP ALL & RETURN WITH CY = 0
0045 C1               PCHAR3: POP     B            ;FETCH CHARACTER FROM STACK
0046 79                       MOV     A,C
0047 F680                     ORI     STROFF       ;SOFTWARE STROBE OFF MASK
0049 77                       MOV     M,A          ;CHARACTER OUT, NO STROBE
004A E67F                     ANI     STRON        ;SOFTWARE STROBE ON MASK
004C 77                       MOV     M,A          ;CHARACTER OUT, STROBE ON (LOW)
004D F680                     ORI     STROFF       ;STROBE BACK OFF
004F 77                       MOV     M,A          ;AND OUTPUT
0050 F1               PCHAR4: POP     PSW
0051 37                       STC                  ;SUCCESS FLAG SET
0052 E1                       POP     H
0053 D1                       POP     D
0054 C1                       POP     B
0055 C9                       RET                  ;POP ALL & RETURN, CY = 0, PSTAT = 0
                      ;
                              END

PUBLIC SYMBOLS
PCHAR  C 0000    PSTAT  D 0000

EXTERNAL SYMBOLS
DLYR   E 0000    OFFFL  E 0000    PERR   E 0000    PPORT  E 0000

USER SYMBOLS
ACKM   A 0002    BSYM   A 0001    DLYR   E 0000    ENABM  A 0010    FAULTM A 0020    OFFFL  E 0000    ONLINM A 0008
PCHAR  C 0000    PCHAR1 C 0029    PCHAR2 C 0039    PCHAR3 C 0045    PCHAR4 C 0050    PERR   E 0000    POUTM  A 0004
PPORT  E 0000    PSTAT  D 0000    STROFF A 0080    STRON  A 007F

ASSEMBLY COMPLETE,   NO ERRORS
```

```
ISIS-II 8080/8085 MACRO ASSEMBLER, V3.0        GENCUF

LOC  OBJ        LINE        SOURCE STATEMENT

                 ;
                 ;;;;;;;;;;;;;;;;;;;;;;;;;;;;;;;;;;;;;;;;;;;;;;;;;;;;;;;;;;;;;;;;
                 ;
                 ;                 CUFIND, TRFIND, & BUFBLK
                 ;
                 ;         THE CUFIND ROUTINE IS PASSED THE CUST # IN THE BC PAIR
                 ;         AND THE DESIRED LOAD # IN THE A REG. ITS JOB IS TO
                 ;         FIND THE CORRESPONDING TRANSACTION IN THE BFR
                 ;
                 ;         THE TRFIND ROUTINE IS PASSED THE TRANS # IN THE BC PAIR
                 ;         ITS JOB IS TO FIND THAT TRANS IN THE BFR.
                 ;
                 ;         THE BUFBLK ROUTINE IS PASSED NOTHING IN ANY REGISTER.
                 ;         ITS JOB IS TO FIND THE NEXT BLANK SPOT IN THE BFR.
                 ;
                 ;         ALL THREE ROUTINES RETURN CARRY AS A SUCCESS AND NO CARRY
                 ;         IF NOT SUCCESSFUL. ALSO, IF SUCCESSFUL, ALL THREE ROUTINES
                 ;         RETURN THE TRANSACTION STATUS ADDRS IN H&L, AND THE TRANS
                 ;         BYTE 0 IN THE D&E PAIR.
                 ;
                 ;;;;;;;;;;;;;;;;;;;;;;;;;;;;;;;;;;;;;;;;;;;;;;;;;;;;;;;;;;;;;;;;;;;
                 ;
                         NAME    GENCUF
                 ;
                 ;
                 ;               EQUATES
C000             BFR     EQU     0C000H          ;START OF TRANSACTION BFR
0027             TRANL   EQU     39              ;LENGTH OF ONE TRANS
                 ;
                         PUBLIC  CUFIND,TRFIND,BUFBLK
                 ;
                         EXTRN   BFMAX,MAXBUF,NTRANS
                 ;
                         DSEG
                 ;
0000             TRNCTR: DS      2               ;TRANSACTION COUNTER
0002             TMP:    DS      2               ;TEMPORARY SCRATCH STORE
                 ;
                         CSEG
                 ;
                 $INCLUDE(:F1:MAC85.DEF)
               = ;THIS IS AN "INCLUDE" FILE OF 8085 MACRO DEFINITIONS
               = ;
               = ;;;;;;;;;;;;;;;;;;;;;;;;;;;;;;;;;;;;;;;;;;;;;;;;;;;;;;;;;;;;;
               = ;
               = ;       DOUBLE SUBTRACT, (H,L) = (H,L) - (B,C)
               = ;
               = ;;;;;;;;;;;;;;;;;;;;;;;;;;;;;;;;;;;;;;;;;;;;;;;;;;;;;;;;;;;;;
               = ;
               = DSUB    MACRO
-              =         DB      08H
               =         ENDM
               = ;
               = ;;;;;;;;;;;;;;;;;;;;;;;;;;;;;;;;;;;;;;;;;;;;;;;;;;;;;;;;;;;;;
               = ;
               = ;       ARITHMETIC SHIFL H&L LEFT
               = ;       H7=H7, H(N)=H(N -1), L7=H0, L(N-1)=L(N), CY=L0
               = ;
               = ;;;;;;;;;;;;;;;;;;;;;;;;;;;;;;;;;;;;;;;;;;;;;;;;;;;;;;;;;;;;;;
               = ;
               = ARHL    MACRO
-              =         DB      10H
               =         ENDM
               = ;
               = ;;;;;;;;;;;;;;;;;;;;;;;;;;;;;;;;;;;;;;;;;;;;;;;;;;;;;;;;;;;;;;
               = ;
               = ;       ROTATE D,E LEFT THRU CARRY
               = ;
               = ;;;;;;;;;;;;;;;;;;;;;;;;;;;;;;;;;;;;;;;;;;;;;;;;;;;;;;;;;;;;;;;
               = ;
               = RDEL    MACRO
-              =         DB      18H
               =         ENDM
               = ;
               = ;;;;;;;;;;;;;;;;;;;;;;;;;;;;;;;;;;;;;;;;;;;;;;;;;;;;;;;;;;;;;;
               = ;
               = ;       LOAD D,E WITH H,L PLUS IMMEDIATE BYTE
               = ;
               = ;;;;;;;;;;;;;;;;;;;;;;;;;;;;;;;;;;;;;;;;;;;;;;;;;;;;;;;;;;;;;;
               = ;
               = LDHI    MACRO   INDEX
-              =         DB      28H
-              =         DB      INDEX
               =         ENDM
               = ;
               = ;;;;;;;;;;;;;;;;;;;;;;;;;;;;;;;;;;;;;;;;;;;;;;;;;;;;;;;;;;;;;;;
               = ;
               = ;       LOAD D,E WITH SP + IMMEDIATE BYTE
               = ;
               = ;;;;;;;;;;;;;;;;;;;;;;;;;;;;;;;;;;;;;;;;;;;;;;;;;;;;;;;;;;;;;;;
               = ;
               = LDSI    MACRO   INDEX
-              =         DB      38H
-              =         DB      INDEX
               =         ENDM
               = ;
               = ;;;;;;;;;;;;;;;;;;;;;;;;;;;;;;;;;;;;;;;;;;;;;;;;;;;;;;;;;;;;;;;;
               = ;
               = ;       RSTV    RESTART IF OVERFLOW
               = ;
               = ;       VECTOR TO 40H WITH PC PUSHED ONTO STACK
```

```
LOC  OBJ        LINE        SOURCE STATEMENT

                ;
                ;;;;;;;;;;;;;;;;;;;;;;;;;;;;;;;;;;;;;;;;;;;;;;;;;;;;;;;;;;;;;;;;;;;;;;
                ;
                RSTV    MACRO
                        DB      CBH
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       STORE H,L INDIRECT THRU D,E ADDRESS
                ;
                ;;;;;;;;;;;;;;;;;;;;;;;;;;;;;;;;;;;;;;;;;;;;;;;;;;;;;;;;;;;;;;;;;;;;;;
                ;
                SHLX    MACRO
                        DB      0D9H
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       LHLX    LOAD H,L INDIRECT THRU D,E ADDRESS
                ;
                ;;;;;;;;;;;;;;;;;;;;;;;;;;;;;;;;;;;;;;;;;;;;;;;;;;;;;;;;;;;;;;;;;;;;;;
                ;
                LHLX    MACRO
                        DB      0EDH
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       JUMP ON X5 AND JUMP ON NOT X5
                ;
                ;       X5 IS THE 16BIT 2'SCOMPLIMENT UNDERFLOW/OVERFLOW FLAG
                ;       AFFECTED BY DSUB, INX, & DCX INSTRUCTIONS
                ;
                ;;;;;;;;;;;;;;;;;;;;;;;;;;;;;;;;;;;;;;;;;;;;;;;;;;;;;;;;;;;;;;;;;;;;;;
                ;
                JX5     MACRO
                        DB      0FDH
                        ENDM
                JNX5    MACRO
                        DB      0DDH
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       PUSH    ALL     & POP   ALL
                ;
                ;;;;;;;;;;;;;;;;;;;;;;;;;;;;;;;;;;;;;;;;;;;;;;;;;;;;;;;;;;;;;;;;;;;;;;
                ;
                PUSHAL  MACRO
                        PUSH    B
                        PUSH    D
                        PUSH    H
                        PUSH    PSW
                        ENDM
                ;
                POPAL   MACRO
                        POP     PSW
                        POP     H
                        POP     D
                        POP     B
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       NIBBLE SHIFT D,E LEFT, EXTEND WITH 0 INT LS NIBBLE OF E
                ;
                ;;;;;;;;;;;;;;;;;;;;;;;;;;;;;;;;;;;;;;;;;;;;;;;;;;;;;;;;;;;;;;;;;;;;;;
                ;
                NSDEL   MACRO
                        PUSH    PSW
                        ORA     A
                        DB      18H
                        ORA     A
                        DB      18H
                        ORA     A
                        DB      18H
                        ORA     A
                        DB      18H
                        POP     PSW
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       16 BIT COMPARE B,C TO H,L
                ;
                ;;;;;;;;;;;;;;;;;;;;;;;;;;;;;;;;;;;;;;;;;;;;;;;;;;;;;;;;;;;;;;;;;;;;;;
                ;
                CMPBH   MACRO
                        PUSH    H
                        DB      08H
                        POP     H
                        ENDM
                ;
                ;;;;;;;;;;;;;;;;;;;;;;;;;;;;;;;;;;;;;;;;;;;;;;;;;;;;;;;;;;;;;;;;;;;;;;
                ;
                ;       FURTHER MACROS WILL BE ADDED HERE
                ;       D.E.T.  3/16/81
                ;
                ;;;;;;;;;;;;;;;;;;;;;;;;;;;;;;;;;;;;;;;;;;;;;;;;;;;;;;;;;;;;;;;;;;;;;;
                ;
                ;
                ;
```

```
LOC  OBJ            LINE      SOURCE STATEMENT

0000 B7              205 CUFIND: ORA    A              ;LOAD # = 0?
0001 C8              206         RZ                    ;INVALID REQUEST
0002 320200      D   207         STA    TMP            ;LOAD # OR NTH FIND VALUE
0005 C5              208         PUSH   B
0006 D5              209         PUSH   D
0007 E5              210         PUSH   H
0008 F5              211         PUSH   PSW            ;SAVE ALL WITH CY CLEAR
0009 3E80            212         MVI    A,80H          ;POINTER OFFSET FOR CUST #
000B A2              213         ANA    D
000C F603            214         ORI    3              ;3 IS H,L OFFSET, 80H IN D IF NTH FIND
000E 320300      D   215         STA    TMP + 1
0011 2103C0          216         LXI    H,BFR + 3      ;FIRST TRANS CUST # LOC
0014 E5              217 CTB1:   PUSH   H              ;SAVE BUFFER POINTER
0015 2A0000      E   218         LHLD   BFMAX          ;MAX BUFFER # IN USE
0018 220000      D   219         SHLD   TRNCTR
001B 7D              220         MOV    A,L
001C B4              221         ORA    H              ;CHECK FOR 0
001D E1              222         POP    H
001E CA3B00      C   223         JZ     CTB3B          ;FAST EXIT IF BUFFER EMPTY
0021 112700          224 CTB1A:  LXI    D,TRANL ;OFFSET TO NEXT TRANS
0024 7E              225 CTB2:   MOV    A,M            ;LS BYTE
0025 B9              226         CMP    C              ;LS BYTE OF CUST# OR TR #
0026 CA3D00      C   227         JZ     CTB4
0029 19              228 CTB3:   DAD    D              ;NO MATCH SO GO TO NEXT TRANS SPOT
002A E5              229         PUSH   H
002B 2A0000      D   230         LHLD   TRNCTR         ;FETCH COUNTER
002E 2B              231         DCX    H
002F 220000      D   232         SHLD   TRNCTR
0032 7D              233         MOV    A,L
0033 B4              234         ORA    H              ;COUNTER = 0?
0034 E1              235         POP    H
0035 C22400      C   236         JNZ    CTB2
0038 F1              237 CTB3B:  POP    PSW
0039 E1              238         POP    H
003A D1              239         POP    D
003B C1              240         POP    B
003C C9              241         RET                   ;NO SUCCESS PATH
003D 23              242 CTB4:   INX    H
003E 7E              243         MOV    A,M            ;MS BYTE FETCH
003F 2B              244         DCX    H              ;NEUTRALIZE POINTER
0040 B8              245         CMP    B              ;MS BYTE MATCH?
0041 C22900      C   246         JNZ    CTB3           ;IF NOT, RE-ENTER LOOP
0044 3A0200      D   247         LDA    TMP            ;LOAD # IF ANY
0047 B7              248         ORA    A              ;IS THERE ONE?
0048 CA5E00      C   249         JZ     CTB5           ;NO, SO WE HAVE SUCCESS
004B 3A0300      D   250         LDA    TMP + 1        ;FETCH H,L OFFSET
004E E680            251         ANI    80H            ;NTH FIND, OR LOAD #?
0050 3A0200      D   252         LDA    TMP            ;RE-FETCH
0053 C28000      C   253         JNZ    CTB4A          ;IF SO, COUNT HIM DOWN
0056 23              254         INX    H
0057 23              255         INX    H              ;LOAD # OFFSET
0058 BE              256         CMP    M
0059 2B              257         DCX    H
005A 2B              258         DCX    H              ;NEUTRALIZE POINTER
005B C22900      C   259         JNZ    CTB3           ;IF NOT, RE-ENTER LOOP
005E 3A0300      D   260 CTB5:   LDA    TMP + 1 ;NEGATIVE OFFSET BACK TO STATUS BYTE
0061 E67F            261         ANI    7FH            ;IF 0 WE ARE THERE
0063 CA6B00      C   262         JZ     CTB7
0066 2B              263 CTB6:   DCX    H
0067 3D              264         DCR    A              ;BACK UP TO STATUS
0068 C26600      C   265         JNZ    CTB6
006B F1              266 CTB7:   POP    PSW            ;ENTRY VALUE
006C 37              267         STC                   ;SHOW SUCCESS
006D C1              268         POP    D              ;DUMMY POP OF ENTRY H
006E D1              269         POP    D              ;ENTRY VALUE OF D TO BE DESTROYED
006F C1              270         POP    B              ;ENTRY VALUE OF B
0070 E5              271         PUSH   H
0071 D1              272         POP    D              ;D,E = H,L
0072 13              273         INX    D              ;D,E POINT TO TRANS BYTE 0
0073 F5              274         PUSH   PSW
0074 3E80            275         MVI    A,80H
0076 B6              276         ORA    M              ;SET BUSY BIT IN STATUS
0077 77              277         MOV    M,A            ;& UPDATE
0078 1A              278         LDAX   D              ;BYTE 0
0079 2F              279         CMA
007A B7              280         ORA    A              ;DID WE JUST FIND A BLANK BUFFER?
007B CC0000      E   281         CZ     MAXBUF         ;IF SO, RE-CHECK FOR BFMAX
007E F1              282         POP    PSW
007F C9              283         RET                   ;WITH SUCCESS
                     284 ;
0080 3D              285 CTB4A:  DCR    A              ;DOWN COUNTER FOR N-TH FIND
0081 320200      D   286         STA    TMP            ;UPDATE DOWN COUNTER
0084 C22900      C   287         JNZ    CTB3           ;AND RE-ENTER LOOP
0087 C35E00      C   288         JMP    CTB5           ;N-TH COUNTER IS DECREMENTED TO 0
                     289 ;
                     290 ;
008A B7              291 TRFIND: ORA    A              ;CLEAR CARRY
008B C5              292         PUSH   B
008C D5              293         PUSH   D
008D E5              294         PUSH   H
008E F5              295         PUSH   PSW            ;SAVE ALL
008F AF              296         XRA    A
0090 320200      D   297         STA    TMP            ;NO LOAD #
0093 3C              298         INR    A
0094 320300      D   299         STA    TMP + 1 ;OFFSET OF 1 INDICATOR
0097 2101C0          300         LXI    H,BFR + 1      ;TRNAS # LS BYTE LOCATION
009A C31400      C   301         JMP    CTB1           ;AND SEARCH
                     302 ;
009D B7              303 BUFBLR: ORA    A              ;CLEAR CARRY
009E C5              304         PUSH   B
009F D5              305         PUSH   D
00A0 E5              306         PUSH   H
00A1 F5              307         PUSH   PSW            ;SAVE ALL
00A2 AF              308         XRA    A
```

```
LOC  OBJ          LINE        SOURCE STATEMENT

00A3 210200   D   309         LXI    H,TMP
00A6 77           310         MOV    M,A              ;NO LOAD #
00A7 23           311         INX    H
00A8 77           312         MOV    M,A              ;OFFSET OF 0 INDICATOR
00A9 0100FF       313         LXI    B,0FF00H         ;00 WILL MATCH STATUS BYTE
                  314 ;                               ;AND FF WILL MATCH TRANS LS BYTE
                  315 ;                               ;FOR A BLANK BFR SPOT
                  316 ;
00AC 210000   E   317         LXI    H,NTRANS
00AF 220000   D   318         SHLD   TRNCTR           ;COUNTER = MAX BUFFER SIZE FOR
                  319 ;                               ;BLANK FINDER
00B2 2100C0       320         LXI    H,BFR
00B5 C32100   C   321         JMP    CTB1A
                  322 ;
                  323         END

PUBLIC SYMBOLS
BUFBLR C 009D    CUFIND C 0000    TRFIND C 008A

EXTERNAL SYMBOLS
BFMAX  E 0000    MAXBUF E 0000    NTRANS E 0000

USER SYMBOLS
AHHL   + 0000   BFMAX  E 0000   BFR    A C000   BUFBLR C 009D   CMPBH  + 000D   CTB1   C 0014   CTB1A  C 0021
CTB2   C 0024   CTB3   C 0029   CTB3B  C 0038   CTB4   C 003D   CTB4A  C 0080   CTB5   C 005E   CTB6   C 006E
CTB7   C 006B   CUFIND C 0000   DSUB   + 0000   JNX5   + 0009   JX5    + 0006   LDHI   + 0003   LDSI   + 0004
LHLX   + 0007   MAXBUF E 0000   NSDEL  + 0000   NTRANS E 0000   POPAL  + 0000   PUSHAL + 0000   RDEL   + 0020
RSTV   + 0000   SHLX   + 0000   TMP    D 0002   TRANL  A 0027   TRFIND C 008A   TRNCTR D 0000

ASSEMBLY COMPLETE,   NO ERRORS
```

```
ISIS-II 8080/8085 MACRO ASSEMBLER, V3.0        GRNSSF

LOC  OBJ          LINE        SOURCE STATEMENT

                    1 ;
                    2 ;;;;;;;;;;;;;;;;;;;;;;;;;;;;;;;;;;;;;;;;;;;;;;;;;;;;;;;;;;;;;;
                    3 ;
                    4 ;                          SSFIND
                    5 ;
                    6 ;          SHARE OR SERVICE FIND ROUTINE FOR GRAINMASTER
                    7 ;          SOFTWARE.
                    8 ;          DESIRED CUSTOMER # IS SENT IN B,C PAIR IN PACKED
                    9 ;          BCD. THE E REGISTER UPON ENTRY HAS A BINARY #
                   10 ;          INDICATING THE CALLING ROUTINE WISHES THE NTH
                   11 ;          FIND OF THIS CUSTOMER IN A SHARE OR SERVICE
                   12 ;          POSITION IN A TRANSACTION STORE
                   13 ;          THE D REGISTER HOLDS A FORMAT WITH THE FOLLOWING
                   14 ;          MEANING:
                   15 ;
                   16 ;                    RD                 MEANING
                   17 ;                    --                 -------
                   18 ;                    00H                UNDIFINED
                   19 ;                    0FH                SERVICE POSITIONS
                   20 ;                                       ONLY
                   21 ;                                       ONLY
                   22 ;                    0F0H               SHARE POSITIONS
                   23 ;                                       ONLY
                   24 ;                    0FFH               SERVICE AND
                   25 ;                                       SHARE POSITIONS
                   26 ;                                       ARE ACCEPTABLE
                   27 ;
                   28 ;          THE CARRY FLAG WILL BE USED TO SHOW SUCCESSFUL FINDS
                   29 ;          IN WHICH CASE THE H,L PAIR WILL BE RETURNED POINTING
                   30 ;          TO THE TRANSACTION STATUS BYTE, THE D,E PAIR WILL
                   31 ;          RETURN THE TRANSACTION BYTE 0, AND THE A REG WILL
                   32 ;          RETURN THE APPROPRIATE MASK FOR SHE STATUS BYTE AT
                   33 ;          BUFFER BYTE 29
                   34 ;;;;;;;;;;;;;;;;;;;;;;;;;;;;;;;;;;;;;;;;;;;;;;;;;;;;;;;;;;;;;;;;
                   35 ;
                   36          NAME     GRNSSF
                   37 ;
                   38 ;;;;;;;;;;;;;;;;;;;;;;;;;;;;;;;;;;;;;;;;;;;;;;;;;;;;;;;;;;;;;;;;
                   39
                   40 ;                 EQUATES TO BE USED
C000               41 BUFFER   EQU    0C000H           ;TRANS BUFFER START ADDRS
0027               42 TRANSL   EQU    39               ;LENGTH OF TRANSACTION
0002               43 MASK     EQU    02H              ;RETURN MASK FOR BUFFER BYTE 29
                   44 ;
                   45 ;
                   46 ;
                   47          PUBLIC  SSFIND
                   48 ;
                   49          EXTRN   NTRANS,BFMAX
                   50 ;
                   51          DSEG
                   52 ;
0000               53 TEMP:    DS      2                ;SCRATCH STORE
                   54 ;
                   55 ;
                   56          CSEG
                   57 ;
0000 B7            58 SSFIND:  ORA     A                ;CLEAR CARRY FOR RETURN
0001 C5            59          PUSH    B
0002 D5            60          PUSH    D
0003 E5            61          PUSH    H
```

```
LOC  OBJ          LINE      SOURCE STATEMENT

0004 F5            62          PUSH   PSW             ;SAVE ALL
0005 7B            63          MOV    A,E
0006 B7            64          ORA    A               ;IS NTH FIND # 0?
0007 CA6300   C    65          JZ     SS8             ;IF SO, ABORT AND EXIT
000A 320000   D    66          STA    TEMP
000D 7A            67          MOV    A,D
000E B7            68          ORA    A               ;IS MASK VALID
000F CA6300   C    69          JZ     SS8             ;IF NOT, ABORT AND EXIT
0012 320100   D    70          STA    TEMP + 1
0015 2A0000   E    71          LHLD   BFMAX           ;GET MAX BUFFER # CURRENTLY IN USE
0018 E5            72          PUSH   H               ;SAVE COUNTER ON STACK
0019 7D            73          MOV    A,L
001A B4            74          ORA    H               ;IF 0, TAKE AN EARLY EXIT
001B CA6300   C    75          JZ     SS8
001E 2100C0        76          LXI    H,BUFFER
0021 7E            77 SS1:     MOV    A,M             ;FETCH STATUS BYTE
0022 B7            78          ORA    A               ;IS IT BUSY
0023 CA6900   C    79          JZ     SS9             ;IF NOT, ABORT LOOK
0026 E5            80          PUSH   H               ;SAVE STATUS BYTE POINTER
0027 11BD00   C    81          LXI    D,OFSTAB        ;OFFSET TABLE POINTER
002A 3E02          82          MVI    A,MASK
002C F5            83          PUSH   PSW             ;MASK POSITION BIT
002D CDC200   C    84          CALL   NEXT            ;NEXT SHARE OR SERVICE POSITION
0030 7E            85          MOV    A,M
0031 B9            86          CMP    C               ;LS BYTE COMPARE
0032 CA7000   C    87          JZ     SS1A            ;IF VALID, CHECK MS BYTE
0035 F1            88 SS2:     POP    PSW             ;MASK
0036 07            89          RLC                    ;TO NEXT LOCATION
0037 F5            90          PUSH   PSW
0038 CDC200   C    91          CALL   NEXT
003B 7E            92          MOV    A,M
003C B9            93          CMP    C               ;LS BYTE COMPARE
003D CA8100   C    94          JZ     SS2A            ;IF VALID CHECK MS BYTE
0040 F1            95 SS3:     POP    PSW
0041 07            96          RLC
0042 F5            97          PUSH   PSW             ;UPDATE MASK
0043 CDC200   C    98          CALL   NEXT
0046 7E            99          MOV    A,M
0047 B9           100          CMP    C               ;LS BYTE AGAIN
0048 CA9200   C   101          JZ     SS3A
004B F1           102 SS4:     POP    PSW
004C 07           103          RLC
004D F5           104          PUSH   PSW             ;UPDATE MASK
004E CDC200   C   105          CALL   NEXT
0051 7E           106          MOV    A,M
0052 B9           107          CMP    C
0053 CAA300   C   108          JZ     SS4A            ;CHECK MS BYTE
0056 CDC200   C   109 SS5:     CALL   NEXT            ;GET STATUS BYTE OF NEXT TRANS
0059 F1           110          POP    PSW             ;MASK
005A D1           111          POP    D               ;DUMMY POP OF H
005B E3           112 SS7:     XTHL                   ;GET COUNTER
005C 2B           113          DCX    H               ;COUNT DOWN
005D 7D           114          MOV    A,L
005E B4           115          ORA    H               ;TRANS COUNTER = 0?
005F E3           116          XTHL
0060 C22100   C   117          JNZ    SS1             ;IF NOT LAST TRANS SPOT TO LOOK
0063 E1           118 SS8:     POP    H               ;POP COUNTER
0064 F1           119          POP    PSW
0065 E1           120          POP    H
0066 D1           121          POP    D
0067 C1           122          POP    B
0068 C9           123          RET                    ;UNSUCCESSFUL RETURN PATH
                  124 ;
0069 112700       125 SS9:     LXI    D,TRANSL
006C 19           126          DAD    D               ;OFFSET TO NEXT STATUS BYTE
006D C35B00   C   127          JMP    SS7             ;RE-ENTER LOOP
                  128 ;
0070 CDC900   C   129 SS1A:    CALL   CMPB
0073 C23500   C   130          JNZ    SS2             ;MS BYTE NOT VALID
0076 3E0F         131          MVI    A,0FH           ;SERVICE FORMAT MASK
0078 CDCE00   C   132          CALL   CHECK           ;SEE IF THIS IS LAST FINE
007B C23500   C   133          JNZ    SS2             ;IF NOT, RE-ENTER LOOP
007E C3B100   C   134          JMP    SS6             ;SUCCESSFUL PATH EXIT
                  135 ;
0081 CDC900   C   136 SS2A:    CALL   CMPB
0084 C24000   C   137          JNZ    SS3
0087 3E0F         138          MVI    A,0FH           ;SERVICE FORMAT MASK
0089 CDCE00   C   139          CALL   CHECK
008C C24000   C   140          JNZ    SS3             ;RE-ENTER
008F C3B100   C   141          JMP    SS6             ;SUCCESS
                  142 ;
0092 CDC900   C   143 SS3A:    CALL   CMPB
0095 C24B00   C   144          JNZ    SS4             ;NO MATCH
0098 3EF0         145          MVI    A,0F0H          ;SHARE FORMAT MASK
009A CDCE00   C   146          CALL   CHECK
009D C24B00   C   147          JNZ    SS4             ;RE-ENTER
00A0 C3B100   C   148          JMP    SS6             ;SUCCESS
                  149 ;
00A3 CDC900   C   150 SS4A:    CALL   CMPB
00A6 C25600   C   151          JNZ    SS5             ;NO MATCH
00A9 3EF0         152          MVI    A,0F0H
00AB CDCE00   C   153          CALL   CHECK           ;MS BYTE CHECK
00AE C25600   C   154          JNZ    SS5             ;RE-ENTER
                  155 ;
00B1 F1           156 SS6:     POP    PSW             ;SUCCESS, GET POSITION MASK
00B2 E1           157          POP    H               ;STATUS BYTE
00B3 D1           158          POP    D               ;DUMMY POP OF COUNTER
00B4 D1           159          POP    D               ;DUMMY POP OF PSW ENTRY VALUE
00B5 D1           160          POP    D               ;DUMMY POP OF HL ENTRY VALUE
00B6 D1           161          POP    D               ;DUMMY POP OF DE ENTRY VALUE
00B7 C1           162          POP    B               ;ENTRY VALUE
00B8 E5           163          PUSH   H
00B9 D1           164          POP    D               ;RDE = RHL
```

```
LOC  OBJ          LINE        SOURCE STATEMENT

00BA 13            165           INX     D              ;RDE = TRANS BUFFER BYTE 0
00BB 37            166           STC                    ;FOR SUCCESS
00BC C9            167           RET
                   168 ;
00BD 15            169 OFSTAB:   DB      21,4,8,3,3     ;OFFSETS TO CUST # IN SHARE &
00BE 04
00BF 08
00C0 03
00C1 03
                   170 ;                                ;SERVICE POSITIONS FROM STATUS BYTE
                   171 ;
00C2 1A            172 NEXT:     LDAX    D              ;FETCH NEXT OFFSET
00C3 13            173           INX     D
00C4 85            174           ADD     L
00C5 6F            175           MOV     L,A            ;LS BYTE OFFSET
00C6 D0            176           RNC
00C7 24            177           INR     H
00C8 C9            178           RET                    ;ADD CARRY IF ANY
                   179 ;
00C9 23            180 CMPB:     INX     H              ;TO MS BYTE POSN
00CA 7E            181           MOV     A,M
00CB 2B            182           DCX     H
00CC B8            183           CMP     B              ;COMPARE WITH MS BYTE OF CUST #
00CD C9            184           RET                    ;ZERO FLAG INDICATES RESULT
                   185 ;
00CE E5            186 CHECK:    PUSH    H
00CF 2A0000    D   187           LHLD    TEMP           ;FORMAT & COUNTER
00D2 A4            188           ANA     H              ;ARE WE LOOKING FOR THIS FORMAT?
00D3 CADC00    C   189           JZ      CHECK1         ;IF NOT, PREPARE TO EXIT
00D6 2D            190           DCR     L              ;NTH VALUE COUNTER
00D7 220000    D   191           SHLD    TEMP           ;UPDATE
00DA E1            192 CHECK2:   POP     H              ;RESTORE
00DB C9            193           RET                    ;AND RETURN, ZERO FLAG HAS RESULT
00DC 3C            194 CHECK1:   INR     A              ;TO CLEAR ZERO FLAG
00DD E1            195           POP     H              ;TO RESTORE
00DE C9            196           RET                    ;WITH NO SUCCESS
                   197 ;
                   198           END

PUBLIC SYMBOLS
SSFIND C 0000

EXTERNAL SYMBOLS
BFMAX  E 0000    NTRANS E 0000

USER SYMBOLS
BFMAX  E 0000    BUFFER A C000    CHECK  C 00CE    CHECK1 C 00DC    CHECK2 C 00DA    CMPB   C 00C9    MASK   A 0002
NEXT   C 00C2    NTRANS E 0000    OFSTAB C 00BD    SS1    C 0021    SS1A   C 0070    SS2    C 0035    SS2A   C 0061
SS3    C 0040    SS3A   C 0092    SS4    C 004B    SS4A   C 00A3    SS5    C 0056    SS6    C 00B1    SS7    C 005B
SS8    C 0063    SS9    C 0069    SSFIND C 0000    TEMP   D 0000    TRANSL A 0027

ASSEMBLY COMPLETE,   NO ERRORS


ISIS-II 8080/8085 MACRO ASSEMBLER, V3.0          MAXFND

LOC  OBJ          LINE        SOURCE STATEMENT

                     1 ;
                     2 ;;;;;;;;;;;;;;;;;;;;;;;;;;;;;;;;;;;;;;;;;;;;;;;;;;;;;;;;;;;;;;
                     3 ;
                     4 ;                         MAX BUFFER LOCATION FINDER
                     5 ;
                     6 ;         THIS ROUTINE FINDS THE MAX BUFFER # USED & STORES THAT
                     7 ;         NUMBER IN BFMAX FOR THE FIND ROUTINES TO USE.
                     8 ;
                     9 ;;;;;;;;;;;;;;;;;;;;;;;;;;;;;;;;;;;;;;;;;;;;;;;;;;;;;;;;;;;;;;
                    10 ;
                    11           NAME    MAXFND
                    12 ;
                    13           PUBLIC  MAXBUF,BFMAX
                    14 ;
                    15           EXTRN   NTRANS
                    16 ;
                    17 ;
C000                18 BUFFER    EQU     0C000H
0027                19 TRANSL    EQU     39
                    20 ;
                    21           DSEG
                    22 ;
0000                23 BFMAX:    DS      2              ;1ST BYTE = BMAX, 2ND IS SCRATCH
                    24 ;                                ;FOR BUBBLE TO SEE IF UPDATE IS NEEDED
                    25 ;
                    26           CSEG
                    27 ;
                    28 $INCLUDE(:F1:MAC85.DEF)
                =   29 ;THIS IS AN "INCLUDE" FILE OF 8085 MACRO DEFINITIONS
                =   30 ;
                =   31 ;;;;;;;;;;;;;;;;;;;;;;;;;;;;;;;;;;;;;;;;;;;;;;;;;;;;;;;;;;
                =   32 ;
                =   33 ;         DOUBLE SUBTRACT, (H,L) = (H,L) - (B,C)
                =   34 ;
                =   35 ;;;;;;;;;;;;;;;;;;;;;;;;;;;;;;;;;;;;;;;;;;;;;;;;;;;;;;;;;;
                =   36 ;
                =   37 DSUB      MACRO
                =   38           DB      08H
                =   39           ENDM
                =   40 ;
```

LOC OBJ LINE SOURCE STATEMENT

```
;;;;;;;;;;;;;;;;;;;;;;;;;;;;;;;;;;;;;;;;;;;;;;;;;;;;;;;;;;;;;;;;;;;;;;
;
;        ARITHMETIC SHIFL H&L LEFT
;        H7=H7, H(N)=H(N -1), L7=H0, L(N-1)=L(N), CY=L0
;
;;;;;;;;;;;;;;;;;;;;;;;;;;;;;;;;;;;;;;;;;;;;;;;;;;;;;;;;;;;;;;;;;;;;;;
;
ARHL     MACRO
         DB      10H
         ENDM
;
;;;;;;;;;;;;;;;;;;;;;;;;;;;;;;;;;;;;;;;;;;;;;;;;;;;;;;;;;;;;;;;;;;;;;;
;
;        ROTATE D,E LEFT THRU CARRY
;
;;;;;;;;;;;;;;;;;;;;;;;;;;;;;;;;;;;;;;;;;;;;;;;;;;;;;;;;;;;;;;;;;;;;;;
;
RDEL     MACRO
         DB      18H
         ENDM
;
;;;;;;;;;;;;;;;;;;;;;;;;;;;;;;;;;;;;;;;;;;;;;;;;;;;;;;;;;;;;;;;;;;;;;;
;
;        LOAD D,E WITH H,L PLUS IMMEDIATE BYTE
;
;;;;;;;;;;;;;;;;;;;;;;;;;;;;;;;;;;;;;;;;;;;;;;;;;;;;;;;;;;;;;;;;;;;;;;
;
LDHI     MACRO   INDEX
         DB      28H
         DB      INDEX
         ENDM
;
;;;;;;;;;;;;;;;;;;;;;;;;;;;;;;;;;;;;;;;;;;;;;;;;;;;;;;;;;;;;;;;;;;;;;;
;
;        LOAD D,E WITH SP + IMMEDIATE BYTE
;
;;;;;;;;;;;;;;;;;;;;;;;;;;;;;;;;;;;;;;;;;;;;;;;;;;;;;;;;;;;;;;;;;;;;;;
;
LDSI     MACRO   INDEX
         DB      38H
         DB      INDEX
         ENDM
;
;;;;;;;;;;;;;;;;;;;;;;;;;;;;;;;;;;;;;;;;;;;;;;;;;;;;;;;;;;;;;;;;;;;;;;
;
;        RSTV    RESTART IF OVERFLOW
;
;        VECTOR TO 40H WITH PC PUSHED ONTO STACK
;
;;;;;;;;;;;;;;;;;;;;;;;;;;;;;;;;;;;;;;;;;;;;;;;;;;;;;;;;;;;;;;;;;;;;;;
;
RSTV     MACRO
         DB      CBH
         ENDM
;
;;;;;;;;;;;;;;;;;;;;;;;;;;;;;;;;;;;;;;;;;;;;;;;;;;;;;;;;;;;;;;;;;;;;;;
;
;        STORE H,L INDIRECT THRU D,E ADDRESS
;
;;;;;;;;;;;;;;;;;;;;;;;;;;;;;;;;;;;;;;;;;;;;;;;;;;;;;;;;;;;;;;;;;;;;;;
;
SHLX     MACRO
         DB      0D9H
         ENDM
;
;;;;;;;;;;;;;;;;;;;;;;;;;;;;;;;;;;;;;;;;;;;;;;;;;;;;;;;;;;;;;;;;;;;;;;
;
;        IHLX    LOAD H,L INDIRECT THRU D,E ADDRESS
;
;;;;;;;;;;;;;;;;;;;;;;;;;;;;;;;;;;;;;;;;;;;;;;;;;;;;;;;;;;;;;;;;;;;;;;
;
LHLX     MACRO
         DB      0EDH
         ENDM
;
;;;;;;;;;;;;;;;;;;;;;;;;;;;;;;;;;;;;;;;;;;;;;;;;;;;;;;;;;;;;;;;;;;;;;;
;
;        JUMP ON X5 AND JUMP ON NOT X5
;
;        X5 IS THE 16BIT 2'SCOMPLIMENT UNDERFLOW/OVERFLOW FLAG
;        AFFECTED BY DSUB, INX, & LCX INSTRUCTIONS
;
;;;;;;;;;;;;;;;;;;;;;;;;;;;;;;;;;;;;;;;;;;;;;;;;;;;;;;;;;;;;;;;;;;;;;;
;
JX5      MACRO
         DB      0FDH
         ENDM
JNX5     MACRO
         DB      0DDH
         ENDM
;
;;;;;;;;;;;;;;;;;;;;;;;;;;;;;;;;;;;;;;;;;;;;;;;;;;;;;;;;;;;;;;;;;;;;;;
;
;        PUSH    ALL     & POP   ALL
;
;;;;;;;;;;;;;;;;;;;;;;;;;;;;;;;;;;;;;;;;;;;;;;;;;;;;;;;;;;;;;;;;;;;;;;
;
PUSHAL   MACRO
         PUSH    B
         PUSH    D
         PUSH    H
         PUSH    PSW
         ENDM
;
```

```
LOC  OBJ            LINE        SOURCE STATEMENT

                    = 145 POPAL     MACRO
                    = 146           POP     PSW
                    = 147           POP     H
                    = 148           POP     D
                    = 149           POP     B
                    = 150           ENDM
                    = 151 ;
                    = 152 ;;;;;;;;;;;;;;;;;;;;;;;;;;;;;;;;;;;;;;;;;;;;;;;;;;;;;;;;;;;;;;;;;;;;;;
                    = 153 ;
                    = 154 ;         NIBBLE SHIFT D,E LEFT, EXTEND WITH 0 INT LS NIBBLE OF E
                    = 155 ;
                    = 156 ;;;;;;;;;;;;;;;;;;;;;;;;;;;;;;;;;;;;;;;;;;;;;;;;;;;;;;;;;;;;;;;;;;;;;;
                    = 157 ;
                    = 158 NSDEL     MACRO
                    = 159           PUSH    PSW
                    = 160           ORA     A
                    = 161           DB      18H
                    = 162           ORA     A
                    = 163           DB      18H
                    = 164           ORA     A
                    = 165           DB      18H
                    = 166           ORA     A
                    = 167           DB      18H
                    = 168           POP     PSW
                    = 169           ENDM
                    = 170 ;
                    = 171 ;;;;;;;;;;;;;;;;;;;;;;;;;;;;;;;;;;;;;;;;;;;;;;;;;;;;;;;;;;;;;;;;;;;;;;
                    = 172 ;
                    = 173 ;         16 BIT COMPARE B,C TO H,L
                    = 174 ;
                    = 175 ;;;;;;;;;;;;;;;;;;;;;;;;;;;;;;;;;;;;;;;;;;;;;;;;;;;;;;;;;;;;;;;;;;;;;;
                    = 176 ;
                    = 177 CMPBH     MACRO
                    = 178           PUSH    H
                    = 179           DB      08H
                    = 180           POP     H
                    = 181           ENDM
                    = 182 ;
                    = 183 ;;;;;;;;;;;;;;;;;;;;;;;;;;;;;;;;;;;;;;;;;;;;;;;;;;;;;;;;;;;;;;;;;;;;;;
                    = 184 ;
                    = 185 ;         FURTHER MACROS WILL BE ADDED HERE
                    = 186 ;         D.E.T.  3/16/81
                    = 187 ;
                    = 188 ;;;;;;;;;;;;;;;;;;;;;;;;;;;;;;;;;;;;;;;;;;;;;;;;;;;;;;;;;;;;;;;;;;;;;;
                    = 189 ;
                      190 ;
                      191 ;
0000 C5               192 MAXBUF:   PUSH    B
0001 D5               193           PUSH    D
0002 E5               194           PUSH    H
0003 210000    D      195           LXI     H,BFMAX         ;UP-COUNTER LOCATION
0006 E5               196           PUSH    H               ;ON THE STACK
0007 3600             197           MVI     M,0
0009 23               198           INX     H
000A 3600             199           MVI     M,0             ;SET COUNTER TO 0
000C 2100C0           200           LXI     H,BUFFER        ;START OF BUFFER RAM
000F 110100           201           LXI     D,1             ;UP COUNTER
0012 010000    E      202           LXI     B,NTRANS        ;MAX BUFFER SIZE DOWN COUNTER
0015 AF               203 MAX1:     XRA     A               ;0
0016 B6               204           ORA     M               ;STATUS BYTE = 0
0017 C22E00    C      205           JNZ     MAX3            ;IF NOT, UPDATE COUNTER
001A 13               206 MAX2:     INX     D
001B C5               207           PUSH    B               ;INCREMENT & SAVE UP COUNTER
001C 012700           208           LXI     B,TRANSL
001F 09               209           DAD     B               ;H&L POINT TO NEXT STATUS BYTE
0020 C1               210           POP     B
0021 0B               211           DCX     B               ;DOWN COUNTER
0022 79               212           MOV     A,C
0023 B0               213           ORA     B               ;LAST BUFFER LOCATION?
0024 C21500    C      214           JNZ     MAX1            ;IF NOT, CHECK NEXT TRANS BUFFER
0027 E1               215           POP     H               ;.BFMAX POP
0028 E1               216           POP     H               ;ENTRY VALUE POPS
0029 3600             217           MVI     M,0             ;RE-ZERO STATUS BYTE
002B D1               218           POP     D
002C C1               219           POP     B
002D C9               220           RET
002E E3               221 MAX3:     XTHL                    ;[SP] = BUFFER PTR, H&L = .BFMAX
002F EB               222           XCHG                    ;D,E = .BFMAX, H,L = BFMAX UP COUNTER
                      223           SHLX                    ;UPDATE BFMAX TO SHOW TRANS IN NTH BUFFER
0030 D9               224+          DB      0D9H
0031 EB               225           XCHG                    ;D,E = UP CTR, H,L = .BFMAX
0032 E3               226           XTHL                    ;[SP] = .BFMAX, H&L = BUFFER PTR
0033 C31A00    C      227           JMP     MAX2            ;REJOIN LOOP
                      228 ;
                      229           END

PUBLIC SYMBOLS
BFMAX  D 0000    MAXBUF C 0000

EXTERNAL SYMBOLS
NTRANS E 0000

USER SYMBOLS
ARHL   + 0000   BFMAX  D 0000   BUFFER A C000   CMPBH  + 000D   DSUB   + 0000   JNX5   + 0009   JX5    + 0006
LDHI   + 0003   LDSI   + 0004   LHLX   + 0007   MAX1   C 0015   MAX2   C 001A   MAX3   C 002E   MAXBUF C 0000
NSDEL  + 000C   NTRANS E 0000   POPAL  + 0000   PUSHAL + 0000   RDEL   + 0000   RSTV   + 0000   SHLX   + 0000
TRANSL A 0027

ASSEMBLY COMPLETE,  NO ERRORS
```

```
ISIS-II 8080/8085 MACRO ASSEMBLER, V3.0        BEEPER

  LOC  OBJ          LINE        SOURCE STATEMENT

                       1 ;
                       2 ;;;;;;;;;;;;;;;;;;;;;;;;;;;;;;;;;;;;;;;;;;;;;;;;;;;;;;;;;;;;;;;;
                       3 ;
                       4 ;                        BEEP ROUTINE
                       5 ;
                       6 ;       THIS ROUTINE GIVES A 50MS. BEEP AND RETURNS
                       7 ;       ALL REGS ARE SAVED
                       8 ;
                       9 ;;;;;;;;;;;;;;;;;;;;;;;;;;;;;;;;;;;;;;;;;;;;;;;;;;;;;;;;;;;;;;;;
                      10 ;
                      11         NAME    BEEPER
                      12 ;
  883A                13 BPRLOC  EQU     883AH           ;MEMORY LOCATION OF BEEPER
  0064                14 BEPTIM  EQU     100             ;BEEPTIME IN MS.
  0000                15 BEPON   EQU     0               ;BEEPER ON MASK
                      16 ;
                      17         PUBLIC  BEEP
                      18 ;
                      19         EXTRN   DLYR
                      20 ;
                      21         CSEG
                      22 ;
                      23 ;;;;;;;;;;;;;;;;;;;;;;;;;;;;;;;;;;;;;;;;;;;;;;;;;;;;;;;;;;;;;;;;
                      24 ;
  0000 C5             25 BEEP:   PUSH    B
  0001 F5             26         PUSH    PSW
  0002 E5             27         PUSH    H
  0003 213A88         28         LXI     H,BPRLOC        ;LOCATION OF BEEPER
  0006 3E00           29         MVI     A,BEPON
  0008 0E64           30         MVI     C,BEPTIM
  000A 77             31         MOV     M,A             ;BEEPER ON
  000B CD0000    E    32         CALL    DLYR            ;DELAY BEPTIM MS
  000E 2F             33         CMA
  000F 77             34         MOV     M,A             ;BEEPER OFF
  0010 E1             35         POP     H
  0011 F1             36         POP     PSW
  0012 C1             37         POP     B
  0013 C9             38         RET                     ;AND EXIT
                      39 ;
                      40         END

PUBLIC SYMBOLS
BEEP   C 0000

EXTERNAL SYMBOLS
DLYR   E 0000

USER SYMBOLS
BEEP   C 0000    BEPON  A 0000    BEPTIM A 0064    BPRLOC A 883A    DLYR   E 0000

ASSEMBLY COMPLETE,   NO ERRORS
```

```
ISIS-II 8080/8085 MACRO ASSEMBLER, V3.0        DELAY

  LOC  OBJ          LINE        SOURCE STATEMENT

                       1 ;
                       2 ;;;;;;;;;;;;;;;;;;;;;;;;;;;;;;;;;;;;;;;;;;;;;;;;;;;;;;;;;;;;;;;;
                       3 ;
                       4 ;                        DELAY ROUTINE
                       5 ;
                       6 ;       THIS ROUTINE DELAYS 1MS X THE CONTENTS OF THE
                       7 ;       C REGISTER THEN RETURNS
                       8 ;
                       9 ;;;;;;;;;;;;;;;;;;;;;;;;;;;;;;;;;;;;;;;;;;;;;;;;;;;;;;;;;;;;;;;;
                      10 ;
                      11         NAME    DELAY
                      12 ;
                      13         PUBLIC  DLYR
                      14 ;
                      15         CSEG
                      16 ;
                      17 ;;;;;;;;;;;;;;;;;;;;;;;;;;;;;;;;;;;;;;;;;;;;;;;;;;;;;;;;;;;;;;;;
                      18 ;
  0000 C5             19 DLYR:   PUSH    B
  0001 0639           20 DLY1:   MVI     B,57            ;LOOP COUNTER
  0003 D5             21 DLY2:   PUSH    D
  0004 D5             22         PUSH    D
  0005 D1             23         POP     D
  0006 D1             24         POP     D               ;GARBAGE INSTRUCTIONS
  0007 05             25         DCR     B
  0008 C20300    C    26         JNZ     DLY2
  000B 0D             27         DCR     C
  000C C20100    C    28         JNZ     DLY1
  000F C1             29         POP     B
  0010 C9             30         RET
                      31 ;
                      32         END

PUBLIC SYMBOLS
DLYR   C 0000
```

```
  LOC  OBJ           LINE        SOURCE STATEMENT

EXTERNAL SYMBOLS

USER SYMBOLS
DLY1   C 0001     DLY2   C 0003     DLYR   C 0000

ASSEMBLY COMPLETE,    NO ERRORS




ISIS-II 8080/8085 MACRO ASSEMBLER, V3.0          STUFFE


  LOC  OBJ           LINE        SOURCE STATEMENT

                        1 ;
                        2 ;;;;;;;;;;;;;;;;;;;;;;;;;;;;;;;;;;;;;;;;;;;;;;;;;;;;;;;;;;;;;;;;;;;;;;
                        3 ;
                        4 ;                 STUFF MANY LOCATIONS ROUTINE
                        5 ;
                        6 ;          C HAS DATA,H,L HAVE STARTING ADDRESS, D,E HAVE LENGTH
                        7 ;          OF STORE TO BE STUFFED WITH C DATA
                        8 ;
                        9 ;;;;;;;;;;;;;;;;;;;;;;;;;;;;;;;;;;;;;;;;;;;;;;;;;;;;;;;;;;;;;;;;;;;;;;
                       10 ;
                       11          NAME    STUFFER
                       12 ;
                       13          PUBLIC  SMLR
                       14 ;
                       15          CSEG
                       16 ;
                       17 ;;;;;;;;;;;;;;;;;;;;;;;;;;;;;;;;;;;;;;;;;;;;;;;;;;;;;;;;;;;;;;;;;;;;;;;;
                       18 ;
 0000 C5               19 SMLR:    PUSH    B
 0001 D5               20          PUSH    D
 0002 E5               21          PUSH    H
 0003 F5               22          PUSH    PSW
 0004 7B               23 SMLR1:   MOV     A,E
 0005 B2               24          ORA     D                   ;DONE YET?
 0006 CA0F00    C      25          JZ      SMLR2
 0009 71               26          MOV     M,C                 ;STUFF IT
 000A 23               27          INX     H
 000B 1B               28          DCX     D
 000C C30400    C      29          JMP     SMLR1
 000F F1               30 SMLR2:   POP     PSW
 0010 E1               31          POP     H
 0011 D1               32          POP     D
 0012 C1               33          POP     B
 0013 C9               34          RET                         ;AND EXIT
                       35 ;
                       36          END

PUBLIC SYMBOLS
SMLR   C 0000

EXTERNAL SYMBOLS

USER SYMBOLS
SMLR   C 0000     SMLR1  C 0004     SMLR2  C 000F

ASSEMBLY COMPLETE,    NO ERRORS



ISIS-II 8080/8085 MACRO ASSEMBLER, V3.0          PRNMSG


  LOC  OBJ           LINE        SOURCE STATEMENT

                        1 ;
                        2 ;
                        3 ;;;;;;;;;;;;;;;;;;;;;;;;;;;;;;;;;;;;;;;;;;;;;;;;;;;;;;;;;;;;;;;;;;;;;;;;;;;;;
                        4 ;
                        5 ;
                        6 ;                           PMASG
                        7 ;
                        8 ;                 PRINT MESSAGE ROUTINE
                        9 ;                 REG. D POINTS TO THE STARTING ADDRESS OF MESSAGE TO
                       10 ;                 BE PRINTED OUT
                       11 ;                 CARRY IS SET IF SUCCESSFUL IN PRINTING
                       12 ;                 END OF MESSAGE SHOULD HAVE AETX
                       13 ;
                       14 ;
                       15 ;;;;;;;;;;;;;;;;;;;;;;;;;;;;;;;;;;;;;;;;;;;;;;;;;;;;;;;;;;;;;;;;;;;;;;;;;;;;;;
                       16 ;
                       17                 NAME    PRNMSG
                       18          PUBLIC  PMASG
                       19 ;
                       20 ;
                       21          EXTRN   PCHAR
                       22 ;
                       23          CSEG
 0000 B7               24 PMASG:   ORA     A
 0001 C5               25          PUSH    B
 0002 D5               26          PUSH    D
 0003 E5               27          PUSH    H
```

```
LOC  OBJ           SOURCE STATEMENT

0004 F5                     PUSH    PSW
0005 1A            PMASG1:  LDAX    D
0006 FE03                   CPI     03H         ;COMPARE WITH ASCII END OF TEXT
0008 C21100   C             JNZ     PMASG3
000B F1                     POP     PSW
000C 37                     STC
000D E1            PMASG2:  POP     H
000E D1                     POP     D
000F C1                     POP     B
0010 C9                     RET
0011 13            PMASG3:  INX     D
0012 4F                     MOV     C,A
0013 CD0000   E             CALL    PCHAR       ;PRINT CHARACTER
0016 DA0500   C             JC      PMASG1      ;JUMP IF UNSUCCESSFUL IN PRINTING THAT CHAR.
0019 F1                     POP     PSW
001A C30D00   C             JMP     PMASG2
                   ;
                   ;
                            END

PUBLIC SYMBOLS
PMASG  C 0000

EXTERNAL SYMBOLS
PCHAR  E 0000

USER SYMBOLS
PCHAR  E 0000    PMASG  C 0000    PMASG1 C 0005    PMASG2 C 000D    PMASG3 C 0011

ASSEMBLY COMPLETE,   NO ERRORS
```

```
ISIS-II 8080/8085 MACRO ASSEMBLER, V3.0        KYSCN

LOC  OBJ           SOURCE STATEMENT

                   ;
                   ;;;;;;;;;;;;;;;;;;;;;;;;;;;;;;;;;;;;;;;;;;;;;;;;;;;;;;;;;;;;;;
                   ;
                   ;                        KEYIN
                   ;
                   ;        THIS ROUTINE SCANS AN 8 X 8 KEY MATRIX
                   ;        LOCATED AT LOCATION KEYS. IF NO VALID
                   ;        ENTRY IS FOUND, A CLEAR CARRY IS RETURNDE
                   ;        TO THE CALLING ROUTINE.IF A CLOSURE IS SENSED
                   ;        THE ROW BY COLUMN CODE IS RETURNED IN A
                   ;        AND CARRY IS SET.
                   ;        THIS ROUTINE WORKS
                   ;        ON CPU-1E SERIES BOARDS ONLY.
                   ;
                   ;;;;;;;;;;;;;;;;;;;;;;;;;;;;;;;;;;;;;;;;;;;;;;;;;;;;;;;;;;;;;;
                   ;
                            NAME    KYSCN
                   ;
8C00               KEYS     EQU     8C00H
                   ;
                            PUBLIC  KEYIN,LASTKY
                   ;
                            EXTRN   DLYR
                   ;
                            DSEG
0000               LASTKY:  DS      1
                   ;
                   ;;;;;;;;;;;;;;;;;;;;;;;;;;;;;;;;;;;;;;;;;;;;;;;;;;;;;;;;;;;;;;
                   ;
                            CSEG
                   ;
0000 C5            KEYIN:   PUSH    B
0001 D5                     PUSH    D
0002 E5                     PUSH    H
0003 F5                     PUSH    PSW
0004 3A0000   D             LDA     LASTKY      ;WAS A KEY CLOSED AT LAST
                   ;                            ;KEYIN ENTRY?
0007 B7                     ORA     A
0008 C22B00   C             JNZ     KEYIN4      ;YES, SO LOOK FOR RELEASE
000B 3AFF8C                 LDA     KEYS + 0FFH ;READ ALL COLUMNS AT ONCE
000E 2F                     CMA
000F B7                     ORA     A           ;ANY 1 IS A CLOSURE
0010 CA2600   C             JZ      KEYIN3      ;CLEAR CARRY, & EXIT
0013 21018C                 LXI     H,KEYS + 1  ;ADDRS OF FIRST COLUMN
0016 010000                 LXI     B,0         ;ROW & COLUMN COUNTER
0019 7E            KEYIN1:  MOV     A,M         ;FETCH COLUMN
001A 2F                     CMA
001B B7                     ORA     A           ;ANY 1 A CLOSURE
001C C24600   C             JNZ     KEYIN5
001F 0C            KEYIN2:  INR     C           ;COLUMN COUNTER
0020 7D                     MOV     A,L
0021 07                     RLC                 ;ADDRS OF NEXT COLUMN
0022 6F                     MOV     L,A
0023 D21900   C             JNC     KEYIN1      ;IF NOT DONE, NEXT COLUMN
0026 F1            KEYIN3:  POP     PSW
0027 B7                     ORA     A
0028 C36D00   C             JMP     KEYIN9      ;AND EXIT
002B 3AFF8C        KEYIN4:  LDA     KEYS + 0FFH ;READ ENTIRE KEYBOARD
002E 2F                     CMA
002F B7                     ORA     A           ;ANY 1 A CLOSURE
0030 C22600   C             JNZ     KEYIN3      ;STILL CLOSED
```

```
LOC  OBJ          LINE        SOURCE STATEMENT

0033 0E1E           62          MVI    C,1EH
0035 CD0000    E    63          CALL   DLYR              ;DEBOUNCE TIME
0038 3AFF8C         64          LDA    KEYS + 0FFH       ;READ AGAIN
003B 2F             65          CMA
003C B7             66          ORA    A                 ;STILL CLEAR
003D C22600    C    67          JNZ    KEYIN3
0040 320000    D    68          STA    LASTKY            ;CLEAR FOR NEXT ENTRY
0043 C32600    C    69          JMP    KEYIN3
0046 57             70 KEYIN5:  MOV    D,A               ;TEMP STORE FOR CLOSURE INFO
0047 C5             71          PUSH   B
0048 0E1E           72          MVI    C,1EH
004A CD0000    E    73          CALL   DLYR              ;DEBOUNCE 30MS.
004D 7E             74          MOV    A,M               ;REFETCH
004E 2F             75          CMA
004F BA             76          CMP    D                 ;SAME KEY?
0050 C1             77          POP    B
0051 C21F00    C    78          JNZ    KEYIN2            ;IF NOT, CONTINUE SCAN
0054 0F             79 KEYIN6:  RRC
0055 DA5C00    C    80          JC     KEYIN7            ;FOUND HIM
0058 04             81          INR    B                 ;ROW COUNTER
0059 C35400    C    82          JMP    KEYIN6
005C 78             83 KEYIN7:  MOV    A,B               ;FETCH ROW #
005D 07             84          RLC
005E 07             85          RLC
005F 07             86          RLC
0060 07             87          RLC                      ;TO MS NIBBLE
0061 B1             88          ORA    C                 ;COLUMN # TO LS NIBBLE
0062 4F             89          MOV    C,A               ;TEMP
0063 F1             90          POP    PSW
0064 3EFF           91          MVI    A,0FFH
0066 320000    D    92          STA    LASTKY            ;SET FOR NEXT ENTRY INDICATING CLOSURE
0069 79             93          MOV    A,C
006A 37             94          STC
006B F5             95          PUSH   PSW
006C F1             96 KEYIN8:  POP    PSW
006D E1             97 KEYIN9:  POP    H
006E D1             98          POP    D
006F C1             99          POP    B
0070 C9            100          RET                      ;SUCCESSFUL EXIT
                   101 ;
                   102          END

PUBLIC SYMBOLS
KEYIN  C 0000    LASTKY D 0000

EXTERNAL SYMBOLS
DLYR   E 0000

USER SYMBOLS
DLYR   E 0000   KEYIN  C 0000   KEYIN1 C 0019   KEYIN2 C 001F   KEYIN3 C 0026   KEYIN4 C 002B   KEYIN5 C 0046
KEYIN6 C 0054   KEYIN7 C 005C   KEYIN8 C 006C   KEYIN9 C 006D   KEYS   A 8C00   LASTKY D 0000

ASSEMBLY COMPLETE,   NO ERRORS
```

```
ISIS-II 8080/8085 MACRO ASSEMBLER, V3.0          PERR

LOC  OBJ          LINE        SOURCE STATEMENT

                     1 ;
                     2          NAME   PRERR
                     3 ;
                     4 ;        PRINTER ERROR FOR GRAINMASTER
                     5 ;        VALID 6/25/81
                     6 ;        ONLY DOES 3 BEEPS AND DISPLAY
                     7 ;        OF "PRINT ERR"
                     8 ;
                     9          PUBLIC  PERR
                    10 ;
                    11          EXTRN   BEEP,TRAPR,ERDIS,LASTKY,KEYIN,DIM11,DIM27
                    12 ;
0073                13          SEGP    EQU    73H
0050                14          SEGR    EQU    50H
0004                15          SEGI    EQU    04H
0054                16          SEGN    EQU    54H
0078                17          SEGT    EQU    78H
0011                18          DELET   EQU    11H
                    19 ;
                    20          CSEG
                    21 ;
0000 E5             22 PERR:    PUSH   H
0001 3E73           23          MVI    A,SEGP            ;LOAD STARTING LOCATION OF DISPLAY MEMORY
0003 320000    E    24          STA    DIM11
0006 210000    E    25          LXI    H,DIM27
0009 3650           26          MVI    M,SEGR
000B 2B             27          DCX    H
000C 3604           28          MVI    M,SEGI
000E 2B             29          DCX    H
000F 3654           30          MVI    M,SEGN
0011 2B             31          DCX    H
0012 3678           32          MVI    M,SEGT
0014 CD0000    E    33          CALL   ERDIS             ;DISPLAY ERROR ON SCR. PAD AND UPDATE DISP.
0017 E1             34          POP    H
0018 AF             35          XRA    A
0019 320000    E    36          STA    LASTKY
001C CD0000    E    37          CALL   KEYIN
001F FE11           38          CPI    DELET
```

```
LOC  OBJ          LINE        SOURCE STATEMENT

0021 C0            39          RNZ
0022 C30000   E    40          JMP     TRAPR
                   41          END


PUBLIC SYMBOLS
PERR   C 0000

EXTERNAL SYMBOLS
BEEP   E 0000    DIM11  E 0000    DIM27  E 0000    ERDIS  E 0000    KEYIN  E 0000    LASTKY E 0000    TRAPR  E 0000

USER SYMBOLS
BEEP   E 0000    DELET  A 0011    DIM11  E 0000    DIM27  E 0000    ERDIS  E 0000    KEYIN  E 0000    LASTKY E 0000
PERR   C 0000    SEGI   A 0004    SEGN   A 0054    SEGP   A 0073    SEGR   A 0050    SEGT   A 0078    TRAPR  E 0000

ASSEMBLY COMPLETE,   NO ERRORS




ISIS-II 8080/8085 MACRO ASSEMBLER, V3.0          GACIO
GAC I/O ROUTINE

LOC  OBJ          LINE        SOURCE STATEMENT

                    1 $        TITLE   ('GAC I/O ROUTINE')
                    2          NAME    GACIO
                    3          CSEG
 0009               4 CHRDLY   EQU     9
 0011               5 DELETE   EQU     11H             ;DELETE KEY CODE
 9FE7               6 CONTRL   EQU     9FE7H
                    7 ;*****************************************************************
                    8 ;
                    9 ;                                6255 PORT A
                   10 ;
                   11 ;                  BIT 0-5       DATA FROM GAC II
                   12 ;                  BIT 6         XMIT (ACTIVE LOW)
                   13 ;                  BIT 7         ENABLE
                   14 ;*****************************************************************
                   15 ;
 9FE4              16 PORTA    EQU     9FE4H
                   17 ;
                   18 ;*****************************************************************
                   19 ;
                   20 ;                                8255 PORT C (BITS 4-7 OUTPUTS)
                   21 ;
                   22 ;                  BIT 6         CHAR REQ (ACTIVE LOW)
                   23 ;                  BIT 7         EXT RDY (ACTIVE LOW)
                   24 ;
                   25 ;*****************************************************************
                   26 ;
 9FE6              27 PORTC    EQU     9FE6H
 0080              28 FLAGIT   EQU     80H
 003F              29 CHRSTB   EQU     3FH
 007F              30 HNDSHK   EQU     7FH
 00C1              31 HLDPRT   EQU     0C1H
                   32 ;
                   33 ;*****************************************************************
                   34 ;
                   35 ;                         DELCARE:
                   36 ;
                   37 ;*****************************************************************
                   38          EXTRN   KEYIN
                   39          PUBLIC  GACMN,KEYFLG,TSTWTB,PMOSTB
                   40 $        EJECT
                   41 ;*****************************************************************
                   42 ;
                   43 ;                                MACROS
                   44 ;
                   45 ;*****************************************************************
                   46 ;
                   47 ;
                   48 PUSHAL   MACRO
   -               49          PUSH    B
   -               50          PUSH    D
   -               51          PUSH    H
                   52          ENDM
                   53 ;
                   54 ;
                   55 POPAL    MACRO
   -               56          POP     H
   -               57          POP     D
   -               58          POP     B
                   59          ENDM
                   60 ;
                   61 ;
                   62 SMLDLY   MACRO   DLY
                   63          LOCAL   LOOP
   -               64          MVI     A,DLY
   -               65 LOOP:    DCR     A
   -               66          JNZ     LOOP
                   67          ENDM
                   68 ;
                   69 ;
                   70 CPXB     MACRO
   -               71          PUSH    H
   -               72          DB      08H
   -               73          POP     H
                   74          ENDM
                   75 ;
                   76 ;
```

```
LOC  OBJ            LINE        SOURCE STATEMENT

                      77 CSLD     MACRO
-                     78          DB      18H
-                     79          DB      18H
-                     80          DB      18H
-                     81          DB      18H
                      82          ENDM
                      83 ;
                      84 ;
                      85 TSTFLG   MACRO   FLAG,IFTRUE
-                     86          LDA     FLAG
-                     87          RAL
-                     88          JC      IFTRUE
                      89          ENDM
                      90 ;
                      91 ;
                      92 CLC      MACRO
-                     93          ANA     A
                      94          ENDM
                      95 $        EJECT
                      96 ;**************************************************************
                      97 ;
                      98 ;                        MAIN
                      99 ;
                     100 ;        THIS IS THE MAIN PROGRAM. IT INITIALIZES THE ROUTINE AND
                     101 ;CHECKS IF THE GAC II IS ON LINE.  THE CARRY FLAG IS RESET IF NO
                     102 ;VALUE IS OR CANNOT BE RETURNED TO THE CALLING ROUTINE.
                     103 ;
                     104 ;**************************************************************
                     105 ;
                     106 GACMN:   PUSHAL                      ;PUSH ALL REGISTERS
0000 C5              107+         PUSH    B
0001 D5              108+         PUSH    D
0002 E5              109+         PUSH    H
0003 CD2700     C    110          CALL    INITIO              ;INIT ROUTINE
0006 CD5100     C    111          CALL    CHKON               ;CHECK IF GAC II IS ON LINE
0009 DA0F00     C    112          JC      WAIT                ;ITS ON SO WAIT FOR OUTPUT
000C C32300     C    113          JMP     EXIT
000F 3E7F            114 WAIT:    MVI     A,HNDSHK            ;SET HANDSHAKE
0011 32E69F          115          STA     PORTC
0014 CD6B00     C    116          CALL    GACWAT              ;WAIT FOR OUTPUT OR KEY TO INTRPT
                     117          TSTFLG  KEYFLG,KEYPRS       ;TEST IF KEY IS PRESSED
0017 3A0100     D    118+         LDA     KEYFLG
001A 17              119+         RAL
001B DA2200     C    120+         JC      KEYPRS
001E 37              121          STC                         ;GOT OUTPUT SO SIGNAL WITH CARRY
001F C32300     C    122          JMP     EXIT
0022 AF              123 KEYPRS:  XRA     A                   ;CLEAR THE CARRY, NO OUTPUT
                     124 EXIT:    POPAL                       ;POP REGISTERS AND RETURN
0023 E1              125+         POP     H
0024 D1              126+         POP     D
0025 C1              127+         POP     B
0026 C9              128          RET
                     129 $        EJECT
                     130 ;**************************************************************
                     131 ;
                     132 ;                        INITIO
                     133 ;
                     134 ;        THIS ROUTINE INITIALIZES THE ROUTINE BY SETTING UP THE 8255
                     135 ;AND ZEROS ALL FLAGS AND BUFFERS
                     136 ;
                     137 ;**************************************************************
                     138 ;
0092                 139 CTRLWD   EQU     92H
                     140 ;
0027 3E92            141 INITIO:  MVI     A,CTRLWD            ;INIT 8255 TO MODE 0, CW #11
0029 32E79F          142          STA     CONTRL
002C 3E00            143          MVI     A,00H               ;ZERO TEST WEIGHT BUFFER
002E 211600     D    144          LXI     H,TSTWTB
0031 77              145          MOV     M,A
0032 23              146          INX     H
0033 77              147          MOV     M,A
0034 211800     D    148          LXI     H,PMOSTB            ;ZEOR % MOIST BUFFER
0037 77              149          MOV     M,A
0038 23              150          INX     H
0039 77              151          MOV     M,A
003A 320100     D    152          STA     KEYFLG              ;ZERO THE KEY FLAG
003D 320400     D    153          STA     PCTFLG              ;ZERO THE % CHARACTER DETECT FLAG
0040 320300     D    154          STA     FSTFLG
0043 320200     D    155          STA     EXTFLG
0046 3E80            156          MVI     A,FLAGIT
0048 320000     D    157          STA     FILLIN
004B 3EC1            158          MVI     A,HLDPRT            ;SETUP HANDSHAKE
004D 32E69F          159          STA     PORTC
0050 C9              160          RET
                     161 ;
                     162 ;
                     163 ;**************************************************************
                     164 ;
                     165 ;                        CHKON
                     166 ;
                     167 ;        THIS ROUTINE CHECKS IF THE GAC II IS ON LINE
                     168 ;
                     169 ;**************************************************************
                     170 ;
0051 3AE49F          171 CHKON:   LDA     PORTA               ;GET GAC II STATUS BITS
0054 17              172          RAL                         ;CHECK THE ENABLE LINE
0055 D26900     C    173          JNC     FSTOK
                     174          SMLDLY  CHRDLY
0058 3E09            175+         MVI     A,CHRDLY
005A 3D              176+??0001:  DCR     A
005B C25A00     C    177+         JNZ     ??0001
005E 3AE49F          178          LDA     PORTA
0061 17              179          RAL
```

```
LOC  OBJ          LINE    SOURCE STATEMENT

0062 D26900   C                   JNC     FSTOK
                                  CLC
0065 A7                  +        ANA     A
0066 C36A00   C                   JMP     CKEX
0069 17                   FSTOK:  RAL                      ;CHECK XMIT LINE
006A C9                   CKEX:   RET
                          ;
                          ;
                          ;*************************************************************
                          ;
                          ;                       GACWAT
                          ;
                          ;         THIS ROUTINE WAITS ON THE GAC II UNTIL CHARACTERS ARE OUTPUT
                          ;FROM THE UNIT OR UNTIL A KEY IS PRESSED AT THE GRAINMASTER
                          ;THIS ROUTINE WILL RETURN WITH THE KEYFLG SET IF THE EXIT WAS BY KEY
                          ;
                          ;*************************************************************
                          ;
                          ;
006B 210500   D           GACWAT: LXI     H,LINBUF
006E 1611                         MVI     D,17D
                          GACW11: TSTFLG  EXTFLG,WATEXT        ;EXIT ?
0070 3A0200   D          +        LDA     EXTFLG
0073 17                  +        RAL
0074 DA9300   C          +        JC      WATEXT
0077 CD0000   E                   CALL    KEYIN                ;CHECK FOR A KEY
007A D28D00   C                   JNC     WAITDT               ;NO KEY
007D FE11                         CPI     DELETE
007F C28D00   C                   JNZ     WAITDT               ;NOT DELETE KEY ?
0082 3E80                         MVI     A,FLAGIT             ;KEY SO EXIT
0084 320200   D                   STA     EXTFLG
0087 320100   D                   STA     KEYFLG               ;SET KEYFLG
008A C37000   C                   JMP     GACW11
008D CD9400   C           WAITDT: CALL    DATAIN               ;INPUT DATA IF ANY
0090 C37000   C                   JMP     GACW11
0093 C9                   WATEXT: RET
                          ;
                          ;
                          ;*************************************************************
                          ;
                          ;                       DATAIN
                          ;         THIS ROUTINE CHECKS FOR DATA TO INPUT FROM THE GAC II. THE
                          ;UNIT IS ASSUMED READY WHEN THE XMIT LINE IS LOW
                          ;
                          ;*************************************************************
                          ;
                          DATAIN: TSTFLG  FILLIN,RDY
0094 3A0000   D          +        LDA     FILLIN
0097 17                  +        RAL
0098 DAA000   C          +        JC      RDY
009B CDDA00   C                   CALL    PROCLN
009E 1611                         MVI     D,17D
                          RDY:    SMLDLY  CHRDLY
00A0 3E09                +        MVI     A,CHRDLY
00A2 3D                  +??0002: DCR     A
00A3 C2A200   C          +        JNZ     ??0002
00A6 3AE49F                       LDA     PORTA
00A9 17                           RAL
00AA 17                           RAL
00AB DABA00   C                   JC      DATAEX
00AE CDBB00   C                   CALL    INCHAR
00B1 15                           DCR     D
00B2 C2BA00   C                   JNZ     DATAEX
00B5 3E00                         MVI     A,00H
00B7 320000   D                   STA     FILLIN               ;RESET FLAG- 17 CHAR IN BUFFER
00BA C9                   DATAEX: RET
                          ;
                          ;
                          ;*************************************************************
                          ;
                          ;                       INCHAR
                          ;         THIS ROUTINE INPUTS ONE CHARACTER FROM THE GAC II.. THE PCTFLG
                          ;IS SET WHEN THE '%' CHARACTER IS DETECTED
                          ;
                          ;*************************************************************
                          ;
                          ;
00BB CD0A01   C           INCHAR: CALL    ASKPCH               ;GET ONE CHARACTER
00BE D2D300   C                   JNC     ERCON
00C1 1F                           RAR                          ;DATA VALID
00C2 E63F                         ANI     3FH                  ;GET RID OF STROBES
00C4 77                           MOV     M,A                  ;SAVE THE DATA IN THE LINE BUFFER
00C5 23                           INX     H
00C6 FE25                         CPI     25H
00C8 C2D900   C                   JNZ     CHRNX                ;CHECK FOR '%'
00CB 3E80                         MVI     A,FLAGIT
00CD 320400   D                   STA     PCTFLG
00D0 C3D900   C                   JMP     CHRNX
00D3 3E80                 ERCON:  MVI     A,FLAGIT             ;ERROR HAS OCCURRED IN HANDSHAKE EXIT
00D5 320200   D                   STA     EXTFLG
                                  CLC
00D8 A7                  +        ANA     A
00D9 C9                   CHRNX:  RET
                          ;
                          ;
                          ;*************************************************************
                          ;
                          ;                       PROCLN
                          ;
                          ;         THIS ROUTINE CHECKS IF THE LAST LINE OBTAINED FROM THE GAC II
                          ;CONTAINED THE '%' CHARACTER AND IF SO RECOVERS THE NUMERICAL DATA IN
                          ;THE LINE
                          ;
```

```
LOC  OBJ            LINE        SOURCE STATEMENT

                     283 ;*******************************************************************
                     284 ;
00DA 3E80            285 PROCLN: MVI    A,FLAGIT        ;RESET FILLIN FLAG
00DC 320000     D    286         STA    FILLIN
                     287         TSTFLG FCTFLG,PROC1
00DF 3A0400     D    288+        LDA    PCTFLG
00E2 17              289+        RAL
00E3 DAE900     C    290+        JC     PROC1
00E6 C30601     C    291         JMP    PROCEX
                     292 PROC1:  TSTFLG FSTFLG,PROC2    ;CHECK IF THIS IS MOIST OR TST WT
00E9 3A0300     D    293+        LDA    FSTFLG
00EC 17              294+        RAL
00ED DAFB00     C    295+        JC     PROC2
00F0 011800     D    296         LXI    B,PMOSTB
00F3 3E80            297         MVI    A,FLAGIT
00F5 320300     D    298         STA    FSTFLG          ;IT WAS MOIST SO NEXT WILL BE TST WT
00F8 C30301     C    299         JMP    PROCCL
00FB 3E80            300 PROC2:  MVI    A,FLAGIT
00FD 320200     D    301         STA    FXTFLG
0100 011600     D    302         LXI    B,TSTWTB
0103 CD3F01     C    303 PROCCL: CALL   RCOVR
0106 210500     D    304 PROCEX: LXI    H,LINBUF
0109 C9              305         RET
                     306 ;
                     307 ;
                     308 ;*******************************************************************
                     309 ;
                     310 ;                           ASKFCH
                     311 ;
                     312 ;       THIS ROUTINE GETS ON CHARACTER FROM THE GAC II.
                     313 ;
                     314 ;*******************************************************************
000C                 315 TIMOUT  EQU    12D
                     316 ;
                     317 ;
010A F3              318 ASKFCH: DI
                     319         SMLDLY CHRDLY
010B 3E09            320+        MVI    A,CHRDLY
010D 3D              321+??0003: DCR    A
010E C20D01     C    322+        JNZ    ??0003
0111 3E3F            323         MVI    A,CHRSTB
0113 32E69F          324         STA    PORTC
                     325         SMLDLY CHRDLY
0116 3E09            326+        MVI    A,CHRDLY
0118 3D              327+??0004: DCR    A
0119 C21801     C    328+        JNZ    ??0004
                     329         CLC
011C A7              330+        ANA    A
011D 3E7F            331         MVI    A,HNDSHK        ;END OF CHARACTER STROBE NOW WAIT FOR
011F 32E69F          332         STA    PORTC
0122 060C            333         MVI    B,TIMOUT
0124 3AE49F          334 ASK1:   LDA    PORTA           ;CHECK IF ENABLE IS HIGH INDICATING CHAR
0127 17              335         RAL
0128 D22E01     C    336         JNC    CHRWT
012B C33401     C    337         JMP    ASK2
012E 05              338 CHRWT:  DCR    B
012F C22401     C    339         JNZ    ASK1            ;JUMP IF NO TIMEOUT
0132 FB              340 ASKEX:  EI
0133 C9              341         RET
0134 3AE49F          342 ASK2:   LDA    PORTA
0137 17              343         RAL
0138 DA3401     C    344         JC     ASK2
013B 3F              345         CMC                             ;SET FLAG TO OK
013C C33201     C    346         JMP    ASKEX
                     347 ;*******************************************************************
                     348 ;
                     349 ;                           RCOVR
                     350 ;       THIS ROUTINE GETS THE DATA FROM THE INPUT LINE AND PACKS IT
                     351 ;INTO THE PROPER BUFFER.
                     352 ;
                     353 ;*******************************************************************
013F 210700     D    354 RCOVR:  LXI    H,LINBUF+2
0142 110000          355         LXI    D,0H
                     356         CLC                             ;CLEAR THE CARRY
0145 A7              357+        ANA    A
0146 7E              358         MOV    A,M
0147 E60F            359         ANI    0FH
0149 5F              360 RCOV1:  MOV    E,A
                     361         CSLD
014A 18              362+        DB     18H
014B 18              363+        DB     18H
014C 18              364+        DB     18H
014D 18              365+        DB     18H
014E 23              366 RCOV2:  INX    H
014F 7E              367         MOV    A,M
0150 E60F            368         ANI    0FH
0152 FE00            369         CPI    0H
0154 CA6601     C    370         JZ     RDONE
0157 FE0E            371         CPI    0EH
0159 CA4E01     C    372         JZ     RCOV2
015C FE0F            373         CPI    0FH
015E C26201     C    374         JNZ    RCOV3
0161 AF              375         XRA    A
0162 B3              376 RCOV3:  ORA    E
0163 C34901     C    377         JMP    RCOV1
0166 7A              378 RDONE:  MOV    A,D
0167 02              379         STAX   B
0168 03              380         INX    B
0169 7B              381         MOV    A,E
016A 02              382         STAX   B
016B C9              383 RCOVEX: RET
                     384 ;
                     385         DSEG
```

```
LOC  OBJ        LINE       SOURCE STATEMENT

                     ;
                     ;*****************************************************************
                     ;
                     ;                              RAM LOCATIONS
                     ;
                     ;*****************************************************************
                     ;
0000                 FILLIN: DS      1
0001                 KEYFLG: DS      1
0002                 EXTFLG: DS      1
0003                 FSTFLG: DS      1
0004                 PCTFLG: DS      1
0005                 LINBUF: DS      17
0015        D                ORG     $-1
0015                 LBTOP:  DS      1
0016                 TSTWTB: DS      2
0018                 PMOSTB: DS      2              ;% MOIST RESULT BUFFER
                             END

PUBLIC SYMBOLS
GACMN  C 0000   KEYFLG D 0001   PMOSTB D 0018   TSTWTB D 0016

EXTERNAL SYMBOLS
KEYIN  E 0000

USER SYMBOLS
ASK1   C 0124   ASK2   C 0134   ASKEX  C 0132   ASKFCH C 010A   CHKON  C 0051   CHRDLY A 0009   CHRNX  C 00D9
CHRSTB A 003F   CHRWT  C 012E   CKEX   C 006A   CLC    + 0006   CONTRL A 9FE7   CPXB   + 0003   CSLD   + 0004
CTRLWD A 0092   DATAEX C 00BA   DATAIN C 0094   DELETE A 0011   ERCON  C 00D3   EXIT   C 0023   EXTFLG D 0002
FILLIN D 0000   FLAGIT A 0080   FSTFLG D 0003   FSTOK  C 0069   GACMN  C 0000   GACW11 C 0070   GACWAT C 006B
HLDPRT A 00C1   HNDSHK A 007F   INCHAR C 00BB   INITIO C 0027   KEYFLG D 0001   KEYIN  E 0000   KEYPRS C 0022
LBTOP  D 0015   LINBUF D 0005   PCTFLG D 0004   PMOSTB D 0018   POPAL  + 0001   PORTA  A 9FE4   PORTC  A 9FE6
PROC1  C 00E9   PROC2  C 00FB   PROCCL C 0103   PROCEX C 0106   PROCLN C 00DA   PUSHAL + 0000   RCOV1  C 0149
RCOV2  C 014E   RCOV3  C 0162   RCOVEX C 016B   RCOVR  C 013F   RDONE  C 0166   RDY    C 00A0   SMLDLY + 0022
TIMOUT A 000C   TSTFLG + 0005   TSTWTB D 0016   WAIT   C 000F   WAITDT C 008D   WATEXT C 0093

ASSEMBLY COMPLETE,   NO ERRORS


ISIS-II 8080/8085 MACRO ASSEMBLER, V3.0          SCLIO3
SCALES I/O ROUTINE

LOC  OBJ        LINE       SOURCE STATEMENT

                     $       TITLE   ('SCALES I/O ROUTINE')
                             NAME    SCLIO3
                             CSEG
0080                 FLAGIT  EQU     80H
9FE0                 REGA    EQU     9FE0H
9FE1                 REGB    EQU     9FE1H
9FE2                 REGC    EQU     9FE2H
0011                 DELETE  EQU     11H
FFFF                 TIMOUT  EQU     0FFFFH
9FE4                 PORTA   EQU     9FE4H          ;8255 PORT A
9FE5                 PORTB   EQU     9FE5H          ;8255 PORT C
9FE6                 PORTC   EQU     9FE6H          ;8255 PORT C
9FE7                 CTRLPT  EQU     9FE7H          ;8255 CONTROL PORT
009A                 CTRLMD  EQU     10011010B      ;CONTROL WORD TO SETUP 8255 FOR BIT PC0 OUT
0001                 STBHI   EQU     1              ;HIGH LEVEL STROBE MASK
0000                 STBLO   EQU     0              ;LOW LEVEL STROBE MASK
                     ;
                     ;*****************************************************************
                     ;
                     ;                         DELCARE:
                     ;
                     ;*****************************************************************
                             EXTRN   KEYIN
                             PUBLIC  GETWT2,SKYFLG,WTSTOR
                     $       EJECT
                     ;*****************************************************************
                     ;
                     ;                              MACROS
                     ;
                     ;*****************************************************************
                     ;
                     ;
                     PUSHAL  MACRO
                             PUSH    B
                             PUSH    D
                             PUSH    H
                             ENDM
                     ;
                     ;
                     POPAL   MACRO
                             POP     H
                             POP     D
                             POP     B
                             ENDM
                     ;
                     ;
                     ;*****************************************************************
                     ;
                     ;                              CPXB
                     ;
                     ;       THIS ROUTINE COMPARES THE CONTENTS OF THE B REGISTER
                     ;PAIR AND THE H REGISTER PAIR.  THE ZERO FLAG IS SET IF THE CONTENTS
                     ;ARE THE SAME.
                     ;
                     ;*****************************************************************
```

```
LOC  OBJ           LINE   SOURCE STATEMENT

                          ;
                          CPXB     MACRO
                                   PUSH     H
                                   DB       08H
                                   POP      B
                                   ENDM
                          ;
                          ;
                          CSLD     MACRO
                                   DB       18H
                                   DB       18H
                                   DB       18H
                                   DB       18H
                                   ENDM
                          ;
                          ;
                          TSTFLG   MACRO    FLAG,IFTRUE
                                   LDA      FLAG
                                   RAL
                                   JC       IFTRUE
                                   ENDM
                          ;
                          ;
                          CLC      MACRO
                                   ANA      A
                                   ENDM
                          $        EJECT
                          ;*****************************************************************
                          ;
                          ;        THIS ROUTINE IS FOR USE WITH THE MASTRON MODEL M3000 SCALE
                          ;
                          ;*****************************************************************
                          ;
                          ;
                          ;
                          ;
                          ;
                          ;*************************************************************
                          ;
                          ;                          MAIN
                          ;
                          ;        THIS IS THE MAIN PROGRAM. IT INITIALIZES THE ROUTINE AND
                          ;CHECKS IF THE SCALE IS ON LINE.  THE CARRY FLAG IS RESET IF NO
                          ;VALUE IS, OR CANNOT, BE RETURNED TO THE CALLING ROUTINE.
                          ;
                          ;*************************************************************
                          ;
                          GETWT2:  PUSHAL                       ;PUSH ALL REGISTERS
0000 C5                  +         PUSH     B
0001 D5                  +         PUSH     D
0002 E5                  +         PUSH     H
0003 CD3000     C                  CALL     INITIO              ;INIT ROUTINE
0006 3AE29F                        LDA      REGC
0009 FEFF                          CPI      0FFH                ;SCALE ON LINE ?
000B C21600     C                  JNZ      GETOK
000E 3E80                          MVI      A,FLAGIT
0010 320000     D                  STA      ERRFLG
0013 C32000     C                  JMP      GET2
0016 CD4L00     C         GETOK:   CALL     SCLWAT              ;WAIT FOR OUTPUT OR KEY TO INTRPT
                                   TSTFLG   SKYFLG,KEYPRS       ;TEST IF KEY IS PRESSED
0019 3A0100     D        +         LDA      SKYFLG
001C 17                  +         RAL
001D DA2B00     C        +         JC       KEYPRS
                          GET2:    TSTFLG   ERRFLG,KEYPRS       ;ERROR !!!
0020 3A0000     D        +         LDA      ERRFLG
0023 17                  +         RAL
0024 DA2B00     C        +         JC       KEYPRS
0027 37                            STC                          ;GOT OUTPUT SO SIGNAL WITH CARRY
0028 C32C00     C                  JMP      EXIT
                          KEYPRS:  CLC                          ;CLEAR THE CARRY, NO OUTPUT
002B A7                  +         ANA      A
                          EXIT:    POPAL                        ;POP REGISTERS AND RETURN
002C E1                  +         POP      H
002D D1                  +         POP      D
002E C1                  +         POP      B
002F C9                            RET
                          $        EJECT
                          ;*************************************************************
                          ;
                          ;                          INITIO
                          ;
                          ;        THIS ROUTINE INITIALIZES THE ROUTINE BY SETTING UP THE 8255
                          ;AND ZEROS ALL FLAGS AND BUFFERS
                          ;
                          ;*************************************************************
                          ;
                          ;
0030 3E00                 INITIO:  MVI      A,00H               ;ZERO WEIGHT BUFFER
0032 210300     D                  LXI      H,WTSTOR
0035 77                            MOV      M,A
0036 23                            INX      H
0037 77                            MOV      M,A
0038 23                            INX      H
0039 77                            MOV      M,A
003A 320100     D                  STA      SKYFLG              ;ZERO THE KEY FLAG
003D 320200     D                  STA      EXTFLG
0040 320000     D                  STA      ERRFLG
0043 3E9A                          MVI      A,CTRLMD            ;SET UP 8255
0045 32E79F                        STA      CTRLPT
0048 3E01                          MVI      A,STBHI
004A 32E69F                        STA      PORTC
004D C9                            RET
                          ;
                          ;
```

```
LOC  OBJ                SOURCE STATEMENT

                        ;*****************************************************************
                        ;
                        ;                         SCLWAT
                        ;
                        ;       THIS ROUTINE WAITS FOR THE SCALE TO OUTPUT VALID DATA
                        ;FOR A KEY TO BE PRESSED AT THE GRAINMASTER KEYBOARD.
                        ;THIS ROUTINE WILL RETURN WITH THE SKYFLG SET IF THE EXIT WAS BY KEY
                        ;
                        ;*****************************************************************
                        ;
                        ;
004F 21FFFF             SCLWAT: LXI     H,TIMOUT
0051 010020                     LXI     B,0000H
0054 3E00                       MVI     A,STBLO         ;SETUP 8255 FOR PRINT REQUEST
0056 32E69F                     STA     PORTC
                        SCLW11: TSTFLG  EXTFLG,WATEXT          ;EXIT ?
0059 3A0200     D               LDA     EXTFLG
005C 17                         RAL
005D DA7C00     C               JC      WATEXT
0060 CD0000     E               CALL    KEYIN           ;CHECK FOR A KEY
0063 D27600     C               JNC     WAITDT          ;NO KEY
0066 FE11                       CPI     DELETE          ;DELETE KEY ?
0068 C27600     C               JNZ     WAITDT
006B 3E80                       MVI     A,FLAGIT        ;KEY SO EXIT
006D 320200     D               STA     EXTFLG
0070 320100     D               STA     SKYFLG          ;SET SKYFLG
0073 C35900     C               JMP     SCLW11
0076 CD8200     C       WAITDT: CALL    DATAIN          ;INPUT DATA IF ANY
0079 C35900     C               JMP     SCLW11
007C 3E01               WATEXT: MVI     A,STBHI         ;REMOVE PRINT STROBE
007E 32E69F                     STA     PORTC
0081 C9                         RET
                        ;
                        ;
                        ;*****************************************************************
                        ;
                        ;                         DATAIN
                        ;       THIS ROUTINE CHECKS FOR DATA TO INPUT FROM THE GAC II. THE
                        ;UNIT IS ASSUMED READY WHEN THE XMIT LINE IS LOW
                        ;
                        ;*****************************************************************
                        ;
0082 3AE29F             DATAIN: LDA     REGC            ;WAIT FOR NO MOTION
0085 17                         RAL
0086 17                         RAL
0087 DAA000     C               JC      DATWAT          ;WAIT FOR SAMPLE
008A 26FF                       MVI     H,255           ;SETUP TIMEOUT
008C 3AE29F             DATLOP: LDA     REGC            ;LOOP UNTIL LO IS FOUND
008F 17                         RAL                     ;LOOK FOR VALID DATA
0090 D29A00     C               JNC     DATIN2
0093 25                         DCR     H
0094 CAAD00     C               JZ      DATERR
0097 C38C00     C               JMP     DATLOP
009A CDB600     C       DATIN2: CALL    LOADAT
009D C3B200     C               JMP     SETEX
00A0 2B                 DATWAT: DCX     H
00A1 3E70                       MVI     A,70H           ;DELAY
00A3 3D                 DLYLP:  DCR     A
00A4 C2A300     C               JNZ     DLYLP
                                CPXB
00A7 E5                         PUSH    H
00A8 08                         DR      08H
00A9 E1                         POP     H
00AA C2B700     C               JNZ     DATAEX
00AD 3E80               DATERR: MVI     A,FLAGIT
00AF 320000     D               STA     ERRFLG
00B2 3E80               SETEX:  MVI     A,FLAGIT
00B4 320200     D               STA     EXTFLG
00B7 C9                 DATAEX: RET
                        ;
                        ;
                        ;*****************************************************************
                        ;
                        ;                         LOADAT
                        ;
                        ;       THIS ROUTINE LOADS THE BUFFER WITH THE SCALES DATA.  THE
                        ;'DIFFLG' IS SET IF THE DATA IS STABLE.
                        ;
                        ;*****************************************************************
                        ;
00B6 E5                 LOADAT: PUSH    H
00B9 210300     D               LXI     H,WTSTOR
00BC 3AE29F                     LDA     REGC
00BF E60F                       ANI     0FH             ;CLEAR OUT STATUS
00C1 77                         MOV     M,A
00C2 23                         INX     H
00C3 3AE19F                     LDA     REGB
00C6 77                         MOV     M,A
00C7 23                         INX     H
00C8 3AE09F                     LDA     REGA
00CB 77                         MOV     M,A
00CC E1                 LOADEX: POP     H
00CD C9                         RET
00CE C9                         RET
                        $       EJECT
                        ;
                        ;
                        ;*****************************************************************
                        ;
                        ;                         RAM LOCATIONS
                        ;
                        ;*****************************************************************
                                DSEG
                        ;
```

```
LOC  OBJ          LINE        SOURCE STATEMENT

 0000                264 ERRFLG: DS      1
 0001                265 SKYFLG: DS      1
 0002                266 EXTFLG: DS      1
 0003                267 WTSTOR: DS      3
                     268         END

PUBLIC SYMBOLS
GETWT2 C 0000    SKYFLG D 0001    WTSTOR D 0003

EXTERNAL SYMBOLS
KEYIN  E 0000

USER SYMBOLS
CLC    + 0000    CPXB   + 0000    CSLD   + 0000    CTRLMD A 009A    CTRLPT A 9FE7    DATAEX C 00B7    DATAIN C 0062
DATERR C 00AD    DATIN2 C 009A    DATLOP C 008C    DATWAT C 00A0    DELETE A 0011    DLYLP  C 00A3    ERRFLG D 0000
EXIT   C 002C    EXTFLG D 0002    FLAGIT A 0080    GET2   C 0020    GETOK  C 0016    GETWT2 C 0000    INITIO C 0030
KEYIN  E 0000    KEYPRS C 002B    LOADAT C 00B6    LOADEX C 00CC    POPAL  + 0031    PORTA  A 9FE4    PORTB  A 9FE5
PORTC  A 9FE6    PUSHAL + 0020    REGA   A 9FE0    REGB   A 9FE1    REGC   A 9FE2    SCLW11 C 0059    SCLWAT C 004E
SETEX  C 00B2    SKYFIG D 0001    STBHI  A 0001    STBLO  A 0000    TIMOUT A FFFF    TSTFLG + 0004    WAITDT C 0076
WATEXT C 007C    WTSTOR D 0003

ASSEMBLY COMPLETE,    NO ERRORS
```

```
ISIS-II 8080/8085 MACRO ASSEMBLER, V3.0          SCLIO3
SCALES I/O ROUTINE

  LOC  OBJ          LINE        SOURCE STATEMENT

                       1 $       TITLE   ('SCALES I/O ROUTINE')
                       2         NAME    SCLIO3
                       3         CSEG
  0080                 4 FLAGIT  EQU     80H
  9FE0                 5 REGA    EQU     9FE0H
  9FE1                 6 REGB    EQU     9FE1H
  9FE2                 7 REGC    EQU     9FE2H
  0011                 8 DELETE  EQU     11H
  4500                 9 TIMOUT  EQU     4500H
  9FE4                10 PORTA   EQU     9FE4H            ;8255 PORT A
  9FE5                11 PORTB   EQU     9FE5H            ;8255 PORT C
  9FE6                12 PORTC   EQU     9FE6H            ;8255 PORT C
  9FE7                13 CTRLPT  EQU     9FE7H            ;8255 CONTROL PORT
  009A                14 CTRLMD  EQU     10011010B        ;CONTROL WORD TO SETUP 8255 FOR BIT PC0 OUT
  0001                15 STBHI   EQU     1                ;HIGH LEVEL STROBE MASK
  0000                16 STBLO   EQU     0                ;LOW LEVEL STROBE MASK
                      17 ;
                      18 ;*******************************************************************
                      19 ;
                      20 ;                          DELCARE:
                      21 ;
                      22 ;*******************************************************************
                      23         EXTRN   KEYIN
                      24         PUBLIC  GETWT2,SKYFLG,WTSTOR
                      25 $       EJECT
                      26 ;*******************************************************************
                      27 ;
                      28 ;                                     MACROS
                      29 ;
                      30 ;*******************************************************************
                      31 ;
                      32 ;
                      33 PUSHAL  MACRO
  -                   34         PUSH    B
  -                   35         PUSH    D
  -                   36         PUSH    H
                      37         ENDM
                      38 ;
                      39 ;
                      40 POPAL   MACRO
  -                   41         POP     H
  -                   42         POP     D
  -                   43         POP     B
                      44         ENDM
                      45 ;
                      46 ;
                      47 ;******************************************************************
                      48 ;
                      49 ;                                     CPXB
                      50 ;
                      51 ;       THIS ROUTINE COMPARES THE CONTENTS OF THE B REGISTER
                      52 ;PAIR AND THE H REGISTER PAIR.  THE ZERO FLAG IS SET IF THE CONTENTS
                      53 ;ARE THE SAME.
                      54 ;
                      55 ;******************************************************************
                      56 ;
                      57 CPXB    MACRO
  -                   58         PUSH    H
  -                   59         DB      06H
  -                   60         POP     H
                      61         ENDM
                      62 ;
                      63 ;
                      64 CSLD    MACRO
  -                   65         DB      18H
  -                   66         DB      18H
  -                   67         DB      18H
  -                   68         DB      18H
                      69         ENDM
```

```
LOC  OBJ            SOURCE STATEMENT

                    ;
                    ;
                    TSTFLG  MACRO   FLAG,IFTRUE
                            LDA     FLAG
                            RAL
                            JC      IFTRUE
                            ENDM
                    ;
                    ;
                    CLC     MACRO
                            ANA     A
                            ENDM
                    $       EJECT
                    ;*****************************************************************
                    ;
                    ;       THIS ROUTINE IS FOR USE WITH THE NCI MODEL 5760 SCALE.
                    ;
                    ;*****************************************************************
                    ;
                    ;
                    ;
                    ;
                    ;
                    ;**************************************************************
                    ;
                    ;                       MAIN
                    ;
                    ;       THIS IS THE MAIN PROGRAM. IT INITIALIZES THE ROUTINE AND
                    ;CHECKS IF THE SCALE IS ON LINE.  THE CARRY FLAG IS RESET IF NO
                    ;VALUE IS, OR CANNOT, BE RETURNED TO THE CALLING ROUTINE.
                    ;
                    ;**************************************************************
                    ;
                    GETWT2: PUSHAL                          ;PUSH ALL REGISTERS
0000 C5                     PUSH    B
0001 D5                     PUSH    D
0002 E5                     PUSH    H
0003 CD3000   C             CALL    INITIO                  ;INIT ROUTINE
0006 3AE29F                 LDA     REGC
0009 FEFF                   CPI     0FFH                    ;SCALE ON LINE ?
000B C21600   C             JNZ     GETOK
000E 3E80                   MVI     A,FLAGIT
0010 320000   D             STA     ERRFLG
0013 C32000   C             JMP     GET2
0016 CD5400   C     GETOK:  CALL    SCLWAT                  ;WAIT FOR OUTPUT OR KEY TO INTRPT
                            TSTFLG  SKYFLG,KEYPRS           ;TEST IF KEY IS PRESSED
0019 3A0100   D             LDA     SKYFLG
001C 17                     RAL
001D DA2B00   C             JC      KEYPRS
                    GET2:   TSTFLG  ERRFLG,KEYPRS           ;ERROR !!!
0020 3A0000   D             LDA     ERRFLG
0023 17                     RAL
0024 DA2B00   C             JC      KEYPRS
0027 37                     STC                             ;GOT OUTPUT SO SIGNAL WITH CARRY
0028 C32C00   C             JMP     EXIT
                    KEYPRS: CLC                             ;CLEAR THE CARRY, NO OUTPUT
002B A7                     ANA     A
                    EXIT:   POPAL                           ;POP REGISTERS AND RETURN
002C E1                     POP     H
002D D1                     POP     D
002E C1                     POP     B
002F C9                     RET
                    $       EJECT
                    ;**************************************************************
                    ;
                    ;                       INITIO
                    ;
                    ;       THIS ROUTINE INITIALIZES THE ROUTINE BY SETTING UP THE 8255
                    ;AND ZEROS ALL FLAGS AND BUFFERS
                    ;
                    ;**************************************************************
                    ;
                    ;
0030 3E00           INITIO: MVI     A,00H                   ;ZERO WEIGHT BUFFER
0032 210500   D             LXI     H,WTSTOR
0035 77                     MOV     M,A
0036 23                     INX     H
0037 77                     MOV     M,A
0038 23                     INX     H
0039 77                     MOV     M,A
003A 320100   D             STA     SKYFLG                  ;ZERO THE KEY FLAG
003D 320300   D             STA     DIFFLG                  ;ZERO THE DIFFERENCE DETECT FLAG
0040 320400   D             STA     SAMFLG
0043 320200   D             STA     EXTFLG
0046 320000   D             STA     ERRFLG
0049 3E9A                   MVI     A,CTRLMD                ;SET UP 8255
004B 32E79F                 STA     CTRLPT
004E 3E01                   MVI     A,STBHI
0050 32E69F                 STA     PORTC
0053 C9                     RET
                    ;
                    ;
                    ;**************************************************************
                    ;
                    ;                       SCLWAT
                    ;
                    ;       THIS ROUTINE WAITS FOR THE SCALE TO OUTPUT VALID DATA
                    ;FOR A KEY TO BE PRESSED AT THE GRAINMASTER KEYBOARD.
                    ;THIS ROUTINE WILL RETURN WITH THE SKYFLG SET IF THE EXIT WAS BY KEY
                    ;
                    ;**************************************************************
                    ;
                    ;
```

```
LOC  OBJ              SOURCE STATEMENT

0054 210045      SCLWAT: LXI     H,TIMOUT
0057 010000              LXI     B,0000H
005A 3E00                MVI     A,STBLO         ;SETUP 8255 FOR PRINT REQUEST
005C 32E69F              STA     PORTC
                 SCLW11: TSTFLG  EXTFLG,WATEXT           ;EXIT ?
005F 3A0200   D          LDA     EXTFLG
0062 17                  RAL
0063 DA8200   C          JC      WATEXT
0066 CD0000   E          CALL    KEYIN           ;CHECK FOR A KEY
0069 D27C00   C          JNC     WAITDT          ;NO KEY
006C FE11                CPI     DELETE          ;DELETE KEY ?
006E C27C00   C          JNZ     WAITDT
0071 3E80                MVI     A,FLAGIT        ;KEY SO EXIT
0073 320200   D          STA     EXTFLG
0076 320100   D          STA     SKYFLG          ;SET SKYFLG
0079 C35F00   C          JMP     SCLW11
007C CD8300   C  WAITDT: CALL    DATAIN          ;INPUT DATA IF ANY
007F C35F00   C          JMP     SCLW11
0082 C9          WATEXT: RET
                 ;
                 ;
                 ;**********************************************************************
                 ;
                 ;                                DATAIN
                 ;       THIS ROUTINE CHECKS FOR DATA TO INPUT FROM THE GAC II. THE
                 ;UNIT IS ASSUMED READY WHEN THE XMIT LINE IS LOW
                 ;
                 ;**********************************************************************
                 ;
0083 3AE29F      DATAIN: LDA     REGC            ;WAIT FOR NO MOTION
0086 17                  RAL
0087 17                  RAL
0088 17                  RAL
0089 DA9F00   C          JC      DATWAT          ;WAIT FOR SAMPLE
008C 26FF                MVI     H,255           ;SETUP TIMEOUT
008E 3AE29F      DATLOP: LDA     REGC            ;LOOP UNTIL HI IS FOUND
0091 17                  RAL
0092 DA9900   C          JC      DATIN2
0095 25                  DCR     H
0096 CAA600   C          JZ      DATERR
0099 CDB400   C  DATIN2: CALL    LOADAT
009C C3AB00   C          JMP     SETEX
009F 2B          DATWAT: DCX     H
                         CPXB
00A0 E5                  PUSH    H
00A1 08                  DB      08H
00A2 E1                  POP     H
00A3 C2B300   C          JNZ     DATAEX
00A6 3E80        DATERR: MVI     A,FLAGIT
00A8 320000   D          STA     ERRFLG
00AB 3E80        SETEX:  MVI     A,FLAGIT
00AD 320200   D          STA     EXTFLG
00B0 CDED00   C          CALL    ADJUST
00B3 C9          DATAEX: RET
                 ;
                 ;
                 ;**********************************************************************
                 ;
                 ;                                LOADAT
                 ;
                 ;       THIS ROUTINE LOADS THE BUFFER WITH THE SCALES DATA.  THE
                 ;'DIFFLG' IS SET IF THE DATA IS STABLE.
                 ;
                 ;**********************************************************************
                 ;
00B4 E5          LOADAT: PUSH    H
00B5 210500   D          LXI     H,WTSTOR
00B8 3AE29F              LDA     REGC
00BB E60F                ANI     0FH             ;CLEAR OUT STATUS
00BD 77                  MOV     M,A
00BE 23                  INX     H
00BF 3AE19F              LDA     REGB
00C2 77                  MOV     M,A
00C3 23                  INX     H
00C4 3AE09F              LDA     REGA
00C7 77                  MOV     M,A
00C8 E6F0                ANI     0F0H            ;GET TOP NIBBLE
00CA BB                  CMP     E
00CB 5F                  MOV     E,A
00CC CAD700   C          JZ      SAME
00CF 3E00                MVI     A,00H
00D1 320400   D          STA     SAMFLG
00D4 C3EB00   C          JMP     LOADEX
                 SAME:   TSTFLG  SAMFLG,UPCONT
00D7 3A0400   D          LDA     SAMFLG
00DA 17                  RAL
00DB DAE600   C          JC      UPCONT
00DE 3E80                MVI     A,FLAGIT
00E0 320400   D          STA     SAMFLG
00E3 C3EB00   C          JMP     LOADEX
00E6 3E80        UPCONT: MVI     A,FLAGIT
00E8 320300   D          STA     DIFFLG
00EB E1          LOADEX: POP     H
00EC C9                  RET
                 ;
                 ;
                 ;**********************************************************************
                 ;
                 ;                               ADJUST
                 ;
                 ;**********************************************************************
                 ;
                 ;
00ED 210600   D  ADJUST: LXI     H,WTSTOR+1
```

```
LOC  OBJ               SOURCE STATEMENT

00F0 110000                  LXI     D,0H
                             CLC
00F3 A7                      ANA     A
00F4 7E                      MOV     A,M
00F5 5F                      MOV     E,A
                             CSLD
00F6 18                      DB      18H
00F7 18                      DB      18H
00F8 18                      DB      18H
00F9 18                      DB      18H
00FA 23                      INX     H
00FB 7E                      MOV     A,M
00FC E6F0                    ANI     0F0H
00FE 1F                      RAR
00FF 1F                      RAR
0100 1F                      RAR
0101 1F                      RAR
0102 B3                      ORA     E
0103 5F                      MOV     E,A
0104 7E                      MOV     A,M
0105 210500      D           LXI     H,WTSTOR
0108 47                      MOV     B,A
0109 7A                      MOV     A,D
010A 77                      MOV     M,A
010B 23                      INX     H
010C 7B                      MOV     A,E
010D 77                      MOV     M,A
010E 78                      MOV     A,B
010F E60F                    ANI     0FH
0111 17                      RAL
0112 17                      RAL
0113 17                      RAL
0114 17                      RAL
0115 23                      INX     H
0116 77                      MOV     M,A
0117 C9                      RET
                     $       EJECT
                     ;
                     ;
                     ;*****************************************************************
                     ;
                     ;                             RAM LOCATIONS
                     ;
                     ;*****************************************************************
                             DSEG
                     ;
0000                 ERRFLG: DS      1
0001                 SKYFLG: DS      1
0002                 EXTFLG: DS      1
0003                 DIFFLG: DS      1
0004                 SAMFLG: DS      1
0005                 WTSTOR: DS      3
                             END


PUBLIC SYMBOLS
GETWT2 C 0000    SKYFLG D 0001    WTSTOR D 0005

EXTERNAL SYMBOLS
KEYIN  E 0000

USER SYMBOLS
ADJUST C 00ED   CLC    + 0005   CPXB   + 0002   CSLD   + 0003   CTRLMD A 009A   CTRLFT A 9FE7   DATAEX C 00B3
DATAIN C 0083   DATERR C 00A6   DATIN2 C 0099   DATLOP C 008E   DATWAT C 009F   DELETE A 0011   DIFFLG D 0003
ERRFLG D 0000   EXIT   C 002C   EXTFLG D 0002   FLAGPT A 0080   GET2   C 0020   GETOK  C 0016   GETWT2 C 0000
INITIO C 0030   KEYIN  E 0000   KEYFRS C 002B   LOADAT C 00B4   LOADEX C 00EB   POPAL  + 0001   PORTA  A 9FE4
PORTB  A 9FE5   PORTC  A 9FE6   PUSHAL + 0000   REGA   A 9FE0   REGB   A 9FE1   REGC   A 9FE2   SAME   C 00D7
SAMFLG D 0004   SCLW11 C 005F   SCLWAT C 0054   SETIX  C 00AB   SKYFLG D 0001   STBHI  A 0001   STBLO  A 0000
TIMOUT A 4500   TSTFLG + 0004   UPCONT C 00E6   WAITDT C 007C   WATEXT C 0082   WTSTOR D 0005

ASSEMBLY COMPLETE,   NO ERRORS
```

We claim as our invention:

1. A method for operating a grain elevator by automatically recording and calculating grain transactions for particular customers for present or future recall including records of customer position and account and the total quantities of different grains stored in the elevator as well as the moisture content of the different grains comprising, the steps of weighing containers when they contain grain and also weighing containers after they have been emptied, measuring the moisture percentage of the grain in said container supplying to a computer with a programmable memory inputs indicative of weight and moisture, supplying selectable data from a keyboard to said computer, operating said computer under the control of a program for receiving and retaining in said memory standard moisture percentages and weights for said different grains from said keyboard as well as customer identification numbers, and storage and drying fees, determining in the net weight of the grain contained in each of said containers from signals from a scale means, determining the deviation of the moisture content of the grain in each of said containers from said standard moisture percentages retained in said memory, determining the drying fee for the grain in each of said containers, determining and supplying to said computer a shrinkage factor for the grain in each of said containers, determining and supplying to said computer a damage factor for the grain in each of said containers, determining and supplying to said computer a foreign materials factor for the grain in each of said containers, determining and supplying to said computer the customer or customers identification of the grain in each of said containers, supplying information to said computer indicating whether the grain in each of said containers is to be immediately sold, or whether it is to be stored in said elevator, supplying the buying price to said computer for grain which is to be sold, calculating the quantity of grain and the net price for said grain which is determined from said net weight, said deviation of moisture content, the drying fee, the shrinkage factor, the damage factor and said foreign materials factor of said grain in each of said containers, and supplying and output of said computer which comprises an indication of the quantity and net price for said grain in each of said containers for each customer.

2. A method according to claim 1 further comprising a step of determining for each customer the total grain stored in the elevator for said customer.

3. A method according to claim 1 further comprising the steps of determining the totals of each type of grain stored in the elevator and determining the ownership of each type of said grain stored in said elevator.

4. A method according to claim 1 further comprising the steps of determining the quantities of different types of grain removed from said elevator and determining the quantities of different types of grain remaining in said elevator.

* * * * *